US012422946B2

(12) United States Patent
Kim et al.

(10) Patent No.: US 12,422,946 B2
(45) Date of Patent: Sep. 23, 2025

(54) ELECTRONIC DEVICE, STYLUS PEN, AND METHOD FOR DETECTION OF A POSITION OF THE STYLUS PEN ON THE ELECTRONIC DEVICE

(71) Applicant: HiDeep Inc., Seongnam-si (KR)

(72) Inventors: Seyeob Kim, Seongnam-si (KR); Hyoungwook Woo, Seongnam-si (KR); Kyeonghan Park, Seongnam-si (KR); Bonkee Kim, Seongnam-si (KR); Youngho Cho, Seongnam-si (KR); Sein Lee, Seongnam-si (KR); Hwanhee Lee, Seongnam-si (KR); Kiryoung Jung, Seongnam-si (KR); Wonwoo Lee, Seongnam-si (KR); Jeongwon Seo, Seongnam-si (KR); Jongsik Kim, Seongnam-si (KR); Inuk Jeong, Seongnam-si (KR); Beomkyu Ko, Seongnam-si (KR); Hojun Moon, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 18/621,190

(22) Filed: Mar. 29, 2024

(65) Prior Publication Data

US 2024/0319817 A1 Sep. 26, 2024

Related U.S. Application Data

(63) Continuation of application No. 17/794,736, filed as application No. PCT/KR2021/000870 on Jan. 22, 2021, now Pat. No. 11,983,357.

(30) Foreign Application Priority Data

Jan. 22, 2020 (KR) ........................ 10-2020-0008825
Jan. 22, 2020 (KR) ........................ 10-2020-0008826
(Continued)

(51) Int. Cl.
*G06F 3/041* (2006.01)
*G06F 1/16* (2006.01)
(Continued)

(52) U.S. Cl.
CPC ........ *G06F 3/04164* (2019.05); *G06F 1/1616* (2013.01); *G06F 1/1656* (2013.01);
(Continued)

(58) Field of Classification Search
CPC .. G06F 3/04164; G06F 3/0441; G06F 3/0442; G06F 3/04162; G06F 3/03545;
(Continued)

(56) References Cited

U.S. PATENT DOCUMENTS

2012/0287003 A1 11/2012 Kao et al.
2014/0080411 A1 3/2014 Konanur et al.
(Continued)

FOREIGN PATENT DOCUMENTS

CN 104808879 A 7/2015
CN 106597717 A 4/2017
(Continued)

OTHER PUBLICATIONS

Japanese Office Action for Application 2022-545073, Issued Feb. 20, 2024.

(Continued)

*Primary Examiner* — Lisa S Landis
(74) *Attorney, Agent, or Firm* — The Belles Group, P.C.

(57) ABSTRACT

An electronic device according to an embodiment includes: a display panel; a touch electrode layer disposed on the
(Continued)

display panel and comprising at least one touch electrode; and a conductive wire disposed on the display panel, disposed on the same layer as the touch electrode layer, and generating a magnetic field signal for driving a stylus pen.

12 Claims, 149 Drawing Sheets

(30) Foreign Application Priority Data

| | | |
|---|---|---|
| Jan. 22, 2020 | (KR) | 10-2020-0008827 |
| Jan. 22, 2020 | (KR) | 10-2020-0008828 |
| Jan. 22, 2020 | (KR) | 10-2020-0008829 |
| Jan. 22, 2020 | (KR) | 10-2020-0008830 |
| Feb. 24, 2020 | (KR) | 10-2020-0022527 |
| Mar. 31, 2020 | (KR) | 10-2020-0039246 |
| Apr. 1, 2020 | (KR) | 10-2020-0039831 |
| Apr. 3, 2020 | (KR) | 10-2020-0040911 |
| Apr. 9, 2020 | (KR) | 10-2020-0043434 |
| Apr. 20, 2020 | (KR) | 10-2020-0047507 |
| May 12, 2020 | (KR) | 10-2020-0056598 |
| May 18, 2020 | (KR) | 10-2020-0058885 |
| May 20, 2020 | (KR) | 10-2020-0060499 |

(51) Int. Cl.

| | |
|---|---|
| ***G06F 3/0354*** | (2013.01) |
| ***G06F 3/038*** | (2013.01) |
| ***G06F 3/044*** | (2006.01) |
| ***G06F 3/046*** | (2006.01) |

(52) U.S. Cl.
CPC ........ *G06F 3/03545* (2013.01); *G06F 3/0383* (2013.01); *G06F 3/0412* (2013.01); *G06F 3/04162* (2019.05); *G06F 3/0441* (2019.05); *G06F 3/0442* (2019.05); *G06F 3/046* (2013.01)

(58) Field of Classification Search
CPC ...... G06F 3/0383; G06F 3/0412; G06F 3/046; G06F 1/1656; G06F 1/1616
See application file for complete search history.

(56) References Cited

U.S. PATENT DOCUMENTS

| | | | |
|---|---|---|---|
| 2015/0160782 A1 | 6/2015 | Park | |
| 2015/0242029 A1* | 8/2015 | Kim | G06F 3/046 345/173 |
| 2015/0338888 A1 | 11/2015 | Kim et al. | |
| 2016/0012956 A1 | 1/2016 | Yang et al. | |
| 2017/0153732 A1 | 6/2017 | Choi et al. | |
| 2018/0188838 A1 | 7/2018 | An et al. | |
| 2019/0220123 A1 | 7/2019 | Kanaya | |
| 2021/0132722 A1 | 5/2021 | Kim et al. | |

FOREIGN PATENT DOCUMENTS

| | | | |
|---|---|---|---|
| CN | 209843948 | U | 12/2019 |
| EP | 2911043 | A1 | 8/2015 |
| EP | 3428769 | A1 | 1/2019 |
| JP | 2012252660 | A | 12/2012 |
| JP | 2013161343 | A | 8/2013 |
| JP | 2015166865 | A | 9/2015 |
| JP | 2018005484 | A | 1/2018 |
| JP | 2019211758 | A | 12/2019 |
| KR | 20140100744 | A | 8/2014 |
| KR | 20150089753 | A | 8/2015 |
| KR | 20160019989 | A | 2/2016 |
| KR | 20160130603 | A | 11/2016 |
| KR | 20170034998 | A | 3/2017 |
| KR | 101834793 | B1 | 3/2018 |
| KR | 20180090243 | A | 8/2018 |
| WO | 2019009360 | A1 | 1/2019 |

OTHER PUBLICATIONS

European Search Report 21744360.5-1224, Issued Feb. 21, 2024.
Chinese Office Action 202180012026.6, Issued May 28, 2025.

* cited by examiner

Ideal case

Real case

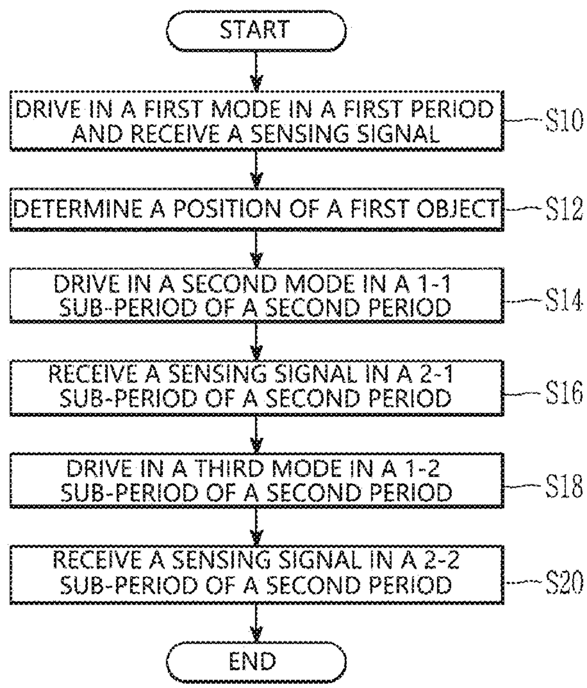
Fig. 148
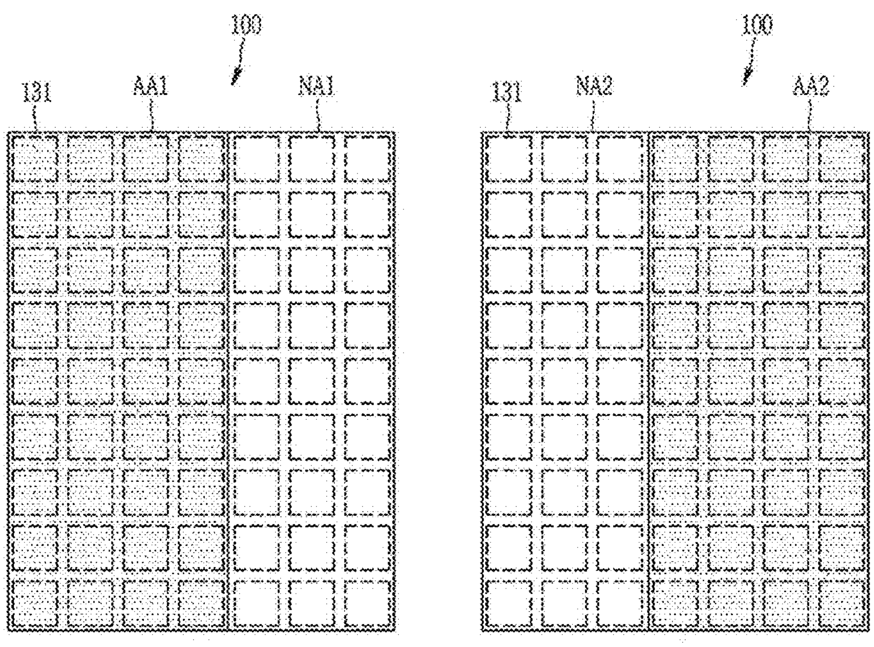
Fig. 149A
Fig. 149B

ELECTRONIC DEVICE, STYLUS PEN, AND METHOD FOR DETECTION OF A POSITION OF THE STYLUS PEN ON THE ELECTRONIC DEVICE

CROSS-REFERENCE TO RELATED APPLICATIONS

The present application is a continuation of U.S. patent application Ser. No. 17/794,736, filed on Jul. 22, 2022, which is a U.S. national stage application under 35 U.S.C. § 371 of PCT Application No. PCT/KR2021/000870, filed Jan. 22, 2021, which claims priority to Korean Patent Application Nos. 10-2020-0008825, 10-2020-0008826, 10-2020-0008827, 10-2020-0008828, 10-2020-0008829, and 10-2020-0008830, all filed Jan. 22, 2020; Korean Patent Application No. 10-2020-0022527, filed Feb. 24, 2020; Korean Patent Application No. 10-2020-0039246, filed Mar. 31, 2020; Korean Patent Application No. 10-2020-0039831, filed Apr. 1, 2020; Korean Patent Application No. 10-2020-0040911, filed Apr. 3, 2020; Korean Patent Application No. 10-2020-0043434, filed Apr. 9, 2020; Korean Patent Application No. 10-2020-0047507, filed Apr. 20, 2020; Korean Patent Application No. 10-2020-0056598, filed May 12, 2020; Korean Patent Application No. 10-2020-0058885, filed May 18, 2020; and Korean Patent Application No. 10-2020-0060499; filed May 20, 2020. The disclosures of all the aforementioned applications are incorporated herein by reference in their respective entireties, for all purposes.

TECHNICAL FIELD

The present disclosure relates to an electronic device, a stylus pen, and driving and controlling method thereof.

BACKGROUND ART

Touch sensors are included in various electronic devices such as mobile phones, smart phones, tablet PCs, laptop computers, digital broadcasting terminals, PDA (Personal Digital Assistants), PMP (Portable Multimedia Player), and navigation systems.

In such an electronic device, the touch sensor may be located on a display panel displaying an image or located in an area of the electronic device body. When the user interacts with the electronic device by touching the touch sensor, the electronic device may provide an intuitive user interface to the user.

A user may use a stylus pen for sophisticated touch input. Such a stylus pen may transmit and receive a signal through an electrical and/or magnetic method with the touch sensor. In the case of a passive stylus pen, the stylus pen generates a signal by resonating with a driving signal applied to the touch sensor, and the touch sensor receives the resonance signal of the stylus pen and detects a touch position.

In the case of a passive stylus pen, the stylus pen generates a signal by resonating with a driving signal applied to the touch sensor, and the touch sensor receives the resonance signal of the stylus pen and detects a touch position. On the other hand, when such a passive stylus pen touches the touch sensor with a conductive object such as a human body, a problem arises that the touch sensor does not detect the touch of the stylus pen depending on the location of the conductive object or the touch area of the conductive object.

Noise exists in an electronic device for various reasons, and such noise may act as a factor degrading the sensing performance of the electronic device. In particular, in the case of the stylus pen, when noise in a frequency band similar to the resonant frequency of the stylus pen exists, the precision of touch sensing may be greatly reduced.

The demand for an electronic device having a larger display screen while having the same or smaller volume or thickness than the prior art is increasing, and a foldable display device or a bendable display device is also being developed.

Conventionally, in order to receive a sensing signal from the touch electrodes included in the touch sensor, amplifiers corresponding to each of the touch electrodes are provided in the touch sensor.

Meanwhile, for a sophisticated touch input to an electronic device having a large screen, a stylus pen may be used. The stylus pen may be divided into an active stylus pen and a passive stylus pen depending on whether a battery and electronic components are provided therein.

The active stylus pen has superior basic performance compared to the passive stylus pen and has the advantage of providing additional functions (pressure, hovering, buttons), but it is difficult to use while charging the battery, and the pen itself is expensive and requires power. Since it is a method of charging the battery, there are not many actual users except for some advanced users.

The passive stylus pen has the advantage of being cheaper and not requiring a battery compared to the active stylus pen, but it has the disadvantage that it is difficult to recognize a sophisticated touch compared to the active stylus pen. However, recently, in order to implement a passive stylus pen capable of sophisticated touch recognition, an Electro Magnetic Resonance (EMR) method which is an inductive resonance method, and a capacitive resonance method have been proposed. In addition, in the case of a passive stylus pen, the stylus pen generates a signal by resonating with a driving signal applied to the touch sensor, and the touch sensor receives the resonance signal of the stylus pen to detect a touch position. On the other hand, when such a passive stylus pen touches the touch sensor with a conductive object such as a human body, a problem arises that the touch sensor does not detect the touch of the stylus pen depending on the location of the conductive object or the touch area of the conductive object.

Since a passive stylus pen operating without an internal power source performs a touch input using an electric signal and/or a magnetic signal transmitted from a touch sensor, research to improve touch sensitivity is being conducted.

However, recently, a technique for implementing a passive stylus pen capable of sophisticated touch recognition using a resonance circuit has been proposed.

In particular, in the case of an Electro-Magnetic Resonance (EMR) type pen among passive stylus pens, after a digitizer transmits an electromagnetic signal to the pen, the digitizer receives a resonance signal from the pen. That is, since a signal is transmitted and received only by the digitizer, signal transmission and signal reception cannot be simultaneously performed, and there is a problem in that it must be performed in a time division manner. Similarly, in the case of an Electrically Coupled Resonance (ECR) type pen among passive stylus pens, after the touch electrode transmits an electromagnetic signal to the pen, the touch electrode receives a resonance signal from the pen. That is, since the signal is transmitted and received only by the touch electrode, there is a problem that the signal transmission and the signal reception cannot be simultaneously performed, and must be performed in a time division manner.

The EMR method has superior writing/drawing quality, which is the core function of the stylus pen, but has a disadvantage in that it is thicker and more expensive because a separate EMR sensor panel and EMR driving IC must be added in addition to the capacitive touch panel.

The capacitive resonance method uses a general capacitive touch sensor and a touch controller IC to support pen touch by increasing the performance of the IC at no additional cost.

In the capacitive resonance method, in order for the touch sensor to more accurately identify the touch by the stylus pen, the amplitude of the resonance signal must be large. Accordingly, the frequency of the driving signal transmitted from the touch sensor to the stylus pen is made to be substantially the same as the resonance frequency of the resonance circuit built in the stylus pen. However, according to the conventional capacitive resonance method, even if the resonance frequency and the frequency of the driving signal match, signal transmission is attenuated due to a very small capacitance formed between the touch sensor outputting the driving signal and the pen tip receiving the driving signal is very large, so there is a problem in that signal transmission is difficult. As a result, despite the many attempts of many touch controller IC vendors for a long time, there is no company that has succeeded in mass production as there is not enough output signal.

Therefore, in order to manufacture a capacitive resonant stylus pen capable of generating the maximum output signal, how to design the internal resonant circuit and the structure of the pen becomes a very important factor.

SUMMARY OF THE INVENTION

An embodiment of the present invention is to provide a capacitive resonant stylus pen capable of generating a sufficient output signal.

An embodiment of the present invention provides an electronic device, a stylus pen, and a driving and controlling method thereof, capable of preventing noise caused by a display panel.

An embodiment of the present invention provides an electronic device, a stylus pen, and a method of driving and controlling the same, having a plurality of resonant frequencies and using them to receive a signal with reduced noise.

An embodiment of the present invention provides an electronic device, a stylus pen, and a method of driving and controlling the same, capable of reducing noise of a touch signal.

An embodiment of the present invention provides an electronic device, a stylus pen, and a method of driving and controlling the same, capable of improving touch sensing performance by the stylus pen.

An embodiment of the present invention provides an electronic device, a stylus pen, and a driving and controlling method thereof, capable of improving touch sensing performance by a stylus pen in an environment in which noise in a frequency band similar to a resonance signal of the stylus pen exists.

An embodiment of the present invention provides an electronic device, a stylus pen, and a method of driving and controlling the same, capable of improving signal sensitivity for detecting a touch position of the stylus pen.

An embodiment of the present invention provides an electronic device, a stylus pen, and a method of driving and controlling the same, capable of sensing a touch position by the stylus pen when the stylus pen comes into contact with another conductive object such as a human body at the same time.

An embodiment of the present invention provides an electronic device, a stylus pen, and a method of driving and controlling the same, capable of searching for a resonant frequency of the stylus pen.

An embodiment of the present invention provides an electronic device, a stylus pen, and a method for driving and controlling the same, capable of generating a sufficient resonance signal.

An embodiment of the present invention provides an electronic device capable of resonating a signal transmitted from a touch sensor, a stylus pen, and a driving and controlling method thereof.

An embodiment of the present invention provides an electronic device, a stylus pen, and a method for driving and controlling the same, in which the stylus pen is easy to use.

An embodiment of the present invention provides a foldable electronic device, a stylus pen, and a method of driving and controlling the same, in which the stylus pen is easily used.

An embodiment of the present invention provides an antenna module implemented on one layer, an electronic device including the same, a stylus pen, and a driving and controlling method thereof.

An embodiment of the present invention provides an electronic device capable of wireless charging while the stylus pen is in use, the stylus pen, and a driving and controlling method thereof.

An embodiment of the present invention provides an electronic device, a stylus pen, and a method of driving and controlling the same, including an antenna module driven with a smaller current.

An embodiment of the present invention provides an electronic device capable of outputting a driving signal corresponding to a resonant frequency of the stylus pen, the stylus pen, and a driving and controlling method thereof.

An embodiment of the present invention provides an electronic device, a stylus pen, and a method of driving and controlling the same, capable of transmitting a signal of an appropriate size to a touch sensor.

An embodiment of the present invention provides an electronic device capable of wireless charging without a separate wireless charging module, a stylus pen, and a driving and controlling method thereof.

An embodiment of the present invention provides an electronic device, a stylus pen, and a driving and controlling method thereof, including an antenna module capable of reducing power consumption.

An embodiment of the present invention provides an electronic device, a stylus pen, and a driving and controlling method thereof, in which a resonant frequency can be maintained.

An embodiment of the present invention provides an electronic device capable of a touch input and a sensor input, and a stylus pen, and a driving and controlling method thereof.

An embodiment of the present invention provides an electronic device, a stylus pen, and a method for driving and controlling the same, in which a resonant frequency can be changed.

An embodiment of the present invention provides an electronic device, a stylus pen, and a method of driving and controlling the same, capable of amplifying a magnetic field generated in a coil with the same voltage.

An embodiment of the present invention provides an electronic device, a stylus pen, and a method of driving and controlling the same, capable of wireless charging with maximum efficiency.

An embodiment of the present invention provides an electronic device, a stylus pen, and a method of driving and controlling the same, capable of communicating with the electronic device using a commercialized communication protocol.

In order to achieve the above or other objects, the stylus pen according to an embodiment is connected to a body portion, a conductive tip exposed to the outside in the body portion, a ferrite core positioned in the body portion, and the conductive tip, and an inductor part including a coil wound in multiple layers on at least a portion of the ferrite core, and a capacitor part located in the body portion and electrically connected to the inductor part to form a resonance circuit.

Here, the dielectric constant of the ferrite core is 1000 or less, the coil may have adjacent winding layers that are alternately wound, and the coil may be a wire wrapped around two or more insulated wires.

In addition, the ferrite core may include nickel, and the coil may be formed of a Litz wire.

In addition, it may further include a grounding portion that can be electrically connected to a user, and further includes a bobbin surrounding at least a portion of the ferrite core, and the coil may be wound on at least a portion of the bobbin.

A conductive blocking member surrounding at least a portion of the inductor portion may be further included. The blocking member may include a single slit for blocking the generation of eddy currents, and both ends of the blocking member may be spaced apart from each other in a first direction, which is a direction in which an eddy current is formed by the single slit.

A stylus pen according to another embodiment includes a body part, a conductive tip exposed to the outside within the body part, a resonance circuit unit that is located in the body part, is connected to the conductive tip, and resonates an electrical signal transmitted from the conductive tip, and a ground part that can be electrically connected to a user.

Here, the resonance circuit unit is electrically connected to the ferrite core and the conductive tip located in the body part, and it may include an inductor unit including a coil wound in multiple layers on at least a portion of the ferrite core and located in the body part, and a capacitor part electrically connected to the ground part and the conductive tip. In this case, the dielectric constant of the ferrite core is 1000 or less, and the coil is wound in a zigzag manner in which adjacent winding layers are inclined, and the coil may be a wire wrapped around two or more insulated wires.

In addition, the ferrite core may include nickel, and the coil may be formed of a Litz wire.

In this case, the resonance circuit unit may be formed of two or more inductor units and one capacitor unit connected in series. In addition, two or more LC resonance circuits may be connected in series to the resonance circuit unit.

It may further include a conductive blocking member surrounding at least a portion of the resonance circuit unit. The blocking member may include a single slit for blocking the generation of eddy currents, and both ends of the blocking member may be spaced apart from each other in a first direction, which is a direction in which an eddy current is formed by the single slit.

A stylus pen according to an embodiment includes a housing, a conductive tip at least a portion of which is exposed to the outside of the housing, a resonance circuit unit located in the housing, connected to the conductive tip, and resonating an electrical signal transmitted from the conductive tip, and a conductive blocking member positioned to correspond to a portion of the housing to which the conductive tip is exposed to the outside.

The blocking member may be a single conductive plate.

One portion thereof includes a non-conductive holder portion. The blocking member is positioned corresponding to the holder portion, and includes a slit for blocking generation of eddy currents. Both ends of the blocking member are spaced apart in the first direction by the single slit and the first direction may be a direction in which an eddy current is formed.

The blocking member includes a connection unit connecting both ends of the blocking member, and further includes a grounding unit capable of electrical connection with a user, and the connection unit is electrically connected to the grounding unit.

The blocking member may be positioned between an area spaced apart 0.1 mm from the opening of the housing to which the conductive tip is exposed to the outside, and an area spaced apart from the opening by 20 mm.

One portion thereof includes a non-conductive holder portion. The blocking member is positioned corresponding to the holder portion, is spaced apart from each other in a first direction, and includes the plurality of first blocking units extending along a second direction perpendicular to the first direction where the first direction is a direction in which an eddy current is formed, and the plurality of first blocking units may be conductive.

The blocking member includes a connection unit connecting both ends of the blocking member, and further includes a grounding unit capable of electrical connection with a user, and the connection unit is electrically connected to the grounding unit.

One portion thereof includes a non-conductive holder portion. The blocking member includes a plurality of second blocking units positioned corresponding to the holder portion, extending along a first direction, and spaced apart from each other in a second direction perpendicular to the first direction where the first direction is a direction in which an eddy current is formed, and both ends of each of the plurality of second blocking units are spaced apart from each other in the first direction.

It may further include a ground part that is connected to the blocking member and can be electrically connected to a user, wherein the resonance circuit unit may include an inductor part connected between the conductive tip and the ground part, and a capacitor part connected between the conductive tip and the ground part.

The blocking member surrounds at least a portion of an inductor part.

One portion thereof includes a non-conductive holder portion and a non-conductive body portion spaced apart from the conductive tip, and a first portion positioned adjacent to the conductive tip of the blocking member is positioned corresponding to the holder portion, and one conductive plate and a second portion surrounding at least a portion of the inductor portion of the blocking member is positioned to correspond to the body portion and includes one slit for blocking the generation of eddy currents, and both ends of the second portion of the blocking member are separated by the one slit. Both ends of the second portion are spaced apart along a first direction, and the first direction may be a direction in which an eddy current is formed.

One portion thereof includes a non-conductive holder portion, the housing further includes a non-conductive body portion spaced apart from the conductive tip, a first portion positioned adjacent to the conductive tip of the blocking member is positioned corresponding to the holder portion, a first slit for blocking generation of eddy currents, and a second portion surrounding at least a portion of the inductor portion of the blocking member is positioned corresponding to the body portion, and includes a second slit for blocking generation of eddy currents. Both ends of the first portion of the blocking member are spaced apart in a first direction by one first slit, and both ends of the second portion of the blocking member are spaced apart in the first direction by one second slit. The first direction may be a direction in which an eddy current is formed.

One portion thereof includes a non-conductive holder portion, the housing further includes a non-conductive body portion spaced apart from the conductive tip, a first portion positioned adjacent to the conductive tip of the blocking member is positioned corresponding to the holder portion, a second portion including a plurality of first blocking portions spaced apart from each other in a first direction and extending in a second direction perpendicular to the first direction, a second portion surrounding at least a portion of the inductor portion of the blocking member is positioned corresponding to the body portion, a plurality of third blocking portions spaced apart from each other in a first direction and extending along a second direction perpendicular to the first direction, where the first direction is a direction in which an eddy current is formed, and the plurality of first blocking portions and the plurality of third blocking portions may be conductive.

The inductor unit may include a ferrite core and a conductive coil connected to the conductive tip and wound around the ferrite core.

The blocking member may be located on the inner surface of the housing.

The blocking member may be located on the outer surface of the housing.

The blocking member is embedded between the inner and outer surfaces of the housing.

The blocking member may include a sheet in which a plurality of conductive blocking portions is printed.

The blocking member may include a plurality of blocking portions plated on the housing.

To achieve the above or other objects, a touch device according to an embodiment includes a touch panel that applies a first driving signal to the touch panel while driving in a first mode, the touch panel including a plurality of touch electrodes, and enters a second mode, a driving/receiving unit that applies a second driving signal different from the first driving signal to the touch panel during driving, and a controller configured to obtain first touch data by comparing first sensing signals received from the touch panel while driving in the first mode with a first threshold value, and to obtain second touch data by comparing second sensing signals received from the touch panel with a second threshold value while driving in the second mode. The controller may determine the second threshold value based on at least some of the first sensing signals.

The controller acquires touch coordinates by using the second sensing signals, and determines the second threshold by using the first sensing signals corresponding to a predetermined region based on the touch coordinates among the first sensing signals.

The plurality of touch electrodes includes a plurality of first touch electrodes arranged in a first direction and a plurality of second touch electrodes arranged in a second direction intersecting the first direction, and the driving/receiving unit may apply a signal of first frequency as the first driving signal to the plurality of first touch electrodes during a first period of driving in the first mode.

The driving/receiving unit may apply a signal of a second frequency different from the first frequency to both the plurality of first touch electrodes and the plurality of second touch electrodes as the second driving signal during a part of the second period driven in the second mode.

The controller may receive the first sensing signals from the plurality of second touch electrodes during the first period.

The controller may receive the second sensing signals from the plurality of first touch electrodes and the plurality of second touch electrodes in a part of the second period.

The frequency of the second driving signal may correspond to a resonance frequency of a stylus pen.

The first sensing signals are used to acquire touch coordinates of a first touch object, and the second sensing signals are used to acquire touch coordinates of a second touch object, where the second touch object includes a stylus pen, and the first touch object may include a conductive touch object different from the stylus pen.

When the first and second touch objects simultaneously touch the touch panel, the controller may change the second threshold value according to a distance between a touch point of the first touch object and a touch point of the second touch object, and acquire the second touch data by the second touch object.

When the first and second touch objects simultaneously touch the touch panel, the controller may change the second threshold value according to a touch pattern of the first touch object, and acquire the second touch data by the second touch object.

The touch pattern may include a touch area or a touch shape.

A touch device according to another embodiment may include a touch panel, a driving/receiving unit that applies a driving signal corresponding to a frequency of a resonance signal of a stylus pen to the touch panel, and receives sensing signals from the touch panel, and among the sensing signals, and a controller configured to acquire touch data by the stylus pen using at least one sensing signal identified as a valid touch signal. In addition, in a state in which the touch panel is individually touched by the stylus pen, the controller may identify a sensing signal having a signal magnitude of a first range as the effective touch signal. In a state in which the touch panel is simultaneously touched by the stylus pen and a conductive touch object different from the stylus pen, the controller may identify a sensing signal having a signal magnitude of a second range different from the first range as the effective touch signal.

The controller compares the sensing signals with a threshold value to identify the effective touch signal. The threshold value in a state where the touch panel is touched by the stylus pen alone, and the threshold value in a state in which the touch panel is simultaneously touched by the stylus pen and a conductive touch object different from the stylus pen may be used differently.

The controller may identify the effective touch signal by comparing the sensing signals with a threshold value. When the touch panel is simultaneously touched by the stylus pen and a conductive touch object different from the stylus pen, the sensing signal may be compared with the threshold value, after amplifying the sensing signals having a signal level in the second range to those having a signal level in the first range.

A touch detection method of a touch device according to an embodiment includes applying a driving signal corresponding to a resonance signal of a stylus pen to the touch panel in a state in which the touch panel is individually touched by the stylus pen, receiving sensing signals from the touch panel, identifying a valid touch signal from among the sensing signals using a threshold value, and acquiring touch data by the stylus pen using the sensing signal identified as the valid touch signal from among the sensing signals. In the step of identifying, when the touch panel is individually touched by the stylus pen, a sensing signal having a signal magnitude of a first range among the sensing signals is identified as a valid touch signal, and when the touch panel is simultaneously touched by the stylus pen and a conductive touch object different from the stylus pen, a sensing signal having a signal magnitude in a second range different from the first range among the sensing signals is identified as a valid touch signal.

The threshold value in a state in which the touch panel is individually touched by the stylus pen and the threshold value in a state in which the touch panel is simultaneously touched by the stylus pen and a conductive touch object different from the stylus pen may be different from each other.

The step of identifying the sensing signal having the signal magnitude in the second range as the valid touch signal may include amplifying the sensing signals so that a sensing signal having a signal magnitude in the second range among the sensing signals has a signal magnitude in the first range, and comparing the amplified sensing signals with the threshold value to identify the valid touch signal.

A touch detection method of a touch device according to another embodiment may include entering a first mode and applying a first driving signal to a touch panel, receiving first sensing signals from the touch panel in response to the first driving signal, acquiring first touch data by comparing the first sensing signals with a first threshold value, entering a second mode and applying a second driving signal different from the first driving signal to the touch panel, receiving second sensing signals from the touch panel in response to the second driving signal, determining a second threshold value based on the first sensing signals, and acquiring second touch data by comparing the second sensing signals with two threshold values.

The step of determining may include acquiring touch coordinates using the second sensing signals, and determining the second threshold value using the first sensing signals corresponding to a predetermined area based on the touch coordinates among the first sensing signals.

The step of determining may include using any one of first value and second value obtained by using the first sensing signals as the second threshold value.

The second value may be smaller than the first value.

The method for detecting a touch of a touch device according to another embodiment may further include obtaining touch coordinates of a first touch object using the first touch data, and obtaining touch coordinates of a second touch object using the second touch data. In addition, the second touch object may include a stylus pen, and the first touch object may include a conductive touch object different from the stylus pen.

The step of determining may include changing the second threshold value according to a distance between a touch point of the first touch object and a touch point of the second touch object, when the first and second touch objects simultaneously touch the touch panel.

The step of determining may include changing the second threshold value according to a touch pattern of the first touch object, when the first and second touch objects simultaneously touch the touch panel.

To achieve the above or other objects, a touch device according to an embodiment includes a touch panel comprising a plurality of first touch electrodes arranged in a first direction and a plurality of second touch electrodes arranged in a second direction intersecting the first direction, a driver configured to apply a driving signal of a first frequency to the plurality of first touch electrodes and the plurality of second touch electrodes during at least one first period within one frame period among successive frame periods, a receiver configured to receive sensing signals from the plurality of first touch electrodes and the plurality of second touch electrodes during a second period after a first period to which the driving signal is applied, and a controller configured to control the driver to change frequencies of driving signals applied to the plurality of first touch electrodes and the plurality of second touch electrodes based on the signal output from the receiver during at least one first period within one frame period among successive frame periods.

To achieve the above or other objects, a touch device according to an embodiment may include a touch panel comprising a plurality of touch electrodes, and a driving/receiving unit configured to apply a driving signal having a frequency corresponding to a resonance frequency of a stylus pen to the plurality of touch electrodes and receive sensing signals from the plurality of touch electrodes, wherein the driving signal may include a first driving signal and a second driving signal having a phase different from that of the first driving signal.

The touch device may further include a controller configured to acquire first touch data based on sensing signals received from the plurality of touch electrodes during a first period, wherein the driving/receiving unit applies the first driving signal to the plurality of touch electrodes during a second period and the second driving signal to the plurality of touch electrodes during a third period, and wherein the first period may include at least one of the second period and the third period.

The controller may further acquire second touch data based on sensing signals received from the plurality of touch electrodes in at least one of the second period and the third period.

The number of the second periods included in the first period may be the same as the number of the third periods included in the first period.

The number of the second periods included in the first period may be different from the number of the third periods included in the first period.

In the first period, the second period and the third period may be alternately arranged at a predetermined interval.

In the first period, the second period and the third period may be repeated at least once.

In the first period, the second period and the third period may be continuous at least twice.

The number of successive times of the second period and the number of successive times of the third period within the first period may be different from each other.

The number of successive times of the second period and the number of successive times of the third period within the first period may be the same.

The controller calculates a first amplitude value by multiplying an amplitude value of the first sensing signal by a first value when the sensing signals are first sensing signals received from the plurality of touch electrodes in response to the first driving signal. When the sensing signals are second sensing signals received from the plurality of touch electrodes in response to the second driving signal, the controller calculates a second amplitude value by multiplying the amplitude value of the second sensing signal by a second value. The controller acquires the first touch data based on the first amplitude value and the second amplitude value acquired for a predetermined time. The first value and the second value may have the same absolute value and different signs.

The first touch data or the second touch data may correspond to a capacitance change amount of the touch electrodes, a change amount of the sensing signal, or an analog to digital converter (ADC) output, due to a touch of the stylus pen on the touch panel.

In addition, a method for detecting a touch of a touch device according to an embodiment may include selectively applying any one of first and second driving signals having a frequency corresponding to the resonance frequency of the stylus pen and having different phases from each other to a touch panel including a plurality of touch electrodes, receiving sensing signals from the plurality of touch electrodes, calculating the amplitude of each of the sensing signals, repeating the receiving step and the calculating step for a preset number of times, obtaining a final signal level corresponding to each of the plurality of touch electrodes by using the calculated amplitude each time the calculating step is performed, and acquiring touch data by the touch of the stylus pen based on the final signal level.

The selectively applying may include selectively applying any one of the first and second driving signals so that the number of times the first driving signal is applied is equal to the number of times the second driving signal is applied within the preset number of times.

The selectively applying may include selectively applying any one of the first and second driving signals so that the first driving signal and the second driving signal are alternately applied at a predetermined interval.

The selectively applying may include selectively applying any one of the first and second driving signals so that the first driving signal and the second driving signal are alternately applied at a predetermined interval.

The selectively applying may include selectively applying any one of the first and second driving signals so that the first driving signal and the second driving signal are repeatedly applied at least once within the preset number of times.

The selectively applying may include selectively applying any one of the first and second driving signals so that the first driving signal and the second driving signal are repeatedly applied at least twice, wherein the number of times the first driving signal is continuously applied and the number of times the second driving signal is continuously applied may be different from each other within the preset number of times.

The selectively applying may include selectively applying any one of the first and second driving signals so that each of the first driving signal and the second driving signal is continuously applied at least twice, wherein the number of times the first driving signal is continuously applied and the number of times the second driving signal is continuously applied may be the same within the preset number of times.

The step of obtaining the final signal level includes calculating a first amplitude value by multiplying an amplitude value of the first sensing signal by a first value when the sensing signals are first sensing signals received from the plurality of touch electrodes in response to the first driving signal, calculating a second amplitude value by multiplying the amplitude value of the second sensing signal by a second value when the sensing signals are second sensing signals received from the plurality of touch electrodes in response to the second driving signal, and acquiring the final signal level based on the first amplitude value and the second amplitude value acquired for a predetermined time, wherein the first value and the second value may have the same absolute value and different signs.

The step of acquiring the touch data may include acquiring the touch data based on a touch electrode having a corresponding final signal level equal to or greater than a threshold value among the plurality of touch electrodes.

To achieve the above or other objects, a touch device according to an embodiment includes a touch sensing unit that is positioned on a display unit of a display device for driving a plurality of pixels according to a vertical synchronization signal and a horizontal synchronization signal and comprises a plurality of first touch electrodes arranged in a first direction and a plurality of second touch electrodes arranged in a second direction crossing the first direction, a driving/receiving unit for applying a driving signal to at least one of the plurality of first touch electrodes and the plurality of second touch electrodes during a first period and receiving sensing signals from at least one of the plurality of first touch electrodes and the plurality of second touch electrodes during a second period after the first period, wherein the driving signal is synchronized to the horizontal synchronization signal.

The driving/receiving unit may simultaneously apply the driving signal to at least one of plurality of first touch electrodes and at least one of plurality of second touch electrodes during the first period, and may receive sensing signals from at least one of plurality of first touch electrodes and at least one of plurality of second touch electrodes during the second period.

The driving signal may be synchronized with pulses of the horizontal synchronization signal of a predetermined period.

The driving signal may be synchronized with a pulse of the vertical synchronization signal for every frame of a predetermined period.

The frequency of the driving signal may be an integer multiple of 2 or more of the frequency of the horizontal synchronization signal.

The sensing signal may be received in a period determined in response to the horizontal synchronization signal.

The period determined in response to the horizontal synchronization signal may be a period other than the period in which the data signal is input in at least some of the plurality of pixels.

The period determined in response to the horizontal synchronization signal may be a period in which a scan signal applied to the plurality of pixels is at a disable level.

The period determined in response to the horizontal synchronization signal may be a period excluding the period in which a data signal is applied to at least one of the plurality of data lines connected to the plurality of pixels.

The driving/receiving unit may receive the sensing signals according to the frequency of the driving signal synchronized to the frequency of the horizontal synchronization signal.

The reception timing of the sensing signals may include at least two timing-points having opposite phases within one period of a frequency.

The reception timing of the sensing signals may include at least two timing-points at which the phase is changed within one period of a frequency.

The sensing signal may be a signal in which a resonance signal by the driving signal is transmitted to at least one of plurality of first touch electrodes and plurality of second touch electrodes.

The display unit is positioned on the substrate, wherein a thin film encapsulation layer is positioned on the display unit, wherein the plurality of touch electrodes is positioned on the thin film encapsulation layer, and wherein the thin film encapsulation layer may have a thickness of 4 μm to 10 μm.

A method of driving a touch device according to an embodiment includes receiving a horizontal synchronization signal from a signal control unit of a display device, applying a driving signal to at least one of a plurality of first touch electrodes arranged in a first direction and a plurality of second touch electrodes in a second direction crossing the first direction during a first period, receiving sensing signals from at least one of the plurality of first touch electrodes and the plurality of second touch electrodes during a second period after the first period, and generating touch information using the sensing signals, wherein the driving signal is synchronized to the horizontal synchronization signal.

The step of applying the driving signal may include simultaneously applying the driving signal to at least one of plurality of first touch electrodes and at least one of plurality of second touch electrodes during the first period, and the step of receiving the sensing signals may include receiving the sensing signals from at least one of plurality of first touch electrodes and at least one of plurality of second touch electrodes during the second period.

The driving signal may be synchronized with pulses of the horizontal synchronization signal of a predetermined period.

The frequency of the driving signal may be an integer multiple of 2 or more of the frequency of the horizontal synchronization signal.

The sensing signal may be received in a period determined in response to the horizontal synchronization signal.

The period determined in response to the horizontal synchronization signal may be a period other than the period in which the data signal is input in at least some of the plurality of pixels.

The period determined in response to the horizontal synchronization signal may be a period in which a scan signal applied to the plurality of pixels is at a disable level.

The period determined in response to the horizontal synchronization signal may be a period excluding the period in which a data signal is applied to at least one of the plurality of data lines connected to the plurality of pixels.

The step of receiving the sensing signals may include receiving the sensing signals in a period other than the period in which a data signal is input in at least some of the plurality of pixels of the display device according to the horizontal synchronization signal.

The step of receiving the sensing signals may include receiving the sensing signals during a period in which a scan signal applied to the plurality of pixels of the display device according to the horizontal synchronization signal is at a disable level.

The step of receiving the sensing signals may include receiving the sensing signals during a period excluding the period in which a data signal is applied to at least one of a plurality of data lines connected to the plurality of pixels of the display device according to the horizontal synchronization signal.

A display device according to an embodiment includes a display panel including a display area in which a plurality of pixels are positioned, a data driver for applying a data signal to data lines connected to the plurality of pixels, a scan driver for applying a scan signal to scan lines connected to the plurality of pixels, a signal controller for controlling the data driver and the scan driver according to a horizontal synchronization signal, a touch panel overlapping the display area and comprising an active area in which a plurality of first touch electrodes arranged in a first direction and a plurality of second touch electrodes arranged in a second direction crossing the first direction are positioned, and a touch controller for driving the touch panel so that the touch controller applies a driving signal to at least one of the plurality of first touch electrodes and at least one of the plurality of second touch electrodes during a first period, and the touch controller receives sensing signals from at least one of the plurality of first touch electrodes and the plurality of second touch electrodes during a second period after the first period, wherein the drive signal is synchronized to the pulses of the horizontal synchronization signal.

The frequency of the driving signal may be an integer multiple of 2 or more of the frequency of the horizontal synchronization signal.

A touch system according to an embodiment includes a touch sensor unit that is located on a display unit of a display device that drives a plurality of pixels according to a vertical synchronization signal and a horizontal synchronization signal and includes a plurality of first touch electrodes arranged in a first direction and a plurality of second touch electrodes in a second direction crossing the first direction, a driving/receiving unit that applies a driving signal to at least one of the plurality of first touch electrodes and the plurality of second touch electrodes during a first period and receives sensing signals from at least one of the plurality of first touch electrodes and the plurality of second touch electrodes during a second period after the first period, a touch device comprising a controller for generating touch information by using the sensing signals, and a stylus pen comprising a conductive tip and a resonant circuit unit that is connected to the conductive tip and resonates with a driving signal transmitted from the conductive tip, wherein the sensing signal is a signal resonated by the resonance circuit unit, and the driving signal is a signal synchronized with the horizontal synchronization signal.

To achieve the above or other objects, a touch device according to an embodiment includes a touch panel comprising first and second touch electrodes for sensing an external touch through a change in capacitance formed therebetween and third touch electrodes arranged in a matrix form, and a controller that detects a touch position of a first object by applying a first driving signal to at least one of the first touch electrodes, the second touch electrodes, and the third touch electrodes, and the first touch electrodes and the second touch and detects a touch position of a second object different from the first object by applying a second driving signal and a third driving signal different from the second driving signal to at least one of the first touch electrodes, the second touch electrodes and the third touch electrodes, wherein the first driving signal has a frequency different from that of the second driving signal, and the second driving signal is a signal for resonating the second object.

The controller may apply the second driving signal to at least one of the first touch electrodes, the second touch electrodes and the third touch electrodes located in areas other than the touch position of the first object among the first touch electrodes, the second touch electrodes and the third touch electrodes.

The controller may apply the third driving signal to at least one of the first touch electrodes, the second touch electrodes and the third touch electrodes located at the touch position of the first object among the first touch electrodes, the second touch electrodes and the third touch electrodes.

The controller may apply the second driving signal to at least one type of touch electrodes among the first touch electrodes, the second touch electrodes and the third touch electrodes during a first period so as to detect the position of the second object, and apply only the second driving signal or the second and third driving signals together depending on the distance between the touch position of the first object and the touch position of the second object during a second period after the first period.

The controller may apply the second driving signal and the third driving signal together if the distance between the touch position of the first object and the touch position of the second object exceeds a threshold value.

The controller may apply the second driving signal to all of the third touch electrodes during a first period and apply the third driving signal to the third touch electrodes corresponding to the touch position of the first object depending on the distance between the touch position of the first object and the touch position of the second object during a second period after the first period, and apply the second driving signal to the remaining third touch electrodes.

The controller may further apply the second driving signal to both the first touch electrodes and the second touch electrodes during the first period and the second period.

The controller may further apply the second driving signal to all of the first touch electrodes and the second touch electrodes during a first period, apply the third driving signal to the first touch electrodes and the second touch electrodes corresponding to the touch position of the first object depending on the distance between the touch position of the first object and the touch position of the second object during a second period, and apply the second driving signal to the remaining first touch electrodes and second touch electrodes.

The first object may include at least one of finger and palm, and the second object may be a stylus pen.

The third driving signal may have a phase difference of 180 degrees from the second driving signal.

The third driving signal may maintain a constant voltage.

A touch device according to another embodiment may include a plurality of first sensor patterns and a plurality of second sensor patterns each including an outer line and an inner line, a plurality of first connection patterns electrically connecting the plurality of first sensor patterns, a plurality of second connection patterns electrically connecting the plurality of second sensor patterns and located on a different layer from the plurality of first connection patterns, a plurality of third sensor patterns disposed in an inner region surrounded by an inner line on a plane, and a plurality of third connection patterns electrically connecting the plurality of third sensor patterns, wherein the plurality of third sensor patterns are located in an inner region of the plurality of first sensor patterns and the plurality of second sensor patterns on a plane.

The plurality of third connection patterns may be located on the same layer as the plurality of second connection patterns.

The touch device may further include an insulating layer disposed between the plurality of first connection patterns and the plurality of second connection patterns, wherein the plurality of second connection patterns and the plurality of third connection patterns are disposed on a first layer under the insulating layer, wherein the plurality of first and second sensor patterns and the plurality of first connection patterns are disposed on a second layer on the insulating layer, and wherein the plurality of second sensor patterns are connected to the plurality of second connection patterns through the insulating layer between the first layer and the second layer.

Each of the plurality of third sensor patterns may be disposed on the first layer, and each of the plurality of third sensor patterns and each of the plurality of first sensor patterns and the plurality of second sensor patterns may not overlap each other on a plane.

At least one of plurality of third connection patterns may connect a third sensor pattern positioned in an inner region of a first sensor pattern among the plurality of third patterns and a third sensor pattern positioned in an inner region of a second sensor pattern among the plurality of third patterns.

The touch device may further include a first driving/receiving unit electrically connected to the plurality of first sensor patterns, a second driving/receiving unit electrically connected to the plurality of second sensor patterns and a third driving/receiving unit electrically connected to the plurality of third sensor patterns, wherein at least one of the first driving/receiving unit, the second driving/receiving unit, and the third driving/receiving unit drives and detects the touch position of the first object in the first period, wherein at least one of the first driving/receiving unit, the second driving/receiving unit, and the third driving/receiving unit drives and detects the touch position of the second object in the second section after the first section, wherein the first object may include at least one of a finger and a palm, and the second object may be a stylus pen.

In the second period, the signal applied to the sensor patterns corresponding to the position of the first object and the signal applied to the sensor patterns corresponding to the position of the second object may be different from each other.

A touch device according to another embodiment may include first sensor patterns and second sensor patterns each having an opening and sensing an external touch through a change in capacitance formed therebetween, and third sensor patterns positioned in each opening in the same layer as the first sensor patterns and the second sensor patterns, wherein two or more third sensor patterns adjacent to each other among the third sensor patterns are connected to each other to constitute one sensor electrode, and wherein two or more third sensor patterns adjacent to each other constituting one sensor electrode are positioned in at least an opening included in the first sensor patterns and an opening included in the second sensor patterns, respectively.

Some of the third sensor patterns are floating.

To achieve the above or other objects, a stylus pen according to an embodiment may include a body part, a conductive tip exposed to the outside within the body part, a ground part that can be electrically connected to a user, and a resonant circuit unit comprising at least one resonant circuit that resonates with electrical signals of different frequencies transmitted from the conductive tip and outputs resonant signals of the different frequencies.

The resonant circuit unit may include a first resonant circuit resonant with an electrical signal of a first frequency and a second resonant circuit resonant with an electrical signal of a second frequency, wherein the first resonant circuit outputs a resonant signal through the conductive tip during a first period, and wherein the second resonant circuit outputs a resonance signal through the conductive tip during a second period different from the first period.

The first resonance circuit and the second resonance circuit may alternately output a resonance signal.

The first resonant circuit may include a first inductor connected between the conductive tip and the second resonant circuit and a first capacitor coupled between the conductive tip and the second resonant circuit, and the second resonant circuit may include a second inductor connected between the ground part and the first resonant circuit and a second capacitor connected between the ground part and the first resonant circuit, wherein the first inductor and the second inductor may have separate ferrite cores.

The first resonant circuit is connected between the conductive tip and the second resonant circuit, and the second resonant circuit is connected between the first resonant circuit and the ground part.

The resonant circuit unit may output a resonance signal whose frequency changes with time in response to an electrical signal whose frequency changes with time.

A touch device according to an embodiment includes a touch panel comprising first touch electrodes arranged in a first direction and second touch electrodes arranged in a second direction crossing the first direction, and a controller that determines whether a noise signal is received by sampling a signal transmitted from at least one of the first touch electrodes and the second touch electrodes during a first period within one touch report frame period according to a first sampling frequency related to a first driving frequency, and applies a second driving signal having a second driving frequency different from the first driving frequency to at least one of the first touch electrodes and the second touch electrodes during a second period after the first period when a noise signal is determined to be received.

The controller may receive a sensing signal by sampling the signal transmitted from at least one of the first touch electrodes and the second touch electrodes according to the second sampling frequency related to the second driving signal during a third period after the second period.

The signal transmitted from at least one of the first touch electrodes and the second touch electrodes during the third period may be a signal resonated by the second driving signal.

The controller may determine whether a noise signal is received by sampling a signal transmitted from at least one of the first touch electrodes and the second touch electrodes according to the second sampling frequency related to the second driving frequency during the first period within the next touch report frame period after the third period ends.

When it is determined that the noise signal is not received, the controller may apply the first driving signal having the first driving frequency to at least one of the first touch electrodes and the second touch electrodes during the second period after the first period.

The controller may receive a sensing signal by sampling a signal transmitted from at least one of the first touch electrodes and the second touch electrodes according to the first sampling frequency during the third period after the second period.

A touch device according to another embodiment includes a touch panel comprising first touch electrodes arranged in a first direction and second touch electrodes arranged in a second direction crossing the first direction, and a controller that applies a first driving signal having a first driving frequency to at least one of the first touch electrodes and the second touch electrodes during a first number of first periods within one touch report frame period including a plurality of first periods, receives a first sensing signal by sampling a signal transmitted from at least one of the first touch electrodes and the second touch electrodes according to a first sampling frequency related to the first driving frequency, applies a first driving signal having a second driving frequency different from the first driving frequency to at least one of the first touch electrodes and the second touch electrodes during a second number of first periods, and receives a second sensing signal by sampling a signal transmitted from at least one of the first and second touch electrodes according to a second sampling frequency related to the second driving frequency.

The controller may determine whether a noise signal is received using the first sensing signal and the second sensing signal, and change the first number and the second number within the next touch report frame period when it is determined that a noise signal is received.

The controller may increase the first number when the signal-to-noise ratio (SNR) of the first sensing signal is greater than the SNR of the second sensing signal, and may increase the second number when the SNR of the second sensing signal is greater than the SNR of the first sensing signal.

The first number and the second number may be the same.

A touch system according to an embodiment includes a stylus pen according to an embodiment, and a touch device according to any one of the embodiments.

To achieve the above or other objects, an electronic device according to an embodiment includes a loop coil, a touch panel comprising a plurality of first touch electrodes arranged in a first direction and a plurality of second touch electrodes arranged in a second direction crossing the first direction, a driver that applies a driving signal of a first frequency to the loop coil during at least one first period within one frame period among successive frame periods, a receiver that receives a sensing signal from the plurality of first touch electrodes and the plurality of second touch electrodes during a second period after the first period to which the driving signal of the first frequency is applied, and a controller that controls the driver so as to change the frequency of the driving signal applied to the loop coil during at least one first period within the frame periods after the one frame period based on the signal output from the receiver.

To achieve the above or other objects, an electronic device according to an embodiment may include a loop coil, a touch panel comprising a plurality of touch electrodes, and a driving/receiving unit that applies driving signals having a frequency corresponding to the resonance frequency of a stylus pen to the loop coil and receives sensing signals from the plurality of touch electrodes, wherein the driving signals may include a first driving signal and a second driving signal having a phase different from that of the first driving signal.

The electronic device may further include a controller that acquires first touch data based on sensing signals received from the plurality of touch electrodes during a first period, wherein the driving/receiving unit may apply the first driving signal to the plurality of touch electrodes during a second period, and may apply the second driving signal to the plurality of touch electrodes during a third period, and wherein the first period may include at least one of the second period and at least one of the third period.

The controller may further acquire second touch data based on sensing signals received from the plurality of touch electrodes in at least one of the second period and the third period.

The number of the second period included in the first period may be the same as the number of the third periods.

The number of the second period included in the first period may be different from the number of the third periods.

In the first period, the second period and the third period may be alternately arranged at a predetermined period.

In the first period, the second period and the third period may be repeated at least once.

Each of the second period and the third period within the first period may be continuous at least twice.

The number of successive times of the second period and the number of successive times of the third period within the first period may be different from each other.

The number of successive times of the second period and the number of successive times of the third period within the first period may be the same.

The controller may calculate a first amplitude value by multiplying the amplitude value of the first sensing signal by a first value if the sensing signals are the first sensing signals received from the plurality of touch electrodes in response to the first driving signal, calculate a second amplitude value by multiplying the amplitude value of the first sensing signal by a second value if the sensing signals are the second sensing signals received from the plurality of touch electrodes in response to the second driving signal, and acquire the first touch data based on the first amplitude value and the second amplitude value obtained for a predetermined time, wherein the first value and the second value may have the same absolute value and different signs.

The first touch data or the second touch data corresponds to a capacitance change amount of the touch electrode, a change amount of the sensing signals, or an analog-to-digital converter (ADC) output due to a touch of the stylus pen on the touch panel.

In addition, a method for detecting a touch of an electronic device according to an embodiment may include selectively applying to a loop coil any one of first and second driving signals having different phases and having a frequency corresponding to a resonant frequency of a stylus pen, receiving sensing signals from a plurality of touch electrodes, calculating the amplitude of each of the sensing signals, repeating the applying step, the receiving step, and the calculating step a predetermined number of times, obtaining a final signal level corresponding to each of the plurality of touch electrodes by using the calculated amplitude whenever the calculating step is performed, and acquiring one touch data based on the final signal level.

The step of selectively applying may include selectively applying any one of the first and second driving signals so that the number of times the first driving signal is applied is equal to the number of times the second driving signal is applied within the predetermined number of times.

The step of selectively applying may include selectively applying any one of the first and second driving signals so that the number of times the first driving signal is applied is different from the number of times the second driving signal is applied within the predetermined number of times.

The step of selectively applying may include selectively applying any one of the first and second driving signals so that the first driving signal and the second driving signal are alternately applied at a predetermined period.

The step of selectively applying may include selectively applying any one of the first and second driving signals so that the first driving signal and the second driving signal are each repeatedly applied at least once within the predetermined number of times.

The step of selectively applying may include selectively applying any one of the first and second driving signals so that the first driving signal and the second driving signal are each repeatedly applied at least twice wherein the number of times the first driving signal is continuously applied and the number of times the second driving signal is continuously applied may be different from each other within the predetermined number of times.

The step of selectively applying may include selectively applying any one of the first and second driving signals so that the first driving signal and the second driving signal are each repeatedly applied at least twice wherein the number of times the first driving signal is continuously applied and the number of times the second driving signal is continuously applied may be the same.

The step of obtaining a final signal level may include calculating a first amplitude value by multiplying the amplitude value of the first sensing signal by a first value if the sensing signals are the first sensing signals received from the plurality of touch electrodes in response to the first driving signal, calculating a second amplitude value by multiplying the amplitude value of the first sensing signal by a second value if the sensing signals are the second sensing signals received from the plurality of touch electrodes in response to the second driving signal, and acquiring the signal level based on the first amplitude value and the second amplitude value obtained for a predetermined time, wherein the first value and the second value may have the same absolute value and different signs.

The step of acquiring the touch data may include acquiring the touch data based on a touch electrode having a corresponding final signal level equal to or greater than a threshold value among the plurality of touch electrodes.

To achieve the above or other objects, an electronic device according to an embodiment may include a loop coil, a touch sensor that is positioned on a display driving a plurality of pixels according to a vertical synchronization signal and a horizontal synchronization signal and includes a plurality of first touch electrodes arranged in a first direction and a plurality of second touch electrodes arranged in a second direction crossing the first direction, a driving receiver that applies a driving signal to the loop coil during a first period and receives a sensing signal from at least one of the plurality of first touch electrodes and the plurality of second touch electrodes during a second period after the first period, and a controller that generates touch information using the sensing signal, wherein the drive signal is synchronized to the horizontal synchronization signal.

The driving receiver may simultaneously apply a driving signal to at least one of plurality of first touch electrodes and at least one of plurality of second touch electrodes during the first period, and may receive the sensing signal from at least one of plurality of first touch electrodes and at least one of plurality of second touch electrodes during the second period.

The driving signal may be synchronized with pulses of the horizontal synchronization signal of a predetermined period.

The driving signal may be synchronized with a pulse of the vertical synchronization signal for every frame of a predetermined period.

The frequency of the driving signal may be an integer multiple of 2 or more of the frequency of the horizontal synchronization signal.

The sensing signal may be received in a period determined in response to the horizontal synchronization signal.

The period determined in response to the horizontal synchronization signal may be a period other than the period in which a data signal is input in at least some of the plurality of pixels.

The period determined in response to the horizontal synchronization signal may be a period in which a scan signal applied to the plurality of pixels is at a disable level.

The period determined in response to the horizontal synchronization signal may be a period excluding a period in which a data signal is applied to at least one of the plurality of data lines connected to the plurality of pixels.

The driving receiver may receive the sensing signal according to the frequency of the driving signal synchronized to the frequency of the horizontal synchronization signal.

The reception timing of the sensing signal may include at least two timing-points having opposite phases within one period of the frequency.

The reception timing of the sensing signal may include at least two timing-points at which the phase is changed within one period of the frequency.

The sensing signal may be a signal in which a resonance signal by the driving signal is transmitted to at least one of plurality of first touch electrodes and the plurality of second touch electrodes.

The display is positioned on the substrate, the thin film encapsulation layer is positioned on the display, and the plurality of touch electrodes are positioned on the thin film encapsulation layer, wherein the thin film encapsulation layer may have a thickness of 4 μm to 10 μm.

A method of driving an electronic device according to an embodiment includes receiving a horizontal synchronization signal from a signal controller of a display device, applying a driving signal to at least one of a plurality of first touch electrodes arranged in a first direction of a touch sensor during a first period and a plurality of second touch electrodes arranged in a second direction crossing the first direction during a first period, receiving a sensing signal from at least one of the plurality of first touch electrodes and the plurality of second touch electrodes during a second period after the first period, and generating touch information using the sensing signal, wherein the driving signal is synchronized to the horizontal synchronization signal.

The step of applying the driving signal may include simultaneously applying the driving signal to at least one of plurality of first touch electrodes and at least one of plurality of second touch electrodes during the first period, and the step of receiving the sensing signal may include receiving the sensing signal from at least one of plurality of first touch electrodes and at least one of plurality of second touch electrodes during the second period.

The driving signal may be synchronized with pulses of the horizontal synchronization signal of a predetermined period.

The frequency of the driving signal may be an integer multiple of 2 or more of the frequency of the horizontal synchronization signal.

The sensing signal may be received in a period determined in response to the horizontal synchronization signal.

The period determined in response to the horizontal synchronization signal may be a period other than the period in which the data signal is input in at least some of the plurality of pixels.

The period determined in response to the horizontal synchronization signal may be a period in which a scan signal applied to the plurality of pixels is at a disable level.

The period determined in response to the horizontal synchronization signal may be a period excluding a period in which a data signal is applied to at least one of the plurality of data lines connected to the plurality of pixels.

The step of receiving the sensing signal may include receiving the sensing signal in a period other than a period in which a data signal is input in at least some of the plurality of pixels of the display device according to the horizontal synchronization signal.

The step of receiving the sensing signal may include receiving the sensing signal during a period in which a scan signal applied to the plurality of pixels of the display device according to the horizontal synchronization signal is at a disable level.

The step of receiving the sensing signal may include receiving the sensing signal during a period excluding a period in which a data signal is applied to at least one of the plurality of data lines connected to a plurality of pixels of the display device according to the horizontal synchronization signal.

A display device according to an embodiment includes a display panel comprising a display area in which a plurality of pixels are positioned, a data driver applying a data signal to data lines connected to the plurality of pixels, a scan driver applying a scan signal to scan lines connected to the plurality of pixels, a signal controller controlling the data driver and the scan driver according to a horizontal synchronization signal, a touch panel overlapping the display area and comprising an active area in which a plurality of first touch electrodes arranged in a first direction and a plurality of second touch electrodes arranged in a second direction crossing the first direction are positioned, and a touch controller driving the touch panel so as to apply a driving signal to at least one of the plurality of first touch electrodes and at least one of the plurality of second touch electrodes during a first period and receive a sensing signal from at least one of the plurality of first touch electrodes and the plurality of second touch electrodes during a second period after the first period, wherein the driving signal is synchronized to the pulses of the horizontal synchronization signal.

The frequency of the driving signal may be an integer multiple of 2 or more of the frequency of the horizontal synchronization signal.

A touch system according to an embodiment includes a touch sensor that is positioned on a display of a display device driving a plurality of pixels according to a vertical synchronization signal and a horizontal synchronization signal, and comprises a plurality of first touch electrodes arranged in a first direction and a plurality of second touch electrodes arranged in a second direction crossing the first direction, a driving receiver that applies a driving signal to at least one of the plurality of first touch electrodes and at least one of the plurality of second touch electrodes during a first period, and receives a sensing signal from at least one of the plurality of first touch electrodes and the plurality of second touch electrodes during a second period after the first period, a touch device comprising a controller that generates touch information using the sensing signal, and a stylus pen comprising a conductive tip and a resonance circuit that is connected to the conductive tip and resonates with a driving signal transmitted from the conductive tip, wherein the sensing signal is a signal resonated by the resonance circuit, and the driving signal is a signal synchronized with the horizontal synchronization signal.

To achieve the above or other objects, a stylus pen according to an embodiment includes a body, a conductive tip exposed to the outside within the body, an inductor comprising a ferrite core located in the body and a coil connected to the conductive tip and wound in multiple layers on at least a portion of the ferrite core, and a capacitor located in the body and electrically connected to the inductor to form a resonance circuit.

Here, the dielectric constant of the ferrite core may be 1000 or less, the coil may have adjacent winding layers that are alternately wound, and the coil may be a type of wire surrounding two or more insulated wires.

In addition, the ferrite core may include nickel, and the coil may be formed of a Litz wire.

In addition, it may further include a ground that can be electrically connected to a user, and further includes a bobbin surrounding at least a portion of the ferrite core, and the coil may be wound on at least a portion of the bobbin.

It may further include a conductive blocking member surrounding at least a portion of the inductor. The blocking member may include one slit for blocking the generation of eddy currents, and both ends of the blocking member may be spaced apart from each other in a first direction by the one slit in the direction in which the eddy current is formed.

A stylus pen according to another embodiment includes a body part, a conductive tip exposed to the outside within the body part, and a resonance circuit part that is located in the body part, is connected to the conductive tip, and resonates an electrical signal transmitted from the conductive tip, and a ground part that can be electrically connected to a user.

Here, the resonance circuit part may include an inductor part comprising a ferrite core located in the body part and a coil electrically connected to the conductive tip and wound in multiple layers on at least a portion of the ferrite core, and a capacitor part that is located in the body part and electrically connected to the ground part and the conductive tip, wherein the dielectric constant of the ferrite core is 1000 or less, the coil is wound with adjacent winding layers inclined in a zigzag, and the coil may be a wire in the form of wrapping two or more insulated wires.

In addition, the ferrite core may include nickel, and the coil may be formed of a Litz wire.

In this case, the resonance circuit part may be formed of two or more inductor parts and one capacitor part connected in series. In addition, it may be formed of two or more LC resonance circuits connected in series.

It may further include a conductive blocking member surrounding at least a portion of the resonance circuit part. The blocking member may include a single slit for blocking the generation of eddy currents, and both ends of the blocking member may be spaced apart from each other in a first direction, which is a direction in which an eddy current is formed by the single slit.

A stylus pen according to an embodiment includes a housing, a conductive tip at least partially exposed to the outside of the housing, a resonance circuit unit positioned in the housing and resonating a magnetic signal, and a conductive blocking member positioned to correspond to a portion of the housing where the conductive tip is exposed to the outside.

The blocking member may be a single conductive plate.

A portion thereof may include a non-conductive holder part, wherein the blocking member may be positioned corresponding to the holder part, and may include a slit for blocking generation of eddy currents, and wherein both ends of the blocking member are spaced apart in a first direction by the slit, and the first direction may be a direction in which an eddy current is formed.

The blocking member is connected to a blocking member further comprising a connection part connecting both ends of the blocking member, and further includes a grounding part capable of electrical connection with a user, wherein the connection part is electrically connected to the grounding part.

The blocking member may be positioned between an area spaced apart 0.1 mm from the opening of the housing to which the conductive tip is exposed to the outside, and an area spaced apart from the opening by 20 mm.

A portion thereof may include a non-conductive holder part, wherein the blocking member may be positioned corresponding to the holder part, spaced apart from each other in a first direction, include a plurality of first blocking parts extending along a second direction perpendicular to the first direction, wherein the first direction may be a direction in which an eddy current is formed, and wherein the plurality of first blocking parts may be conductive.

The blocking member is connected to the blocking member, further comprising a connection unit for connecting the plurality of first blocking units, and further includes a grounding unit capable of being electrically connected to a user, and the connection unit is electrically connected to the grounding unit.

A portion thereof includes a non-conductive holder part, wherein the blocking member includes a plurality of second blocking parts positioned corresponding to the holder part, extending along a first direction, and spaced apart from each other in a second direction perpendicular to the first direction, and wherein the first direction is a direction in which an eddy current is formed, and both ends of each of the plurality of second blocking parts are spaced apart from each other in the first direction.

It may further include a ground part that is connected to the blocking member and can be electrically connected to a user, wherein the resonance circuit part may include an inductor part connected between the conductive tip and the ground part, and a capacitor part connected between the conductive tip and the ground part.

The blocking member further surrounds at least a portion of the inductor part.

A portion thereof may include a non-conductive holder part and a non-conductive body part spaced apart from the conductive tip, wherein a first part adjacent to the conductive tip of the blocking member is positioned corresponding to the holder part and one conductive plate, wherein a second part surrounding at least a portion of the inductor part of the blocking member is positioned to correspond to the body part and including one slit for blocking the generation of eddy currents, and wherein both ends of the second part of the blocking member are separated by the one slit spaced apart along a first direction which may be a direction in which an eddy current is formed.

A portion thereof may include a non-conductive holder part, wherein the housing further includes a non-conductive body part spaced apart from the conductive tip, wherein a first part adjacent to the conductive tip of the blocking member is positioned corresponding to the holder part and includes a first slit for blocking the generation of eddy currents, wherein a second part surrounding at least a portion of the inductor part of the blocking member is positioned to correspond to the body part and includes a second slit for blocking the generation of eddy currents, wherein both ends of the first part of the blocking member are spaced apart in a first direction by the first slit, and both ends of the second part of the blocking member are spaced apart in the first direction by the second slit, and wherein the first direction may be a direction in which an eddy current is formed.

A portion thereof may include a non-conductive holder part, wherein the housing further includes a non-conductive body part spaced apart from the conductive tip, wherein a first part adjacent to the conductive tip of the blocking member is positioned corresponding to the holder part, and includes a plurality of first blocking parts spaced apart from each other in a first direction and extending in a second direction perpendicular to the first direction, wherein a second part surrounding at least a portion of the inductor part of the blocking member is positioned corresponding to the body part, and includes a plurality of third blocking parts spaced apart from each other in the first direction and extending in the second direction perpendicular to the first direction, and wherein the first direction may be a direction in which an eddy current is formed, and the plurality of first blocking parts and the plurality of third blocking parts may be conductive.

The inductor part may include a ferrite core and a conductive coil connected to the conductive tip and wound around the ferrite core.

The blocking member may be located on the inner surface of the housing.

The blocking member may be located on the outer surface of the housing.

The blocking member may be embedded between the inner and outer surfaces of the housing.

The blocking member may include a sheet in which a plurality of conductive blocking parts are printed.

The blocking member may include a plurality of blocking parts plated on the housing.

To achieve the above or other objects, a stylus pen according to an embodiment includes a body portion, a conductive tip exposed to the outside within the body portion, a resonance circuit unit that is located in the body portion, is connected to the conductive tip, and resonates an electrical signal transmitted from the conductive tip, and a conductive blocking unit surrounding at least a portion of the resonance circuit unit.

It may further include a grounding unit that can be electrically connected to a user.

The resonance circuit unit may include an inductor unit connected between the conductive tip and the grounding unit, and a capacitor unit connected between the conductive tip and the grounding unit.

The blocking unit may surround only the inductor unit.

The blocking unit may include one slit for blocking the generation of eddy currents, and both ends of the blocking unit may be spaced apart from each other in a first direction by the slit, and the first direction may be a direction in which eddy currents are formed.

The blocking unit may further include a connection unit spaced apart from a position of the inductor unit in the body in a second direction perpendicular to a first direction and connecting both ends of the blocking unit.

The connection unit is electrically connected to the grounding unit.

The blocking unit may include a plurality of first blocking units spaced apart from each other in a first direction and extending along a second direction perpendicular to the first direction, wherein the first direction is a direction in which an eddy current is formed, and the plurality of first blocking units may be conductive.

The blocking unit may further include a connection unit spaced apart from a position of the inductor unit in the body portion along the second direction and connecting the plurality of first blocking units.

The connection unit is electrically connected to the grounding unit.

The blocking unit extends along a first direction and includes a plurality of second blocking units spaced apart from each other in a second direction perpendicular to the first direction, wherein the first direction is a direction in which an eddy current is formed, and wherein both ends of each of the plurality of second blocking units are spaced apart from each other along the first direction.

The blocking unit extends along a second direction and includes a connection unit connecting the plurality of second blocking units and an additional grounding unit that is spaced apart from the position of the inductor unit in the body portion and is connected to the connection unit along the second direction.

The additional grounding unit is electrically connected to the grounding unit.

The inductor unit may include a ferrite core and a conductive coil connected to the conductive tip and wound around the ferrite core.

The capacitor unit may include a plurality of capacitors connected in parallel and having different capacitances.

The blocking unit may be located on the inner surface of the body portion.

The blocking unit may be located on the outer surface of the body portion.

The blocking unit may be embedded between the inner surface and the outer surface of the body portion.

A stylus pen according to another embodiment includes a body portion, a conductive tip exposed to the outside within the body portion, a resonance circuit portion that is located in the body portion, is connected to the conductive tip, and resonates an electrical signal transmitted from the conductive tip, and a conductive blocking member surrounding at least a portion of the body portion, wherein the blocking member includes a slit for blocking the generation of eddy currents, wherein both ends of the blocking member are spaced apart along a first direction by the slit, and wherein the first direction is a direction in which an eddy current is formed.

The resonance circuit portion may include an inductor part connected between the conductive tip and a ground part, a capacitor part connected between the conductive tip and the ground part, and a conductive connection member connecting the conductive tip and the inductor part.

A stylus pen according to another embodiment includes a body portion, a conductive blocking member surrounding at least a portion of the body portion, and a conductive tip exposed to the outside within the body portion, wherein the blocking member includes a slit for blocking the generation of eddy currents.

The blocking member may be located on the inner surface of the body portion.

The blocking member may be located on the outer surface of the body portion.

The blocking member is embedded between the inner surface and the outer surface of the body portion.

The blocking member may include a plurality of blocking portions printed on a sheet.

The blocking member may include a plurality of blocking portions plated on the body portion.

To achieve the above or other objects, a stylus pen according to an embodiment includes a body part, a conductive tip exposed to the outside in the body part, a grounding part that can be electrically connected to a user, and a resonance circuit part comprising at least one resonance circuit that is located within the body part, is electrically connected between the conductive tip and the grounding part, resonates with the electromagnetic signals of different frequencies transmitted through the body part, respectively, and outputs resonance signals of different frequencies.

The resonant circuit part may include a first resonance circuit resonanting with an electromagnetic signal of a first frequency, and a second resonance circuit resonanting with an electromagnetic signal of a second frequency, wherein the first resonance circuit may output a resonance signal through the conductive tip during a first period, and the second resonance circuit may output a resonance signal through the conductive tip during a second period different from the first period.

The first resonance circuit and the second resonance circuit may alternately output a resonance signal.

The first resonance circuit may include a first inductor connected between the conductive tip and the second resonance circuit and a first capacitor connected between the conductive tip and the second resonance circuit, wherein the second resonance circuit may include a second inductor connected between the grounding part and the first resonance circuit and a second capacitor connected between the grounding part and the first resonance circuit, and wherein the first inductor and the second inductor may have separate ferrite cores.

The first resonance circuit is connected between the conductive tip and the second resonance circuit, and the second resonance circuit is connected between the first resonance circuit and the grounding part.

The resonance circuit part may output a resonance signal whose frequency changes with time in response to an electromagnetic signal whose frequency changes with time.

A touch sensor according to an embodiment includes a touch panel comprising first touch electrodes arranged in a first direction and second touch electrodes arranged in a second direction crossing the first direction, and a controller that determines whether a noise signal is received by sampling a signal transmitted from at least one of the first touch electrodes and the second touch electrodes according to a first sampling frequency related to a first driving frequency during a first period within one touch report frame period, and when it is determined that a noise signal is received, applies a second driving signal having a second driving frequency different from the first driving frequency to at least one of the first and second touch electrodes during a second period after the first period.

The controller may receive a sensing signal by sampling a signal transmitted from at least one of the first touch electrodes and the second touch electrodes according to a second sampling frequency related to the second driving signal during a third period after the second period.

A signal transmitted from at least one of the first touch electrodes and the second touch electrodes during the third period may be a signal resonated by the second driving signal.

The controller may determine whether a noise signal is received by sampling a signal transmitted from at least one of the first touch electrodes and the second touch electrodes according to the second sampling frequency related to the second driving frequency during a first period within the next touch report frame period after the third period ends.

When it is determined that a noise signal is not received, the controller may apply a first driving signal having the first driving frequency to at least one of the first and second touch electrodes during the second period after the first period.

The controller may receive a sensing signal by sampling a signal transmitted from at least one of the first and second touch electrodes according to the first sampling frequency during the third period after the second period.

A touch sensor according to another embodiment includes a touch panel comprising first touch electrodes arranged in a first direction and second touch electrodes arranged in a second direction crossing the first direction, and a controller that, in one touch report frame period including a plurality of first periods, applies a first driving signal having a first driving frequency to at least one of the first touch electrodes and the second touch electrodes for a first number of first periods, receives a first sensing signal by sampling a signal transmitted from at least one of the first touch electrodes and the second touch electrodes according to a first sampling frequency related to the first driving frequency, applies a second driving signal having a second driving frequency different from the first driving frequency to at least one of the first touch electrodes and the second touch electrodes for a second number of first periods, and receives a second sensing signal by sampling a signal transmitted from at least one of the first touch electrodes and the second touch electrodes according to a second sampling frequency related to the second driving frequency.

The controller may determine whether a noise signal is received using the first sensing signal and the second sensing signal, and change the first number and the second number within the next touch report frame period when it is determined that the noise signal is received.

The controller may increase the first number when the signal-to-noise ratio (SNR) of the first sensing signal is greater than the SNR of the second sensing signal, and may increase the second number when the SNR of the second sensing signal is greater than the SNR of the first sensing signal.

The first number and the second number may be the same.

A touch system according to an embodiment includes a stylus pen according to an embodiment, and a touch sensor according to any one of the embodiments.

To achieve the above or other objects, an electronic device according to an embodiment includes a loop coil, a touch panel comprising a plurality of first touch electrodes arranged in a first direction and a plurality of second touch electrodes arranged in a second direction intersecting the first direction, a coil driver applying a coil driving signal to the loop coil, a driving receiver applying a driving signal to the plurality of first touch electrodes and the plurality of second touch electrodes and receiving a sensing signal from the plurality of first touch electrodes and the plurality of second touch electrodes, and a controller controlling the coil driver so as to change the length of a period in which the coil driver operates based on the sensing signal from the driving receiver.

To achieve the above or other objects, a foldable electronic device according to an embodiment includes a touch sensor and a loop coil disposed under the touch sensor, wherein the loop coil includes a ferrite sheet in a region excluding a folding region forming a curved surface in a folded state and an antenna loop disposed on the ferrite sheet.

To achieve the above or other objects, an electronic device according to an embodiment includes a plurality of antenna loops formed to be spaced apart from each other on a substrate, the plurality of antenna loops comprising a first antenna loop connecting between a first pad and a second pad on the substrate and a second antenna loop connecting between a third pad and a fourth pad, and a flexible circuit board electrically connected to the first to fourth pads, the flexible circuit board comprising the second and a connection wire connecting the second pad and the third pad to each other and a coil driver applying a driving signal to the first pad and the second pad.

To achieve the above or other objects, a stylus pen according to an embodiment includes a sensor sensing an external input, a resonance circuit, and a controller controlling a resonance signal generated by the resonance circuit according to a sensing value of the sensor.

To achieve the above or other objects, an electronic device according to an embodiment includes a touch sensor that sequentially transmits an electromagnetic signal having two or more frequencies to a stylus pen and receives an electrical signal corresponding to the electromagnetic signal from the stylus pen, and a touch controller that operates the touch sensor by determining one of two or more frequencies as a frequency of the electromagnetic signal according to a change in the electrical signal.

The touch controller may determine a frequency at which the magnitude of the electrical signal is large as the frequency of the electromagnetic signal.

The touch controller may generate touch data based on the electrical signal in a unit of one frame.

The touch sensor may sequentially apply electromagnetic signals having two or more frequencies within one frame.

The touch sensor may apply electromagnetic signals of different frequencies corresponding to a plurality of time periods within one frame during each time period.

The touch sensor may apply electromagnetic signals having two or more frequencies in a unit of one frame.

The touch sensor sequentially applies electromagnetic signals having a frequency included in each of a plurality of first frequency periods divided by a first frequency unit to each of a plurality of time periods in a first frame, and sequentially applies electromagnetic signals having a frequency included in each of a plurality of second frequency periods divided by a second frequency unit to each of a plurality of time periods in a second frame successive to the first frame, wherein the first frequency unit is greater than the second frequency unit.

A first frequency period including a frequency having the largest magnitude among electrical signals received during the first frame may be identified as the second frequency unit.

The touch sensor may include a touch panel comprising a plurality of first touch electrodes for detecting touch coordinates in a first direction, and a plurality of second touch electrodes for detecting touch coordinates in a second direction crossing the first direction, and a driving receiver for applying driving signals corresponding to two or more frequencies to at least one of the plurality of first touch electrodes and the plurality of second touch electrodes so that electromagnetic signals having two or more frequencies are transmitted to the stylus pen, and for receiving electrical signals.

The touch sensor may include a loop coil for generating a magnetic field, a touch panel comprising a plurality of first touch electrodes for detecting touch coordinates in a first direction, and a plurality of second electrodes for detecting touch coordinates in a second direction crossing the first direction, and a driving receiver for applying driving signals corresponding to two or more frequencies to the loop coil so that electromagnetic signals having two or more frequencies are transmitted to the stylus pen, and for receiving an electrical signal.

It may further include a temperature sensor for sensing an ambient temperature, wherein the touch sensor may start to transmit electromagnetic signals having two or more frequencies when the ambient temperature is changed.

A method of controlling an electronic device according to an embodiment includes the steps of, by a touch sensor, sequentially transmitting an electromagnetic signal having two or more frequencies to a stylus pen, and by the touch controller, operating the touch sensor by determining any one of two or more frequencies according to a change in an electrical signal as the frequency of the electromagnetic signal.

Determining any one of the two or more frequencies as the frequency of the electromagnetic signal may include determining, by the touch controller, a frequency having a large electrical signal as the frequency of the electromagnetic signal.

The method may further include, by the touch controller, generating touch data based on an electrical signal in a unit of one frame.

The step of sequentially transmitting the electromagnetic signal having two or more frequencies to the stylus pen may include, by the touch sensor, sequentially applying the electromagnetic signal having two or more frequencies within one frame.

The step of sequentially transmitting the electromagnetic signal having two or more frequencies to the stylus pen may include, by the touch sensor, applying the electromagnetic signal having two or more frequencies in a unit of one frame.

The step of applying the electromagnetic signal having two or more frequencies in a unit of one frame may include sequentially applying, by the touch sensor, electromagnetic signals having a frequency included in each of a plurality of first frequency periods divided by a first frequency unit to each of a plurality of time periods in a first frame, and sequentially applying, by the touch sensor, electromagnetic signals having a frequency included in each of a plurality of second frequency periods divided by a second frequency unit to each of a plurality of time periods in a second frame successive to the first frame, wherein the first frequency unit is larger than the second frequency unit.

A first frequency period including a frequency having the largest magnitude among electrical signals received during the first frame is identified as a second frequency unit.

The method may further include sensing an ambient temperature, wherein the touch sensor may start to transmit an electromagnetic signal having two or more frequencies when the ambient temperature is sensed to be changed.

A system according to an embodiment includes a stylus pen comprising a resonant circuit having a resonant frequency, and a touch sensor that searches for the resonant frequency by increasing the frequency of a drive signal from a lower limit to an upper limit within a predetermined range of a reference frequency, or decreasing the frequency of the driving signal from an upper limit to a lower limit within a predetermined range and transmits an electromagnetic signal having the resonant frequency to the stylus pen.

To achieve the above or other objects, an antenna module according to an embodiment includes a resonance circuit comprising a loop coil and a capacitor connected in parallel with the loop coil, a blocking capacitor connected in series to the resonance circuit, and a power supply transmitting a driving signal having a predetermined frequency to the blocking capacitor.

An electronic device according to an embodiment includes a loop coil and a coil driver that applies a driving signal of a predetermined frequency to both ends of the loop coil, wherein the coil driver applies driving signals of opposite phases to both ends of the loop coil.

To achieve the above or other objects, an electronic device according to an embodiment includes a loop coil, a coil driver applying a driving signal of a predetermined frequency to the loop coil, a touch electrode, and a touch driver receiving a sensing signal from the touch electrode, wherein the touch driver receives the sensing signal in a period to which the driving signal is not applied.

To achieve the above or other objects, an electronic device according to an embodiment includes a touch sensor comprising a touch electrode, and a loop coil having a different distance between windings corresponding to the arrangement of the touch electrode.

To achieve the above or other objects, a stylus pen according to an embodiment includes a resonant circuit, an inductor coupled to the resonant circuit in mutual inductance, and an active module coupled to the inductor.

An electronic device, a stylus pen and a driving and controlling method thereof according to an embodiment of the present invention can provide an advantage in that a sufficient output signal can be generated even with a thin diameter due to an optimal structure of resonant circuit in a capacitive resonant stylus pen.

In addition, when the stylus pen is in contact with another conductive object such as a human body at the same time, there is an advantage in that a touch position by the stylus pen can be detected.

In addition, even if the resonant frequency of the stylus pen is changed, there is an advantage in that the size of a signal output from the stylus pen can be increased.

In addition, there is an advantage in that the reception sensitivity of a touch input can be improved.

In addition, there is an advantage in that a more accurate touch position can be calculated.

In addition, there is an advantage in that the touch sensing performance by the stylus pen can be improved in an environment in which noise in a frequency band similar to the resonance signal of the stylus pen exists.

In addition, there is an advantage in that the signal-to-noise ratio (SNR) of a touch device can be improved.

In addition, by presenting an optimal structure of resonant circuit of the stylus pen, there is an advantage in that a sufficient output signal can be generated even with a thin diameter.

In addition, there is an advantage in that it is possible to provide the stylus pen that is robust against external factors.

In addition, there is an advantage in that it is possible to provide the stylus pen that prevents an unintentional touch input.

In addition, there is an advantage in that it is possible to provide the stylus pen that improves the touch sensitivity to a touch sensor.

In addition, there is an advantage of improving the signal-noise-ratio (SNR) of the signal output from the stylus pen.

In addition, there is an advantage in that a palm rejection can be performed.

In addition, there is an advantage in that energy consumption of a touch sensor can be reduced by reducing energy consumption in a period in which a driving signal is output to the touch sensor for resonance of the stylus pen.

In addition, there is an advantage of being able to provide a thinner and smaller form factor.

In addition, there is an advantage in that the costs for manufacturing the antenna module and the electronic device including the same can be saved.

In addition, there is an advantage in that an additional input of a user using the stylus pen can be detected.

In addition, there is an advantage in that the manufacturing cost of the stylus pen can be reduced.

In addition, even if a resonant frequency of the stylus pen is changed, there is an advantage in that the size of a signal output from the stylus pen can be increased.

In addition, there is an advantage in that the power consumption of the antenna module and the electronic device including the same can be reduced.

In addition, there is an advantage of increasing the energy delivered to the stylus pen.

In addition, there is an advantage in that power required for the use of the stylus pen can be delivered at the same time as the use of the stylus pen without separate wireless charging.

In addition, there is an advantage of being able to wirelessly charge the stylus pen in use.

In addition, there is an advantage in that the stylus pen can be charged more quickly.

In addition, there is an advantage of reducing power consumption for charging the stylus pen.

In addition, there is an advantage in that an additional input of a user using the stylus pen can be detected.

In addition, the further scope of applicability of the present invention will become apparent from the following detailed description. However, it should be understood that the detailed description and specific embodiments such as preferred embodiments of the present invention are hereby disclosed by way of illustration purpose only, since a variety of changes and modifications within the scope of the present invention may be readily apparent to a person having ordinary skill in the art.

BRIEF DESCRIPTION OF THE DRAWINGS

FIGS. 104A to 107B are diagrams illustrating an arrangement of a touch panel and a loop coil according to various aspects of another embodiment.

FIG. 148 is a flowchart illustrating a method of controlling a touch sensing unit according to embodiments.

FIGS. 149A and 149B are a diagram illustrating an example of applying a driving signal according to a control method of a touch sensing unit.

FIG. 183 is a graph for explaining the inductance L and Q value in the design of the inductor part.

FIGS. 184 and 185 are diagrams for explaining a type of wire according to an embodiment.

FIGS. 186A and 186B are diagrams for explaining two types of multi-layer winding method.

FIG. 187 is a graph showing the Q values of inductor 1 and inductor 2 measured while changing the frequency through the E4980A precision LCR meter of KEYSIGHT TECHNOLOGIES.

FIG. 188 is a graph showing the Q values of inductors 3 to 5 measured while changing the frequency through the E4980A precision LCR meter of KEYSIGHT TECHNOLOGIES.

FIG. 189 is a graph showing the Q values of inductor 6 and inductor 7 measured while changing the frequency through the E4980A precision LCR meter of KEYSIGHT TECHNOLOGIES.

FIG. 190 is a diagram for explaining an inductor unit according to an embodiment.

Figure 191:
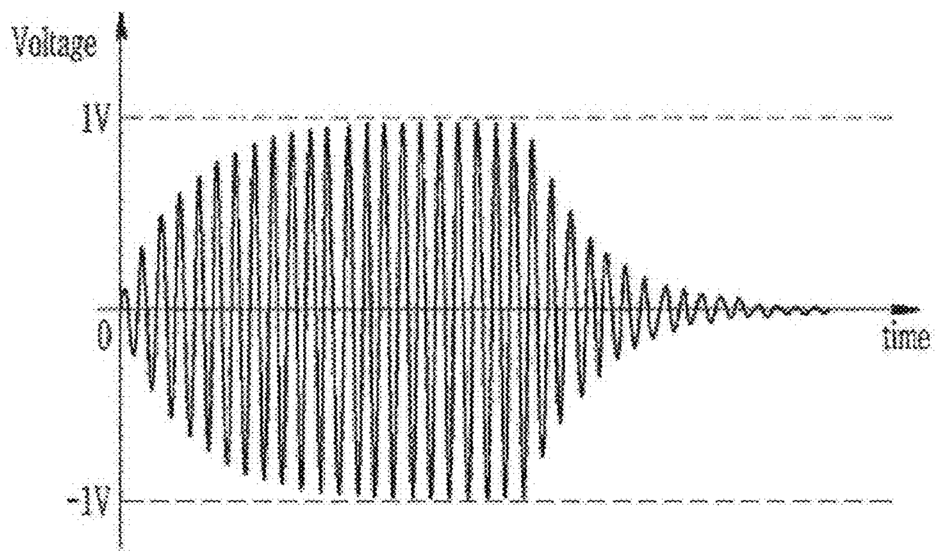

FIG. 191 is a graph showing the maximum amplitude of a resonance signal when the inductor unit 14 includes only the ferrite core 15 and the coil 16.

Figure 192:
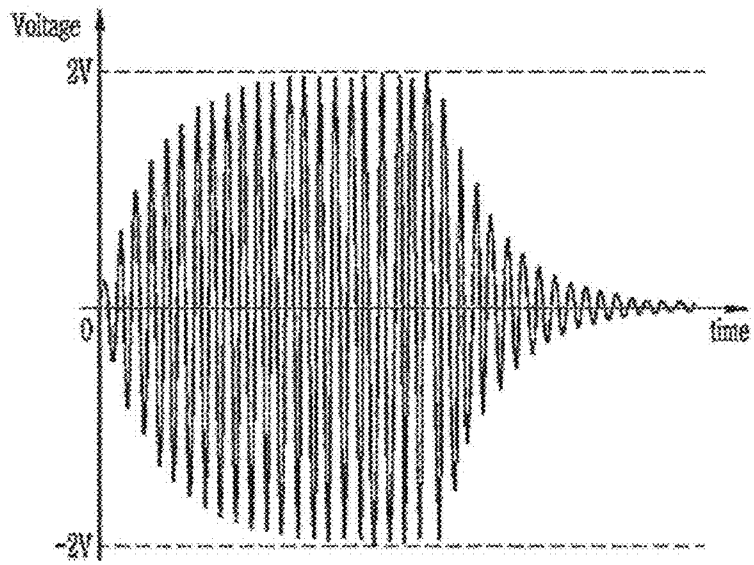

FIG. 192 is a graph showing the maximum amplitude of a resonance signal when the inductor unit 14 includes the ferrite core 15, the bobbin 141 and the coil 16.

Figure 193:
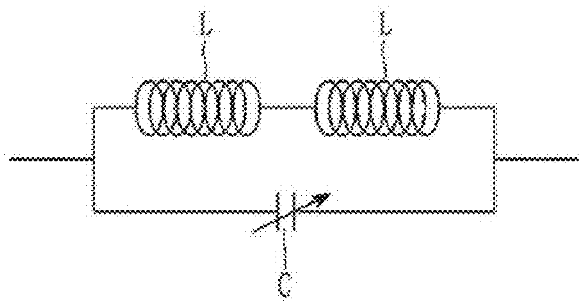

FIG. 193 shows an equivalent circuit in which two thin-diameter inductors are connected in series and a capacitor is connected in parallel between both ends of the two inductors.

Figure 194:
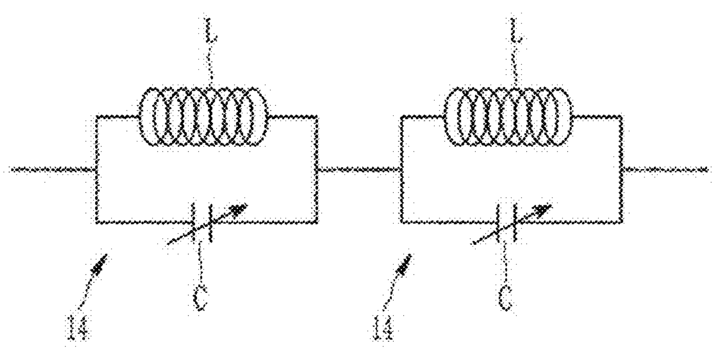

FIG. 194 is a diagram illustrating an equivalent circuit in which two LC resonant circuits are connected in series (hereinafter, referred to as an "LCLC resonant circuit") and output by combining two resonant signals.

Figure 195A:
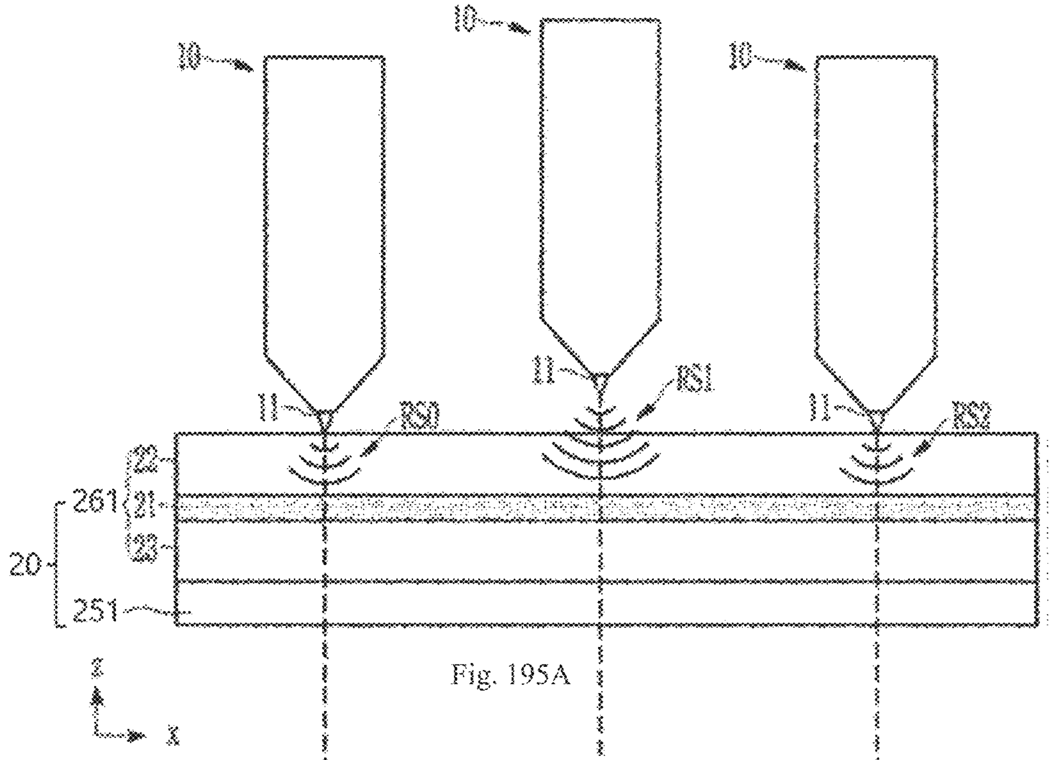
Figure 195B:
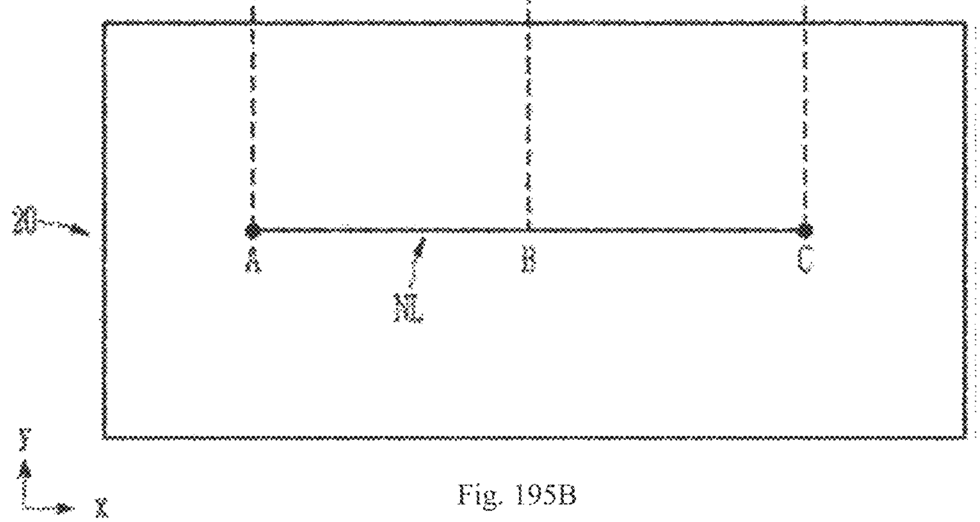

FIGS. 195A and 195B are a diagram illustrating a touch input by hovering of a stylus pen.

Figure 196A:
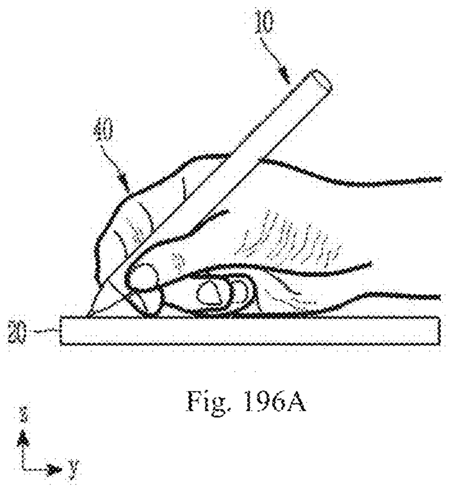
Figure 196B:
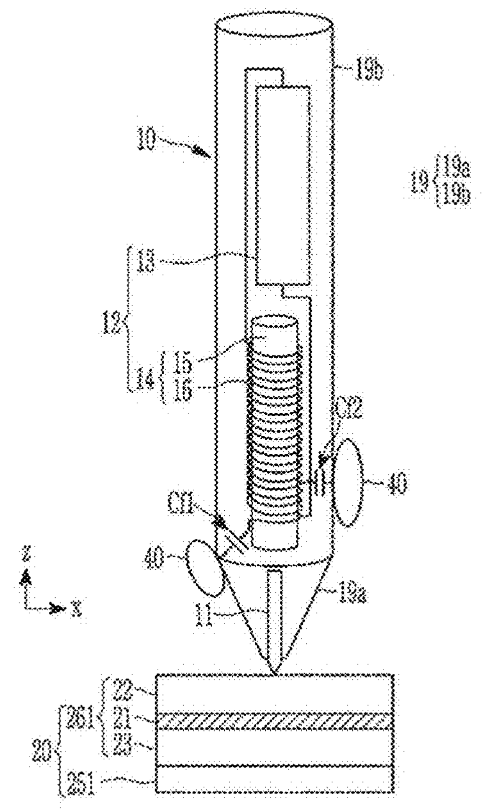

FIGS. 196A and 196B are a conceptual diagram illustrating a stylus pen and an electronic device when the stylus pen is gripped.

Figure 197:
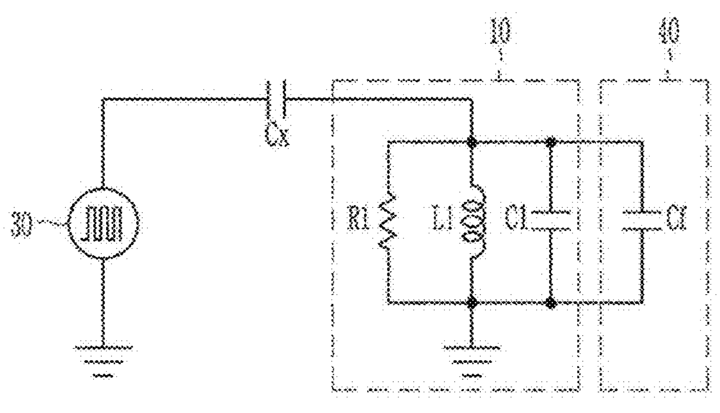

FIG. 197 is a schematic circuit diagram illustrating a stylus pen and an electronic device when the stylus pen is gripped.

Figure 198:
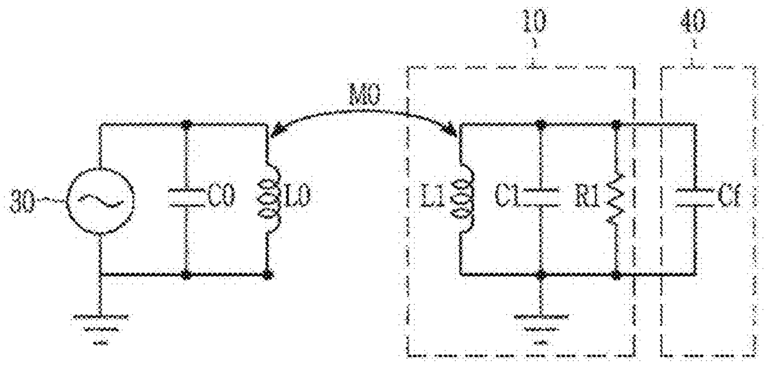
Figure 199:
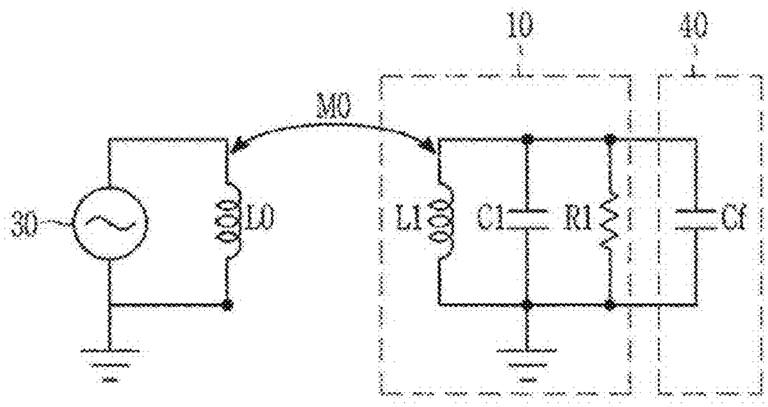

FIGS. 198 and 199 are schematic circuit diagrams illustrating a stylus pen and an electronic device when the stylus pen is gripped.

Figure 200:
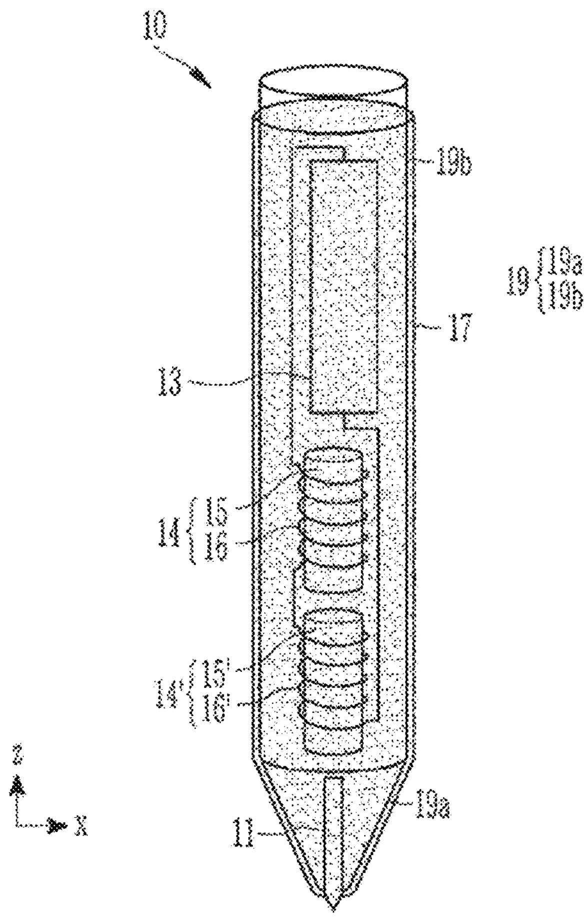

FIG. 200 is a conceptual diagram illustrating a stylus pen having an LLC structure.

Figure 201:
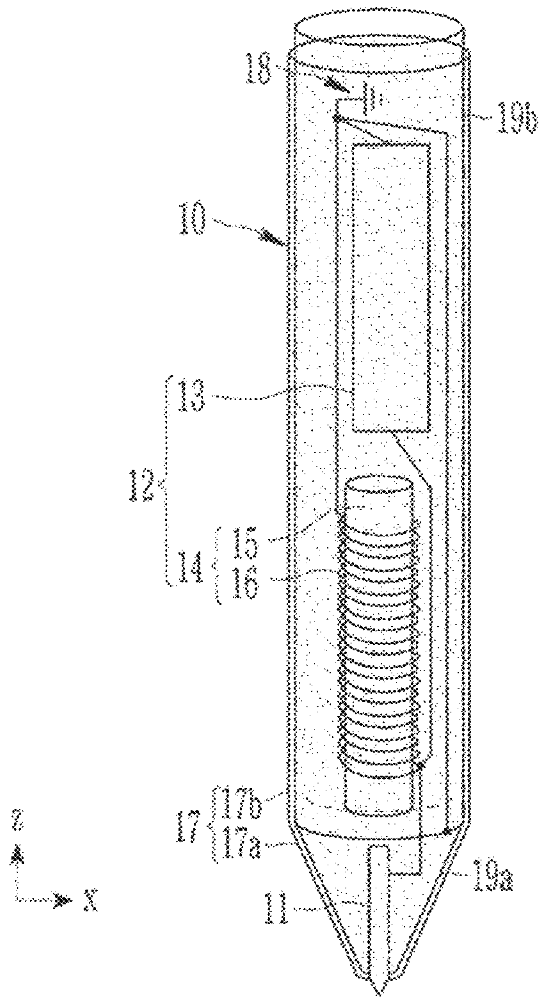

FIG. 201 is a conceptual diagram illustrating a stylus pen.

Figure 202A:
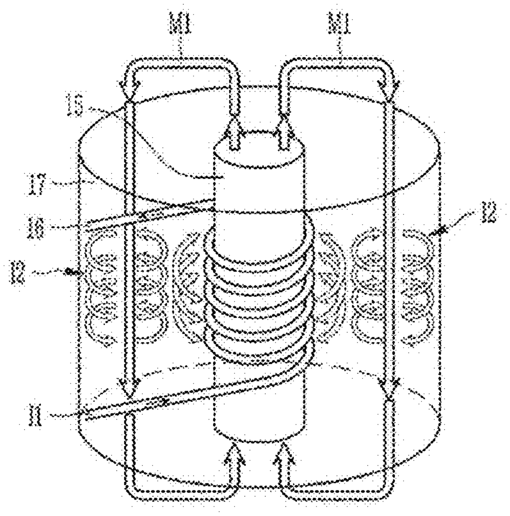
Figure 202B:
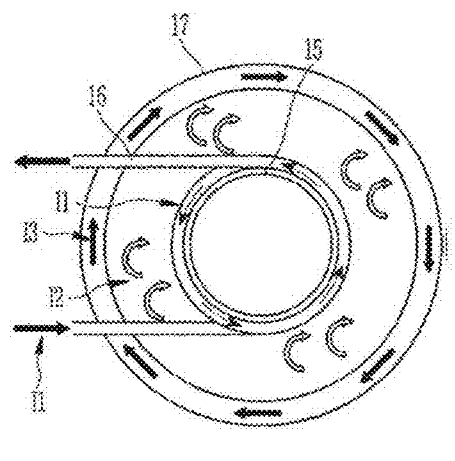

FIGS. 202A and 202B is an exemplary diagram illustrating an eddy current generated in the stylus pen shown in FIG. 201.

FIGS. 203A to 211D are conceptual diagrams illustrating a structure of a stylus pen according to embodiments.

Figure 212A:
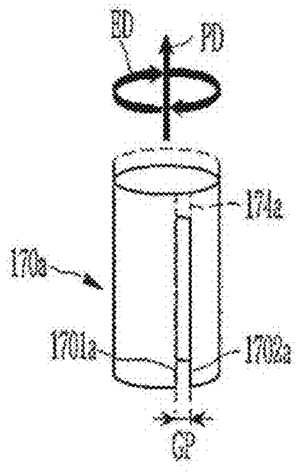
Figure 213A:
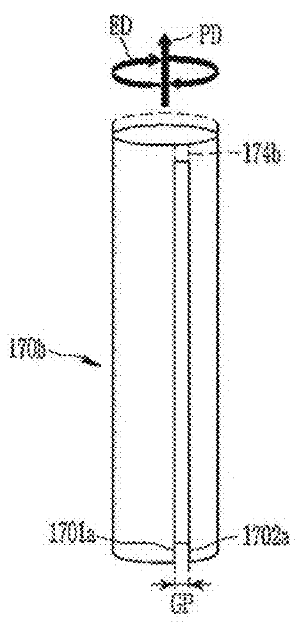
Figure 213B:
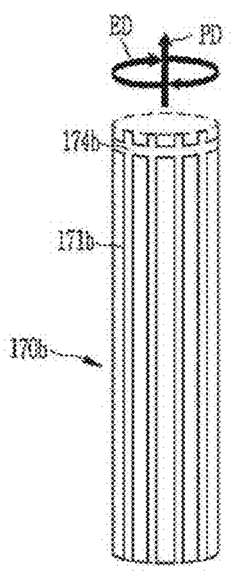
Figure 213C:
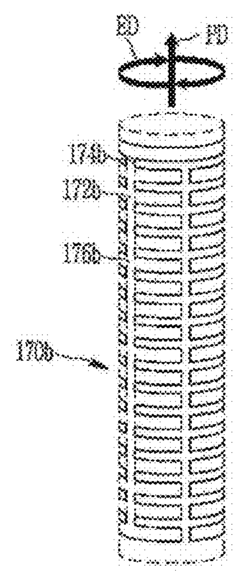

FIGS. 212A and 213C are conceptual diagrams illustrating a structure of a blocking member of a stylus pen according to embodiments.

Figure 214A:
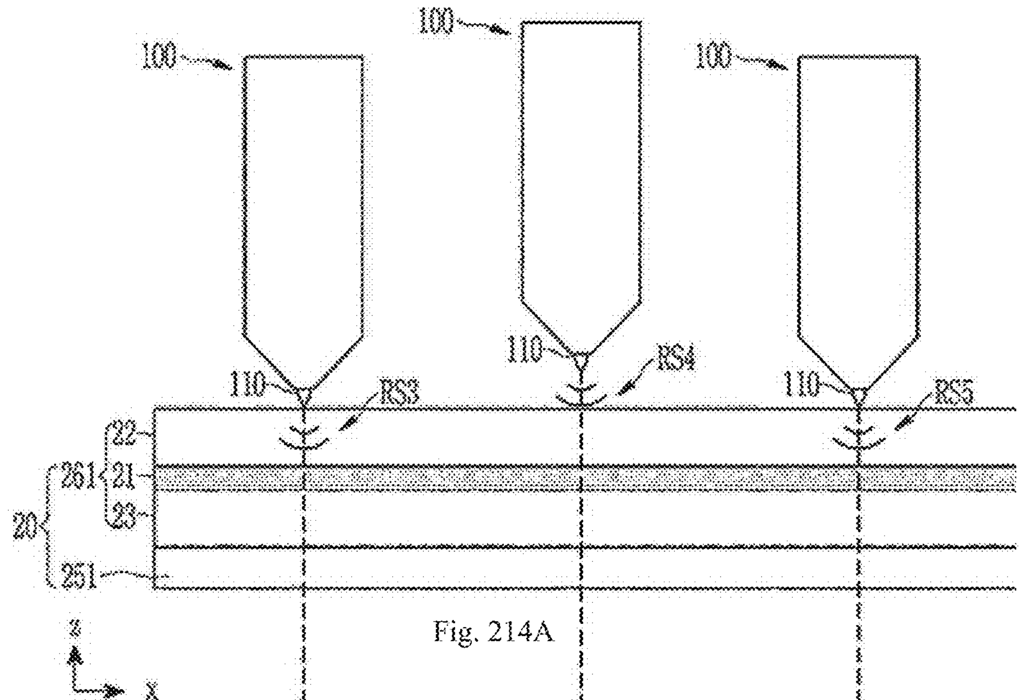
Figure 214B:
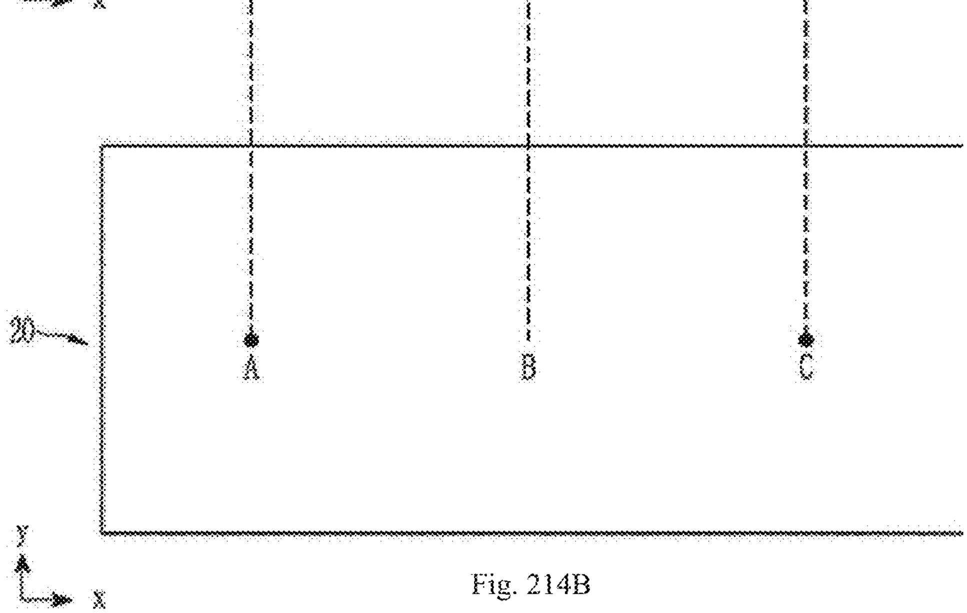

FIGS. 214A and 214B are a diagram illustrating a touch input by hovering of a stylus pen according to embodiments.

FIGS. 215A to 217B are diagrams illustrating a structure of a body part of a stylus pen according to embodiments.

Figure 218:
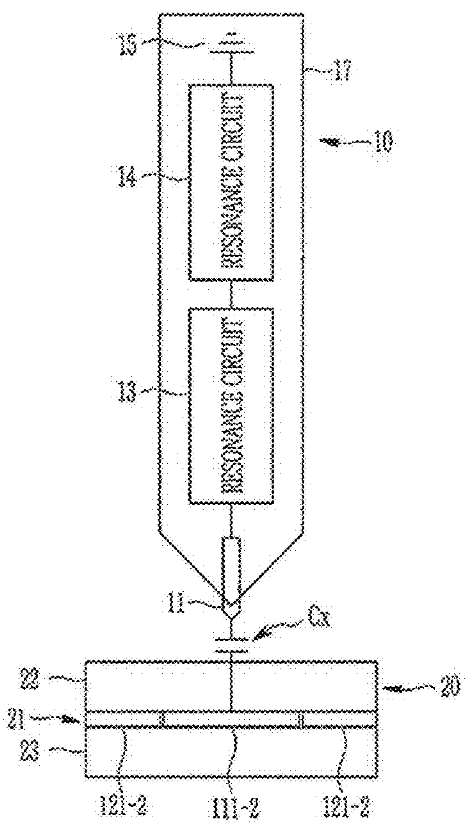

FIG. 218 is a conceptual diagram illustrating a stylus pen according to an embodiment.

Figure 219A:
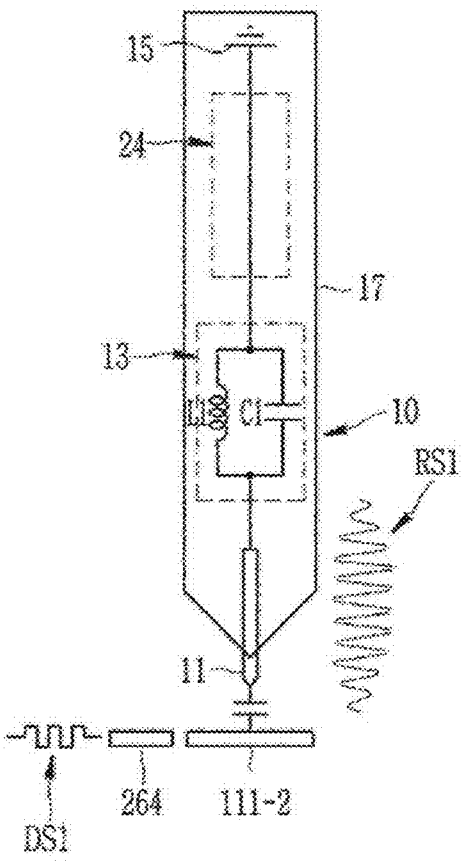
Figure 219B:
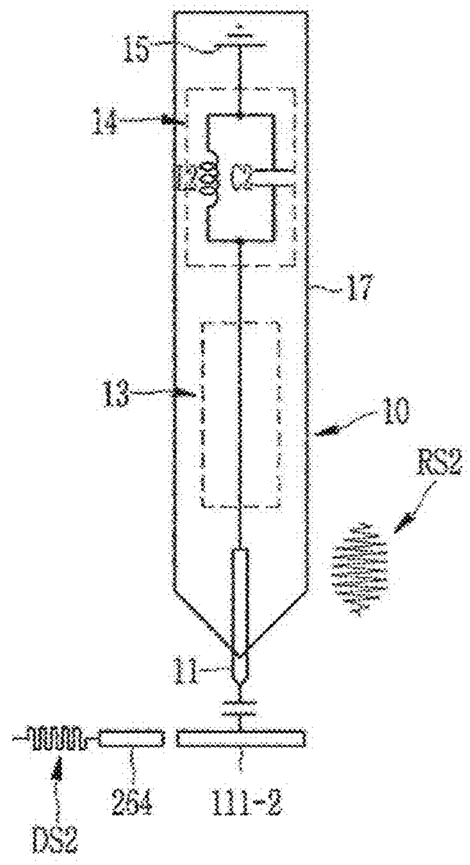

FIGS. 219A and 219B are a conceptual diagram illustrating a stylus pen including resonant circuits each resonating with driving signals having different frequencies.

Figure 220:
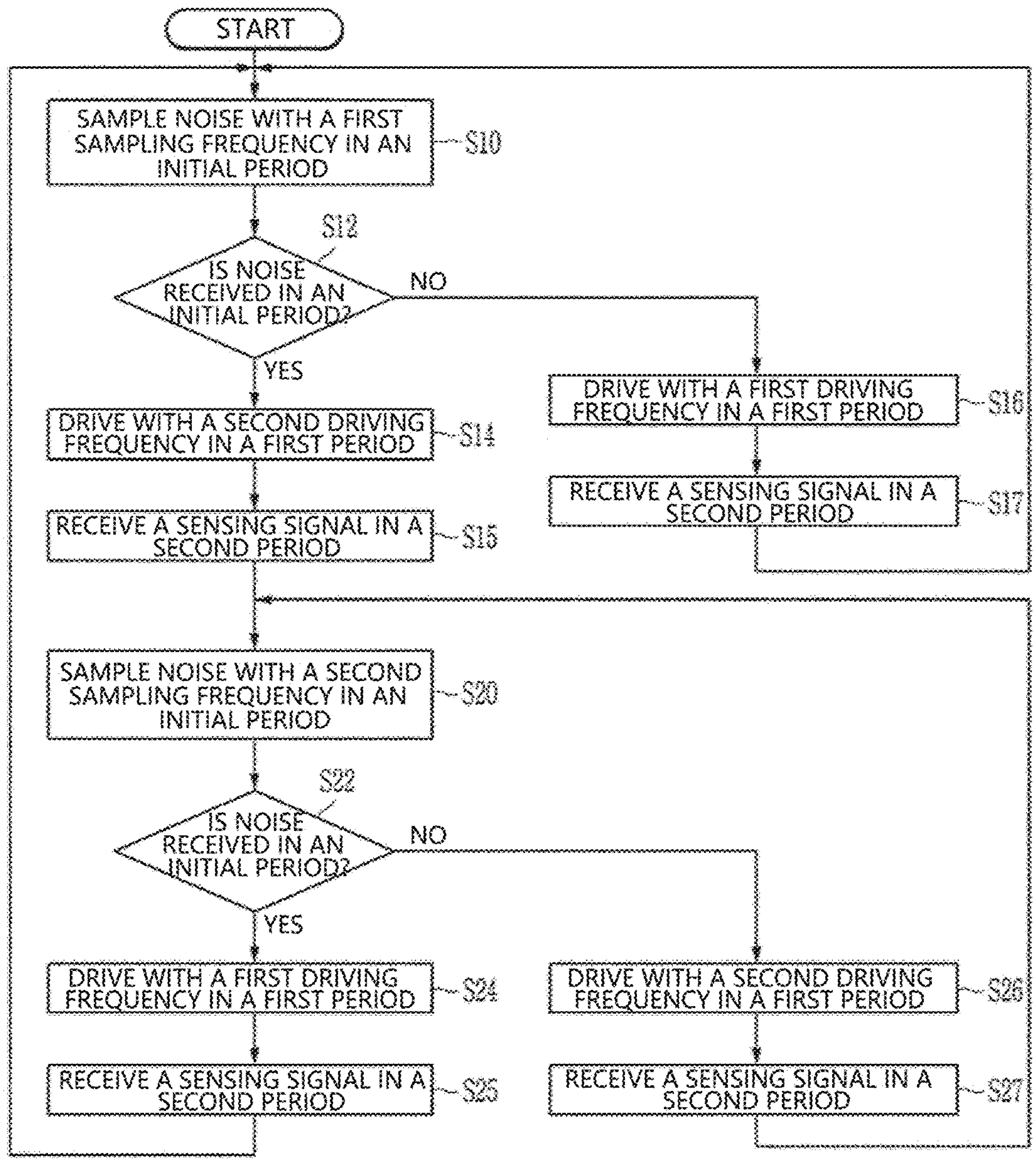

FIG. 220 is a flow chart illustrating a method of controlling an electronic device according to an embodiment.

Figure 221:
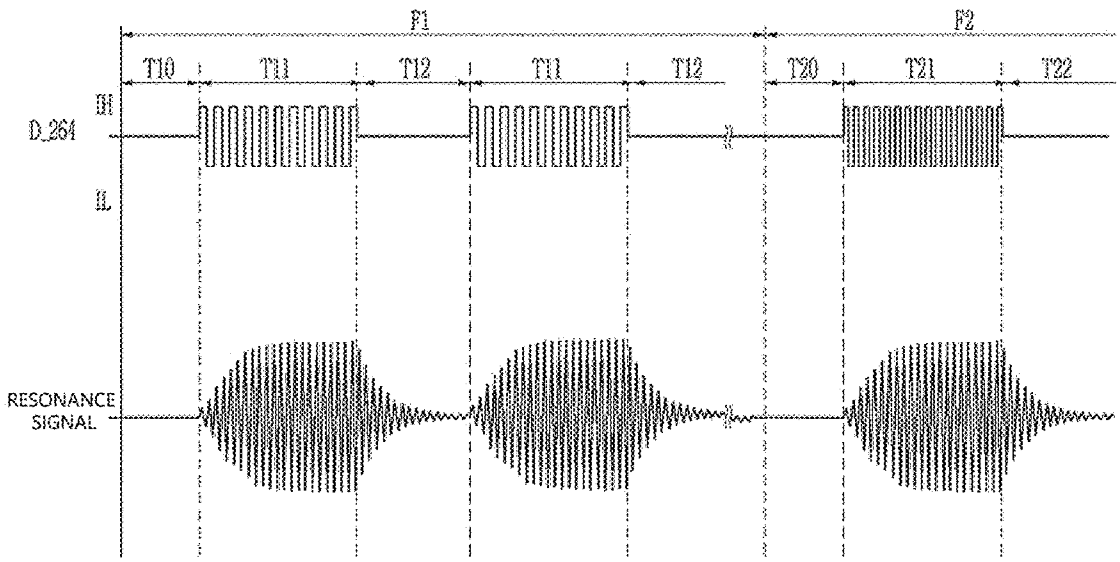

FIG. 221 is a waveform diagram illustrating an example of a driving signal and a resonance signal according to the control method of the electronic device of FIG. 220.

Figure 222:
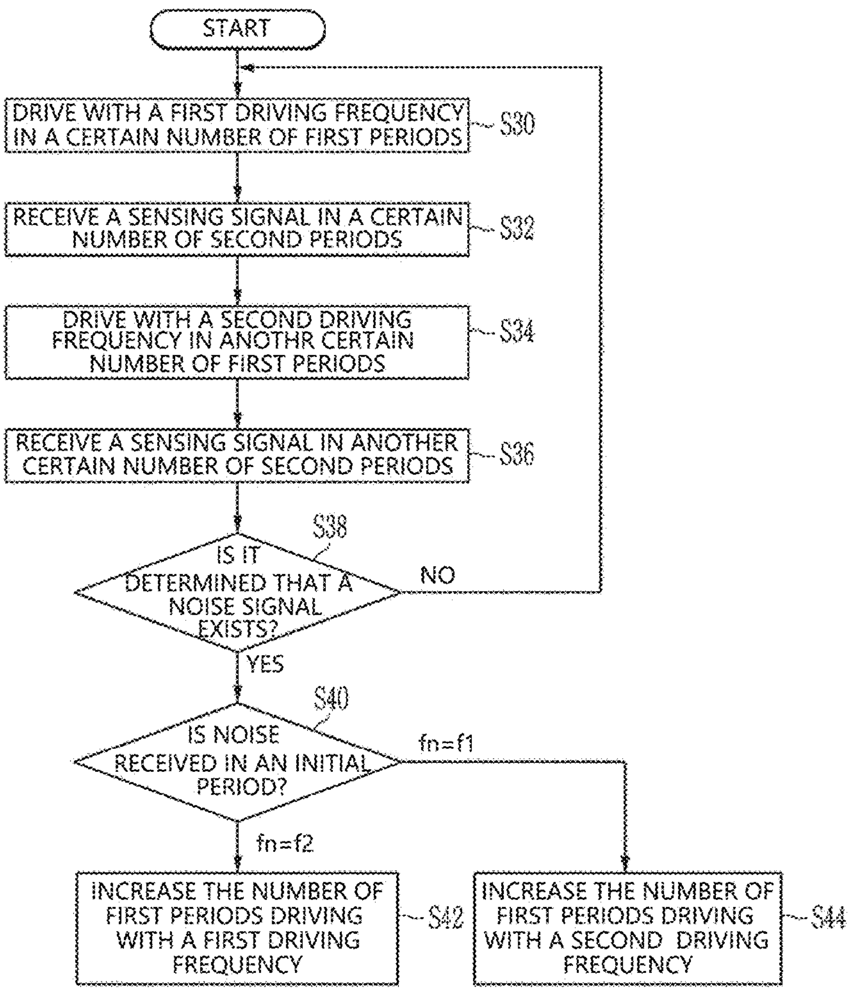

FIG. 222 is a flow chart illustrating a control method of the electronic device 2 according to another embodiment.

Figure 223:
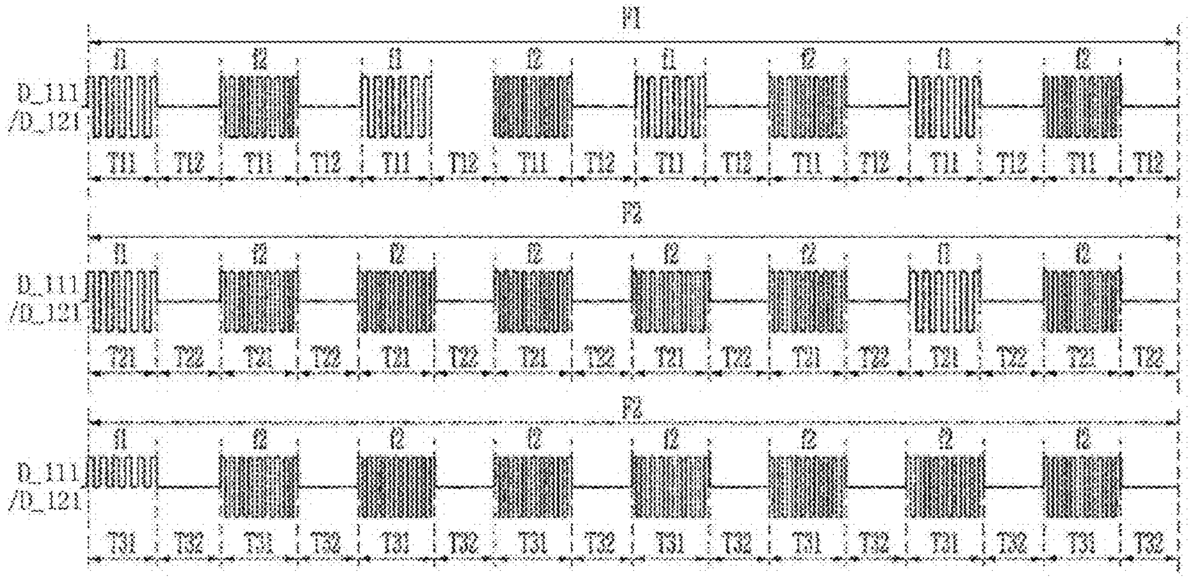

FIG. 223 is a waveform diagram illustrating a driving signal according to the method of controlling the electronic device of FIG. 222.

Figure 224A:
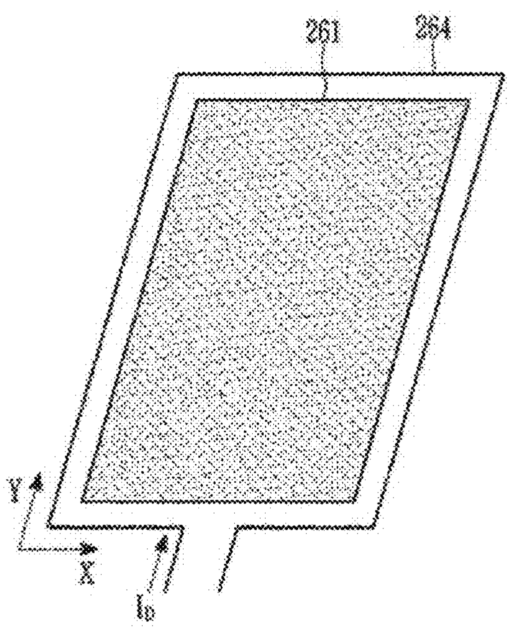
Figure 224B:
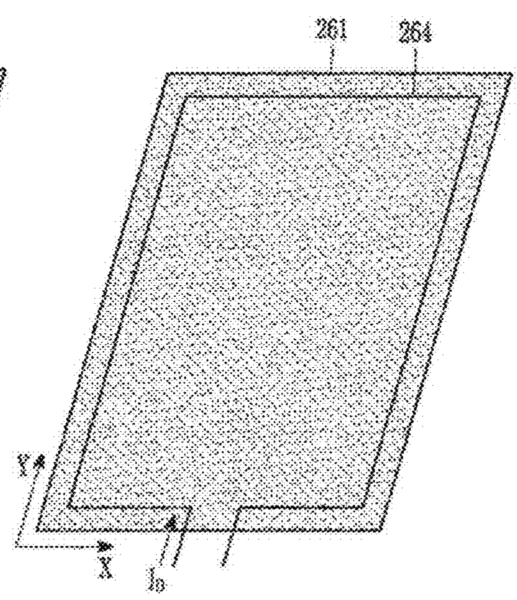

FIGS. 224A and 224B are diagrams showing the arrangement of the touch sensor and the loop coil.

Figure 225:
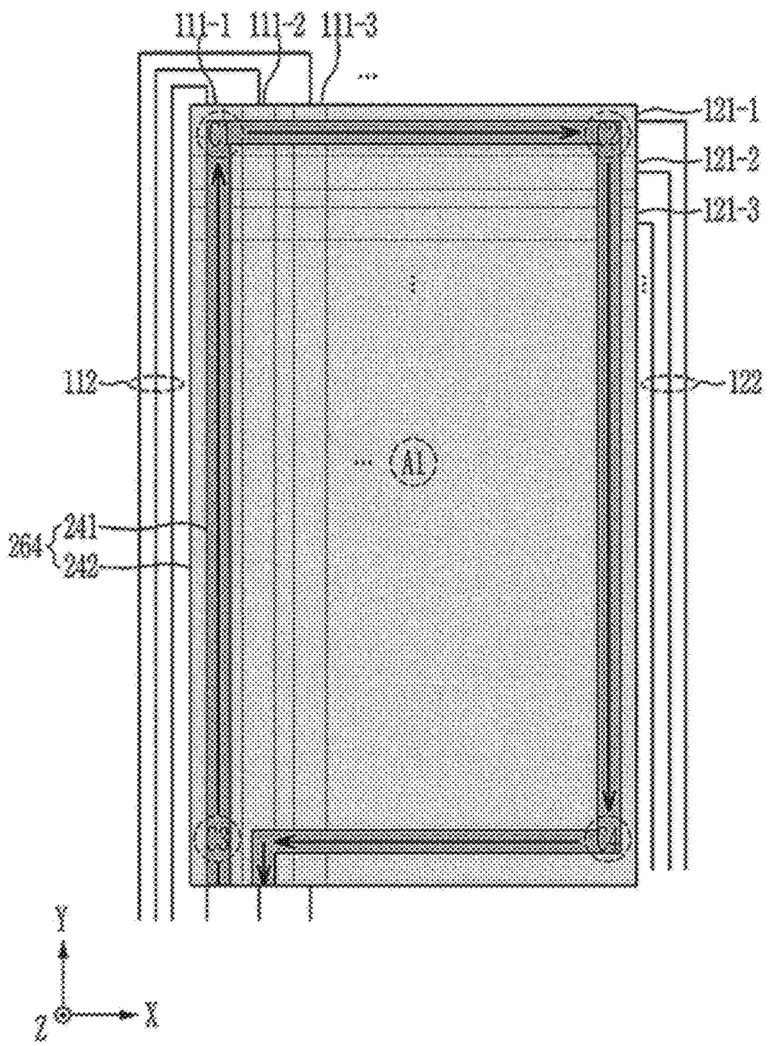
Figure 226:
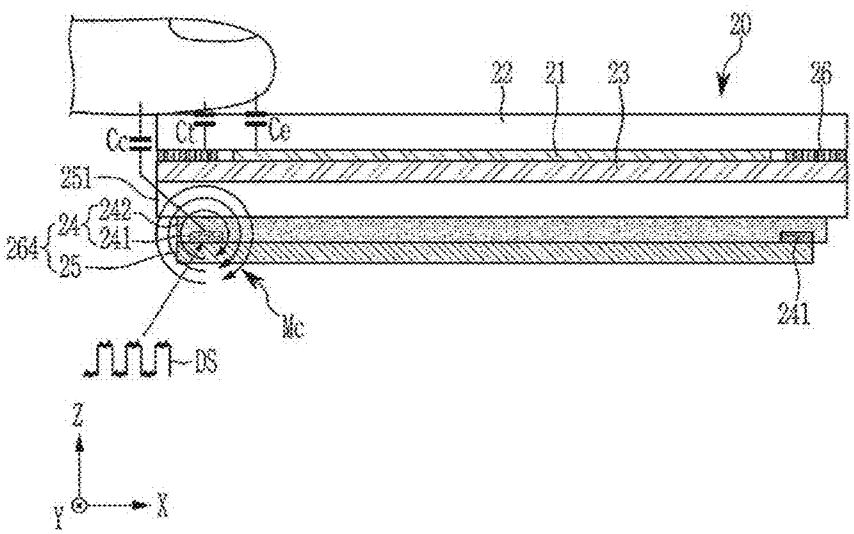

FIGS. 225 and 226 are diagrams showing the arrangement of a touch sensor and a loop coil.

Figure 227:
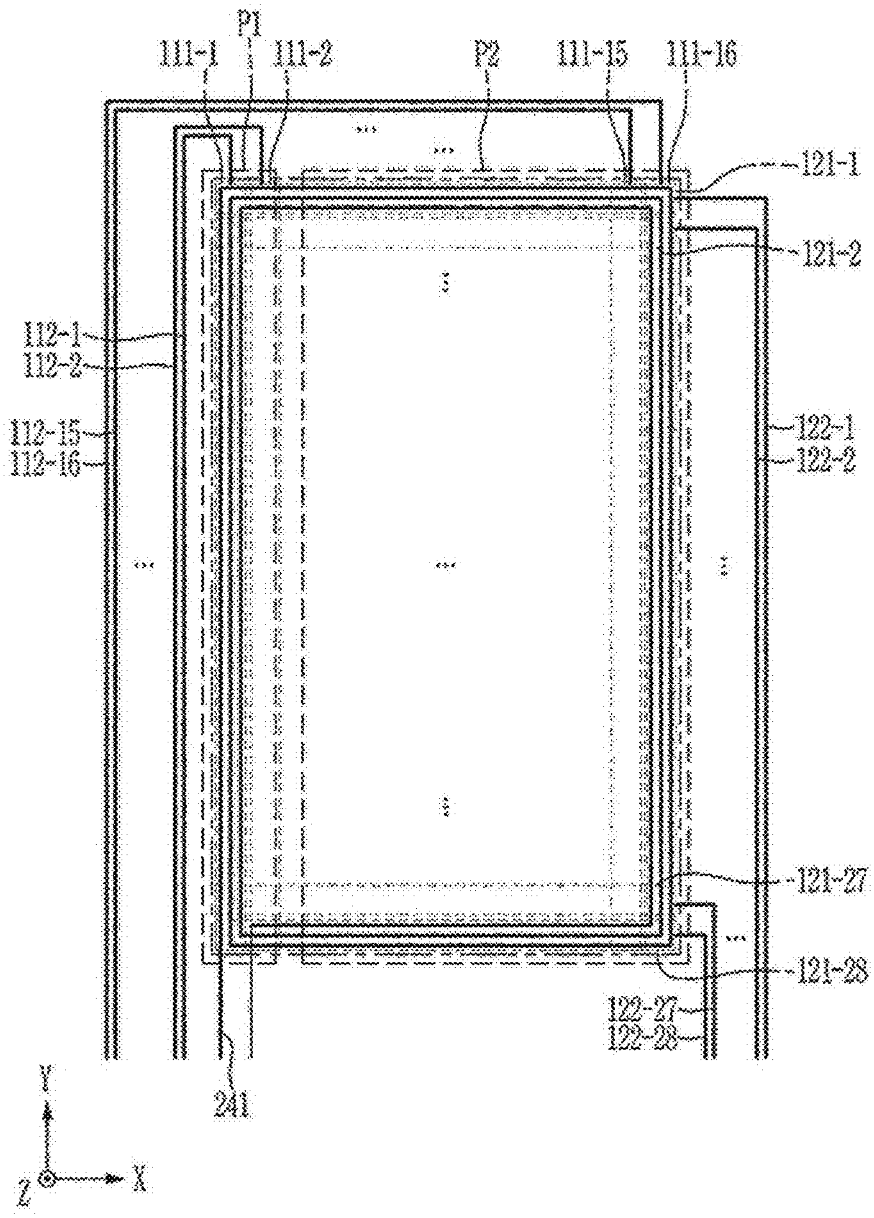

FIG. 227 is a diagram showing the arrangement of the touch sensor and the loop coil of FIG. 225 in more detail.

FIGS. 228 to 233 are diagrams showing the arrangement of a touch sensor and a loop coil in various aspects of an embodiment.

Figure 234:
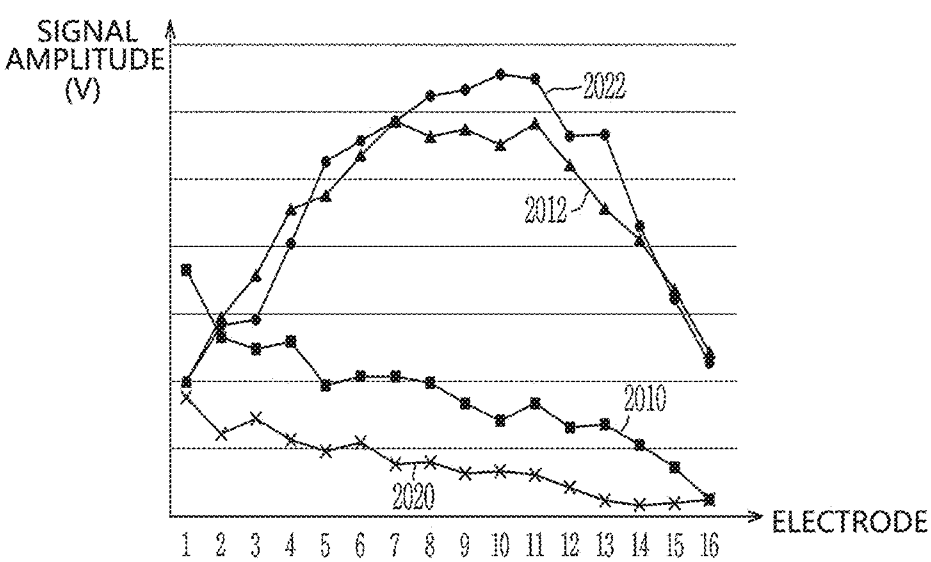

FIG. 234 is a graph comparing a touch signal and a noise signal according to an embodiment and a comparative example.

FIGS. 235 to 238B are diagrams showing the arrangement of a touch sensor and a loop coil in various aspects of another embodiment.

Figure 239:
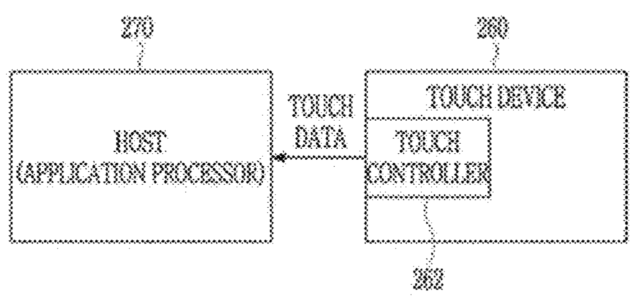

FIG. 239 is a block diagram illustrating a touch sensor and a host according to an embodiment.

Figure 240:
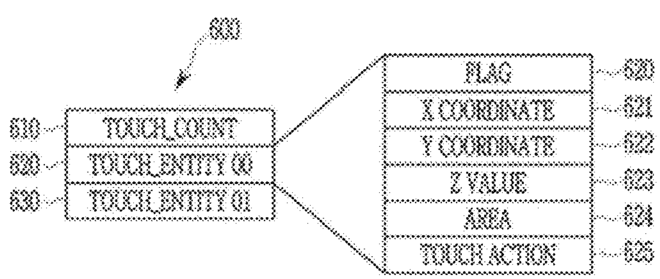

FIG. 240 is a diagram illustrating an example of touch data provided from a touch sensor to a host.

DETAILED DESCRIPTION

Hereinafter, various embodiments of the present disclosure are described with reference to the accompanying drawings. However, it should be understood that the present disclosure is not limited to the specific embodiments, and includes various modifications, equivalents, and/or alternatives of embodiments of the present disclosure. In describing the drawings, similar reference numerals may be used to designate similar elements.

In addition, since sizes and thicknesses of components in the drawings are arbitrarily illustrated for convenience of explanation, the present invention is not limited thereto. In the drawings, the thickness of layers and regions is enlarged for clarity. For convenience of explanation, the thicknesses of some layers and regions are exaggerated in the drawings.

In addition, it will be understood that when an element such as a layer, film, region, substrate, etc. is referred to as being "on" or "above" another element, it can be directly on the other element or intervening elements may also be present. Conversely, it will be understood that when an element is referred to as being "directly on" another element, intervening elements are not present in the middle. Additionally, to be "on" or "above" a reference part means to be located above or below the reference part, and it does not necessarily mean to be located "on" or "above" the opposite direction of gravity.

Herein, the expression "have", "may include", "include", or "may include" refers to the presence of a corresponding feature (e.g., a component such as a number, function, action, part, etc.), and does not exclude the presence of additional features.

In the present disclosure, the expression "A or B", "at least one of A and/or B", or "one or more of A and/or B" may include all possible combinations of the items listed together. For example, "either A or B", "at least one of A and B, or "at least one of A or B" may refer to all cases including: at least one A; at least one B; or at least one A and at least one B.

Herein, the expression such as "No. 1", "No. 2", "first", or "second" may be used regardless of order and/or importance. It is used only to distinguish one component from other components, and does not limit the corresponding component. For example, the user equipment No. 1 and the user equipment No. 2 may display different user devices regardless of order or importance. For example, component No. 1 may be referred to as component No. 2, and similarly, component No. 2 may be referred to as component No. 1 without departing from the scope of the present disclosure.

It will be understood that when a component (e.g., component No. 1) is "(operatively or communicatively) coupled with/to" or "connected to" another component (e.g., component No. 2), the component is connected directly to another component or through another component (e.g., component No. 3). On the other hand, when a component (e.g., component No. 1) is referred to as being "directly connected to" another component (e.g., component No. 2), it may be understood that there is no other component (e.g., component No. 3) between the component and another component.

The expression "configured to" as used herein may be used interchangeably with, for example, "suitable for", "having the capacity to", "designed to", "adapted to", "made to", or "capable of", depending on the context.

The term "configured to" may not necessarily mean "specifically designed to" in hardware. Instead, in some circumstances, the expression "a device configured to" may mean that the device is "capable of" with other devices or parts thereof. For example, the phrase "a processor configured to perform A, B, and C" may refer to a dedicated processor (e.g., an embedded processor), or a generic-purpose processor (e.g., a CPU or an application processor) capable of performing the corresponding operations by executing one or more software programs stored in a memory device.

The terminology used herein is for the purpose of describing particular embodiments only, and is not intended to limit the invention. A singular expression may include a plural expression unless the context clearly dictates otherwise. Unless otherwise defined, all terms including scientific and technological terms used herein have the same meaning as commonly understood by one of ordinary skill in the art to which this disclosure pertains. Among the terms used in this disclosure, the terms defined in a general dictionary may be interpreted as the same or similar meaning as that in the context of the related art, and are not interpreted as an ideal or excessively formal meaning unless explicitly defined in this disclosure. In some cases, even the terms defined in this disclosure cannot be construed to exclude embodiments of this disclosure.

An electronic device according to various embodiments of the present disclosure may include, for example, at least one of a smart phone, a tablet personal computer (PC), a mobile phone, a video phone, an e-book reader, a laptop personal computer (PC), a netbook computer, a mobile medical device, a camera, or a wearable device. According to various embodiments, the wearable device may include at least one of an accessory (e.g., a watch, ring, bracelet, anklet, necklace, glasses, contact lenses, or head-mounted-device (HMD)), a fabric or integrated garment (e.g., electronic clothing), a body attachable (e.g., a skin pad or tattoo), and a bio-implantable (e.g., an implantable circuit).

Hereinafter, an electronic device, a stylus pen, and a driving method thereof according to embodiments will be described with reference to the drawings.

In the case of an active stylus pen, in order to efficiently transmit power by a wireless charging method to a battery, the amplitude of a resonance signal in the resonant circuit embedded in the stylus pen should be large. On the other hand, in the resonant method of a passive stylus pen, the amplitude of a resonance signal in the resonant circuit embedded in the stylus pen should be large enough for a touch sensor to more accurately identify a touch by the stylus pen. Therefore, it is very important to transmit a signal having the same frequency as a resonant frequency of the resonant circuit of the stylus pen to the stylus pen so as to produce a maximum resonance signal.

Figure 1A:
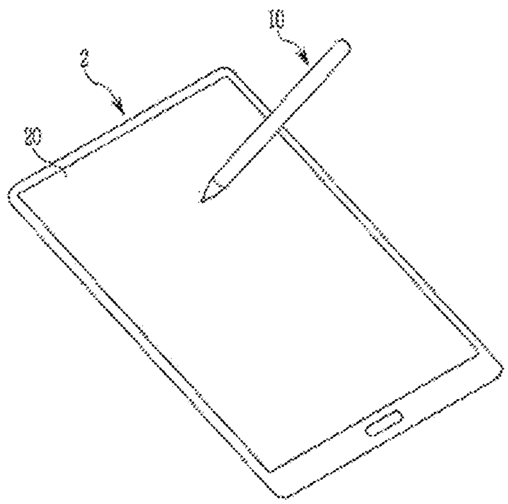
FIGS. 1A and 1B are conceptual views illustrating a stylus pen and an electronic device.
Figure 1B:
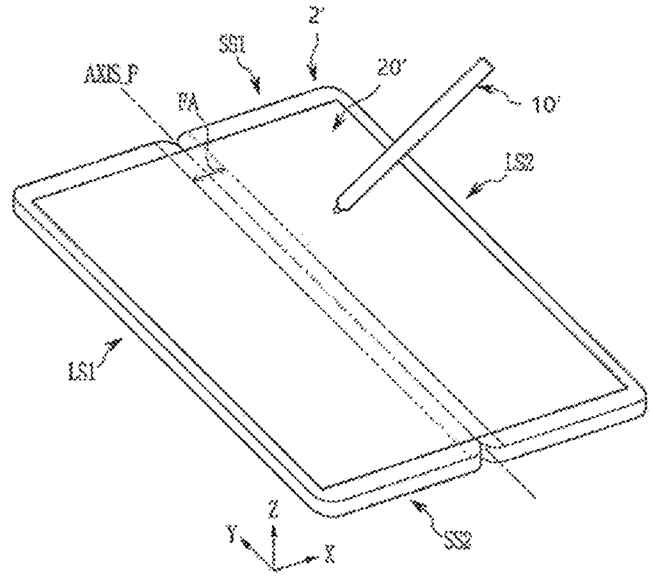
Figure 2:
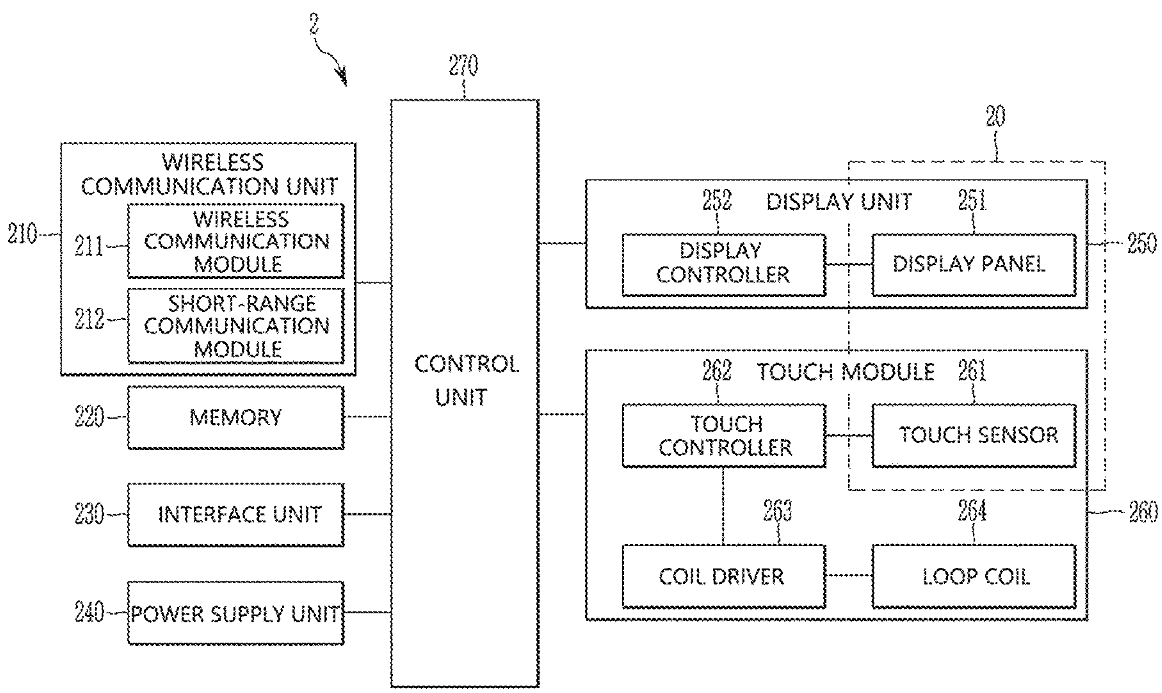
FIG. 2 is a block diagram schematically illustrating an electronic device.

FIG. 1A and FIG. 1B are conceptual diagrams illustrating a stylus pen and an electronic device, and FIG. 2 is a block diagram schematically illustrating an electronic device.

As shown in FIG. 1A and FIG. 1B, the stylus pen 10, 10' receives a signal output from the electronic device 2, 2' or the touch screen 20, 20' near the touch screen 20, 20' of the electronic device 2, 2', and transmits signals to the touch screen 20, 20'.

The electronic devices 2, 2' may include at least one of a portable communication device (e.g., a smartphone, a tablet PC), a computer device, a portable multimedia device, a portable medical device, a wearable device, or a home appliance. Further, the electronic device 2 may be a flexible device or a flexible display device. Further, the electronic device 2 may be a touch device capable of touch input.

In the member such as the rectangular foldable electronic device 2' or the touch screen 20' included therein as shown in FIG. 1B, the long side located on the left side of a plane is referred to as a first long side LS1, the long side located on the right side thereof is referred to as a second long side LS2, the short side located above is referred to as a first short side SS1, and the short side located below is referred to as a second short side SS2.

The foldable electronic device 2' may be bent along a predetermined folding direction based on a folding axis AXIS_F that crosses the first short side SS1 and the second short side SS2. That is, the foldable electronic device 2' may be able to switch between a folded state and an unfolded state along the folding direction based on the folding axis AXIS_F.

As shown in FIG. 2, the electronic device 2, 2' in FIG. 1A and FIG. 1B may include a wireless communication unit 210, a memory 220, an interface unit 230, a power supply unit 240, a display unit 250, a touch sensing unit 260, a control unit 270, and the like. The components illustrated in FIG. 2 are not necessary to implement an electronic device, and the electronic device described in this disclosure may have more or fewer components than those listed above. Hereinafter, for convenience of description, the electronic device 2 of FIG. 1A will be described as an example. Hence, it should be noted that the contents described below may also be applied to the electronic device 2' of FIG. 1B.

More specifically, among the components, the wireless communication unit 210 may include one or more modules that enable wireless communication between the electronic device 2 and the wireless communication system, between the electronic device 2 and another electronic device 2, or between the electronic device 2 and an external server. Further, it may include one or more modules that connect the electronic device 2 to one or more networks. The wireless communication unit 210 may include a wireless Internet module 211 and a short-range communication module 212.

The wireless Internet module 211 refers to a module for wireless Internet connection, and may be incorporated in the electronic device 2. The wireless Internet module 211 is configured to transmit and receive wireless signals over a communication network according to wireless Internet technologies. Wireless Internet technology is, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced) and the like, and the wireless Internet module 211 transmits and receives data according to at least one wireless Internet technology within a scope including Internet technologies not listed above.

The short-range communication module 212 is for short-range communication, and at least one of Bluetooth, RFID (Radio Frequency Identification), infrared communication (Infrared Data Association; IrDA), UWB (Ultra Wideband), ZigBee, NFC (Near Field Communication), Wi-Fi (Wireless-Fidelity), Wi-Fi Direct, or Wireless USB (Wireless Universal Serial Bus) may be used to support the short-range communication. The short-range communication module 212 may support wireless communication via Wireless Area Networks between the electronic device 2 and the wireless communication system, between the electronic device 2 and the wireless communication capable device, or between the touch sensor 2 and a network where an external server is located. The short-range wireless communication network may be a short-range Wireless Personal Area Networks.

Here, the wireless communication enabled device may be a mobile terminal (e.g., a smart phone, a tablet PC, a notebook, etc.) capable of exchanging data with the electronic device 2 according to the present invention. The short-range communication module 212 may sense or recognize a wireless communication enabled device that is communicable with the electronic device 2. Further, the control unit 270 may transmit at least a portion of data processed by the electronic device 2 to the wireless communication enabled device through the short-range communication module 2 when the sensed wireless communication enabled device is a device authenticated to communicate with the electronic device 2 according to an embodiment. Accordingly, a user of the wireless communication enabled device can use the data processed by the electronic device 2 through the wireless communication enabled device.

Further, the memory 220 may store data supporting various functions of the electronic device 2. The memory 220 may store a plurality of application programs (or applications) executed in the electronic device 2, data for operation of the electronic device 2, and instructions.

The interface unit 230 may serve as a path to various kinds of external devices connected to the electronic device 2. The interface unit 230 may include at least one of a wired/wireless headset port, an external charger port, a wired/wireless data port, a memory card port, a port for connecting a device equipped with an identification module, an audio I/O (Input/Output) port, a video I/O (Input/Output) port, and an earphone port.

The power supply unit 240 receives external power or internal power under the control of the control unit 270, and supplies the power to each component included in the electronic device 2. The power supply unit 240 may include a battery, and the battery may be an internal battery or a replaceable battery.

The display unit 250 displays information processed in the electronic device 2. For example, the display unit 250 may display the execution screen information of an application program executed in the electronic device 2, or UI (User Interface) or GUI (Graphic User Interface) information according to the execution screen information.

The display unit 250 may include LCD display (liquid crystal display), OLED (organic light-emitting diode) display, electronic ink display (e-ink display), quantum dot light-emitting display, micro-LED (light emitting diode) display, and the like.

The display unit 250 includes a display panel 251 for displaying an image, and a display controller 252 connected to the display panel 251 to supply signals for displaying an image to the display panel 251.

For example, the display panel 251 may include a plurality of scan lines, a plurality of pixels connected to the same signal lines as a plurality of data lines, and a scan driving unit configured to supply scan signals to the scan lines.

The display controller 252 may include a data driver IC for generating a data signal to be applied to the data line, a timing controller that processes an image signal and controls the overall operation of the display unit 250, power management IC, and the like.

The touch sensing unit 260 may sense a touch or touch input applied to the touch area using a capacitive method. As an example, the touch sensing unit 260 may be configured to convert a change in capacitance, voltage, or current generated in a specific region into an electrical input signal. The touch sensing unit 260 may be configured to detect a position and area where a touch object applying a touch on a touch area is touched on the touch sensing unit 260, and a capacitance at the time of the touch. Here, the touch object is an object that applies a touch to the touch sensor. For example, it can be a user's body part (finger, palm, etc.), a passive or active type stylus pen 10, etc.

The touch sensing unit 260 includes the touch sensor 261 in which the touch electrodes are located, and the touch controller 262 that applies a driving signal to the touch sensor 261, receives a sensing signal from the touch sensor 261, and transmits touch data to the control unit 270 and/or the display controller 252.

In FIG. 2, the configuration called the touch sensing unit 260 is named in terms of operation with the configurations of other "units" such as the "display unit". In the following description, a "unit" can be used when expressing the concept of operation in relation to other configurations, a "module" can be used in the concept of the configuration being modularized and produced, a "device" can be used in the concept where the configuration is embodied as one aspect of a "thing", a "sensor" may be used in the concept of physical operation of the configuration, and a "panel" may be used in the concept of a production process. The names of "unit", "module", "device", "sensor", and "panel" may be used to make the present invention easily understood within each concept thereof by those skilled in the art, and the differences in expressions do not limit the scope of the present invention.

The touch controller 262 may output touch coordinate information in response to a touch input sensed by the touch sensor 261. The touch controller 262 may change a frequency of the driving signal in response to a touch sensing result.

As an embodiment, the touch controller 262 may include a driving unit that is connected to at least one of a plurality of first touch electrodes and a plurality of second touch electrodes and applies a driving signal, a receiving unit that is connected to at least one of the plurality of first touch electrodes and the plurality of second touch electrodes and receives a sensing signal, and a micro control unit (MCU) that controls operations of the driving unit and the receiving unit and obtains a touch position by using the sensing signal output from the receiving unit.

In another embodiment, the touch controller 262 may include a first driving/receiving unit that is connected to a plurality of first touch electrodes, applies a driving signal, and receives a sensing signal, a second driving/receiving unit that is connected to a plurality of second touch electrodes, applies a driving signal, and receives a sensing signal, and an MCU that obtains a touch position by using sensing signals output from the first and second driving/receiving units.

The display panel 251 and the touch sensor 261 may be formed in a mutual layered structure or integrally formed, and may be referred to as a touch screen 20.

The touch sensing unit 260 may further include a loop coil 264 and a coil driver 264 for applying a driving signal to the loop coil 263. The loop coil 264 may be disposed near the touch screen 20 or at a location within the electronic device 2. The loop coil 264 may also be composed of an antenna of a short-range communication module 212 such as RFID and NFC. The driving signal may include an alternating voltage or alternating current having a predetermined frequency.

Here, the loop coil 264 may receive a driving signal from the coil driver 253 and transmit power to the outside. Hence, the loop coil 264 may be referred to as a transmission electrode unit. The coil driver 253 may also be referred to as a transmission driver.

Referring to FIGS. 1 and 2, the control unit 270 may control driving of the electronic device 2, and may output touch coordinate information corresponding to a touch sensing result of the electronic device 2. The control unit 270 may change a frequency of the driving signal in response to a touch sensing result.

The control unit 270 controls the overall operation of the electronic device 2 in addition to the operation associated with the application program. The control unit 270 may provide or process appropriate information or functions to a user by processing signals, data, information, etc. input or output through the above-described components or by driving an application program stored in the memory 270.

In addition, the control unit 270 may control at least some of the components shown in FIG. 2 to drive an application program stored in the memory 270. Further, the control unit 270 may combine and operate at least two of the components included in the electronic device 2 to drive the application program.

Figure 3A:
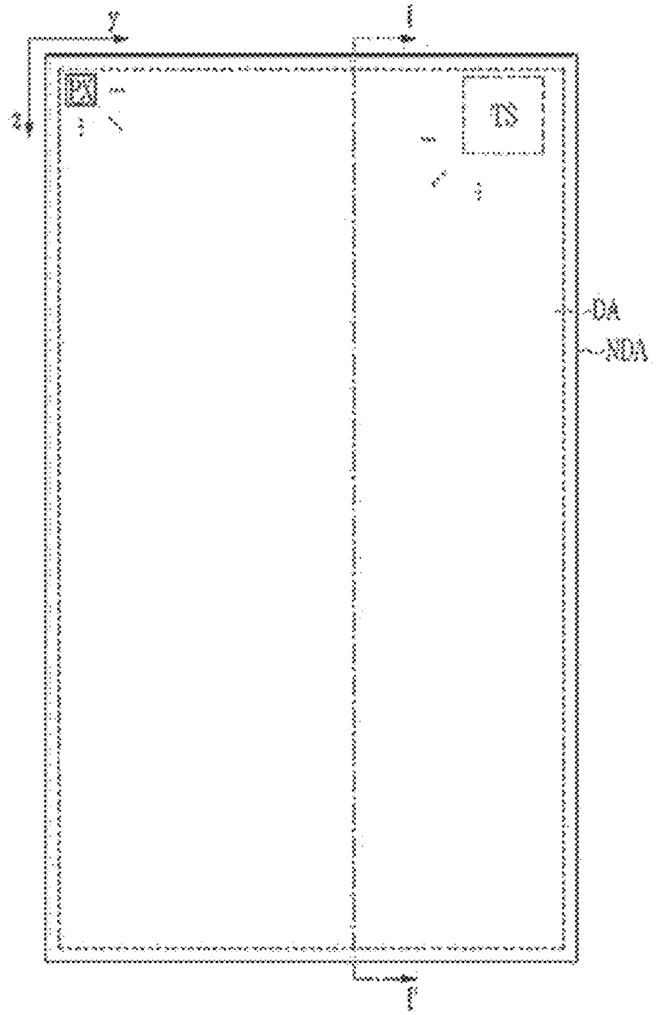
FIG. 3A is a plan view schematically illustrating a part of a display unit according to an embodiment.
Figure 3B:
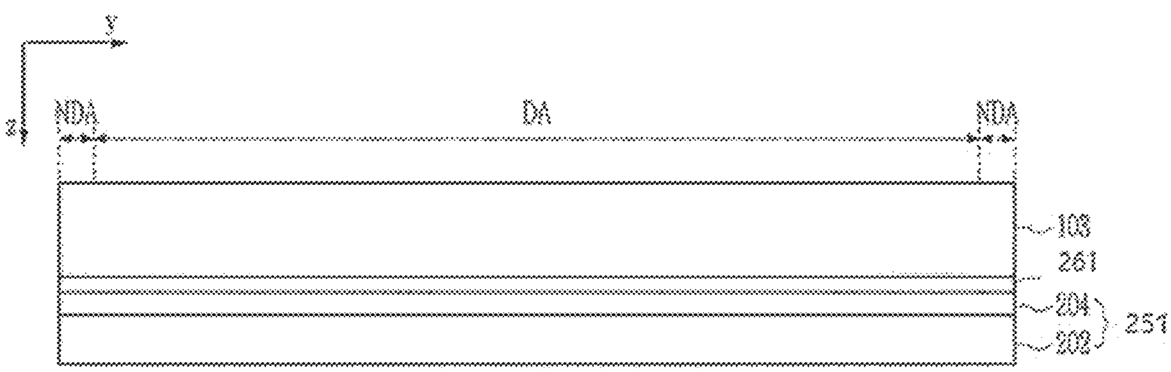
FIG. 3B is a cross-sectional view taken along the I-I' line of FIG. 3A.

FIG. 3A is a plan view schematically showing a part of a display unit according to an embodiment, and FIG. 3B is a sectional view along the I-I' line in FIG. 3A.

Referring to FIG. 3A and FIG. 3B, the display panel 251 may display any visual information on the front surface thereof, for example, texts, videos, photos, 2-dimensional or 3-dimensional images, and the like. The type of the display panel 251 is not particularly limited as long as an image is displayed thereon.

In an embodiment, the display panel 251 is a panel having organic light emitting diodes as a light emitting element. However, the type of the display panel 251 is not limited thereto, and another display panel may be used as long as it meets the concept of the present invention.

The display panel 251 may have various shapes. For example, the display panel 251 may be a rectangular panel having two pairs of sides thereof parallel to each other. For convenience of description, the display panel 251 is shown as a rectangle having a pair of long sides and a pair of short sides.

However, the shape of the display panel 251 is not limited thereto, and the display panel 251 may have various shapes. For example, the display panel 251 may have any shape of a closed-type polygon including a straight line, a circle, an ellipse, etc. including a curved line, and a semi-circle, semi-ellipse, etc. including a side having a straight line and a curved line. At least some of the corners of the display panel 251 may have a curved shape.

The display panel 251 may have flexibility in a whole or at least a portion thereof.

The display panel 251 may display an image. The display panel 251 includes a display portion 204, and the display portion 204 may include a display area DA on which an image is displayed and a non-display area NDA located at at least one side of the display area DA. For example, the non-display area NDA may surround the display area DA. A plurality of pixels PX may be located on the display area DA, and a driving unit that drives the plurality of pixels PX may be disposed in the non-display area NDA (see FIG. 210).

The display area DA may have a shape corresponding to that of the display panel 251. For example, like a shape of the display panel 251, the display area DA may have various shapes such as a closed-type polygon including a straight line, a circle, an ellipse, etc. including a curved line, and a semi-circle, semi-ellipse, etc. including a side having a straight line and a curved line. In an embodiment of the present invention, it is assumed that the display area DA is rectangular.

The display panel 251 may include a substrate 202 and a display portion 204 provided on the substrate 202.

The substrate 202 may be made of various materials such as glass, polymer metal, etc., for example. The substrate 202 may be an insulating substrate made of a polymer organic material. As to the material of an insulating substrate containing an organic polymer, there are polystyrene, polyvinyl alcohol, polymethylmethacrylate, polyethersulfone, polyacrylate, polyetherimide, polyethylene naphthalate, polyphenyleneterephthalate, polyphenylene sulfide, polyarylate, polyimide, polycarbonate, triacetate cellulose, cellulose acetate propionate, and the like. However, the material of the substrate 202 is not limited thereto, and for example, the substrate 202 may be made of FRP (fiber glass reinforced plastic).

The display portion 204 can be positioned over the substrate 202. The display unit 204 may display information inputted by a user or information provided to a user as an image. The display portion 204 may include a plurality of pixels PX. The plurality of pixels PX may be organic light emitting devices including organic layers, but are not limited thereto, and may be implemented in various forms such as liquid crystal devices, electrophoretic devices, and electrowetting devices. Each pixel PX may include an organic light emitting device that emits white light and/or color light as a minimum unit for displaying an image. Each pixel PX may emit light of any one of red, green, blue, and white, but is not limited thereto. Alternatively, it may emit color light such as cyan, magenta, yellow, or the like. Each pixel PX may include a plurality of transistors (not shown therein) connected to a plurality of signal lines (not shown therein) and an organic light emitting diode electrically connected to the transistors.

The display driving unit 210 includes a scan driver that supplies signals to the pixels PX included in the display panel 251 and a data driver.

The signal control unit 220 may supply a driving control signal and image data to the display driving unit 210, and control an image display operation of the display panel 251. In detail, the signal control unit 220 may generate the driving control signal and the image data by using the video signal and the data enable signal supplied from an external video source. For example, the signal control unit 220 may receive an image signal and a control signal from an external image source, and the control signal may include a vertical sync signal that is a signal for discriminating frame periods, a horizontal sync signal that is a row discriminating signal within one frame, a data enable signal having a high level only during a data output period, and clock signals. In addition, the driving control signal may include a scan driving control signal, a data driving control signal, and the like.

The scan driving unit 220 generates scan signals based on a scan driving control signal provided from the signal control unit 220, and outputs the scan signals to scan lines connected to the pixels PX. The data driving unit generates grayscale voltages according to the image data provided from the signal control unit 220 based on the data driving control signal received from the signal control unit 220. The data driving unit outputs grayscale voltages as data voltages to data lines connected to the pixels PX. On the other hand, the scan driving unit may be formed simultaneously with the pixels PX through a thin film process. For example, the scan driving unit may be mounted in a non-display area NDA in the form of an ASG (amorphous silicon TFT gate driver circuit) or OSG (oxide semiconductor TFT gate driver circuit).

The touch sensor 261 may be mounted on the display portion 204 in the form of a separate panel or film, and may be formed integrally with the display portion 204.

The touch sensor 261 may include a plurality of touch sensing units TS for sensing a position of a touch when a user's touch is present. The touch sensing unit TS may sense a touch in a mutual capacitance type or a self capacitance type. The touch sensor 261 receives a driving signal from a touch controller 102 of FIG. 3. The touch controller 262 may receive a sensing signal that changes according to a user's touch from the touch sensor 261.

The window 103 may be positioned on the touch sensor 261. The window 103 may have a shape corresponding to that of the display panel 251, and may cover at least a portion of the front surface of the display panel 251. For example, if the display panel 251 is rectangular, the window 103 may also be rectangular. Alternatively, if the display panel 251 is circular, the window 103 may also be circular.

An image displayed on the display panel 251 is transmitted to the outside through the window 103. The window 103 may relieve an external impact and prevent the display panel 251 from being damaged or malfunctioning by the external impact. The external impact may refer to a force that causes a defect in the display panel 251 due to an external force which may be expressed by pressure, stress, or the like.

The window 103 may have flexibility in whole or at least in part.

Figure 4:
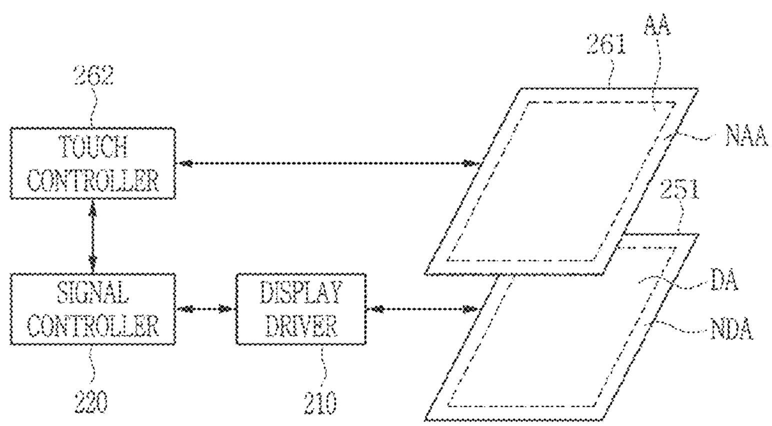
FIG. 4 is a block diagram of some configurations of an electronic device.

FIG. 4 is a block diagram of some configurations of an electronic device. Referring to FIG. 4, the display panel 251 is connected to the display driving unit 210, and the touch sensor 261 is connected to the touch controller 262.

The touch controller 262 may generate a driving signal output to the touch sensor 261, and may receive a sensing signal input from the touch sensor 261. In addition, the touch controller 262 may determine whether a touch is input to the touch screen, the number of touch inputs, the location of the touch input, and the like, by using the driving signal and the sensing signal. The touch controller 262 may receive a horizontal synchronization signal, a scan driving control signal, a data driving control signal, and the like from the signal control unit 220. The touch controller 262 may adjust the frequency of the driving signal provided to the touch sensor 261 based on the horizontal synchronization signal. For example, the touch controller 262 may set the frequency of the driving signal to an integer multiple of 2 or more of the frequency of the horizontal synchronization signal.

Further, the touch controller 262 may receive a sensing signal from the touch sensor 261 during a period in which the scan signal has a disable level based on at least one of the horizontal synchronization signal and the scan driving control signal.

Further, the touch controller 262 may receive a sensing signal from the touch sensor 261 for a period other than the period in which the data signal is applied to the data lines of the display panel 251 based on at least one of the horizontal synchronization signal and the data driving control signal.

In an embodiment of FIG. 4, the touch sensor 261 and the display panel 251 are separated from each other, but the present invention is not limited thereto. For example, the touch sensor 261 and the display panel 251 may be integrally formed.

The touch sensor 261 may be provided on at least one area of the display panel 251. For example, the touch sensor 261 may be provided on at least one surface of the display panel 251 to overlap the display panel 251. For example, the touch sensor 261 may be disposed on one surface (e.g., an upper surface) of the display panel 251 in a direction in which an image is emitted.

In addition, the touch sensor 261 may be directly formed on at least one surface of both surfaces of the display panel 251, or may be formed inside the display panel 251. For example, the touch sensor 251 is formed directly on the upper substrate (or encapsulation layer) of the display panel 251 or the outer surface of the lower substrate (e.g., the upper surface of the upper substrate or the lower surface of the lower substrate). For example, the touch sensor 251 may be formed directly on the upper substrate (or encapsulation layer) of the display panel 251 or the outer surface of the lower substrate (e.g., the upper surface of the upper substrate or the lower surface of the lower substrate). Alternatively, it may be formed directly on the upper substrate or the inner surface of the lower substrate (e.g., the lower surface of the upper substrate or the upper surface of the lower substrate).

When the touch sensor 261 is formed directly on the encapsulation layer of the display panel 251, the overall thickness of the encapsulation layer may be 4 μm to 10 μm.

The touch sensor 261 includes an active area AA capable of sensing a touch input and a non-active area NAA surrounding at least a portion of the active area AA. According to an exemplary embodiment, the active area AA may be disposed to correspond to the display area DA of the display panel 251, and the non-active area NAA may be disposed to correspond to the non-display area NDA of the display panel 251. For example, the active area AA of the touch sensor 261 may overlap the display area DA of the display panel 251, and the non-active area NAA of the touch sensor 261 may overlap the display area NDA of the display panel 251.

According to an exemplary embodiment, a plurality of touch sensing units TS is disposed in the active area AA. That is, the active area AA may be a touch sensing area capable of sensing a touch input by a user.

The plurality of touch sensing units TS includes at least one touch electrode for detecting a touch input, for example, in the case of a mutual capacitance method, a plurality of first touch electrodes and a plurality of second touch electrodes. Specifically, one touch sensing unit TS may be one unit for detecting a change in capacitance formed by crossing one first touch electrode and one second touch electrode.

As another example, in the case of a self capacitance method, the plurality of touch sensing units TS includes a plurality of touch electrodes arranged in a matrix form. Specifically, one touch sensing unit TS may be one unit for detecting a change in capacitance of one touch electrode.

According to an embodiment, at least one touch electrode may be provided on the display area DA of the display panel 251. In this case, the at least one touch electrode may overlap at least one of electrodes and wires provided in the display panel 251 on a plane. For example, when the display panel 251 is an organic light emitting display panel, at least one touch electrode may at least overlap a cathode electrode, a data line, a scan line, and the like. When the display panel 251 is a liquid crystal display panel, at least one touch electrode may overlap at least a common electrode, a data line, a gate line, and the like.

As such, when the touch sensor 261 is coupled to the display panel 251, a parasitic capacitance is generated between the touch sensor 261 and the display panel 251. For example, at least one touch electrode of the touch sensor 261 may be disposed to overlap at least one of electrodes and wires of the display panel 251 on a plane, and accordingly, a parasitic capacitance is generated between the touch sensor 261 and the display panel 251.

A signal of the display panel 251 may be transmitted to the touch sensor, in particular, the touch sensor 261 by the coupling action of the parasitic capacitance. For example, a noise signal due to a display driving signal (e.g., a data signal, a scan signal, a light emission control signal, etc.) applied to the display panel 251 may be introduced into the touch sensor 261.

In the electronic device 2 according to an embodiment, the display panel 251 may be an organic light emitting display panel having a thin film encapsulation layer, and the touch sensor 261 may be made of on-cell type sensor electrodes in which at least one touch electrode is directly formed on one surface (e.g., an upper surface) of the thin film encapsulation layer. In this case, at least one (e.g., a cathode electrode) of electrodes and wires provided in the organic light emitting display panel and at least one touch electrode are positioned adjacent to each other. Accordingly, a noise signal according to driving the display may be transmitted to the touch sensor 261 with a relatively high intensity.

The noise signal transmitted to the touch sensor 261 may cause a ripple of the sensing signal, which may reduce the sensitivity of the touch sensor. Accordingly, the present disclosure will provide various embodiments capable of improving the sensitivity of the touch sensor, and a detailed description thereof will be provided later.

Next, an aspect of the display unit 250 shown in FIG. 2 will be described with reference to FIGS. 5 to 7.

Figure 5:
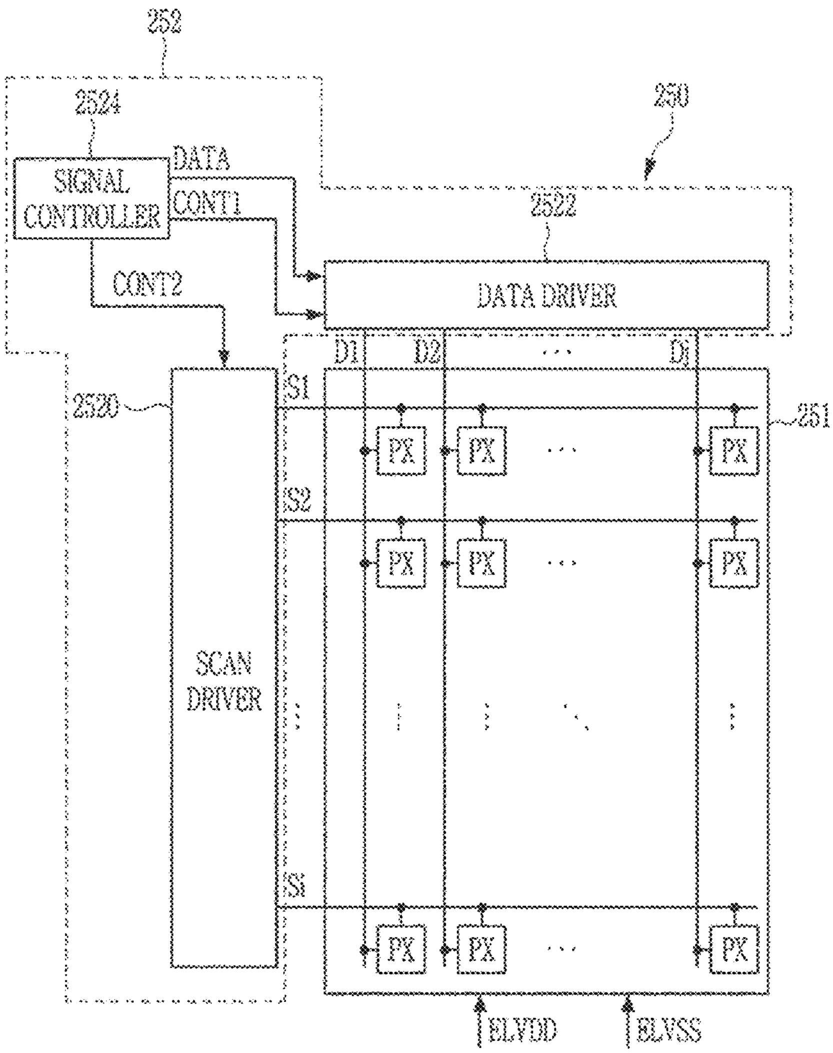
FIG. 5 is a block diagram schematically illustrating an aspect of the display unit 250 of FIG. 2.
Figure 6:
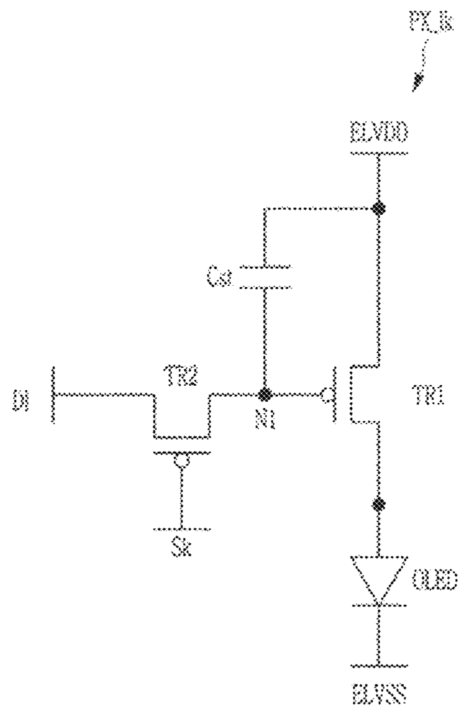
FIG. 6 is a diagram illustrating a pixel of the display unit of FIG. 5.
Figure 7:
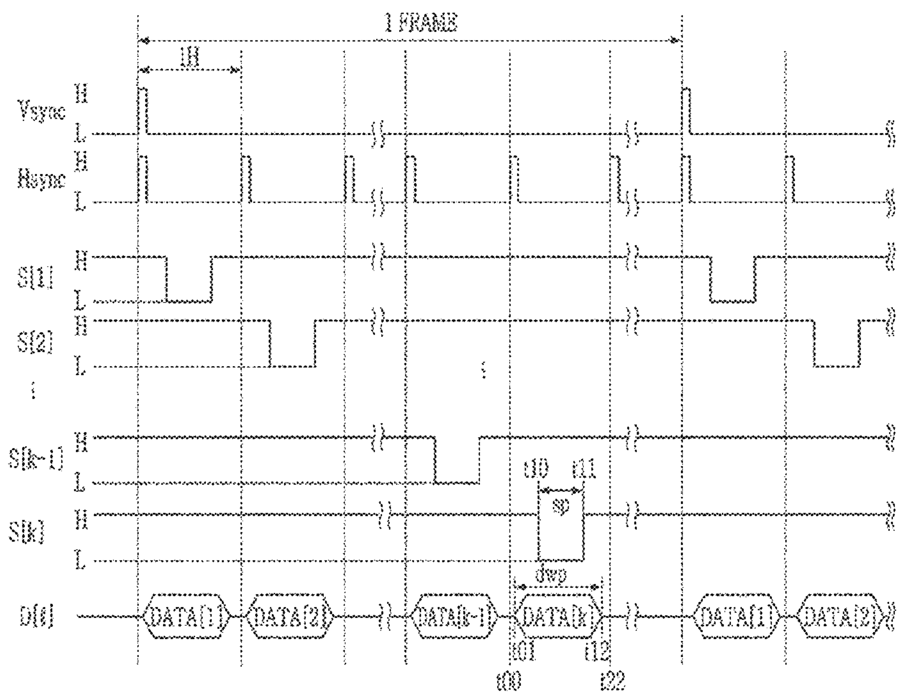
FIG. 7 is a timing diagram illustrating an example of a driving signal for driving the display unit of FIG. 5.

FIG. 5 is a block diagram schematically illustrating one embodiment of the display unit 250 of FIG. 2, and FIG. 6 illustrates pixels of the display unit of FIG. 5, and FIG. 7 illustrates an timing view representing an example of a driving signal for driving the display unit in FIG. 5.

As shown in FIG. 5, the display unit may include a display panel 251 including a plurality of pixels PX, a data driving unit 2522, a scan driving unit 2520, and a signal control unit 2524.

The display panel 251 includes a plurality of pixels PX arranged in a substantially matrix form. Although not particularly limited, the plurality of scan lines S1 to Si extends substantially opposite to each other in a substantially row direction in the arrangement of pixels and is substantially parallel to each other, and the plurality of data lines D1 to Dj extends substantially in the column direction, and is substantially parallel to each other.

Each of the plurality of pixels PX is connected to a corresponding one of the plurality of scan lines S1 to Si connected to the display panel 251 and a corresponding one of the plurality of data lines D1 to Dj connected to the display panel 251. In addition, although not shown directly on the display panel 251 of FIG. 5, each of the plurality of pixels PX is connected to a power source connected to the display panel 251, and is supplied a first power supply voltage ELVDD and a second power supply voltage ELVSS.

Each of the plurality of pixels PX emits light with a predetermined luminance by a driving current supplied to the organic light emitting diode according to a corresponding data signal transmitted through the plurality of data lines D1 to Dj.

The scan driving unit 2520 generates and transmits a scan signal corresponding to each pixel through the plurality of scan lines S1 to Si. That is, the scan driving unit 2520 transmits a scan signal to each of a plurality of pixels included in each pixel row through a corresponding scan line.

The scan driving unit 2520 receives the scan driving control signal CONT2 from the signal controller 2524 and generates a plurality of scan signals, and sequentially applies the scan signals to the plurality of scan lines S1 to Si connected to each pixel row. In addition, the scan driving unit 2520 generates a common control signal and supplies the common control signal to a common control line connected to all of the plurality of pixels PX.

The data driving unit 2522 transmits a data signal to each pixel through a plurality of data lines D1 to Dj.

The data driving unit 2522 receives a data driving control signal CONT1 from the signal control unit 2524 and supplies data signals corresponding to the plurality of data lines D1 to Dj connected to each of the plurality of pixels included in each pixel row.

The signal control unit 2524 converts an image signal transmitted from the outside into image data DATA and transmits it to the data driving unit 2522. The signal control unit 2524 receives external control signals such as a vertical synchronization signal Vsync, a horizontal synchronization signal Hsync, a clock signal, a data enable signal, etc., and generates and transmits a control signal for controlling of driving the scan driving unit 2520 and the data driving unit 2522. That is, the signal control unit 2524 generates and transmits a scan driving control signal CONT2 for controlling the scan driving unit 2520 and a data driving control signal CONT1 for controlling the data driving unit 2522, respectively.

As shown in FIG. 6, the pixel PX_lk may include an organic light-emitting diode OLED, a first transistor TR1, a second transistor TR2, and a storage capacitor Cst. The pixel PX_lk may be disposed in the first pixel row and k-th pixel column. Each transistor is a PMOS transistor for the convenience of description.

The first transistor TR1 may be a driving transistor. In an embodiment, the first transistor TR1 may include a gate connected to the first node N1, a source connected to the first power voltage ELVDD, and a drain connected to the anode of the organic light emitting diode OLED.

The driving current is a current corresponding to a voltage difference between the gate and the source of the first transistor TR1, and the driving current varies according to a voltage according to a data signal applied to the data line D1.

The second transistor TR2 may be turned on according to the level of the scan signal applied to the scan line Sk and connect the first node N1 and the data line D1. In one embodiment, the second transistor TR2 may include a gate connected to the scan line Sk, a source connected to the data line D1, and a drain connected to the first node N1. The second transistor TR2 transmits a data voltage according to the data signal D[1] transmitted through the first data line D1 to the first node N1 in response to the corresponding scan signal S[k] transmitted through the k-th scan line Sk.

The storage capacitor Cst is connected between the first power voltage ELVDD and the first node N1. In an embodiment, the storage capacitor Cst may include one electrode connected to the first power voltage ELVDD and the other electrode connected to the first node N1.

The organic light emitting diode OLED may emit light by a driving current flowing from the first transistor TR1. In an embodiment, the organic light emitting diode OLED may include an anode connected to the drain of the first transistor TR1 and a cathode connected to the second power voltage ELVSS.

As shown in FIG. 7, the period of the pulse of the vertical synchronization signal Vsync may be one frame period 1 FRAME of the display panel 251 according to the display frame rate.

During one frame period 1 FRAME, the data driving unit 2522 may be synchronized with the horizontal synchronization signal Hsync and apply an enable level data signal to the plurality of data lines D1 to Dj. For example, for every pulse of the horizontal synchronization signal Hsync, the data driving unit 2522 applies a data signal corresponding to pixels connected to a scan line to which a scan signal having a low-level voltage L is applied to all of the plurality of data lines D1 to Dj. For example, the scan driving unit 2520 applies the scan signal of the low-level voltage L to one corresponding scan line for every pulse of the horizontal synchronization signal Hsync.

Within one horizontal period 1H, that is, within one period of the pulse of the horizontal synchronization signal Hsync, there are the period dwp for applying the data signal to the data line and the period sp during which the scan signal is a low-level voltage L.

Regarding the period dwp and the period sp, a pixel connected to the scan line Sk and the data line D1 will be described as an example.

At t00, one horizontal period 1H begins. At t01, the data signal DATA[k] is applied to the data line D1. At t10, the scan signal S[k] applied to the scan line Sk is changed to a low-level voltage L.

The time t10 at which the scan signal S[k] is changed to the low-level voltage L and the time t01 at which the data signal DATA [k] starts to be applied to the data line D1 may be the same or different. For example, in consideration of the RC delay of the data line D1, before the scan signal S[k] is changed to the low-level voltage L, the data signal DATA[k] is may be applied to the data line D1.

At t11, the scan signal S[k] is changed to a high-level voltage H. At t12, the application of the data signal DATA[k] to the data line D1 is stopped. At t22, one horizontal period 1H ends.

The time t11 at which the scan signal S[k] is changed to the high-level voltage H and the time t12 at which the application of the data signal DATA[k] to the data line D1 is stopped may be the same or different. For example, after the scan signal S[k] is changed to the high-level voltage H, the application of the data signal DATA[k] to the data line D1 may be stopped.

The data writing period TA includes a period dwp and a period sp. Specifically, the data writing period TA is from the earlier of the time at which the period dwp starts and the time at which the period sp starts, up to the later of the end of the period dwp and the end of the period sp. For example, the data writing period TA may be a period from t01 to t12.

Next, another aspect of the display unit will be described with reference to FIGS. 8 and 9.

Figure 8:
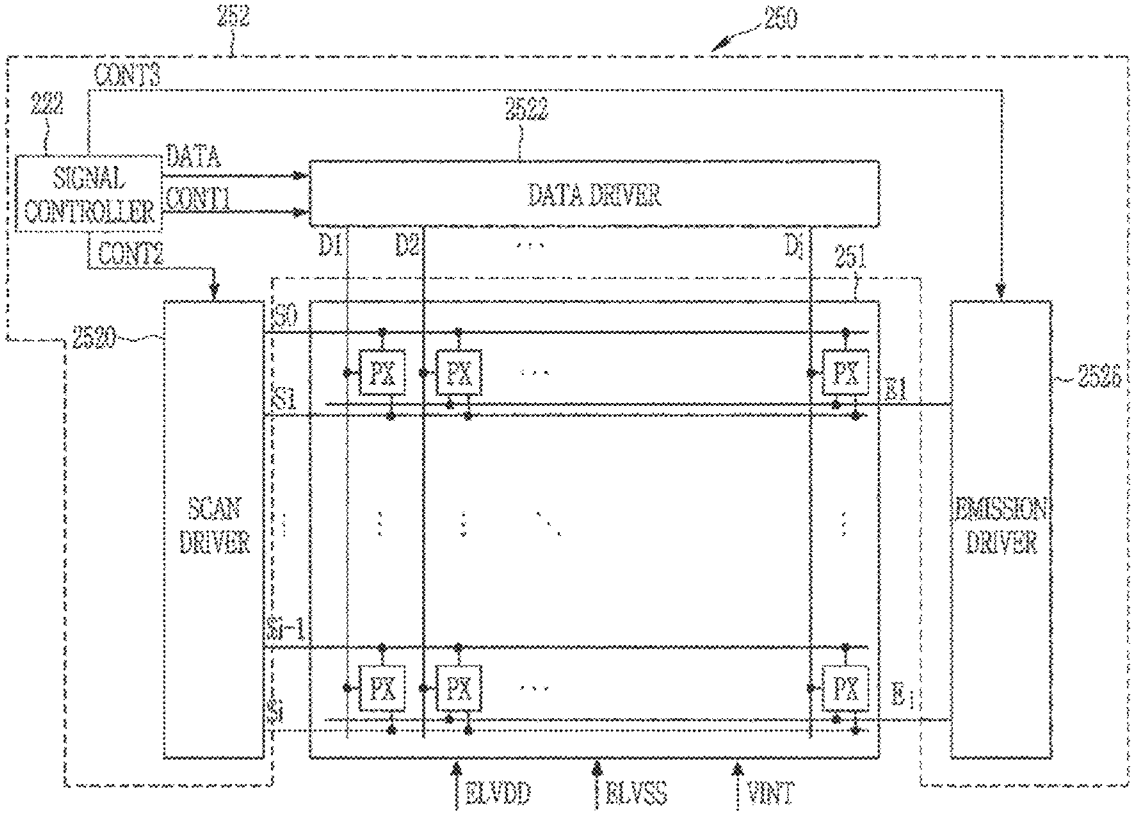
FIG. 8 is a block diagram schematically illustrating another aspect of the display unit of FIG. 2.
Figure 9:
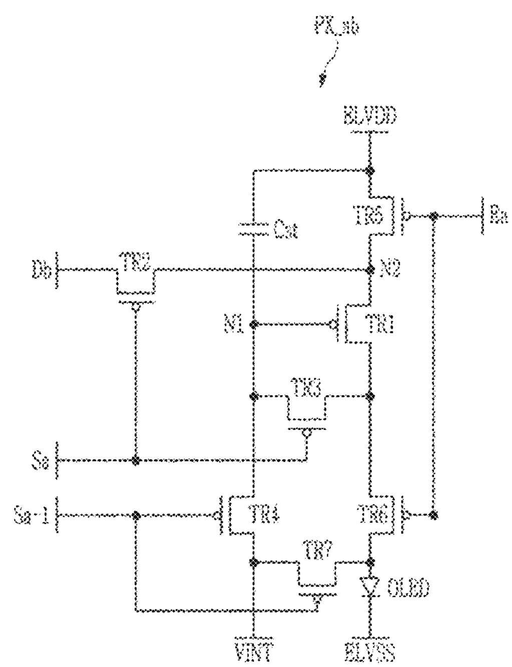
FIG. 9 is a diagram illustrating a pixel of the display unit of FIG. 8.

FIG. 8 is a block diagram schematically illustrating another aspect of the display unit of FIG. 2, and FIG. 9 is a view showing pixels of the display unit of FIG. 8.

As shown in FIG. 8, the display unit includes a display panel 251 including a plurality of pixels PX, a data driving unit 2522, a scan driving unit 2520, a light emission control driver 2526, and a signal control unit 2524.

The display panel 251 includes a plurality of pixels PX arranged in a substantially matrix form. Although not particularly limited, the plurality of scan lines S0 to Si and the plurality of light emission control lines E1 to Ei extend oppositely in the substantially row direction in the arrangement of the pixels and are substantially parallel to each other, and the plurality of data lines D1 to Dj extend approximately in the substantially column direction and are substantially parallel to each other.

Each of the plurality of pixels PX is connected to corresponding two scan lines among the plurality of scan lines S0 to Si connected to the display panel 251, corresponding one light emission control line of the plurality of light emission control lines E1 to Ei, and corresponding one data line of the plurality of data lines D1 to Dj, respectively. In addition, although not directly shown on the display panel 251 of FIG. 8, each of the plurality of pixels PX is connected to a power source connected to the display panel 251, and is supplied a first power supply voltage ELVDD, a second power supply voltage ELVSS, and an initialization voltage VINT.

Each of the plurality of pixels PX of the display panel 251 is connected to two corresponding scan lines. That is, it is connected to the scan line corresponding to the pixel row including the corresponding pixel and the scan line corresponding to the previous pixel row of the pixel row. Each of the plurality of pixels included in the first pixel row may be connected to the first scan line S1 and the dummy scan line S0. In addition, each of the plurality of pixels included in the i-th pixel row is connected to the i-th scan line Si corresponding to the i-th pixel row, which is the corresponding pixel row, and the i−1th scan line Si−1 corresponding to the i−1th pixel row, which is the previous pixel row. It is connected to the line Si−1.

Each of the plurality of pixels PX emits light having a predetermined luminance by a driving current supplied to the organic light emitting diode according to a corresponding data signal transmitted through the plurality of data lines D1 to Dj.

The scan driving unit 2520 generates and transmits a scan signal corresponding to each pixel PX through the plurality of scan lines S0 to Si. That is, the scan driving unit 2520 transmits a scan signal to each of the plurality of pixels PX included in each pixel row through a corresponding scan line.

The scan driving unit 2520 receives the scan driving control signal CONT2 from the signal control unit 2524 and generates a plurality of scan signals, and sequentially applies the scan signals to a plurality of scan lines S0 to Si connected to each pixel row.

The data driving unit 2522 transmits a data signal to each pixel through the plurality of data lines D1 to Dj.

The data driving unit 2522 receives the data driving control signal CONT1 from the signal control unit 2524 and supplies data signals corresponding to the plurality of data lines D1 to Dj connected to each of the plurality of pixels included in each pixel row.

The light emission control driving unit 2526 is connected to a plurality of light emission control lines E1 to Ei connected to the display panel 251 including a plurality of pixels PX arranged in a matrix. That is, a plurality of light emission control lines E1 to Ei extending substantially parallel to each other while facing each of the plurality of pixels in a substantially row direction, connects each of the plurality of pixels PX to the light emission control driving unit 2526.

The light emission control driving unit 2526 generates and transmits a light emission control signal corresponding to each pixel through the plurality of light emission control lines E1 to Ei. Each pixel receiving the light emission control signal is controlled to emit an image according to the image data signal in response to the control of the light emission control signal. That is, in response to the light emission control signal transmitted through the corresponding light emission control line, the operation of the light emission control transistors TR5, TR6 in FIG. 9 included in each pixel is controlled, and accordingly, the organic light emitting diode connected to the light emission control transistor may or may not emit light with a luminance according to the driving current corresponding to the data signal.

A first power voltage ELVDD, a second power voltage ELVSS, and an initialization voltage VINT are supplied to each pixel PX of the display panel 251. The first power voltage ELVDD may be a predetermined high-level voltage, and the second power voltage ELVSS may be a voltage lower than the first power voltage ELVDD or a ground voltage. The initialization voltage VINT may be set to be equal to or lower than the second power voltage ELVSS.

Voltage values of the first power voltage ELVDD, the second power voltage ELVSS, and the initialization voltage VINT are not particularly limited.

The signal control unit 2524 converts a plurality of image signals transmitted from the outside into a plurality of image data signals DATA, and transmits the converted image signals to the data driving unit 2522. The signal control unit 2524 receives the vertical synchronization signal Vsync, the horizontal synchronization signal Hsync, and the clock signal, and generates control signals for controlling the driving of the scan driving unit 2520, the light emission control driving unit 2526, and the data driving unit 2522 and transmit them thereto, respectively. That is, the signal control unit 2524 generates and transmits the data driving control signal CONT1 for controlling the data driving unit 2522, the scan driving control signal CONT2 for controlling the scan driving unit 2520, and the light emission control signal CONT3 for controlling the light emission control driving unit 2526.

As shown in FIG. 9, the pixel PX_ab includes an organic light emitting diode OLED, a storage capacitor Cst, and the first to seventh transistors TR1 to TR7. The pixel PX_ab may be located in the a-th pixel row and the b-th pixel column. Each transistor is assumed to be a PMOS transistor for the convenience of description.

The first transistor TR1 has a gate connected to the first node N1, a source connected to the second node N2 to which the drain of the fifth transistor TR5 is connected, and a drain connected to a third node N3. A driving current flows through the first transistor TR1 according to the corresponding data signal D[b].

The driving current is a current corresponding to a voltage difference between the source and gate of the first transistor TR1, and the driving current varies in response to a data voltage according to the applied data signal D[b].

The second transistor TR2 has a gate connected to the a-th scan line Sa, a source connected to the b-th data line Db, and a drain connected to the second node N2 which is commonly connected to the source of the first transistor TR1 and the drain of the fifth transistor TR5.

The second transistor TR2 transmits to the second node N2 a data voltage according to the data signal D[b] transmitted through the b-th data line Db in response to the corresponding scan signal S[j] transmitted through the a-th scan line Sa.

The third transistor TR3 includes a gate connected to the a-th scan line Sa, and both ends respectively connected to the gate and drain of the first transistor TR1. The third transistor TR3 operates in response to the corresponding scan signal S[j] transmitted through the a-th scan line Sa. The turned-on third transistor TR3 connects the gate and the drain of the first transistor TR1, and diode-connects the first transistor TR1.

When the first transistor TR1 is diode-connected, a voltage compensated by the threshold voltage of the first transistor TR1 from the data voltage applied to the source of the first transistor TR1 is applied to the gate of the first transistor TR1. Since the gate of the first transistor TR1 is connected to one electrode of the storage capacitor Cst, the voltage is maintained by the storage capacitor Cst. Since the voltage for which the threshold voltage of the first transistor TR1 is compensated is applied to the gate thereof and maintained, the driving current flowing through the first transistor TR1 is not affected by the threshold voltage of the first transistor TR1.

The fourth transistor TR4 includes a gate connected to the a−1th scan line Sa−1, a source connected to the initialization voltage VINT, and a drain connected to the first node N1. The fourth transistor TR4 transmits to the first node N1 an initialization voltage VINT applied through the initialization voltage VINT in response to the a−1th scan signal S[a−1] transmitted through the a−1th scan line Sa−1. The fourth transistor TR4 may transmit to the first node N1 the initialization voltage VINT, before the data signal D[b] is applied, in response to the a−1th scan signal S[a−1]transmitted in advance to the a−1th scan line Sa−1 corresponding to the previous pixel row of the j-th pixel row including the corresponding pixel PX_ab.

In this case, the voltage value of the initialization voltage VINT is not limited, but may be set to have a low-level voltage value to sufficiently lower the gate voltage of the first transistor TR1 for initialization. That is, during the period in which the a−1th scan signal S[a−1] is transferred to the gate of the fourth transistor TR4 at the gate-on voltage level, the gate of the first transistor TR1 is set to be initialized with the initialization voltage VINT.

The fifth transistor TR5 includes a gate connected to the j-th light emission control line Ej, a source connected to the first power voltage ELVDD, and a drain connected to the second node N2.

The sixth transistor TR6 includes a gate connected to the j-th light emission control line Ej, a source connected to the third node N3, and a drain connected to the anode of the organic light emitting diode OLED.

The fifth transistor TR5 and the sixth transistor TR6 operate in response to the j-th light emission control signal E[j] transmitted through the j-th light emission control line Ej. When the fifth transistor TR5 and the sixth transistor TR6 are turned on in response to the j-th light emission control signal E[j], a current path is formed in the direction from the first power voltage ELVDD to the organic light emitting diode OLED so that a driving current can flow, and then the organic light emitting diode OLED emits light according to the driving current, and an image of the data signal is displayed.

The storage capacitor Cst includes one electrode connected to the first node N1 and the other electrode connected to the first power voltage ELVDD. As described above, since the storage capacitor Cst is connected between the gate of the first transistor TR1 and the first power voltage ELVDD, the voltage applied to the gate of the first transistor TR1 may be maintained.

The seventh transistor TR7 includes a gate connected to the a−1th scan line Sa−1, a source connected to the anode of the organic light emitting diode OLED, and a drain connected to the power supply of the initialization voltage VINT.

The seventh transistor TR7 may transmit to the anode of the organic light emitting diode OLED the initialization voltage VINT in response to the a−1th scan signal S[a−1] transmitted in advance to the a−1th scan line Sa−1 corresponding to the previous pixel row of the j-th pixel row including the corresponding pixel PX_ab. The anode of the organic light emitting diode OLED is reset to a sufficiently low voltage by the transmitted initialization voltage VINT.

Figure 10:
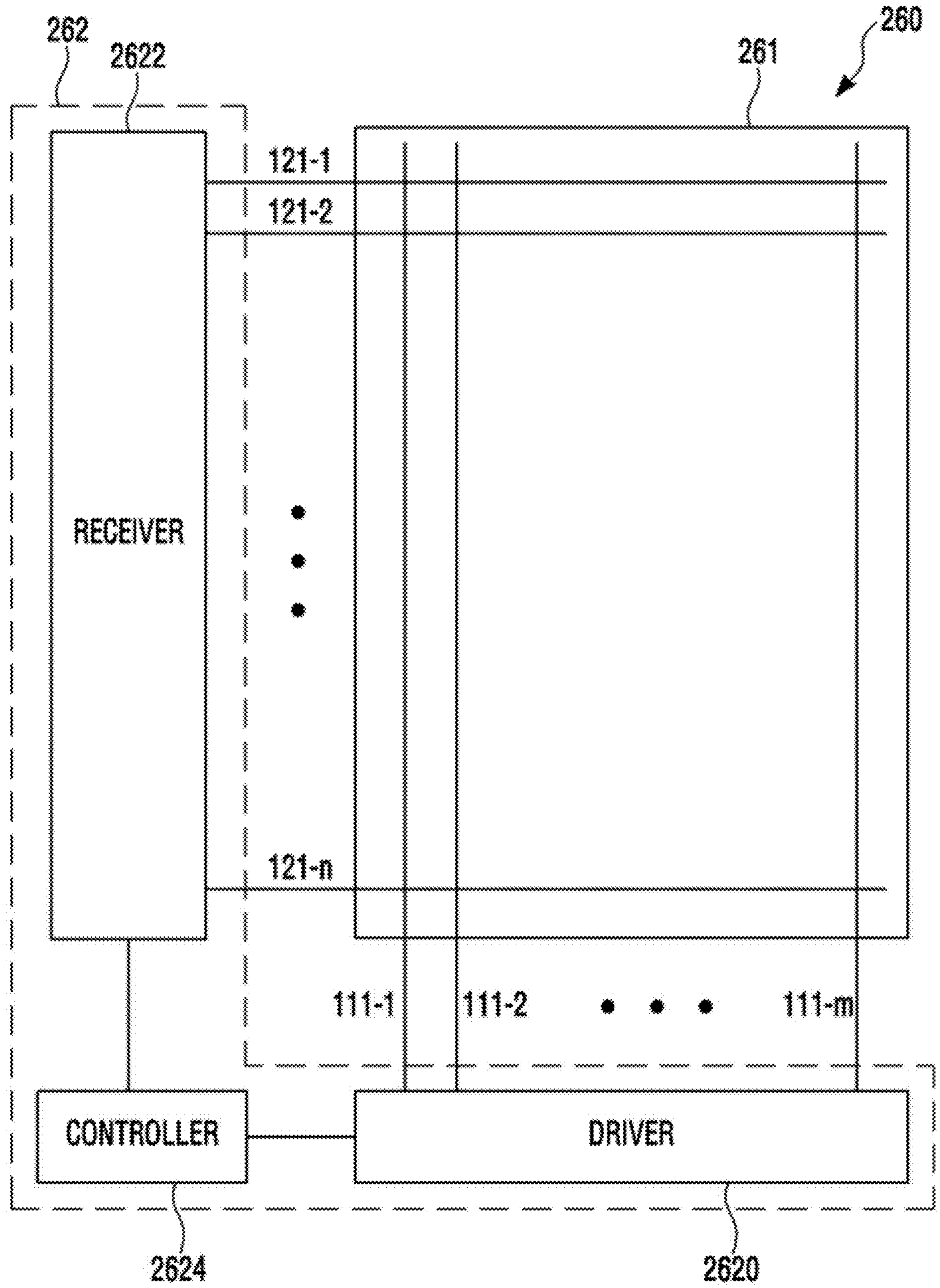
FIG. 10 is a diagram schematically illustrating a touch sensing unit according to an embodiment.

FIG. 10 is a diagram schematically illustrating a touch sensing unit according to an embodiment.

The touch sensing unit 260 according to an embodiment includes a touch sensor 261 and a touch controller 262 for controlling the touch sensor 261. The touch controller 262 may include a driving unit 2620 and a receiving unit 2622 that transmit/receive signals to and from the touch sensor 261, and a control unit 2624.

The touch sensor 261 may include a plurality of first touch electrodes 111-1 to 111-*m* for detecting touch coordinates in a first direction, and a plurality of second touch electrodes 111-1 to 111-*n* for detecting touch coordinates in a second direction crossing the first direction. For example, the touch sensor 261 includes a plurality of first touch electrodes 111-1 to 111-*m* having a shape extending in the second direction, and a plurality of second touch electrodes 121-1 to 121-*n* having a shape extending in the first direction crossing the second direction. In the touch sensor 261, the plurality of first touch electrodes 111-1 to 111-*m* may be arranged along the first direction, and the plurality of second touch electrodes 121-1 to 121-*n* may be arranged along the second direction.

The plurality of first touch electrodes 111-1 to 111-*m* are connected to the driving unit 2620, and the plurality of second touch electrodes 121-1 to 121-*n* are connected to the receiving unit 2622. Although the driving unit 2620, the receiving unit 2622, and the control unit 2624 are illustrated separately in FIG. 10, they may be implemented as one module, unit, or chip, but are not limited thereto.

The driving unit 2620 may apply a driving signal to the plurality of first touch electrodes 111-1 to 111-*m*. The receiving unit 2622 may receive a sensing signal from the plurality of second touch electrodes 121-1 to 121-*n*.

Although it has been described above that the touch sensing unit 260 is implemented in a mutual capacitance method, the touch sensing unit 260 may be implemented in a self-capacitance method, and a person skilled in the art may easily modify the touch electrodes in the mutual capacitance method 111-1 to 111-*m*, 121-1 to 121-*n*, the driving unit 2620, and the receiving unit 2622 so as to suit the self-capacitance method by means of appropriate modification thereof, adding new components, or omitting some components thereof.

Figure 11:
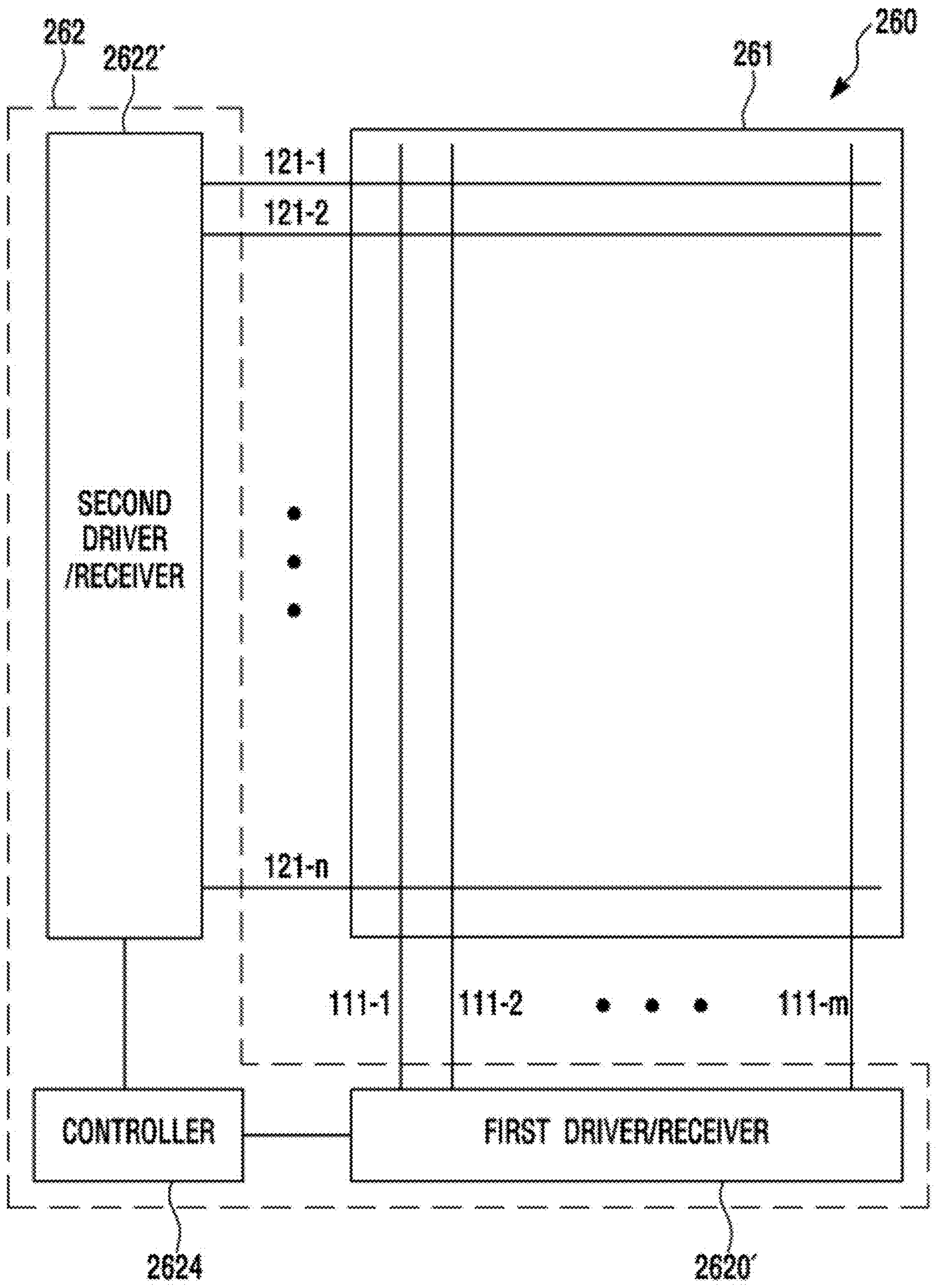
FIG. 11 is a diagram schematically illustrating the touch sensing unit 260 according to an embodiment.
Figure 12A:
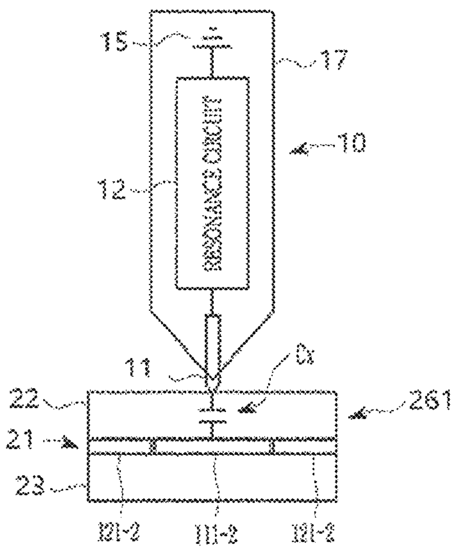
FIGS. 12A and 12B are a diagram illustrating an example in which a stylus pen is touched by a touch sensing unit 260 according to an embodiment.
Figure 12B:
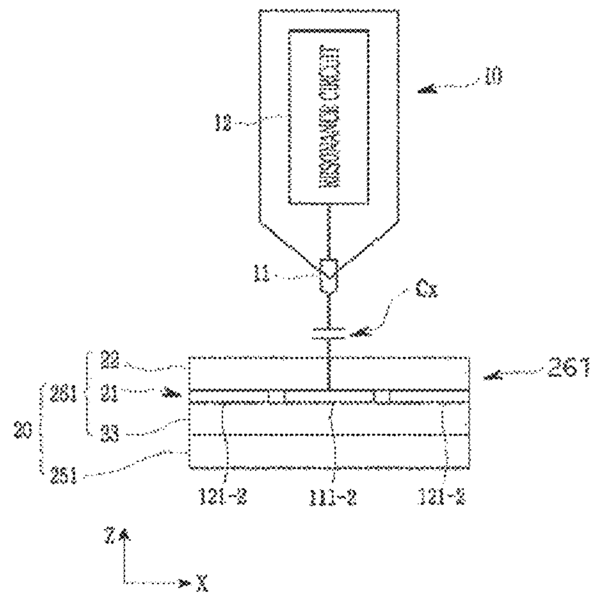

FIG. 11 is a diagram schematically illustrating a touch sensing unit 260 according to an embodiment, and FIGS. 12A and 12B are a diagram illustrating an example in which a stylus pen is touched by the touch sensing unit 260 according to an embodiment.

Referring to FIG. 11, the touch sensing unit 260 according to an exemplary embodiment includes a touch panel 262620 and a touch controller 262 controlling the touch sensor 261. The touch controller 262 may include first and second driving/receiving units 2620' and 2622' that transmit/receive signals to and from the touch sensor 261, and a control unit 2624.

The touch sensor 261 may include a plurality of touch electrodes 111-1 to 111-*m*, 121-1 to 121-*n*.

The touch sensing unit 260 of the present embodiment may not include the coil driver 263 and the loop coil 264.

The touch sensor 261 includes a plurality of first touch electrodes 111-1 to 111-*m* having a shape extending in a first direction, and a plurality of second touch electrodes 111-1 to 111-*n* having a shape extending in a second direction crossing the first direction. In the touch sensor 261, the plurality of first touch electrodes 111-1 to 111-*m* may be arranged along the second direction, and the plurality of second touch electrodes 121-1 to 121-*n* may be arranged along the first direction. Although the shape of the touch sensor 261 in FIG. 1 is illustrated as a rectangle, it is not limited thereto.

Although the shape of the touch sensor 261 in FIG. 11 is illustrated as a rectangle, it is not limited thereto. The shape of the touch sensor 261 may have an arbitrary shape. For example, the arbitrary shape may be a circle, an ellipse, a partially circular polygon, or a polygon other than a square. The arbitrary shape includes the shape of a figure partially composed of curves.

The touch sensing unit 260 may be used to sense a touch input (direct touch or proximity touch) by a touch object. A touch input of the stylus pen 10 close to the touch sensor 261 may be sensed by the touch sensing unit 260.

As shown in FIGS. 12A and 12B, the touch sensor 261 further includes an insulating layer 23 and a window 22. The touch electrode layer 21 may be positioned on the insulating layer 23. The touch electrode layer 21 includes a plurality of first touch electrodes 111-1 to 111-*m* and a plurality of second touch electrodes 121-1 to 121-*n*. A window 22 may be positioned on the touch electrode layer 21. In FIG. 12A and FIG. 12B, the plurality of first touch electrodes 111-1 to 111-*m* and the plurality of second touch electrodes 121-1 to 121-*n* are illustrated as being positioned on the same layer, however, they may be respectively located on different layers, and are not limited thereto.

The plurality of first touch electrodes 111-1 to 111-*m* is connected to the first driving/receiving unit 2620', and the plurality of second touch electrodes 121-1 to 121-*n* is connected to the second driving/receiving unit 2622'. Although the first driving/receiving unit 2620' and the second driving/receiving unit 2622' are shown separately in FIG. 11, the first driving/receiving unit 2620' and the second driving/receiving unit 2622' may be implemented as a module, a unit, or a chip, but are not limited thereto.

The first driving/receiving unit 2620' may apply a driving signal to the plurality of first touch electrodes 111-1 to 111-*m* through the plurality of touch channels. The first driving/receiving unit 2620' may also receive sensing signals from the plurality of first touch electrodes 111-1 to 111-*m* through the plurality of touch channels. Similarly, the second driving/receiving unit 2622' may apply driving signals to the plurality of second touch electrodes 121-1 to **121-*n* through the plurality of touch channels. The second driving/receiving unit 2622' may also receive sensing signals from the plurality of first touch electrodes 121-1 to 121-*n*** through the plurality of touch channels.

That is, the first driving/receiving unit 2620' and the second driving/receiving unit 2622' may be a kind of transceiver for transmitting and receiving signals.

When a driving signal is applied from the first driving/receiving unit 2620' to the plurality of first touch electrodes 111-1 to **111-*m*, the channels corresponding to the plurality of first touch electrodes 111-1 to 111-*m* act as drive channels. In addition, when a sensing signal is transmitted from the plurality of first touch electrodes 111-1 to 111-*m* to the first driving/receiving unit 2620', the touch channels corresponding to the plurality of first touch electrodes 111-1 to 111-*m* act as sensing channels. Similarly, when a driving signal is applied from the second driving/receiving unit 2622' to the plurality of second touch electrodes 121-1 to 121-*n*, the touch channels corresponding to the plurality of second touch electrodes 121-1 to 121-*n* act as driving channels. In addition, when a sensing signal is transmitted from the plurality of second touch electrodes 121-1 to 121-*n* to the second driving/receiving unit 2622', the touch channels corresponding to the plurality of second touch electrodes 121-1 to 121-*n*** act as sensing channels.

The driving signal may include a signal (e.g., a sine wave, a square wave, etc.) having a frequency corresponding to the resonance frequency of the stylus pen 10. The resonant frequency of the stylus pen 10 depends on a design value of the resonant circuit unit 12 of the stylus pen.

The touch sensing unit 260 may be used to sense a touch input (direct touch or proximity touch) by a touch object. As shown in FIG. 12A, a touch input of the stylus pen 10 adjacent to the touch sensor 261 may be sensed by the touch sensing unit 260.

As shown in FIG. 12B, the touch screen 20 includes a display panel 251 and a touch sensor 261 on the display panel 251. The touch sensor 261 may include a substrate 23, a touch electrode 21 on the substrate, and a window 22 on the touch electrode 21.

The touch electrode 21 includes a plurality of first touch electrodes 111-1, 111-2, . . . , **111-*m* and a plurality of second touch electrodes 121-1, 121-2, . . . , 121-*n*. Although the touch electrode 21 is illustrated as a single layer in FIG. 12**B, the first touch electrodes and the second touch electrodes may be respectively located on different layers, but are not limited thereto.

A window 22 may be positioned on the touch electrode 21. The touch electrode 21, the conductive tip 11, and the window 22 may form a capacitance Cx. Accordingly, a signal a resonance signal or an active touch signal generated by the stylus pen 10 may be transmitted to the touch electrode 21.

As shown in FIG. 12A, the touch sensing unit 260 may be used to sense a touch input direct touch or proximity touch by a touch object. As illustrated in FIG. 12B, a touch input of the stylus pen 10 close to the touch sensor 261 may be sensed by the touch sensing unit 260.

Figure 13A:
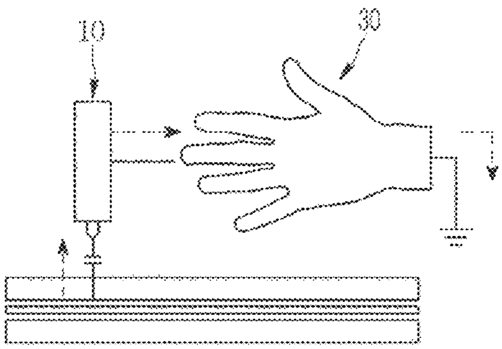
FIGS. 13A and 13B are a diagram illustrating a case in which a driving signal is applied to a stylus pen and a user's hand holding the stylus pen.
Figure 13B:
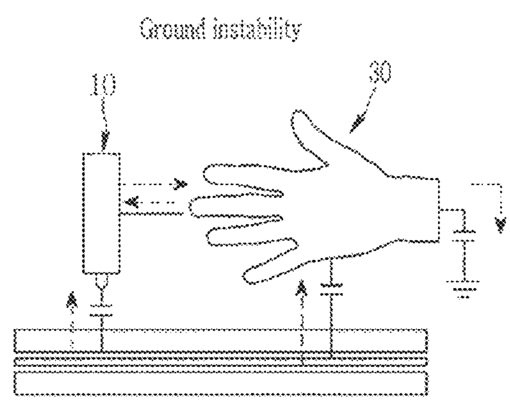

FIGS. 13A and 13B are a diagram illustrating a case in which a driving signal is applied to a stylus pen and a user's hand holding the stylus pen.

As shown in FIG. 13A, the driving signal is transmitted to the resonance circuit unit 12 through a capacitance formed from the conductive tip 11 of the stylus pen 10.

However, assuming that a user holds the stylus pen 10 with the hand 30 and writes on the touch sensing unit 260, a capacitance formed between the user's hand 30 and the touch electrodes 111, 121 also exists in addition to the capacitance formed between the touch electrodes 111, 121 and the conductive tip 11.

When the same driving signal is applied to the plurality of touch electrodes 111, 121 in this connection state, as shown in FIG. 13B, the driving signal is transmitted not only to the capacitance formed from the conductive tip 11 of the stylus pen 10, but also to the capacitance with the user's hand 30 at the same time. Since the user's hand 30 is connected to the ground unit 15 of the stylus pen 10, the driving signal is transmitted to the resonance circuit unit 12.

On the other hand, the resonance circuit unit 12 resonates using the voltage difference between the signal transmitted through the conductive tip 11 and the ground unit 15 of the stylus pen 10, but when the same driving signal is applied to the ground unit 15 of the stylus pen 10 through the hand 30, the voltage difference between the conductive tip 11 and the ground unit 15 of the stylus pen 10 is reduced, thereby reducing the magnitude of a resonance signal. In this regard, it will be described in detail with reference to FIGS. 14 and 15.

Figure 14:
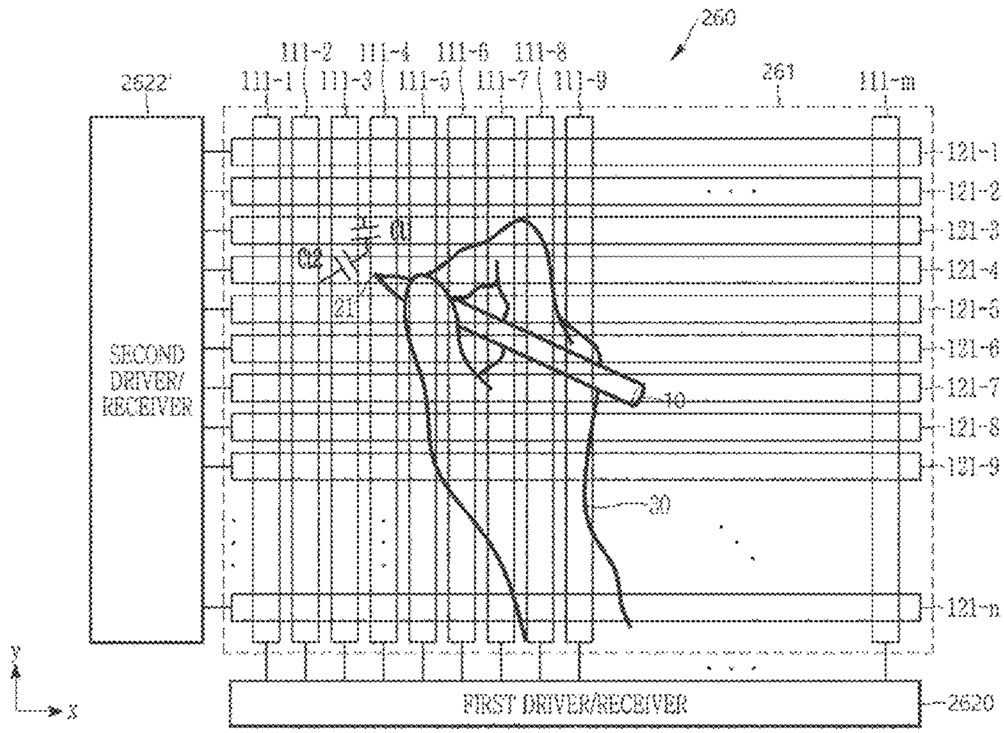
FIG. 14 is a diagram illustrating an example of performing a touch input to the touch sensing unit 260 using a stylus pen according to an embodiment.
Figure 15:
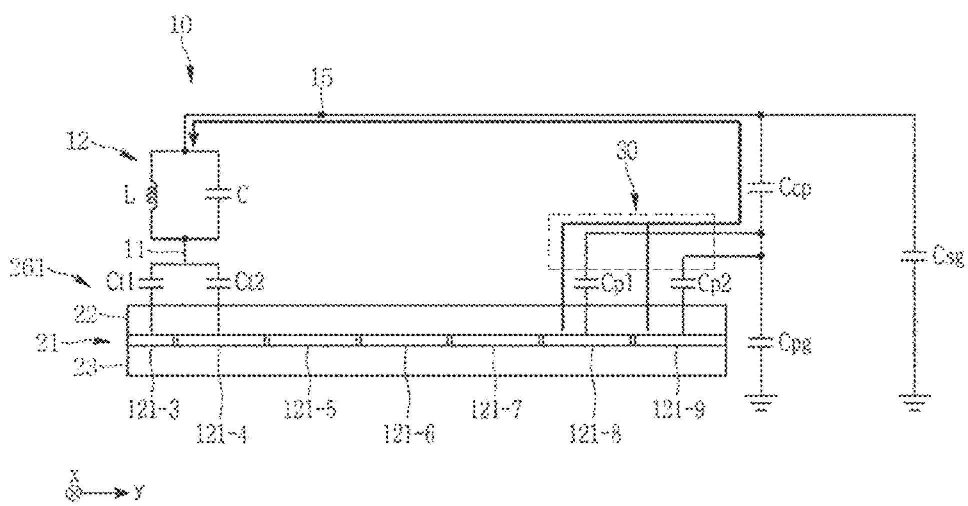
FIG. 15 is a diagram illustrating an effect of a driving signal transmitted by hand in FIG. 14.

FIG. 14 is a diagram illustrating a case of performing a touch input to the touch sensing unit 260 according to an embodiment using a stylus pen, and FIG. 15 is a diagram illustrating the influence of a driving signal transmitted by hand in FIG. 14.

As shown in FIG. 14, the tip 11 of the stylus pen 10 forms capacitances Ct1, Ct2 with the second touch electrodes 121-3, 121-4, respectively.

When a user grips the stylus pen 10 and performs a touch input on the touch sensor 261, the user's hand 30 is spaced apart from the conductive tip 11 of the stylus pen 10 and comes in contact with the touch sensor 261. For example, as shown in FIG. 15, the user's hand 30 contacts the area in which the second touch electrodes 121-7, 121-8 are arranged in the touch sensor 261. That is, the user's hand 30 may form capacitance with the second touch electrodes 121-7, 121-8.

Referring to FIG. 15, the touch electrodes of the touch sensor 261 may form capacitance with the conductive tip 11 of the stylus pen 10. For example, the second touch electrodes 121-3 of the touch sensor 261 form a capacitance Ct1 with the conductive tip 11 of the stylus pen 10, and the second touch electrodes 121-4 form a capacitance Ct2 with the conductive tip 11 of the stylus pen 10. One end of the resonance circuit unit 12 of the stylus pen 10 is electrically connected to the second touch electrodes 121-3, 121-4.

The touch electrodes of the touch sensor 261 may form capacitance with the user's hand 30. For example, the second touch electrode 121-8 of the touch sensor 261 forms a capacitance Cp1 with the user's hand 30, and the second touch electrode 121-8 forms a capacitance Cp2 with the user's hand 30.

Since the user's hand 30 is holding the stylus pen 10, that is, the ground unit 15 or the body portion 17 of the stylus pen 10, the user's hand 30 and the ground unit 15 of the stylus pen 10 are electrically conductive, or the user's hand 30 and the ground unit 15 of the stylus pen 10 form a capacitance Ccp through the body portion 17. That is, the other end of the resonance circuit unit 12 is electrically connected to the user's hand 30.

In addition, a capacitance Cpg is formed between the user's hand 30 and the ground of the touch sensor 261, and a capacitance Csg is also formed between the ground unit 15 of the stylus pen 10 and the ground of the touch sensor 261.

The driving signal applied to the touch electrodes 121-8, 121-9 is transmitted to the other end of the resonance circuit unit 12 through capacitances Cp1, Cp2 between the touch electrodes 121-8, 121-9 and the user's hand 30 and the user's hand 30, and through the capacitance Ccp between the user's hand 30 and the ground unit 15 of the stylus pen 10.

As such, as the driving signal is applied to the ground unit 15, the ground unit 15 of the stylus pen 10 does not have an ideally stable ground state, and the voltage level changes according to the driving signal. On the other hand, the resonance circuit unit 12 accumulates energy required for resonance with the voltage difference between the ground unit 15 and the conductive tip 11, but when the potential of the ground unit 15 moves according to the driving signal, the voltage difference between the ground unit 15 and the conductive tip 11 is reduced, thereby the magnitude of a resonance signal is reduced.

In order to solve this problem, in the prior art, when a contact object such as the user's hand 30 and the stylus pen 10 contact the touch sensor 261 at the same time, a driving signal is not applied at a point where the user's hand is expected to be located, or a driving signal having a 180-degree phase difference is applied so that the magnitude of the resonance signal generated by the stylus pen 10 is not reduced. This operation will be described below with reference to FIG. 16.

Figure 16:
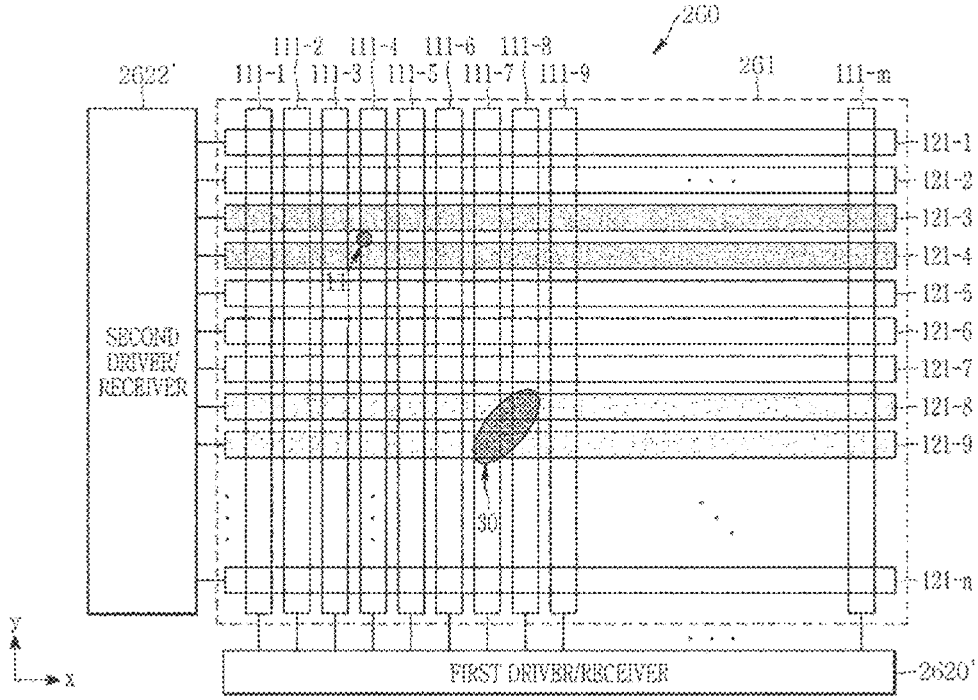
FIG. 16 is a diagram illustrating a driving signal application operation of the touch sensing unit (260) according to an exemplary embodiment.

FIG. 16 is a diagram illustrating a driving signal application operation of the touch sensing unit 260 according to an exemplary embodiment.

Referring to FIG. 16, when the user's hand 30 grips the stylus pen 10 and is positioned on the touch sensor 261, the conductive tip 11 of the stylus pen 10 may be positioned on the second touch electrode 121-3, 121-4, and the user's hand 30 may be positioned on the second touch electrodes 121-8, 121-9.

In this case, the second driving/receiving unit 2622' may apply a first driving signal to the second touch electrodes 121-3, 121-4 where the stylus pen 10 is positioned, and may apply a second driving signal having a phase difference of 180 degrees from the first driving signal to to the second touch electrodes 121-8, 121-9 arranged adjacent to the second touch electrodes 121-3, 121-4 where the first driving signal is applied.

In this case, the second driving/receiving unit 2622' may be configured such that the other second touch electrodes 121-1, 121-2, 121-5, 121-6, 121-7 arranged adjacent to the second touch electrodes 121-3, 121-4 maintain a constant voltage (e.g., a ground state). Although the illustrated example shows that the second touch electrodes 121-5, 121-6, 121-7 grounded between the second touch electrodes to which the first driving signal and the second driving signal are applied are disposed therein, the touch electrode to which the first driving signal is applied and the touch electrode to which the second driving signal is applied may be continuously arranged in some implementation. In addition, the control unit 2624 may make the corresponding second touch electrodes 121-1, 121-2, 121-5, 121-6, 121-7 have a floating state instead of grounding them. Here, the floating state means that a specific electrode is opened without being grounded or connected to another circuit configuration.

Since the driving signal having a 180-degree phase difference is provided to the ground unit 15 of the stylus pen 10, the voltage difference between both ends of the resonant circuit unit 12 increases more than that in a case where the ground unit 15 of the stylus pen 10 is ideally grounded. Accordingly, as the energy that can be utilized for resonance increases, the stylus pen 10 may generate a resonance signal of a larger size.

However, when the stylus pen 10 and the user's hand 30 respectively form capacitances with the same touch electrode, it is difficult to increase the magnitude of the resonance signal according to the above-described embodiment.

Figure 17:
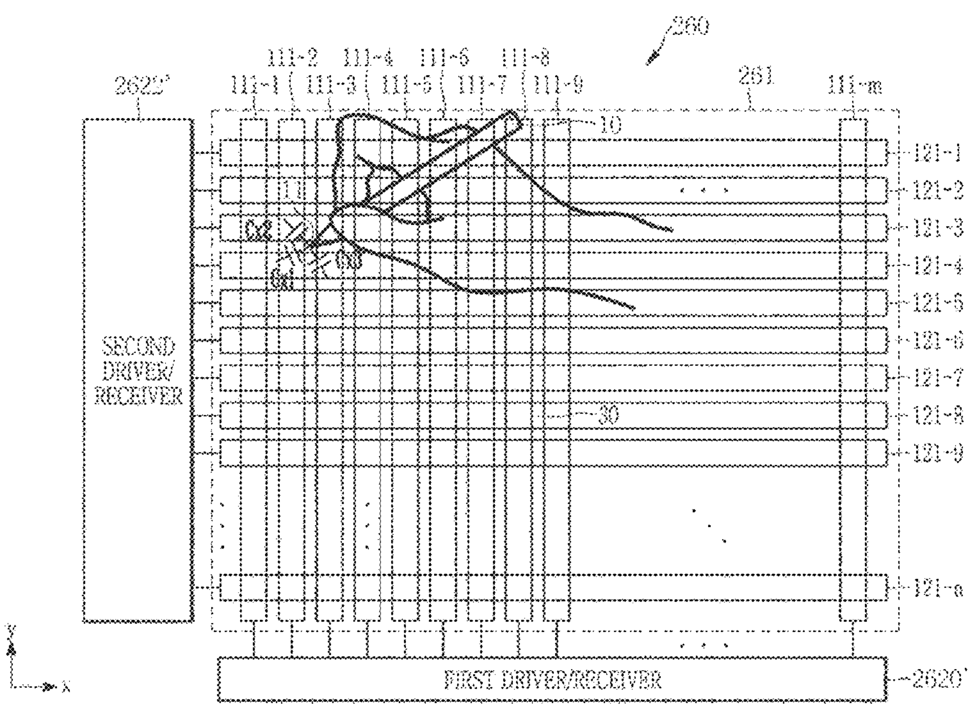
FIG. 17 is a diagram illustrating another case of performing a touch input to the touch sensing unit 260 using a stylus pen according to an exemplary embodiment.
Figure 18:
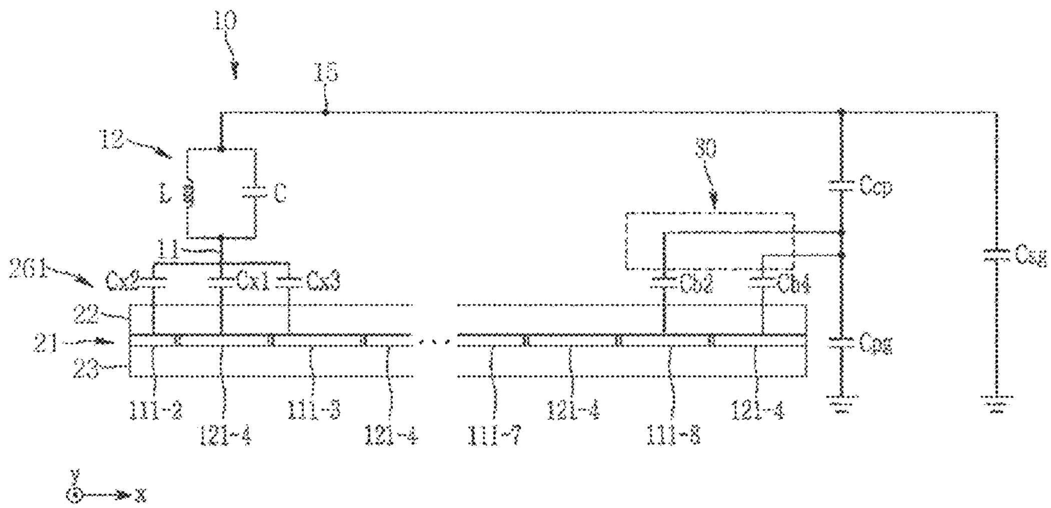
FIG. 18 is a diagram illustrating the influence of a driving signal transmitted by hand in FIG. 17.

FIG. 17 is a diagram illustrating another case of performing a touch input to the touch sensing unit 260 using a stylus pen according to an embodiment, and FIG. 18 is a diagram illustrating the influence of a driving signal transmitted by hand in FIG. 17.

Referring to FIG. 17, the tip 11 of the stylus pen 10 forms capacitances Cx1, Cx2, Cx3 respectively with the second touch electrode 121-4 and the first touch electrodes 111-2, 111-3.

When a user grips the stylus pen 10 and performs a touch input on the touch sensor 261, the user's hand 30 may be spaced apart from the conductive tip 11 of the stylus pen 10 and come into contact with the touch sensor 261. In this case, the user's hand 30 and the conductive tip 11 may be located together on the same touch electrode. For example, as shown in FIG. 18, the user's hand 30 comes into contact with an area where the second touch electrodes 121-4 are disposed within the touch sensor 261. That is, the user's hand 30 may form a capacitance with the second touch electrode 121-4.

Referring to FIG. 18, the touch electrodes of the touch sensor 261 may form capacitance with the conductive tip 11 of the stylus pen 10. For example, the second touch electrode 121-4 of the touch sensor 261 forms a capacitance Cx1 with the conductive tip 11 of the stylus pen 10, and the first touch electrode 111-2 of the touch sensor 261 and the first touch electrode 111-3 form a capacitance Cx2 and a capacitance Cx3 with the conductive tip 11 of the stylus pen 10, respectively. One end of the resonance circuit unit 12 of the stylus pen 10 is electrically connected to the second touch electrode 121-4 and the first touch electrodes 111-2, 111-3.

The touch electrodes of the touch sensor 261 may form capacitance with the user's hand 30. For example, the second touch electrode 121-4 of the touch sensor 261 forms a capacitance Cb1 with the user's hand 30, and the first touch electrode 111-8 forms a capacitance Cb2 with the user's hand 30.

Since the user's hand 30 is holding the stylus pen 10, that is, the ground unit 15 or the body portion 17 of the stylus pen 10, the user's hand 30 and the ground unit 15 of the stylus pen 10 are electrically conductive, or the user's hand 30 and the ground unit 15 of the stylus pen 10 form a capacitance Ccp through the body portion 17. That is, the other end of the resonance circuit unit 12 is electrically connected to the user's hand 30.

In addition, a capacitance Cpg is formed between the user's hand 30 and the ground of the touch sensor 261, and a capacitance Csg is also formed between the ground unit 25 of the stylus pen 10 and the ground of the touch sensor 261.

The driving signal applied to the touch electrode 121-4 is transmitted to the other end of the resonance circuit unit 12 through the capacitance Cb4 between the touch electrode 121-4 and the user's hand 30 and through the capacitance Ccp between the user's hand 30 and the ground unit 15 of the stylus pen 10.

As such, as the driving signal is applied to the ground unit 15, the ground unit 15 of the stylus pen 10 does not have an ideally stable ground state, and the voltage level changes according to the driving signal. On the other hand, the resonance circuit unit 12 accumulates energy required for resonance with the voltage difference between the ground unit 15 and the conductive tip 11, but when the potential of the ground unit 15 moves according to the driving signal, the voltage difference between the ground unit 15 and the conductive tip 11 is reduced, thereby the magnitude of the resonance signal is reduced.

Figure 19:
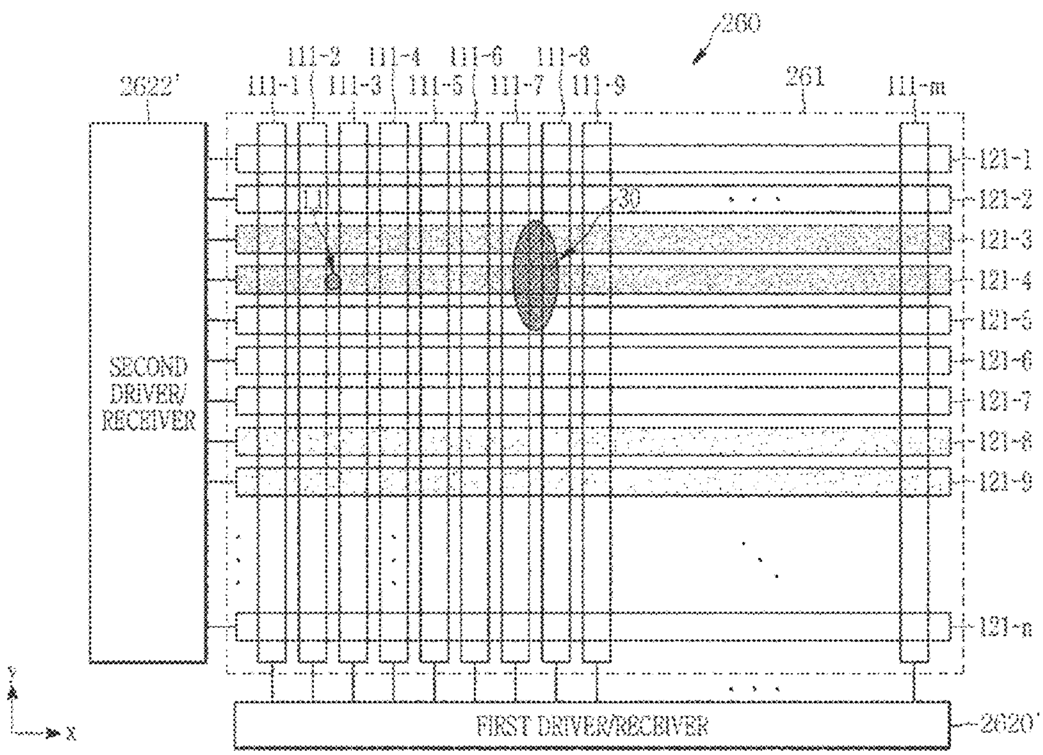
FIG. 19 is a diagram illustrating a driving signal application operation of the touch sensing unit 260 according to an embodiment.

FIG. 19 is a diagram illustrating a driving signal application operation of the touch sensing unit 260 according to an exemplary embodiment.

Referring to FIG. 19, when a user's hand 30 grips the stylus pen 10 and is positioned on the touch sensor 261, the conductive tip 11 of the stylus pen 10 may be positioned on the second touch electrode 121-4, and the user's hand 30 may also be positioned on the second touch electrode 121-4.

The second driving/receiving unit 2622 may apply the first driving signal to the second touch electrodes 121-4 where the stylus pen 10 and the hand 30 are located, and may apply a second driving signal having a phase difference of 180 degrees from the first driving signal to the second touch electrodes 121-8, 121-9 located adjacent to the second touch electrode 121-4.

In this case, through the capacitance Cb4 formed between the touch electrode 121-4 and the user's hand 30 and the capacitance Ccp formed between the user's hand 30 and the ground unit 25 of the stylus pen 10, a driving signal of the same phase as that of the conductive tip 11 is transmitted to the ground unit 15 of the stylus pen 10. Accordingly, the voltage difference driving the resonance circuit becomes significantly smaller than when there is no driving signal flowing into the hand 30. That is, when the driving signal is transmitted to the ground unit 15 of the stylus pen 10 through the hand 30, the voltage difference between both ends of the resonance circuit unit 12 is reduced, and accordingly, the energy that can be utilized for resonance will decrease.

A touch sensing unit according to embodiments of the present disclosure will be described with reference to FIGS. 20 to 24.

Figure 20:
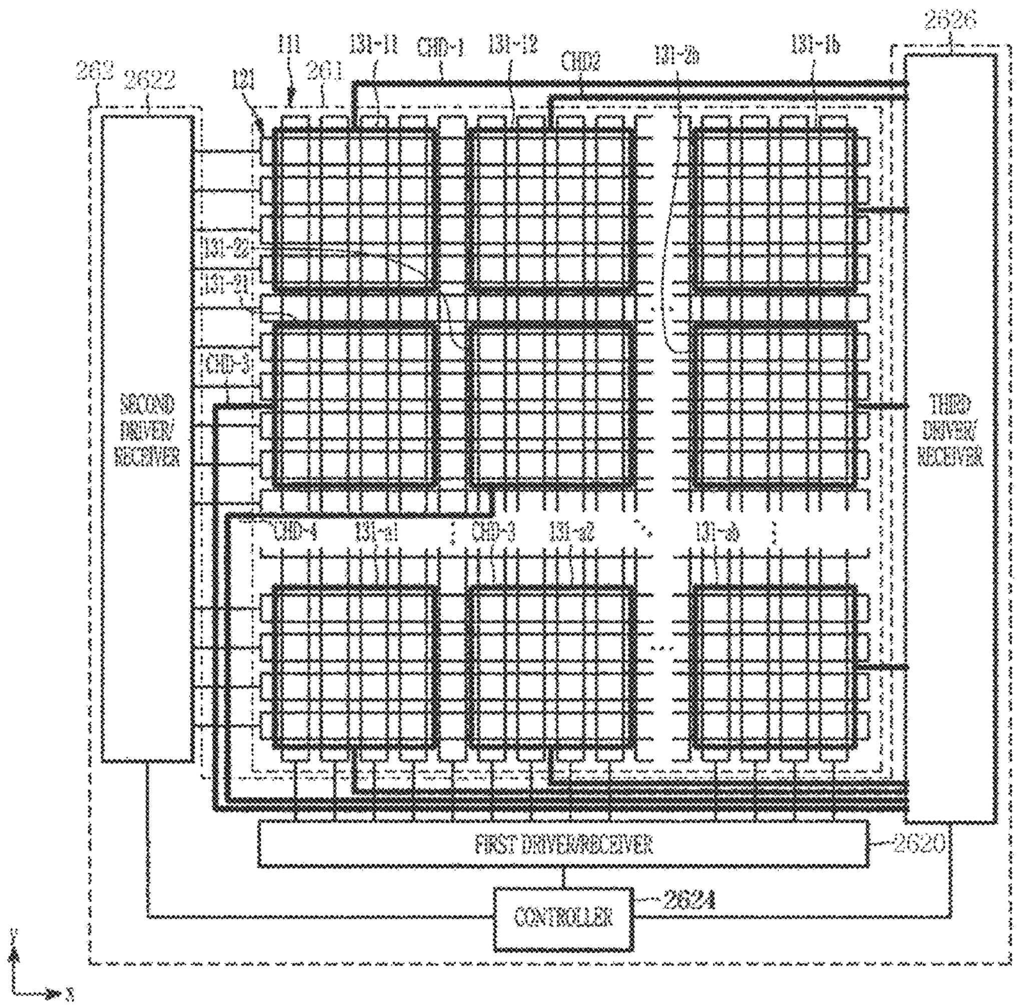
FIG. 20 is a diagram schematically illustrating a touch sensing unit according to an embodiment.

FIG. 20 is a diagram schematically illustrating a touch sensing unit according to an embodiment.

Referring to FIG. 20, the touch sensing unit 260' according to an exemplary embodiment includes a touch sensor 261 and a touch controller 262 for controlling the touch sensor 261. The touch controller 262 may include first to third driving/receiving units 2620, 2622, 2626 for transmitting and receiving signals to and from the touch sensor 261, and a control unit 2624.

The touch sensor 261 includes a plurality of first touch electrodes 111-1 to 111-*m* having a shape extending in a first direction, a plurality of second touch electrodes 111-1 to 111-*n* having a shape extending in a second direction crossing the first direction, and a plurality of third touch electrodes 131-11 to 131-*ab* arranged in a matrix. In the touch sensor 261, the plurality of first touch electrodes 111-1 to 111-*m* may be arranged along the second direction, and the plurality of second touch electrodes 121-1 to 121-*n* may be arranged along the first direction. The plurality of third touch electrodes 131-1 to 131-*ab* may be arranged in a dot matrix shape. One third touch electrode (e.g., 131-11) may be disposed to correspond to a plurality of intersection points where first touch electrodes (e.g., 111-1 to 111-4) adjacent to each other and second touch electrodes (e.g., 121-1 to 121-4) adjacent to each other intersect. The shape of the touch sensor 261 in FIG. 20 is illustrated as a rectangle, but is not limited thereto.

The plurality of first touch electrodes 111-1 to 111-*m* is connected to the first driving/receiving unit 2620, the plurality of second touch electrodes 121-1 to 121-*n* is connected to the second driving/receiving unit 2622, and the plurality of third touch electrodes 131-11 to 131-*ab* are connected to the third driving/receiving unit 2626. In FIG. 1, although the first driving/receiving unit 2620, the second driving/receiving unit 2622, the third driving/receiving unit 2626, and the control unit 2624 are illustrated separately, but they may be implemented as a module, a unit, or a chip, but are not limited thereto.

The first driving/receiving unit 2620 may apply a driving signal to the plurality of first touch electrodes 111-1 to 111-*m*. The first driving/receiving unit 2620 may also receive sensing signals from the plurality of first touch electrodes 111-1 to 111-*m*. Similarly, the second driving/receiving unit 2622 may apply a driving signal to the plurality of second touch electrodes 121-1 to 121-*n*. The second driving/receiving unit 2622 may also receive sensing signals from the plurality of second touch electrodes 121-1 to 121-*n*. Similarly, the third driving/receiving unit 2626 may apply a driving signal to the plurality of third touch electrodes 131-11 to 131-*ab*. The third driving/receiving unit 2626 may also receive sensing signals from the plurality of third touch electrodes 131-11 to 131-*ab*.

The first driving/receiving unit 2620, the second driving/receiving unit 2622, and the third driving/receiving unit 2626 may be a kind of transceiver that transmits and receives signals, and may include a driving unit that generates and outputs a driving signal and a receiving unit that receives a signal, respectively. However, each of the first driving/receiving unit 2620, the second driving/receiving unit 2622, and the third driving/receiving unit 2626 is either a driver only transmitting a signal, or a receiver only receiving a signal, but is not limited to the description above.

The driving signal may include a signal (e.g., a sine wave, a square wave, etc.) having a frequency corresponding to the resonance frequency of the stylus pen 10. The resonant frequency of the stylus pen 10 depends on a design value of the resonant circuit unit 23 of the stylus pen.

The touch sensing unit 260 may be used to sense a touch input (direct touch or proximity touch) by a touch object.

Figure 21:
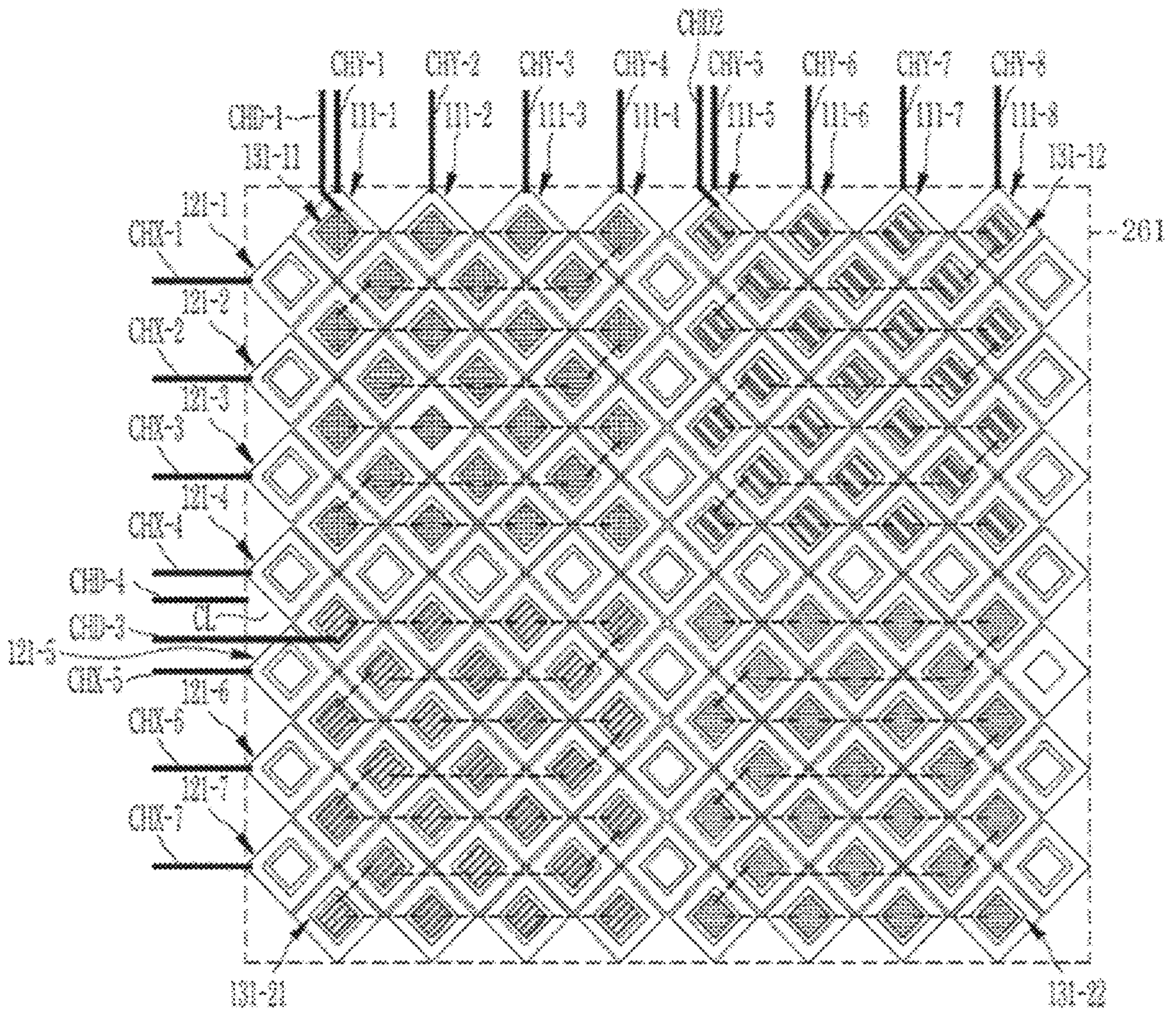
FIG. 21 is a plan view of a portion of the touch sensor 261 according to an embodiment.
Figure 22:
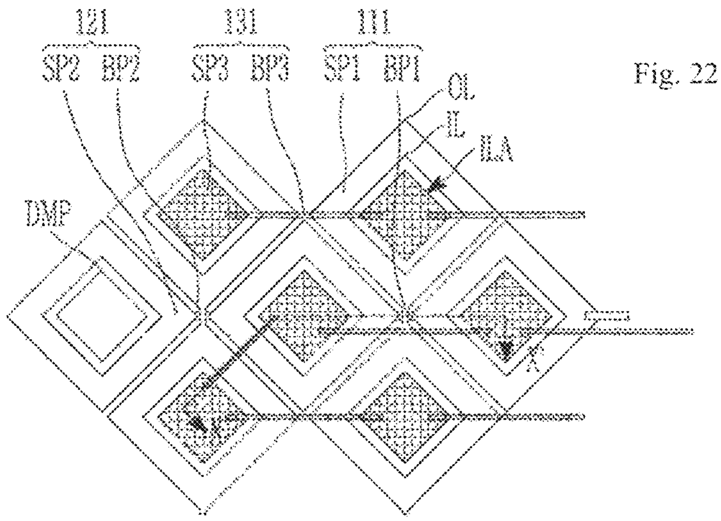
FIG. 22 is a plan view illustrating a part of FIG. 21 in detail.
Figure 23:
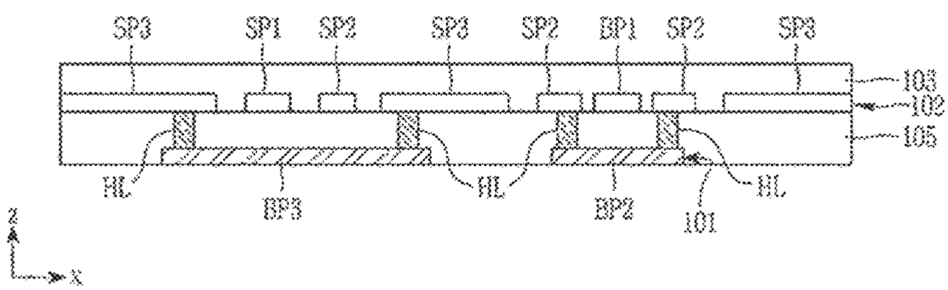
FIG. 23 is a cross-sectional view taken along the X-X' line of FIG. 22.
Figure 24:
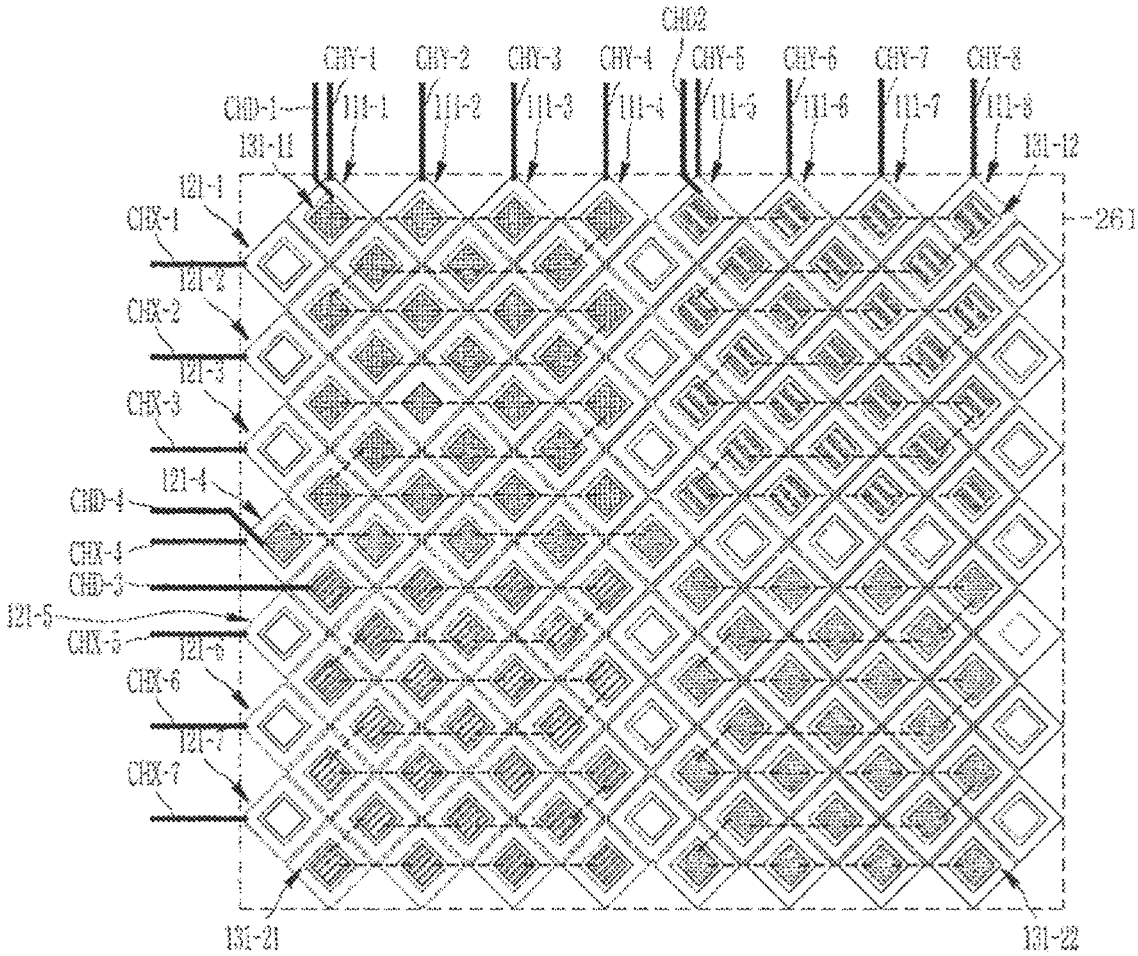
FIG. 24 is a plan view of a portion of the touch sensor 261 according to another embodiment.

FIG. 21 is a plan view of a part of the touch sensor 261 according to an embodiment, FIG. 22 is a plan view showing a part of FIG. 21 in detail, and FIG. 23 is a cross-sectional view taken along the line X-X' of FIG. 22, and FIG. 24 is a plan view of a part of the touch sensor 261 according to another embodiment.

Referring to FIG. 21 and FIG. 22 together, the touch sensor 261 may include first touch electrodes 111-1 to 111-8, second touch electrodes 121-1 to 121-7, third touch electrodes 131-11 to 131-22, first wirings CHY-1 to CHY-8, second wirings CHX-1 to CHX-7, third wirings CHD-1 to CHD-4, first pads PD1, and second pads PD2.

The first touch electrodes 111-1 to 111-8 may be arranged along a first direction X. Each of the first touch electrodes 111-1 to 111-8 may include a plurality of first sensor patterns SP1 arranged along a second direction Y, and first connection patterns BP1 electrically connecting the adjacent first sensor patterns SP1 to each other.

The second touch electrodes 121-1 to 121-7 may be arranged along the second direction Y. Each of the second touch electrodes 121-1 to 121-7 may include a plurality of second sensor patterns SP2 arranged along the first direction X and second connection patterns BP2 electrically connecting the adjacent second sensor patterns SP2 to each other.

Each of the first sensor patterns SP1 and the second sensor patterns SP2 may include an outer line OL and an inner line IL. On a plane, the inner line IL may be defined inside the outer line OL. The first sensor patterns SP1 and the second sensor patterns SP2 may not be disposed in the inner area ILA surrounded by the inner line IL on a plane.

The third touch electrodes 131-11 to 131-122 may be referred to as third sensor patterns SP3, self-capacitance sensor patterns SP3, or operation dummy patterns SP3. Each of the third touch electrodes 131-11 to 131-22 may include third connection patterns BP3 that electrically connect the plurality of third sensor patterns SP3 and the adjacent third sensor patterns SP3 to each other.

The third sensor patterns SP3 may be disposed in the inner region ILA on a plane view. The third sensor patterns SP3 may be insulated from the first sensor patterns SP1 and the second sensor patterns SP2. That is, openings are defined in each of the first and second sensor patterns SP1, SP2. The opening may correspond to the inner region ILA. Third sensor patterns SP3 or a dummy pattern DMP may be disposed in each of the openings.

In FIG. 22, the third sensor patterns SP3 may be disposed in the inner area ILA of some of the first sensor patterns SP1 and the second sensor patterns SP2. In this case, the dummy patterns DMP may be disposed in the inner area ILA of other portions of the first sensor patterns SP1 and the second sensor patterns SP2 in which the third sensor patterns SP3 are not disposed. In FIGS. 21 and 22, in order to distinguish between an area where the third sensor patterns SP3 are disposed and an area where the dummy patterns DMP are disposed, dots are marked at positions where the third sensor patterns SP3 are disposed. The dummy patterns DMP may be floating electrodes to which a separate electrical signal is not applied from the outside. Accordingly, separate signal lines connected to the dummy patterns DMP may be omitted. The dummy patterns DMP may be insulated from the first sensor patterns SP1, the second sensor patterns SP2, and the third sensor patterns SP3.

The first sensor patterns SP1 and the second sensor patterns SP2 may form mutual capacitance between each other and sense a touch applied from the outside. In addition, each of the third sensor patterns SP3 may sense an external touch through a change in self-capacitance.

According to an embodiment of the present invention, the touch sensor 261 may implement both a mutual capacitance type touch and a self capacitance type touch.

Each of the first sensor patterns SP1, the second sensor patterns SP2, the third sensor patterns SP3, the first connection patterns BP1, and the second connection patterns BP2 may include a transparent conductive oxide. For example, each of the first sensor patterns SP1, the second sensor patterns SP2, the third sensor patterns SP3, the first connection patterns BP1, and the second connection patterns BP2 may include at least one of indium zinc oxide (IZO), indium tin oxide (ITO), indium gallium oxide (IGO), indium zinc gallium oxide (IGZO), and mixtures/compounds thereof. However, the present invention is not limited thereto.

The first wires CHY-1 to CHY-8 may be connected to the first touch electrodes 111-1 to 111-8, and the second wires CHX-1 to CHX-7 may be the second touch electrodes 121-1 to 121-7, and the third wires CHD-1 to CHD-4 may be connected to the third touch electrodes 131-11 to 131-22.

The first wires CHY-1 to CHY-8 may be connected to each of the first sensor patterns SP1 disposed at the respective ends of the first touch electrodes 111-1 to 111-8 among the first touch electrodes 111-1 to 111-8.

The second wires CHX-1 to CHX-7 may be connected to each of the second sensor patterns SP2 disposed at the respective ends of the second touch electrodes 121-1 to 121-7 among the second touch electrodes 121-1 to 121-7, and the third wires CHD-1 to CHD-4 may be connected to the third touch electrodes 131-11 to 131-22 in a one-to-one correspondence.

Some CHD-4 of the third wires CHD-1 to CHD-4 may be connected to the third touch electrodes 131-22 located inside the touch sensor 261 through a connection line CL extending along the outer line OL. The connection line CL may be disposed between the outer lines OL of two adjacent sensor patterns, and minimize parasitic capacitance with the sensor patterns.

However, the present invention is not limited thereto. For example, a plurality of wires may be connected to each of the second touch electrodes 121-1 to 121-7, like the first touch electrodes 111-1 to 111-8. In addition, in another embodiment, wires may be connected to only one side of each of the first touch electrodes 111-1 to 111-8. A touch device according to an embodiment of the present invention may include signal wires and sensor electrodes having various connection relationships therewith, and it is not limited to a specific structure.

As shown in FIG. 24, some CHD-4 among the third wires CHD-1 to CHD-4 may be connected to the electrodes 131-22 positioned inside the touch sensor 261 through the dummy patterns DMP.

Each of the first wires CHY-1 to CHY-8, the second wires CHX-1 to CHX-7, and the third wires CHD-1 to CHD-4 may have a single-layered or multi-layered structure. In addition, each of the first wires CHY-1 to CHY-8, the second wires CHX-1 to CHX-7, and the third wires CHD-1 to CHD-4 may contain a transparent conductive oxide comprising at least one of indium zinc oxide (IZO), indium tin oxide (ITO), indium gallium oxide (IGO), indium zinc gallium oxide (IGZO), or mixtures/compounds thereof, or may contain molybdenum, silver, titanium, copper, aluminum, or alloys thereof.

The first wires CHY-1 to CHY-8, the second wires CHX-1 to CHX-7, and the third wires CHD-1 to CHD-4 are electrically connected to the first driving/receiving unit 2620, the second driving/receiving unit 2622, and the third driving/receiving unit 2626 that are provided outside the touch sensor 261, respectively.

Referring to FIG. 23, the touch sensor 261 includes a first conductive layer 101, an insulating layer 105, a second conductive layer 102, and a window 103.

Each of the first conductive layer 101 and the second conductive layer 102 may include a plurality of conductive patterns. The plurality of conductive patterns may include the first touch electrodes 111-1 to 111-8, the second touch electrodes 121-1 to 121-7, the third touch electrodes 131-11 to 131-22, the first wires CHY-1 to CHY-8, the second wires CHX-1 to CHX-7, and the third wires CHD-1 to CHD-4, as described in FIGS. 21 and 22. This will be described in detail below.

The insulating layer 105 is disposed between the first conductive layer 101 and the second conductive layer 102. The insulating layer 105 separates the first conductive layer 101 and the second conductive layer 102 to be spaced apart from each other in a cross section. That is, the first conductive layer 101 and the second conductive layer 102 may be electrically insulated by the insulating layer 105. A portion of the first conductive layer 101 and the second conductive layer 102 may be electrically connected through a contact hole penetrating the insulating layer 105. The insulating layer 105 may include an organic material and/or an inorganic material.

The window 103 covers the second conductive layer 102 and protects the second conductive layer 102. The window 103 may have insulating properties. The window 103 may include at least one inorganic layer and/or an organic layer. In some cases, the window 103 may be omitted.

The first touch electrodes 111-1 to 111-8 may include first sensor patterns SP1 disposed on the second conductive layer 102 and first connection patterns BP1 disposed on the second conductive layer 102.

The second touch electrodes 121-1 to 121-7 may include second sensor patterns SP2 disposed on the second conductive layer 102 and second connection patterns BP2 disposed on the first conductive layer 101. The second sensor patterns SP2 and the second connection patterns BP2 may pass through the contact hole HL to be electrically connected to each other.

The third touch electrodes 131-11 to 131-122 may include third sensor patterns SP3 disposed on the second conductive layer 102 and third connection patterns BP3 disposed on the first conductive layer 101. The third sensor patterns SP3 and the third connection patterns BP3 may be electrically connected to each other through the contact hole HL.

Figure 25:
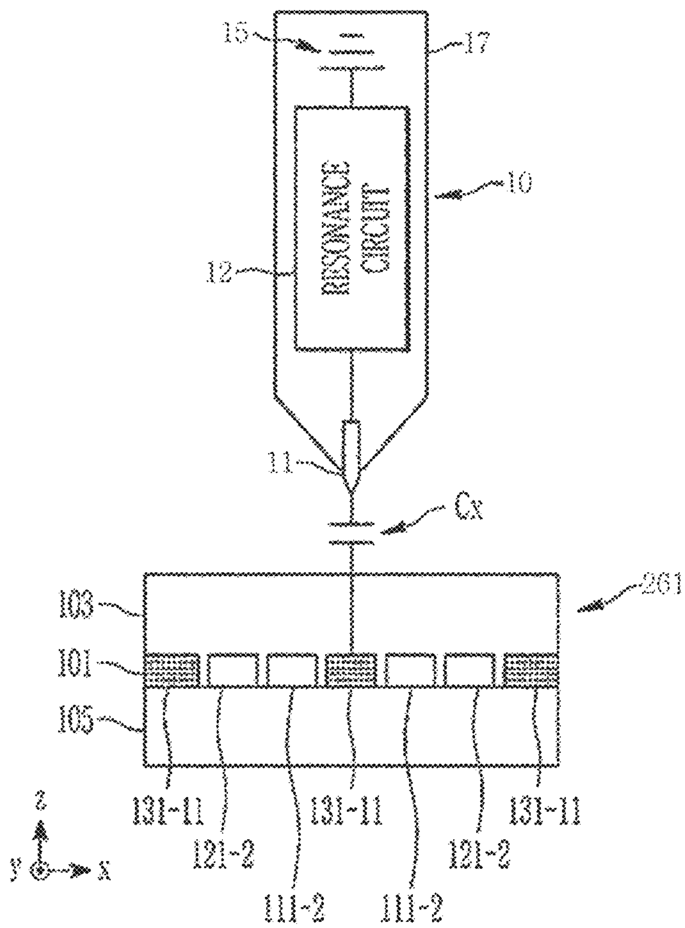
FIG. 25 is a view illustrating an example in which a stylus pen is close to the touch sensing unit of FIG. 20.

FIG. 25 is a view illustrating an example in which a stylus pen is close to the touch sensing unit of FIG. 20.

The stylus pen 10 may include a conductive tip 11, a resonance circuit unit 12, a ground 15, and a body 17. A touch input of the stylus pen 10 close to the touch sensor 261 may be sensed by the touch sensing unit 260.

At least a portion of the conductive tip 11 is formed of a conductive material (e.g., metal, conductive rubber, conductive fabric, conductive silicone, etc.), and may be electrically connected to the resonant circuit unit 12.

The resonance circuit unit 12 is an LC resonance circuit, and may resonate with a driving signal applied to at least one type of electrodes among the plurality of first touch electrodes 111-1 to 111-*m* and the plurality of second touch electrodes 121-1 to 121-*n* from at least one of the first driving/receiving unit 2620 and the second driving/receiving unit 2622 through the conductive tip 11.

The resonance signal generated by the resonance circuit unit 12 resonating with the driving signal may be output to the touch sensor 261 through the conductive tip 11. A resonance signal due to resonance of the resonance circuit unit 12 may be transmitted to the conductive tip 11 in the period in which the driving signal is applied to at least one type of electrodes among the plurality of first touch electrodes 111-1 to 111-*m*, the plurality of second touch electrodes 121-1 to 121-*n*, and the plurality of third touch electrodes 131-11 to 131-*ab*, and in a period thereafter. The resonance circuit unit 12 may be located in the body 17, and may be electrically connected to the ground 15.

The stylus pen 10 of this type may respond to a driving signal applied to at least one of the touch electrodes 111-1 to 111-*m*, 121-1 to 121-*n*, and 131-11 to 131-*ab*, and may generate a resonance signal, thereby causing to generate a touch input.

The capacitance Cx is formed by at least one of the touch electrodes 111-1 to 111-*m*, 121-1 to 121-*n*, and 131-11 to 131-*ab* and the conductive tip 11 of the stylus pen 10. The driving signal may be transmitted to the stylus pen 10 through the capacitance Cx between at least one of the touch electrodes 111-1 to 111-*m*, 121-1 to 121-*n*, and 131-11 to 131-*ab*, and the conductive tip 11, and the resonance signal may be transmitted to the touch sensor 261.

The touch sensing unit 260 may detect a touch by a touch object other than the stylus pen 10 using the method of generating the resonance signal described above (e.g., a user's body part (finger, palm, etc.), or passive or active type stylus pen), but it is not limited thereto.

For example, the touch sensing unit 260 detects a touch by the stylus pen that receives an electrical signal and outputs it as a magnetic field signal. For example, the touch sensing unit 260 may further include a digitizer. A touch may be detected by the digitizer in the manner that a magnetic field signal electromagnetically resonant (or electromagnetically induced) by the stylus pen is detected by the digitizer. Alternatively, the touch sensing unit 260 detects a touch by the stylus pen that receives a magnetic field signal and outputs it as a resonant magnetic field signal. For example, the touch sensing unit 260 may further include a coil for applying a current as a driving signal, and a digitizer. The stylus pen resonates with the magnetic field signal generated by the current applied coil. A touch may be detected by the stylus pen in the manner that an electromagnetic resonance (or electromagnetic induction) magnetic field signal is detected by the digitizer. The touch sensing unit 260 detects a touch by the stylus pen that receives a magnetic field signal and outputs a predetermined signal. Here, the predetermined signal output from the stylus pen may be different from a signal resonant in the resonance circuit unit inside the stylus pen. For example, the predetermined signal may be a signal output from an active circuit unit inside the stylus pen. The active circuit unit may receive power from a battery charged by the resonance signal, and may output the predetermined signal.

The control unit 2624 may control driving of the touch sensing unit 260, and may output touch coordinate information in response to the touch sensing result of the touch sensing unit 260.

The touch sensing unit 260 including the antenna module according to the present disclosure will be described with reference to FIG. 26.

Figure 26:
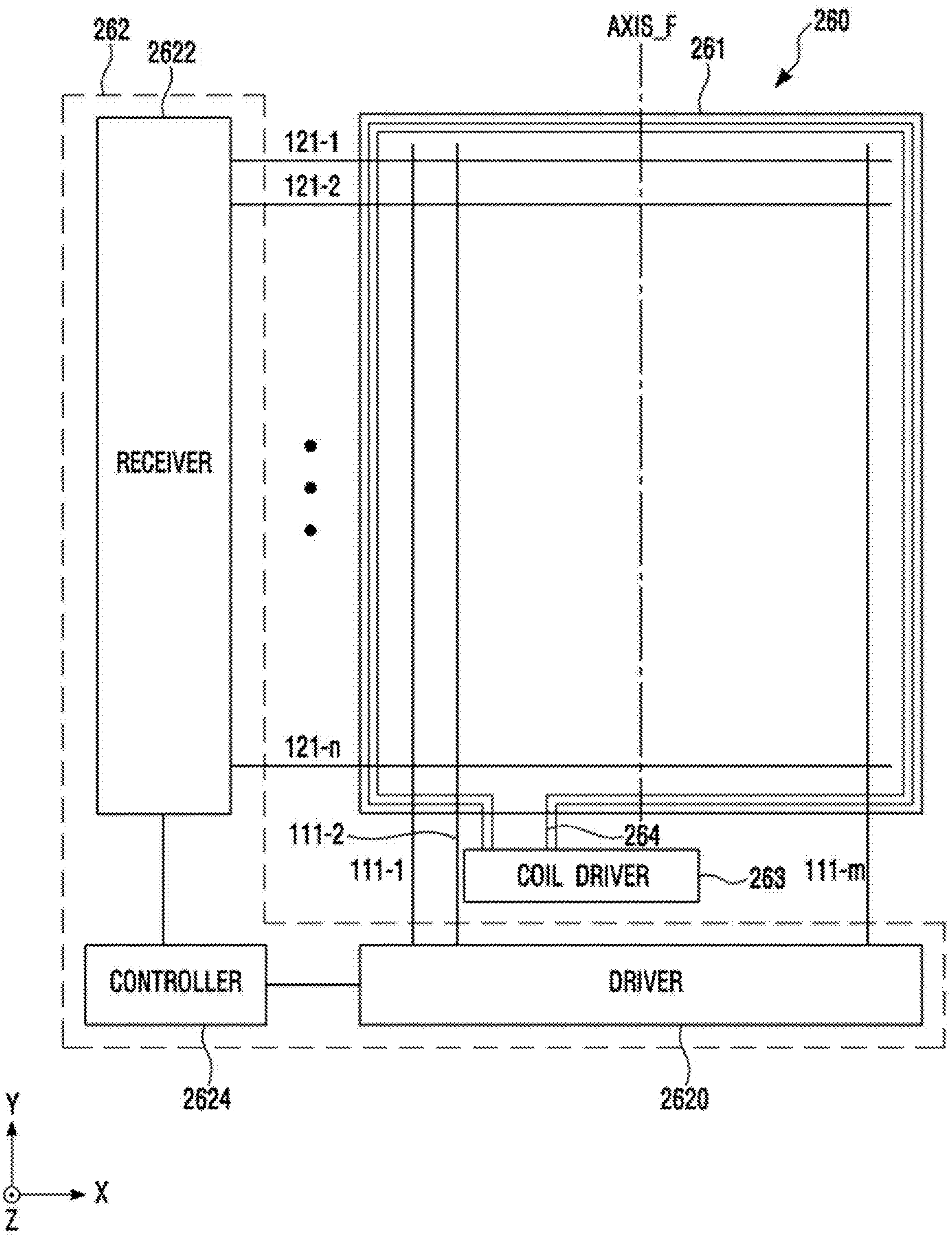
FIG. 26 is a diagram schematically illustrating a part of a touch sensing unit according to an embodiment.

FIG. 26 is a diagram schematically illustrating a part of the touch sensing unit according to an exemplary embodiment.

The touch sensing unit 260 according to an embodiment includes a touch sensor 261, a loop coil 264, a coil driver 263 for driving the loop coil 264, and a touch controller 262 for controlling the touch sensor 261. The touch controller 262 may include a driving unit 2620 and a receiving unit 2622 that transmit/receive signals to and from the touch sensor 261, and a control unit 2624. In addition, although separately illustrated in the drawing, the touch controller 262 may further include a coil driver 263 for applying a driving signal to the loop coil 264.

The touch sensor 261 may include a plurality of first touch electrodes 111-1 to 111-*m* for detecting touch coordinates in a first direction, and a plurality of second touch electrodes 121-1 to 121-*n* for detecting touch coordinates in a second direction crossing the first direction. For example, the plurality of first touch electrodes 111-1 to 111-*m* may have a shape extending in the second direction, and the plurality of second touch electrodes 121-1 to 121-*n* may have a shape extending in the first direction. In the touch sensor 261, the plurality of first touch electrodes 111-1 to 111-*m* may be arranged along the first direction, and the plurality of second touch electrodes 121-1 to 121-*n* may be arranged along the second direction.

The driving unit 2620 may apply a driving signal to the plurality of first touch electrodes 111-1 to 111-*m*. The receiving unit 2622 may receive a sensing signal from the plurality of second touch electrodes 121-1 to 121-*n*.

Although it has been described above that the touch sensor 261 is implemented in a mutual capacitance method, the touch sensor 261 may be implemented in a self-capacitance method, and the touch electrodes 111-1 to 111-*m*,

121-1 to 121-*n* in the mutual capacitance method, the driving unit 2620, and the receiving unit 2622 may be appropriately modified, added new components, or omitted some components in order to adapt to the self-capacitance method. This will be easily implemented by a person skilled in the art.

Figure 27:
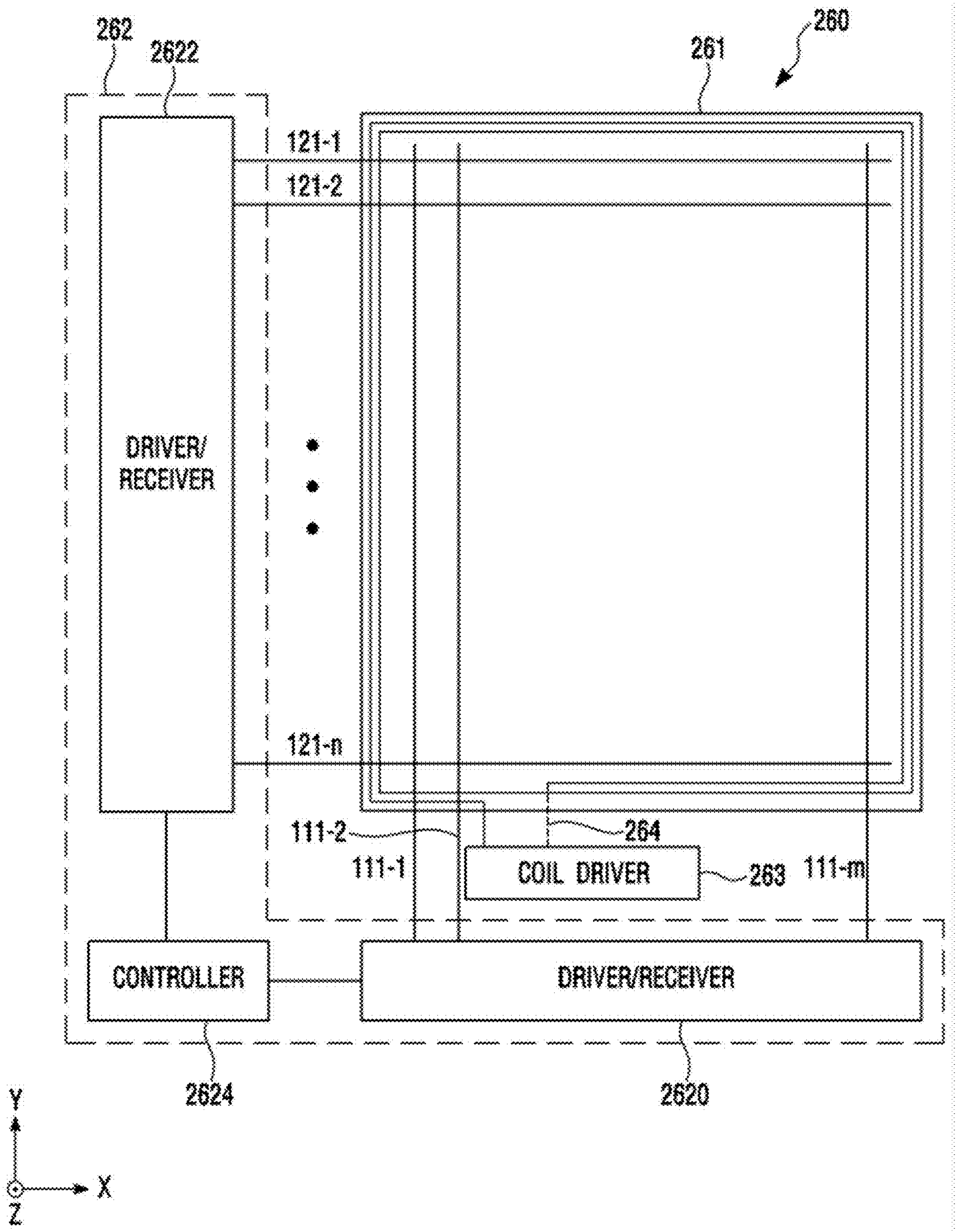
FIG. 27 is a diagram schematically illustrating a part of the touch sensing unit 260 according to an embodiment.

FIG. 27 is a diagram schematically illustrating a part of the touch sensing unit 260 according to an exemplary embodiment.

The touch sensing unit 260 according to an embodiment includes a touch sensor 261, a loop coil 264, a coil driver 263 for driving the loop coil 264, and a touch controller 262 for controlling the touch sensor 261. The touch controller 262 may include a driving/receiving unit 2620 that transmits/receives signals to and from the touch sensor 261, a driving/receiving unit 2622, and a control unit 2624. In addition, the touch controller 262 may further include a coil driver 263 that applies a driving signal to the loop coil 264.

The touch sensor 261 may include a plurality of first touch electrodes 111-1 to 111-*m* for detecting touch coordinates in a first direction, and a plurality of second touch electrodes 121-1 to 121-*n* for detecting touch coordinates in a second direction crossing the first direction. For example, the plurality of first touch electrodes 111-1 to 111-*m* may have a shape extending in the second direction, and the plurality of second touch electrodes 121-1 to 121-*n* may have a shape extending in the first direction. In the touch sensor 261, the plurality of first touch electrodes 111-1 to 111-*m* may be arranged along the first direction, and the plurality of second touch electrodes 121-1 to 121-*n* may be arranged along the second direction.

The driving/receiving unit 2620 may apply a driving signal to at least one of the first touch electrodes 111-1 to 111-*m*, and may receive a sensing signal from the at least one of the first touch electrodes 111-1 to 111-*m*. The driving/receiving unit 2622 may apply a driving signal to at least one of the second touch electrodes 121-1 to 121-*n*, and may receive a sensing signal to the at least one of the second touch electrodes 121-1 to 121-*n*.

Although it has been described above that the touch sensor 261 is implemented in a mutual capacitance method, the touch sensor 261 may be implemented in a self-capacitance method, and the touch electrodes 111-1 to 111-*m*, 121-1 to 121-*n* in the mutual capacitance method, the driving unit 2620, and the receiving unit 2622 may be appropriately modified, added new components, or omitted some components in order to adapt to the self-capacitance method. This will be easily implemented by a person skilled in the art.

In addition, the driving/receiving unit 2620 may be connected to at least one of the first touch electrodes and the second touch electrodes, and may apply a driving signal. The driving/receiving unit 2622 may be connected to at least one of the first touch electrodes and the second touch electrodes, and may receive a sensing signal.

The coil driver 263 applies a driving signal to the loop coil 264. The driving signal may include a signal (e.g., a sine wave, a square wave, etc.) having a frequency corresponding to the resonance frequency of the resonance circuit unit 12, and may be an AC voltage or an AC current having a predetermined frequency. The frequency and magnitude of the driving signal may be changed according to the control of the controller 2624.

The control unit 2624 may receive a sensor input from the stylus pen 10 by demodulating the touch signal received from the driving/receiving unit 2620 and the driving/receiving unit 2622.

In addition, the control unit 2624 may modulate the driving signal applied to the loop coil 264 so that the frequency of the resonance signal of the stylus pen 10 may be changed. Here, the demodulation method of the touch signal and the modulation method of the frequency change request driving signal in the control unit 2624 may be performed in a manner such as OOK (On/Off Keying), ASK (Amplitude Shift Keying), or FSK (Frequency Shift Keying). Similarly, the modulation method of the touch signal and the demodulation method of the frequency change request driving signal in the stylus pen 10 may be performed in a manner such as On/Off Keying (OOK), or Amplitude Shift Keying (ASK).

The touch sensing unit 260 of the electronic device 2' shown in FIG. 1B will be described with reference to FIG. 28.

Figure 28:
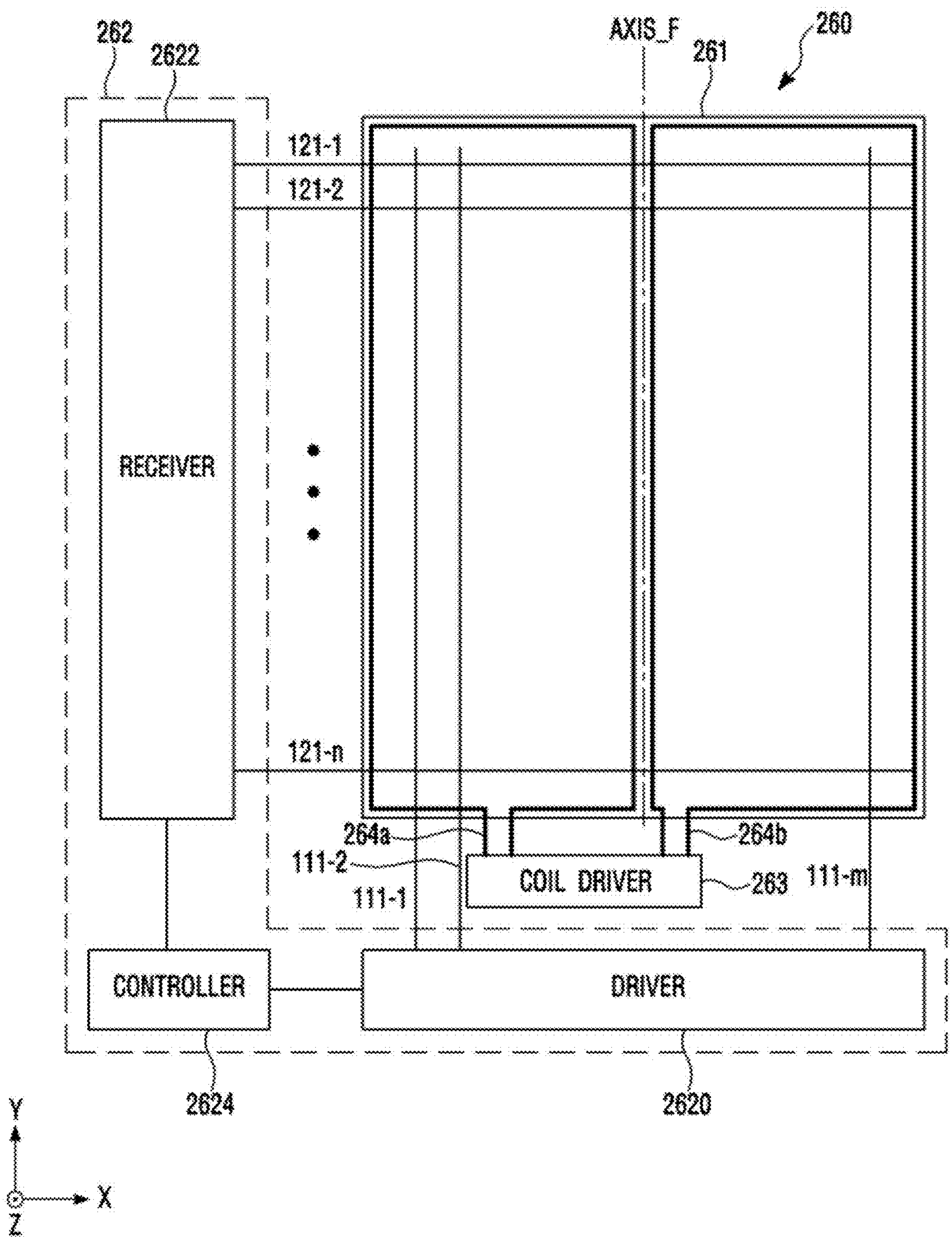
FIG. 28 is a diagram schematically illustrating a part of the touch sensing unit 260 according to an embodiment.

FIG. 28 is a diagram schematically illustrating a part of the touch sensing unit 260 according to an exemplary embodiment. The touch sensing unit 260 shown in FIG. 28 includes a plurality of loop coils 264*a*, 264*b*, and the plurality of loop coils 264*a*, 264*b* are respectively located in areas other than the folding area FA including the axis AXIS_F, in comparison with the touch sensing unit 260 described with reference to FIG. 26. Since the touch sensing unit 260 shown in FIG. 28 is the same except for those enumerated above, detailed descriptions of other components therein will be omitted.

The first loop coil 264*a* is located on the left side of the folding axis AXIS_F, and the second loop coil 264*b* is located on the right side of the folding axis AXIS_F. The first and second loop coils 264*a*, 264*b* are connected to the coil driver 263.

The coil driver 263 applies a driving signal to each of the first and second loop coils 264*a*, 264*b*. The coil driver 263 may differently apply driving signals using the position of the stylus pen 10 on the touch screen 20. This will be described later with reference to the drawings.

Meanwhile, although two loop coils are illustrated in FIG. 28, the number of loop coils may be further increased according to the number of folding areas. For example, if there are two folding areas, there may be three loop coils, and if there are three folding areas, there may be four loop coils. As such, the number of loop coils may have the number obtained by adding one to the number of folding areas.

Hereinafter, the stylus pen 10 shown in FIG. 1 will be described.

Figure 29A:
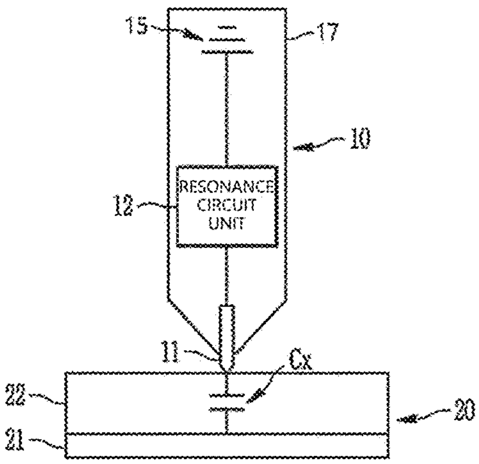
FIGS. 29A and 29B are diagrams illustrating the operation of the stylus pen 10 according to the embodiment and the touch screen 20 according to two embodiments.
Figure 29B:
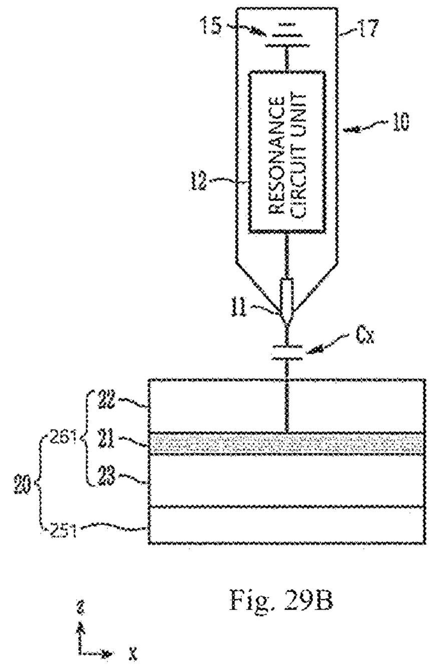

FIGS. 29A and 29B are diagrams illustrating the operations of the stylus pen 10 according to an embodiment and the touch screen 20 according to two embodiments.

Referring to FIG. 29A and FIG. 29B, the stylus pen 10 may include a conductive tip 11, a resonance circuit unit 12, a ground unit 15, and a housing 17 (e.g., case, frame, cover, etc.).

The conductive tip 11 is electrically connected to the resonant circuit unit 12. At least a portion thereof may be formed of a conductive material (e.g., metal, conductive rubber, conductive fabric, conductive silicone, etc.), but it is not limited thereto. In addition, the conductive tip 11 may have a form in which a portion of the conductive tip 11 is exposed to the outside of the housing while being present inside the non-conductive housing, but it is not limited thereto.

At least a portion of the conductive tip 11 is formed of a conductive material (e.g., metal, conductive rubber, conductive fabric, conductive silicone, etc.), and may be electrically connected to the resonant circuit unit 12.

The resonance circuit unit 12 is an LC resonance circuit, and may resonate with a driving signal output from the touch screen 20. The resonance circuit unit 12 is an LC resonance circuit, and may resonate with a driving signal applied to at least one type of electrodes among a plurality of first touch electrodes 111-1 to 111-*m* and a plurality of second touch electrodes 121-1 to 121-*n* from at least one of the first driving/receiving unit 2620 and the second driving/receiving unit 2622 through the conductive tip 11. Here, the driving signal may be a Tx signal transmitted to the touch electrodes (channel). The driving signal may include a signal (e.g., a sine wave, a square wave, etc.) having a frequency corresponding to the resonance frequency of the resonance circuit unit 12. The resonance frequency of the stylus pen 10 depends on a design value of the resonance circuit unit 12 of the stylus pen 10. For resonance, the resonance frequency of the resonance circuit unit 12 and the frequency of the driving signal should be the same or very similar. When the touch electrodes 21 generate an electric field by the driving signal, the resonance circuit 12 of the stylus pen 10 resonates using the signal received through the change of the electric field.

The housing 17 may accommodate the elements of the stylus pen 10. The housing 17 may have a cylindrical pillar shape, a polygonal pillar shape, a pillar shape with at least a portion thereof a curved surface, an entasis shape, a frustum of pyramid shape, a circular truncated cone shape, etc., and the shape thereof is not limited hereto. Since the housing 17 has an empty interior, the conductive tip 11, the resonance circuit unit 12, and the ground unit 15 may be accommodated therein. The housing 17 may be made of a non-conductive material.

The resonance signal generated by the resonance circuit unit 12 resonating with the driving signal may be output to the touch screen 20 through the conductive tip 11. During a period in which a driving signal is input to the touch electrode 21 and a period thereafter, a resonance signal due to resonance may be output to the touch screen 20 through the conductive tip 11. The resonance circuit unit 12 is located in the housing 17, and is electrically connected to the ground unit 15. The ground unit 18 may be grounded by a user's body in contact with the outer surface of the housing 17.

Hereinafter, stylus pens 10 according to various embodiments will be described with reference to FIGS. 30A to 30E.

FIGS. 30A to 30E are a view illustrating a stylus pen according to various embodiments. The stylus pens 10*a*, 10*b*, 10*c*, 10*d*, and 10*e* include a conductive tip 11 and a resonant circuit unit 12 in common.

Figure 30A:
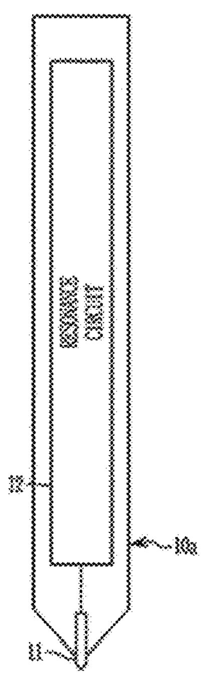
FIGS. 30A to 30E are a diagram illustrating a stylus pen according to various embodiments.

Specifically, the stylus pen 10*a* in FIG. 30A includes a conductive tip 11 and a resonance circuit unit 12 connected to the conductive tip 11.

Figure 30B:
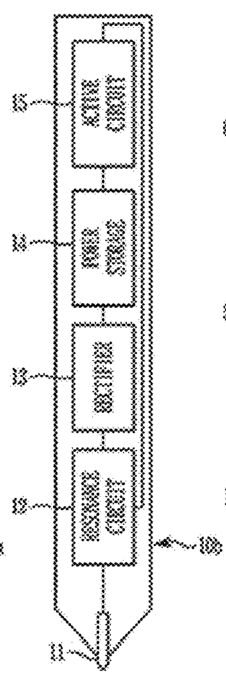

The stylus pen 10*b* in FIG. 30B includes a conductive tip 11, a resonance circuit unit 12 connected to the conductive tip 11, a rectifier 13 connected to the resonance circuit unit 12, a power storage 14 connected to the rectifier 13, and an active circuit unit 15 connected to the power storage 14. The active circuit unit 15 is connected to the resonant circuit unit 12.

Figure 30C:
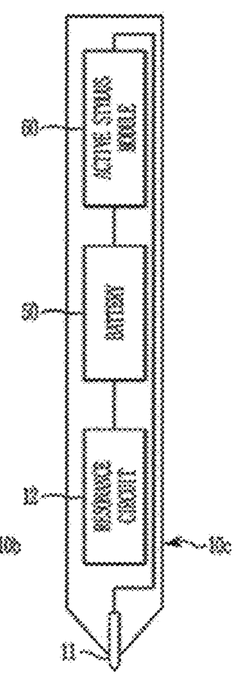

The stylus pen 10*c* in FIG. 30C includes a conductive tip 11, a resonance circuit unit 12, a battery 50 connected to the resonance circuit unit 12, and an active stylus module 60 connected to the battery 50. The active stylus module 60 is connected to the conductive tip 11.

Figure 30D:
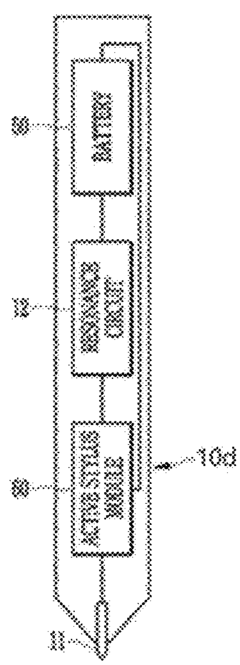

The stylus pen 10*d* in FIG. 30D includes a conductive tip 11, an active stylus module 60 connected to the conductive tip 11, a resonance circuit unit 12 connected to the active stylus module 60, a battery 50 connected to the resonance circuit unit 12. The battery 50 and the active stylus module 60 are connected to each other.

Figure 30E:
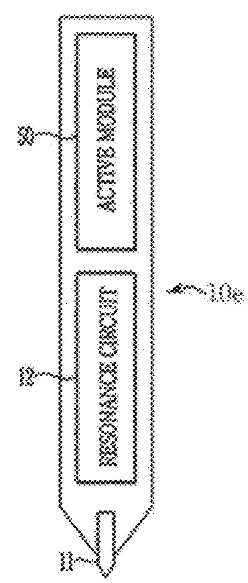

The stylus pen 10*e* in FIG. 30E includes a conductive tip 11, a resonance circuit unit 12, and an active module 50. In addition, the stylus pens 10*a*, 10*b*, 10*c*, 10*d*, and 10*e* may further include a sensor and/or a communication module to be described later.

At least a portion of the conductive tip 11 may be formed of a conductive material (e.g., metal, conductive rubber, conductive fabric, conductive silicone, etc.), but it is not limited thereto. The resonance circuit unit 12 is an LC resonance circuit and may resonate with a driving signal output from the loop coil 264. The resonance circuit unit 12 is an LC resonance circuit and may resonate with a driving signal output from the touch screen 20. The driving signal may include a signal (e.g., a sine wave, a square wave, etc.) having a frequency corresponding to the resonance frequency of the resonance circuit unit 12. Each resonant frequency of the stylus pens 10*a*, 10*b*, 10*c*, 10*d*, and 10*e* depends on the design value of the resonant circuit unit 12 of each of the stylus pens 10*a*, 10*b*, 10*c*, 10*d*, and 10*e*. For resonance, the resonance frequency of the resonance circuit unit 12 and the frequency of the driving signal should be the same or very similar. When the loop coil 264 generates a magnetic field by a driving signal or the touch sensor 261 generates an electric field by a driving signal, the resonance circuit unit 12 of the stylus pens 10*a*, 10*b*, 10*c*, 10*d*, 10*e* resonates using a signal received through a change in a magnetic field and/or an electric field.

The elements of the stylus pens 10*a*, 10*b*, 10*c*, 10*d*, 10*e* may be accommodated in the housing. The housing may have a cylinder shape, a polygonal pillar shape, a pillar shape at least partially curved, an entasis shape, a frustum of pyramid shape, a circular truncated cone shape, etc., but the shape of the housing is not limited thereto. Since the housing has an empty interior, the elements of the stylus pens 10*a*, 10*b*, 10*c*, 10*d*, 10*e*, such as the conductive tip 11 and the resonance circuit unit 12 can be accommodated therein. Such a housing may be made of a non-conductive material.

The stylus pen 10*a* illustrated in FIG. 30A may include a conductive tip 11 and a resonance circuit unit 12 directly connected to the conductive tip 11. The resonant circuit unit 12 resonates using energy transmitted from the loop coil 264, and the resonant energy is directly output through the conductive tip 11.

During the period in which the driving signal is input to the loop coil 264 and the period thereafter, a resonance signal due to resonance may be output to the touch screen 20 through the conductive tip 11. The resonant circuit unit 12 is located in the housing and is electrically connected to the ground unit. The electronic device 2 may be used to sense a touch input (direct touch or proximity touch) by a touch object. As shown in FIG. 29, a touch input of the stylus pen 10 proximate to the touch sensor 261 may be sensed by the electronic device 2.

The stylus pen 10*b* shown in FIG. 30B includes a conductive tip 11, a resonant circuit unit 12, a rectifier 13, a power storage 14, and an active circuit unit 15. In addition, the stylus pen 10 may further include a sensor (not shown therein) and/or a communication module (not shown therein). The resonant circuit unit 12 resonates using energy transmitted from the loop coil 264, and the resonant energy is transmitted to the active module 50. The resonant circuit unit 12 resonates using energy transferred from the loop coil 264, and the resonant energy is rectified in the rectifier 13 and can be used to charge the power storage 14. The power storage 14 includes a rechargeable battery or a capacitor such as an electric double layered capacitor (EDLC).

The active circuit unit 15 of the stylus pen 10*b* shown in FIG. 30B may receive power from the power storage 14, and may change the magnitude, frequency, phase, etc. of the resonance signal transmitted to the touch screen 20. In addition, the active circuit unit 15 may transmit an additional signal other than the touch input to the short-range communication module 212 of the electronic device 2. The active module 50 may also transmit an additional signal other than the touch input to the short-range communication module 212 of the electronic device 2.

The active module 50 of the stylus pen 10*e* shown in FIG. 30E may rectify the resonant energy and store it. In order to store power, the active module 50 may include a rechargeable battery or a capacitor such as an electric double layered capacitor (EDLC). Additionally, the active module 50 may further include a DC/DC converter, etc.

The active module 50 may include a sensor, a communication unit, and the like. For example, the sensor may include at least one of a pen pressure sensor for obtaining a change in pressure according to the pressure of the pen tip 11, an acceleration sensor for obtaining a change in inclination of the stylus pen 10, a mechanical input means (alternatively, a mechanical key, for example, a button located on the back or side of the stylus pen 10, a dome switch, a jog wheel, a jog switch, etc.), a proximity sensor, an illumination sensor, a touch sensor, a magnetic sensor, a gyroscope sensor, a motion sensor, a RGB sensor, an infrared sensor (IR sensor), a fingerprint sensor (finger scan sensor), an optical sensor (e.g., camera), a microphone, a battery gauge, an environmental sensor (e.g., barometer, hygrometer, thermometer, radiation sensor, thermal sensor, gas detection sensor, etc.), and a chemical sensor (e.g., electronic nose, healthcare sensor, biometric sensor, etc.).

The communication unit may perform short-range wireless communication using at least one of Bluetooth, RFID (Radio Frequency Identification), IrDA (Infrared Data Association), UWB (Ultra Wideband), ZigBee, NFC (Near Field Communication), Wi-Fi (Wireless-Fidelity), Wi-Fi Direct and Wireless USB (Universal Serial Bus) technologies. The short-range communication method of the communication unit may be a short-range communication protocol other than the communication protocols described above, and is not limited to the above description.

The stylus pen 10*c* shown in FIGS. 30C and 30D may include a conductive tip 11, a resonant circuit unit 12, a battery 50 connected to the resonant circuit unit 12 to store power, and an active stylus module 60 connected to the conductive tip 11. The resonant circuit unit 12 resonates using energy transmitted from the loop coil 264, and the resonant energy may be used to charge the battery 50. The active stylus module 60 may receive power from the battery 50 and transmit a signal to the touch screen 20. The active module 50 may transmit an electromagnetic signal to the touch screen 20 using stored power, energy transmitted to the resonance circuit unit 12, and the like. The active stylus module 60 may include an oscillator and the like, and may transmit an electrical signal oscillating at a predetermined frequency generated by the oscillator to the touch screen 20.

A stylus pen, an electronic device, and an input system including the same according to an embodiment will be described with reference to FIGS. 31 to 35.

Figure 31:
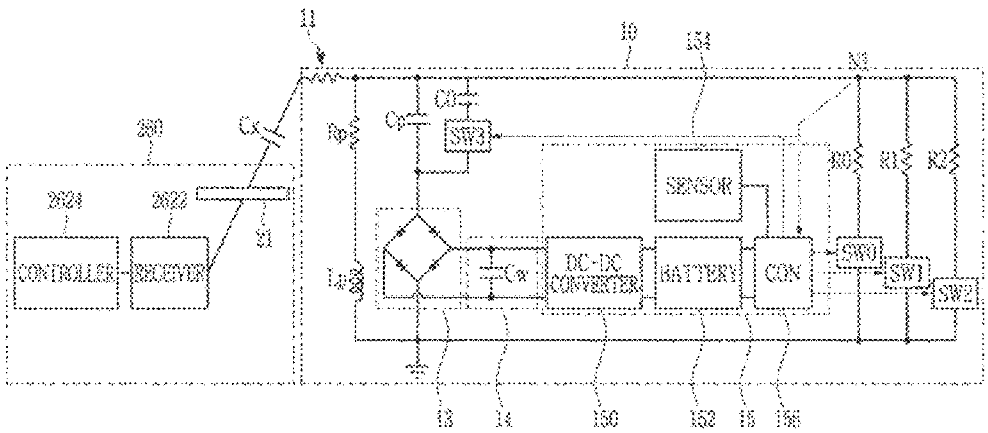
FIG. 31 is a diagram illustrating a part of a stylus pen and an electronic device according to an embodiment.

FIG. 31 is a diagram illustrating a part of a stylus pen and an electronic device according to an embodiment. Hereinafter, descriptions of the same components as those described above will be omitted.

The active circuit unit 15 may include a DC/DC converter 150, a battery 152, a sensor 154, and a controller 156. Here, the DC/DC converter 150 and the battery 152 may not be included depending on a design thereof.

The DC/DC converter 150 may boost or down-convert the power stored in the power storage 14 to supply an appropriate charging voltage to the battery 152. When the battery 152 is not included in the active circuit unit 15, the DC/DC converter 150 may supply the converted voltage as the operating voltage of the controller 156.

The battery 152 may be charged with a voltage supplied from the DC/DC converter 150, and the charged voltage may be supplied as an operating voltage of the controller 156. When the DC/DC converter 150 is not included in the active circuit unit 15, the battery 152 functions as the charge storage 14.

The sensor may include at least one of a pen pressure sensor for obtaining a change in pressure according to the pressure of the pen tip 11, an acceleration sensor for obtaining a change in inclination of the stylus pen 10, a mechanical input means (alternatively, a mechanical key, for example, a button located on the back or side of the stylus pen 10, a dome switch, a jog wheel, a jog switch, etc.), a proximity sensor, an illumination sensor, a touch sensor, a magnetic sensor, a gyroscope sensor, a motion sensor, a RGB sensor, an infrared sensor (IR sensor), a fingerprint sensor (finger scan sensor), an optical sensor (e.g., camera), a microphone, a battery gauge, an environmental sensor (e.g., barometer, hygrometer, thermometer, radiation sensor, thermal sensor, gas detection sensor, etc.), and a chemical sensor (e.g., electronic nose, healthcare sensor, biometric sensor, etc.).

The controller 156 controls the overall operation of the stylus pen 10.

The controller 156 may transmit the sensor input to the electronic device 2 by controlling the magnitude of the resonance signal according to the input from the sensor 154. The controller 154 may modulate a sensor input value in an OOK method or an ASK method by controlling on/off of the switches SW0, SW1, SW2 according to an input value from the sensor. In FIG. 31, a total of three resistors are connected in parallel to represent 4 bits, but more or fewer resistors may be included. In this regard, it will be described with reference to FIGS. 32 and 33 together.

Figure 32:
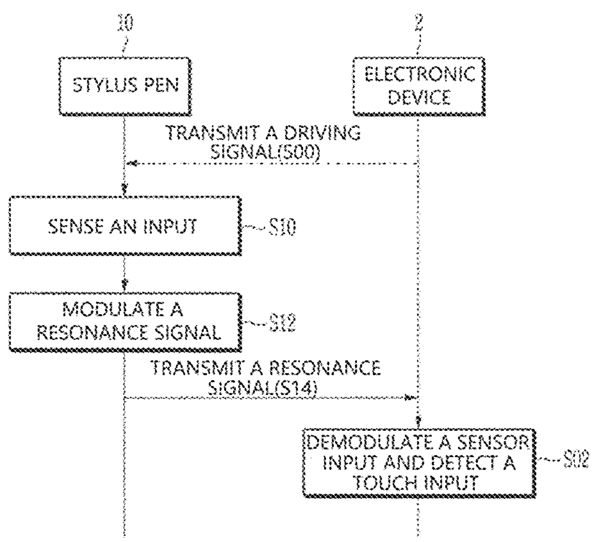
FIG. 32 is a flowchart illustrating a sensor input operation of a stylus pen and an electronic device according to an embodiment.
Figure 33:
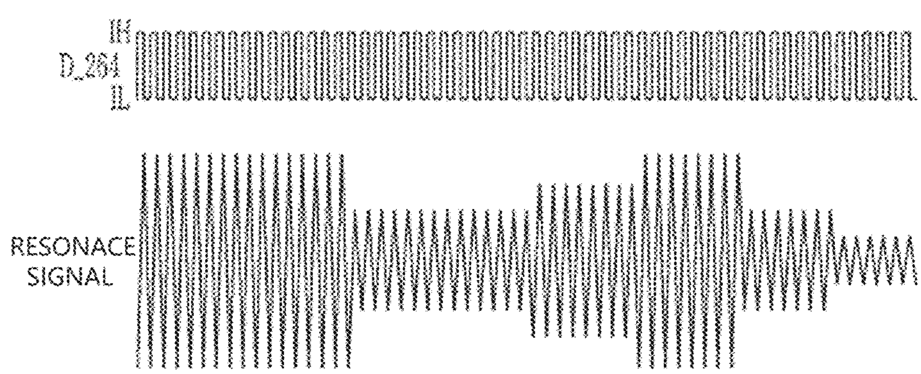
FIG. 33 is a waveform diagram illustrating an example of a driving signal and a resonance signal according to FIG. 32.

FIG. 32 is a flowchart illustrating a sensor input operation of a stylus pen and an electronic device according to an exemplary embodiment, and FIG. 33 is a waveform diagram illustrating an example of a driving signal and a resonance signal according to FIG. 32.

As shown in FIG. 32, the electronic device 2 transmits a driving signal to the stylus pen 10 S00. The drive signal may charge the power storage 14, 152 of the stylus pen 10. If the power storage 14, 152 is sufficiently charged, this step may be omitted.

The sensor 154 senses an input S10. The input may be various inputs according to the type of the sensor 154.

The controller 156 modulates the resonance signal according to the sensed input S12, and the modulated resonance signal is transmitted to the electronic device 2 S14. As shown in FIG. 33, the resonance signal modulated by the ASK method may be transmitted to the electronic device 2.

The electronic device 2 acquires data sensed by the sensor 154 by demodulating the transmitted resonance signal, and detects a touch input by the resonance signal S02. Hereinafter, data transmitted to the electronic device 2 according to the type of the sensor 154 will be described.

When the sensor 154 is a pen pressure sensor, and senses a hovering state, the controller 156 may control at least one of the switches SW0, SW1, SW2 and change the magnitude of the resonance signal. For example, the controller 156 may connect the voltage of the first node N1 to the ground of the battery 152, and may stop the output of the resonance signal in the hovering state. In this case, the controller 2624 may sense that the magnitude of the resonance signal received through the touch electrode 21 is very small or the resonance signal itself is not received, and may determine that there is no touch input by the stylus pen 10. As another example, the controller 156 may output data indicating the hovering state as a resonance signal through a signal modulation method using the magnitude of the resonance signal. Then, the controller 2624 may demodulate the resonance signal received by the receiver 2622 and obtain data indicating the hovering state, and may not process the received resonance signal as a touch input.

When the sensor 154 is an acceleration sensor, and senses an inclination angle, the controller 156 may control at least one of the switches SW0, SW1, SW2 and change the magnitude of the resonance signal. The controller 156 may output data indicating the inclination angle as a resonance signal through a signal modulation method using the magnitude of the resonance signal. Then, the controller 2624 may demodulate the resonance signal received by the receiver 2622, obtain data indicating the inclination angle, and adjust the touch area to correspond to the inclination angle. If the angle of inclination of the stylus pen 10 from the Z-axis (see FIG. 5) is large, the controller 2624 may generate touch data by adjusting it to have a larger value than the touch area according to the touch input by the resonance signal.

When the sensor 154 is a button or a touch sensor, and senses a user's button press or a touch of the touch sensor, the controller 156 may control at least one of the switches SW0, SW1, SW2 and change the size of the resonance signal. The controller 156 may output data indicating the button press or the touch input as a resonance signal through a signal modulation method using the magnitude of the resonance signal. Then, the controller 2624 may demodulate the resonance signal received by the receiver 2622 and obtain data indicating the button press or the touch input, and may generate touch data indicating the button press or the touch input. The electronic device 2 may process a user input received by the electronic device 2 using touch data indicating the button press or the touch input. For example, when the electronic device 2 further includes a camera, if touch data indicating a button press or a touch input of the stylus pen 10 are received, the controller 270 performs an operation of taking an image with the camera. In addition, when the electronic device 2 further includes a speaker, if touch data indicating a button press or a touch input of the stylus pen 10 are received, the controller 270 may control the volume of the sound output to the speaker, or perform an operation to start or stop the reproduction of the sound.

When the sensor 154 is an illuminance sensor, and senses ambient illuminance, the controller 156 may control at least one of the switches SW0, SW1, SW2 and change the magnitude of the resonance signal. The controller 156 may output data indicating ambient illuminance as a resonance signal through a signal modulation method using the magnitude of the resonance signal. Then, the controller 2624 may demodulate the resonance signal received by the receiver 2622 and acquire data representing ambient illuminance, and transmit it to the controller 270 or the display controller 252. Then, the luminance of the image displayed on the display panel 251 may be adjusted according to the ambient illuminance.

When the sensor 154 is a magnetic sensor, and senses the direction the stylus pen 10 faces, the controller 156 may control at least one of the switches SW0, SW1, SW2 and change the magnitude of the resonance signal. The controller 156 may output data indicating the direction in which the stylus pen 10 faces as a resonance signal through a signal modulation method using the magnitude of the resonance signal. Then, the controller 2624 may demodulate the resonance signal received by the receiver 2622 and obtain data indicating the direction in which the stylus pen 10 faces, and transmit it to the controller 270. Then, the controller 270 may display the direction in which the stylus pen 10 faces on the display panel 251 as a compass image or the like. The controller 270 may generate a signal for controlling another external device positioned in the direction the stylus pen 10 faces. In this case, it is assumed that the direction in which the external device is positioned with respect to the electronic device 2 is stored in the memory 220.

When the sensor 154 is a gyroscope sensor or a motion sensor, and senses a user's motion input, the controller 156 may control at least one of the switches SW0, SW1, SW2 and change the magnitude of the resonance signal. The controller 156 may output data indicating the motion input as a resonance signal through a signal modulation method using the magnitude of the resonance signal. Then, the controller 2624 may acquire data indicating the motion input by demodulating the resonance signal received by the receiver 2622, and transmit it to the controller 270. Then, the controller 270 may perform an operation according to the motion input.

When the sensor 154 is an RGB sensor, a light sensor, or an infrared sensor, and senses external light, the controller 156 may control at least one of the switches SW0, SW1, SW2 and change the magnitude of the resonance signal. The controller 156 may output data indicating the color, image, or infrared level of external light as a resonance signal through a signal modulation method using the magnitude of the resonance signal. Then, the controller 2624 may demodulate the resonance signal received by the receiver 2622 and obtain data indicating the color, image, or infrared level of external light, and transmit it to the controller 270. Then, the controller 270 may perform an operation according to the color, image, or infrared level of external light.

When the sensor 154 is a fingerprint sensor, and senses a user's fingerprint input, the controller 156 may compare the input fingerprint image with a fingerprint image stored in a memory (not shown therein) of the active circuit unit 15 to authenticate the user. If the user is an authenticated user, the controller 156 may control at least one of the switches SW0, SW1, SW2 and change the magnitude of the resonance signal.

For example, the controller 156 may connect the voltage of the first node N1 to the ground of the battery 152, and may stop the output of the resonance signal during use by an unauthorized user. In this case, the controller 2624 may sense that the magnitude of the resonance signal received through the touch electrode 21 is very small or the resonance signal itself is not received, and may determine that there is no touch input by the stylus pen 10. As another example, the controller 156 may output data indicating a use by an unauthorized user as a resonance signal through a signal modulation method using the magnitude of the resonance signal. Then, the controller 2624 may demodulate the resonance signal received by the receiver 2622 and obtain data indicating the use by the unauthorized user, and may not process the received resonance signal as a touch input.

When the sensor 154 is a microphone, and senses an external sound, the controller 156 may control at least one of the switches SW0, SW1, SW2 and change the magnitude of the resonance signal. The controller 156 may output data indicating an external sound as a resonance signal through a signal modulation method using the magnitude of the resonance signal. Then, the controller 2624 may demodulate the resonance signal received by the receiver 2622, acquire data indicating the external sound, and transmit it to the controller 270. Then, the controller 270 may perform an operation according to the external sound.

When the sensor 154 is a battery gauge, and senses the state of charge (SOC, OCV, etc.) of the batteries 14, 152, the controller 156 may control at least one of the switches SW0, SW1, SW2 and change the magnitude of the resonance signal. The controller 156 may output data indicating the state of charge of the batteries as a resonance signal through a signal modulation method using the magnitude of the resonance signal. Then, the controller 2624 may demodulate the resonance signal received by the receiver 2622, obtain data indicating the state of charge of the batteries 14, 152, and adjust the magnitude of the driving signal applied to the loop coil 264. When the state of charge of the batteries 14, 152 is in a fully charged state, the controller 2624 may decrease the level of the driving signal. When the state of charge of the batteries 14 and 152 is equal to or less than a threshold, the controller 2624 may increase the level of the driving signal.

When the sensor 154 is a thermometer, and senses the ambient temperature, the controller 156 may control at least one of the switches SW0, SW1, SW2 and change the magnitude of the resonance signal. The controller 156 may output data indicating the ambient temperature as a resonance signal through a signal modulation method using the magnitude of the resonance signal. In this case, the controller 156 may control the switch SW3 and change the resonance frequency. For example, when the ambient temperature increases, the controller 156 may control the switch SW3 to increase the resonance frequency. When the ambient temperature decreases, the controller 156 may control the switch SW3 and reduce the resonance frequency. Then, the control unit 2624 may demodulate the resonance signal received by the receiving unit 2622, acquire data indicating the ambient temperature, and adjust the frequency of the driving signal applied to the loop coil 264. When it is determined that the ambient temperature increases, the controller 2624 may decrease the frequency of the driving signal. When it is determined that the ambient temperature increases, the control unit 2624 may decrease the magnitude of the driving signal.

In addition, the data sensed according to the function of the sensor 154 may be modulated according to various data modulation methods and transmitted to the electronic device 2. Then, the controllers 2624, 270 may demodulate the received resonance signal, acquire sensor data, and perform appropriate controls in response thereto.

Next, the controller 156 may demodulate a driving signal transmitted through the touch electrode 21 and change the resonance frequency of the resonance circuit unit 12. In this regard, it will be described with reference to FIGS. 34 and 35 together.

Figure 34:
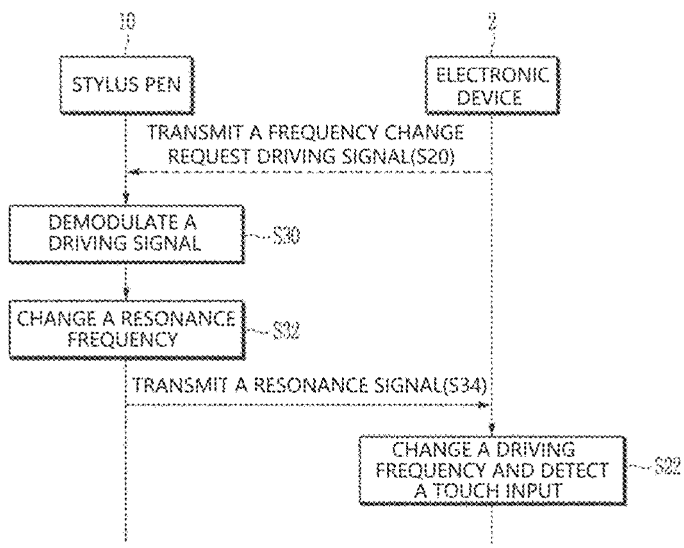
FIG. 34 is a flowchart illustrating an operation of changing a resonance frequency of a stylus pen and an electronic device according to an embodiment.
Figure 35:
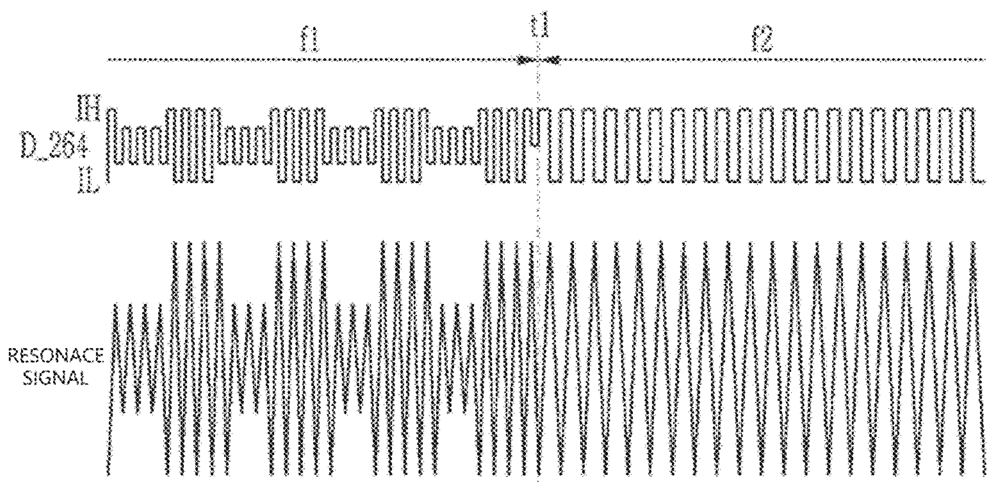
FIG. 35 is a waveform diagram illustrating an example of a driving signal and a resonance signal according to FIG. 34.

FIG. 34 is a flowchart illustrating operations of changing resonance frequencies of a stylus pen and an electronic device according to an exemplary embodiment, and FIG. 35 is a waveform diagram illustrating an example of a driving signal and a resonance signal according to FIG. 34.

The electronic device 2 may be vulnerable to noise having a frequency similar to the resonant frequency according to the design of the resonant circuit unit built into the stylus pen 10. Accordingly, the controller 2624 may change the driving frequency of the driving signal when the signal received from the receiver 2622 contains a noise component having the same or similar frequency as the driving frequency of the current driving signal, or only a noise signal equal to or similar to the driving frequency of the current driving signal exists.

As shown in FIG. 34, the controller 2624 transmits a resonance frequency change request signal to the stylus pen 10 S20. Before changing the driving frequency of the driving signal, the controller 2624 may modulate the resonant frequency change request signal to the driving signal, and apply it to the touch electrode 21. As illustrated in FIG. 35, the controller 2624 may modulate the resonant frequency change request signal to the driving signal in an ASK method before changing the frequency f1 of the driving signal to the frequency f2, and transmit it to the stylus pen 10.

The controller 156 determines whether a frequency change request signal is received by demodulating the driving signal transmitted through the touch electrode 21 S30.

If there is a frequency change request, the controller 156 controls the switch SW3 and changes the resonance frequency of the resonance circuit unit 12 S32, and the stylus pen 10 transmits the resonance signal to the electronic device 2 S34. In this case, although the resonance frequency is changed, if the driving frequency of the driving signal is not changed, the magnitude of the resonance signal may be reduced.

When the resonant frequency of the resonant circuit unit 12 is changed, the controller 2624 changes the frequency of the driving signal to the changed resonant frequency, and senses a touch input S22. Referring back to FIG. 35, at t1, the controller 2624 changes the driving frequency of the driving signal to f2. In this case, the changed resonance frequency of the resonance circuit unit 12 may be a preset frequency. On the other hand, the controller 156 may output data indicating that the resonance frequency is changed through a signal modulation method using the magnitude of the resonance signal as a resonance signal, and the controller 2624 may check whether the resonance frequency is changed. Alternatively, if the magnitude of the received resonance signal decreases after the controller 2624 transmits the frequency change request signal, or a predetermined time elapses after the frequency change request signal is transmitted, the controller 2624 may determine that the resonance frequency has changed.

Next, a stylus pen, an electronic device, and an input system including the same according to another embodiment will be described with reference to FIGS. 36 to 38.

Figure 36:
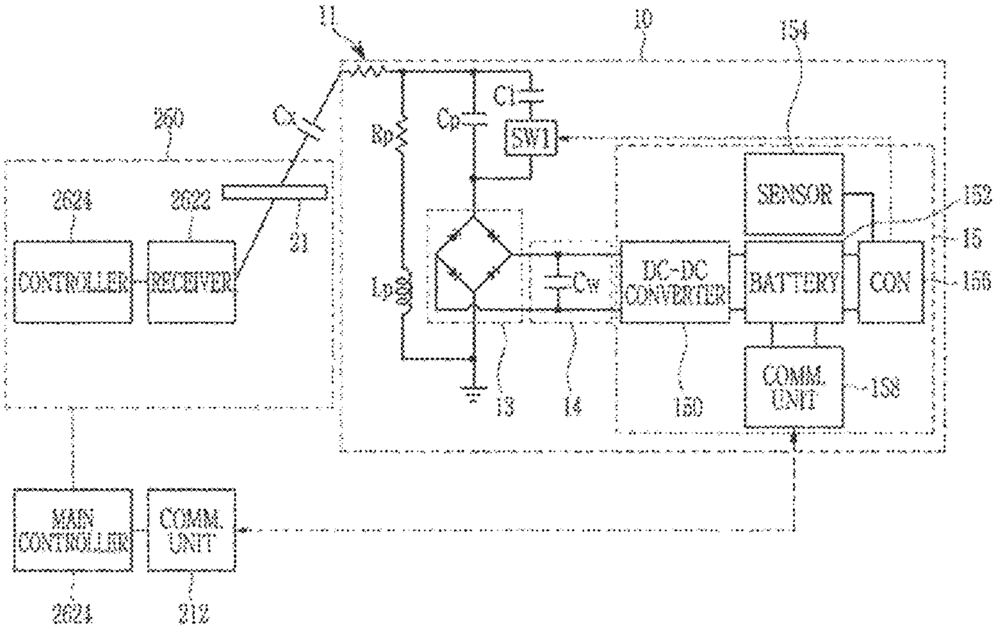
FIG. 36 is a diagram illustrating a part of a stylus pen and an electronic device according to an embodiment.

FIG. 36 is a diagram illustrating a part of a stylus pen and an electronic device according to an embodiment. Hereinafter, descriptions of the same components as those described above will be omitted.

As shown in FIG. 36, the stylus pen 10 further includes a communication unit 158 capable of communicating with an external communication module 212 and the like.

The communication unit 158 may perform short-range wireless communication using at least one of Bluetooth, RFID (Radio Frequency Identification), IrDA (Infrared Data Association), UWB (Ultra Wideband), ZigBee, NFC (Near Field Communication), Wi-Fi (Wireless-Fidelity), Wi-Fi Direct and Wireless USB (Universal Serial Bus) technologies. The short-range communication method of the communication unit 158 may be a short-range communication protocol other than the communication protocols described above, and is not limited to the above description.

The controller 156 may transmit the input from the sensor 154 to the electronic device 2 via the communication unit 158. It will be described together with reference to FIG. 37.

Figure 37:
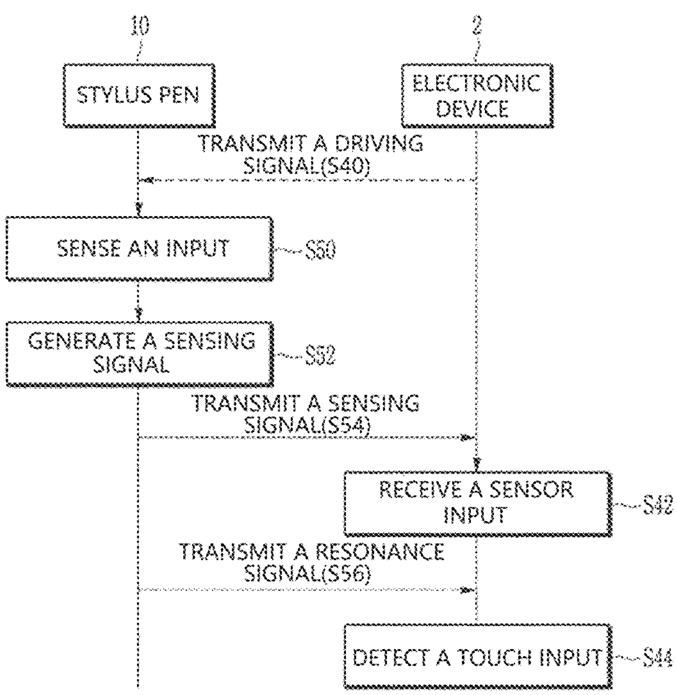
FIG. 37 is a flowchart illustrating a sensor input operation of a stylus pen and an electronic device according to another embodiment.

FIG. 37 is a flowchart illustrating a sensor input operation of a stylus pen and an electronic device according to another exemplary embodiment.

As illustrated, the electronic device 2 transmits a driving signal to the stylus pen 10 S40. The drive signal may charge the power storage 14, 152 of the stylus pen 10. If the power storage 14, 152 is sufficiently charged, this step may be omitted.

The sensor 154 senses an input S50. The input may be various inputs according to the type of the sensor 154.

The controller 156 generates a sensing signal according to the sensed input S52, and the generated sensing signal is transmitted to the electronic device 2 S54.

The electronic device 2 receives the transmitted communication signal and acquires data sensed by the sensor 154 S42.

Separately, the stylus pen 10 transmits a resonance signal according to the driving signal to the electronic device 2 S56, and the electronic device 2 detects a touch input by the resonance signal S44.

Next, the controller 156 may demodulate the driving signal transmitted through the touch electrode 21, and may change the resonance frequency of the resonance circuit unit 12. In this regard, it will be described with reference to FIG. 19.

Figure 38:
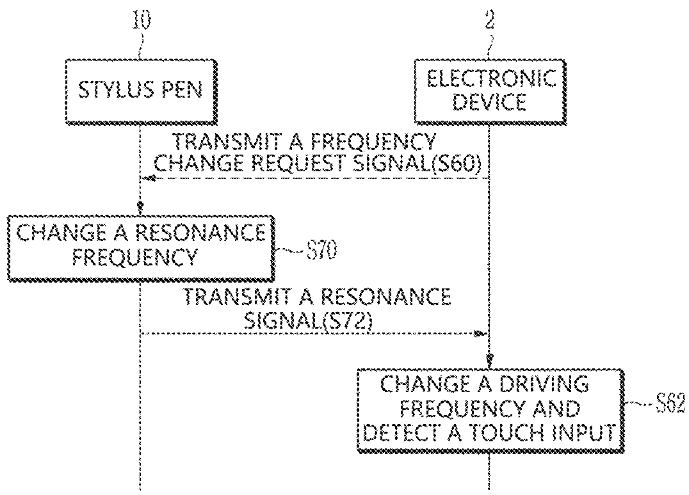
FIG. 38 is a flowchart illustrating an operation of changing a resonance frequency of a stylus pen and an electronic device according to another embodiment.

FIG. 38 is a flowchart illustrating operations of changing resonance frequencies of a stylus pen and an electronic device according to another embodiment.

As shown, the controller 2624 transmits the resonance frequency change request signal to the stylus pen 10 through the short-range communication module 212 S60. The controller 2624 may transmit the resonant frequency change request signal to the stylus pen 10 before changing the driving frequency of the driving signal.

When the resonant frequency change request signal is received through the communication unit 158, the controller 156 controls the switch SW3 and change the resonant frequency of the resonant circuit unit 12 S70. When the resonant frequency is changed, the communication unit 158 may transmit data indicating that the resonant frequency is changed to the short-range communication module 212, or may transmit data indicating the timing for the resonant frequency to be changed to the short-range communication module 212. The stylus pen 10 transmits the changed resonance signal to the electronic device 2 S72.

When the resonant frequency of the resonant circuit unit 12 is changed, the controller 2624 changes the frequency of the driving signal to the changed resonant frequency and detects a touch input S62. After the controller 2624 transmits the frequency change request signal, if the magnitude of the received resonance signal decreases, or a predetermined time elapses after the frequency change request signal is transmitted, the controller 2624 may determine that the resonance frequency has changed.

Figure 39A:
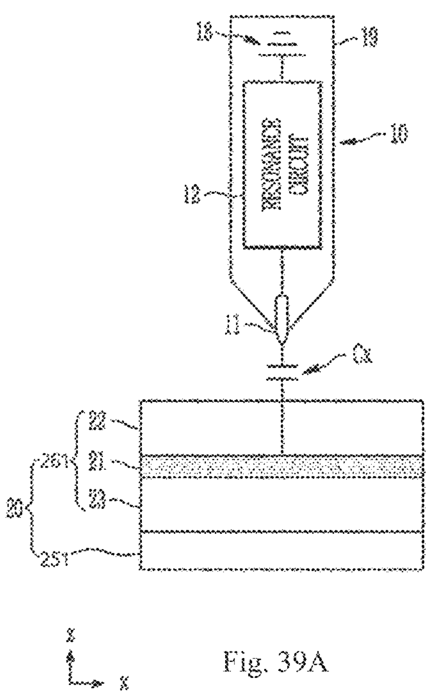
FIG. 39A is a diagram showing a state in which a stylus pen is close to an electronic device.
Figure 39B:
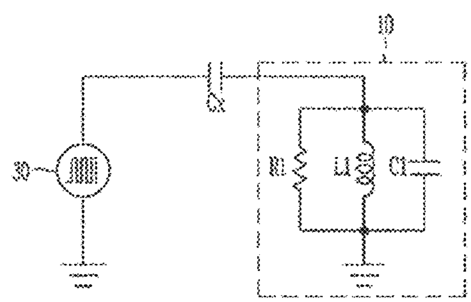
FIG. 39B is a schematic circuit diagram showing the stylus pen and the electronic device.
Figure 40A:
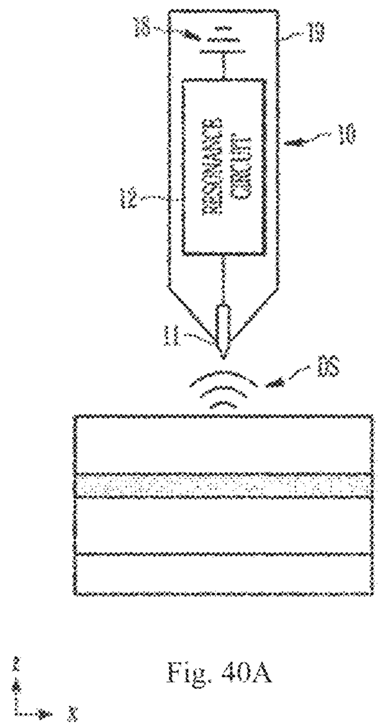
FIGS. 40A and 40B are diagrams illustrating a state in which a stylus pen approaches an electronic device to transmit and receive signals.
Figure 40B:
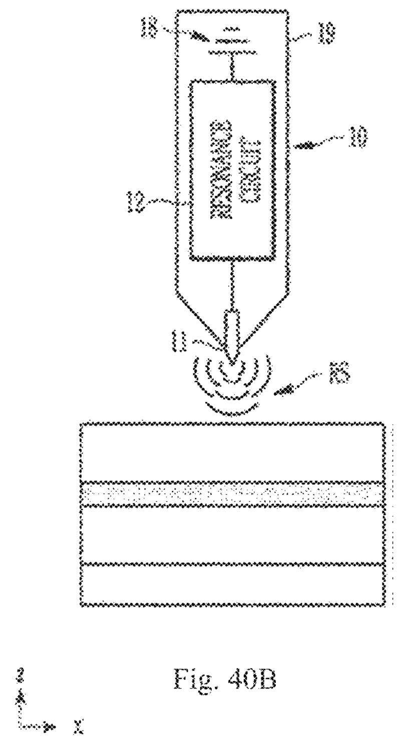

FIG. 39A is a view showing a state in which a stylus pen is in proximity to an electronic device, FIG. 39B is a schematic circuit diagram showing a stylus pen and an electronic device, and FIGS. 40A and 40B are a diagram illustrating a state in which a stylus pen approaches an electronic device to transmit and receive signals.

As illustrated in FIG. 39A, the stylus pen 10 and the touch screen 20 may be adjacent to each other.

The stylus pen 10 of this type may generate a touch input by generating a resonance signal in response to a driving signal applied to the touch electrode 21.

The touch screen 20 includes a display panel 251 and a touch sensor 261 on the display panel 251. The touch sensor 261 may include a substrate 23, a touch electrode 21 on the substrate, and a window 22 on the touch electrode 21.

The substrate 23 may be an encapsulation substrate of the display panel 251, which is preferably implemented with a transparent material.

The touch electrode 21 may include a plurality of first touch electrodes having a shape extending in a first direction and arranged along a second direction intersecting the first direction, and a plurality of second touch electrodes having a shape extending in a second direction and arranged along the first direction.

Although the touch electrode 21 is illustrated as a single layer in FIG. 39A, the first touch electrodes and the second touch electrodes may be respectively located on different layers, but they are not limited thereto.

A capacitance Cx is formed by at least one of the touch electrodes 111-1 to 111-*n*, 121-1 to 121-*m* and the conductive tip 11 of the stylus pen 10. A driving signal applied to the touch sensor 261 may be transmitted to the stylus pen 10 through the capacitance Cx between at least one of the touch electrodes 111-1 to 111-*m*, 121-1 to 121-*n* and the conductive tip 11, and a resonance signal may be transmitted to the touch sensor 261.

The touch sensing unit 260 may detect a touch by a touch object other than the stylus pen 10 that uses the method of generating the resonance signal described above (e.g., a user's body part (finger, palm, etc.), a passive or active type stylus pen), but it is not limited thereto.

For example, the touch sensing unit 260 may detect a touch by a stylus pen that receives an electrical signal and outputs it as a magnetic field signal. In addition, for example, the touch sensing unit 260 may detect a touch by a stylus pen that receives a magnetic field signal and outputs it as a resonant magnetic field signal. For example, the electronic device 2 may further comprise a digitizer. A magnetic field signal electromagnetically resonant (or electromagnetically induced) by the stylus pen is detected by the digitizer, and a touch may be detected thereby.

As shown in FIG. 39B, the stylus pen 10 in FIG. 39A may be represented by an equivalent circuit including a resistor R1, an inductor L1, and a capacitor C1.

The driving signal 30 having a predetermined frequency through the capacitor Cx is transmitted to the stylus pen 10 through the touch electrode 21. Then, the resonance circuit unit 12 including the inductor L1 and the capacitor C1 of the stylus pen 10 may resonate with the driving signal 30.

As shown in FIG. 40A, even in a state in which the stylus pen 10 is not in direct contact with the window 22 (i.e., in a hovering state), the driving signal DS from the touch electrode 21 may be transmitted to the conductive tip 11.

Similarly, as shown in FIG. 40B, the resonance signal RS may be transmitted from the conductive tip 11 to the touch electrode 21 through the air or the non-conductive housing 19.

Next, signal transmission/reception between the electronic device 2 and the stylus pen 10 will be described with reference to FIGS. 41, 42A and 42B.

Figure 41:
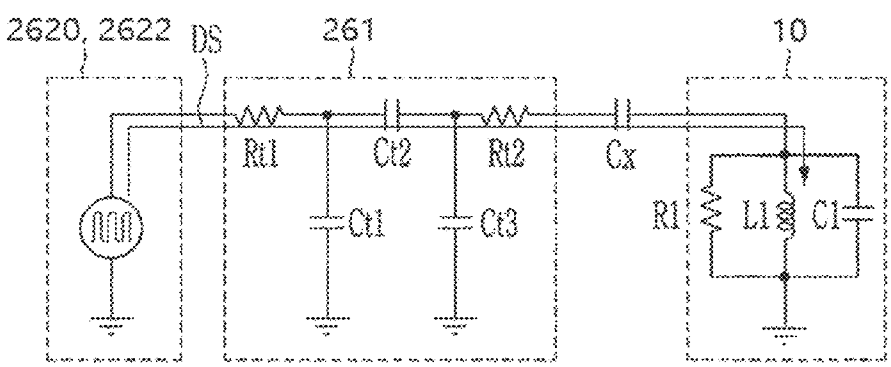
FIG. 41 is an equivalent circuit diagram illustrating a stylus pen and an electronic device outputting a driving signal.
Figure 42A:
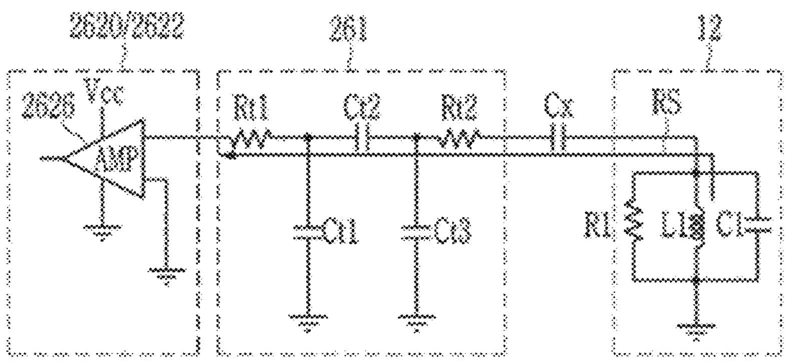
FIGS. 42A and 42B are an equivalent circuit diagram illustrating a stylus pen and an electronic device for receiving a detection signal.
Figure 42B:
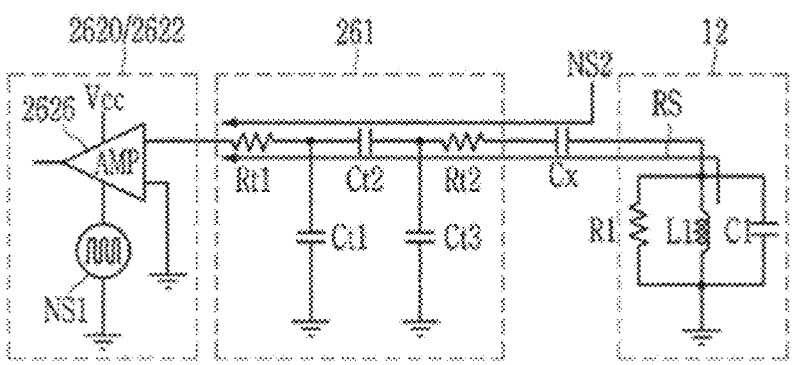

FIG. 41 is an equivalent circuit diagram illustrating a stylus pen and an electronic device that outputs a driving signal, and FIGS. 42A and 42B are an equivalent circuit diagram illustrating a stylus pen and an electronic device that receives a sensing signal.

As shown in FIG. 41, the stylus pen 10 may be represented by an equivalent circuit including a resistor R1, an inductor L1, and a capacitor C1. At least one of the first driving/receiving unit 2620 and the second driving/receiving unit 2622 applies the driving signal DS to the touch sensor 261. The driving signal DS is transmitted to the resonance circuit unit 12 through the capacitance Cx formed between the touch sensor 261 and the stylus pen 10, that is, between the touch electrodes 111, 121 and the conductive tip 11. Then, the resonance circuit unit 12 including the inductor L1 and the capacitor C1 of the stylus pen 10 may resonate with the driving signal DS. For resonance, the resonance frequency of the resonance circuit unit 12 and the frequency of the driving signal DS should be the same or very similar.

Next, the touch sensor 261 receiving a signal from the stylus pen 10 will be described with reference to FIGS. 42A and 42B.

FIGS. 42A and 42B are an equivalent circuit diagram illustrating a stylus pen and a touch sensor receiving a sensing signal.

As shown in FIG. 42A, the resonance signal RS of the resonance circuit unit 12 is transmitted to at least one of the first driving/receiving unit 2620 and the second driving/receiving unit 2622 through the capacitance Cx. At least one of the first driving/receiving unit 2620 and the second driving/receiving unit 2622 includes an amplifier 2626.

A first voltage Vcc may be applied to a first power input terminal of the amplifier 2626, and a second voltage GND may be applied to a second power input terminal thereof. The amplifier 2626 may amplify or differentially amplify and output the resonance signal RS input to at least one of the two input terminals using a voltage difference between the first voltage Vcc and the second voltage GND.

As shown in FIG. 42B, the noise NS1 may be introduced from the outside of the touch sensor 261, or the noise NS2 may be introduced to the second power input terminal of the amplifier 2626. In this case, the resonance signal RS generated by the driving signal 30 in FIGS. 12 to 17 has the same or very similar frequency as that of the driving signal 30. In addition, the noises NS1, NS2 have the same or similar frequency as that of the resonance signal RS.

The noise NS1 may be transmitted to the input terminal of the amplifier 2626 to which the resonance signal RS is transmitted, the noise NS1 may be transmitted to the input terminal of the amplifier 2626 to which the resonance signal RS is not transmitted, or the noise NS1 may be transmitted to both input terminals of the amplifier 2626 with different magnitudes. For this reason, there is a problem in that the signal output from the amplifier 2626 has noise.

In addition, the noise NS2 is transmitted to the second power input terminal of the amplifier 2626. Since the amplifier 2626 amplifies or differentially amplifies the resonance signal RS using the voltage difference between the first voltage Vcc and the noise NS2, there is a problem in that the signal output from the amplifier 2626 has noise.

As described above, when noises NS1, NS2 similar to the driving signal 30 (or the resonance signal RS) are input to the touch sensor 261, it is difficult that the touch sensor 261 accurately detects a touch input by the stylus pen 10. In the case of an active stylus pen, when noises NS1, NS2 are introduced into the touch sensor 261, the noises are avoided by a frequency hopping method of changing the frequency of a signal transmitted from the active stylus pen, but in the case of a passive stylus pen, since the response by the driving signal DS from the touch sensor 261 is transmitted to the touch sensor 261 as a sensing signal, it is difficult to implement such a frequency hopping method. For example, the touch sensing unit 260 may further include a coil for applying a current as a driving signal and a digitizer. The stylus pen resonates with the magnetic field signal generated by the current applied coil. In the stylus pen, a touch may be detected in the manner that an electromagnetic resonance (or electromagnetic induced) magnetic field signal is detected by a digitizer.

FIGS. 43 to 47 are diagrams illustrating a state in which a stylus pen approaches an electronic device.

As shown in FIGS. 43 to 47, the stylus pen 10 and the touch screen 20 may be adjacent to each other.

The stylus pen 10 in FIGS. 43 to 47 may generate a touch input (a resonance signal or an active touch signal) by resonating with a driving signal applied to the touch electrode 21.

The touch screen 20 in FIGS. 43 to 47 includes a display panel 251 and a touch sensor 261 on the display panel 251. The touch sensor 261 may include a substrate 23, a touch electrode 21 on the substrate, and a window 22 on the touch electrode 21.

The substrate 23 may be an encapsulation substrate of the display panel 251, which is preferably implemented with a transparent material.

The touch electrode 21 includes a plurality of first touch electrodes for detecting touch coordinates in a first direction and a plurality of second touch electrodes for detecting touch coordinates in a second direction crossing the first direction. For example, the touch electrode 21 includes a plurality of first touch electrodes having a shape extending in the second direction and a plurality of second touch electrodes having a shape extending in a first direction crossing the second direction, and the plurality of first touch electrodes may be arranged along the first direction, and the plurality of second touch electrodes may be arranged along the second direction. Although the touch electrode 21 is illustrated as a single layer in the drawings, the first touch electrodes and the second touch electrodes may be respectively located on different layers, but they are not limited thereto.

A window 22 may be positioned on the touch electrode 21. The touch electrode 21, the conductive tip 11, and the window 22 may form a capacitance Cx. Accordingly, a signal (a resonance signal or an active touch signal) generated by the stylus pen 10 may be transmitted to the touch electrode 21.

As shown in FIGS. 43 to 47, the resonance circuit unit 12 may mutually resonate with the loop coil 264, and the degree of mutual resonance occurring between the inductor of the resonance circuit unit 12 and the loop coil 264 is affected by the mutual inductance M. Alternatively, the resonance circuit unit 12 may resonate with the magnetic field generated by the loop coil 264.

Figure 43:
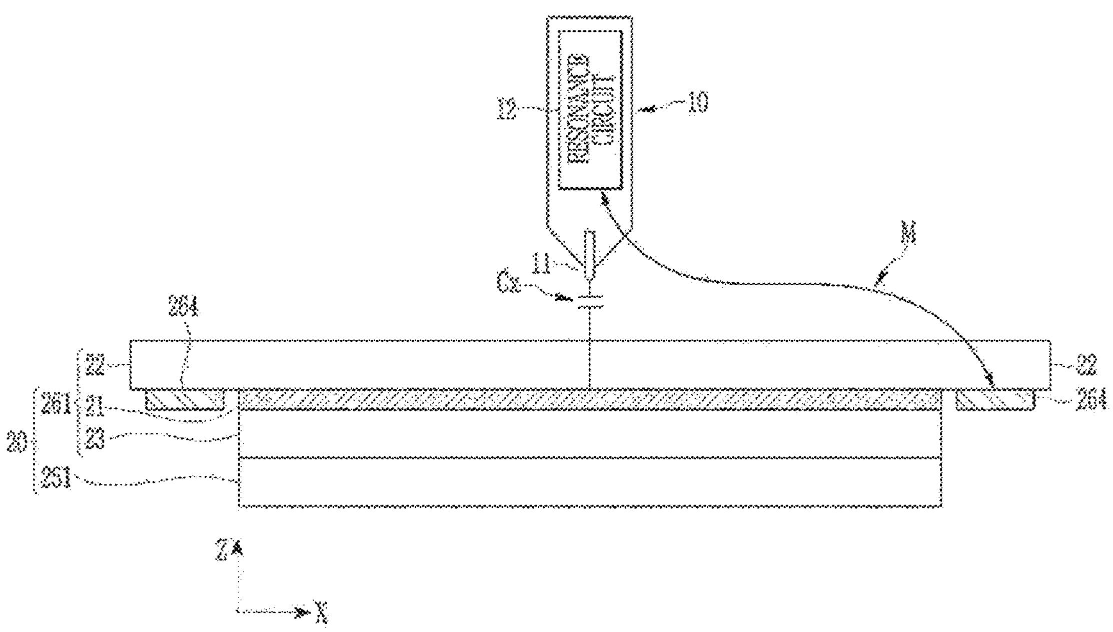
FIGS. 43 to 47 are diagrams illustrating a state in which a stylus pen approaches an electronic device.
Figure 44:
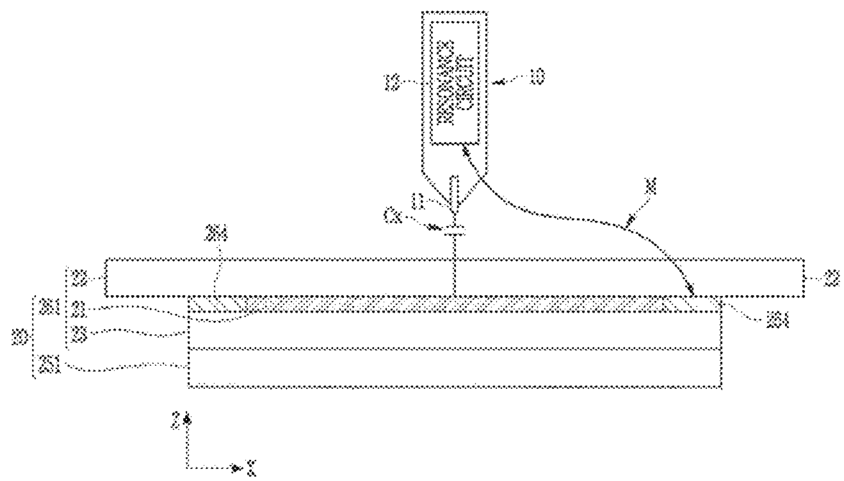
Figure 45:
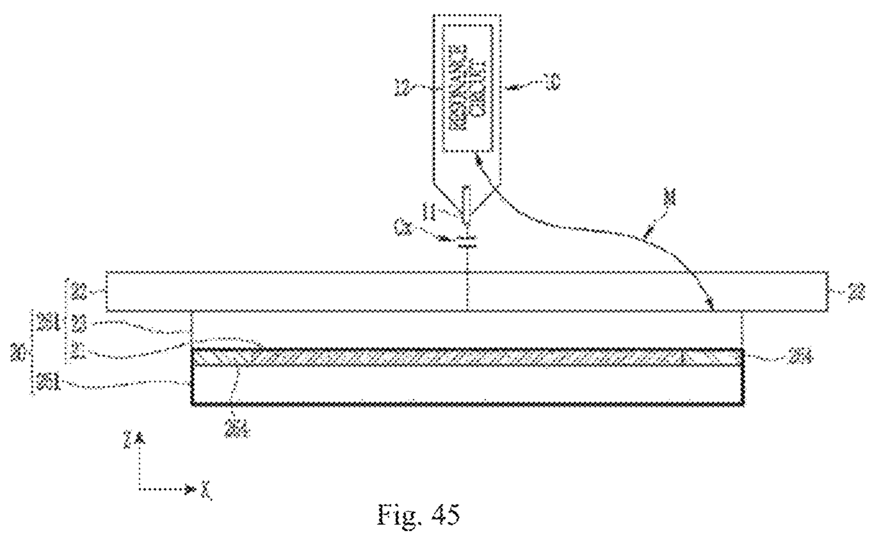

As illustrated in FIGS. 43 to 45, the loop coil 264 may be positioned in an area that does not overlap the touch sensor 261.

Referring to FIG. 43, the loop coil 264 may be printed on the window 22 by a method such as photolithography, thin film sputtering, or the like, or may be printed on a sheet by a method of photolithography, thin film deposition, or the like and attached to the window 22. Methods for positioning the loop coil 264 on the window 22 are not limited to the above description.

FIG. 44 is a view showing the arrangement of the loop coil 264 positioned on the same layer as the touch electrode 21 in the case of an on-cell type touch sensor, and FIG. 45 is a view showing the arrangement of the loop coil 264 located in the same layer as that of the touch electrode 21 in the case of an in-cell type touch sensor.

Referring to FIGS. 44 and 45, the loop coil 264 may be positioned on the same layer as that of the touch electrode 21. The loop coil 264 may be made of the same material as that of the touch electrode 21. However, the loop coil 264 may be positioned on a different layer from the that of touch electrode 21, and may be made of a different material.

In FIG. 44, the loop coil 264 and the touch electrode 21 are positioned in the same layer on the encapsulation substrate 23 of the display panel 251.

In FIG. 45, the display panel 251 includes a touch electrode 21 and a loop coil 264. That is, the substrate 23 may be a color filter substrate of the display panel 251, and the touch electrode 21 and the loop coil 264 may be positioned between the color filter substrate 23 and the TFT substrate of the display panel 251. Alternatively, both the touch electrode 21 and the loop coil 264 may be positioned on the upper and lower sides of the color filter substrate 23.

Figure 46:
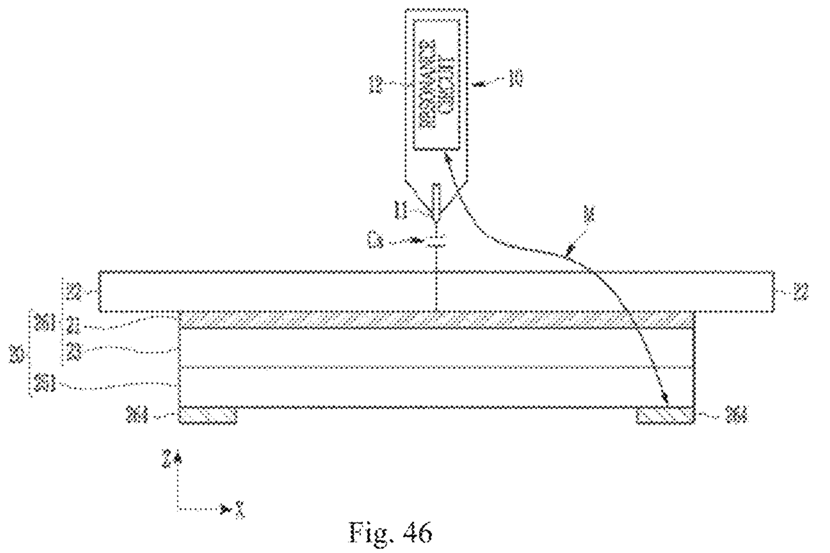
Figure 47:
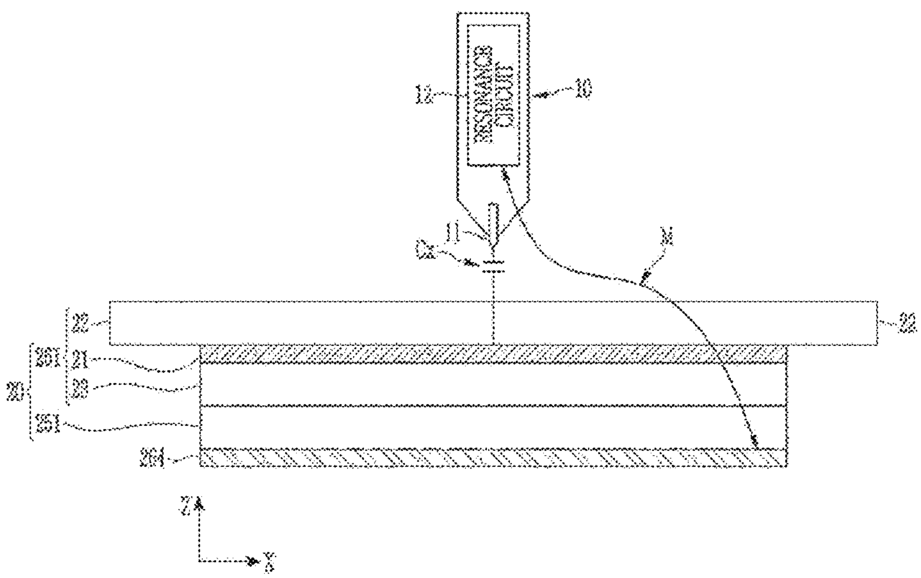

As shown in FIGS. 46 and 47, the loop coil 264 may be positioned in an area overlapping the touch sensor 261. The loop coil 264 may be directly printed on the substrate of the display panel 251 by a method such as photolithography, thin film sputtering, or the like, or may be printed on a sheet by a method of photolithography, thin film deposition, or the like and attached to the substrate of the display panel 251. Methods for positioning the loop coil 264 on the substrate of the display panel 251 are not limited to the above description.

As shown in FIG. 46, the loop coil 264 may be disposed at an outer shell (or edge region) of the touch sensor 261 as a partial area of the touch sensor 261, or disposed in a position close to the outer shell. Alternatively, the loop coil 264 may be disposed to correspond to the entire area of the touch sensor 261, as shown in FIG. 47.

The loop coil 264 may be positioned in a layer different from that of the touch electrode 21. However, as in FIGS. 44 and 45, the loop coil 264 may be positioned on the same layer as that of the touch electrode 21 in the area overlapping the touch sensor 261, and may be made of the same material.

Examples of transmitting and receiving signals between the stylus pen and the electronic device will be described with reference to FIGS. 48 to 53.

FIGS. 48 to 53 are schematic circuit diagrams illustrating a stylus pen and an electronic device.

Figure 48:
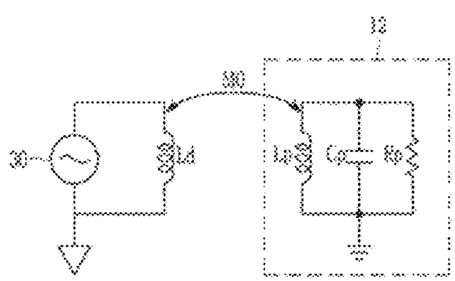
FIGS. 48 to 53 are schematic circuit diagrams illustrating a stylus pen and an electronic device.
Figure 49:
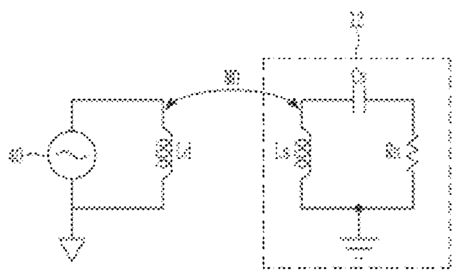

Referring to FIGS. 48 and 49, the resonance circuit unit 12 may be expressed as an equivalent circuit including a resistor Rp, an inductor Lp, and a capacitor Cp, or as an equivalent circuit including a resistor Rs, an inductor Ls, and a capacitor Cs.

As shown in FIGS. 48 and 49, when the loop coil Ld forms a magnetic field by the driving signal applied by the power source 40, a current is induced in the inductor LP of the stylus pen 10 and the resonance circuit unit (12) can resonate.

Even in a state in which the stylus pen 10 is not in direct contact with the window 22 (i.e., in a hovering state), the resonance circuit 12 may resonate by the magnetic field generated by the loop coil Ld.

As shown in FIGS. 50 to 53, when the loop coil and the internal capacitor resonate by the driving signal applied by the power source 40, the resonance circuit unit 12 of the stylus pen 10 may interact and resonate with the loop coil and the internal capacitor.

Figure 50:
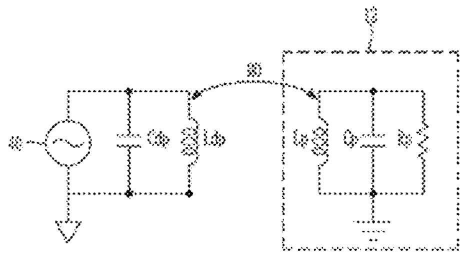

FIG. 50 shows a case in which the loop coil Ldp and the internal capacitor Cdp are connected in parallel, and the resistor Rp, the inductor Lp, and the capacitor Cp of the resonance circuit unit 12 are connected in parallel.

Figure 51:
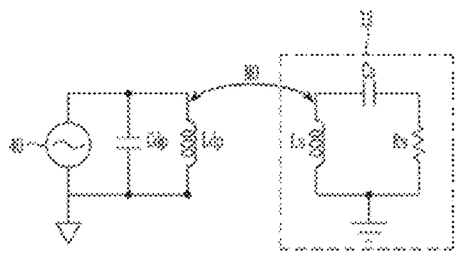

FIG. 51 shows a case in which the loop coil Ldp and the internal capacitor Cdp are connected in parallel, and the resistor Rs, the inductor Ls, and the capacitor Cs of the resonance circuit unit 12 are connected in series.

Figure 52:
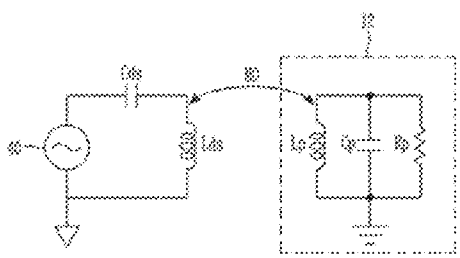

FIG. 52 shows a case in which the loop coil Lds and the internal capacitor Cds are connected in series, and the resistor Rp, the inductor Lp, and the capacitor Cp of the resonance circuit unit 12 are connected in parallel.

Figure 53:
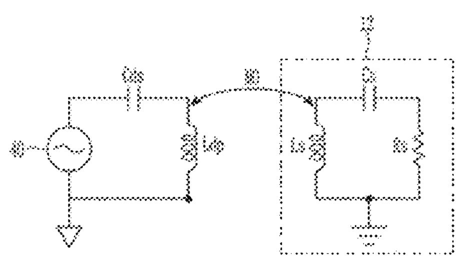

FIG. 53 shows a case in which the loop coil Lds and the internal capacitor Cds are connected in series, and the resistor Rs, the inductor Ls, and the capacitor Cs of the resonance circuit unit 12 are connected in series.

Even in a state in which the stylus pen 10 is not in direct contact with the window 22 (i.e., in a hovering state), the resonance circuit 12 may resonate with the loop coil Lds, Ldp through mutual resonance.

According to the circuit diagrams shown in FIGS. 48 to 53, when a driving signal is applied to the loop coils Ld, Ldp, Lds included in the electronic device, the resonance circuit unit 12 of the stylus pen 10 resonates and generates a resonance signal. The generated resonance signal may be sensed through a touch sensor provided in the electronic device.

FIGS. 54 to 59 are still another schematic circuit diagrams illustrating a stylus pen and an electronic device.

Figure 54:
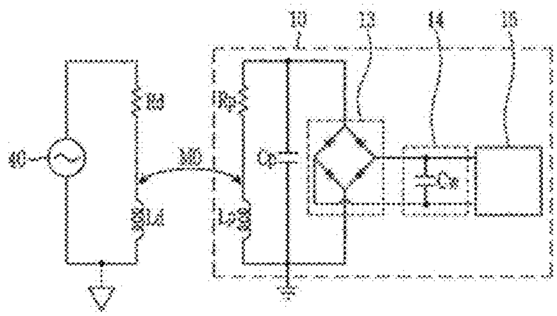
FIGS. 54 to 59 are another schematic circuit diagrams illustrating a stylus pen and an electronic device.
Figure 55:
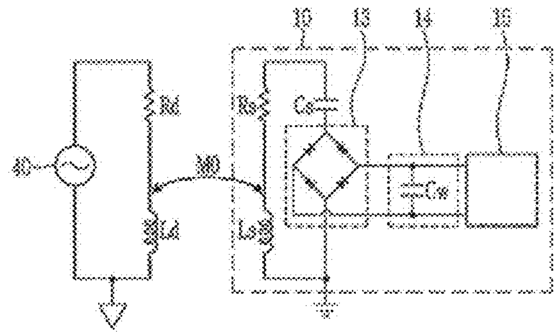

Referring to FIGS. 54 and 55, the resonance circuit unit 12 may be expressed as an equivalent circuit including a resistor Rp, an inductor Lp, and a capacitor Cp, or as an equivalent circuit including a resistor Rs, an inductor Ls, and a capacitor Cs.

As shown in FIGS. 54 and 55, when the loop coil Ld forms a magnetic field by the driving signal 40, a current is induced in the inductor LP of the stylus pen 10 and the resonance circuit unit 12 can resonate.

The resonant voltage in the resonance circuit unit 12 may be rectified by the rectifier 13 and stored in the power storage 14. Then, the active circuit unit 15 may be driven using the power stored in the power storage 14.

As shown in FIGS. 56 to 59, when the loop coil and the internal capacitor resonate by the driving signal 40, the resonance circuit unit 12 of the stylus pen 10 may also resonate with the loop coil and the internal capacitor.

Figure 56:
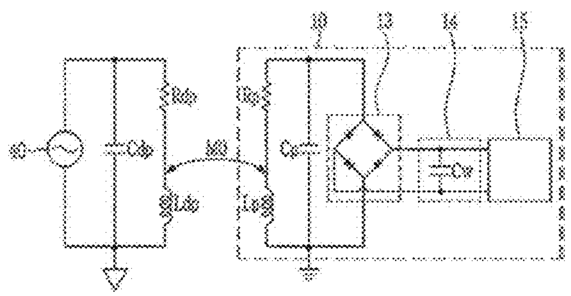

FIG. 56 illustrates a case in which the loop coil Ldp and the internal capacitor Cdp are connected in parallel, and the resistor Rp, the inductor Lp, and the capacitor Cp of the resonance circuit unit 12 are connected in parallel.

Figure 57:
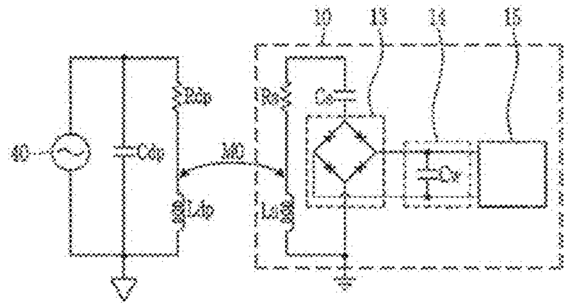

FIG. 57 illustrates a case in which the loop coil Ldp and the internal capacitor Cdp are connected in parallel, and the resistor Rs, the inductor Ls, and the capacitor Cs of the resonance circuit unit 12 are connected in series.

Figure 58:
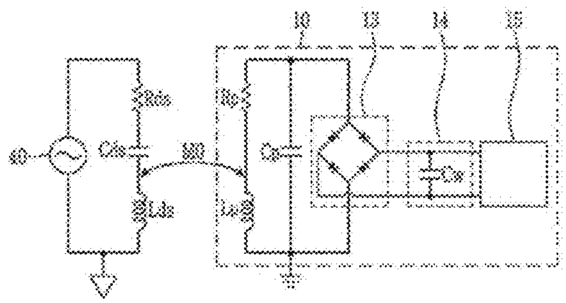

FIG. 58 illustrates a case in which the loop coil Lds and the internal capacitor Cds are connected in series, and the resistor Rp, the inductor Lp, and the capacitor Cp of the resonance circuit unit 12 are connected in parallel.

Figure 59:
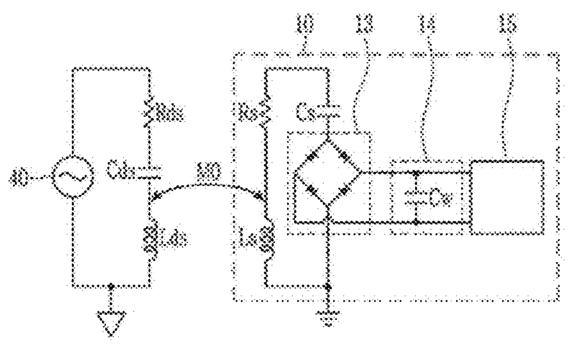

FIG. 59 illustrates a case in which the loop coil Lds and the internal capacitor Cds are connected in series, and the resistor Rs, the inductor Ls, and the capacitor Cs of the resonance circuit unit 12 are connected in series.

According to the circuit diagrams shown in FIGS. 54 to 59, when a driving signal is applied to the loop coils Ld, Ldp, Lds included in the electronic device, the resonance circuit unit 12 of the stylus pen 10 resonates and generates a resonance signal. The generated resonance signal is stored in the power storage inside the stylus pen 10, and the active circuit unit may output a predetermined signal using the power stored in the power storage. The output predetermined signal may be detected through a touch sensor provided in the electronic device.

According to the circuit diagrams shown in FIGS. 54 to 59, when a driving signal is applied to the loop coils Ld, Ldp, Lds included in the electronic device, the resonance circuit unit 12 of the stylus pen 10 resonates and generates a resonance signal. The generated resonance signal is stored in the power storage inside the stylus pen 10, and the active circuit unit may output a predetermined signal using the power stored in the power storage, and the output predetermined signal can be detected through a touch sensor provided in the electronic device.

Figure 60:
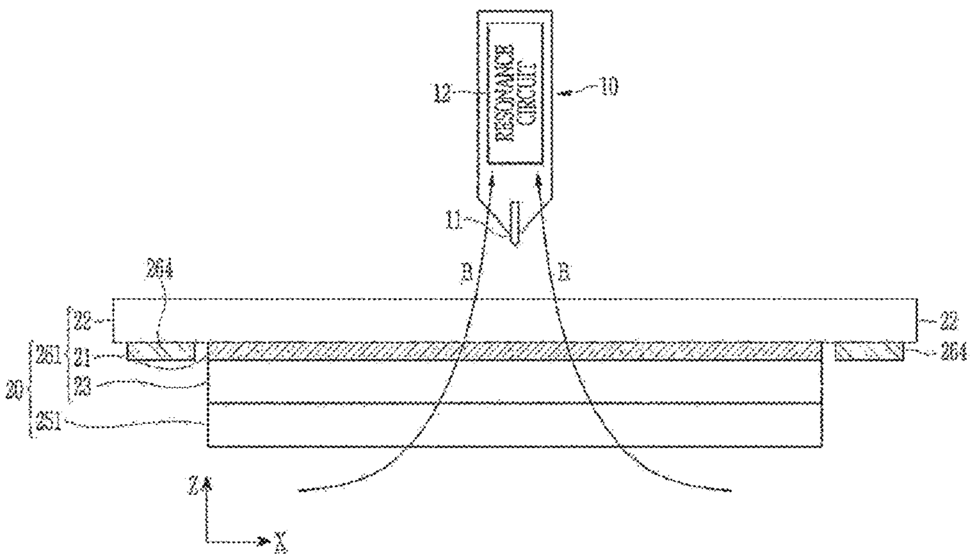
FIGS. 60 and 61 are diagrams illustrating a state in which a stylus pen approaches an electronic device to transmit and receive signals.
Figure 61:
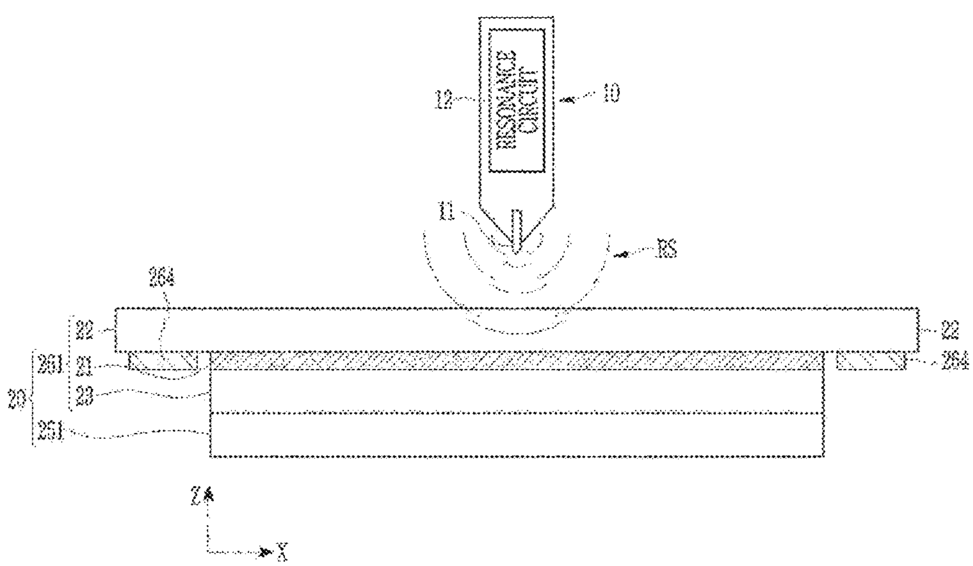

FIGS. 60 and 61 are diagrams illustrating a state in which a stylus pen approaches an electronic device and transmits/receives a signal.

As shown in FIG. 60, when a driving signal is applied to the loop coil 264, the resonance circuit 12 resonates by a magnetic field B generated therefrom. Then, as shown in FIG. 61, the signal RS from the stylus pen 10 can be directly transmitted from the conductive tip 11 to the touch electrode 21, or can be transmitted to the touch electrode 21 through the air or non-conductive housing. The resonance circuit unit 12 of the stylus pen may resonate by receiving energy from the loop coil 264 as a magnetic field generated by a driving signal of a predetermined frequency applied by the power source 40. Then, the stylus pen may transmit a touch input signal to the touch sensor 261 using the resonant energy. For example, the stylus pens 10*a*, 10*b* in FIGS. 30A and 30B may transmit a signal resonant from the resonance circuit unit 12 to the touch sensor 261 as a touch input. The stylus pens 10*c*, 10*d*, 10*e* in FIGS. 30C, 30D, and 30E may use the power generated from the resonance signal in the resonant circuit unit 12, and may cause the active stylus module 60 to transmit a signal to the touch sensor 261.

Examples of transmitting and receiving signals between the stylus pen and the electronic device according to an embodiment will be described with reference to FIGS. 62 and 63.

Figure 62:
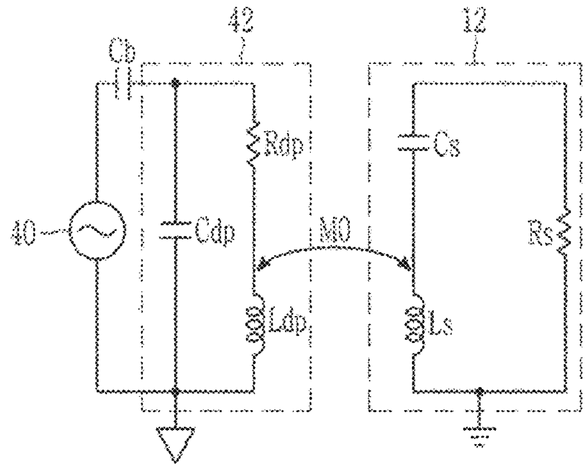
FIGS. 62 and 63 are another schematic circuit diagrams illustrating a stylus pen and an electronic device.
Figure 63:
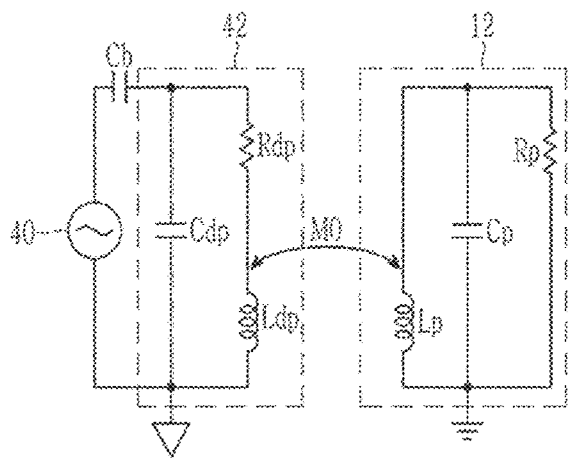

FIGS. 62 and 63 are other schematic circuit diagrams illustrating a stylus pen and an electronic device.

Referring to FIGS. 62 and 63, the resonance circuit unit 12 can be expressed as an equivalent circuit including a resistor Rp, an inductor Lp, and a capacitor Cp, or as an equivalent circuit including a resistor Rs, an inductor Ls, and a capacitor Cs.

FIGS. 62 and 63, when the loop coil and the internal capacitor resonate by the power source 40 that transmits the driving signal, the resonance circuit unit 12 of the stylus pen 10 can also interact and resonate with the loop coil and the internal capacitor.

FIG. 62 shows a case in which the loop coil Ldp and the internal capacitor Cdp are connected in parallel, and the resistor Rp, the inductor Lp, and the capacitor Cp of the resonance circuit unit 12 are connected in parallel.

FIG. 63 shows a case in which the loop coil Ldp and the internal capacitor Cdp are connected in parallel, and the resistor Rs, the inductor Ls, and the capacitor Cs of the resonance circuit unit 12 are connected in series.

In FIGS. 62 and 63, when the blocking capacitor Cb is not connected in series with the resonance circuit 42, the magnetic field generated by the driving signal is as follows:

$$\nabla \times H = \frac{\partial D}{\partial t} + J \qquad \text{[Equation 1]}$$

A change in the magnetic field generated by the resonance circuit 42 generates an induced electromotive force as shown in Equation 2 below.

$$\nabla \times E = -\frac{\partial B}{\partial t} \qquad \text{[Equation 2]}$$

Looking at Equation 1, both AC and DC currents contribute to inducing a magnetic field when inducing a magnetic field by an electric field, but as in Equation 2, when an electric field is induced by a magnetic field, the electric field is induced only by a magnetic field that changes with time. Accordingly, the current J of the DC component of Equation 1 consumes power despite no contribution to the induced electromotive force of the resonance circuit unit 12.

Therefore, it is possible to prevent a DC component current from flowing through the resonance circuit 42 as shown in Equation 3 below by connecting the blocking capacitor Cb in series with the resonance circuit 42.

$$\nabla \times H = \frac{\partial D}{\partial t} \qquad \text{[Equation 3]}$$

Accordingly, power consumption by the resonance circuit 42 can be reduced.

Next, an example of the loop coil 264 and the coil driver 263 of the electronic device 2 according to an embodiment will be described with reference to FIG. 64.

Figure 64:
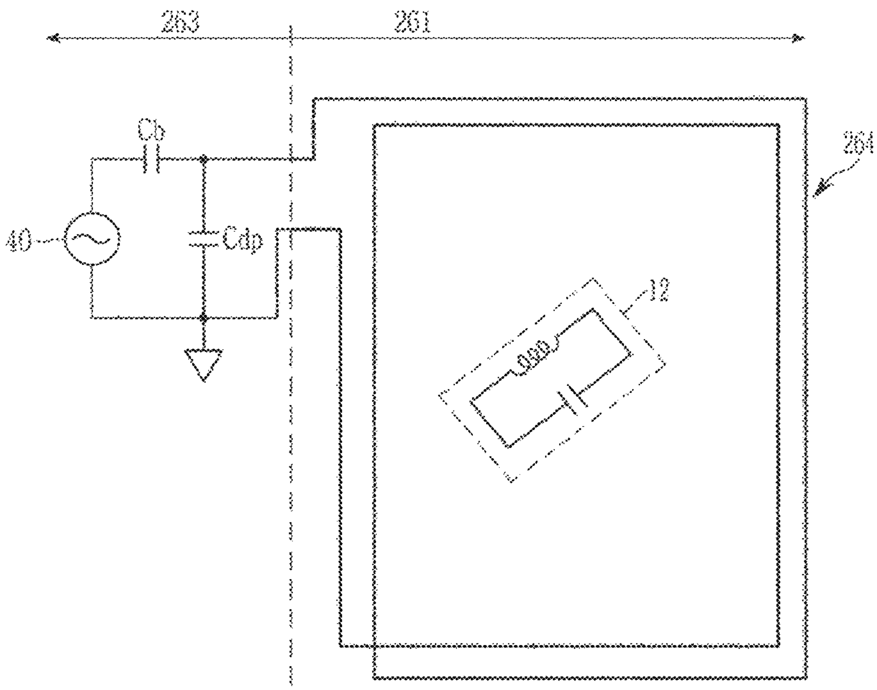
FIG. 64 is a diagram illustrating an antenna module and a stylus pen according to an embodiment.

FIG. 64 is a diagram illustrating an antenna module and a stylus pen according to an embodiment.

Referring to FIG. 64, the loop coil 264 positioned on the touch sensor 261 forms a resonance circuit with the capacitor Cdp. The resonance circuit and the blocking capacitor Cb are connected in series.

The resonance circuit unit 12 of the stylus pen may resonate by receiving energy from the loop coil 264 as a magnetic field generated by a driving signal of a predetermined frequency applied by the power source 40. Then, the stylus pen may transmit a touch input signal to the touch sensor 261 using the resonant energy. For example, the stylus pens 10*a*, 10*b* in FIGS. 30A and 30B may transmit a signal resonant from the resonance circuit unit 12 to the touch sensor 261 as a touch input. The stylus pens 10*c*, 10*d*, 10*e* in FIGS. 30C, 30D, and 30E may use the power generated from the resonance signal in the resonance circuit unit 12, and may causes the active stylus module 60 to transmit a signal to the touch sensor 261.

Next, a change in the amplitude of the resonance signal based on the magnetic field increased by the method of applying the driving signal will be described with reference to FIGS. 65 to 66.

Figure 65:
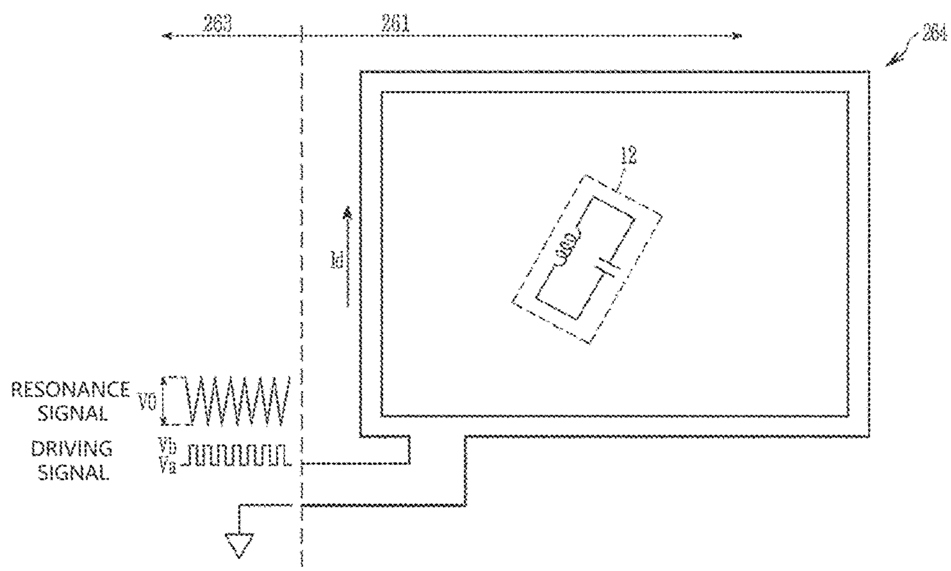
FIG. 65 is a diagram illustrating a driving signal applied by a coil driver to a loop coil and a resonance signal of a stylus pen.
Figure 66:
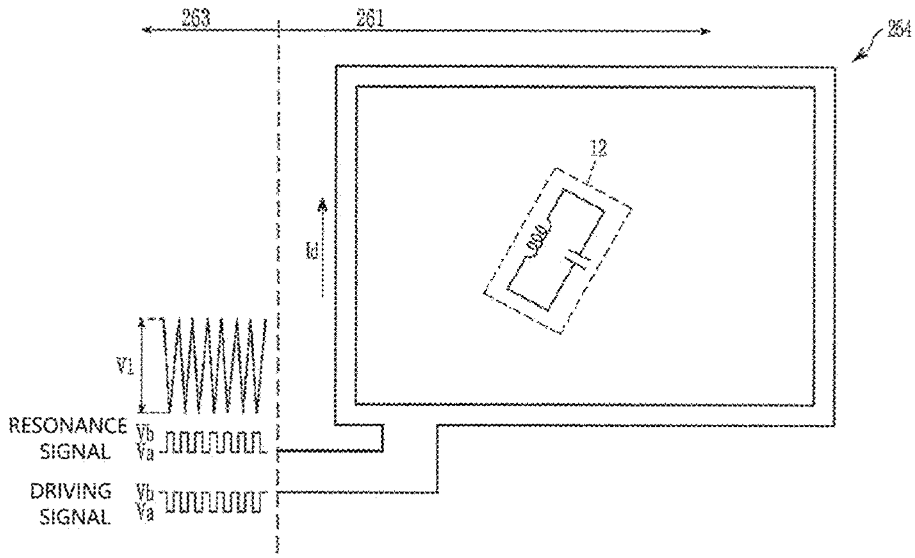
FIG. 66 is a diagram illustrating a driving signal applied by a coil driver to a loop coil and a resonance signal of a stylus pen according to an embodiment.

FIG. 65 is a view showing a driving signal applied to a loop coil by a coil driver and a resonance signal of a stylus pen, and FIG. 66 is a view showing a driving signal applied to a loop coil by a coil driver and a resonance signal of a stylus pen according to an embodiment.

As shown in FIG. 65, the coil driver 263 may apply a driving signal to each of both ends of the loop coil 264. A ground is connected to the other end of the loop coil 264, and a driving signal, that is, a voltage having a predetermined frequency, is applied to one end of the loop coil 264. Since voltages having different magnitudes (voltage difference between both ends=(Vb−Va)) are applied to both ends of the loop coil 264, a current Id flows in the loop coil 264. The strength of the current changes according to the change of voltage, but the direction of the current is constant. As in Equation 1 above, a change in current (current strength) forms a magnetic field around the loop coil 264.

The change in the magnetic field induces an induced electromotive force in the resonance circuit unit 12 as shown in Equation 2.

The PP (peak to peak) voltage of the resonance signal generated by the induced electromotive force in the resonance circuit unit 12 is V0.

Referring to FIG. 66, opposite-phase driving signals are applied to both ends of the loop coil 264. In this case, the PP voltage of the driving signal is Vb−Va, which is the same as the driving signal applied to the loop coil 264 in FIG. 65. Since voltages having different magnitudes (voltage difference between both ends=2*(Vb−Va)) are applied to both ends of the loop coil 264, a current Id flows in the loop coil 264. As the voltage changes, the strength and direction of the current change.

As in Equation 1 above, a change in current (current strength) forms a magnetic field around the loop coil 264. The change in the magnetic field induces an induced electromotive force in the resonance circuit unit 12 as shown in Equation 2 above. The PP voltage of the resonance signal generated by the induced electromotive force in the resonance circuit unit 12 is V1 (V1>V0).

An alternating current of greater strength generates a larger magnetic field change, and a larger magnetic field change induces a larger induced electromotive force. According to the electronic device control method of the present disclosure, by simultaneously applying the opposite-phase driving signal to both ends of the loop coil 264, there occurs an effect of amplifying the magnetic field generated in the coil even with the same voltage.

That is, according to the electronic device control method of the present disclosure, energy transmitted to the resonance circuit unit 12 of the stylus pen 10 may be increased without the coil driver 263 increasing the PP voltage.

Next, a case where the coil driver 263 using the method of applying the driving signal in FIG. 66 includes the blocking capacitor Cb will be described.

Figure 67:
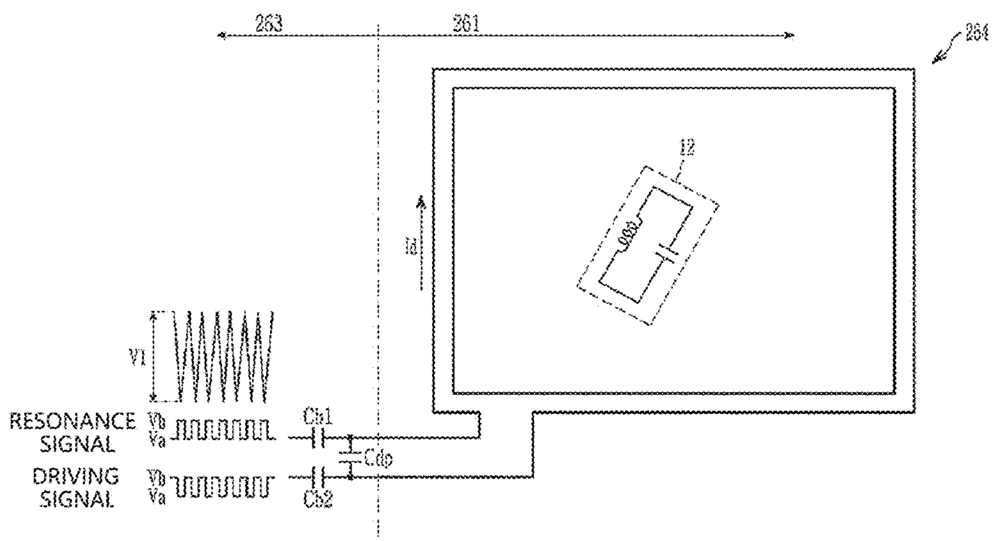
FIG. 67 is a diagram specifically illustrating the coil driver of FIG. 66.

FIG. 67 is a diagram specifically illustrating the coil driver in FIG. 66.

Referring to FIG. 67, the loop coil Ldp and the internal capacitor Cdp are connected in parallel, one electrode of the blocking capacitor Cb1 is connected to one electrode of the internal capacitor Cdp, and one electrode of the blocking capacitor Cb2 is connected to the other electrode of the internal capacitor Cdp.

A driving signal of a phase different from each other (e.g., out of phase) is applied to the other electrode of the blocking capacitor Cb1 and the other electrode of the blocking capacitor Cb2, respectively. For example, the phase of the driving signal applied to the other electrode of the blocking capacitor Cb1 and the phase of the driving signal applied to the other electrode of the blocking capacitor Cb2 are opposite to each other.

As described with reference to FIG. 66, by simultaneously applying the opposite-phase driving signal to both ends of the loop coil 264, there occurs an effect of amplifying the magnetic field generated in the coil even with the same voltage.

Also, by connecting the blocking capacitors Cb1 and Cb2 to the resonance circuit 42, it is possible to prevent a DC component current from flowing in the resonance circuit 42 as in Equation 3 above.

Examples in which the stylus pen and the electronic device transmit/receive signals will be described with reference to FIGS. 68 to 71.

Figure 68:
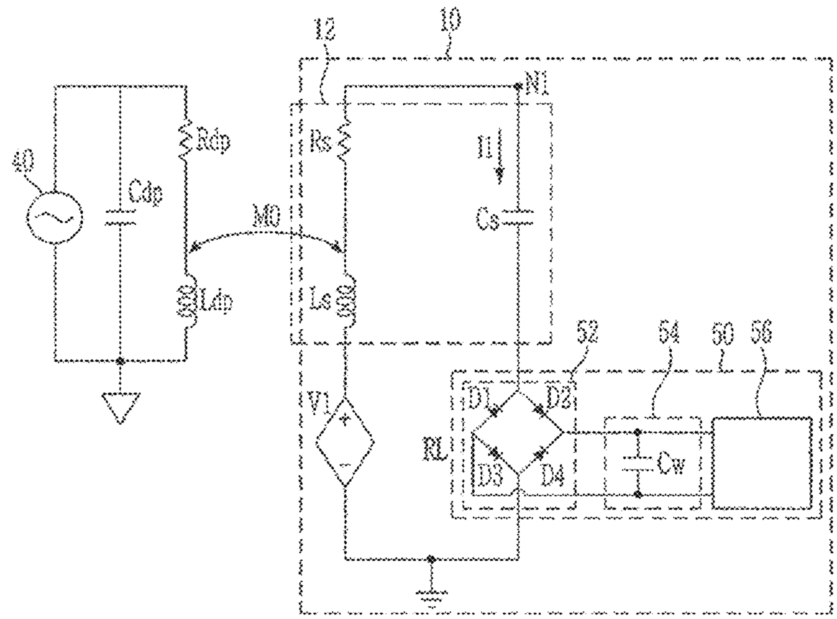
FIGS. 68 and 69 are schematic circuit diagrams illustrating a stylus pen and an electronic device.
Figure 69:
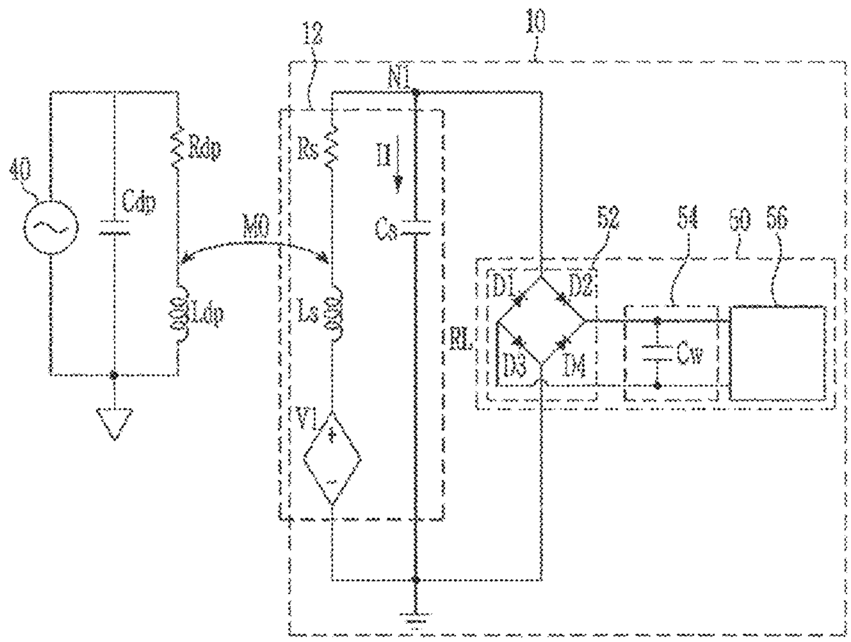

FIGS. 68 and 69 are schematic circuit diagrams illustrating a stylus pen and an electronic device.

The resonance circuit unit 12 of FIGS. 68 and 69 can be expressed as an equivalent circuit including a resistor Rp, an inductor Lp, and a capacitor Cp, or as an equivalent circuit including a resistor Rs, an inductor Ls, and a capacitor Cs.

As shown in FIG. 68, the active module 50 is connected in series to a resistor Rs, an inductor Ls, and a capacitor Cs. On the electronic device side, when the loop coil Ldp forms a magnetic field by the driving signal 40, a current I1 is induced in the inductor Ls of the stylus pen 10, and the resonance circuit unit 12 can resonate. The degree to which a current is induced in the inductor Ls by the loop coil Ldp is affected by the mutual inductance M0. Alternatively, when the loop coil Ldp and the internal capacitor Cdp resonate by the driving signal 40, the resonance circuit unit 12 of the stylus pen 10 may also resonate with the loop coil and the internal capacitor. In this case, the degree of mutual resonance among the loop coil Ldp, the internal capacitor Cdp, and the resonance circuit unit 12 is affected by the mutual inductance M0. On the electronic device side, the transmitted energy is represented by a voltage source V1. V1 may be determined as in Equation 4 below.

$$V1 = 2\pi f_0 \cdot k \cdot \sqrt{L1 \cdot L2} \cdot I1 \qquad \text{[Equation 4]}$$

Here, f0 is the resonance frequency of the resonant circuit unit 12, L1 is the inductance of the inductor Ldp, L2 is the inductance of the inductor Ls, and k is the coupling coefficient of the inductor Ldp and the inductor Ls. L1 is several tens to hundreds of H, L2 is several mH, and k is 0 or more and less than 1 (e.g., k may be 0 or more and less than 0.9). Energy resonant in the resonant circuit unit 12 may be rectified by the rectifier 52 and stored in the power storage 54. Then, the active IC 56 can be driven using the power stored in the power storage 54. If the active module 50 is represented by an equivalent resistance RL, when the resonance circuit unit 12 resonates, the resistance Rs and the resistance RL must be the same to receive the maximum energy from the electronic device. If the resistor Rs and the resistor RL are the same, the voltage applied to the node N1 becomes V1/2. In consideration of the threshold voltages Vth of the diodes D1 to D4 included in the rectifier 52, the voltage transmitted to both ends of the power storage 54 is calculated as in Equation 5 below.

$$V_{CW} = \frac{V1}{4} - 2Vth \qquad \text{[Equation 5]}$$

Here, it is assumed that the threshold voltage Vth is greater than 0V and less than or equal to 0.5V. The inventors have confirmed that the voltage VCw stored in the power storage 54 is not sufficient to drive the active IC 56. That is, the driving voltage for operating the active IC 56 is greater than the voltage VCw stored in the power storage 54. In addition, there is a problem in that an additional device is required to convert the voltage to a voltage sufficient to drive the active IC 56.

In addition, although the equivalent resistance RL and the resistance Rs should have the same value, the resistance value of the active module 50 is larger than the resistance Rs. Thus, there occurs a problem that impedance conversion is required.

Accordingly, the inventors considered a structure in which the active module 50 is connected to the resonance circuit unit 12 in parallel. As shown in FIG. 69, the active module 50 is connected in parallel to a resistor Rs, an inductor Ls, and a capacitor Cs.

Figure 70A:
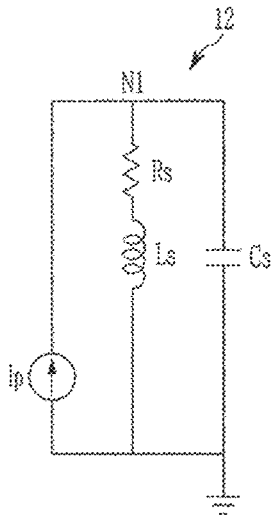
FIGS. 70A, 70B and 71 are circuit diagrams illustrating the stylus pen of FIG. 69 in more detail.
Figure 70B:
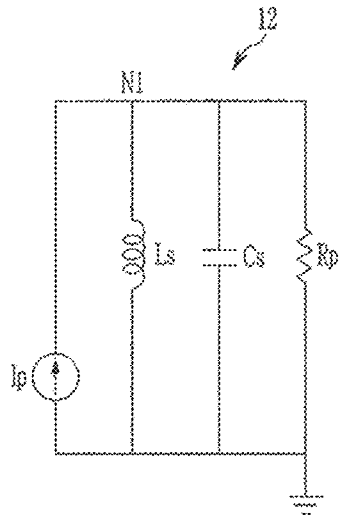
Figure 71:
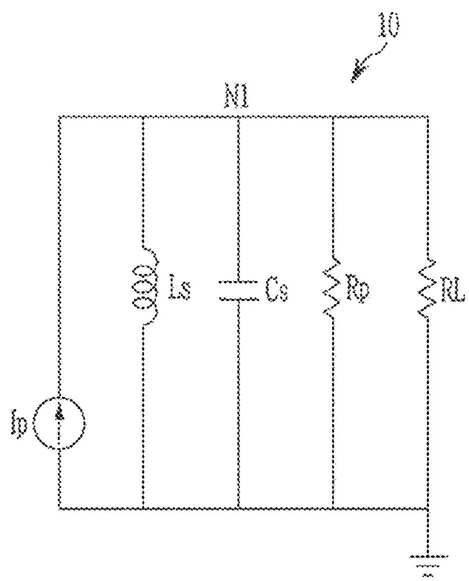

In this case, the internal circuit of the stylus pen 10 was converted using Norton's theorem as in FIGS. 70A, 70B and 71 in order to calculate the resistance RL value that can receive the maximum energy from the electronic device.

FIGS. 70A, 70B and 71 are circuit diagrams illustrating the stylus pen of FIG. 69 in more detail.

As shown in FIG. 70A, the dependent voltage source V1 is converted to the current source Ip, and the resistor Rs, the inductor Ls and the capacitor Cs are connected in parallel at the node N1. In this case, the current of the current source Ip is calculated as in Equation 6 below.

$$Ip = \frac{V1}{(Rs + j \cdot 2\pi f0 \cdot L2)} \quad \text{[Equation 6]}$$

As shown in FIG. 70B, the resistor Rs is converted into a resistor Rp connected in parallel with the inductor Ls and the capacitor Cs at the node N1. In this case, the resistance Rp is calculated as in Equation 7 below.

$$R_p = Rs \cdot \left(\frac{2\pi f0 \cdot L2}{Rs}\right)^2 \quad \text{[Equation 7]}$$

As shown in FIG. 71, when the active modules 50 are connected in parallel, if the equivalent resistance RL and the resistance Rp have the same resistance value, the stylus pen 10 can receive the maximum energy from the electronic device.

However, since the resonance frequency f0 is several tens to several hundreds of kHz, the value of the resistance Rp is larger than the equivalent resistance RL. The equivalent resistance RL may be several hundred Q. Therefore, the value of the combined resistance in which the equivalent resistor RL and the resistor Rp are connected in parallel has a value similar to that of the equivalent resistor RL rather than the resistor Rp. In this case, the voltage applied to the node N1 is calculated as Ip*RL and can be expressed as Equation 8 below.

$$V_{N1} = \frac{V1 \cdot RL}{(Rs + j \cdot 2\pi f0 \cdot L2)} \quad \text{[Equation 8]}$$

In Equation 8, VN1 is a voltage applied to the node N1. In Equation 8, since the inductance L2 is several mH, the voltage VN1 applied to the node N1 has a very small value. The inventors have confirmed that the voltage VCw stored in the power storage 54 calculated according to Equation 5 is not sufficient to drive the active IC 56. In addition, there occurs a problem in that an additional device is required to convert the voltage to a voltage sufficient to drive the active IC 56.

Next, the stylus pen 10 according to the present disclosure will be described with reference to FIGS. 72 to 74.

Figure 72:
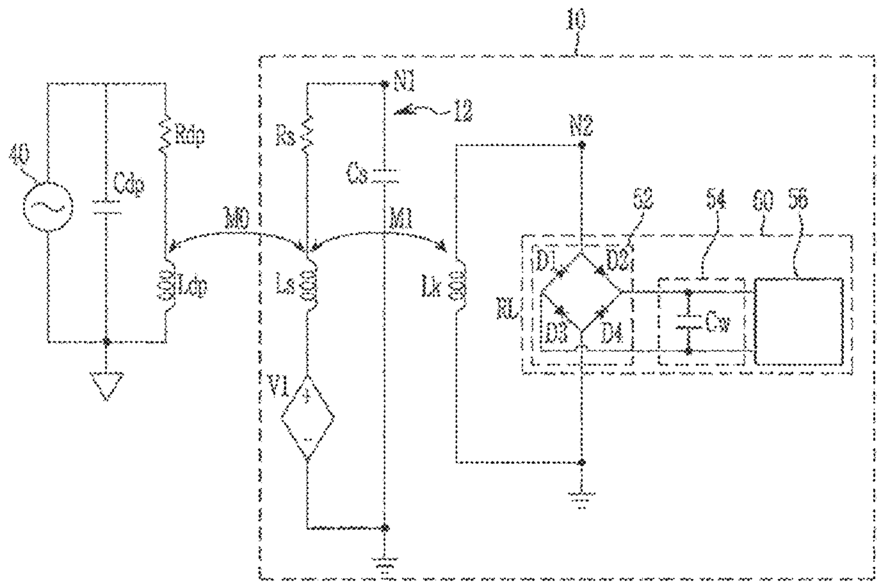
FIG. 72 is a schematic circuit diagram illustrating a stylus pen and an electronic device according to an embodiment.
Figure 73:
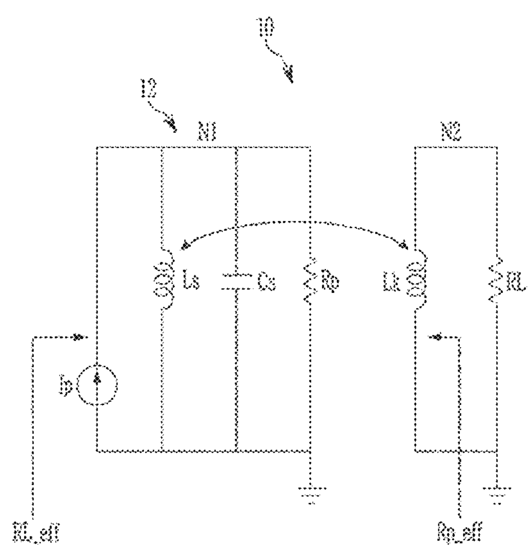
FIGS. 73 and 74 are circuit diagrams illustrating the stylus pen of FIG. 72 in more detail.
Figure 74:
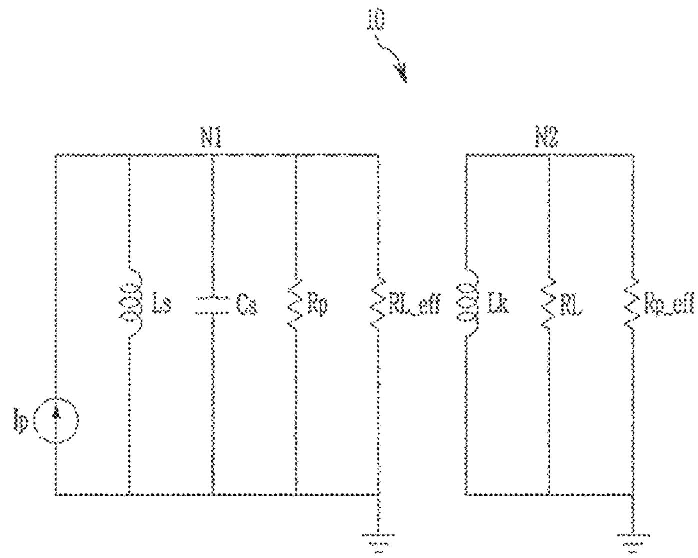

FIG. 72 is a schematic circuit diagram illustrating a stylus pen and an electronic device according to an embodiment, and FIGS. 73 and 74 are circuit diagrams illustrating the stylus pen in FIG. 72 in more detail.

Referring to FIG. 72, the stylus pen 10 further includes an inductor Lk connected to the inductor Ls and a mutual inductance M1 of the resonance circuit unit 12 in addition to the resonant circuit unit 12, and an active module 50 connected to the inductor Lk.

The active module 50 may include a rectifier 52, a power storage 54, and an active IC 56.

In FIG. 73, the resonance circuit unit 12, the inductor Lk, and the equivalent resistance RL of the active module 50 are shown as an equivalent circuit. In order to calculate the voltage transmitted to the equivalent resistor RL, that is, the voltage applied to the node N2, the resistance RL_eff when the resonance circuit unit 12 looks at the equivalent resistor RL and the resistance Rp_eff when looking at the resonance circuit unit 12 from the equivalent resistor RL can be calculated as in Equations 9 and 10 below.

$$\text{RL\_eff} = \left(\frac{n2}{n3}\right)^2 \cdot RL \quad \text{[Equation 9]}$$

$$\text{RL\_eff} = \left(\frac{n3}{n2}\right)^2 \cdot Rp \quad \text{[Equation 10]}$$

In Equations 9 and 10, n2 is the number of turns of the inductor Ls, and n3 is the number of turns of the inductor Lk.

As shown in FIG. 74, the resistance Rp_eff when the resonance circuit unit 12 is viewed from the equivalent resistance RL is connected in parallel to the active module 50, and the resistance RL_eff when looking at the equivalent resistance RL from the resonance circuit unit 12 is connected in parallel to the resistance Rp of the resonance circuit unit 12.

The voltage of the node N2 is determined by the following Equation 11 with the voltage of the node N1 and the numbers of turns of the inductor Ls and the inductor Lk.

$$V_{N2} = \left(\frac{n3}{n2}\right) \cdot V_{N1} \quad \text{[Equation 11]}$$

Since the combined resistance of the resistor Rp and the resistor RL_eff calculated in Equation 7 is several hundred kΩ, when the current Ip calculated in Equation 6 is multiplied, the voltage at the node N1 is calculated as several hundred V.

It is assumed that the ratio of n2 and n3 is a:1 (10<a<300). Then, the voltage at the node N2 is calculated to be at least several V. Even considering the threshold voltages of the diodes D1 to D4, the voltage at the node N2 has a sufficient value to drive the active IC 56.

Next, the stylus pen 10 and the loop coil 264 of the present disclosure will be described with reference to FIGS. 75 to 77.

Figure 75:
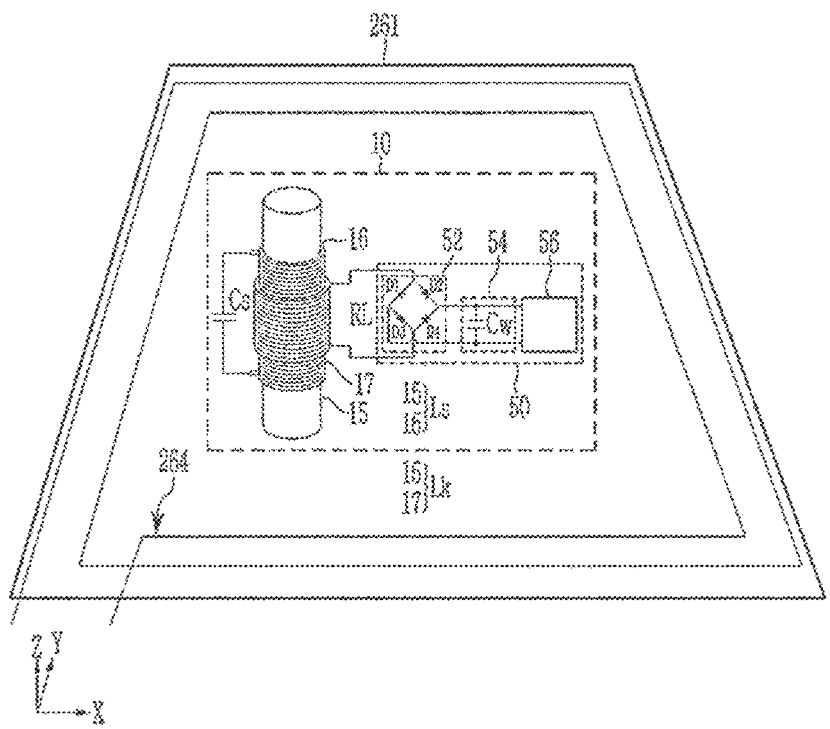
FIGS. 75 to 77 are diagrams illustrating a stylus pen and a portion of an electronic device according to various aspects of an embodiment.
Figure 76:
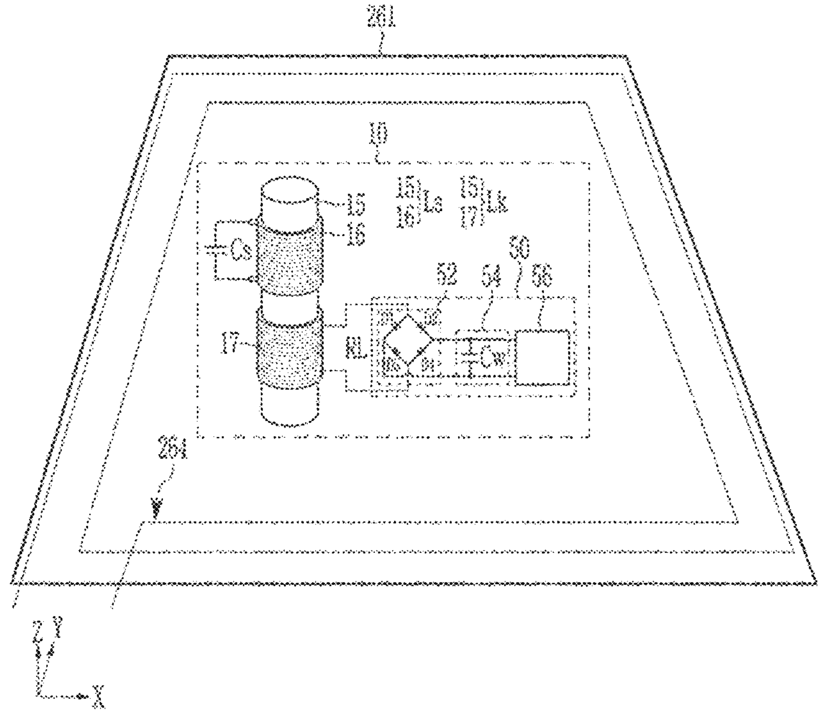
Figure 77:
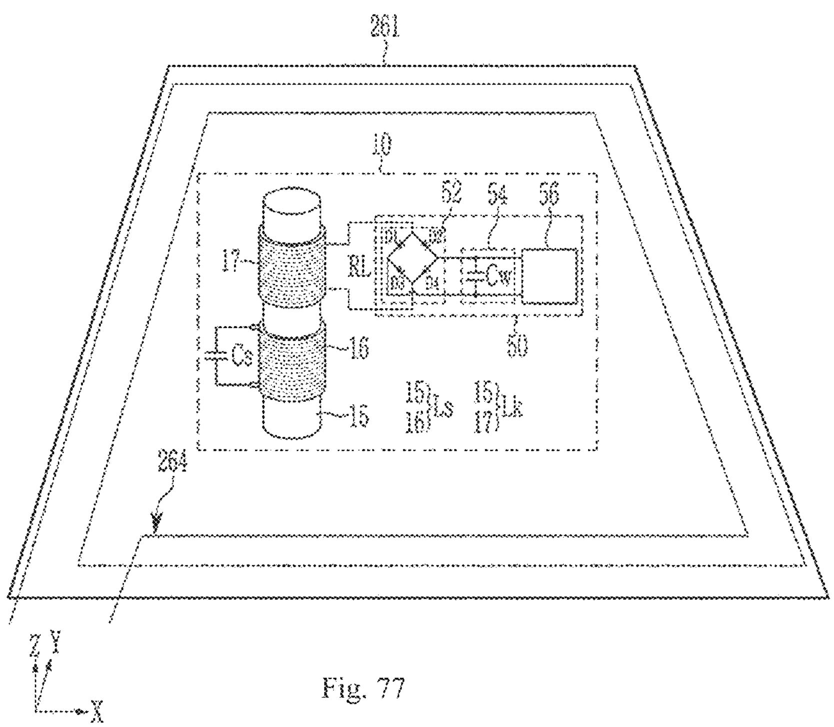

FIGS. 75 to 77 are diagrams illustrating a stylus pen and a part of an electronic device according to various aspects of an embodiment.

Referring to FIGS. 75 to 77, the resonance circuit unit 12 includes an inductor Ls and a capacitor Cs, and the inductor Ls includes a ferrite core 15 and a coil 16 wound around the ferrite core 15.

As shown in FIG. 75, the inductor Lk includes a ferrite core 15 and a coil 17 wound on the outside of a coil 16 (directly wound around the ferrite core 15).

As shown in FIG. 76, the inductor Lk includes a ferrite core 15 and a coil 17 directly wound around the ferrite core 15 while positioned below the coil 16 (i.e., in the −Z-axis direction).

As shown in FIG. 77, the inductor Lk includes a ferrite core 15 and a coil 17 directly wound around the ferrite core 15 while positioned above the coil 16 (i.e., in the +Z-axis direction). do.

In FIGS. 75 to 77, the active module 50 is connected to the coil 17. The coil 16 and the coil 17 are close to the perfect coupling state, and the coupling coefficient between the coil 16 and the coil 17 has a value close to 1 (e.g., 0.9 or more and less than 1).

According to the stylus pen 10 of the present disclosure, the resonance circuit unit 12 and the active module 50 are coupled with a transformer, and there occurs an advantage that a voltage required to drive the active module 50 can be supplied through energy transmitted from the electronic device 2.

In addition, there is an advantage in that the stylus pen 10 can be charged more quickly.

In addition, there is an advantage in that power consumption in the electronic device 2 for charging the stylus pen 10 can be reduced.

Figure 78:
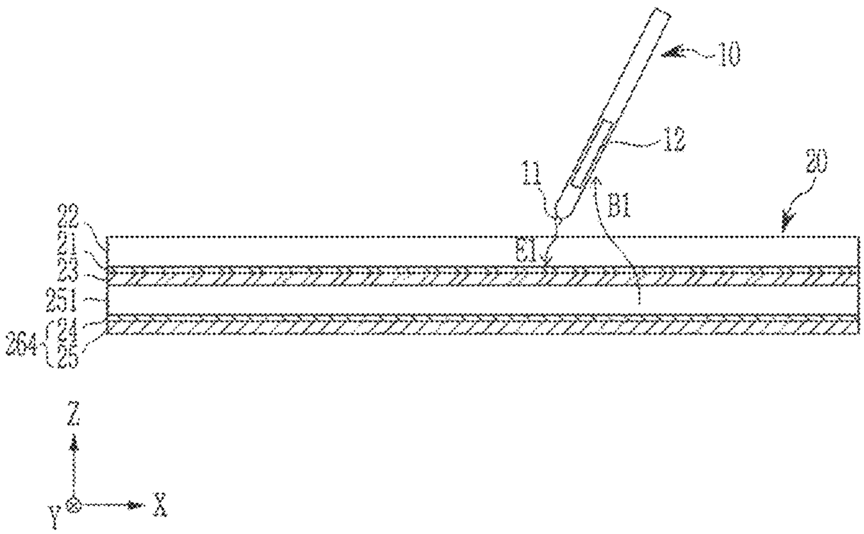
FIG. 78 is a diagram illustrating a case in which a stylus pen is used in an electronic device according to an embodiment.

FIG. 78 is a diagram illustrating a case in which a stylus pen is used in an electronic device according to an exemplary embodiment.

As shown in FIG. 78, the touch screen 20 of the electronic device includes a display panel 251, a touch sensor 261 on the display panel 251, and a loop coil 264 below the display panel 251.

The touch sensor 261 may include a substrate 23, a touch electrode layer 21 on the substrate, and a window 22 on the touch electrode layer 21.

The substrate 23 may be an encapsulation substrate of the display panel 251 or a color filter substrate of the display panel 251, which is preferably made of a transparent material.

The touch electrode layer 21 may include a plurality of first touch electrodes for detecting touch coordinates in a first direction and a plurality of second touch electrodes for detecting touch coordinates in a second direction crossing the first direction.

Although the touch electrode layer 21 is illustrated as a single layer in FIG. 78, the first touch electrodes and the second touch electrodes may be respectively located on different layers, they may or may not overlap each other, or a separate layer may be interposed between the first touch electrodes and the second touch electrodes. However, they are not limited thereto.

A window 22 may be positioned on the touch electrode layer 21. The touch electrode layer 21, the conductive tip 11, and the window 22 may form capacitance.

Accordingly, a signal (a resonance signal or an active touch signal) generated by the stylus pen 10 may be transmitted to the touch electrode layer 21 through the capacitance.

The loop coil 264 may include a substrate 24 on which an antenna loop is positioned and a ferrite sheet 25. The antenna loop may be formed of a conductive material such as copper, silver, or the like. However, the antenna loop may be located on the same layer as the touch electrode layer 21 in addition to the substrate 24. In this case, the antenna loop may be formed of a conductive material exhibiting high transmittance and low impedance, such as ITO, graphene, silver nanowire, or the like. The antenna loop may also be located under the window 22. In such cases, the substrate 24 may not be included in the loop coil 264.

The substrate 24 may be located on the rear surface of the display panel 251. For example, the substrate 24 may be attached to the rear surface of the display panel 251.

The substrate 24 may be a single layer FPCB, a double-sided FPCB, or a multilayer FPCB, but it is preferably a single layer FPCB that is a single-sided FPCB or a double-sided FPCB in order to realize thinning and miniaturization of the touch screen 20. Since such a single layer FPCB can be made thin, it can be used in bendable, foldable, and stretchable electronic devices.

In addition, the substrate 24 may be a rigid PCB, but it is not limited thereto.

When the substrate 24 is formed of a double-sided FPCB, a conductive layer may be positioned on the other surface of one surface on which the antenna loop is positioned. The conductive layer is made of a conductive material, and may be, for example, a copper clad layer.

The substrate 24 may include a base film. The base film may be made of a polyimide resin, an epoxy resin, or other known flexible material. The base film may be flexible. At least one antenna loop formed of at least one wiring may be formed on the base film.

The antenna loop 241 formed on the substrate 24 will be described with reference to FIG. 79.

Figure 79:
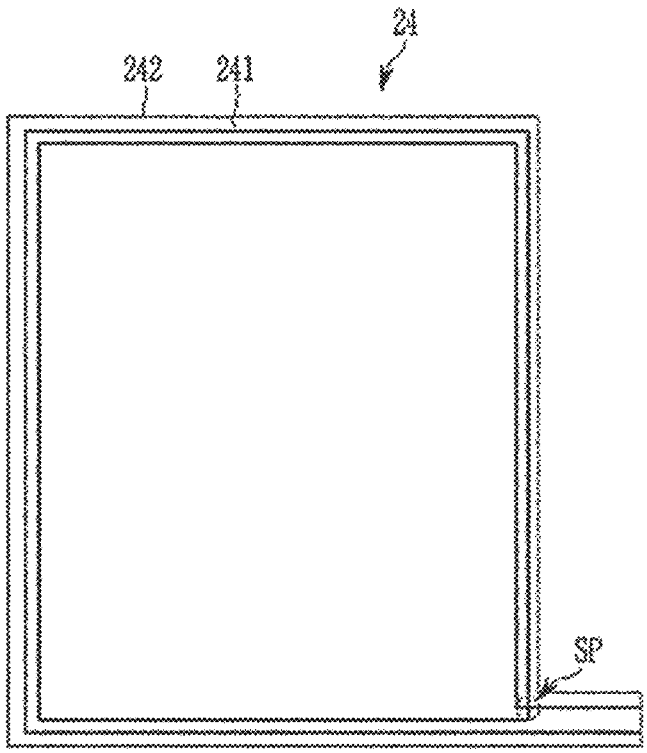
FIG. 79 is a diagram showing an example in which an antenna pattern is implemented on one surface of a substrate.

FIG. 79 is a view showing an example in which an antenna pattern is implemented on one surface of a substrate.

Referring to FIG. 79, the antenna loop 241 is formed as a conductive wire on the base film 242. For example, the antenna loop may be printed on the base film 242 by photolithography, thin film sputtering, or the like. The method for positioning the antenna loop on the base film 242 is not limited to the above description.

Depending on the design value of the inductance of the antenna loop 241 and the radiation performance of the antenna loop 241, the antenna loop 241 has a spiral pattern. However, when the spiral pattern is implemented only on one surface of the base film 242, the wiring of the antenna loop 241 is shorted to each other at a point SP on one surface of the base film 242. Implementing such a spiral pattern using a double-sided PCB may be considered. For example, an opening or a hole may be formed in the base film 242, and a wiring located on one surface may be connected to a wiring located on the other surface through the opening or hole. However, when the copper foil is attached to the other surface of the double-sided PCB, a problem in which the wiring and the copper foil located on the other surface are in contact with each other or are electrically connected may occur.

Figure 80:
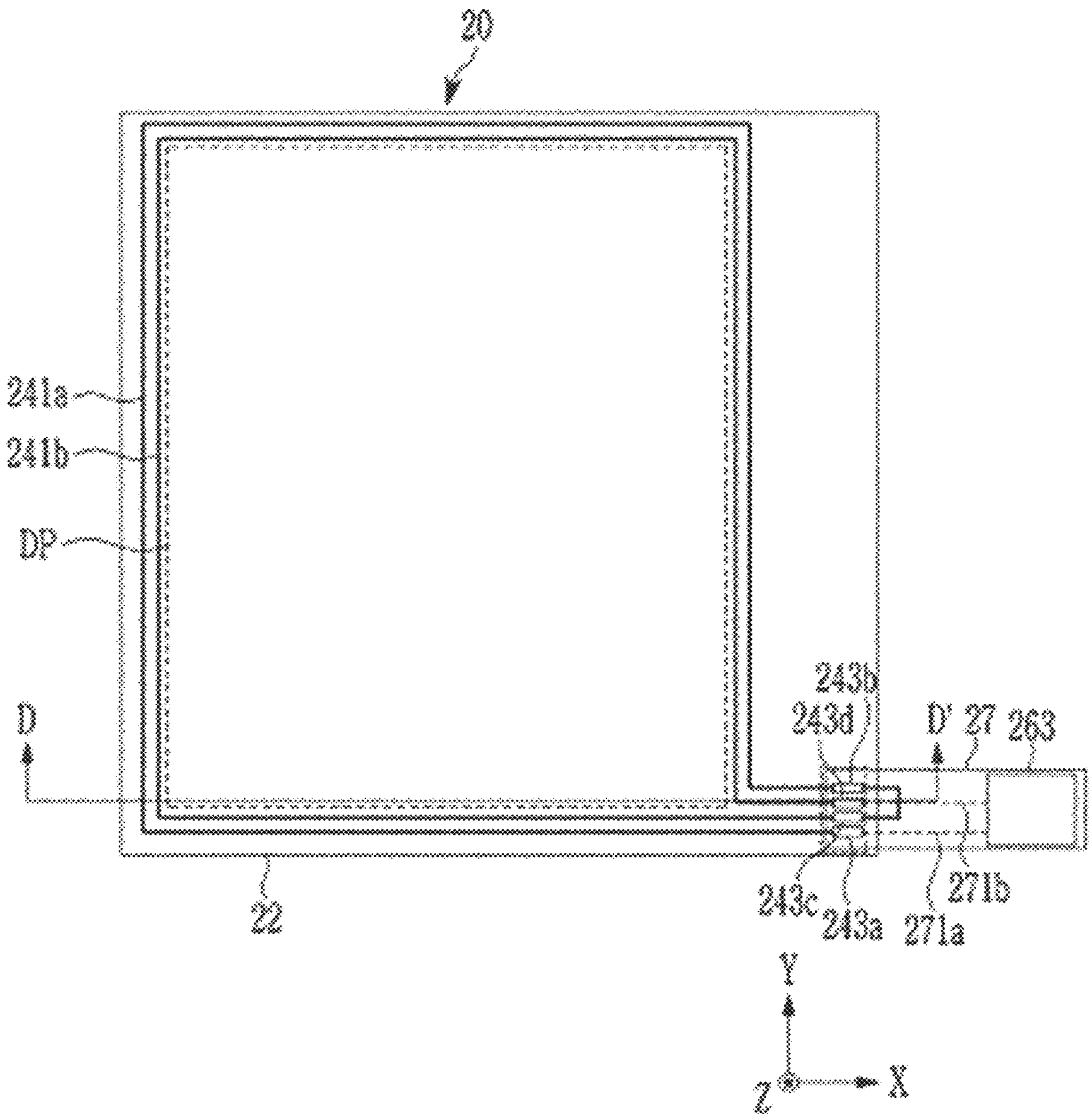
FIGS. 80 and 81 are diagrams illustrating a part of an antenna module and an electronic device including the same according to an embodiment.
Figure 81:
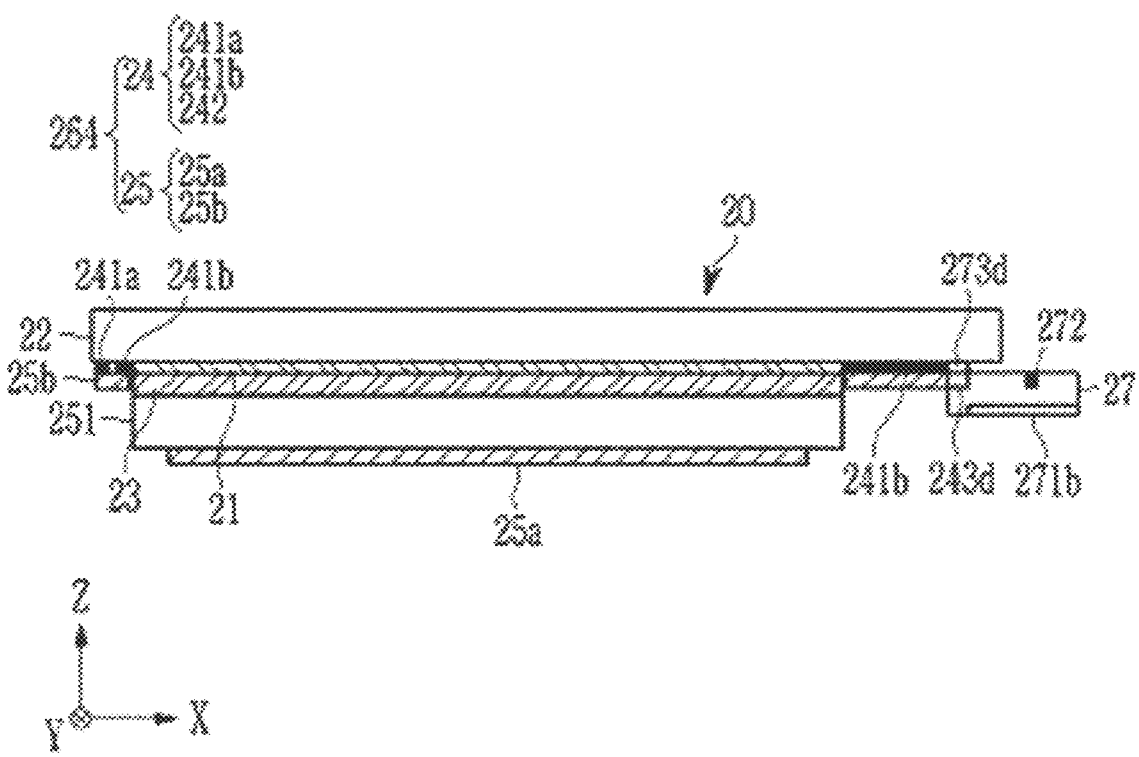

FIGS. 80 and 81 are diagrams illustrating a part of an antenna module and an electronic device including the same according to an embodiment.

As shown in FIGS. 80 and 81, the loop coil 264 includes antenna loops 241*a*, 241*b* positioned under the window 22, a ferrite sheet 25*a* positioned under the display panel 251, and the antenna loop and a ferrite sheet 25*b* positioned below the 241*a*, 241*b*.

FIG. 81 is a cross-sectional view taken along the line D-D' of FIG. 80. As shown in FIG. 81, the antenna loops 241*a*, 241*b* may be printed on the window 22 by a method such as photolithography, thin film sputtering, or the like, or may be printed on a sheet by photolithography, thin film deposition (sputtering), etc., and attached to the window 22. The method for positioning the antenna loops 241*a*, 241*b* on the window 22 is not limited to the above description.

Each of the plurality of sub-antenna loops 241*a*, 241*b* is spaced apart from each other on one surface of the window 22 and does not directly contact each other. One end of the first sub-antenna loop 241*a* is connected to one corresponding pad 243*a* among the plurality of pads, and the other end is connected to the other corresponding pad 243*b*. The second sub-antenna loop 241*b* has one end connected to a corresponding one pad 243*c* among the plurality of pads, and the other end connected to the other corresponding pad 243*d*.

Each of the plurality of sub-antenna loops 241*a*, 241*b* may be a conductive wire extending along the boundary of the display area DP. Although each of the plurality of sub-antenna loops 241*a*, 241*b* is illustrated as having an overall rectangular shape, it may have a shape such as a circle, an oval circle, a polygon, a polygon with rounded corners, and the like, but it is not limited thereto.

In addition, the first sub-antenna loop 241*a* is positioned at the outer shell of the second sub-antenna loop 241*b*. The first sub-antenna loop 241*a* may extend along the circumference of the second sub-antenna loop 241*b*. The shortest distance at which the adjacent first sub-antenna loop 241*a* and second sub-antenna loop 241*b* are spaced apart from each other may be the same on one surface of the window 22, but it is not limited thereto. The first sub-antenna loop 241*a* and the second sub-antenna loop 241*b* may be wires having the same width, but they are not limited thereto. The first sub-antenna loop 241*a* and the second sub-antenna loop 241*b* may be made of the same material, but they are not limited thereto.

The flexible circuit board 27 may be connected to the plurality of pads 243*a*, 243*b*, 243*c*, 243*d*. The flexible circuit board 27 may be a flexible printed circuit board (FPCB) or a chip on film (COF). Since the coil driver 263 is mounted on the flexible circuit board 27, the flexible circuit board 27 will be described as a chip-on-film (COF) hereinafter.

The flexible circuit board 27 may be electrically connected to the plurality of pads 243*a*, 243*b*, 243*c*, 243*d*. For example, the plurality of pads (not shown therein) on the flexible circuit board 27 connected to the plurality of signal transmission wires 271*a*, 271*b* and the connection wire 272 may be coupled through the plurality of pads 243*a*, 243*b*, 243*c*, 243*d* and the connector 26. The connector 26 may be a zero-insertion force connector (ZIF), a board-to-board connector (BTB), or the like, but it is not limited thereto. A plurality of pads (not shown therein) and a plurality of pads 243*a*, 243*b*, 243*c*, 243*d* may be electrically connected to each other in the manner that a socket of the connector 26 is formed in the window 22, and the flexible circuit board 27 is inserted into the socket of the connector 26.

As another example, the plurality of pads (not shown therein) of the flexible circuit board 27 may be bonded to the plurality of pads 243*a*, 243*b*, 243*c*, 243*d*. For example, a plurality of pads (not shown therein) connected to the plurality of signal transmission wires 271*a*, 271*b* and the connection wire 272 on the flexible circuit board 27, and a plurality of pads 243*a*, 243*b*, 243*c*, 243*d* may be connected by an anisotropic conductive film (ACF) by means of an outer lead bonding (OLB) method.

In addition to this, various connection methods for electrically and physically connecting the plurality of pads (not shown therein) and the plurality of pads 243*a*, 243*b*, 243*c*, 243*d* may be used.

The flexible circuit board 27 includes a plurality of signal transmission wires 271*a*, 271*b* positioned on one surface of the substrate and a connection wire 272 positioned on the other surface. The wires 271*a*, 271*b*, 272 may be printed by a method such as photolithography, thin film sputtering, or the like. The method for positioning the wires 271*a*, 271*b*, 272 on the flexible circuit board 27 is not limited to the above description. In addition, although it has been described in the above that the signal transmission wires 271*a*, 271*b* and the connection wire 272 are respectively located on both surfaces of one substrate, they may be respectively located on different substrates. They are not limited thereto.

The signal transmission wire 271*a* connects the pad 243*a* connected to the first sub-antenna loop 241*a* and the coil driver 263, respectively, and the signal transmission wire 271*b* connects the pad 243*d* connected to the second sub-antenna loop 241*b* and the coil driver 263.

The connection wire 272 connects the pad 243*b* connected to the first sub-antenna loop 241*a* and the pad 243*c* connected to the second sub-antenna loop 241*b* to each other. That is, the first sub-antenna loop 241*a* and the second sub-antenna loop 241*b* are electrically connected to each other through the connection wire 272 located on the flexible circuit board 27. Accordingly, the current input from the coil driver 263 to the pad 243*a* through the signal transmission wire 271*a* flows in the order from the first sub-antenna loop 241*a*, the pad 243*b*, the connection wire 272, the pad 243*c*, the second sub-antenna loop 241*b*, the pad 243*d* to the signal transmission wire 271*b*.

That is, according to the antenna module according to the embodiment, it has substantially the same effect as the antenna loop formed in the spiral pattern without forming wiring in the spiral pattern on the base film 242. In this antenna module, since all wiring is formed on one surface of the window 22, manufacturing cost is reduced and the touch screen 20 is thinned and miniaturized.

Figure 82:
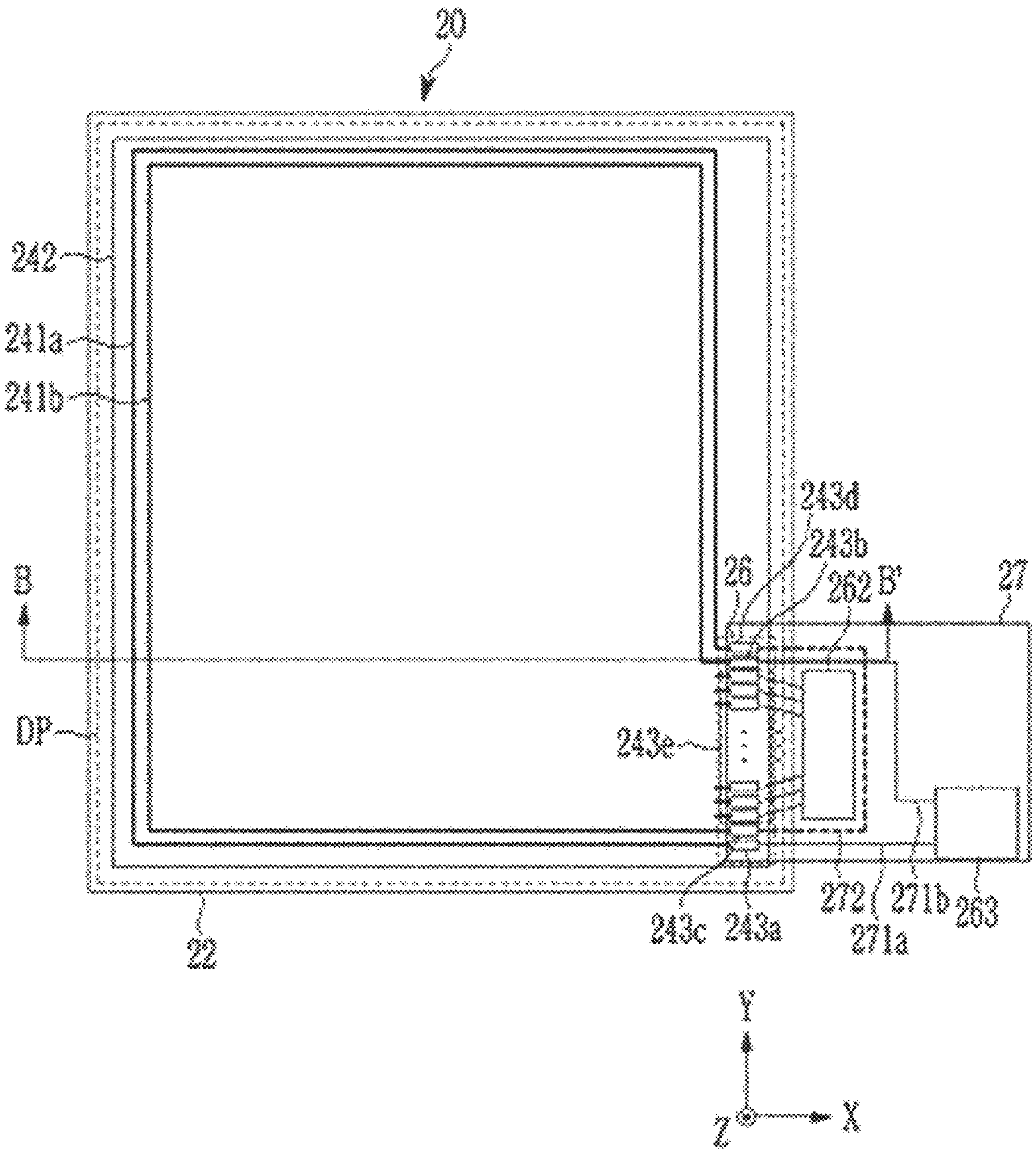
FIGS. 82 and 83 are diagrams illustrating a part of an antenna module and an electronic device including the same according to an embodiment.
Figure 83:
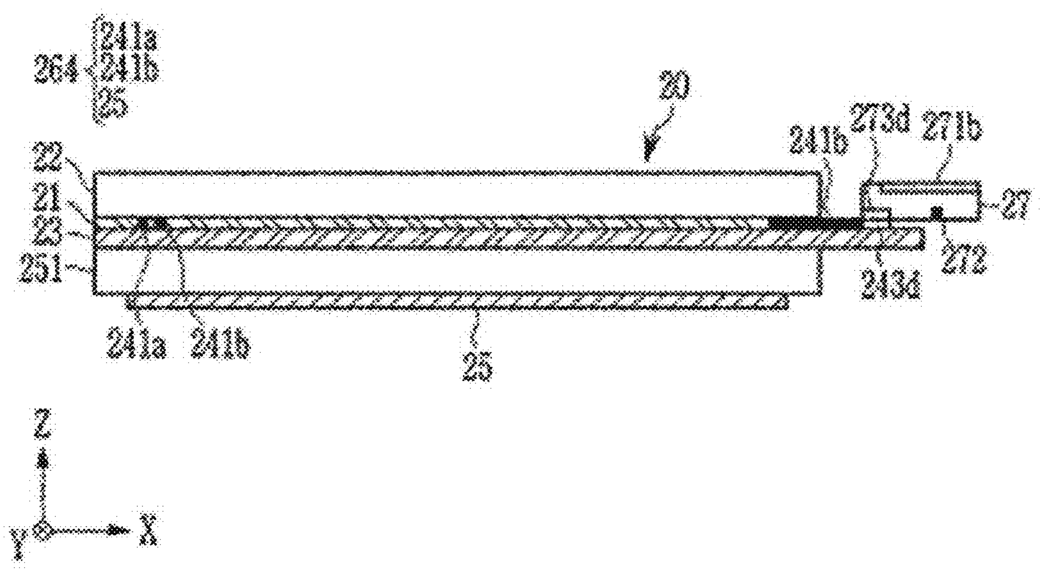

FIGS. 82 and 83 are diagrams illustrating a part of an antenna module and an electronic device including the same according to an embodiment.

In FIGS. 82 and 83, when the touch sensor 261 is implemented as an on-cell type touch sensor, a loop coil 264 including an antenna loop 241 positioned on the same layer as the touch electrode layer 21 is shown.

As shown in FIGS. 82 and 83, the loop coil 264 includes an antenna loop 241 positioned on the touch electrode layer 21 and a ferrite sheet 25 positioned under the display panel 251.

FIG. 83 is a cross-sectional view taken along the line B-B' in FIG. 82. As shown in FIG. 83, the antenna loops 241*a*, 241*b* and the touch electrode layer 21 are positioned in the same layer on the encapsulation substrate 23 of the display panel 251. The antenna loops 241*a*, 241*b* may be made of the same material as the first and second touch electrodes of the touch electrode layer 21. For example, the antenna loops 241*a*, 241*b* may be formed of a conductive material exhibiting high transmittance and low impedance, such as ITO, graphene, silver nanowire, or the like. However, the antenna loops 241*a*, 241*b* may be positioned as a different layer from the touch electrode layer 21, and may be made of a material different from that of the first and second touch electrodes.

Each of the plurality of sub-antenna loops 241*a*, 241*b* is spaced apart from each other on one surface of the encapsulation substrate 23 and does not directly contact each other. One end of the first sub-antenna loop 241*a* is connected to one corresponding pad 243*a* among the plurality of pads, and the other end is connected to the other corresponding pad 243*b*. One end of the second sub-antenna loop 241*b* is connected to one corresponding pad 243*c* among the plurality of pads, and the other end is connected to the other corresponding pad 243*d*. On the other hand, the first touch electrodes and the second touch electrodes are connected to the pads 243*e*.

Each of the plurality of sub-antenna loops 241*a*, 241*b* may be a conductive wire extending along the boundary of the display area DP. Although each of the plurality of sub-antenna loops 241*a*, 241*b* is illustrated as having an overall rectangular shape, it may have a shape such as a circle, an oval circle, a polygon, a polygon with rounded corners, and the like, but it is not limited thereto.

In addition, the first sub-antenna loop 241*a* is positioned at the outer shell of the second sub-antenna loop 241*b*. The first sub-antenna loop 241*a* may extend along the circumference of the second sub-antenna loop 241*b*. The shortest distance at which the adjacent first sub-antenna loop 241*a* and second sub-antenna loop 241*b* are spaced apart from each other may be the same on one surface of the encapsulation substrate 23, but it is not limited thereto. The first sub-antenna loop 241*a* and the second sub-antenna loop 241*b* may be wires having the same width, but they are not limited thereto. The first sub-antenna loop 241*a* and the second sub-antenna loop 241*b* may be made of the same material, but they are not limited thereto.

The flexible circuit board 27 may be connected to the plurality of pads 243*a*, 243*b*, 243*c*, 243*d* of the encapsulation substrate 23.

A plurality of pads (not shown therein) of the flexible circuit board 27 connected to the plurality of signal transmission wires 271*a*, 271*b* and the connection wire 272 may be electrically connected to the plurality of pads 243*a*, 243*b*, 243*c*, 243*d*. A plurality of pads (not shown therein) may be bonded to the plurality of pads 243*a*, 243*b*, 243*c*, 243*d*. For example, the plurality of pads (not shown therein) and the plurality of pads 243*a*, 243*b*, 243*c*, 243*d* may be connected to each other by an anisotropic conductive film (ACF) or the like using an outer lead bonding (OLB) method.

In addition to this, various connection methods for electrically and physically connecting the plurality of pads (not shown therein) and the plurality of pads 243*a*, 243*b*, 243*c*, 243*d* may be used.

The flexible circuit board 27 includes a plurality of signal transmission wires 271*a*, 271*b* positioned on one surface of the substrate and a connection wire 272 positioned on the other surface. The wires 271*a*, 271*b*, 272 may be printed by a method such as photolithography, thin film sputtering, or the like. The method for positioning the wires 271*a*, 271*b*, 272 on the flexible circuit board 27 is not limited to the above description. In addition, although it has been described in the above that the signal transmission wires 271*a*, 271*b* and the connection wire 272 are respectively located on both sides of one substrate, they may be located on different substrates, and they are not limited thereto.

The signal transmission wire 271*a* connects the pad 243*a* connected to the first sub-antenna loop 241*a* and the coil driver 263, respectively, and the signal transmission wire 271*b* connects the pad 243*d* connected to the second sub-antenna loop 241*b* and the coil driver 263.

The connection wire 272 connects the pad 243*b* connected to the first sub-antenna loop 241*a* and the pad 243*c* connected to the second sub-antenna loop 241*b* to each other. That is, the first sub-antenna loop 241*a* and the second sub-antenna loop 241*b* are electrically connected to each other through the connection wire 272 located on the flexible circuit board 27. Accordingly, the current drawn from the coil driver 263 to the pad 243*a* through the signal transmission wire 271*a* flows in the order from the first sub-antenna loop 241*a*, the pad 243*b*, the connection line 272, the pad 243*c*, the second sub-antenna loop 241*b*, the pad 243*d*, to the signal transmission wire 271*b*.

That is, according to the antenna module according to an embodiment, it has substantially the same effect as the antenna loop formed in the spiral pattern without forming a wiring in the spiral pattern on the encapsulation substrate 23. This antenna module has the effect of reducing the manufacturing cost and reducing the thickness and size of the touch screen 20 because the wiring is all formed on one surface of the encapsulation substrate 23.

Figure 84:
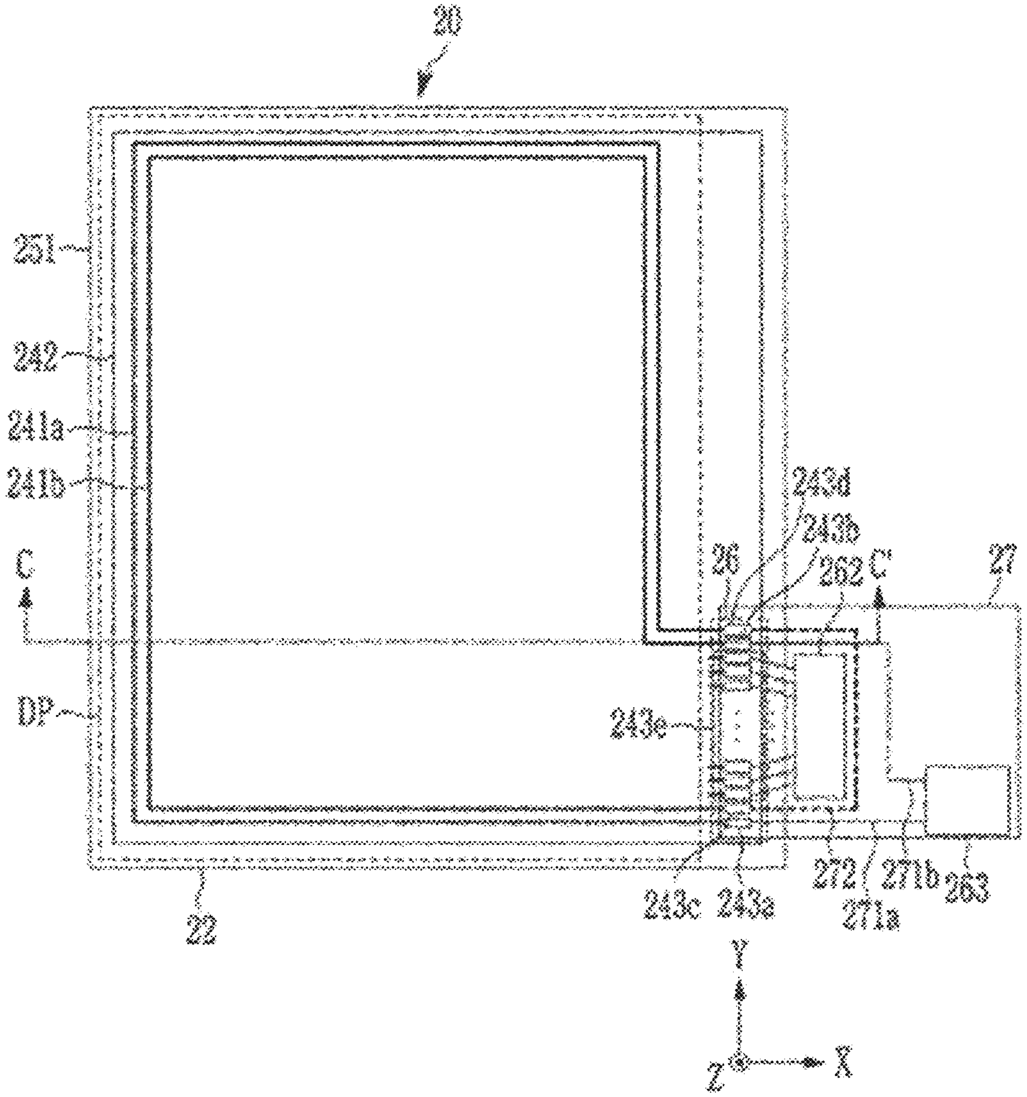
FIGS. 84 and 85 are diagrams illustrating a part of an antenna module and an electronic device including the same according to an embodiment.
Figure 85:
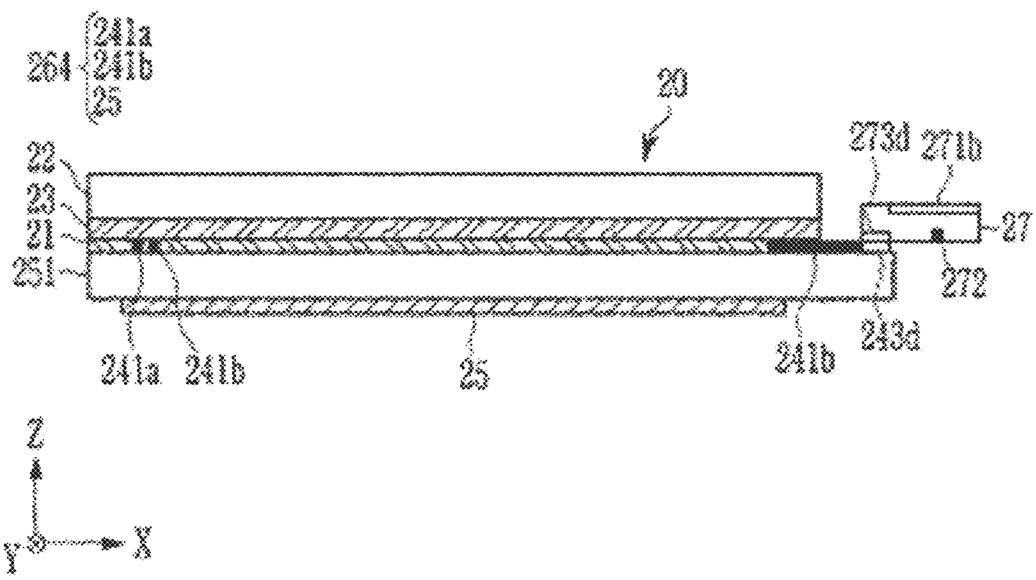

FIGS. 84 and 85 are views illustrating a part of an antenna module and an electronic device including the same according to an embodiment. FIGS. 84 and 85 show a loop coil 264 including an antenna loop 241 positioned on the same layer as the touch electrode layer 21 when the touch sensor 261 is implemented as an in-cell type touch sensor.

As shown in FIGS. 84 and 85, the loop coil 264 includes an antenna loop 241 positioned on the touch electrode layer 21 and a ferrite sheet 25 positioned under the display panel 251.

FIG. 85 is a cross-sectional view taken along the line C-C' in FIG. 84. As shown in FIG. 85, the antenna loops 241*a*, 241*b* and the touch electrode layer 21 may be positioned between the color filter substrate 23 of the display panel 251 and the TFT substrate of the display panel 251 as the same layer. Both the touch electrode layer 21 and the antenna loops 241*a*, 241*b* may be positioned on the upper and lower sides of the color filter substrate 23.

The antenna loops 241*a*, 241*b* may be made of the same material as the first and second touch electrodes of the touch electrode layer 21. For example, the antenna loops 241*a*, 241*b* may be formed of a conductive material exhibiting high transmittance and low impedance, such as ITO, graphene, silver nanowire, or the like. However, the antenna loops 241*a*, 241*b* may be positioned in a layer different from that of the touch electrode layer 21, and may be made of a material different from that of the first and second touch electrodes.

Each of the plurality of sub-antenna loops 241*a*, 241*b* is spaced apart from each other on one surface of the color filter substrate 23 and does not directly contact each other. One end of the first sub-antenna loop 241*a* is connected to one corresponding pad 243*a* among the plurality of pads, and the other end is connected to the other corresponding pad 243*b*. One end of the second sub-antenna loop 241*b* is connected to one corresponding pad 243*c* among the plurality of pads, and the other end is connected to the other corresponding pad 243*d*. On the other hand, the first touch electrodes and the second touch electrodes are connected to the pads 243*e*.

Each of the plurality of sub-antenna loops 241*a*, 241*b* may be a conductive wire extending along the boundary of the display area DP. Although each of the plurality of sub-antenna loops 241*a*, 241*b* is illustrated as having an overall rectangular shape, it may have a shape such as a circle, an oval circle, a polygon, a polygon with rounded corners, and the like, but it is not limited thereto.

In addition, the first sub-antenna loop 241*a* is positioned at the outer shell of the second sub-antenna loop 241*b*. The first sub-antenna loop 241*a* may extend along the circumference of the second sub-antenna loop 241*b*. The shortest distance at which the adjacent first sub-antenna loop 241*a* and second sub-antenna loop 241*b* are spaced apart from each other may be the same on one surface of the color filter substrate 23, but it is not limited thereto. The first sub-antenna loop 241*a* and the second sub-antenna loop 241*b* may be wires having the same width, but they are not limited thereto. The first sub-antenna loop 241*a* and the second sub-antenna loop 241*b* may be made of the same material, but they are not limited thereto.

The flexible circuit board 27 may be connected to the plurality of pads 243*a*, 243*b*, 243*c*, 243*d* of the color filter substrate 23.

A plurality of pads (not shown therein) of the flexible circuit board 27 connected to the plurality of signal transmission wires 271*a*, 271*b* and the connection wire 272 may be electrically connected to the plurality of pads 243*a*, 243*b*, 243*c*, 243*d*. A plurality of pads (not shown therein) may be bonded to the plurality of pads 243*a*, 243*b*, 243*c*, 243*d*. For example, the plurality of pads (not shown therein) and the plurality of pads 243*a*, 243*b*, 243*c*, 243*d* may be connected to each other by an anisotropic conductive film (ACF) or the like using an outer lead bonding (OLB) method.

In addition to this, various connection methods for electrically and physically connecting the plurality of pads (not shown therein) and the plurality of pads 243*a*, 243*b*, 243*c*, 243*d* may be used.

The flexible circuit board 27 includes a plurality of signal transmission wires 271*a*, 271*b* positioned on one surface of the substrate and a connection wire 272 positioned on the other surface. The wires 271*a*, 271*b*, 272 may be printed by a method such as photolithography, thin film sputtering, or the like. The method for positioning the wires 271*a*, 271*b*, 272 on the flexible circuit board 27 is not limited to the above description. In addition, although it has been described in the above that the signal transmission wires 271*a*, 271*b* and the connection wire 272 are respectively located on both sides of one substrate, they may be located on different substrates, and they are not limited thereto.

The signal transmission wire 271*a* connects the pad 243*a* connected to the first sub-antenna loop 241*a* and the coil driver 263, respectively, and the signal transmission wire 271*b* connects the pad 243*d* connected to the second sub-antenna loop 241*b* and the coil driver 263.

The connection wire 272 connects the pad 243*b* connected to the first sub-antenna loop 241*a* and the pad 243*c* connected to the second sub-antenna loop 241*b* to each other. That is, the first sub-antenna loop 241*a* and the second sub-antenna loop 241*b* are electrically connected to each other through the connection wire 272 located on the flexible circuit board 27. Accordingly, the current input from the coil driver 263 to the pad 243*a* through the signal transmission wire 271*a* flows in the order from the first sub-antenna loop 241*a*, the pad 243*b*, the connection wire 272, the pad 243*c*, the second sub-antenna loop 241*b*, the pad 243*d*, to the signal transmission wire 271*b*.

That is, according to the antenna module according to an embodiment, it has substantially the same effect as the antenna loop formed in the spiral pattern without forming a wiring in the spiral pattern on the color filter substrate 23. In such an antenna module, since the wiring is all formed on one surface of the color filter substrate 23, manufacturing cost is reduced and the touch screen 20 is thinned and miniaturized.

Figure 86:
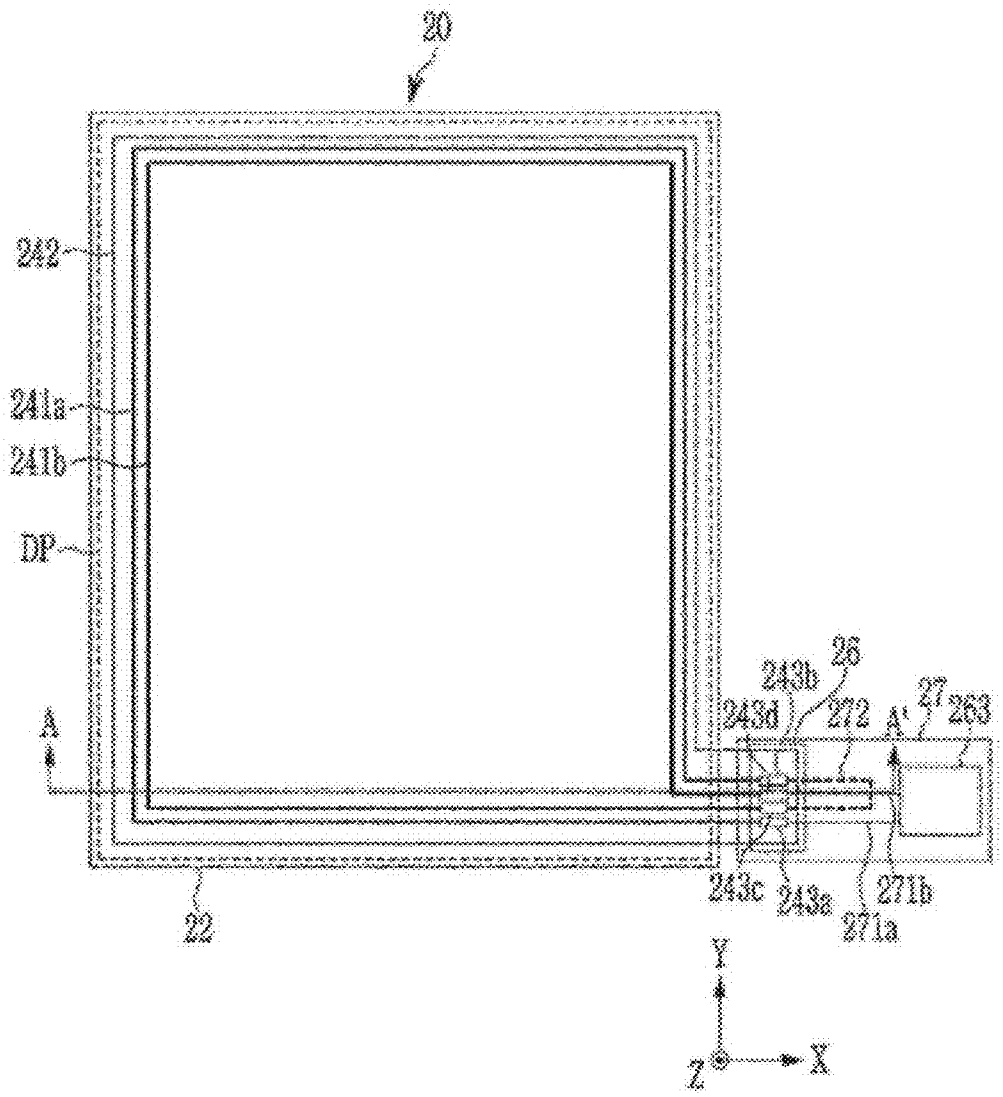
FIGS. 86 to 88 are diagrams illustrating a part of an antenna module and an electronic device including the same according to an embodiment.
Figure 87:
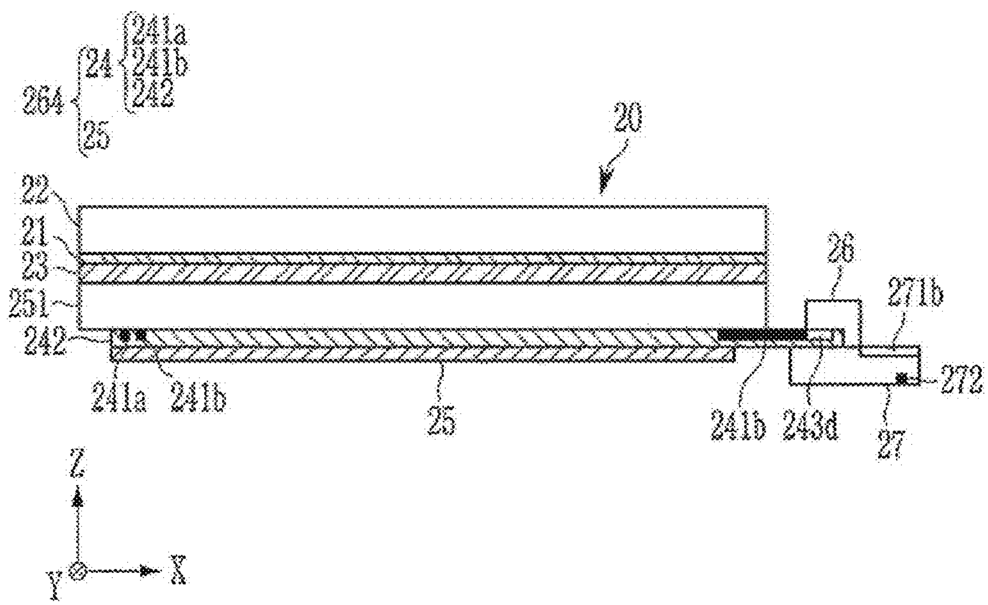
Figure 88:
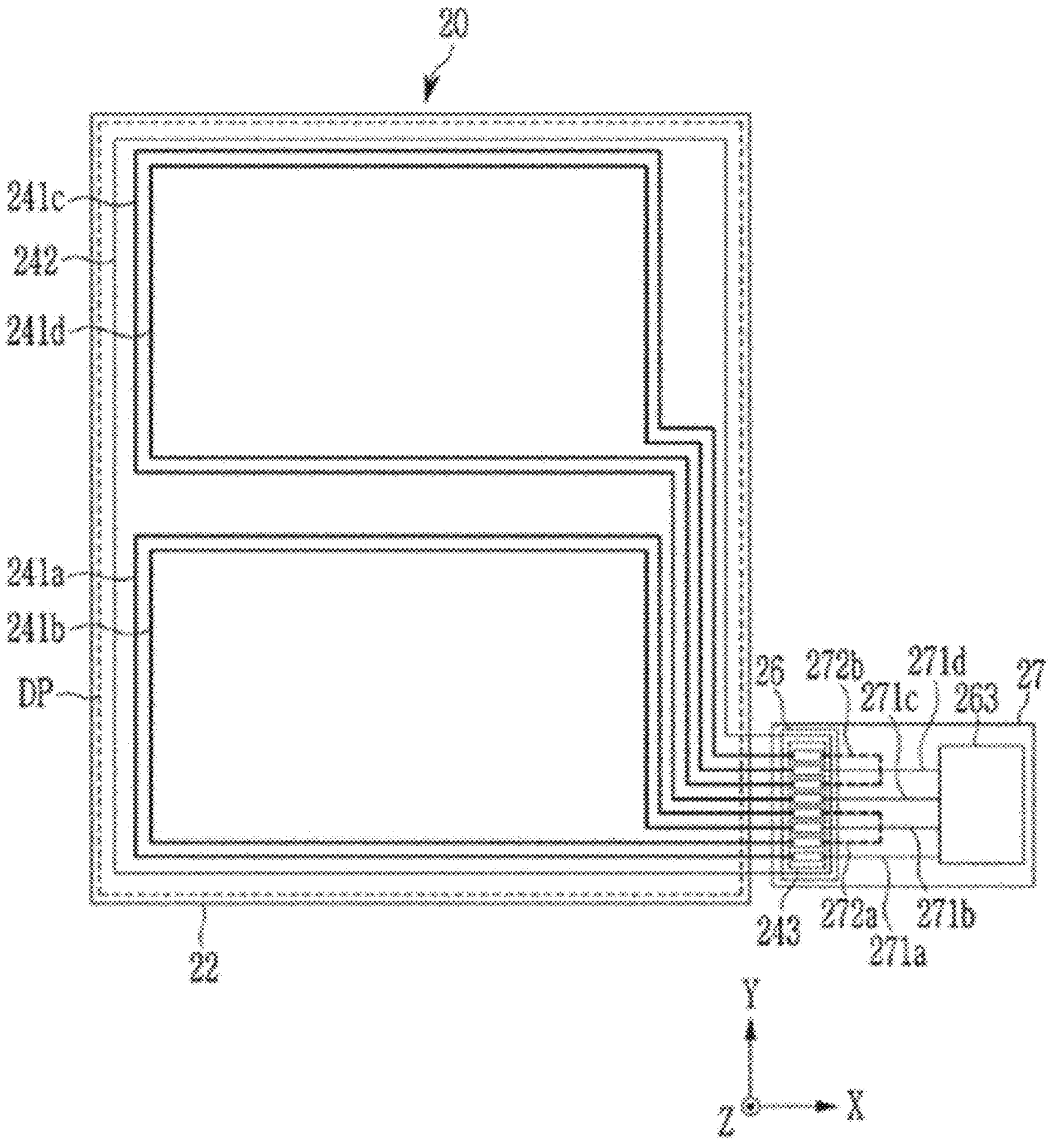

FIGS. 86 to 88 are views illustrating a part of an antenna module and an electronic device including the same according to an embodiment.

As shown in FIG. 86, a plurality of sub-antenna loops 241*a*, 241*b* are positioned on the base film 242. The antenna loop 241 may be formed of a conductive material exhibiting high transmittance and low impedance, such as ITO, graphene, silver nanowire, or the like.

FIG. 87 is a cross-sectional view taken along the line A-A' in FIG. 86. As shown in FIG. 87, the plurality of sub-antenna loops 241*a*, 241*b* is illustrated as being positioned on one surface of the base film 242 spaced apart from the ferrite sheet 25, but it is not limited thereto.

Each of the plurality of sub-antenna loops 241*a*, 241*b* is spaced apart from each other on one surface of the base film 242 and does not directly contact each other. One end of the first sub-antenna loop 241*a* is connected to one corresponding pad 243*a* among the plurality of pads, and the other end is connected to the other corresponding pad 243*b*. One end of the second sub-antenna loop 241*b* is connected to one corresponding pad 243*c* among the plurality of pads, and the other end is connected to the other corresponding pad 243*d*.

Each of the plurality of sub-antenna loops 241*a*, 241*b* may be a conductive wire extending along the boundary of the display area DP. Although each of the plurality of sub-antenna loops 241*a*, 241*b* is illustrated as having an overall rectangular shape, it may have a shape such as a circle, an oval circle, a polygon, a polygon with rounded corners, and the like, but it is not limited thereto.

In addition, the first sub-antenna loop 241*a* is positioned at the outer shell of the second sub-antenna loop 241*b*. The first sub-antenna loop 241*a* may extend along the circumference of the second sub-antenna loop 241*b*. The shortest distance at which the adjacent first sub-antenna loop 241*a* and the second sub-antenna loop 241*b* are spaced apart from each other may be the same on one surface of the base film 242, but it is not limited thereto. The first sub-antenna loop 241*a* and the second sub-antenna loop 241*b* may be wires having the same width, but they are not limited thereto. The first sub-antenna loop 241*a* and the second sub-antenna loop 241*b* may be made of the same material, but they are not limited thereto.

The flexible circuit board 27 may be connected to the plurality of pads 243*a*, 243*b*, 243*c*, 243*d* of the base film 242. The flexible circuit board 27 may be a flexible printed circuit board (FPCB). A coil driver 263 is mounted on the flexible circuit board 27.

The flexible circuit board 27 may be electrically connected to the plurality of pads 243*a*, 243*b*, 243*c*, 243*d*. For example, the plurality of pads (not shown therein) on the flexible circuit board 27 connected to the plurality of signal transmission wires 271*a*, 271*b* and the connection wire 272 may be coupled through the plurality of pads 243*a*, 243*b*, 243*c*, 243*d* and the connector 26. The connector 26 may be a zero-insertion force connector (ZIF), a board-to-board connector (BTB), or the like, but it is not limited thereto. A plurality of pads (not shown therein) and a plurality of pads 243*a*, 243*b*, 243*c*, 243*d* may be electrically connected to each other in the manner that a socket for the connector 26 is formed on the substrate 24, and the flexible circuit board 27 is inserted into the socket of the connector 26.

As another example, the plurality of pads (not shown therein) of the flexible circuit board 27 may be bonded to the plurality of pads 243*a*, 243*b*, 243*c*, 243*d*. For example, a plurality of pads (not shown therein) connected to the plurality of signal transmission wires 271*a*, 271*b* and the connection wire 272 on the flexible circuit board 27 and a plurality of pads 243*a*, 243*b*, 243*c*, 243*d* may be connected by an anisotropic conductive film (ACF) using an outer lead bonding (OLB) method.

In addition, various connection methods for electrical and physical connection of the plurality of pads (not shown therein) of the flexible circuit board 27 and the plurality of pads 243*a*, 243*b*, 243*c*, 243*d* may be used.

The flexible circuit board 27 includes a plurality of signal transmission wires 271*a*, 271*b* positioned on one surface of the substrate and a connection wire 272 positioned on the other surface. The wires 271*a*, 271*b*, 272 may be printed by a method such as photolithography, thin film sputtering, or the like. The method for positioning the wires 271*a*, 271*b*, 272 on the flexible circuit board 27 is not limited to the above description. In addition, although it has been described in the above that the signal transmission wires 271*a*, 271*b* and the connection wire 272 are respectively located on both sides of one substrate, they may be located on different substrates, and they are not limited thereto.

The signal transmission wire 271*a* connects the pad 243*a* connected to the first sub-antenna loop 241*a* and the coil driver 263, respectively, and the signal transmission wire 271*b* connects the pad 243*d* connected to the second sub-antenna loop 241*b* and the coil driver 263.

The connection wire 272 connects the pad 243*b* connected to the first sub-antenna loop 241*a* and the pad 243*c* connected to the second sub-antenna loop 241*b* to each other. That is, the first sub-antenna loop 241*a* and the second sub-antenna loop 241*b* are electrically connected to each other through the connection wire 272 located on the flexible circuit board 27. Accordingly, the current input from the coil driver 263 to the pad 243*a* through the signal transmission wire 271*a* flows in the order from the first sub-antenna loop 241*a*, the pad 243*b*, the connection wire 272, the pad 243*c*, the second sub-antenna loop 241*b*, the pad 243*d*, to the signal transmission wire 271*b*.

That is, according to the antenna module according to an embodiment, it has substantially the same effect as the antenna loop formed in the spiral pattern without forming a wiring in the spiral pattern on the base film 242. In this antenna module, since the wiring is all formed on one surface of the base film 242, a copper clad layer may be formed on the other surface, thereby reducing manufacturing cost and reducing the thickness and size of the touch screen 20.

In the above description, an example of implementing a spiral pattern using two sub-antenna loops has been described, but according to a design, each sub-antenna loop is connected by a connection wire 272 formed on the multi-layer board of the flexible circuit board 27. By doing so, a spiral pattern can be implemented using three or more sub-antenna loops.

As shown in FIG. 88, a plurality of antenna loops may be positioned on the touch screen 20. The first sub-antenna loop 241*a*, the connection wire 272*a*, and the second sub-antenna loop 241*b* form a first antenna loop of a spiral pattern. The third sub-antenna loop 241*c*, the connection wire 272*b*, and the fourth sub-antenna loop 241*d* form a second antenna loop of a spiral pattern. The first antenna loop and the second antenna loop are spaced apart from each other in the y-axis direction. Here, the ferrite sheet 25 may be individually disposed in an area in which the first antenna loop is located and in an area in which the second antenna loop is located.

The coil driver 263 may apply a driving signal having the same or similar phase to the first antenna loop and the second antenna loop, may apply a driving signal having an opposite phase, or may selectively drive the driving signal.

Figure 89:
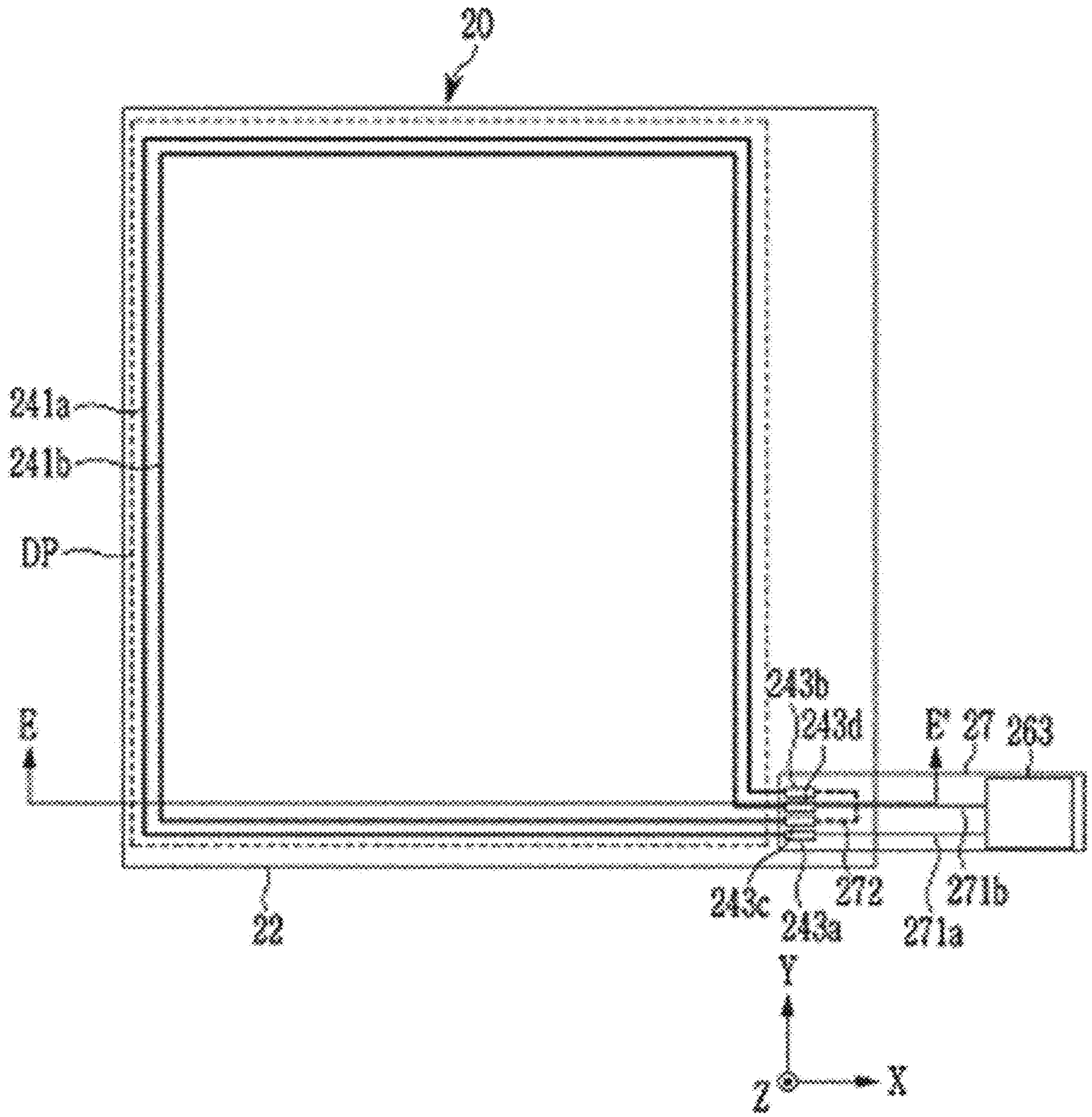
FIGS. 89 and 90 are diagrams illustrating a part of an antenna module and an electronic device including the same according to an embodiment.
Figure 90:
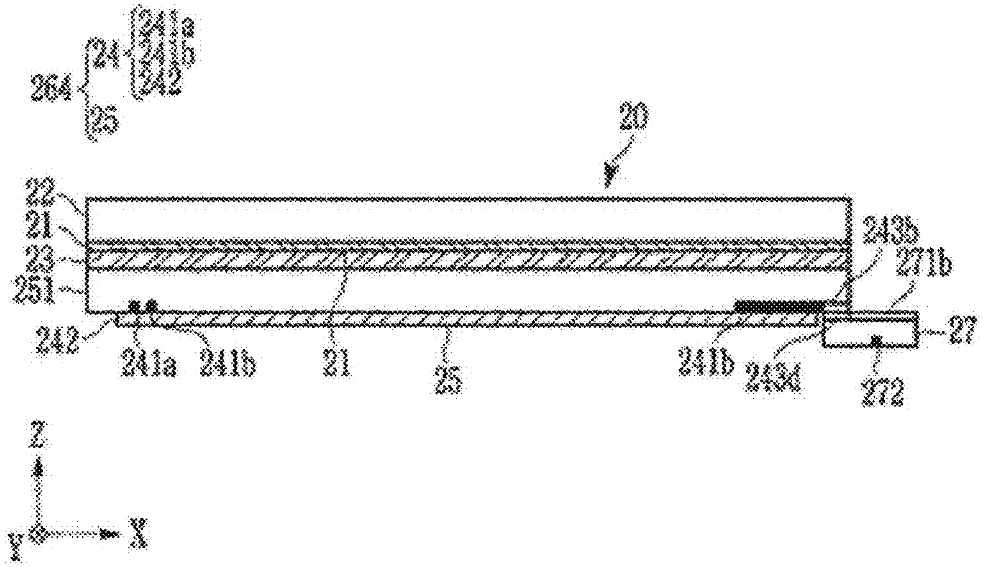

FIGS. 89 and 90 are views illustrating a part of an antenna module and an electronic device including the same according to an embodiment.

As shown in FIGS. 89 and 90, the loop coil 264 includes the antenna loops 241*a*, 241*b* located below the display panel 251, and the ferrite sheet 25 located below the antenna loops 241*a*, 241*b* and the display panel 251.

FIG. 90 is a cross-sectional view taken along the line D-D' in FIG. 89. As shown in FIG. 90, the antenna loops 241*a*, 241*b* may be printed on the display panel 251 by a method such as photolithography, thin film sputtering, or the like, and the method for positioning the antenna loops 241*a*, 241*b* on the display panel 251 is not limited to the above description.

Each of the plurality of sub-antenna loops 241*a*, 241*b* is spaced apart from each other on one surface of the display panel 251 and does not directly contact each other. One end of the first sub-antenna loop 241*a* is connected to one corresponding pad 243*a* among the plurality of pads, and the other end is connected to the other corresponding pad 243*b*. One end of the second sub-antenna loop 241*b* is connected to one corresponding pad 243*c* among the plurality of pads, and the other end is connected to the other corresponding pad 243*d*. The plurality of pads 243*a*, 243*b*, 243*c*, 243*d* may be formed on one surface of the display panel 251.

Each of the plurality of sub-antenna loops 241*a*, 241*b* may be a conductive wire extending along the boundary of the display area DP. Although each of the plurality of sub-antenna loops 241*a*, 241*b* is illustrated as having an overall rectangular shape, it may have a shape such as a circle, an oval circle, a polygon, a polygon with rounded corners, and the like, but it is not limited thereto.

In addition, the first sub-antenna loop 241*a* is positioned at the outer shell of the second sub-antenna loop 241*b*. The first sub-antenna loop 241*a* may extend along the circumference of the second sub-antenna loop 241*b*. The shortest distance at which the adjacent first sub-antenna loop 241*a* and second sub-antenna loop 241*b* are spaced apart from each other may be the same on one surface of the display panel 251, but it is not limited thereto. The first sub-antenna loop 241*a* and the second sub-antenna loop 241*b* may be wires having the same width, but they are not limited thereto. The first sub-antenna loop 241*a* and the second sub-antenna loop 241*b* may be made of the same material, but they are not limited thereto.

The flexible circuit board 27 may be connected to the plurality of pads 243*a*, 243*b*, 243*c*, 243*d*. The flexible circuit board 27 may be a flexible printed circuit board (FPCB) or a chip on film (COF). Since the coil driver 263 is mounted on the flexible circuit board 27, the flexible circuit board 27 will be described as a chip-on-film (COF) hereinafter.

The flexible circuit board 27 may be electrically connected to the plurality of pads 243*a*, 243*b*, 243*c*, 243*d*. For example, the plurality of pads (not shown therein) on the flexible circuit board 27 connected to the plurality of signal transmission wires 271*a*, 271*b* and the connection wire 272 may be coupled through the plurality of pads 243*a*, 243*b*, 243*c*, 243*d* and the connector 26. The connector 26 may be a zero-insertion force connector (ZIF), a board-to-board connector (BTB), or the like, but it is not limited thereto. A plurality of pads (not shown therein) and a plurality of pads 243*a*, 243*b*, 243*c*, 243*d* may be electrically connected to each other in the manner that a socket for the connector 26 is formed in the display panel 251, and the flexible circuit board 27 is inserted into the socket of the connector 26.

As another example, the plurality of pads (not shown therein) of the flexible circuit board 27 may be bonded to the plurality of pads 243*a*, 243*b*, 243*c*, 243*d*. For example, a plurality of pads (not shown therein) connected to the plurality of signal transmission wires 271*a*, 271*b* and the connection wires 272 on the flexible circuit board 27, and a plurality of pads 243*a*, 243*b*, 243*c*, 243*d* may be connected by an anisotropic conductive film (ACF) using an outer lead bonding (OLB) method.

In addition to this, various connection methods for electrically and physically connecting the plurality of pads (not shown therein) and the plurality of pads 243*a*, 243*b*, 243*c*, 243*d* may be used.

The flexible circuit board 27 includes a plurality of signal transmission wires 271*a*, 271*b* positioned on one surface of the substrate and a connection wire 272 positioned on the other surface. The wires 271*a*, 271*b*, 272 may be printed by photolithography, thin film sputtering, or the like. The method for positioning the wires 271*a*, 271*b*, 272 on the flexible circuit board 27 is not limited to the above description. In addition, although it has been described in the above that the signal transmission wires 271*a*, 271*b* and the connection wire 272 are respectively located on both sides of one substrate, they may be located on different substrates, and they are not limited thereto.

The signal transmission wire 271*a* connects the pad 243*a* connected to the first sub-antenna loop 241*a* and the coil driver 263, respectively, and the signal transmission wire 271*b* connects the pad 243*d* connected to the second sub-antenna loop 241*b* and the coil driver 263.

The connection wire 272 connects the pad 243*b* connected to the first sub-antenna loop 241*a* and the pad 243*c* connected to the second sub-antenna loop 241*b* to each other. That is, the first sub-antenna loop 241*a* and the second sub-antenna loop 241*b* are electrically connected to each other through the connection wire 272 located on the flexible circuit board 27. Accordingly, the current input from the coil driver 263 to the pad 243*a* through the signal transmission wire 271*a* flows in the order from the first sub-antenna loop 241*a*, the pad 243*b*, the connection wire 272, the pad 243*c*, the second sub-antenna loop 241*b*, the pad 243*d*, to the signal transmission wire 271*b*.

That is, according to the antenna module according to an embodiment, it has substantially the same effect as the antenna loop formed in the spiral pattern without forming a wiring in the spiral pattern on the base film 242. In this antenna module, since the antenna loop wire is all formed on the lower surface of the display panel 251, manufacturing cost is reduced and the touch screen 20 is thinned and miniaturized.

A case in which a conventional stylus pen, for example, an EMR type pen, is used for a foldable electronic device will be described with reference to FIGS. 91 and 92.

Figure 91:
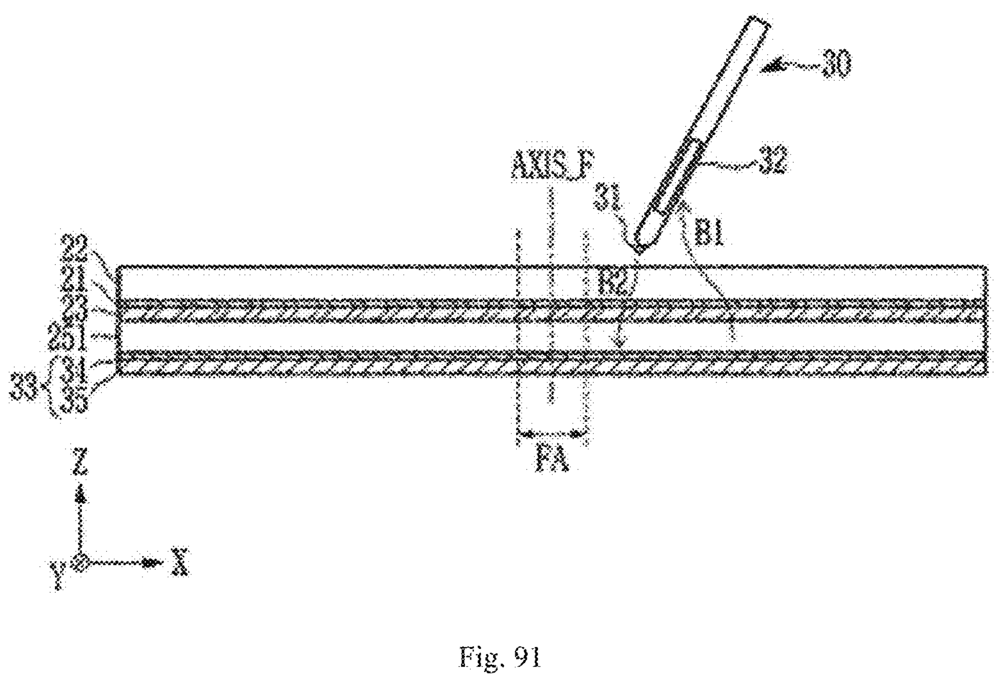
FIGS. 91 and 92 are diagrams illustrating a case in which a stylus pen according to a conventional method is used in a foldable electronic device.
Figure 92:
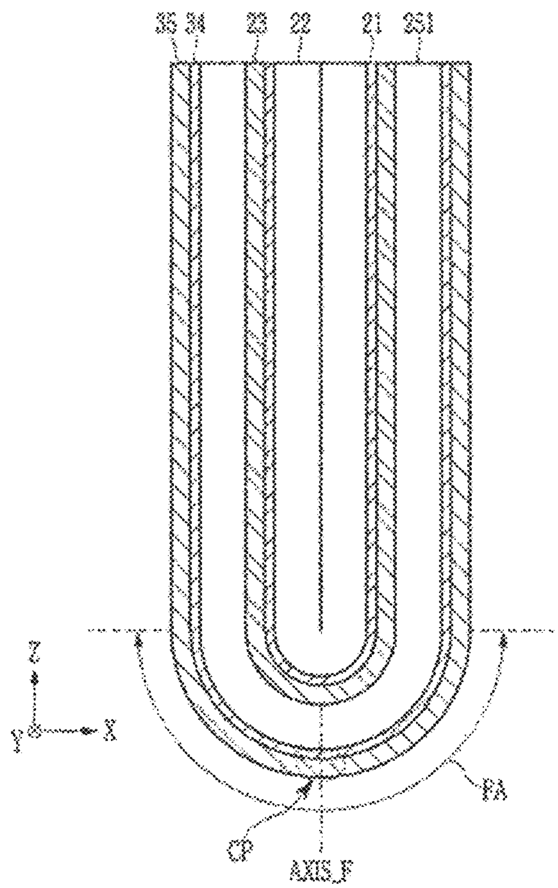

FIGS. 91 and 92 are diagrams illustrating a case in which a stylus pen according to a conventional method is used in a foldable electronic device. The foldable electronic device described here is in a flat state or an unfolded state shown in FIG. 91, a folded state shown in FIG. 92, and an intermediate state between the unfolded state and the folded state. Here, the term “folded state” means “fully folded state” unless otherwise specified.

As shown in FIG. 91, in the case of an EMR (Electro-Magnetic Resonance) type pen among passive stylus pens, after a digitizer 33 transmits an electromagnetic signal B1 to the EMR stylus pen 30, the digitizer 33 receives the resonance signal B2 from the EMR stylus pen 30.

The digitizer 33 may be attached under the display panel 251, and may include a flexible printed circuit board (FPCB) 34 having a plurality of conductive antenna loops formed thereon, and a ferrite sheet 35 blocking a magnetic field generated by the antenna loops.

In the FPCB 34, a plurality of antenna loops for detecting a position to which a resonance signal is input is configured in a plurality of layers. One antenna loop is overlapped with at least one of other antenna loops in the Z-axis direction. Thereby, the thickness of the FPCB 34 is thick.

As shown in FIG. 92, when the folding of the foldable electronic device 2 occurs with respect to the folding axis AXIS_F, the deformation of the FPCB 34 attached to the folding area FA may occur. Stress is applied to the wiring member forming the antenna loop by repeated foldings, which may eventually lead to damage to the wiring member. In a folded state, at least a portion of the folding area FA may be formed of a curved surface having a predetermined curvature.

The ferrite sheet 35 blocks the influence of the magnetic field generated by the antenna loop on the inside of the foldable electronic device 2. The ferrite sheet 35 is also thick, and it is easy to deform when the foldable electronic device 2 is folded. It may be damaged by repeated foldings.

Therefore, it is difficult to apply the EMR type stylus pen 30 to the foldable electronic device 2. In addition, in the case of the EMR method, since the signal is transmitted and received only by the digitizer 34, there occurs a problem that the signal transmission B1 and the signal reception B2 cannot be performed at the same time.

Figure 93:
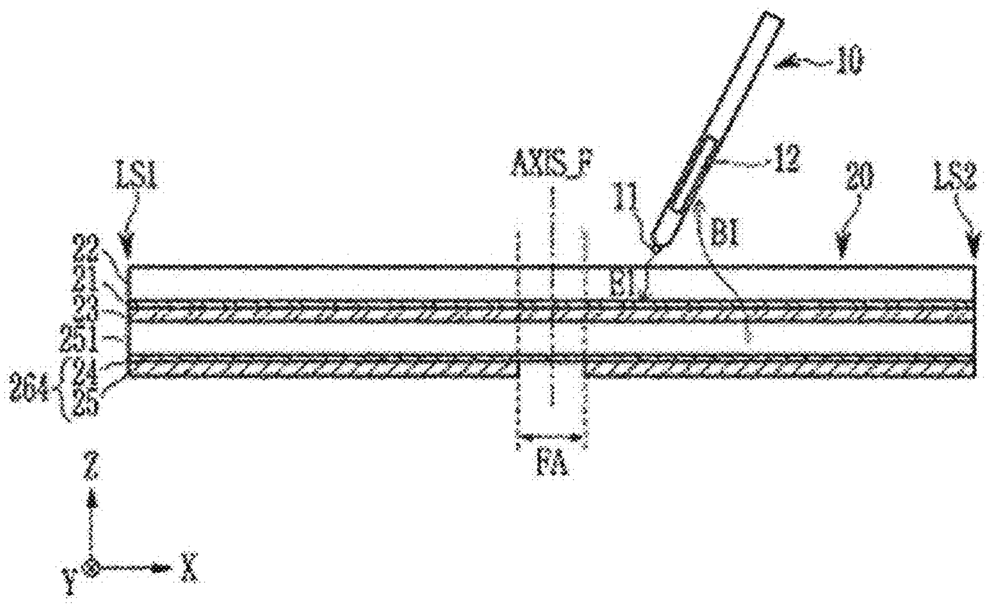
FIGS. 93 and 94 are diagrams illustrating a foldable electronic device according to an embodiment.
Figure 94:
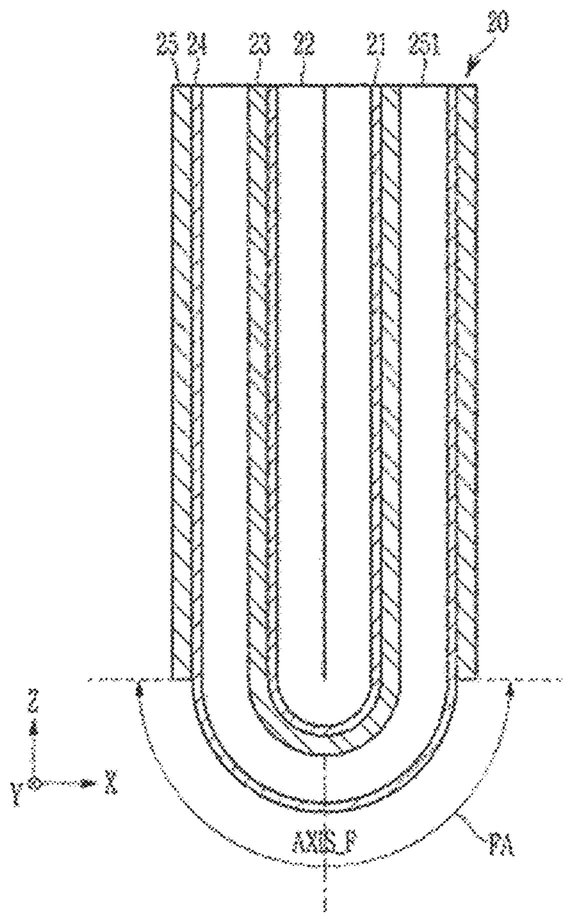

FIGS. 93 and 94 are diagrams illustrating a foldable electronic device according to an exemplary embodiment.

The touch screen 20 of the foldable electronic device includes a display panel 251, a touch sensor 261 on the display panel 251, and a loop coil 264 below the display panel 251.

The touch sensor 261 may include a substrate 23, a touch electrode layer 21 on the substrate, and a window 22 on the touch electrode layer 21.

The substrate 23 may be an encapsulation substrate of the display panel 251 or a color filter substrate of the display panel 251, which is preferably made of a transparent material.

The touch electrode layer 21 may include a plurality of first touch electrodes for detecting touch coordinates in a first direction and a plurality of second touch electrodes for detecting touch coordinates in a second direction crossing the first direction.

Although the touch electrode layer 21 is illustrated as a single layer in FIG. 93, the first touch electrodes and the second touch electrodes may be respectively located on different layers, or may or may not overlap each other. Alternatively, a separate layer may be interposed between the first touch electrodes and the second touch electrodes, but it is not limited thereto.

A window 22 may be positioned on the touch electrode layer 21. The touch electrode layer 21, the conductive tip 11, and the window 22 may form capacitance. Accordingly, a signal (a resonance signal or an active touch signal) generated by the stylus pen 10 may be transmitted to the touch electrode layer 21 through the capacitance.

The loop coil 264 may include a substrate 24 on which an antenna loop is positioned, and a ferrite sheet 25. As described later in the drawings, the antenna loop may be located on the same layer as the touch electrode layer 21 in addition to the substrate 24 or may be located under the window 22, in which case the substrate 24 may not be included in a loop coil 264.

The substrate 24 may be attached to the rear surface of the display panel 251. The substrate 24 may be located in an area including the folding area FA on the rear surface of the display panel 261. The substrate 24 may be a single-side FPCB, a double-sided FPCB, or a multilayer FPCB, but it is preferably a single-side FPCB or a double-sided FPCB. Accordingly, even if the folding area FA is bent with respect to the folding axis AXIS_F, the risk of damage to the substrate 24 by the force applied to the substrate 24 is reduced.

The substrate 24 may include a flexible base film. The base film may be made of a polyimide resin, an epoxy resin, or other known flexible material. At least one antenna loop formed of at least one wire may be formed on the base film.

The antenna loop is formed by a conductive wire on the substrate 24. For example, the antenna loop may be printed on the substrate 24 by a method such as photolithography or thin film sputtering. The manner for positioning the antenna loop on the substrate 24 is not limited to the above description.

The ferrite sheet 25 may be located in an area other than the folding area FA on the XY plane. Here, the area excluding the folding area FA means an area in which the force acting on the ferrite sheet 25 does not damage the ferrite sheet 25 when the foldable electronic device 2 is in a folded state. It does not mean that the ferrite sheet 25 is not completely positioned in the folding area FA. For example, even if the ferrite sheet 25 is located in a part of the folding area FA, if the ferrite sheet 25 is not damaged when the foldable electronic device 2 is repeatedly deformed between the folded state and the unfolded state, it also corresponds to an area excluding the folding area FA. Accordingly, even if the folding area FA is bent based on the folding axis AXIS_F, the risk of damage to the ferrite sheet 25 is reduced.

After the loop coil 264 transmits the electromagnetic signal B1 to the stylus pen 10, the touch sensor 261 receives the resonance signal E1 from the stylus pen 10.

The resonance circuit unit 12 of the stylus pen 10 may mutually resonate with the loop coil 264, and the degree of mutual resonance occurring between the inductor of the resonance circuit unit 12 and the loop coil 264 is affected by mutual inductance. Alternatively, the resonance circuit unit 12 may resonate with the magnetic field generated by the loop coil 264. In relation to this, it will be described with reference to FIGS. 95 to 100.

In FIGS. 91 to 94, the antenna loop 241 is shown to have a shape extending from the inside of the display area DP along the boundary of the display area DP, but the antenna loop 241 may be located outside the display area DP. The antenna loop 241 may be also located to surround the periphery of the area where the touch electrodes are disposed, without overlapping the touch electrodes disposed on the touch sensor layer 21 on the XY plane.

Figure 95A:
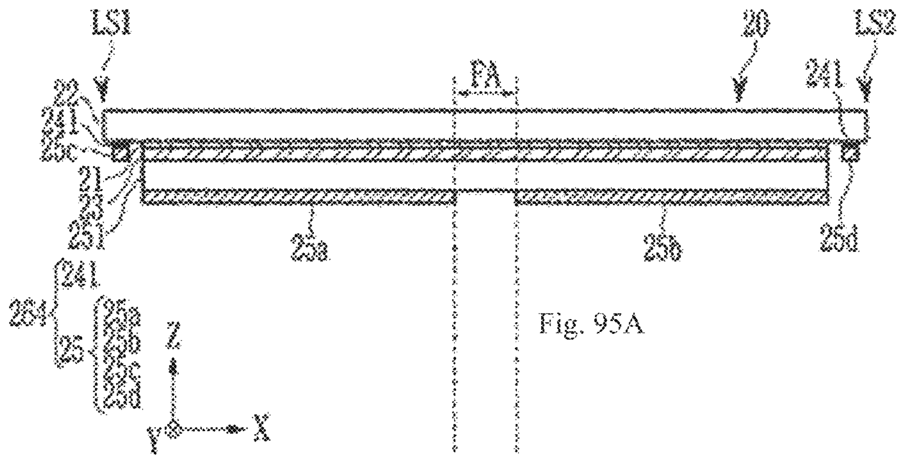
FIGS. 95A to 100B are diagrams showing arrangement of a touch panel and a loop coil according to various aspects of another embodiment.
Figure 95B:
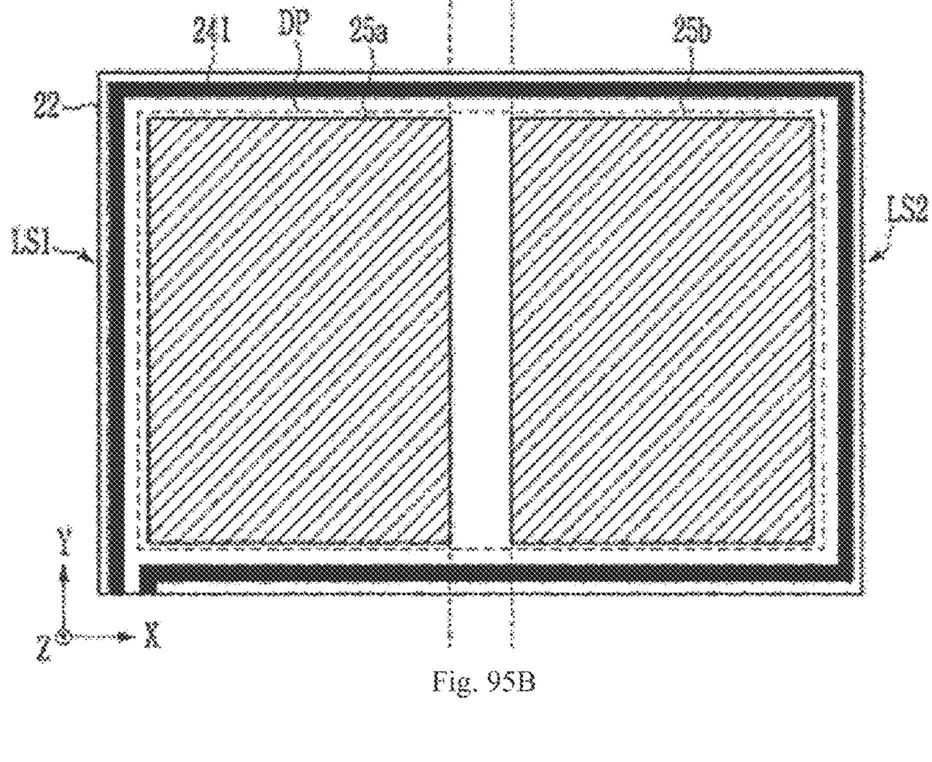

As shown in FIG. 95A, the antenna loop 241 may be printed on the window 22 by a method such as photolithography, thin film sputtering, or the like, or may be printed on a sheet and attached to the window 22 by a method such as photolithography, thin film sputtering, or the like. The method for positioning the antenna loop 241 on the window 22 is not limited to the above description.

The ferrite sheet 25 includes the first sheet 25*a* that is attached to the rear surface of the display panel 261 and located in the area between the folding area FA and the long side LS1, the second sheet 25*b* that is attached to the rear surface of the display panel 261 and located in the area between the folding area FA and the long side LS2, the third sheet 25*c* that is located on the long side LS1 and located below the antenna loop 241 attached to the window 22, and the third seat 25*d* that is located on the long side L2 and located below the antenna loop 241 attached to the window 22.

Next, in the case of an on-cell type touch sensor, FIG. 96 is a view showing a loop coil 264 including an antenna loop 241 positioned on the same layer as the touch electrode layer 21. In the case of an in-cell type touch sensor, FIG. 97 is a diagram showing a loop coil 264 including an antenna loop 241 positioned on the same layer as the touch electrode layer 21.

The antenna loop 241 may be made of the same material as the first and second touch electrodes of the touch electrode layer 21. However, the antenna loop 241 may be positioned in a layer different from that of the touch electrode layer 21, and may be made of a material different from that of the first and second touch electrodes.

Figure 96A:
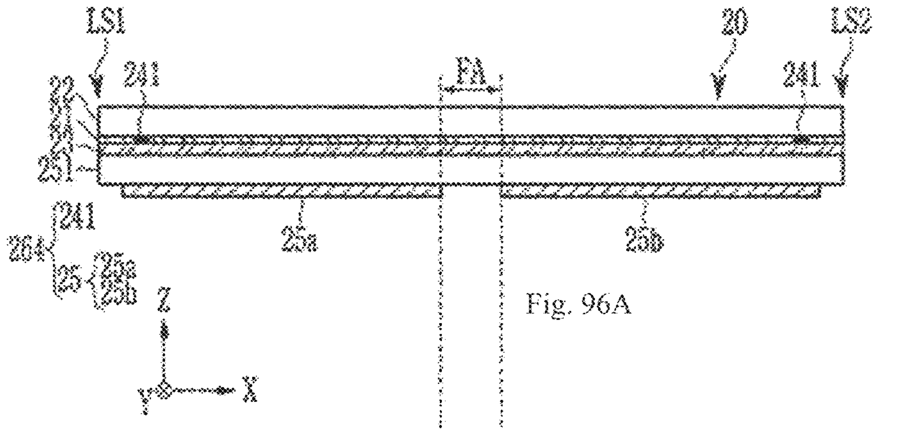
Figure 97A:
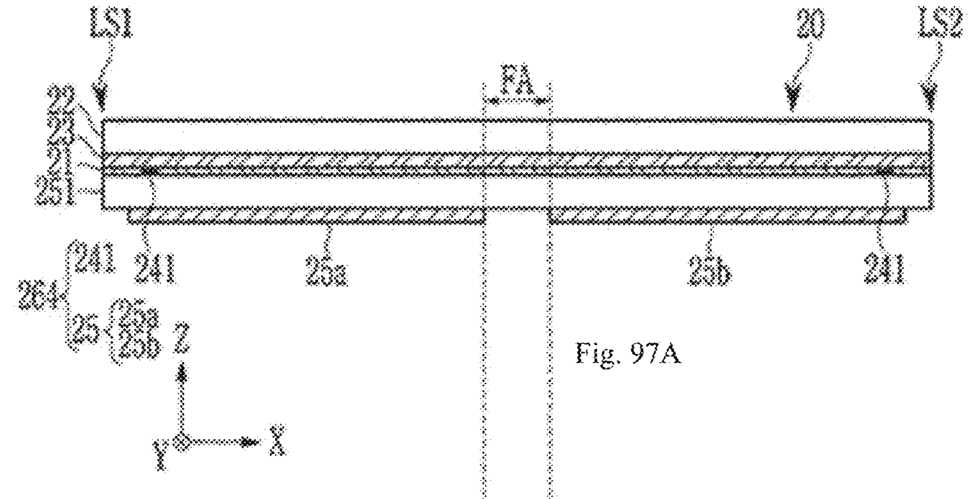

As shown in FIGS. 96A and 97A, the loop coil 264 includes the antenna loop 241 located in the touch electrode layer 21, and the ferrite sheet 25 located under display panel 251.

Figure 96B:
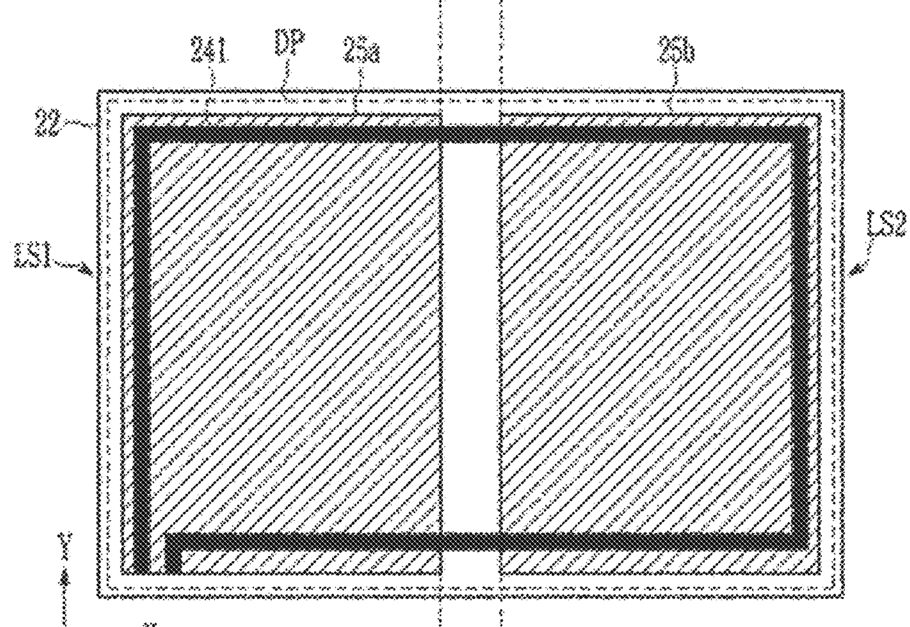

As shown in FIG. 96B, the antenna loop 241 and the touch electrode layer 21 are positioned in the same layer on the encapsulation substrate 23 of the display panel 251.

The antenna loop 241 may be a conductive wire extending along the boundary of the display area DP. The antenna loop 241 may overlap an area in which the ferrite sheet 25 is positioned on the XY plane.

The ferrite sheet 25 may include a first sheet 25*a* located in the area between the folding area FA and the long side LS1, and a second sheet 25*b* located in the area between the folding area FA and the long side LS2. The ferrite sheet 25 may include a plurality of sheets in addition to the two sheets, and even in this case, the ferrite sheet 25 is located in an area other than the folding area FA on the rear surface of the display panel 261.

Figure 97B:
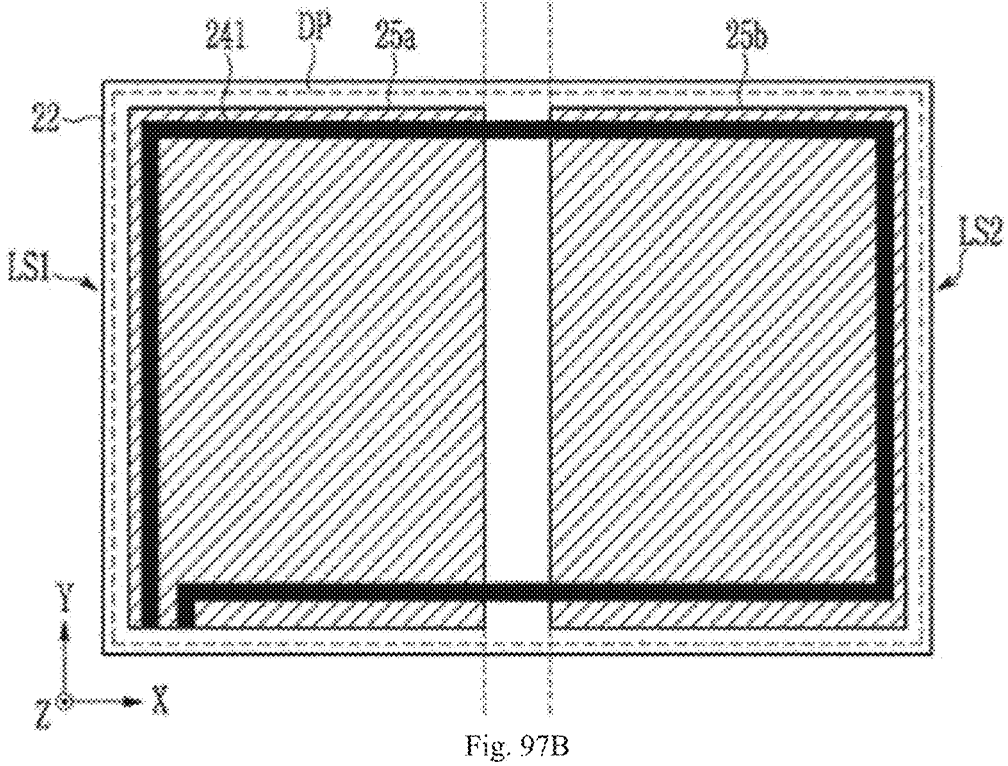

As shown in FIG. 97*b*, the display panel 251 includes a touch electrode layer 21 and a loop coil 264. That is, the substrate 23 may be a color filter substrate of the display panel 251, and the touch electrode layer 21 and the antenna loop 241 may be positioned between the color filter substrate 23 and the TFT substrate of the display panel 251. Alternatively, both the touch electrode layer 21 and the antenna loop 241 may be positioned on the upper and lower sides of the color filter substrate 23.

The antenna loop 241 may be a conductive wire extending along the boundary of the display area DP. The antenna loop 241 may overlap an area in which the ferrite sheet 25 is positioned on the XY plane.

The ferrite sheet 25 may include a first sheet 25*a* located in the area between the folding area FA and the long side LS1, and a second sheet 25*b* located in the area between the folding area FA and the long side LS2. The ferrite sheet 25 may include a plurality of sheets in addition to the two sheets, and even in this case, the ferrite sheet 25 is located in an area other than the folding area FA on the rear surface of the display panel 261.

Figure 98A:
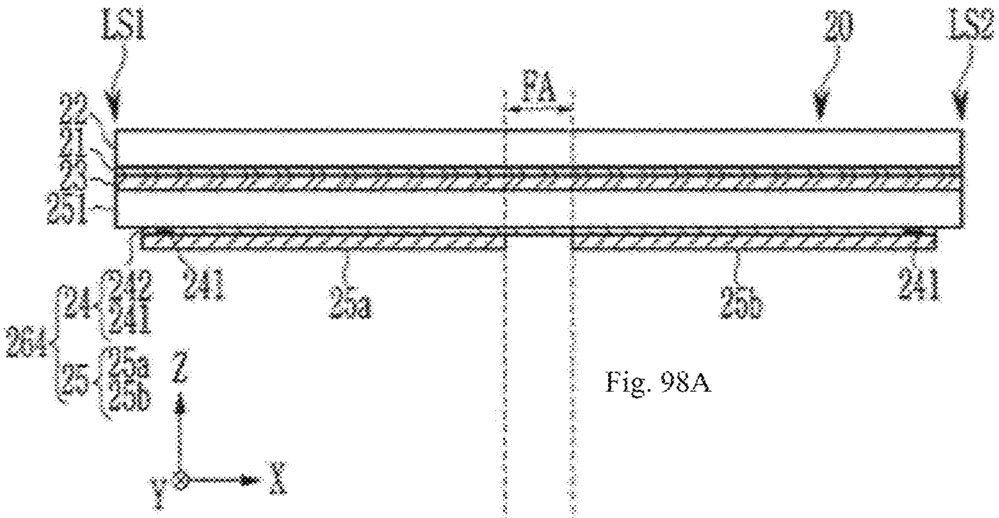

As shown in FIG. 98*a*, the loop coil 264 is located under the display panel 251. The loop coil 264 includes a substrate 24 and a ferrite sheet 25. The substrate 24 includes a base film 242 and an antenna loop 241.

Figure 98B:
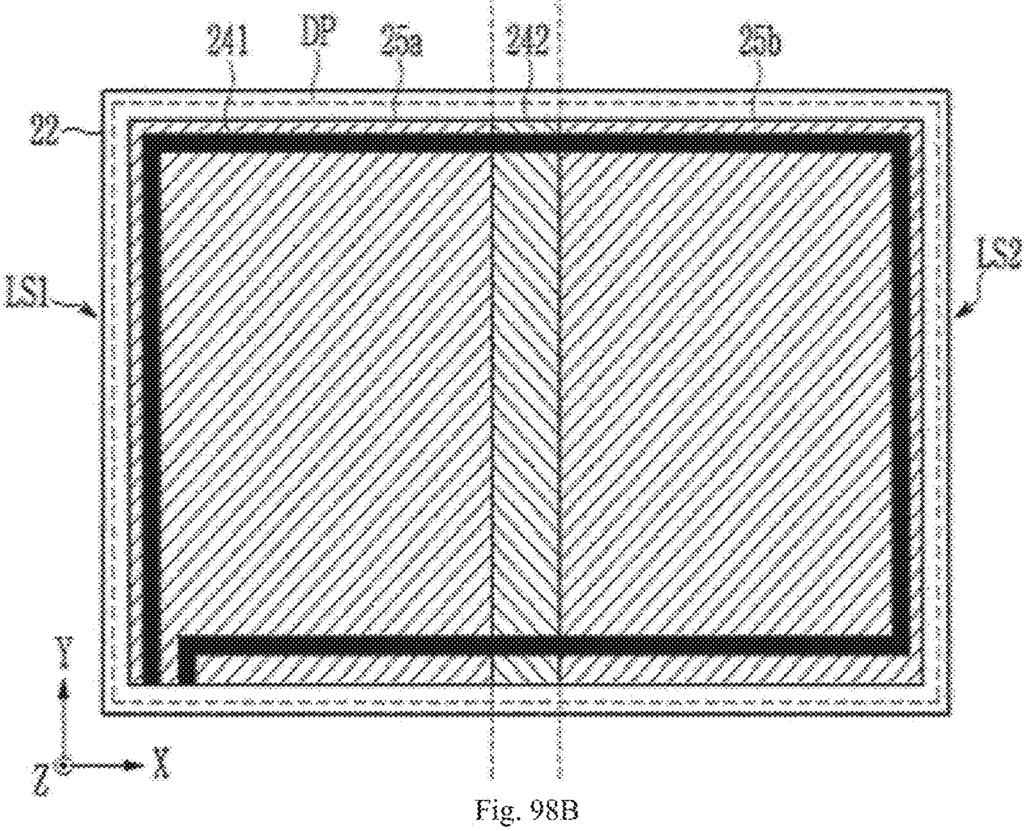

As shown in FIG. 98B, the antenna loop 241 may be a conductive wire extending along the boundary of the display area DP. Although the antenna loop 241 is illustrated as having a rectangular shape as a whole, it may have a shape such as a circle, an ellipse, a polygon, a polygon with rounded corners, and the like, but it is not limited thereto. In addition, the antenna loop 241 may be formed of a conductive material exhibiting high transmittance and low impedance, such as ITO, graphene, silver nanowire, or the like.

The antenna loop 241 may overlap an area in which the ferrite sheet 25 is positioned on the XY plane.

The ferrite sheet 25 may include a first sheet 25*a* located in the area between the folding area FA and the long side LS1, and a second sheet 25*b* located in the area between the folding area FA and the long side LS2. The ferrite sheet 25 may include a plurality of sheets in addition to the two sheets, and even in this case, the ferrite sheet 25 is located in an area other than the folding area FA on the rear surface of the display panel 261.

Figure 99A:
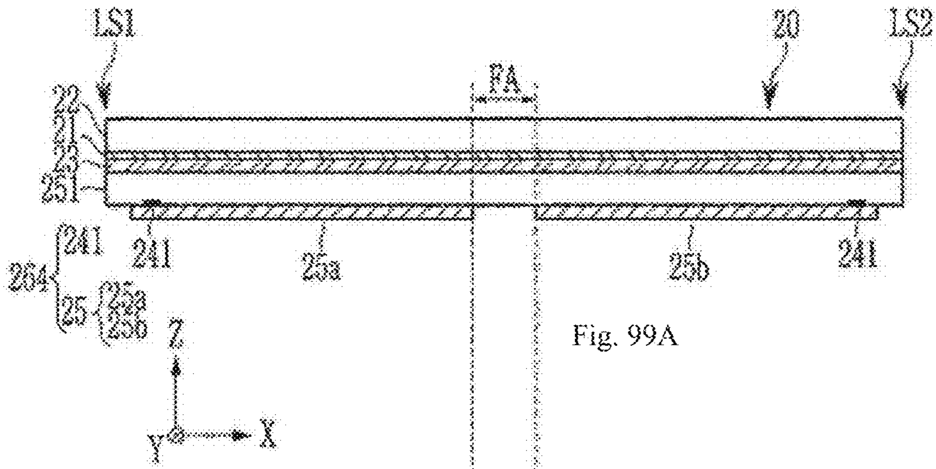

As shown in FIG. 99*a*, the antenna loop 241 may be directly printed on the substrate of the display panel 251 by a method such as photolithography or thin film sputtering. The method for directly forming the antenna loop 241 on the substrate of the display panel 251 is not limited to the above description.

Figure 99B:
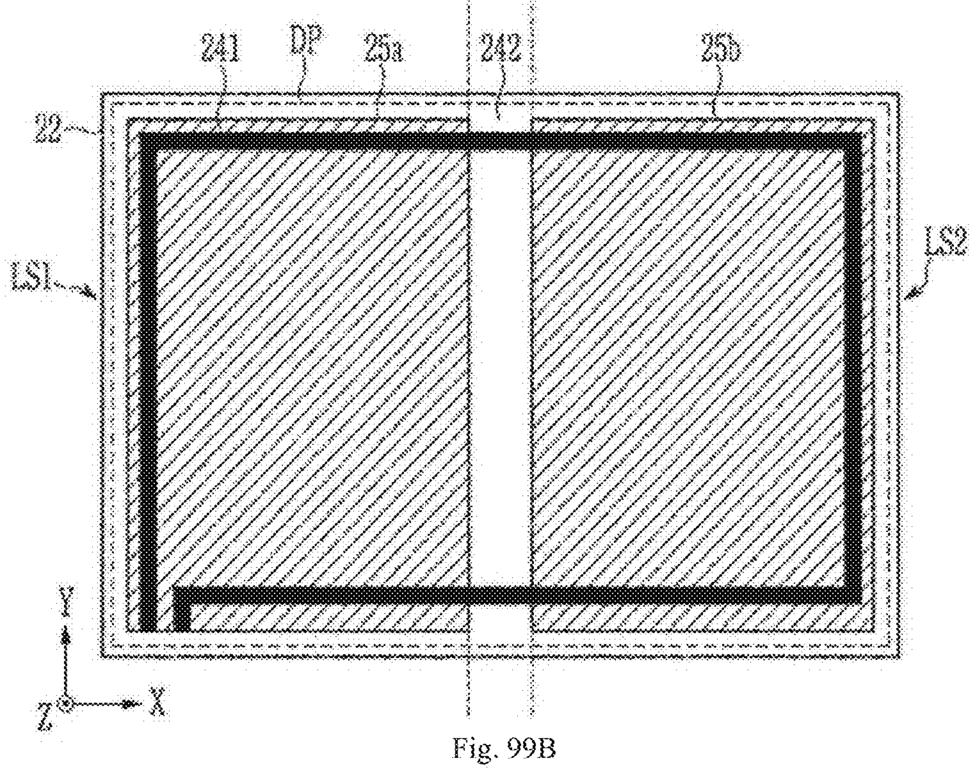

As shown in FIG. 99*b*, the ferrite sheet 25 may include the first sheet 25*a* positioned between the folding area FA and the long side LS1, and the second sheet 25*b* positioned between the folding area FA and the long side LS2. The ferrite sheet 25 may include a plurality of sheets in addition to the two sheets, and even in this case, the ferrite sheet 25 is located in an area other than the folding area FA on the rear surface of the display panel 261.

The antenna loop 241 may be a conductive wire extending along the boundary of the display area DP. Although the antenna loop 241 is shown as being in a rectangular shape as a whole, it may have a shape such as a circle, an ellipse, a polygon, a polygon with rounded corners, and the like, but it is not limited thereto. In addition, the antenna loop 241 may be formed of a conductive material exhibiting high transmittance and low impedance, such as ITO, graphene, silver, nanowire, or the like. The antenna loop 241 may overlap an area in which the ferrite sheet 25 is located on the XY plane.

Figure 100A:
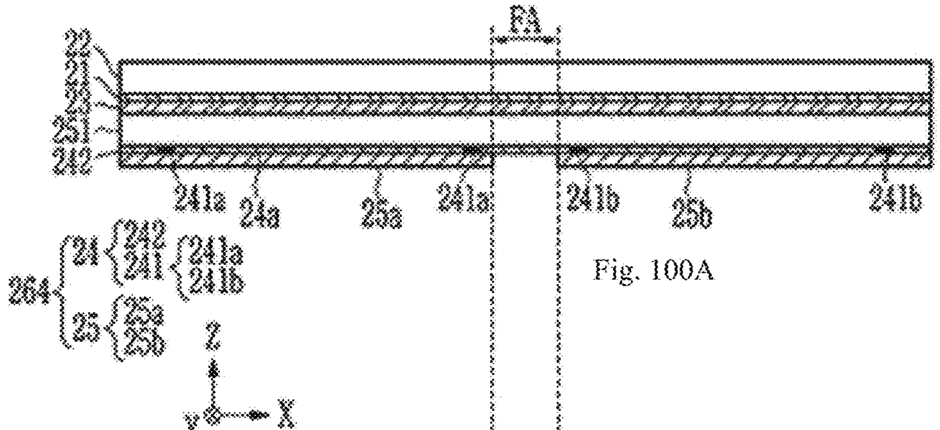

As shown in FIG. 100A, the loop coil 264 is positioned under the display panel 251. The loop coil 264 includes a substrate 24 and a ferrite sheet 25. The substrate 24 includes a base film 242 and antenna loops 241*a*, 241*b*.

Figure 100B:
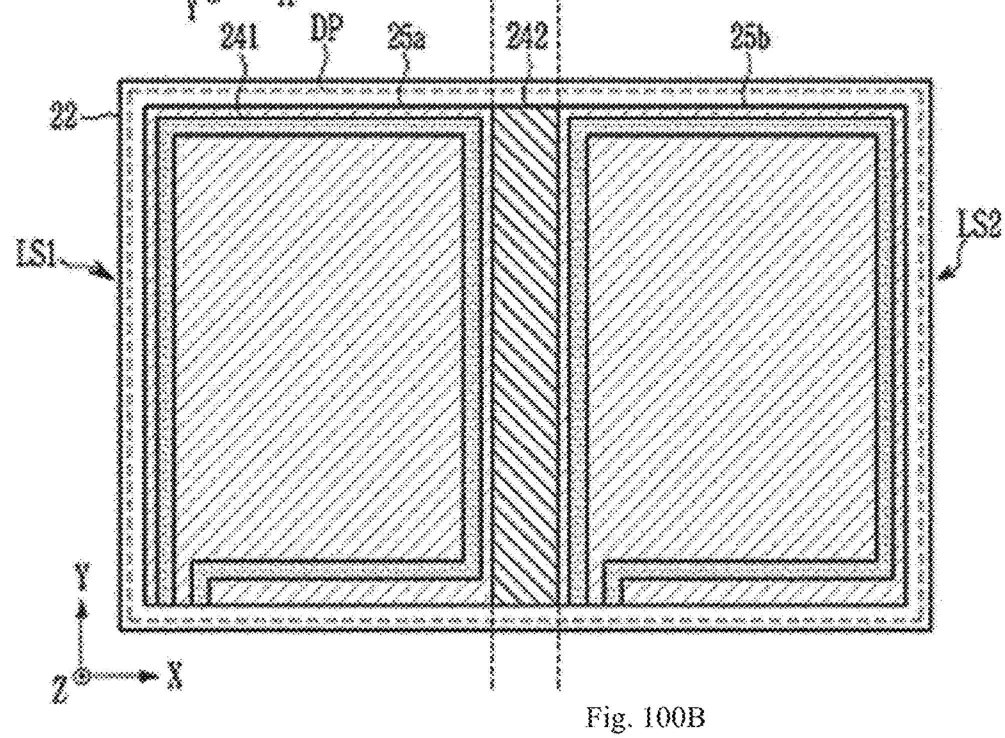

As shown in FIG. 100B, the ferrite sheet 25 may include a first sheet 25*a* positioned between the folding area FA and the long side LS1, and a second sheet 25*b* positioned between the folding area FA and the long side LS2. The ferrite sheet 25 may include a plurality of sheets in addition to the two sheets, and even in this case, the ferrite sheet 25 is located in an area other than the folding area FA on the rear surface of the display panel 261.

The antenna loop 241*a* may be a conductive wire extending along the boundary between the display area DP on the long side LS1 and the folding area FA, and the antenna loop 241*b* may be a conductive wire extending along the boundary between the display area DP on long side LS2 and the folding area FA. The antenna loop 241*a* may overlap an area where the first sheet 25*a* is located on the XY plane, and the antenna loop 241*b* may overlap an area where the second sheet 25*b* is located on the XY plane.

Figure 101:
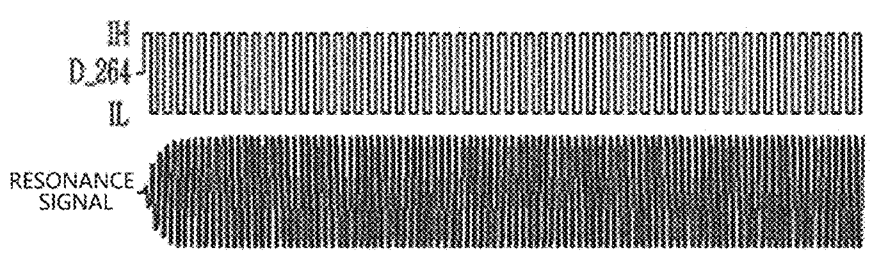
FIG. 101 is a diagram illustrating a driving signal of a loop coil and a resonance signal of a stylus pen according to an embodiment.

FIG. 101 is a diagram illustrating a driving signal of a loop coil and a resonance signal of a stylus pen according to an embodiment.

As illustrated in FIG. 101, the coil driver 263 may apply a driving signal D_264 to the loop coil 264. The driving signal D_264 may have a predetermined frequency, that is, a frequency corresponding to the resonant frequency of the resonant circuit unit 12 of the stylus pen 10, and may be an alternating current oscillating between the first level IH and the second level IL. However, it is not limited thereto. Then, the resonance circuit unit 12 resonates by the magnetic field generated in the loop coil 264 by the driving signal D_264. The signal resonated by the resonance circuit unit 12 may be transmitted to the touch sensor 261 through the capacitance formed with the touch sensor 261, and a sensing signal by the stylus pen 10 may be received from the plurality of first touch electrodes 111 and the plurality of second touch electrodes 121.

Next, a foldable electronic device and a driving method according to another embodiment of the present disclosure will be described with reference to FIGS. 102 to 113.

Figure 102:
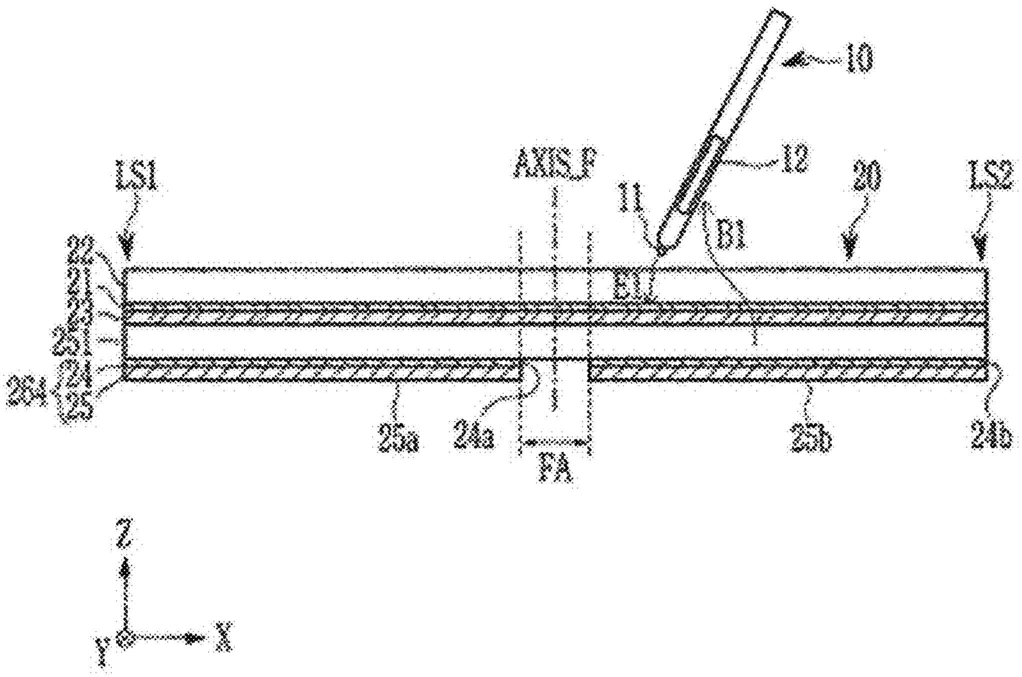
FIGS. 102 and 103 are diagrams illustrating a foldable electronic device according to another embodiment.
Figure 103:
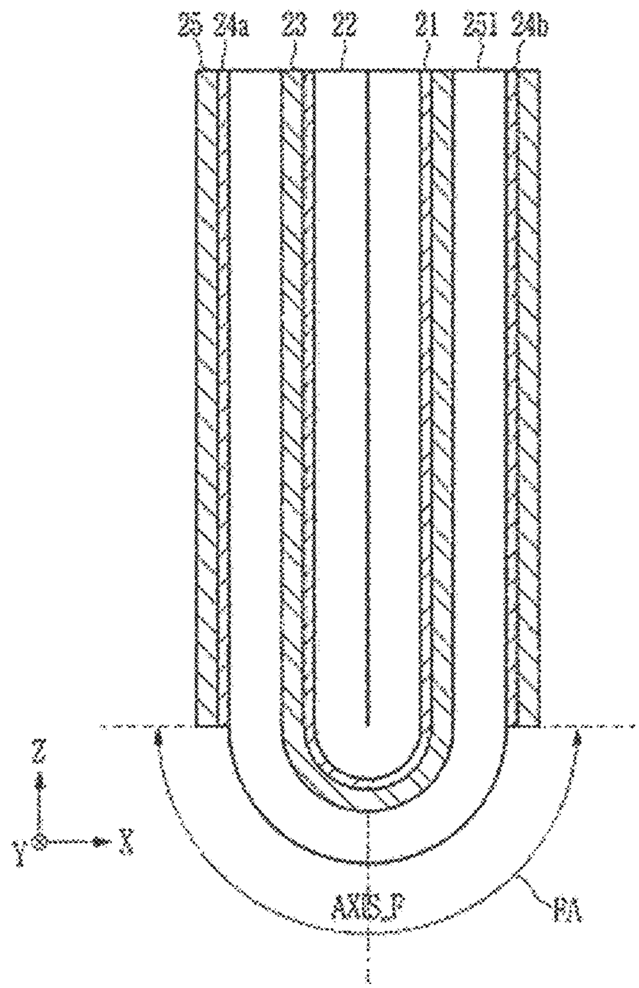

FIGS. 102 and 103 are views illustrating a foldable electronic device according to another embodiment. As compared with the foldable electronic device described above, a description thereof will be omitted because it is the same except that the substrate 24 is located in an area excluding the folding area FA on the XY plane.

Referring to FIG. 102, the loop coil 264 may include a substrate 24 on which an antenna loop is positioned, and a ferrite sheet 25. In FIGS. 104 to 107, as described later, the antenna loop may be located on the same layer as the touch electrode layer 21 in addition to the substrate 24. In this case, the substrate 24 may not be included in the loop coil 264.

The loop coil 264 may be located in an area other than the folding area FA on the XY plane. The loop coil 261 may include at least two sub-loop coils 24*a*, 24*b*. The sub-loop coil 24*a* may be located in an area between the folding area FA and the long side LS1, and the sub-loop coil 24*b* may be located in the area between the folding area FA and the long side LS2. A driving signal having the same or similar phase may be applied to the two sub-loop coils 24*a*, 24*b*, a driving signal having the opposite phase may be applied, or a driving signal may be selectively driven.

Accordingly, even if the folding area FA is bent with respect to the folding axis AXIS_F, the risk of damage to the loop coil 264 is further reduced.

FIGS. 104 to 107 are views illustrating an arrangement of a touch panel and a loop coil according to various aspects of another embodiment.

Figures 104A, 104B:
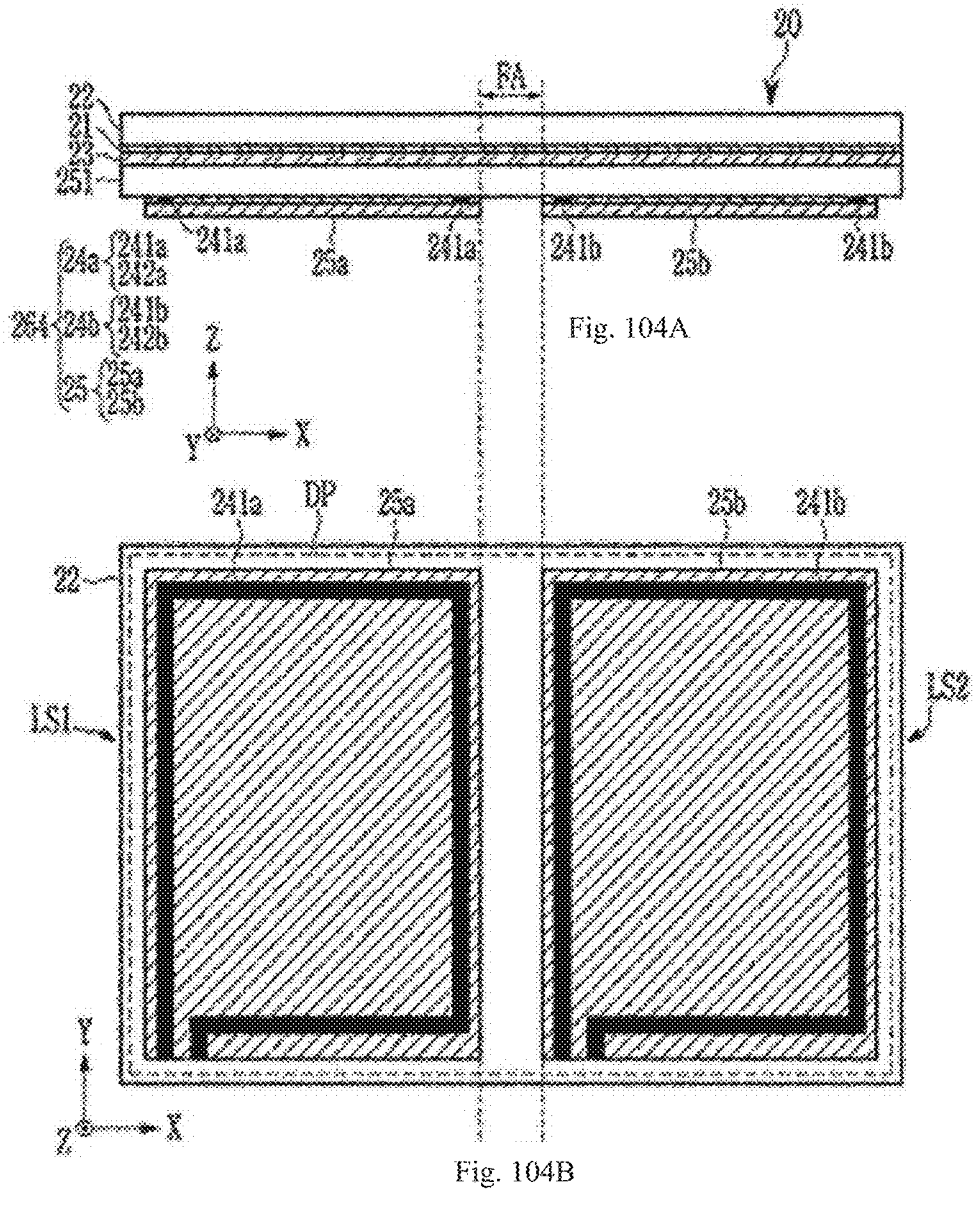

As shown in FIG. 104A, the loop coil 264 is located under the display panel 251. The loop coil 264 includes a plurality of substrates 24*a*, 24*b*, and a ferrite sheet 25.

The substrate 24*a* includes a base film 242*a* and an antenna loop 241*a*, and the substrate 24*b* includes a base film 242*b* and an antenna loop 241*b*. The substrate 24*a* may be positioned between the folding area FA and the long side LS1, and the substrate 24*b* may be positioned between the folding area FA and the long side LS2. The substrates 24*a*, 24*b* in FIGS. 104A and 104B may be FPCBs or rigid PCBs.

As shown in FIG. 104B, the ferrite sheet 25 may include a first sheet 25*a* positioned between the folding area FA and the long side LS1, and a second sheet 25*b* positioned between the folding area FA and the long side LS2. The ferrite sheet 25 may include a plurality of sheets in addition to the two sheets, and even in this case, the ferrite sheet 25 is located in an area other than the folding area FA on the rear surface of the display panel 261.

The antenna loop 241*a* of the substrate 24*a* may be a conductive wire extending along the boundary between the display area DP on the long side and the folding area FA, and the antenna loop of the substrate 24*b* may be a conductive wire extending along the boundary between the display area DP on the long side LS2 and the folding area FA. The antenna loop 241*a* may overlap an area where the first sheet 25*a* is positioned on the XY plane, and the antenna loop 241*b* may overlap an area where the second sheet 25*b* is positioned on the XY plane.

Figure 105A:
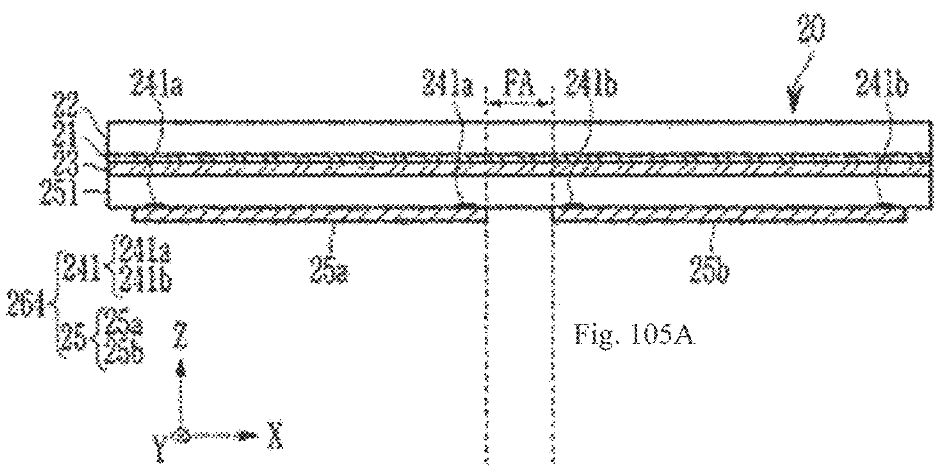

As shown in FIG. 105A, the antenna loops 241*a*, 241*b* may be directly printed on the substrate of the display panel 251 by a method such as photolithography or thin film sputtering. The method for directly forming the antenna loops 241*a*, 241*b* on the substrate of the display panel 251 is not limited to the above description.

Figure 105B:
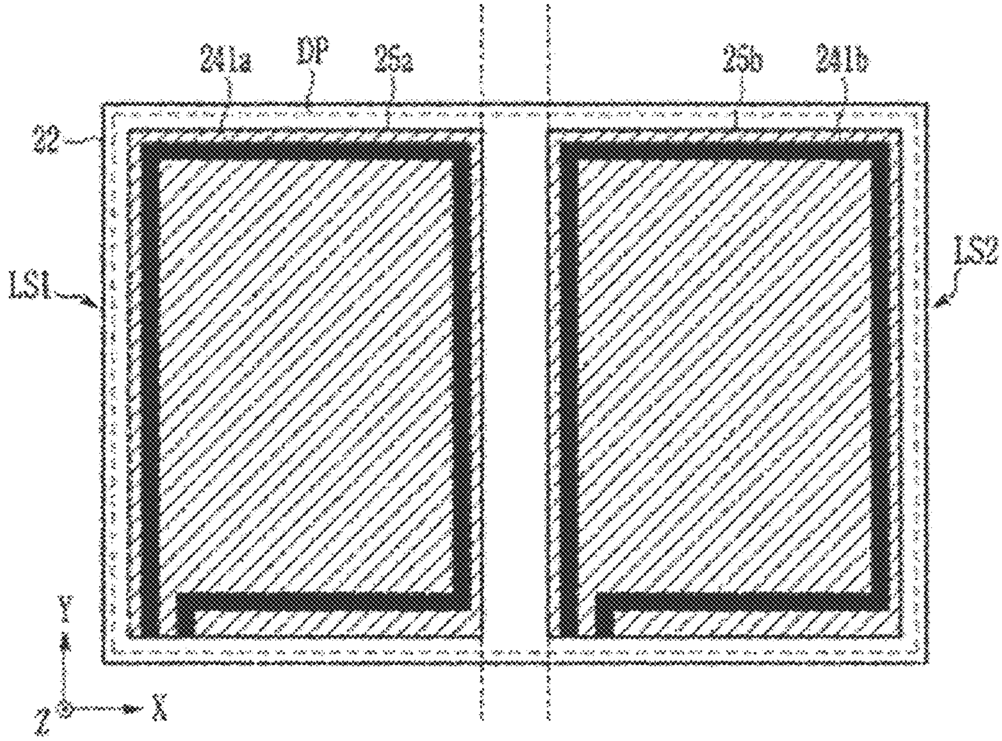

As shown in FIG. 105B, the ferrite sheet 25 may include the first sheet 25*a* positioned between the folding area FA and the long side LS1 and the second sheet 25*b* positioned between the folding area FA and the long side LS2. The ferrite sheet 25 may include a plurality of sheets in addition to the two sheets, and even in this case, the ferrite sheet 25 is located in an area other than the folding area FA on the rear surface of the display panel 261.

The antenna loop 241*a* may be a conductive wire extending along the boundary between the display area DP on the long side LS1 and the folding area FA, and the antenna loop 241*b* may be a conductive wire extending along the boundary between the display area DP on the long side LS2 and the folding area FA. The antenna loop 241*a* may overlap an area where the first sheet 25*a* is located on the XY plane, and the antenna loop 241*b* may overlap an area where the second sheet 25*b* is located on the XY plane.

Figure 106A:
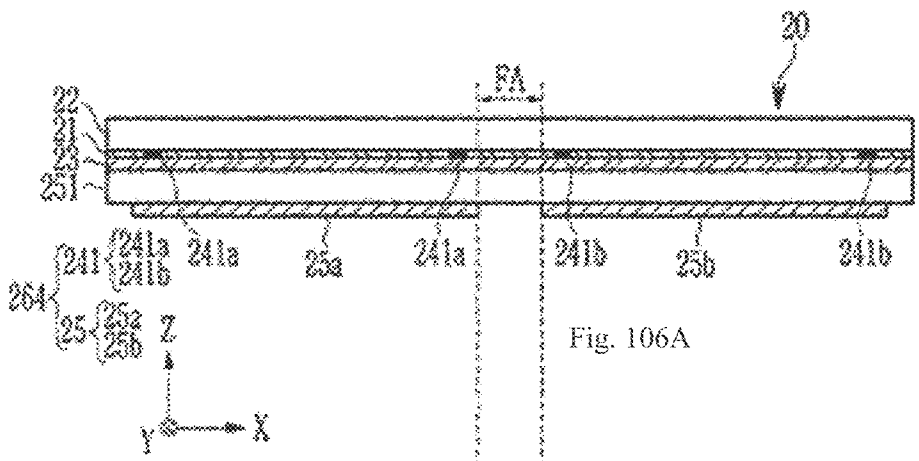
Figure 106B:
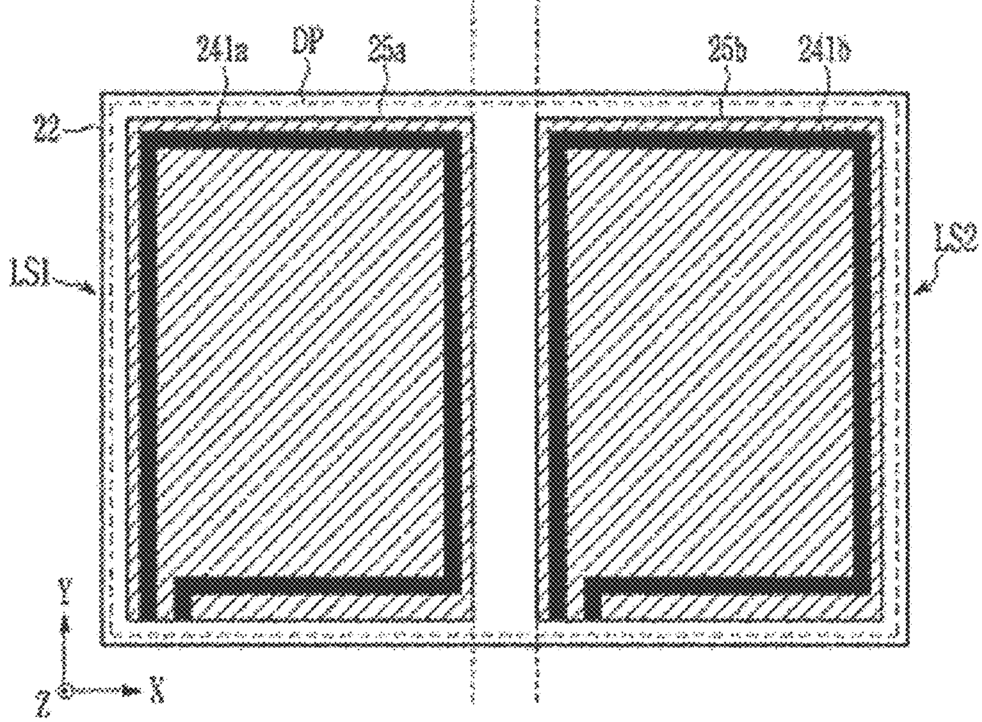

Next, FIGS. 106A and 106B are a diagram illustrating a loop coil 264 including an antenna loop 241 positioned in the same layer as a touch electrode layer 21 in the case of an on-cell type touch sensor, and FIG. 107 is a diagram illustrating a loop coil 264 including an antenna loop 241 positioned on the same layer as a touch electrode layer 21 in the case of an in-cell type touch sensor.

The antenna loop 241 may be made of the same material as the first and second touch electrodes of the touch electrode layer 21. However, the antenna loop 241 may be positioned in a layer different from that of the touch electrode layer 21, and may be made of a material different from that of the first and second touch electrodes.

Figure 107A:
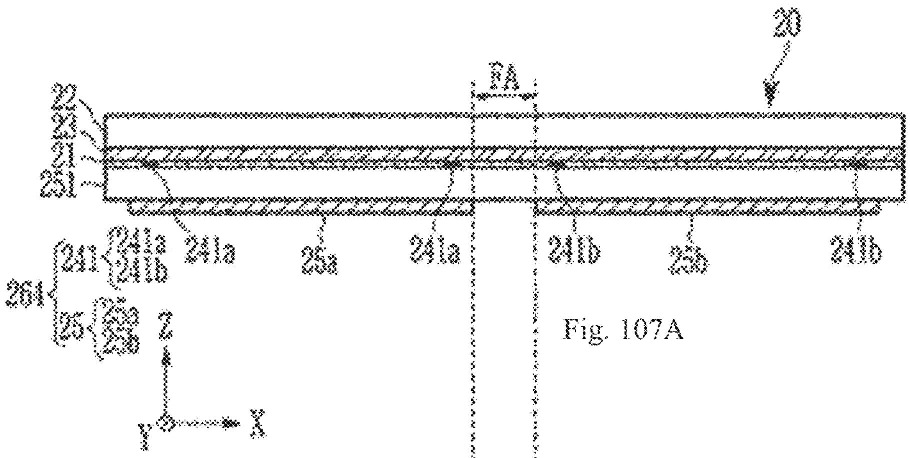

As shown in FIGS. 106A and 107A, the loop coil 264 includes the antenna loop 241 located on the touch electrode layer 21, and the ferrite sheet 25 located under the display panel 251.

As shown in FIG. 106B, the antenna loop 241 and the touch electrode layer 21 are positioned in the same layer on the encapsulation substrate 23 of the display panel 251.

The antenna loop 241*a* may be a conductive wire extending along the boundary between the display area DP on the long side LS1 and the folding area FA, and the antenna loop 241*b* may be a conductive wire extending along the boundary between the display area DP on the long side LS2 and the folding area FA. The antenna loop 241*a* may overlap the area where the first sheet 25*a* is located on the XY plane, and the antenna loop 241*b* may overlap the area where the second sheet 25*b* is located on the XY plane.

The ferrite sheet 25 may include a first sheet 25*a* located in the area between the folding area FA and the long side LS1, and a second sheet 25*b* located in the area between the folding area FA and the long side LS2. The ferrite sheet 25 may include a plurality of sheets in addition to the two sheets, and even in this case, the ferrite sheet 25 is located in an area other than the folding area FA on the rear surface of the display panel 261.

Figure 107B:
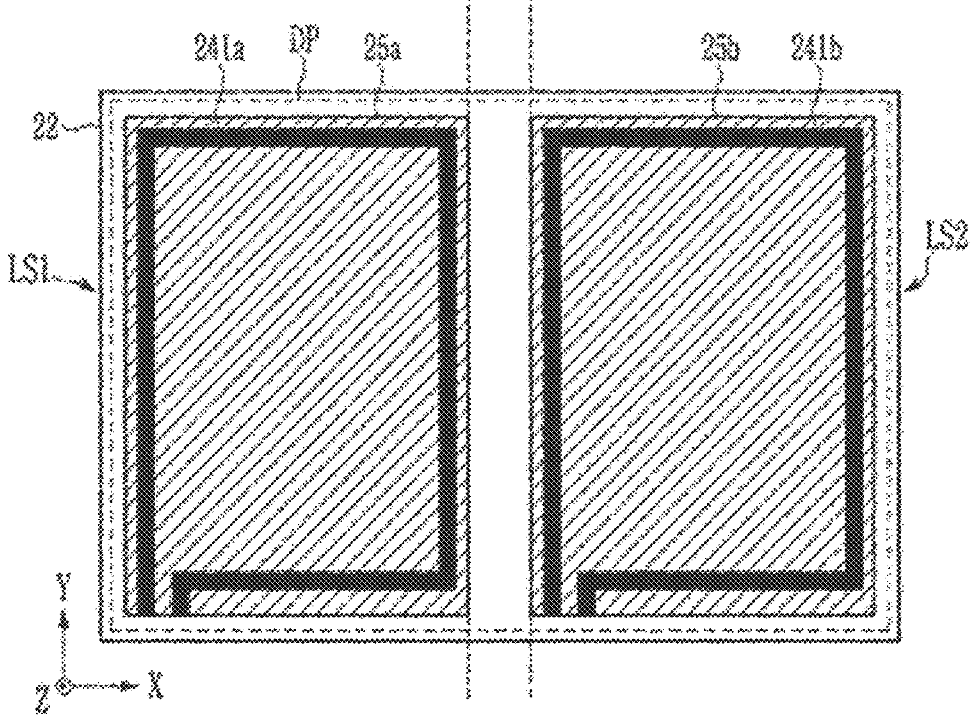

As shown in FIG. 107B, the display panel 251 includes a touch electrode layer 21 and a loop coil 264. That is, the substrate 23 may be a color filter substrate of the display panel 251, and the touch electrode layer 21 and the antenna loop 241 may be positioned between the color filter substrate 23 and the TFT substrate of the display panel 251. Alternatively, both the touch electrode layer 21 and the antenna loop 241 may be positioned on the upper and lower sides of the color filter substrate 23.

The antenna loop 241*a* may be a conductive wire extending along the boundary between the display area DP on the long side LS1 and the folding area FA, and the antenna loop 241*b* may be a conductive wire extending along the boundary between the display area DP on the long side LS2 and the folding area FA. The antenna loop 241*a* may overlap the area where the first sheet 25*a* is located on the XY plane, and the antenna loop 241*b* may overlap the area where the second sheet 25*b* is located on the XY plane.

The ferrite sheet 25 may include a first sheet 25*a* located in the area between the folding area FA and the long side LS1, and a second sheet 25*b* located in the area between the folding area FA and the long side LS2. The ferrite sheet 25 may include a plurality of sheets in addition to the two sheets, and even in this case, the ferrite sheet 25 is located in an area other than the folding area FA on the rear surface of the display panel 261.

In FIGS. 104A to 106B, the antenna loops 241*a*, 241*b* are shown to have an extended shape along the boundary between the display area DP and the folding area FA, but the antenna loops 241*a*, 241*b* may be positioned outside the display area DP. The antenna loop 241 may be also positioned to surround the periphery of a region in which the touch electrodes are disposed, without overlapping the touch electrodes disposed on the touch sensor layer 21 on the XY plane.

Figure 108:
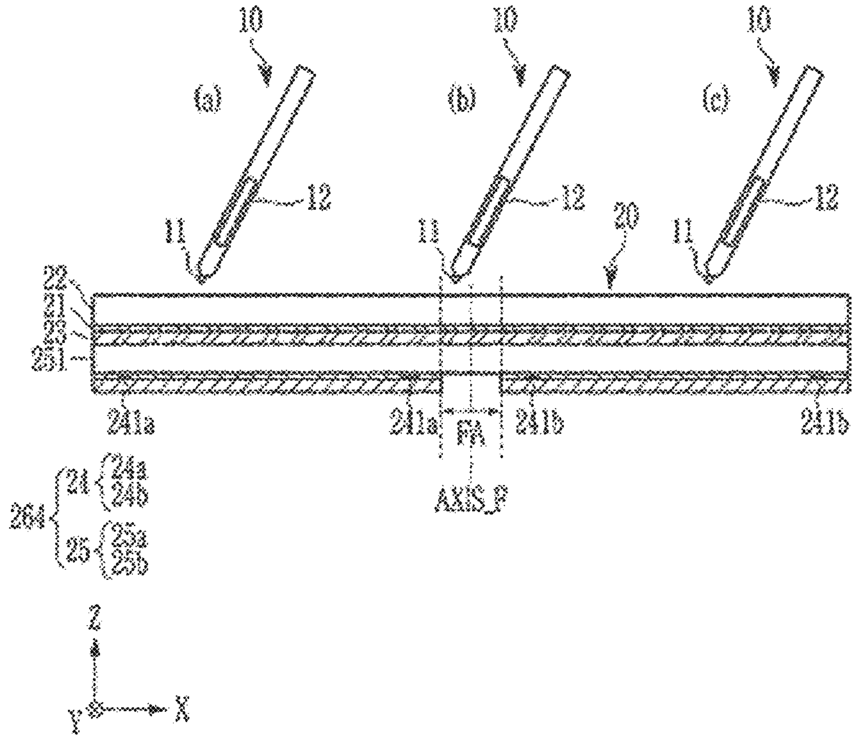
FIG. 108 is a diagram illustrating a case in which a stylus pen approaches various locations of a foldable electronic device according to an embodiment.
Figure 109:
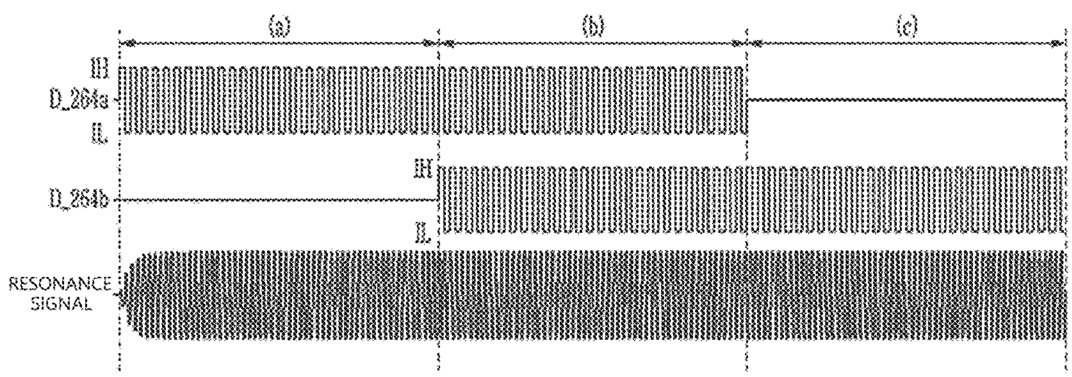
FIG. 109 is a diagram illustrating a driving signal of a loop coil and a resonance signal of a stylus pen according to the position of the stylus pen.

FIG. 108 is a view illustrating a case in which a stylus pen approaches various positions of a foldable electronic device according to an embodiment, and FIG. 109 is a view showing a driving signal of a loop coil and a resonance signal of a stylus pen according to a position of the stylus pen.

As in (a) and (c) of FIG. 108, when the stylus pen 10 is positioned in the area covered by the loop coil on the XY plane, that is, the area between the folding area FA and the long side LS1 or the area between the folding area FA and the long side LS2, the coil driver 263 may resonate the resonance circuit unit 12 by applying a driving signal to each of the antenna loops 241*a*, 241*b*. However, as shown in (b) of FIG. 108, when the stylus pen 10 is located in an area not covered by the loop coil on the XY plane, that is, the folding area FA, if the driving signal is applied to the antenna loops 241*a*, 241*b* individually, the signal resonated by the resonance circuit unit 12 is attenuated, and thus the reception sensitivity of the touch input detected by the touch sensor 261 may be reduced.

Therefore, as shown in FIG. 109, when the stylus pen 10 is located in an area not covered by the loop coil on the XY plane, that is, during the period b, the coil driver 263 applies to all the antenna loops 241*a*, 241*b* a driving signal of the same or similar phase. Here, the position of the stylus pen 10 may be determined by the touch controller 262, and the touch controller 262 may control the coil driver 263 so that a driving signal as in the period b may be applied to each of the antenna loops 241*a*, 241*b* if the stylus pen 10 enters an area where the stylus pen 10 is not covered by the loop coil on the XY plane.

FIGS. 110A to 112B are diagrams schematically illustrating a magnetic field generated when the driving signal in FIG. 109 is applied.

Figure 110A:
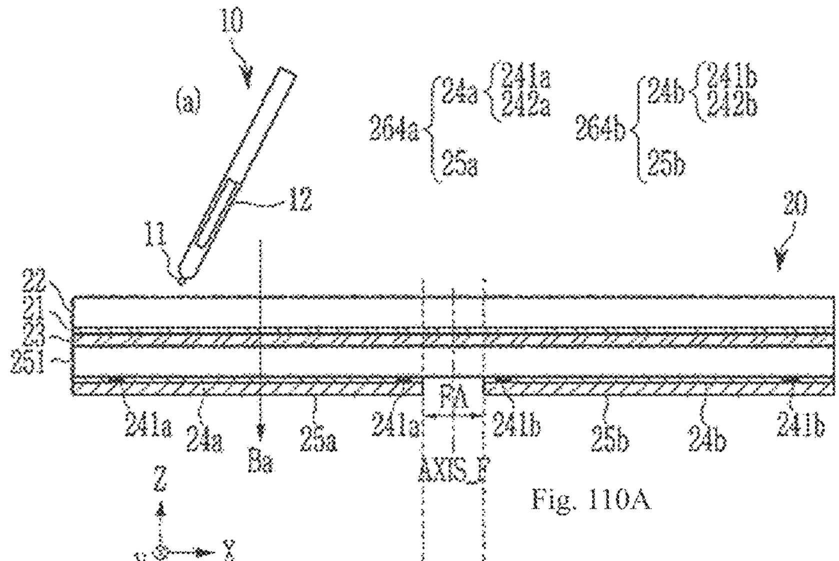
FIGS. 110A to 112B are diagrams schematically illustrating a magnetic field generated when the driving signal of FIG. 109 is applied.
Figure 110B:
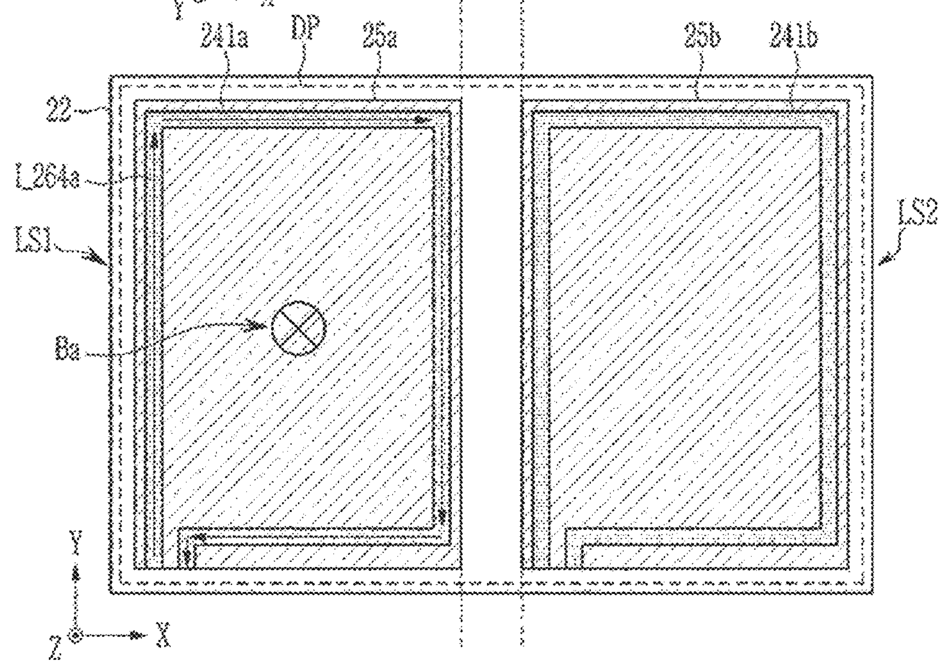

FIGS. 110A and 110B shows the magnetic field Ba generated when the driving signal as in the period a in FIG. 109 is applied. Since the magnetic field Ba is mainly formed in the area covered by the loop coil 264*a* on the XY plane by the current I_264*a* flowing in the loop coil 264*a*, the resonance circuit 12 of the stylus pen 10 can resonate.

Figure 111A:
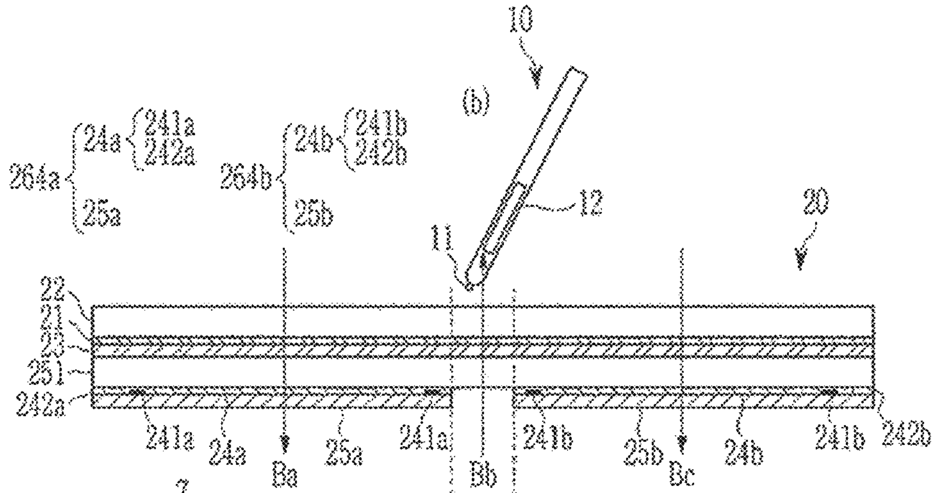
Figure 111B:
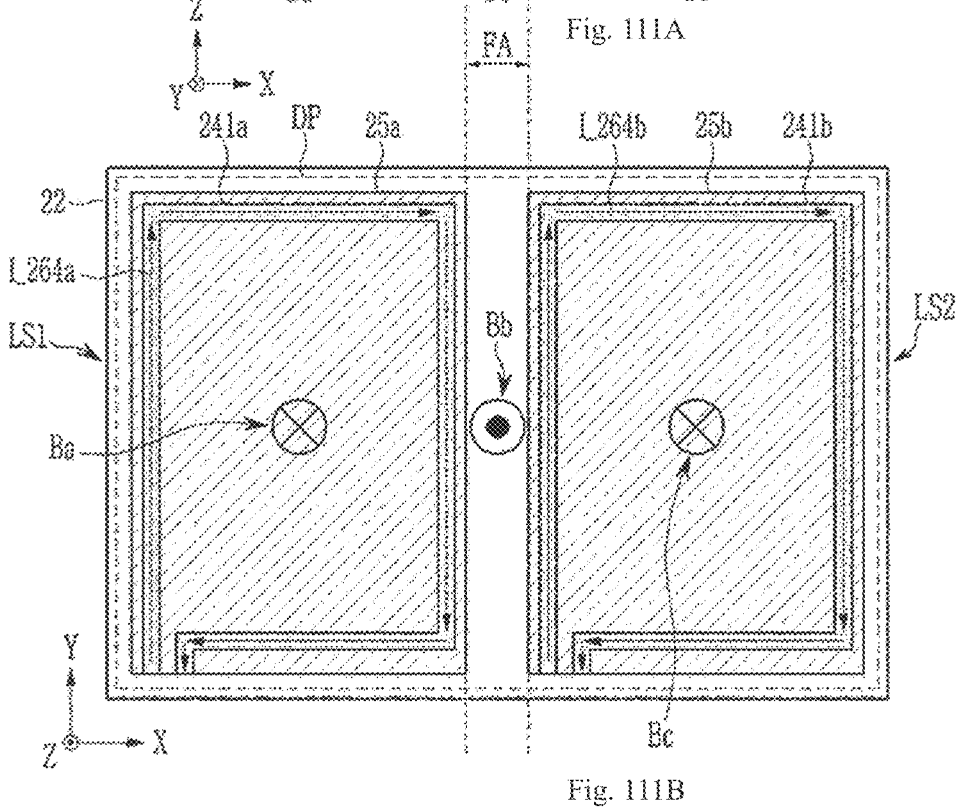

FIGS. 111A and 111B shows magnetic fields Ba, Bb, Be when the driving signal as in the period b in FIG. 109 is applied. The resonance circuit 12 of the stylus pen 10 may resonate because the magnetic field Bb is formed in the area not covered by the loop coils 264*a*, 264*b* on the XY plane, as well as the magnetic field Ba and the magnetic field Be in the area covered by the loop coils 264*a*, 264*b* on the XY plane by the current I_264*a* flowing through the loop coil 264*a* and the current I_264*b* flowing through the loop coil 264*b* are formed.

Figure 112A:
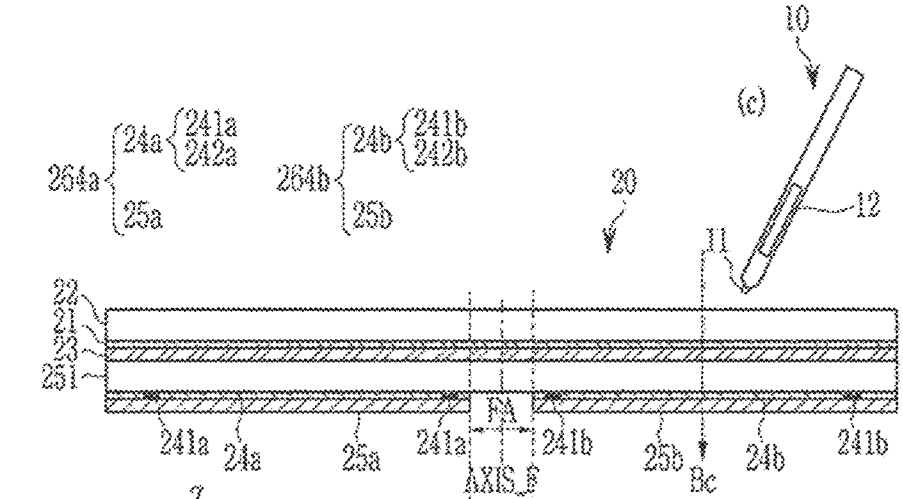
Figure 112B:
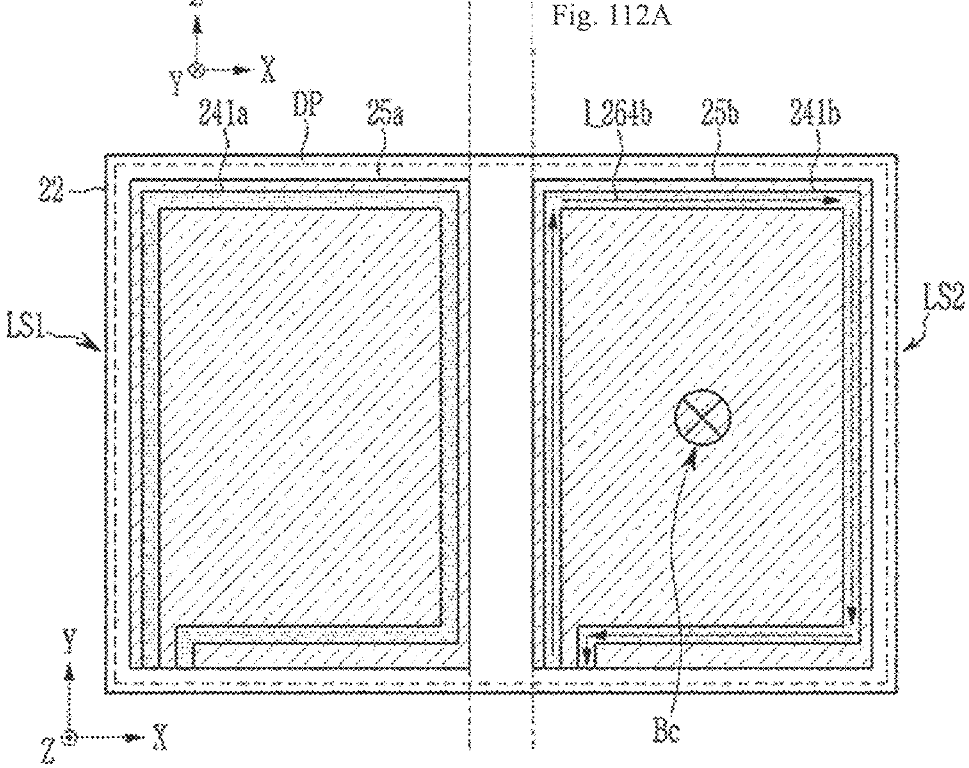

FIGS. 112A and 112B shows the magnetic field Be when the driving signal as in the period c in FIG. 109 is applied. Since the magnetic field Be is mainly formed in the area covered by the loop coil 264*b* on the XY plane by the current I_264*b* flowing through the loop coil 264*b*, the resonance circuit 12 of the stylus pen 10 may resonate.

A touch detection method according to an embodiment will be described with reference to FIGS. 113 and 114.

Figure 113:
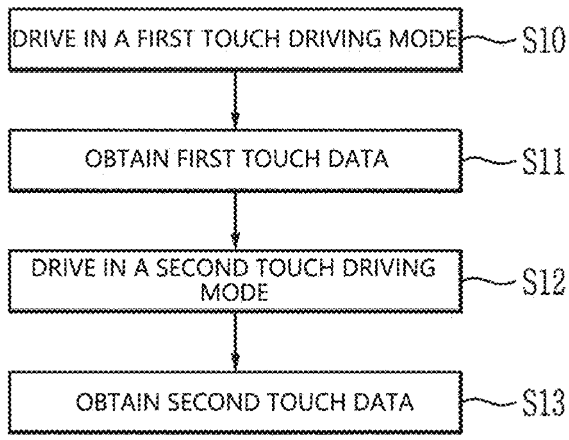
FIG. 113 is a flowchart illustrating a touch detection method according to an embodiment.
Figure 114:
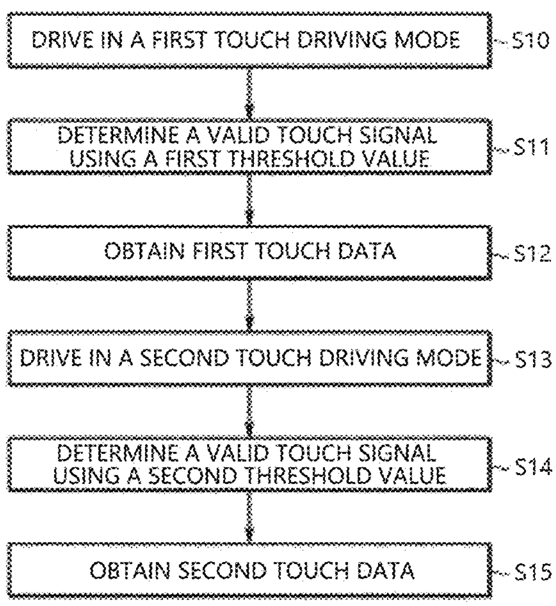
FIG. 114 is a modified example of the touch detection method of FIG. 113.

FIG. 113 is a flow chart illustrating a touch detection method according to an embodiment, and FIG. 114 is a modified example of the touch detection method in FIG. 113. The touch detection method in FIGS. 113 and 114 may be performed by the electronic device described with reference to FIGS. 1 and 2.

Referring to FIG. 113, the electronic device is driven in the first touch driving mode S10. The first touch driving mode is a mode for detecting a touch input by a touch object (e.g., a finger, etc.) other than the stylus pen 10. For example, the first touch driving mode may be a mode in which a driving signal for detecting a touch input by a touch object other than the stylus pen 10 is applied to the touch sensor 261.

For example, while the electronic device is driven in the first mode, the first driving/receiving unit 2620 outputs a driving signal to the plurality of first touch electrodes 111-1 to 111-*m*, and the second driving/receiving unit 2622 may receive a sensing signal according to a touch from the plurality of second touch electrodes 121-1 to 121-*n*.

The control unit 2624 obtains first touch data of the touch object based on the sensing signals received from the touch sensor 261 while the touch sensing unit 260 is driven in the first touch driving mode S11. The first touch data acquired in the first touch driving mode may respond to a touch input by a touch object other than the stylus pen 10 (e.g., a user's body part (finger, palm, etc.), passive or active type stylus pen). That is, the first touch data may be data corresponding to an amount of change in capacitance of a touch electrode due to a touch of the touch sensor 261 by a touch object, an amount of change in a sensing signal, an analog to digital converter (ADC) (see ADC units 115, 125 to be described later) output (or an amount of change in output), etc.

Here, as shown in FIG. 114, the control unit 2624 determines whether the sensing signal is a valid touch signal based on whether the signal magnitude (or signal strength) of the sensing signal obtained while the electronic device is driven in the first touch driving mode exceeds the first threshold value S11, and the first touch data including touch coordinates, a touch area, etc. may be obtained using the detection signal determined as the valid touch signal S12.

For example, if the signal magnitude of the sensing signal received while the electronic device is driven in the first touch driving mode exceeds the first threshold value, the control unit 2624 may use the sensing signal to calculate touch coordinate information of the touch object. On the other hand, if the signal level of the sensing signal received while driving in the first touch driving mode is equal to or less than the first threshold value, the control unit 2624 excludes the sensing signal from the touch coordinate calculation. In addition, for example, if the signal magnitude of the sensing signal received while driving in the first touch driving mode exceeds the first threshold value, the control unit 2624 may calculate the touch area using the sensing signal.

While driving in the first touch driving mode, the sensing signal generated by the touch may include at least one of the first sensing signal generated by the touch of the user's body part (finger, palm, etc.), and the second sensing signal generated by the touch of the stylus pen 10, a passive type stylus pen, or the like. In the step S11, the first threshold value may be set such that the first sensing signal is determined as a valid touch signal, and the second sensing signal is filtered.

When the first touch driving mode ends, the electronic device operates in the second touch driving mode S12. The second touch driving mode is a mode for detecting a touch input by the stylus pen 10. Here, the second touch driving mode may be a mode for applying a driving signal to detect a touch input by the stylus pen 10 to the touch sensor 261, and receiving a resonance signal of the stylus pen 10 resonate in response to the driving signal applied to the touch sensor 261.

When the electronic device is driven in the second touch driving mode, the first driving/receiving unit 2620 and the second driving/receiving unit 2622 may simultaneously apply a driving signal to all of the plurality of first touch electrodes 111-1 to 111-*m* and the plurality of second touch electrodes 121-1 to 121-*n*.

In the above description, in order to generate a resonance signal of the stylus pen 10 while the electronic device is driven in the second touch driving mode, although the case that the first driving/receiving unit 2620 and the second driving/receiving unit 2622 simultaneously apply a driving signal to the plurality of first touch electrodes 111-1 to 111-*m* and the plurality of second touch electrodes 121-1 to 121-*n* has been described as an example, a driving signal may be simultaneously applied to all of the plurality of first touch electrodes 111-1 to 111-*m* by the first driving/receiving unit 2620, or a driving signal may be simultaneously applied to all of the plurality of second touch electrodes 121-1 to 121-*n* by the second driving/receiving unit 2622. In a case that the first driving/receiving unit 2620 and the second driving/receiving unit 2622 simultaneously apply a driving signal to all of the plurality of first touch electrodes 111-1 to 111-*m* and the plurality of second touch electrodes 121-1 to 121-*n*, it is assumed that the driving signal applied to the plurality of first touch electrodes 111-1 to 111-*m* and the driving signal applied to the plurality of second touch electrodes 121-1 to 121-*n* have the same phase. However, it is not limited thereto. The resonance circuit unit 12 of the stylus pen 10 may resonate by the driving signal applied to the plurality of first touch electrodes 111-1 to 111-*m* and the plurality of second touch electrodes 121-1 to 121-*n*, and a resonance signal generated thereby may be transmitted to the touch sensor 261 through the conductive tip 11. Accordingly, the first driving/receiving unit 2620 may receive the sensing signal transmitted from the plurality of first touch electrodes 111-1 to 111-*m*, and the second driving/receiving unit 2622 may receive the sensing signal transmitted from the plurality of second touch electrodes 111-1 to 111-*n*. The first driving/receiving unit 2620 and the second driving/receiving unit 2622 may process the received sensing signals and transmit it to the control unit 2624.

The control unit 2624 receives sensing signals from the touch sensor 261 while the electronic device is driven in the second touch driving mode, and acquires second touch data including touch coordinates of a touch object, etc. based on the received sensing signals S13. The second touch data obtained in the second touch driving mode may correspond to a touch input by the stylus pen 10. That is, the second touch data is obtained by converting into data the amount of capacitance change due to the touch of the touch sensor 261 of the stylus pen 10, the amount of sensing signal change, ADC output (or amount of output change), or the like.

Here, as shown in FIG. 114, the control unit 2624 may determine whether the sensing signal while the electronic device is driven in the second touch driving mode is a valid touch signal based on whether the level of the sensing signal exceeds the second threshold value S14. The second touch data may be acquired using the sensing signal determined as the valid touch signal S15.

For example, if the magnitude of the sensing signal obtained while the electronic device is driven in the second touch driving mode exceeds the second threshold value, the control unit 2624 may calculate touch coordinates using the sensing signal. On the other hand, if the level of the sensing signal obtained while the electronic device is driven in the second touch driving mode is equal to or less than the second threshold value, the control unit 2624 excludes the sensing signal from calculating the touch coordinates. If the magnitude of the sensing signal obtained while the electronic device is driven in the second section exceeds the second threshold value, the control unit 2624 may calculate the touch area using the sensing signal.

Next, driving signals applied in the first touch driving mode and the second touch driving mode and a resonance signal of the stylus pen 10 will be described with reference to FIG. 115.

Figure 115:
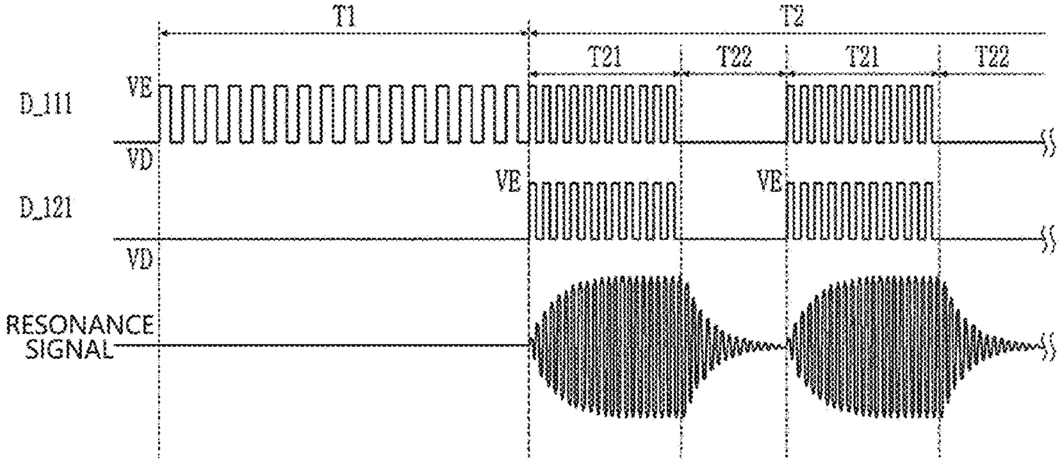
FIG. 115 is a waveform diagram illustrating an example of a driving signal according to the touch detection method of FIGS. 113 and 114.

FIG. 115 is a waveform diagram illustrating an example of a driving signal according to the touch detection method in FIGS. 113 and 114. In FIG. 115, D_111 and D_121 represent examples of driving signals output from the first driving/receiving unit 2620 and the second driving/receiving unit 2622, respectively.

Referring to FIG. 115, in a first period T1 in which the touch sensing unit 260 of the electronic device is driven in the first touch driving mode, the first driving/receiving unit 2620 outputs the driving signal D_111 to a plurality of first touch electrodes 111-1 to 111-*m*. In addition, when the first driving/receiving unit 2620 outputs driving signals to the plurality of first touch electrodes 111-1 to 111-*m*, the second driving/receiving unit 2622 receives sensing signals from the plurality of second touch electrodes 121-1 to 121-*n*. In addition, in a first period T1 in which the touch sensing unit 260 of the electronic device is driven in the first touch driving mode, the first driving/receiving unit 2620 may output a driving signal to at least one type of touch electrodes among the plurality of first touch electrodes 111-1 to 111-*m* and the plurality of second touch electrodes 121-1 to 121-*n*.

In a first sub-period T21 of the second period T2 in which the touch sensing unit 260 of the electronic device is driven in the second touch driving mode, the first driving/receiving unit 2620 simultaneously applies the driving signal D_111 to the plurality of first touch electrodes 111-1 to 111-*m*, and the second driving/receiving unit 2622 simultaneously applies the driving signal D_121 to the plurality of second touch electrodes 121-1 to 121-*n*.

In the first sub-period T21, the frequencies of the driving signal D_111 applied to the plurality of first touch electrodes 111-1 to 111-*m* and the driving signal D_121 applied to the plurality of second touch electrodes 121-1 to 121-*n* correspond to the resonance frequency of the stylus pen 10. For example, the frequencies of driving signals D111, D121 output to the plurality of first touch electrodes 111-1 to 111-*m* and the plurality of second touch electrodes 121-1 to 121-*n* during the first sub-period T21 may be frequencies within an offset of 25 kHz based on 500 kHz.

In contrast, in the first period T1, the frequencies of the driving signals D_111 output to the plurality of first touch electrodes 111-1 to 111-*m* are set to be different from the resonance frequency of the stylus pen 10. For example, the frequency of the driving signals D_111 output to the plurality of first touch electrodes 111-1 to 111-*m* during the first period T1 may be set to about 150 kHz. The frequency setting of such drive signals is merely an example, and may be set to a value different from the above.

In a second sub-period T22 of the second period T2 in which the touch sensing unit 260 of the electronic device is driven in the second touch driving mode, the first driving/receiving unit 2620 may receive sensing signals from the plurality of first touch electrodes 111-1 to 111-*m*, and the second driving/receiving unit 2622 may receive sensing signals from the plurality of second touch electrodes 121-1 to 121-*n*. In the second sub-period T22, even after the application of the driving signal is finished, the resonance signal output by the resonance circuit unit 12 of the stylus pen 10 is transmitted to at least one among the plurality of first touch electrodes 111-1 to 111-*m*, and the plurality of second touch electrodes 121-1 to 121-*n*.

The second period T2 may include a plurality of first sub-periods T21 and second sub-periods T22. For example, in the second period T2, the combination of the first sub-period T21 and the second sub-period T22 may be repeated eight times.

Although it has been described above that the second period T2 exists after the first period T1, the first period T1 may exist after the second period T2, and the time length of the first period T1 and the second period T2 may be changed within several frame periods. The driving method of the touch sensing unit 260 according to an embodiment is not limited thereto.

In addition, in the above description, a case in which the first period T1 and the second period T2 are included once in one frame period has been described as an example, but a plurality of first periods T1 and a plurality of second periods T2 may be included in one frame period. In this case, the touch sensing unit 260 of the electronic device may acquire first touch data based on the sensing signals received from the touch sensor 261 in the plurality of first periods T1 driven in the first touch driving mode, and may acquire second touch data based on the sensing signals received from the touch sensor 261 in the plurality of second periods T2 driven in the second touch driving mode.

In addition, although it has been described above that the first driving/receiving unit 2620 and the second driving/receiving unit 2622 receive the sensing signal in the second sub-period T22, the first driving/receiving unit 2620 and the second driving/receiving unit 2620 may receive sensing signals through the plurality of first touch electrodes 111-1 to 111-*m* and the plurality of second touch electrodes 121-1 to 121-*n* in the first sub-period T21.

Next, the touch detection method in FIGS. 113 and 114 will be described in more detail with reference to FIGS. 116 to 119.

Figure 116:
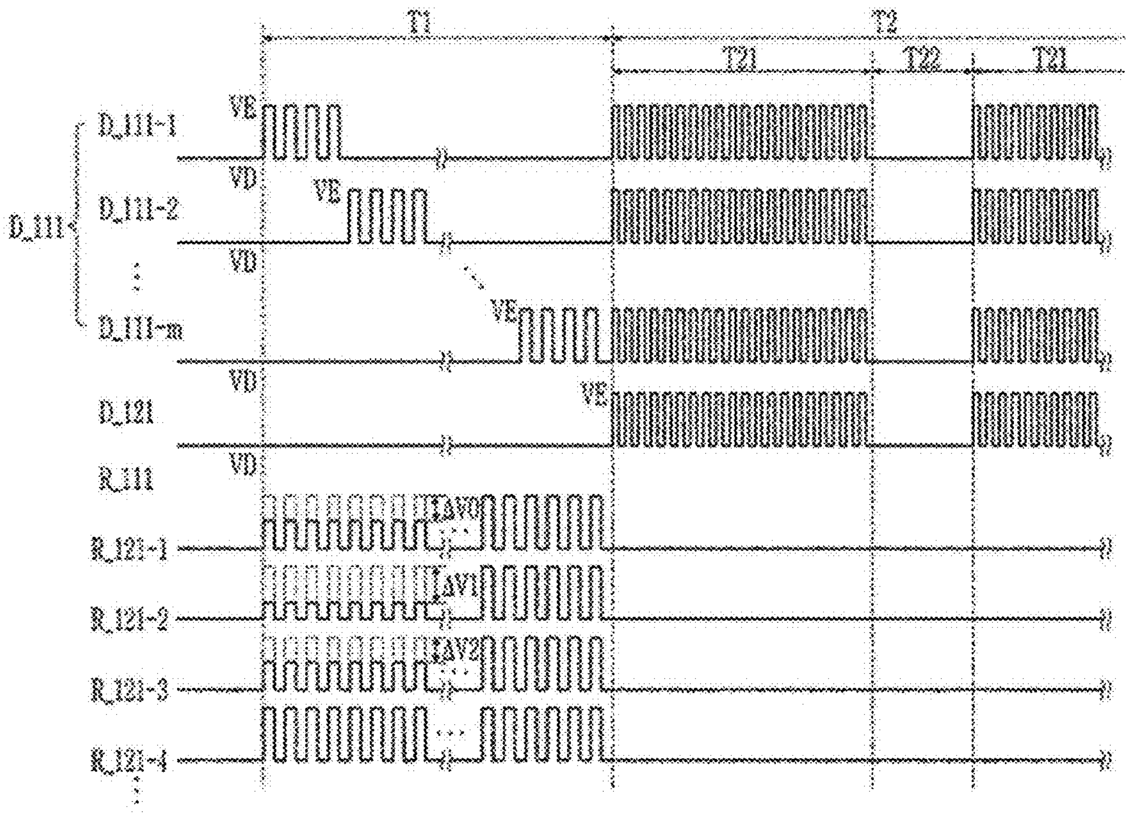
FIG. 116 is a waveform diagram illustrating an example of a driving signal and a received signal according to the touch detection method of FIGS. 113 and 114.
Figure 117:
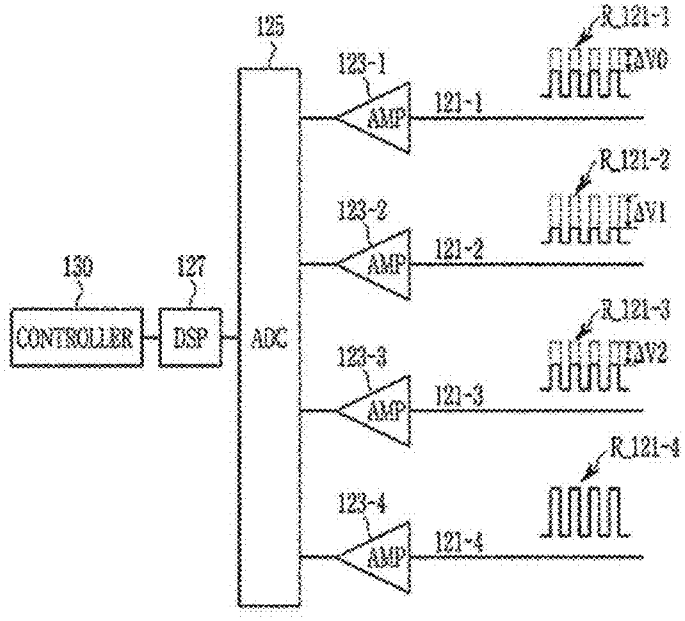
FIG. 117 shows an example of processing a sensing signal in the first period T1 of FIG. 116.

FIG. 116 is a waveform diagram illustrating an example of a driving signal and a received signal according to the touch detection method in FIGS. 113 and 114, and FIG. 117 indicates an example of processing a sensing signal in the first period T1. In FIGS. 116 and 117, it is assumed that a finger touch is applied to an area where the first touch electrodes 111-1, 111-2 and the second touch electrodes 121-1, 121-2, 121-3 intersect.

In FIG. 116, the driving signals D_111, D_121 applied to the first touch electrodes 111-1, 111-2 and the second touch electrodes 121-1, 121-2, 121-3 include a frequency signal having an enable level voltage VE and a disable level voltage VD. Here, the first driving signals D_111-1 to D_111-*m* may be sequentially applied to the plurality of first touch electrodes 111-1 to 111-*m* in the first period T1. The first driving signals D_111-1 to D_111-*m* may be pulse signals having an enable level voltage VE and a disable level voltage VD. On the other hand, in FIG. 116, a case in which the driving signals D_111, D_121 are frequency signals of a pulse waveform is illustrated as an example, but the waveform of the driving signals is not limited thereto.

In the first period T1, the plurality of driving signals D_111-1 to D_111-*m* are sequentially applied to the plurality of first touch electrodes 111-1 to 111-*m*. In addition, the second driving/receiving unit 2622 receives the sensing signals R_121-1 to R_121-*n* from the plurality of second touch electrodes 121-1 to 121-*n*.

In the first period T1, the driving signals D_111-1 to D_111-*m* applied to the plurality of first touch electrodes 111-1 to 111-*m* are those for detecting a touch input by a touch object other than the stylus pen 10.

The second driving/receiving unit 2622 receives the sensing signals R_121-1 to R_121-*n* from the plurality of second touch electrodes 121-1 to 121-*n*.

The first driving signals D_111-1 to D_111-*m* are driving signals for detecting a touch input by a touch object other than the stylus pen 10, and are not limited to the waveform shown in FIG. 116. Although FIG. 116 illustrates that the first driving signals D_111-1 to D_111-*m* are sequentially applied to the plurality of first touch electrodes 111-1 to 111-*m*, driving signals having different frequencies (e.g., frequencies having an orthogonal relationship to each other) may be simultaneously applied to the plurality of first touch electrodes 111-1 to 111-*m*. In this case, the second driving/receiving unit 2622 may receive sensing signals according to a touch from the plurality of second touch electrodes 121-1 to 121-*n*, and may separate the sensing signals for each of the first touch electrodes 111-1 to 111-*m* by means of bandpass filters of different frequency bands.

As shown in FIG. 117, in the first period T1, the sensing signal R_121-1 from the second touch electrode 121-1 may be amplified and output through the corresponding amplifier 123-1. The sensing signal R_121-2 from the second touch electrode 121-2 may be amplified and output through the corresponding amplifier 123-1. The sensing signal R_121-3 from the second touch electrode 121-3 may be amplified and output through the corresponding amplifier 123-1. The sensing signal R_121-4 from the second touch electrode 121-4 may be amplified and output through the corresponding amplifier 123-1. In the sensing signals R_121-1, R_121-2, R_121-3, a change in signal level due to a touch may occur as ΔV0, ΔV1, ΔV2, respectively. The sensing signals amplified by the respective amplifiers 123-1, 123-2, 123-3, 123-4 are converted into sensing data that are a digital signal by the ADC unit 125, then processed by the signal processing unit 127, and transmitted to the control unit 2624.

When sensing data are input, the control unit 2624 may detect a change in signal level (amplitude) of each sensing signal therefrom. In addition, a point where the first touch electrode to which the driving signal is applied when the signal magnitude change occurs and the second touch electrode to which the signal magnitude change occurs intersect can be acquired as touch coordinates. Taking FIG. 8 as an example, while a driving signal is applied to the first touch electrodes 111-1, 111-2, a change in signal magnitude due to a touch occurs as ΔV0, ΔV1, ΔV2, respectively in the sensing signals R_121-1, R_121-2, R_121-3 received from the second touch electrodes 121-1, 121-2, 121-3. Accordingly, a point where the first touch electrodes 111-1, 111-2 and the second touch electrodes 121-1, 121-2, 121-3 intersect may be obtained as touch coordinates.

Next, referring back to FIG. 116, in the first sub-period T21 within the second period T2, the driving signals D_111, D_121 are applied to all of the plurality of first touch electrodes 111-1 to 111-*m* and the plurality of second touch electrodes 121-1 to 121-*n*. Driving signals D_111 and D_121 applied to the plurality of first touch electrodes 111-1 to 111-*m* and the plurality of second touch electrodes 121-1 to 121-*n* during the first sub-period T21 are a frequency or pulse signal having a frequency similar to the resonance frequency of the stylus pen 10.

In the first sub-period T21, a reception of sensing signals from the plurality of first touch electrodes 111-1 to 111-*m* and the plurality of second touch electrodes 121-1 to 121-*n* may not be performed.

In the second sub-period T22, the first driving/receiving unit 2620 and the second driving/receiving unit 2622 may receive sensing signals from all of the plurality of first touch electrodes 111-1 to 111-*m* and the plurality of second touch electrodes 121-1 to 121-*n*.

The second period T2 may include a plurality of first sub-periods T21 and second sub-periods T22. For example, in the second period T2, the combination of the first sub-period T21 and the second sub-period T22 may be repeated eight times.

In FIG. 116, since a touch by the stylus pen 10 does not occur, a sensing signal may not be received in the second sub-period T22.

Figure 118:
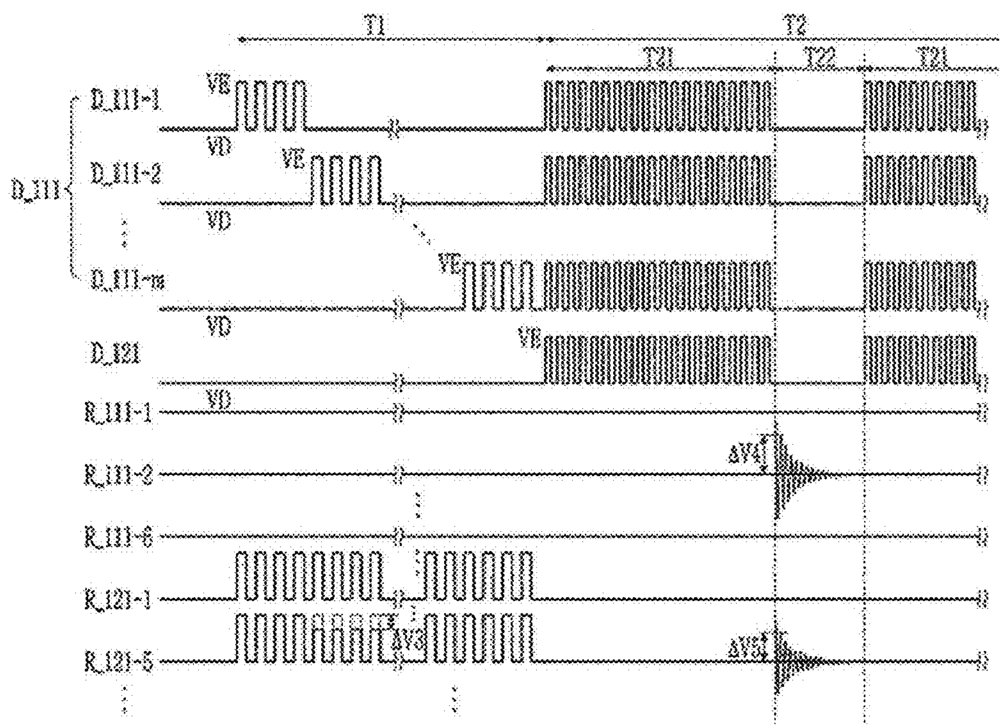
FIG. 118 is a waveform diagram illustrating another example of a driving signal and a received signal according to the touch detection method of FIGS. 113 and 114.
Figure 119:
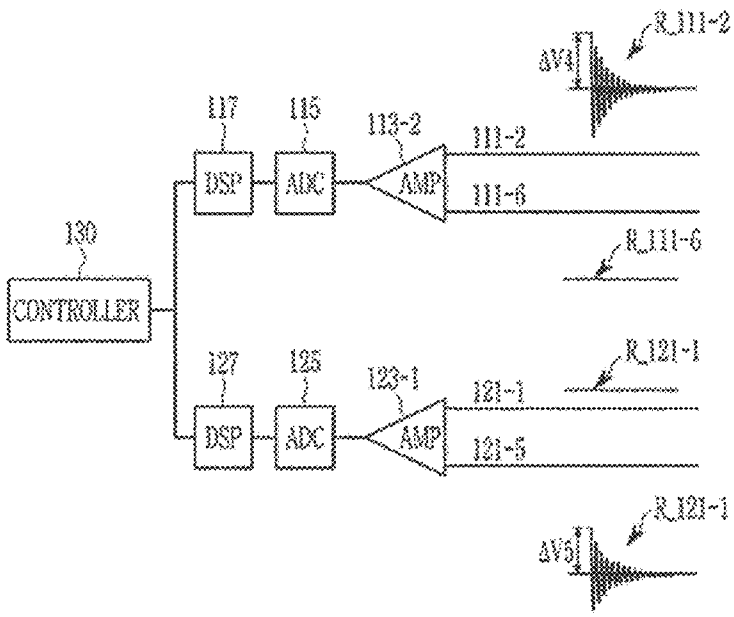
FIG. 119 shows an example of processing a sensing signal in the second period T2 of FIG. 118.

FIG. 118 is a waveform diagram illustrating another example of a driving signal and a received signal according to the touch detection method in FIGS. 113 and 114, and FIG. 119 indicates an example of processing a sensing signal in the second period T2 in FIG. 118. In FIGS. 118 and 119, it is assumed that a touch by the stylus pen 10 is applied to an area where the first touch electrode 111-2 and the second touch electrode 121-5 intersect.

In FIG. 118, driving signals D_111, D_121 applied to the first touch electrodes 111-1, 111-2 and the second touch electrodes 121-1, 121-2, 121-3 include a frequency or pulse signal having an enable level voltage VE and a disable level voltage VD as in FIG. 116. Meanwhile, in FIG. 118, a case in which the driving signals D_111, D_121 are frequency signals of a pulse waveform is illustrated as an example, but the waveform of the driving signals is not limited thereto.

Referring to FIG. 118, in the first period T1, driving signals D_111-1 to D_111-*m* are sequentially applied to the plurality of first touch electrodes 111-1 to 111-*m*. The second driving/receiving unit 2622 receives the sensing signals R_121-1 to R_121-*n* from the plurality of second touch electrodes 121-1 to 121-*n*.

Since the stylus pen 10 is close to the second touch electrode 121-5, in the first period T, the signal magnitude changing value ΔV3 of the sensing signal R_121-5 from the second touch electrode 121-5 having a touch may be amplified and output through the amplifier 123-5.

Next, in the first sub-period T21 in the second period T2, the driving signals D_111, D_121 are applied to all of the plurality of first touch electrodes 111-1 to 111-*m* and the plurality of second touch electrodes 121-1 to 121-*n*. Driving signals D_111, D_121 applied to the plurality of first touch electrodes 111-1 to 111-*m* and the plurality of second touch electrodes 121-1 to 121-*n* during the first sub-period T21 are frequency or pulse signals having a frequency similar to the resonant frequency of the stylus pen 10.

In FIG. 118, the enable level voltage VE and the disable level voltage VD of the second and third driving signals D_111, D_121 are described as being the same and in-phase signals, but the present invention is not limited thereto. In the first sub-period T21, the level of the pen resonance signal increases according to the time when the second and third driving signals D_111, D_121 are applied. After a certain time has elapsed, the level of the pen resonance signal is in a saturated state.

In the first sub-period T21, sensing signals from the plurality of first touch electrodes 111-1 to 111-*m* and the plurality of second touch electrodes 121-1 to 121-*n* are not received.

Thereafter, when the first sub-period T21 ends, the first driving/receiving unit 2620 and the second driving/receiving unit 2622 stop applying driving signals. That is, during the second sub-period T22 following the first sub-period T21, no driving signal is applied to the plurality of first touch electrodes 111-1 to 111-*m* and the plurality of second touch electrodes 121-1 to 121-*n*.

In the second sub-period T22, the first driving/receiving unit 2620 and the second driving/receiving unit 2622 may receive sensing signals from all of the plurality of first touch electrodes 111-1 to 111-*m* and the plurality of second touch electrodes 121-1 to 121-*n*. The first driving/receiving unit 2620 and the second driving/receiving unit 2622 may receive a pen resonance signal in the second sub-period T22 to which the driving signals D_111 and D_121 are not applied, as a detection signal.

As shown in FIG. 119, sensing signals R_111-2, R_121-5 received from the first touch electrode 111-2 and the second touch electrode 121-5 in the area touched by the stylus pen 10 in the second sub-period T22 may be amplified and output by the corresponding differential amplifiers 113-2, 123-1, respectively. In each of the differential amplifiers 113-2, 123-1, since sensing signals received from the touch electrodes 111-6, 121-1 in addition to the sensing signals R_111-2, R_121-5 are input as another input, the signals output from each of the differential amplifiers 113-2, 123-1 substantially correspond to the signals obtained by amplifying sensing signals R_111-2 and R_121-5 received from the first touch electrode 111-2 and the second touch electrode 121-5. The sensing signals amplified by each of the differential amplifiers 113-2, 123-1 are converted into a digital signal of sensing data by the corresponding ADCs 115, 125, and then are processed by signal processing units 117, 127 and transmitted to the control unit 2624. Here, the signal magnitude difference ΔV4 between the sensing signal R_111-2 from the first touch electrode 111-2 with a touch and the sensing signal R_111-6 from the first touch electrode 111-6 without a touch may be amplified and output through the differential amplifier 113-2. Similarly, the difference ΔV5 in signal magnitude between the sensing signal R_121-5 from the second touch electrode 121-5 with a touch and the sensing signal R_121-1 from the second touch electrode 121-1 without a touch may be amplified and output through the differential amplifier 123-1.

When sensing data is input, the control unit 2624 may detect an effective touch signal having a signal level (amplitude) equal to or greater than a predetermined value among sensing signals, using the input. In addition, touch coordinates may be obtained from the positions of the touch electrodes detected as valid touch signals. When taking FIG. 118 as an example, a sensing signal greater than or equal to a predetermined value is received from the first touch electrode 111-2 and the second touch electrode 121-5. Accordingly, a point where the first touch electrode 111-2 and the second touch electrode 121-5 intersect may be obtained as touch coordinates.

The control unit 2624 may calculate a touch position in the touch sensor 261 through the sensing signal received in the second sub-period T22. According to the electronic device in an embodiment, since the sensing signals are received through both the plurality of first touch electrodes 111-1 to 111-*m* and the plurality of second touch electrodes 121-1 to 121-*n* in the second sub-period T22, there is an advantage in that touch coordinates along two axes intersecting each other can be acquired in a short time.

In addition, since the same driving signals D_111, D_121 are simultaneously applied to both the plurality of first touch electrodes 111-1 to 111-*m* and the plurality of second touch electrodes 121-1 to 121-*n* in the first sub-period T21, there is an advantage in that the resonance signal level of the stylus pen 10 in response thereto is improved.

In the above description, a reception of the sensing signal may be performed at least once in the second sub-period T22 by at least one of the first driving/receiving unit 2620 and the second driving/receiving unit 2622. In addition, the point of time at which the sensing signal is received may be at least a point of time within the second sub-period T22, but it is not limited thereto.

According to embodiments, when the first touch data or the second touch data are obtained as described above, the touch sensing unit 260 of the electronic device detects touch coordinates from the acquired touch data and transmits the touch data including the touch coordinates to the host device every predetermined touch report cycle. In this disclosure, the touch report cycle refers to a cycle in which the electronic device outputs touch data to the host device in order to report the touch data acquired by driving the touch sensor 261 to the external host device (not shown therein).

Next, the magnitude of the sensing signal received in each of the first period T1 and the second period T2 will be described with reference to FIG. 120.

Figure 120:
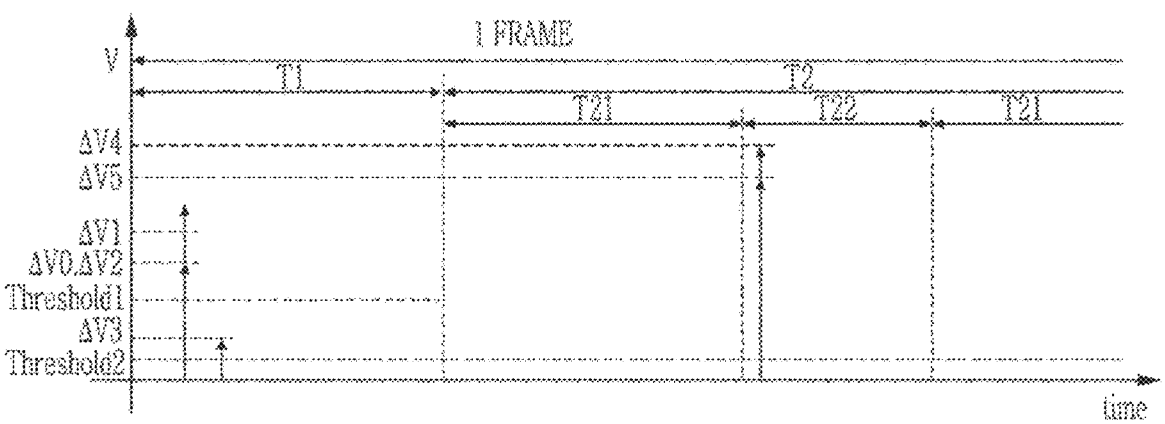
FIG. 120 is a graph showing the magnitude of the received signal in FIGS. 116 and 118.

FIG. 120 is a graph showing the magnitude of the received signal in FIGS. 116 and 118. 1 FRAME includes a first period T1 and a second period T2. The second period T2 includes a first sub-period T21 and a second sub-period T22. When the second period T2 ends, the first period T1 of the next frame starts.

In the first period T1, the difference in magnitude of the sensing signal by the finger is ΔV1, ΔV2, which exceeds the first threshold Threshold1. In the first period T1, the difference in magnitude of the sensing signal by the stylus pen 10 is ΔV3, which is less than or equal to the first threshold Threshold1.

According to an embodiment, the control unit 2624 may determine a sensing signal having a difference in magnitude exceeding the first threshold value Threshold1 in the first period T1 as an effective touch signal. The first threshold Threshold1 may be set so that the first sensing signal by the user's body part (finger, palm, etc.) is determined as an effective touch signal, and the second sensing signal by the stylus pen 10 or the passive type stylus pen is filtered.

Therefore, the control unit 2624 determines that the sensing signal by the finger is a valid touch signal, and calculates touch coordinates using the sensing signal. The control unit 2624 determines that the sensing signal by the stylus pen 10 is not a valid touch signal, and does not calculate touch coordinates.

In the second period T2, the difference in magnitude of the sensing signal by the stylus pen 10 is ΔV4, ΔV5, which exceeds the second threshold Threshold2.

The control unit 2624 determines a sensing signal having a difference in magnitude exceeding the second threshold value Threshold2 in the second period T2 as a valid touch signal. Therefore, the control unit 2624 determines the sensing signal by the stylus pen 10 as a valid touch signal, and calculates touch coordinates using the sensing signal.

According to embodiments, the first threshold value Threshold1 is set so that the first sensing signal by the user's body part (finger, palm, etc.) is determined as an effective touch signal, and the sensing signal by the passive type stylus pen 10 is filtered. Accordingly, in the first period T1, touch coordinates by a touch object having a large change in signal magnitude can be accurately detected, and in the second period T2, touch coordinates by a touch object having a small change in signal magnitude can be accurately detected.

A touch area according to a touch object will be described with reference to FIGS. 121 and 122.

Figure 121:
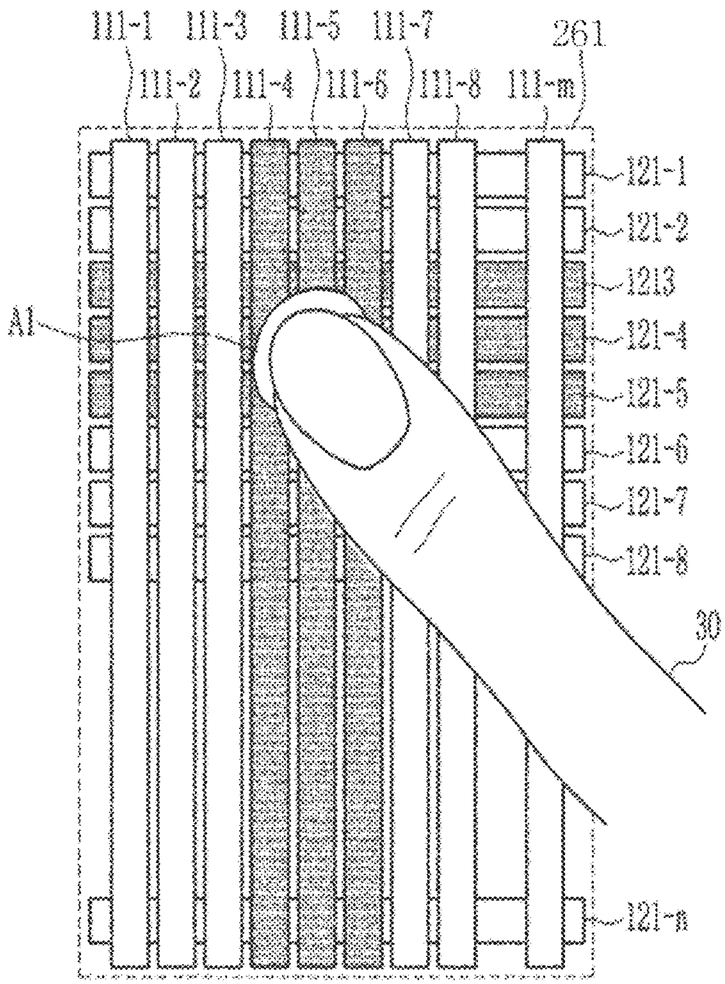
FIGS. 121 and 122 are diagrams illustrating touch areas of different objects, respectively.
Figure 122:
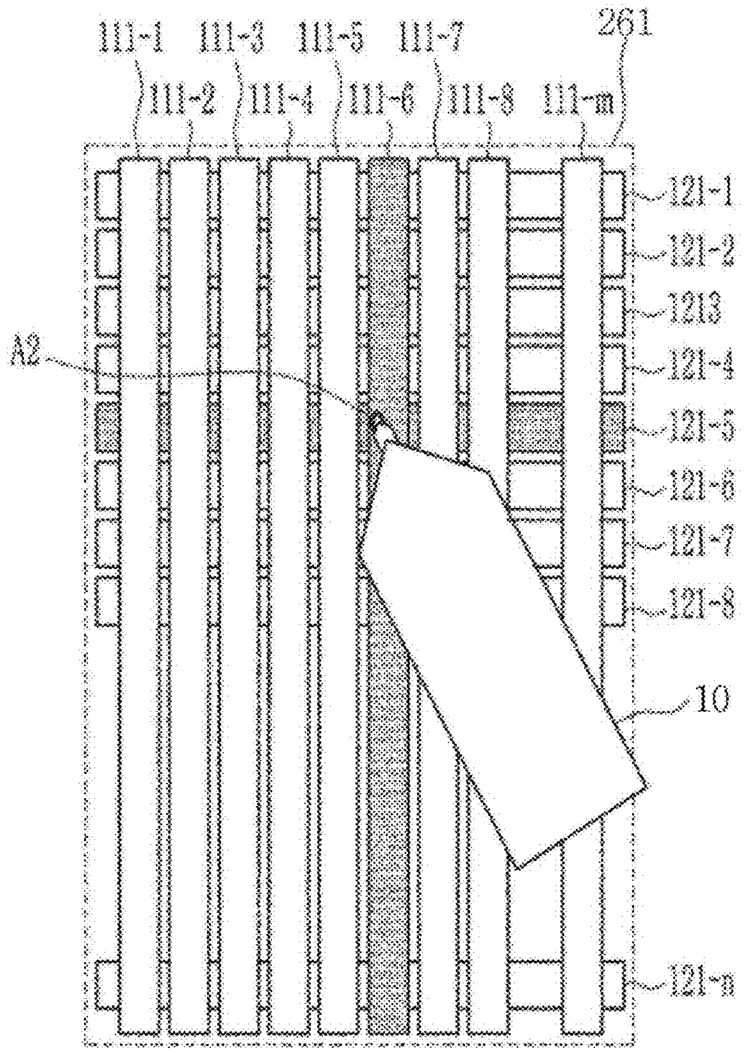

FIGS. 121 and 122 are diagrams illustrating touch areas of different objects, respectively.

FIG. 121 illustrates a case in which the finger 30 touches the touch sensor 261.

Referring to FIG. 121, a plurality of touch electrodes 111-3 to 111-5 and 121-4 to 121-6 may be positioned near an area A1 where the tip of the finger 30 contacts the touch sensor 261. In this case, the control unit 2624 may calculate the area of the touch area A1 by using the sensing signals received from sensing channels corresponding to the plurality of touch electrodes 111-3 to 111-5, 121-4 to 121-6.

FIG. 122 illustrates a case in which the stylus pen 10 touches the touch sensor 261.

Referring to FIG. 122, one first touch electrode 111-6 and one second touch electrode 121-6 may be positioned near the area A2 where the tip of the stylus pen 10 contacts the touch sensor 261. Alternatively, two first touch electrodes and two second touch electrodes may be positioned near the area A2 where the tip of the stylus pen 10 contacts the touch sensor 261. That is, the number of touch electrodes positioned in the area A2 where the tip of the stylus pen 10 contacts the touch sensor 261 is smaller than the number of touch electrodes positioned in the area A1 where the tip of the finger 30 contacts the touch sensor 261. Accordingly, the area of the touch area A2 by the touch of the stylus pen 10 is calculated as a very small value in comparison to that of the touch area A1 by the touch of the finger 30.

According to embodiments, the touch sensing unit 260 may transmit touch data including information on the area of the touch area to the host device. Through this, the host device may identify whether the touch object is the finger 30 or the stylus pen 10.

According to embodiments, the touch sensing unit 260 may determine a touch object according to the calculated area of the touch area and transmit touch data including information on the determined touch object to the host device.

A phenomenon in which a touch of the stylus pen 10 is not detected by another conductive touch object will be described with reference to FIGS. 123 and 124.

Figure 123:
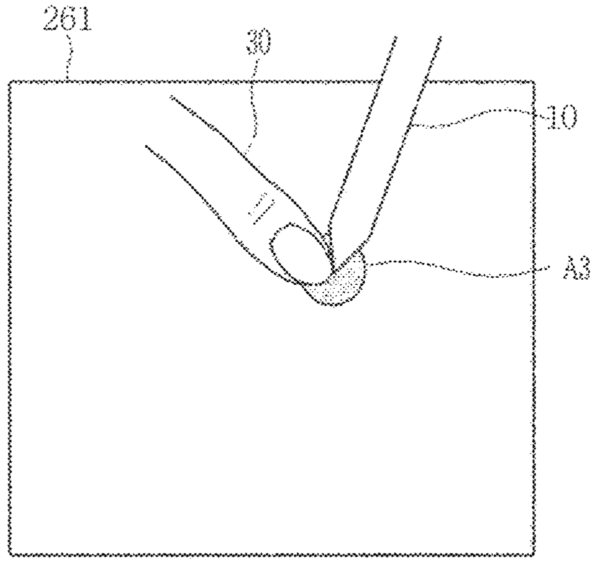
FIG. 123 illustrates a case in which a touch of the stylus pen 10 is not detected according to a distance between the stylus pen 10 and a touch point of another touch object 30.

FIG. 123 illustrates a case in which a touch of the stylus pen 10 is not detected according to a distance between the stylus pen 10 and a touch point of another touch object 30. FIG. 124 illustrates a case in which a touch of the stylus pen 10 is not detected according to a touch area of another touch object 30.

As shown in FIG. 123, when the touch point of another touch object 30 is located in the area A3 within a predetermined distance from the touch point of the stylus pen 10, the magnitude of the sensing signal by the touch of the stylus pen 10 that the driving/receiving unit 2620, 2622 receives in the second period T2 is reduced. For example, the magnitude of the sensing signal in this case may be lowered by about 30% in comparison to the case where the stylus pen 10 alone touches the touch sensor 261.

Figure 124:
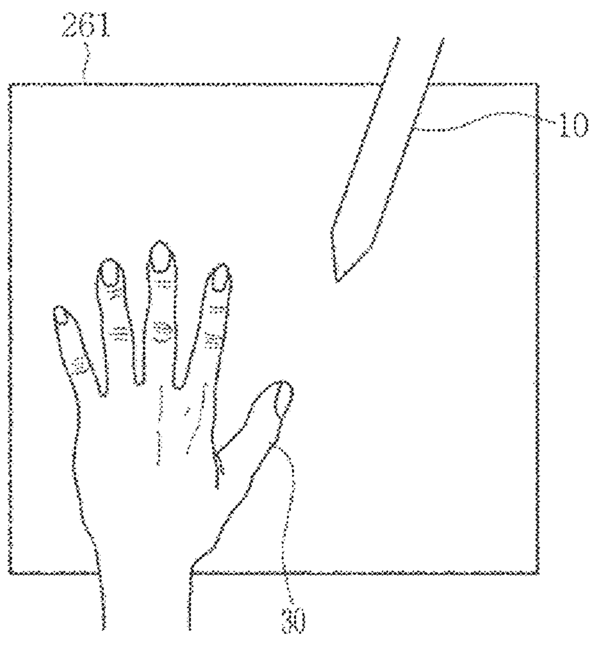
FIG. 124 illustrates a case in which a touch of the stylus pen 10 is not detected according to a touch area of another touch object 30.

As shown in FIG. 124, even when the touch area of another touch object 30 is large, such as when the touch sensor 261 is touched with a palm, the magnitude of the sensing signal by the touch of the stylus pen 10 that the driving/receiving units 2620, 2622 receives in the second section T2 is reduced. For example, the magnitude of the sensing signal in this case may be lowered by about 40% in comparison to the case where the stylus pen 10 alone touches the touch sensor 261.

As described above, since the level of the touch sensing signal of the stylus pen 10 is reduced by the influence of another touch object 30, the level of the sensing signal is lower than the second threshold value, and the touch sensing unit 260 may not detect the touch of the stylus pen 10 even though the stylus pen 10 touched the touch sensor 261. If the second threshold value is set to be lowered to the minimum value to solve this problem, it may be detected that the stylus pen 10 touches the stylus pen 10 even though it does not actually touch the touch sensor 261 and is in a hover state. Thus, the quality of writing using the stylus pen may deteriorate.

Therefore, in the embodiments to be described later, in order to solve this problem, the magnitude range of the sensing signal identified as an effective touch signal in the second period T2 may be determined differently depending on each of the cases that the stylus pen 10 and the conductive touch object 30 (e.g., hand, finger, etc.) different from the stylus pen 10 touch the touch sensor 261 at the same time, and the stylus pen 10 alone touches the touch sensor 261. That is, when the touch sensing unit 260 identifies a valid touch signal among the sensing signals received in the second period T2 through the control unit 2624, a sensing signal having a signal level in the first range may be identified as an effective touch signal in the state in which the stylus pen 10 alone touches the touch sensor 261, and a sensing signal having a signal level in the second range may be identified as a valid touch signal in the state in which the stylus pen 10 and another conductive touch object 30 simultaneously touch the touch sensor 261. Here, the second range represents a signal magnitude range having a lower limit value different from the first range, and the signal magnitude lower limit value of the first range may be higher than the signal magnitude lower limit value of the second range. Accordingly, in a state where the stylus pen 10 and another conductive touch object 30 simultaneously touch the touch sensor 261, the touch sensing unit 260 may identify, as an effective touch signal, a sensing signal having a signal magnitude lower than a sensing signal identified as an effective touch signal in a state where the stylus pen 10 solely touches the touch sensor 261.

According to an embodiment (refer to the method of determining an effective touch signal in FIG. 125 to be described later), the touch sensing unit 260 may be configured such that the magnitude range of a sensing signal identified as an effective touch signal in the second period T2 is made different by differently using a second threshold value that is a criterion for determining a valid touch signal in the second period T2, depending on each of the cases that the stylus pen 10 and the conductive touch object 30 simultaneously touch the touch sensor 261, and the stylus pen 10 solely touches the touch sensor 261. In this case, the touch sensing unit 260 may be configured such that the magnitude range of a sensing signal identified as an effective touch signal is made different by determining a second threshold value that is a criterion for determining a valid touch signal in the second period T2, based on the sensing signal received in the first period T1, depending on each of the cases that a plurality of touch objects including the stylus pen 10 simultaneously touches the touch sensor 261, and the stylus pen 10 solely touches the touch sensor 261.

In addition, according to another embodiment (refer to the method of determining an effective touch signal in FIG. 126 to be described later), the touch sensing unit 260 may be configured such that the magnitude range of a sensing signal identified as an effective touch signal is made different by amplifying the sensing signal received in the second section T2 at a predetermined ratio and comparing with a second threshold value in the case that a plurality of touch objects including the stylus pen 10 simultaneously touches the touch sensor 261, depending on each of the cases that a plurality of touch objects including the stylus pen 10 simultaneously touches the touch sensor 261, and the stylus pen 10 solely touches the touch sensor 261. In this case, when amplifying the sensing signal received in the second period T2 before comparing with the second threshold value if the stylus pen 10 solely touches the touch sensor 261, the amplification ratio in the case where a plurality of touch objects including the stylus pen 10 simultaneously touch the touch sensor 261 may be set to be larger than the amplification ratio in the case where the stylus pen 10 solely touches the touch sensor 261.

Hereinafter, embodiments in which a valid touch signal is determined in the step S14 of the touch detection method shown in FIG. 114 will be described in detail with reference to FIGS. 125 and 126.

Figure 125:
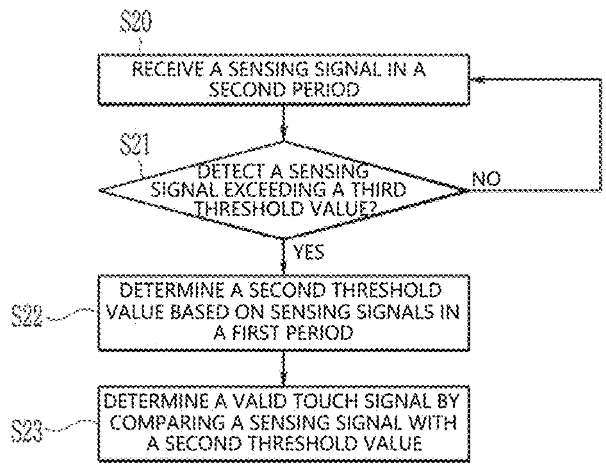
FIG. 125 is a flowchart illustrating an embodiment of determining a valid touch signal in the step S14 of the touch detection method of FIG. 114.

FIG. 125 is a flowchart illustrating an embodiment of determining a valid touch signal in the step S14 of the touch detection method in FIG. 114.

Referring to FIG. 125, the control unit 2624 of the touch sensing unit 260 receives a sensing signal through the plurality of touch electrodes 111-3 to 111-5, 121-4 to 121-6 S20, compares it with the third threshold value, and determine whether there is a sensing signal exceeding the third threshold value during the second period T2 in which the touch sensing unit 260 is driven in the second mode (refer to the step S13 in FIG. 114) S21.

The third threshold value is set to be a value smaller than the second threshold value to be described later, and is used to filter noise from the sensing signal and to roughly determine whether a touch by the stylus pen 10 has occurred. That is, the control unit 2624 may determine that a touch by the stylus pen 10 has occurred if a sensing signal exceeding the third threshold value among sensing signals transmitted from the plurality of touch electrodes 111-3 to 111-5, 121-4 to 121-6 is detected during the second period T2.

In the step S21, when a sensing signal exceeding the third threshold value is detected, the control unit 2624 determines that a touch by the stylus pen 10 has occurred. Then, a second threshold value is determined based on the sensing signals transmitted from the plurality of touch electrodes 121-1 to 121-*n* through the sensing channels during the first period T1 in FIG. 114 S22.

Equation 12 below shows an example of determining the second threshold value Tr.

$$Tr = Tp \times f(Sa, Sb), 0 < f(Sa, Sb) \leq 1 \quad \text{[Equation 12]}$$

In Equation 12, Tp represents the default value of the second threshold value, that is, the second threshold value before correction using the sensing signals in the first period T1. In addition, Sa denotes sensing signals sensed in a predetermined area adjacent to the touch point of the stylus pen 10 during the first period T1, and Sb denotes sensing signals sensed throughout the touch sensor 261 during the first period T1. f(Sa, Sb) is a weight calculation function for calculating weights based on attributes (signal magnitudes, coordinates, etc.) of the corresponding sensing signals Sa, Sb.

In Equation 12 above, Sa represents sensing signals corresponding to a predetermined area adjacent to the touch point of the stylus pen 10 among the sensing signals received from the plurality of second touch electrodes 121-1 to 121-*n* through the sensing channels during the first period T1 in which the touch sensing unit 260 is driven in the first mode (refer to step S10 of FIG. 3). The predetermined area may be a circular area, polygonal area, etc. centered on a touch point, and may have a constant area, for example, 1 $cm^2$, 2 $cm^2$, or the like. The shape and area of the predetermined are not limited thereto.

Here, the touch point (coordinate) of the stylus pen 10, which is a reference for selecting Sa, is information different from the touch coordinate obtained using the effective touch signal in the step S15 in FIG. 3, and may be obtained in response to a sensing signal having the maximum value among the sensing signals received through the step S20. When the touch point (coordinate) of the stylus pen 10 is determined in this way, the control unit 2624 may select a sensing channel (or touch electrode) corresponding thereto and a plurality of sensing channels (or touch electrodes) adjacent thereto, and may select the sensing signals received from the selected sensing channels as Sa. Here, the number of sensing channels in which Sa is obtained may be set corresponding to a range in which a touch point of another touch object 30 affects a sensing signal by a touch of the stylus pen 10, and may be set differently depending on the touch sensing unit 260. For example, the control unit 2624 may select five sensing channels (or touch electrodes) adjacent to each other in the X-axis and Y-axis directions based on the touch point (coordinate) of the stylus pen 10, and Sa may be obtained therefrom.

In Equation 12, f(Sa) may be a function for calculating a weight based on signal magnitudes of the selected sensing signals Sa. That is, f(Sa) may be a function by which a relatively large value (e.g., a value close to 1) is calculated as a weight if the sum (or average) of the signal magnitudes of the selected sensing signals Sa is small, and a relatively small value (e.g., a value close to 0) is calculated as a weight if the sum (or average) of the signal magnitudes of Sa is large. In this case, the weight calculated by f(Sa) in the cases that the touch area by another touch object 30 is large at a position adjacent to the touch point of the stylus pen 10, the magnitude of the sensing signal is greatly changed (for example, the touch signal is mostly synchronized by the touch object 30), or the like, may be smaller than the weight otherwise in comparison to the above cases.

In addition, f(Sa) may be a function that yields a weight based on a distance (minimum distance or average distance)

between a sensing channel of a sensing signal having a signal magnitude greater than or equal to a predetermined value among the selected sensing signals Sa, and a touch point of the stylus pen 10. That is, f(Sa) may be a function that produces a relatively large value (e.g., a value close to 1) as a weight if the distance (minimum distance or average distance) between the sensing channel of the sensing signal having a signal magnitude greater than or equal to a predetermined value among the selected sensing signals Sa, and the touch point of the stylus pen 10 is long, and produces a relatively small value (e.g., a value close to 0) as a weight if the distance (minimum distance or average distance) between the sensing channel of the sensing signal having a signal magnitude greater than or equal to a predetermined value among the selected sensing signals Sa, and the touch point of the stylus pen 10 is short. Accordingly, the weight calculated by f(Sa) may have a smaller value as the touch point of the stylus pen 10 and the touch point of another touch object 30 become adjacent to each other.

In Equation 12 above, Sb represents all sensing signals received from the plurality of second touch electrodes 121-1 to **121-*n* through the sensing channels during the first period T1 in which the touch sensing unit 260 is driven in the first mode (refer to the step S10 in FIG. 114**).

In Equation 12 above, f(Sb) may be a function for calculating a weight based on the touch area of the touch object 30 (or the number of touch electrodes touched by the touch object 30). In the first period T1, as the touch area by the touch object 30 (or the number of touch electrodes touched by the touch object 30) increases, the sum (or average) of the signal magnitudes of the sensing signals Sb increases. Based on these characteristics, f(Sb) may be configured such that a relatively large value (e.g., a value close to 1) is calculated as a weight if the sum (or average) of the signal magnitudes of Sb is small, and a relatively small value (e.g., a value close to 0) is calculated as a weight if the sum (or average) of the signal magnitudes of Sb is large. In this case, the weight calculated by f(Sb) may have a smaller value as the area touched by the touch object 30 (or the number of touch electrodes touched by the touch object 30) increases.

In addition, for example, f(Sb) may be a function in which a weight is calculated differently according to a touch shape of the touch object 30. In this case, f(Sb) may be a function for estimating a touch shape according to a signal magnitude distribution pattern of the sensing signals Sb and calculating a weight corresponding thereto.

On the other hand, although only the case where the weight calculated by f(Sa, Sb) is changed in response to the distance between the touch point of the stylus pen 10 and the touch point of the touch object 30, or the touch pattern (touch area or touch shape) was described as an example in the above, the weight calculated by f(Sa, Sb) may be also changed in response to various other touch properties. For example, f(Sa, Sb) may be a function by which other different weights are computed according to a positional relationship between the touch point of the stylus pen 10 and the touch point of another touch object 30 (e.g., the distance between the touch point of the stylus pen 10 and the touch point by another touch object 30, the number of sensing channels interposed between the touch point of the stylus pen 10 and the touch point by another touch objects 30, whether the touch point of the stylus pen 10 and the touch point by another touch object 30 are located on the same sensing channels, whether the touch point of the stylus pen 10 and the touch point by another touch object 30 are located on sensing channels diagonal to each other, etc.

In addition, f(Sa, Sb)) in Equation 12 above may be an arbitrary function that outputs a value greater than 0 and less than or equal to 1 using each sensing signal Sa, Sb. The weight calculation function f(Sa) may use variables corresponding to the properties (position, signal magnitude, etc.) of the sensing signal Sa, and may be an arbitrary function setting the second threshold value Tr to a value less than or equal to the default value Tp, that is, a function expressed as a logarithmic function, a transcendental function, or a combination thereof. For example, f(Sa) may output a value close to 1 as the distance between the position of the sensing signal Sa and the touch point (coordinate) of the stylus pen 10 increases, may output a value close to 0 as the distance between the position of the sensing signal Sa and the touch point (coordinate) of the stylus pen 10 decreases, may output a value close to 0 as the strength of the sensing signal Sa (e.g., voltage value, capacitance change amount, etc.) increases, or may output a value close to 1 as the strength of the sensing signal Sa decreases.

Similarly, f(Sb) may use variables corresponding to the properties (area, signal magnitude, etc.) of the sensing signal Sb, and may be an arbitrary function setting the second threshold value Tr to a value less than or equal to the default value Tp, that is, a function expressed as a logarithmic function, a transcendental function, or a combination thereof. For example, f(Sb) may output a value close to 1 as the area of the sensing signal Sb decreases, may output a value close to 0 as the area of the sensing signal Sb increases, may output a value close to 0 as the strength of the sensing signal Sb (e.g., voltage value, capacitance change amount, etc.) increases, or may output a value close to 1 as the strength of the sensing signal Sb decreases.

In Equation 12 above, the weight output by f(Sa, Sb) may have a value greater than 0 and less than or equal to 1, and may have a value greater than the third threshold value described above. Accordingly, the second threshold value Tr may be limited to a value equal to or less than the default value Tp of the second threshold value by the weight calculation functions f(Sa, Sb). For example, when a touch by another touch object 30 does not occur, the weights calculated by f(Sa, Sb) all may have a value of 1. Accordingly, the second threshold value Tr may be a default value Tp of the second threshold value. In addition, for example, when a touch by another touch object 30 occurs at a point adjacent to the touch point of the stylus pen 10, f(Sa, Sb) may have a value less than 1, and the second threshold value Tr may be a value smaller than the default value Tp of the second threshold value. In addition, for example, when the touch area of another touch object 30 is large, f(Sa, Sb) may have a value less than 1, and the second threshold value Tr is smaller than the default value Tp of the second threshold value.

As described above, when a touch of another touch object 30 occurs at a point adjacent to the touch point of the stylus pen 10, or a large-area touch occurs by another touch object 30, the second threshold value is determined as a value lower than a default value. Therefore, it is possible to detect an effective touch signal corresponding to the stylus pen 10 even when the level of the sensing signal by the touch of the stylus pen 10 decreases due to the touch of another touch object 30.

When the second threshold value is determined through the step S22, the control unit 2624 compares it with the sensing signal received in the second period T2, and determines a valid touch signal in the second period T2 S23.

Meanwhile, although it has been described in the above that the second threshold value is determined according to the sensing signals in the first period T1 when a detection signal exceeding the third threshold value is detected in the step S21 (when a touch by the stylus pen 10 occurs), the present invention is not limited thereto.

For example, the control unit 2624 may determine the second threshold value using Equation 12 above, regardless of whether the sensing signals received in the second period T2 exceed the third threshold value.

In addition, for example, the second threshold value may be determined using Equation 12 above when the control unit 2624 determines that the sensing signals received in the first period T1 are signals resulting from the touch by the touch object on the touch sensor 261 (when a touch by a touch object other than the stylus pen 10 occurs). In this case, the control unit 2624 may determine that a touch by the touch object occurs on the touch panel 100 if a sensing signal exceeding a fourth threshold value (a threshold value equal to or smaller than the first threshold in FIG. 114) among sensing signals received in the first period T1 is detected.

In addition, for example, the control unit 2624 may determine the second threshold value using Equation 12 above if the sensing signals received in the second period T2 exceed the third threshold value, and the sensing signals received in the first period T1 are determined to be signals by the touch of the touch object (when a touch by the stylus pen 10 and a touch by another touch object occur at the same time).

Meanwhile, in all cases except for the case where the second threshold value is determined through Equation 12, the second threshold value may be set as a default value Tp.

Figure 126:
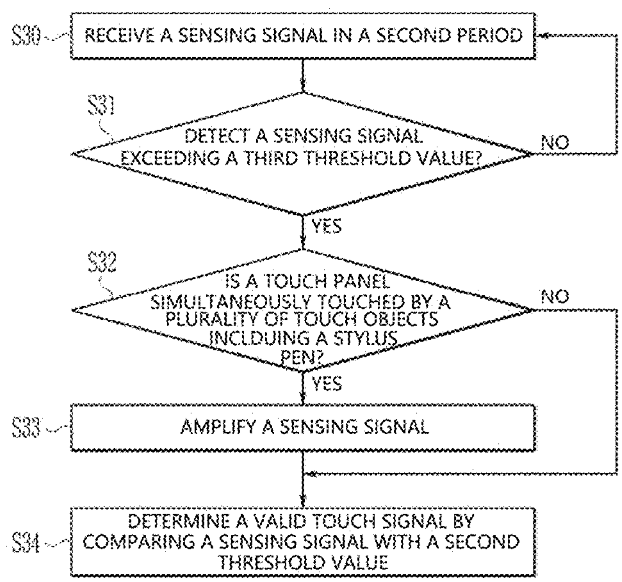
FIG. 126 is a flowchart illustrating another embodiment of determining a valid touch signal in the step S14 of the touch detection method of FIG. 114.

FIG. 126 is a flow chart illustrating another embodiment of determining a valid touch signal in the step S14 of the touch detection method in FIG. 114.

Referring to FIG. 126, the control unit 2624 of the touch sensing unit 260 receives sensing signals from the plurality of touch electrodes 111-3 to 111-5, 121-4 to 121-6 during a second period T2 in which the touch sensing unit 260 is driven in the second mode (refer to the step S13 in FIG. 3) S30, compares with the third threshold value, and determines whether there is a sensing signal exceeding the third threshold value S31.

The third threshold value is set to a value smaller than the second threshold to be described later, and is used to filter noise from the sensing signal and to roughly determine whether a touch by the stylus pen 10 has occurred. That is, if a sensing signal exceeding the third threshold value among sensing signals transmitted from the plurality of touch electrodes 111-3 to 111-5, 121-4 to 121-6 is detected during the second period T2, the control unit 2624 may determine that a touch by the stylus pen 10 has occurred.

As such, if it is determined that a touch has occurred by the stylus pen 10, the control unit 2624 identifies whether the touch sensor 261 is simultaneously touched by a plurality of touch objects including the stylus pen 10 S32.

In the step S32, the control unit 2624 may identify a simultaneous touch situation based on the sensing signals transmitted from the plurality of touch electrodes 121-1 to **121-*n* through the sensing channels during the first period T1 in FIG. 114. For example, the control unit 2624 may detect a simultaneous touch situation by checking whether a valid touch signal is detected in the first period T1 because it is already determined that a touch has occurred by the stylus pen 10 through the step S31**.

The control unit 2624 amplifies the sensing signal received from the plurality of touch electrodes 111-3 to 111-5, 121-4 to 121-6 in the step S30 at a predetermined ratio S33, and then determines an effective touch signal in the second period T2 by comparing the amplified sensing signal with the second threshold value S34.

In the step S33, an amplification ratio may vary depending on the touch position (relative to the stylus pen 10), the touch pattern (area, shape, etc.), etc. of the touch object other than the stylus pen 10 among simultaneously touched touch objects.

On the other hand, if it is identified that only the touch by the stylus pen 10 has occurred in the step S32, the controller 2624 compares the sensing signals received through the step S30 with the second threshold value without amplification, and determines a valid touch signal in the second period T2 S34. Accordingly, in a situation in which the touch sensor 261 is simultaneously touched by a plurality of touch objects including the stylus pen 10, a sensing signal having a smaller signal size in comparison to a situation in which the touch sensor 261 is touched solely by the stylus pen 10 may also be determined as an effective touch signal. Accordingly, when a simultaneous touch of the stylus pen 10 and another touch object 30 occurs, it is possible to detect a valid touch signal corresponding to the stylus pen 10 even in a situation in which the level of the sensing signal by the touch of the stylus pen 10 decreases due to the touch of another touch object 30.

Meanwhile, in FIG. 126, a case in which a sensing signal is amplified only when a simultaneous touch is identified through the step S32 is illustrated as an example, but the present invention is not limited thereto. It is also possible to amplify the sensing signal even in a situation where the touch sensor 261 is touched alone by the stylus pen 10. In this case, the amplification ratio when a plurality of touch objects including the stylus pen 10 simultaneously touches the touch sensor 261 may be set to be greater than the amplification ratio when only the stylus pen 10 touches the touch sensor 261.

According to the above-described embodiments, when the stylus pen makes simultaneous contact with another conductive object such as a human body, the performance of detecting touch data by the stylus pen may be improved.

Meanwhile, noise exists in the touch sensor 261 for various reasons, and such noise may act as a factor degrading the sensing performance of the touch sensor 261. In particular, in the case of the stylus pen 10, when noise in a frequency band similar to the resonance frequency of the stylus pen 10 exists, the precision of touch sensing may be greatly reduced.

Next, a method of driving an electronic device according to an exemplary embodiment will be described with reference to FIG. 127.

Figure 127:
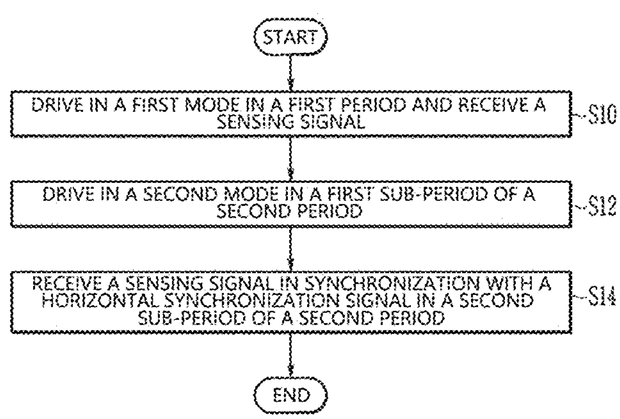
FIG. 127 is a flowchart illustrating a method of driving an electronic device according to an embodiment.

FIG. 127 is a flow chart illustrating a method of driving an electronic device according to an exemplary embodiment.

In the first period, the electronic device 2 is driven in the first mode S10. The first mode is a mode in which a driving signal for detecting a touch input by a touch object other than the stylus pen 10 is applied to the touch sensor 261.

For example, in the first mode, the first driving/receiving unit 2620 outputs driving signals to the plurality of first touch electrodes 111-1 to **111-*m*, and the second driving/receiving unit 2622 receives sensing signals according to a touch from the plurality of second touch electrodes 121-1 to 121-*n***.

The control unit 2624 may determine whether the sensing signal is a valid touch signal based on whether the signal magnitude of the sensing signal obtained in the first period exceeds a first threshold value, and may obtain touch coordinate information using the valid touch signal.

For example, when the signal magnitude of the sensing signal obtained in the first period exceeds the first threshold value, the control unit 2624 calculates touch coordinates using the sensing signal. When the signal level of the sensing signal obtained in the first period is equal to or less than the first threshold value, the control unit 2624 may not calculate touch coordinates according to the sensing signal having the signal level equal to or less than the first threshold value. In addition, when the signal magnitude of the sensing signal obtained in the first period exceeds the first threshold value, the control unit 2624 may calculate the touch area using the sensing signal.

The sensing signal acquired in the first period includes at least one of a first sensing signal by a user's body part (finger, palm, etc.) and a second sensing signal by the stylus pen 10 or a passive stylus pen. The first threshold value may be set such that the first sensing signal is determined as a valid touch signal and the second sensing signal is filtered.

In the first sub-period of the second period, the electronic device 2 operates in the second mode S12. Here, the second mode may be a mode for applying a driving signal for detecting a touch input by the stylus pen 10 to the touch sensor 261, or the second mode may be a mode in which a driving signal for detecting a touch input by the stylus pen 10 is applied to the loop coil 264. As such, the second mode may be one of two types.

When the second mode is a mode in which a driving signal for detecting a touch input by the stylus pen 10 is applied to the touch sensor 261, for example, the first driving/receiving unit 2620 simultaneously applies a driving signal to all of the plurality of first touch electrodes 111-1 to 111-*m*.

Although it has been described above that the first driving/receiving unit 2620 simultaneously applies the driving signal to all of the plurality of first touch electrodes 111-1 to 111-*m* in the first sub-period, it is not limited thereto. For example, in the first sub-period of the second period, the first driving/receiving unit 2620 may apply a driving signal to at least one of the plurality of first touch electrodes 111-1 to 111-*m*. Alternatively, in the first sub-period of the second period, the first driving/receiving unit 2620 may simultaneously apply the driving signal to all of the plurality of first touch electrodes 111-1 to 111-*m*. Alternatively, in the first sub-period of the second period, the second driving/receiving unit 2622 may apply the driving signal to at least one of the plurality of second touch electrodes 121-1 to 121-*n*. Alternatively, in the first sub-period of the second period, the second driving/receiving unit 2622 may simultaneously apply the driving signal to all of the plurality of second touch electrodes 121-1 to 121-*n*. Alternatively, the first driving/receiving unit 2620 and the second driving/receiving unit 2622 may simultaneously apply at least one of the plurality of first touch electrodes 111-1 to 111-*m* and the plurality of second touch electrodes 121-1 to 121-*n*.

The first driving/receiving unit 2620 and the second driving/receiving unit 2622 may apply the driving signal to all of the plurality of first touch electrodes 111-1 to 111-*m* and to all of the plurality of second touch electrodes 121-1 to 121-*n*. When the first driving/receiving unit 2620 and the second driving/receiving unit 2622 applies the driving signal all of the plurality of first touch electrodes 111-1 to 111-*m* and the plurality of second touch electrodes 121-1 to 121-*n*, the phases of the driving signal applied to the plurality of first touch electrodes 111-1 to 111-*m* and the driving signal applied to the plurality of second touch electrodes 121-1 to 121-*n* may be the same, and may be different from each other.

It is assumed that the frequency of the driving signal applied to the touch sensor 261 in the first period is less than or equal to the frequency of the driving signal applied to the touch sensor 261 or the loop coil 264 in the first sub-period. In addition, the frequency of the driving signal applied to the touch sensor 261 or the loop coil 264 in the first sub-period may be an integer multiple of 2 or more of the frequency of the horizontal synchronization signal of the signal control unit 220 of the display unit 250.

For example, the resonance circuit unit 12 of the stylus pen 10 resonates with the driving signal, generates a resonance signal thereby, and transmits it to the touch sensor 261 through the conductive tip 11.

Meanwhile, when the second mode is a mode in which a driving signal for detecting a touch input by the stylus pen 10 is applied to the loop coil 264, the coil driver 263 simultaneously applies a driving signal to the loop coil 264.

In the second sub-period of the second period, the electronic device 2 receives the sensing signal resonant based on the driving signal at least once S14.

In one embodiment, the first driving/receiving unit 2620 receives the sensing signal transmitted from the plurality of first touch electrodes 111-1 to 111-*m* at least once, and the second driving/receiving unit 2622 also receives the sensing signal transmitted from the plurality of second touch electrodes 121-1 to 121-*n* at least once. In this case, the timing at which the first driving/receiving unit 2620 and the second driving/receiving unit 2622 receive the sensing signal may be the same. In addition, the first driving/receiving unit 2620 and the second driving/receiving unit 2622 may process the received sensing signal and transmit it to the control unit 2624.

Although it has been described in the above that, in the second sub-period, the first driving/receiving unit 2620 receives the sensing signal transmitted from a plurality of first touch electrodes 111-1 to 111-*m*, and the second driving/receiving unit 2622 also receives the sensing signal transmitted from a plurality of second touch electrodes 121-1 to 121-*n*, the first driving/receiving unit 2620 may receive the sensing signal transmitted from at least one of the touch electrodes 111-1 to 111-*m*, and the second driving/receiving unit 2622 may also receive the sensing signal transmitted from at least one of a plurality of second touch electrodes 121-1 to 121-*n* in the second sub-period of the second period. Alternatively, only the first driving/receiving unit 2620 may receive the sensing signal transmitted from at least one of a plurality of first touch electrodes 111-1 to 111-*m* in the second sub-period of the second period. Alternatively, only the second driving/receiving unit 2622 may receive the sensing signal transmitted from at least one of a plurality of second touch electrodes 121-1 to 121-*n* in the second sub-period of the second period. The sensing signal receiving operations of the first driving/receiving unit 2620 and the second driving/receiving unit 2622 are not limited to the above.

In addition, in the second sub-period, the first driving/receiving unit 2620 may receive the sensing signal from at least one of a plurality of first touch electrodes 111-1 to 111-*m*, or may receive the sensing signal from all of a plurality of first touch electrodes 111-1 to 111-*m*. Similarly, the second driving/receiving unit 2622 may receive the sensing signal from at least one of a plurality of second touch electrodes 121-1 to 121-*n*, or may receive the sensing signal from all of a plurality of second touch electrodes 121-1 to 121-*n*.

The control unit 2624 generates touch information by using some sensing signals received at least once by the first driving/receiving unit 2620 and the second driving/receiving unit 2622 in the period determined in response to the horizontal synchronization signal.

In another embodiment, the first driving/receiving unit 2620 receives the sensing signals transmitted from the plurality of first touch electrodes 111-1 to 111-*m* in synchronization with the horizontal synchronization signal, and the second driving/receiving unit 2620 2622 is also synchronized with the horizontal synchronization signal and receives the sensing signals transmitted from the plurality of second touch electrodes 121-1 to 121-*n*. In addition, the first driving/receiving unit 2620 and the second driving/receiving unit 2622 may process the received sensing signal and transmit it to the control unit 2624.

The control unit 2624 generates touch information by using the sensing signals received by the first driving/receiving unit 2622 and the second driving/receiving unit 2622 in synchronization with the horizontal synchronization signal.

The control unit 2624 may determine whether the sensing signal is a valid touch signal based on whether the signal magnitude of the sensing signal obtained in the second sub-period exceeds the second threshold value, and may obtain touch coordinate information on the point where a touch by the stylus pen 10 occurred by using the effective touch signal.

For example, when the signal magnitude of the sensing signal obtained in the second sub-period exceeds the second threshold value, the control unit 2624 calculates the touch coordinates by using the sensing signal. When the signal level of the sensing signal obtained in the second sub-period is equal to or less than the second threshold value, the control unit 2624 does not calculate touch coordinates according to the sensing signal. In addition, when the signal magnitude of the detection signal obtained in the second sub-period exceeds the second threshold value, the control unit 2624 may calculate the touch area by using the sensing signal.

Next, a driving signal applied in the first and second periods, a resonance signal of the stylus pen 10, and a sensing signal will be described with reference to FIGS. 128 and 129.

Figure 128:
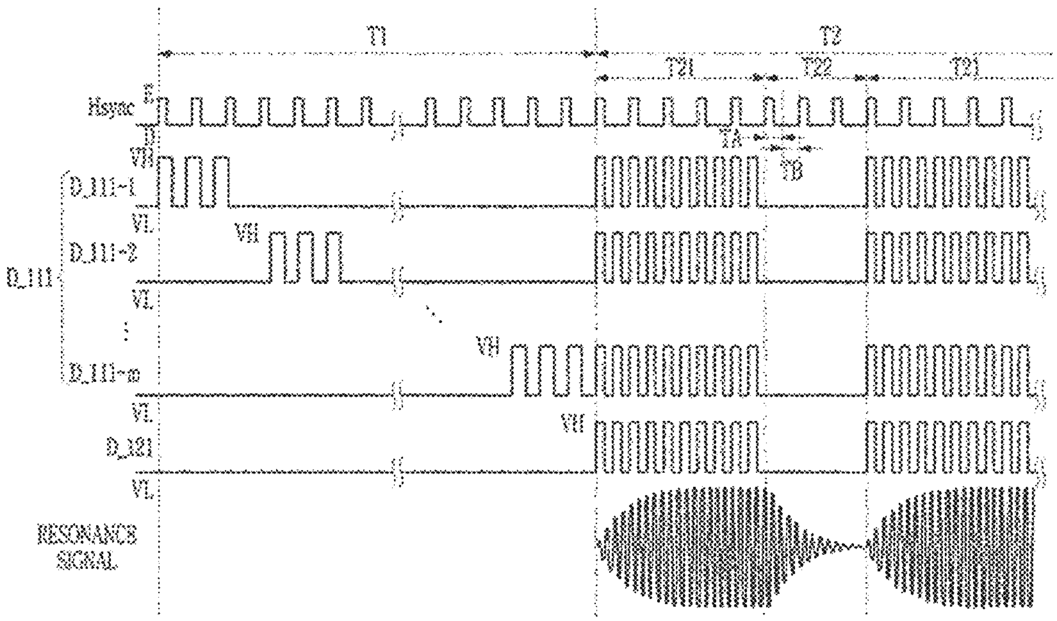
FIG. 128 is a timing diagram illustrating an example of a horizontal synchronization signal Hsync and a driving signal according to the driving method of FIG. 127.
Figure 129:
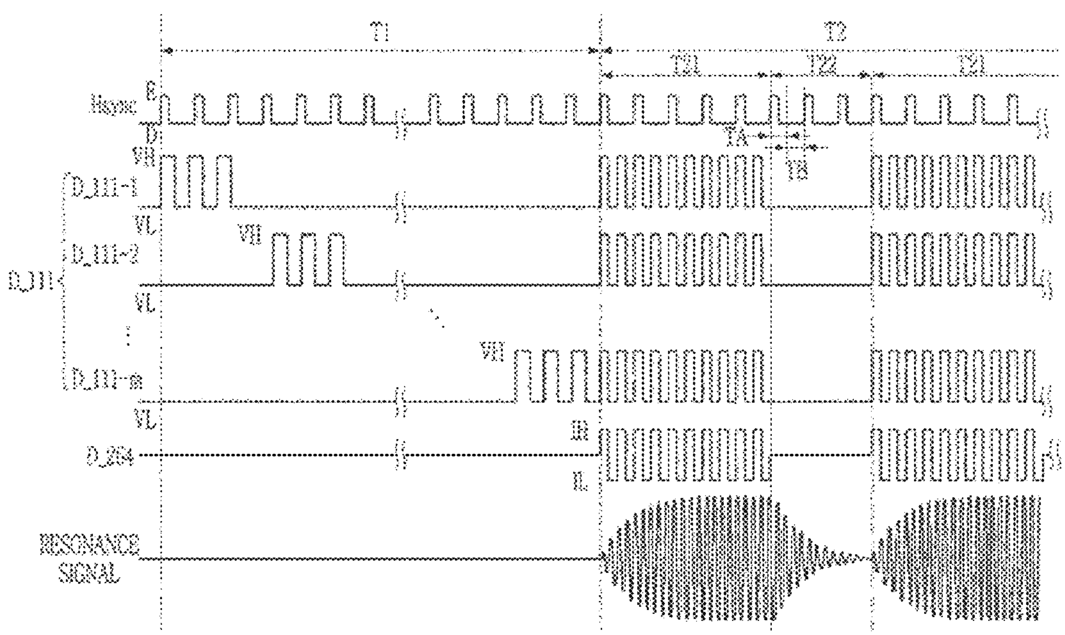
FIG. 129 is a timing diagram illustrating an example of a horizontal synchronization signal Hsync and a driving signal according to the driving method of FIG. 127.

FIG. 128 is a timing diagram illustrating an example of a horizontal synchronization signal Hsync and a driving signal according to the driving method in FIG. 127, and FIG. 129 is a timing diagram showing a horizontal synchronization signal Hsync and an example of a driving signal according to the driving method in FIG. 127.

FIG. 128 is a view when the second mode is a mode in which a driving signal for detecting a touch input by the stylus pen 10 is applied to the touch sensor 261, and FIG. 129 is a diagram illustrating a case in which a driving signal for detecting a touch input by the stylus pen 10 is applied to the loop coil 264 in the second mode.

One touch report frame period according to a touch report rate includes a first period T1 and a second period T2. The touch report rate refers to a speed or frequency (Hz) at which the touch sensing unit 260 reports touch data obtained by driving the touch electrodes to an external host system or outputs them to the control unit 270.

In the first period T1, the first driving/receiving unit 2620 outputs a driving signal to at least one type of touch electrodes among the plurality of first touch electrodes 111-1 to 111-*m* and the plurality of second touch electrodes 121-1 to 121-*n*.

When the first driving/receiving unit 2620 outputs a driving signal to the plurality of first touch electrodes 111-1 to 111-*m*, the second driving/receiving unit 2622 may receive sensing signals from the plurality of second touch electrodes 121-1 to 121-*n*. The control unit 2624 may obtain touch coordinate information based on the signal level of the sensing signal.

In FIG. 128, in the first sub-period T21 in the second period T2, the first driving/receiving unit 2620 simultaneously applies driving signals to the plurality of first touch electrodes 111-1 to 111-*m*, the second driving/receiving unit 2622 simultaneously applies driving signals to the plurality of second touch electrodes 121-1 to 121-*n*.

In the first sub-period T21, the frequency of the driving signal applied to the plurality of first touch electrodes 111-1 to 111-*m* and the plurality of second touch electrodes 121-1 to 121-*n* corresponds to the resonance frequency of the stylus pen 10. For example, frequencies of driving signals output to the plurality of first touch electrodes 111-1 to 111-*m* and the plurality of second touch electrodes 121-1 to 121-*n* during the first sub-period T21 may be an integer multiple of 2 or more of the frequency of the horizontal synchronization signal.

In contrast, in the first period T1, frequencies of the driving signals output to the plurality of first touch electrodes 111-1 to 111-*m* are different from the resonance frequencies of the stylus pen 10.

Meanwhile, in FIG. 129, in the first sub-period T21 in the second period T2, the coil driver 263 applies a driving signal to the loop coil 264. The frequency of the driving signal applied to the loop coil 264 in the first sub-period T21 corresponds to the resonance frequency of the stylus pen 10. For example, the frequency of the driving signal output to the loop coil 264 during the first sub-period T21 may be an integer multiple of 2 or more of the frequency of the horizontal synchronization signal.

The frequency setting of such a driving signal is merely an example, and may be set to a value different from the above. Specifically, the control unit 2624 may receive a horizontal synchronization signal Hsync, a scan driving control signal, a data driving control signal, and the like, from the signal control unit 220 of the display unit 250. Then, the control unit 2624 sets the frequency of the driving signal provided to the touch sensor 261 or the loop coil 264 based on the horizontal synchronization signal Hsync, and may synchronize the driving signal with the horizontal synchronization signal Hsync.

For example, the control unit 2624 may set the frequency of the driving signal of the touch sensor 261 or the loop coil 264 as an integer multiple of 2 or more of the frequency of the horizontal synchronization signal Hsync. Then, the resonance frequency of the stylus pen 10 may be designed to have an integer multiple of two or more of the frequency of the horizontal synchronization signal Hsync. The control unit 2624 may synchronize the driving signal to pulses of the horizontal synchronization signal Hsync.

FIGS. 128 and 129, in the second sub-period T22 in the second period T2, in synchronization with each pulse of the horizontal synchronization signal Hsync, the first driving/receiving unit 2620 receives sensing signals from the plurality of first touch electrodes 111-1 to 111-*m*, and the second driving/receiving unit 2622 receives sensing signals from the plurality of second touch electrodes 121-1 to 121-*n*. In addition, in the second sub-period T22, each of the first driving/receiving unit 2620 and the second driving/receiving unit 2622 may receive a sensing signal at least once.

In the second sub-period T22 to which the driving signal is not applied any more, the resonance signal output by the resonance circuit unit 12 of the stylus pen 10 may be received by at least one of a plurality of first touch electrodes 111-1 to 111-*m* and a plurality of second touch electrodes 121-1 to 121-*n*.

The period of the pulse of the horizontal synchronization signal Hsync is one horizontal period (1H) required to write data into the pixels PXs in one row. After each pulse of the horizontal synchronization signal Hsync is generated, a data signal may be written into the pixel PX during a data writing period TA. The data writing period refers to a period in which a data signal is applied to a data line, and a scan signal is applied to a scan line in order to write a data signal to a pixel PX. Since the data line and the scan line form a parasitic capacitance with the touch electrode, a voltage applied to the data line and the scan line during the data writing period TA causes noise in the sensing signal transmitted to the touch electrode.

In an embodiment, the control unit 2624 or the touch controller 262 may generate touch information by using the sensing signal received in the noise-free period TB excluding the data writing period TA. The data writing period TA and the noise-free period TB may be set differently according to a display device and a driving method of the display device.

Specifically, at each of the plurality of sampling points during the second sub-period T22, the first driving/receiving unit 2620 receives sensing signals from the plurality of first touch electrodes 111-1 to 111-*m*, and the second driving/receiving unit 2622 receive sensing signals from the plurality of second touch electrodes 121-1 to 121-*n*.

The control unit 2624 or the touch controller 262 generates a reception signal by using the sensing signal received at a sampling point in the noise-free period TB. Alternatively, the touch controller 262 generates a reception signal by using the sensing signal received at a sampling point in the noise-free period TB.

As an example, when the control unit 2624 or the touch controller 262 receives only the horizontal synchronization signal Hsync, the control unit 2624 or the touch controller 262 may determine the period from the first preset time to the second preset time after the pulse of the horizontal synchronization signal Hsync is generated, as the data writing period TA. The second preset time exceeds the first preset time. This may be variously set according to the driving method of the display unit 250, and it is not limited thereto. Then, the control unit 2624 or the touch controller 262 generates a reception signal by using the remaining signals except for the sensing signal sampled during the data writing period TA.

As another example, when the control unit 2624 or the touch controller 262 receives the scan driving control signal, the control unit 2624 or the touch controller 262 may determine a period in which a scan signal has a disable level from the scan driving control signal as the data writing period TA. Then, the control unit 2624 or the touch controller 262 generates a reception signal by using the remaining signals except for the sensing signal sampled during the data writing period TA.

As another example, when the control unit 2624 or the touch controller 262 receives the data driving control signal, the control unit 2624 or the touch controller 262 may determine the period during which the data signal is applied to the data line from the data driving control signal as the data writing period TA. Then, the control unit 2624 or the touch controller 262 generates a reception signal by using the remaining signals except for the sensing signal sampled during the data writing period TA.

In another embodiment, it is preferable that the first driving/receiving unit 2620 and the second driving/receiving unit 2622 receive sensing signals during a noise-free period TB excluding the data writing period TA.

Specifically, the first driver/receiver 2620 receives sensing signals from the plurality of first touch electrodes 111-1 to 111-*m* during the noise-free period TB excluding the data writing period TA. Similarly, the second driving/receiving unit 2622 receives sensing signals from the plurality of second touch electrodes 121-1 to 121-*n*.

That is, the control unit 2624 or the touch controller 262 receives a sensing signal from the touch sensor 261 for a period in which the scan signal has a disabled level based on at least one of a horizontal synchronization signal Hsync and a scan driving control signal. When the control unit 2624 or the touch controller 262 receives the scan driving control signal, the control unit 2624 or the touch controller 262 may determine a period in which the scan signal has a disable level from the scan driving control signal. When the control unit 2624 or the touch controller 262 receives only the horizontal synchronization signal Hsync, the control unit 2624 or the touch controller 262 may determine a period from the third preset time to the fourth preset time after the pulse of the horizontal synchronization signal Hsync is generated, as the period during which the scan signal has a disabled level. The fourth preset time exceeds the third preset time. This may be variously set according to a driving method of the display device 10, and it is not limited thereto.

In addition, the control unit 2624 or the touch controller 262 may receive a sensing signal from the touch sensor 261 for a period excluding a period in which the data signal is applied to the data line of the display panel 251, based on at least one of a horizontal synchronization signal Hsync and a data driving control signal. When the control unit 2624 or the touch controller 262 receives a data driving control signal, the control unit 2624 or the touch controller 262 may determine a period during which the data signal is applied to the data line from the data driving control signal. When the control unit 2624 or the touch controller 262 receives only the horizontal synchronization signal Hsync, the control unit 2624 or the touch controller 262 may determine a period from the fifth preset time to the sixth preset time after the pulse of the horizontal synchronization signal Hsync is generated, as the period during which the data signal is applied to the data line. The fifth preset time exceeds the sixth preset time. This may be variously set according to a driving method of the display unit 10, and it is not limited thereto.

The second period T2 includes a plurality of first sub-period T21 and second sub-period T22. For example, in the second period T2, the combination of the first sub period T21 and the second sub period T22 may be repeated eight times.

Although it has been described above that the second period T2 exists after the first period T1, the first period T1 may exist after the second period T2. The time length of the first period T1 and the second period T2 may be changed during each of a plurality of touch report frames, and the driving method of the electronic device 2 according to the present embodiment is not limited thereto.

In addition, although it has been described that the 1-2 sub-period T21*b* and the 2-2 sub-period T22*b* exist after the 1-1 sub-period T21*a* and the 2-1 sub-period T21*a* in the second period T2, their order may be changed, and it is not limited to the above description.

An operation of the touch sensor 261 coupled to the display panel 251 of the display unit 250 will be described with reference to FIGS. 130 to 133.

FIGS. 130 to 133 are timing diagrams illustrating a timing at which a touch device according to an exemplary embodiment receives a sensing signal in synchronization with the horizontal synchronization signal of the display unit 250 in FIG. 5 according to the driving method in FIG. 127.

Figure 130:
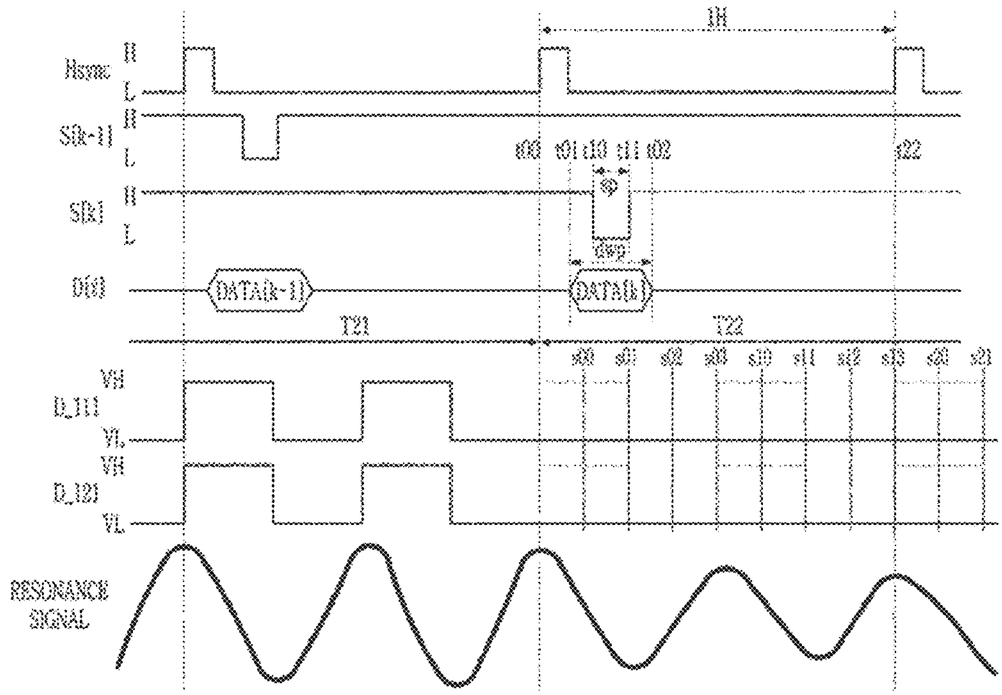
FIGS. 130 to 133 are timing diagrams illustrating a timing at which the touch device according to an embodiment receives a sensing signal in synchronization with the horizontal synchronization signal of the display unit 250 of FIG. 5 according to the driving method of FIG. 127.

As shown in FIG. 130, the frequency of the driving signals D_111 and D_121 in the first sub-period T21 may be twice the frequency of the horizontal synchronization signal Hsync.

Figure 132:
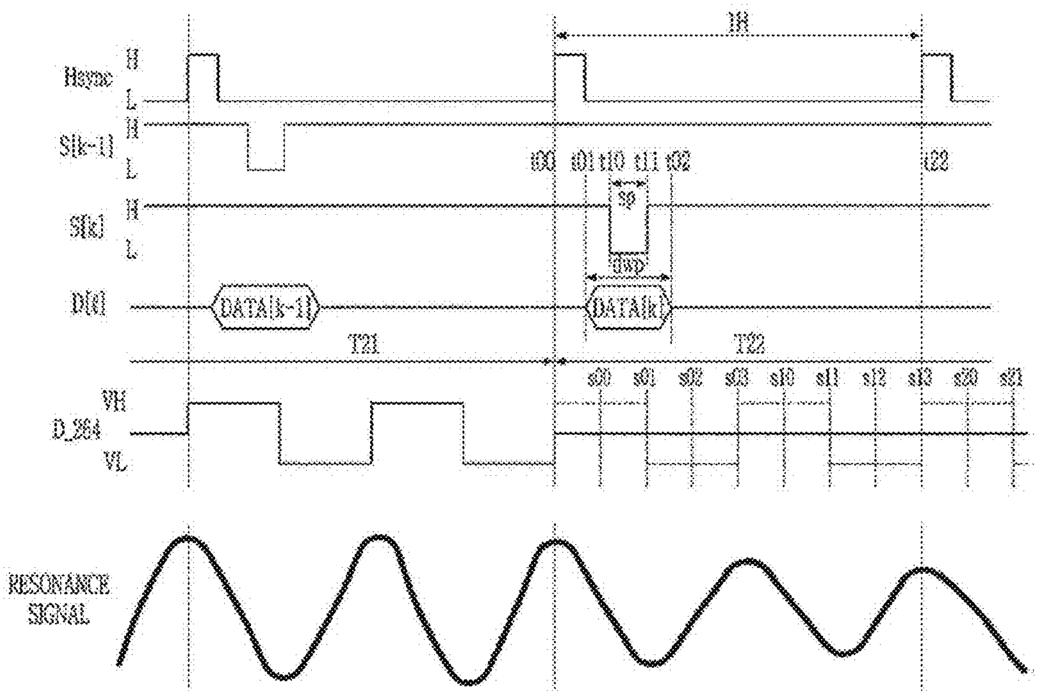
Figure 133:
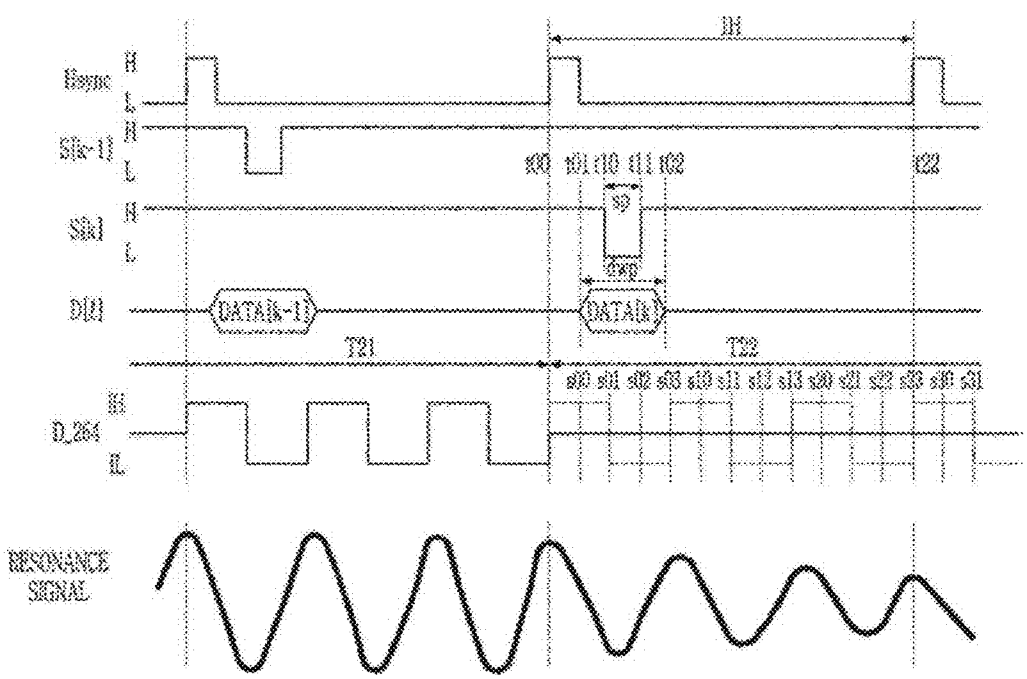

As shown in FIG. 132, the frequency of the driving signal D_264 in the first sub-period T21 may be twice the frequency of the horizontal synchronization signal Hsync.

In response to the frequencies of the driving signals D_111, D_121, D_264 applied in the first sub-period T21, the first driving/receiving unit 2620 and the second driving/receiving unit 2622 in the second sub-period T22 may sample sensing signals. For example, the first driving/receiving unit 2620 and the second driving/receiving unit 2622 may sample sensing signals at at least one sampling time point s00, s01, s02, s03, s10, s11, s12, s13, and so on according to a clock signal having a predetermined frequency. As shown in FIGS. 130 and 132, the clock signal for sampling the sensing signals has a frequency four times the frequency of the driving signals D_111, D_121, D_264. At least one sampling time point s00, s01, s02, s03, s10, s11, s12, s13, and so on in the present disclosure may be any timing to be periodically set in relation to the frequency of the driving signals D_111, D_121, D_264. After the driving signal is synchronized with the pulse of the horizontal synchronization signal Hsync, when the period of the horizontal synchronization signal Hsync is changed by an interface delay, etc. between the signal control unit 220 and the touch controller 262, Inconsistencies may arise between a sampling point periodically set according to the frequency of the driving signals D_111, D_121, D_264 (e.g., the clock signal for sampling the sensing signal has a frequency of four times the frequency of the driving signals D_111, D_121, D_264), and one horizontal period 1H according to the period-changed horizontal synchronization signal Hsync.

For example, if the period of the horizontal synchronization signal Hsync is changed after being synchronized with the first pulse of the horizontal synchronization signal Hsync, the timing of sampling points within one horizontal period 1H is changed since the clock signal for sampling the sensing signal is synchronized with the first pulse. Then, it is difficult to distinguish between whether the sensing signals sampled within one horizontal period 1H are the sensing signals sampled within the period dwp and the period sp or the sensing signals sampled within the period other than the period dwp and the period sp.

Accordingly, the driving signals D_111, D_121, D_264 may be synchronized by at least one of pulses of the horizontal synchronization signal Hsync and pulses of the vertical synchronization signal Vsync. That is, the timing of the driving signal may be refreshed every horizontal period of a predetermined period or every frame of a predetermined period.

For example, the driving signals D_111, D_121, D_264 may be synchronized with pulses of the horizontal synchronization signal Hsync of a predetermined period. For example, the pulses of the driving signals D_111, D_121, D_264 may be initiated in synchronization with the first pulse of the horizontal synchronization signal Hsync, and then the driving signals D_111, D_121, D_264 may be initiated in synchronization with the i-th pulse of the horizontal synchronization signal. Accordingly, the sampling time periodically set according to the frequencies of the driving signals D_111, D_121, D_264 may be a desired time within one horizontal period 1H even if the period of the horizontal synchronization signal Hsync is changed.

As another example, the driving signals D_111, D_121, D_264 may be synchronized with a pulse of the vertical synchronization signal Vsync every frame of a predetermined period. As illustrated in FIGS. 128 and 129, the pulse of the vertical synchronization signal Vsync may be changed to the enable level H at the same timing as the pulse of the horizontal synchronization signal Hsync of one horizontal period 1H. Accordingly, by synchronizing the pulse of the vertical synchronization signal Vsync and the driving signals D_111, D_121, D_264 in every frame, it is possible to prevent a shift between the horizontal synchronization signal Hsync and the sampling time in the corresponding frame. For example, the pulses of the driving signals D_111, D_121, D_264 may be initiated in synchronization with the pulse of the vertical synchronization signal Vsync of the first frame, and then the pulses of the driving signals D_111, D_121, D_264 may be initiated in synchronization with the pulse of the vertical synchronization signal Vsync of the second frame. Accordingly, the sampling time periodically set according to the frequencies of the driving signals D_111, D_121, D_264 may be any desired time point in one horizontal period 1H within a frame synchronized with the vertical synchronization signal Vsync, even if the period of the horizontal synchronization signal Hsync is changed.

In addition, in the present disclosure, at least one sampling time point s00, s01, s02, s03, s10, s11, s12, s13, . . . may include at least two time points of which phases are opposite to each other within one period of the frequency of the driving signals D_111, D_121, D_264. It is not limited to the above description.

In addition, in the present disclosure, at least one sampling time point s00, s01, s02, s03, s10, s11, s12, s13, . . . may include at least two time points of which phases change within one period of the frequency of the driving signals D_111, D_121, D_264. It is not limited to the above description. It is not limited to the above description.

The control unit 2624 generates touch information by using a sensing signal sampled in periods other than the periods dwp and sp within one horizontal period 1H. That is, the control unit 2624 may generate touch information indicating touch coordinates, touch intensity, etc. by using the sensing signal sampled by the first driving/receiving unit 2620 and the second driving/receiving unit 2622 at at least one sampling time point s10, s11, s12, s13, and so on.

Here, the control unit 2624 or the touch controller 262 may use a difference value between the signal value sampled at the first sampling time point s10 and the signal value sampled at the third sampling time point s12, and may obtain the signal level of the sensing signal, that is, an amplitude. In addition, the control unit 2624 or the touch controller 262 may use a difference value between the signal value received at the second sampling time point s11 and the signal value received at the fourth sampling time point s13, and may obtain the signal level of the sensing signal. The control unit 2624 or the touch controller 262 may determine whether to touch, touch coordinates, etc. according to the signal level of the sensing signal.

Alternatively, the control unit 2624 or the touch controller 262 may control the first driving/receiving unit 2620 and the second the driving/receiving unit 2622 so as to sample the sensing signal in a period other than the period dwp and the period sp within one horizontal period 1H.

Figure 131:
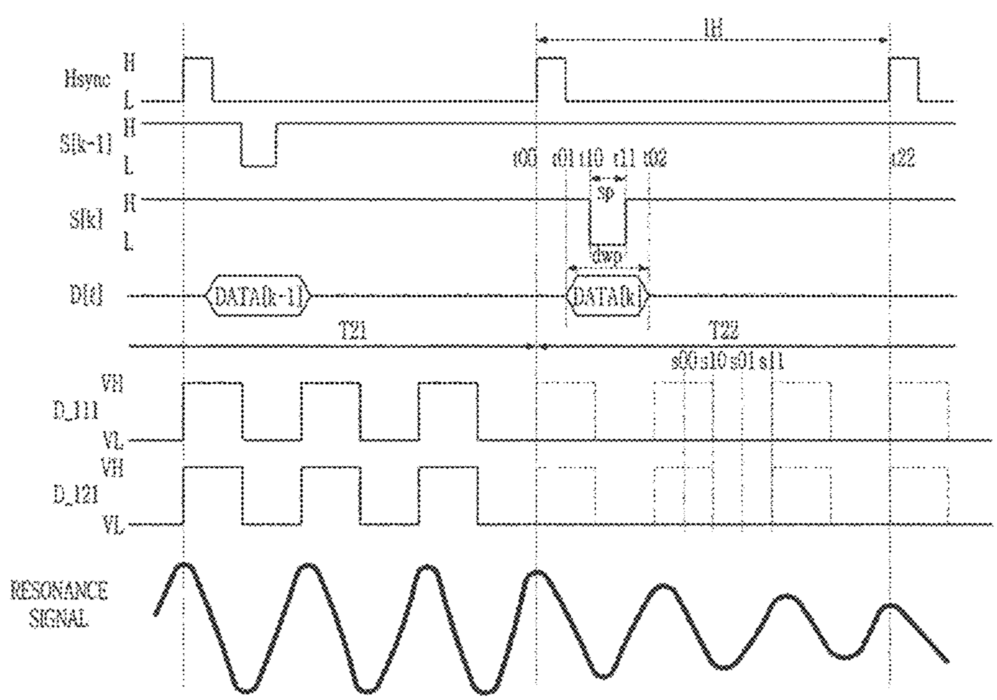

As shown in FIGS. 129 and 131, the frequency of the driving signals D_111, D_121, D_264 in the first sub-period T21 may be three times the frequency of the horizontal synchronization signal Hsync.

According to an embodiment, the control unit 2624 or the touch controller 262 selects some of the sensing signals sampled at least once within the second sub-period T22 based on the horizontal synchronization signal, and generates touch information by using the selected sensing signals. That is, the control unit 2624 or the touch controller 262 uses, as the touch information, the sensing signal sampled in the period other than the period dwp and the period sp within one horizontal period 1H in the second sub-period T22.

The sensing signals sampled during the time period excluding the period dwp in which the control unit 2624 or the touch controller 262 applies the data signal to the data line and the period sp in which the scan signal is the low-level voltage L in one horizontal period 1H, are used here. Thereby, there occurs an effect that the SNR can be improved by not using, as touch information, the sensing signal that generates noise according to the signal applied to the data line and the scan line that can form a parasitic capacitance with the touch electrodes.

According to another exemplary embodiment, within one horizontal period 1H in the second sub-period T22, the first driver/receiver 2620 receives the sensing signal from the plurality of first touch electrodes 111-1 to 111-*m*, and the second driving/receiving unit 2622 receives the sensing signal from the plurality of second touch electrodes 121-1 to 121-*n* in periods other than the periods dwp and sp.

Within one horizontal period 1H, the first driving/receiving unit 2620 and the second driving/receiving unit 2622 samples the sensing signal during a period excluding the period dwp in which the data signal is applied to the data line and the period sp in which the scan signal is a low-level voltage L, thereby preventing noise of the sensing signal according to the signals applied to the data line and the scan line that may form a parasitic capacitance with the touch electrodes.

A driving operation of the pixel PX_ab and an operation of receiving a sensing signal by the touch device according to the timing diagrams in FIGS. 134 and 135 will be described based on the circuit diagram of the pixel PX_ab in FIG. 30.

Figure 134:
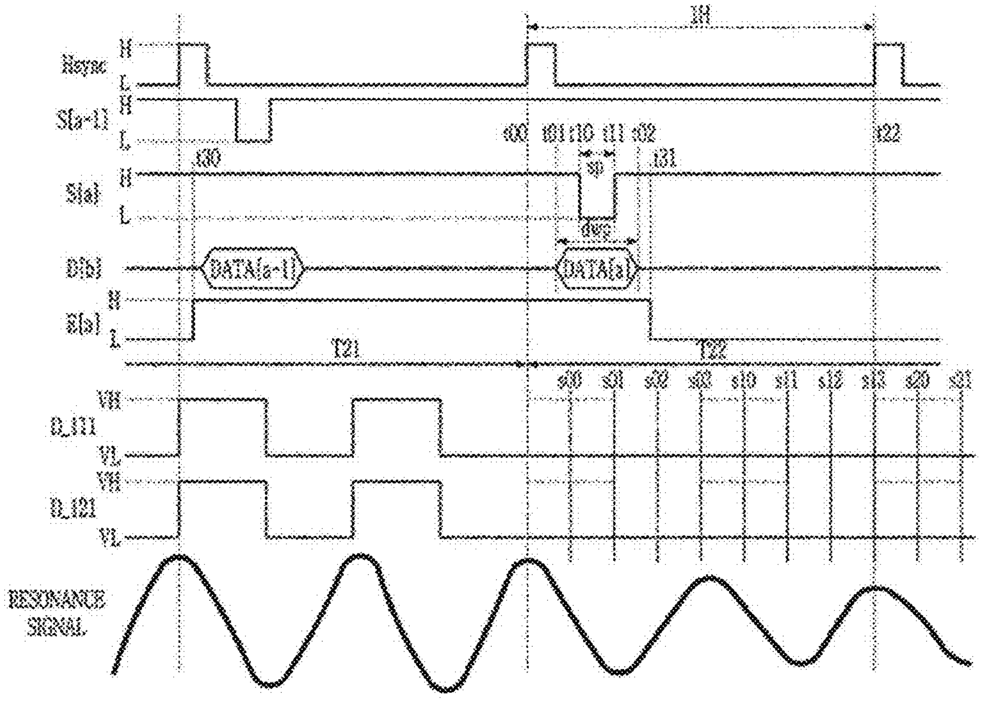
FIGS. 134 and 135 are timing diagrams for explaining a driving operation of the pixel PX_ab and an operation of receiving a sensing signal by a touch device.
Figure 135:
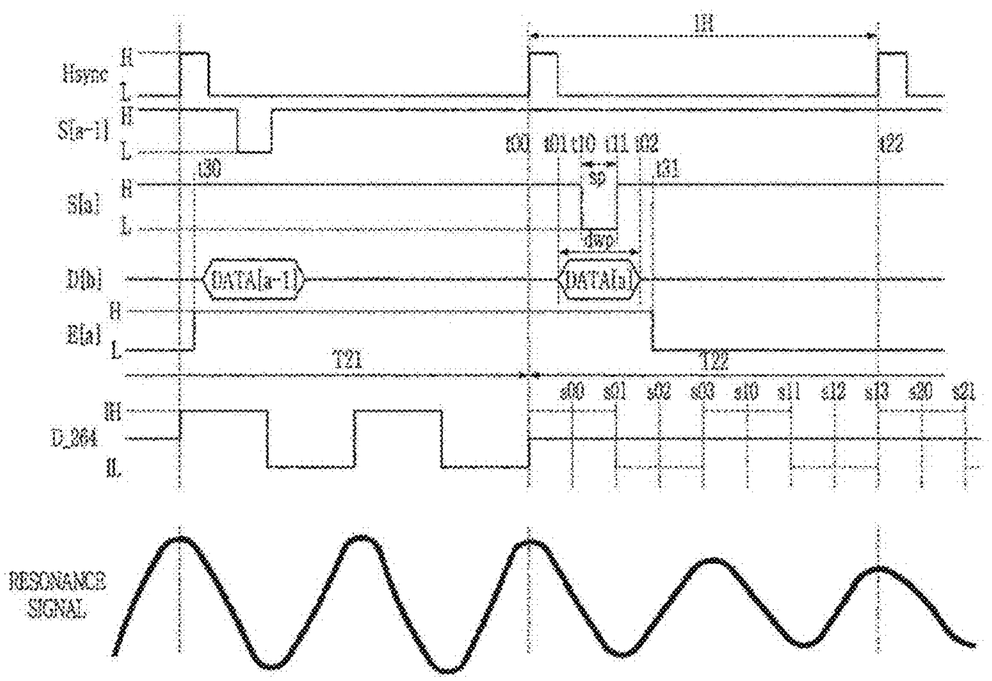

As shown in FIGS. 134 and 135, the frequency of the driving signals D_111, D_121, D_264 in the first sub-period T21 may be twice the frequency of the horizontal synchronization signal Hsync.

First, a driving operation of the pixel PX_ab will be described.

The seventh transistor TR7 together with the fourth transistor TR4 is turned on by the low-level voltage L of the a−1th scan signal S[a−1] transmitted through the a−1th scan line Sa−1. Then, the initialization voltage VINT for initializing the gate electrode voltage of the driving transistor TR1 is transmitted to the first node N1 through the fourth transistor TR4.

During the period sp, the third transistor TR3 together with the second transistor TR2 is turned on by the low-level voltage L of the a-th scan signal S[a] transmitted through the a-th scan line Sa. Then, the corresponding data signal DATA[a] is transmitted to the first node N1 through the turned-on second transistor TR2 and the turned-on third transistor TR3.

At t31, the fifth transistor TR5 and the sixth transistor TR6 are turned on by the light emission control signal Ej of the low-level voltage L. Then, the driving current by the voltage stored in the storage capacitor Cst is transmitted to the organic light emitting diode OLED, and the organic light emitting diode OLED emits light.

Next, an operation in which the electronic device receives the sensing signal will be described.

Within one horizontal period 1H, that is, one period of the pulse of the horizontal synchronization signal Hsync, there are the period dwp for applying the data signal to the data line and the period sp during which the scan signal is a low-level voltage L, and the light emission control signal is changed to the low-level voltage L within one horizontal period 1H.

At at least one sampling time point s00, s01, s02, s03, s10, s11, s12, s13, and so on in the second sub-period T22, the first driving/receiving unit 2620 may sample the sensing signals from the plurality of first touch electrodes 111-1 to 111-*m*, and the second driving/receiving unit 2622 may sample the sensing signals from the plurality of second touch electrodes 121-1 to 121-*n*.

According to an embodiment, the control unit 2624 or the touch controller 262 selects some of the sensing signals sampled at least once within the second sub-period T22 based on the horizontal synchronization signal, and generates touch information using the selected sensing signals. That is, the control unit 2624 or the touch controller 262 uses the sensing signals sampled in the period other than the period dwp and the period sp within one horizontal period 1H in the second sub-period T22 as touch information.

The sensing signals sampled during the time period excluding the period dwp for applying the data signal to the data line and the period sp in which the scan signal is the low-level voltage L in one horizontal period 1H, are used here. Thereby, there occurs an effect that the SNR can be improved by not using, as touch information, the sensing signal that generates noise according to the signal applied to the data line and the scan line that can form a parasitic capacitance with the touch electrodes.

According to another exemplary embodiment, within one horizontal period 1H in the second sub-period T22, the first driver/receiver unit 2620 receives the sensing signal from the plurality of first touch electrodes 111-1 to 111-*m*, and the second driving/receiving unit 2622 receives the sensing signal from the plurality of second touch electrodes 121-1 to 121-*n* in periods other than the period dwp and the period sp.

The sensing signals sampled during the time period excluding the period dwp for applying the data signal to the data line and the period sp in which the scan signal is the low-level voltage L in one horizontal period 1H, are used here. Thereby, there is an effect of preventing noise of the sensing signal according to the signal applied to the data line and the scan line that can form a parasitic capacitance with the touch electrodes.

Additionally, at least one time point s10, s11, s12, s13, and so on is within a period excluding a time point t31 at which the light emission control signal E[a] is changed to the low-level voltage L within one horizontal period 1H in the second sub-period T22.

That is, by using the sampled sensing signal during the period excluding the time t31 at which the emission control signal E[a] is changed to the low-level voltage L within one horizontal period 1H, or by sampling the sensing signal during the period excluding the time t31 at which the light emission control signal E[a] is changed to the low-level voltage L within one horizontal period 1H, there is an effect of preventing noise of the sensing signal according to the signal applied to the light emission control line that can form a parasitic capacitance with the touch electrodes.

Figure 136:
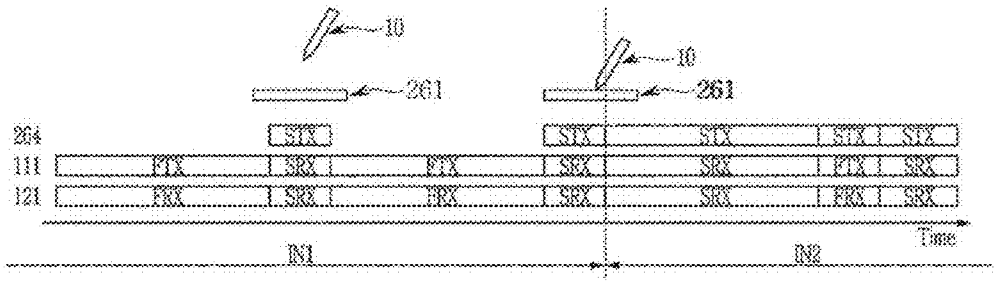
FIG. 136 is a diagram schematically illustrating a driving timing of a touch sensor according to an embodiment.

FIG. 136 is a diagram schematically illustrating a driving timing of a touch sensor according to an exemplary embodiment.

As shown in FIG. 136, the touch sensor 261 may operate in a first mode IN1 and a second mode IN2.

The first mode IN1 is a mode in which a touch by a user's body part (finger, palm, etc.) is mainly input. During the first mode IN1, a driving signal may be applied to the plurality of first touch electrodes 111 FTX, and a sensing signal according to the driving signal may be received by the plurality of second touch electrodes 121 FRX.

During the first mode IN1, the period STX for applying the driving signal for resonating the resonance circuit unit 12 of the stylus pen 10 to the loop coil 264 may be repeated at a predetermined period (e.g., 60 Hz, 120 Hz, etc.). Here, the plurality of first touch electrodes 111 and the plurality of second touch electrodes 121 may receive the sensing signal SRX. In addition, the first mode IN1 may be a mode in which only an input by a user's body part is received, and in this case, the period STX for applying the driving signal to the loop coil 264 may not be required.

When a signal output from the stylus pen 10 is sensed by the touch sensor 261 due to the resonance of the resonance circuit unit 12 of the stylus pen 10, the touch sensor 261 operates in the second mode IN2. In addition, the touch sensor 261 may be entered into the second mode IN2 and operated by an external controller. For example, the touch sensor 261 may be entered into the second mode IN2 and operated when an application program configured to receive a touch input by the stylus pen 10 is executed, or a touch input by the stylus pen 10 is expected to be received by another sensor.

The second mode IN2 is a mode in which a touch by the stylus pen 10 is mainly received. During the second mode IN2, a driving signal may be applied to the loop coil 264 STX, and a signal outputted from the stylus pen 10 may be transmitted to the plurality of first touch electrodes 111 and the plurality of second touch electrodes 121 SRX. According to the waveform of the sensing signal output from the stylus pen 10, the touch sensor 261 may identify the stylus pen 10*a* in FIG. 30A and the stylus pen 10*b* in FIG. 30B. In addition, the stylus pens 10*c*, 10*d*, 10*e* in FIGS. 30B, 30C, and 30E may also be identified.

A period FTX/FRX for receiving a touch input by a body part during the second mode IN2 may be repeated at a predetermined cycle (e.g., 60 Hz, 120 Hz, etc.). In this case, a driving signal may be applied to the plurality of first touch electrodes 111 FTX, and a sensing signal according to the driving signal may be received by the plurality of second touch electrodes 121 FRX. When identified as the stylus pen 10*a* in FIG. 30A, a driving signal may not be applied to the loop coil 264 during this period in order to reduce power consumption according to the application of the driving signal. When identified as the stylus pen 10*b* in FIG. 30B, a driving signal may be applied to the loop coil 264 during this period. Then, power may be charged to the stylus pen 10*b* even during a period in which a touch by a body part is received. In addition, the second mode IN2 may be a mode in which only an input by the stylus pen 10 is received, and in this case, a period FTX/FRX for receiving a touch input by a body part may not be required.

FIGS. 137A to 140B are diagrams illustrating driving timings of touch sensors according to embodiments.

FIGS. 137A, 137B, 138A, and 138B show the timing when the touch sensor 261 operates in a mutual capacitance method, and FIGS. 139A, 139B, 140A and 140B show the timing when the touch sensor 261 operates in a self-capacitance method.

Although FIGS. 137A, 138B, 139A and 140A depict the signals therein as if the frequencies of the driving signal D_111 applied to the first touch electrode 111, the driving signal D_121 applied to the second touch electrode 121, and the driving signal D_264 applied to the loop coil 264 have the same frequency, actual frequencies are not reflected in the drawings. For example, as shown in FIGS. 137B, 138B, 139B and 140B, the frequency of the driving signal D_111 applied to the first touch electrode 111 and/or the driving signal D_121 applied to the second touch electrode 121 may be different from the frequency of the driving signal D_264 applied to the loop coil 264.

Here, as shown in FIGS. 137B, 138B, 139B and 140B, the frequency of the driving signal D_111 applied to the first touch electrode 111 and/or the driving signal D_121 applied to the second touch electrode 121 may be less than the frequency of the driving signal D_264 applied to the loop coil 264. This is not limited thereto, and the frequency of the driving signal D_111 applied to the first touch electrode 111 and/or the driving signal D_121 applied to the second touch electrode 121 may be greater than the frequency of the driving signal D_264 applied to the loop coil 264.

Figure 137A:
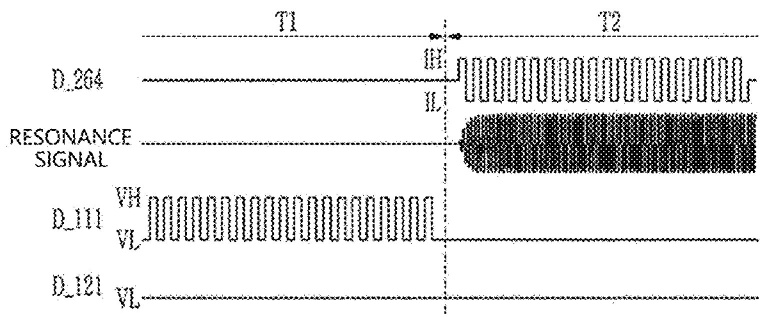
FIGS. 137A to 140B are diagrams illustrating driving timings of touch sensors according to embodiments.
Figure 137B:
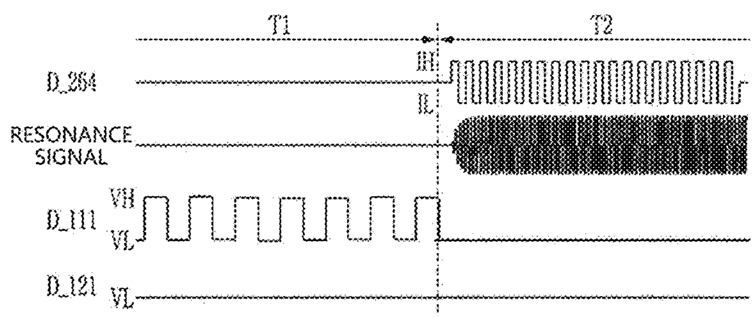

As shown in FIGS. 137B and 137B, the driving signal D_111 may be applied to the plurality of first touch electrodes 111 during the first period T1, and the sensing signal according to the driving signal D_111 may be received from the plurality of second touch electrodes 121. In this case, the driving signal D_121 is not applied to the plurality of second touch electrodes 121.

Next, the driving signal D_264 may be applied to the loop coil 264 during the second period T2. Then, the signal resonant in the resonance circuit unit 12 increases with time, and becomes saturated after a certain period of time has elapsed. A sensing signal by the stylus pen 10 may be received from the plurality of first touch electrodes 111 and the plurality of second touch electrodes 121.

Figure 138A:
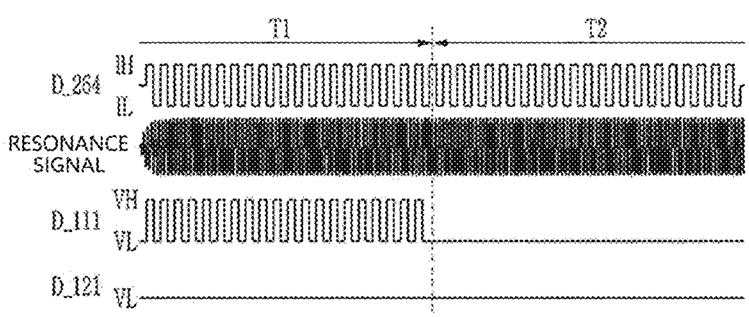
Figure 138B:
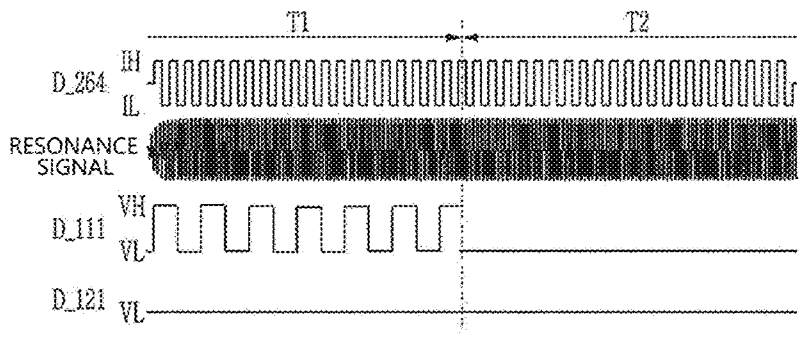

As illustrated in FIGS. 138A and 138B, during the first period T1, the driving signal D_111 is applied to the plurality of first touch electrodes 111, and the sensing signal according to the driving signal D_111 may be received from the plurality of second touch electrodes 121. In this case, the driving signal D_121 may not be applied to the plurality of second touch electrodes 121, but the driving signal D_264 may be applied to the loop coil 264. The resonance signal in the resonance circuit unit 12 increases with time and becomes saturated after a predetermined time elapses.

Since the sampling frequency of the plurality of second touch electrodes 121 corresponds to the driving signal D_111, the touch sensor 261 may receive a touch by a body part during the first period T1.

The driving signal D_264 may be applied only to the loop coil 264 during the second period T2. A sensing signal by the stylus pen 10 may be received from the plurality of first touch electrodes 111 and the plurality of second touch electrodes 121.

Figure 139A:
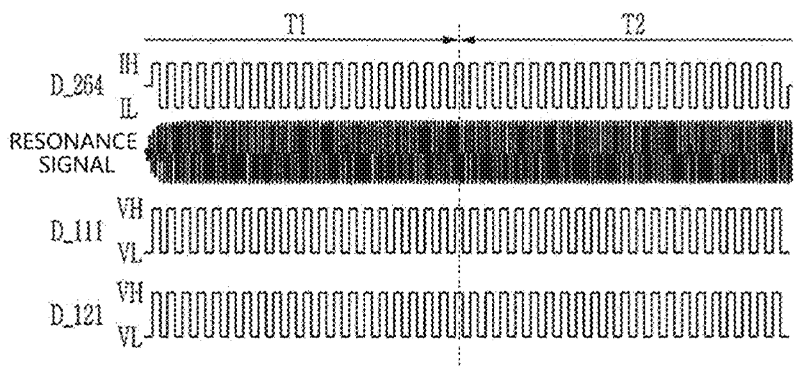
Figure 139B:
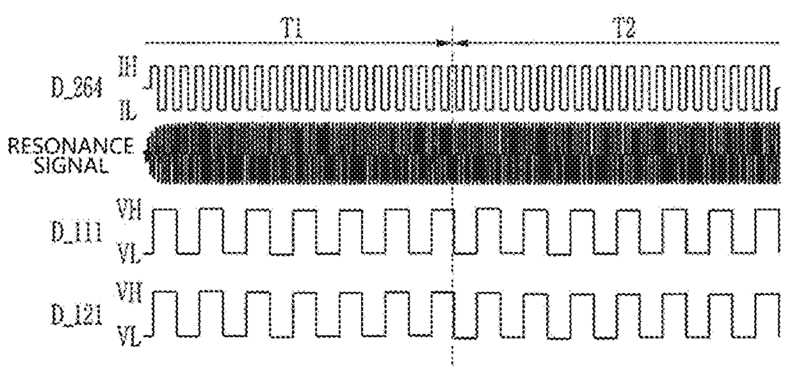

As shown in FIGS. 139A and 139B, during the first to second periods T1 to T2, the driving signal D_111 may be applied to the plurality of first touch electrodes 111, the driving signal D_121 may be applied to the plurality of first touch electrodes 121, and the driving signal D_264 may be applied to the loop coil 264.

In this case, the sampling frequency of the plurality of first touch electrodes 111 and the plurality of second touch electrodes 121 may be set to a frequency corresponding to the driving signal D_111 to receive a touch by a body part, or it may be set to a frequency corresponding to the signal output from the stylus pen 10 to receive a touch by the stylus pen 10.

Figure 140A:
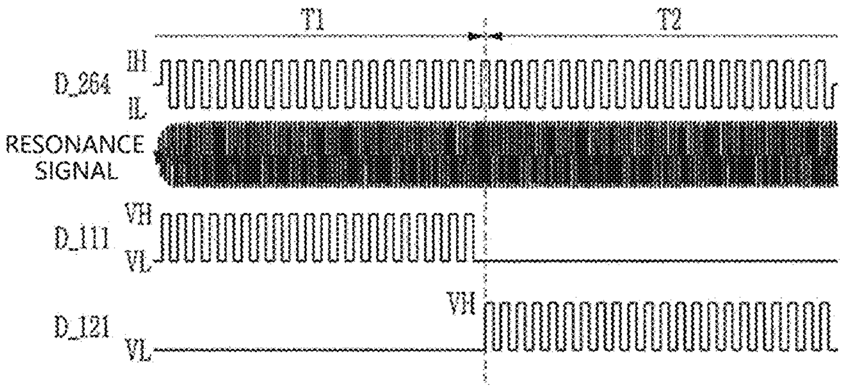
Figure 140B:
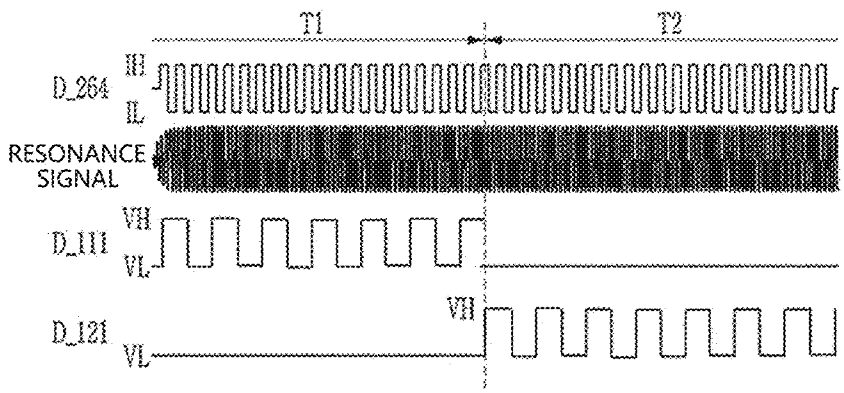

As shown in FIGS. 140A and 140B, a driving signal D_111 may be applied to the plurality of first touch electrodes 111 during a first period T1 to receive a touch by a body part, and a sensing signal by the stylus pen 10 may be received by the plurality of second touch electrodes 121. In this case, the driving signal D_121 may not be applied to the plurality of second touch electrodes 121, but the driving signal D_264 may be applied to the loop coil 264. The resonance signal resonant in the resonance circuit unit 12 increases with time and becomes saturated after a predetermined time elapses.

During the second period T2, the driving signal D_121 is applied to the plurality of first touch electrodes 121 to receive a touch by a body part, and the sensing signal by the stylus pen 10 may be received by the plurality of first touch electrodes 111. In this case, the driving signal D_111 may not be applied to the plurality of first touch electrodes 111, but the driving signal D_264 may be applied to the loop coil 264. The resonance signal resonant in the resonant circuit unit 12 is maintained.

As described above, in the touch sensor according to the present disclosure, the touch electrodes 111, 121 receive a resonance signal from the stylus pen 10 while the loop coil 264 transmits an electromagnetic signal to the stylus pen 10. In the case of the EMR and ECR methods, since the resonance signal is received from the stylus pen after stopping the transmission of the electromagnetic signal, there is a problem in that the resonance signal in the stylus pen is attenuated. Since the touch input is determined based on the attenuated resonance signal, the touch input is incorrectly recognized, and thus the touch sensitivity is deteriorated.

In the touch sensor according to the present disclosure, a signal transmission is performed by the loop coil 264 and a signal reception is performed by the touch electrodes 111, 121. That is, since the touch electrodes 111, 121 receive the resonance signal while the signal is transmitted by the loop coil 264, the resonance signal from the stylus pen 10 is not attenuated and is received by the touch electrodes 111, 121. This improves the SNR of a signal and improves the reception sensitivity of a touch input.

On the other hand, noise exists in the touch sensor 261 for various reasons, and such noise may act as a factor degrading the sensing performance of the touch sensor 261. In particular, in the case of the stylus pen 10, when noise in a frequency band similar to the resonant frequency of the stylus pen 10 exists, the precision of touch sensing may be greatly reduced.

A phenomenon in which noise affects touch sensing will be described with reference to FIG. 141.

Figure 141:
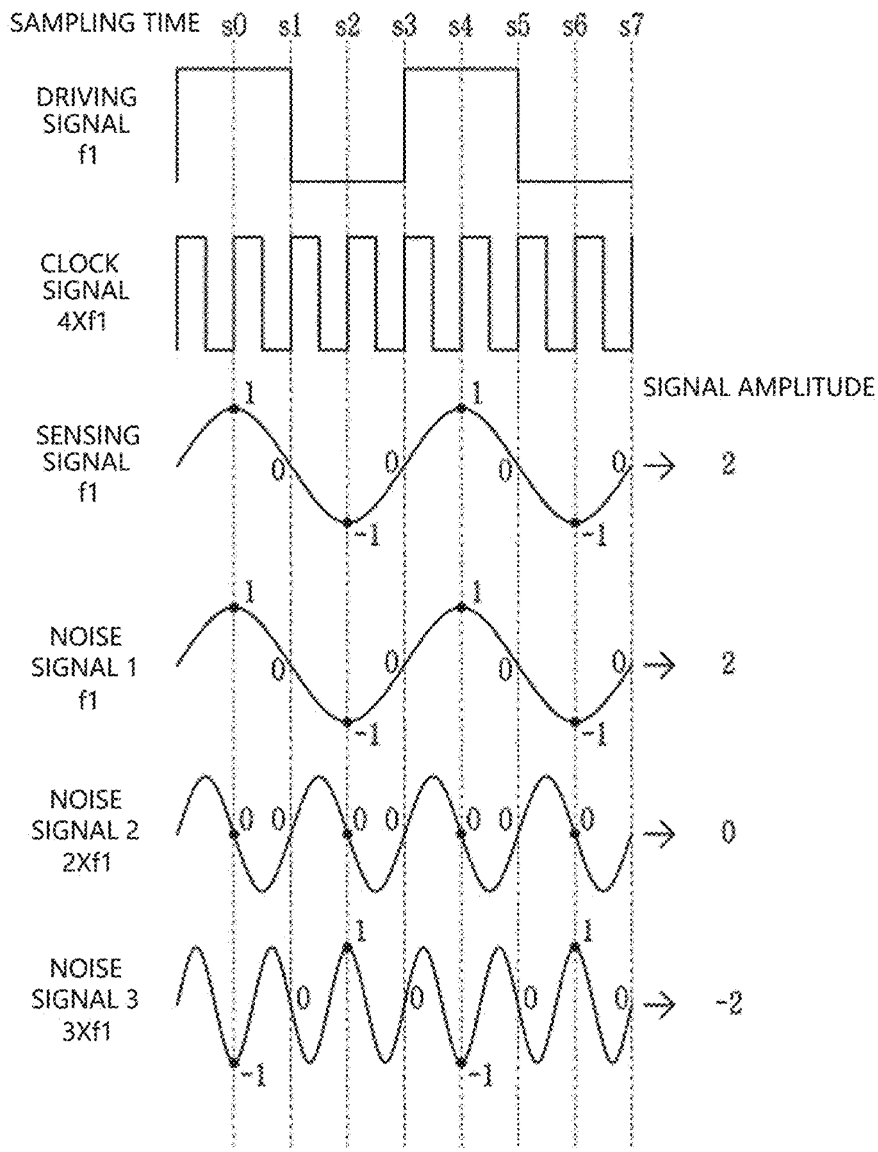
FIG. 141 is a diagram for explaining the effect of noise on touch sensing performance of an electronic device.

FIG. 141 is a diagram for explaining the effect of noise on the touch sensing performance of an electronic device. This indicates a case in which a noise signal having the same frequency as a driving signal applied to the touch sensor 261 or the loop coil 264 for resonance of the stylus pen 10 or having a frequency of 2 times or 3 times is generated.

Referring to FIG. 141, the touch sensing unit 260 of the electronic device samples the signal value of the sensing signal at a plurality of sampling points s0 to s7 in synchronization with a clock signal having a frequency of n times the frequency of the drive signal, for example 4 times the frequency of the drive signal in order to obtain the signal level, that is, the amplitude of the sensing signal. Taking FIG. 141 as an example, the signal level of the sensing signal is obtained using the difference value ΔI between the signal value 1 sampled at the point s0 and the signal value −1 sampled at the point s2.

As shown in FIG. 141, when the touch sensor 261 is touched by the stylus pen 10, the amplitude ΔI of the sensing signal output from the touched touch electrode becomes 2.

Likewise, in the noise signal 1 having the same frequency as the frequency f1 of the driving signal, a signal value sampled at sampling time s0 is 1, and a signal value sampled at sampling time s2 is −1. Thus, the difference between the two signal values ΔI becomes 2. In addition, in the noise signal 3 having a frequency that is three times the frequency f1 of the driving signal, a signal value sampled at sampling time s0 is −1, and a signal value sampled at sampling time s2 is 1. Thus, the difference between the two signal values ΔI becomes −2.

Therefore, when the noise signal 1 or the noise signal 3 is temporally synchronized with the driving signal, the signal value of the noise signal 1 or the noise signal 3 affects the acquisition of the amplitude of the sensing signal, thereby acting as a factor reducing the touch sensing performance.

Therefore, in an embodiment to be described later, in order to solve this problem, driving signals output to the touch sensor 261 or the loop coil 264 in the second touch driving mode in FIGS. 113 and 114 are configured to include two types of driving signals having different phases from each other, and different codes are applied depending on the phase of the corresponding driving signal in the process of acquiring the amplitude of the sensing signal. Thereby, the influence of the noise signal from the sensing signal can be removed.

Hereinafter, with reference to FIGS. 142 to 145, a touch detection method (refer to the steps S12 and S13 in FIG. 113) while the touch sensing unit 260 operates in the second touch driving mode will be described in more detail.

Figure 142:
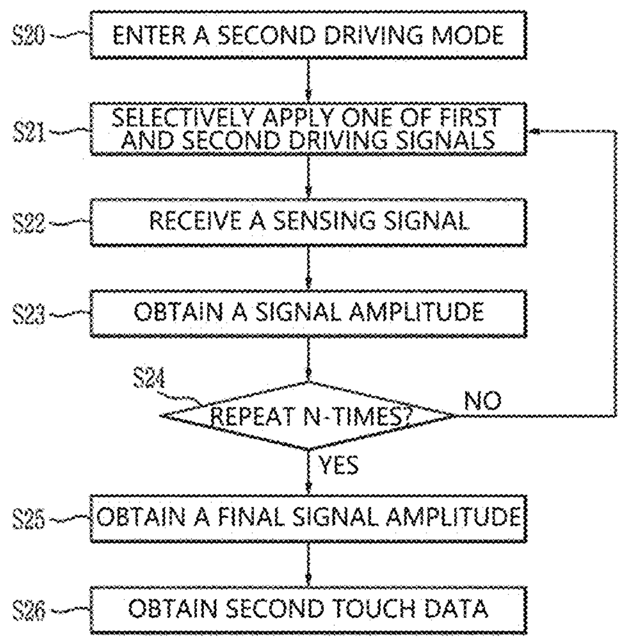
FIG. 142 is a flowchart illustrating a touch detection method while a touch sensing unit operates in a second touch driving mode according to an embodiment.
Figure 143:
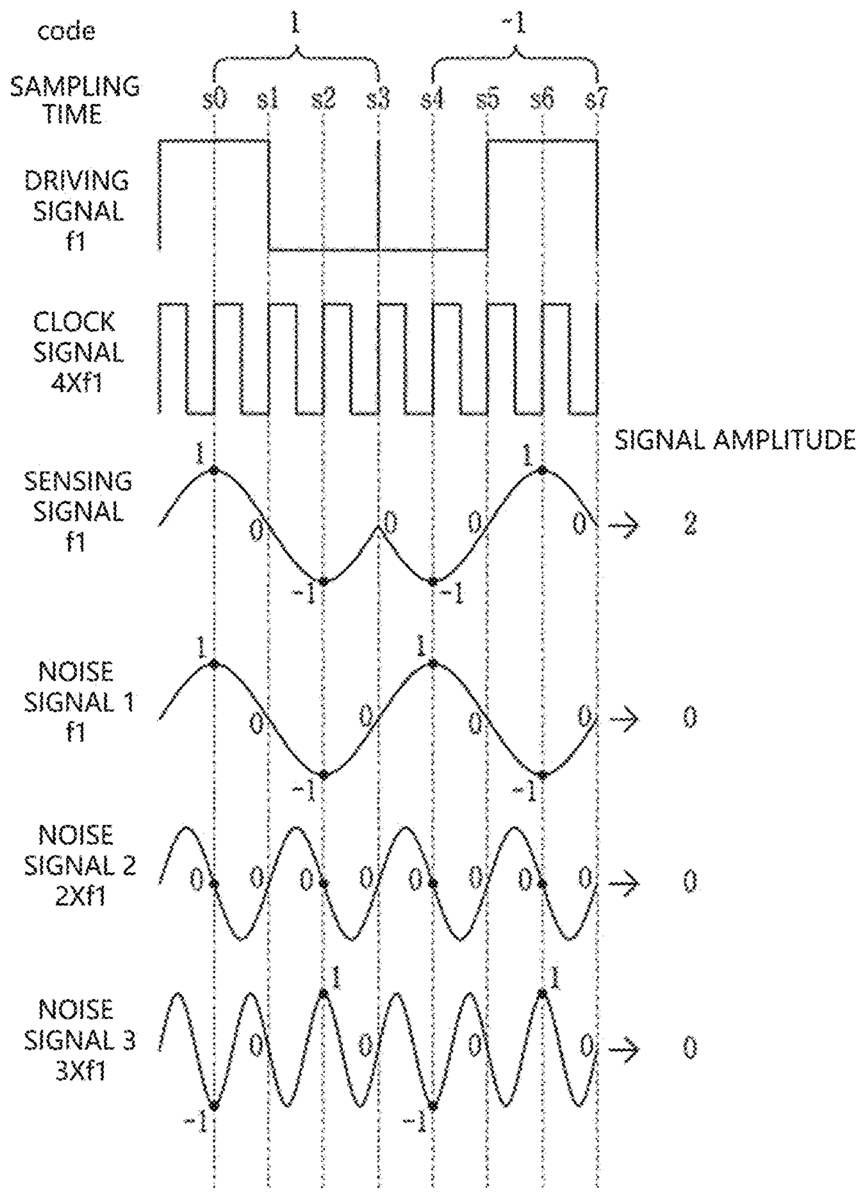
FIG. 143 is a diagram for explaining a method of filtering noise in the touch detection method of FIG. 142.

FIG. 142 is a flow chart illustrating a touch detection method while the touch sensing unit operates in a second touch driving mode according to an embodiment, and FIG. 143 is a diagram for explaining a method of filtering noise in the touch detection method in FIG. 142.

Referring to FIG. 15, as the touch controller 264 of the touch sensing unit 260 enters the second touch driving mode for sensing a touch by the stylus pen 10 by the touch sensing unit 260 S20, the first and second driving/receiving units 2620, 2622 are controlled to output a driving signal for generating a resonance signal of the stylus pen 10 to the touch sensor 261.

Alternatively, as the touch sensing unit 260 enters the touch driving mode for sensing a touch by the stylus pen 10 S20, the touch controller 262 of the touch sensing unit 260 controls the coil driver 263 so that it outputs a driving signal for generating a resonance signal of the stylus pen 10 to the loop coil 264.

Accordingly, the first and second driving/receiving units 2620, 2622 selectively applies one of the first and second driving signals having a frequency similar to the resonance frequency of the stylus pen 10 and having different phases to the touch sensor 261 S21. That is, the first and second driving/receiving units 2620, 2622 select one of the first and second driving signals having different phases, that is, opposite in phase to each other, according to a predetermined order or pattern, and output it to both the plurality of first touch electrodes 111-1 to 111-$m$ and the plurality of second touch electrodes 121-1 to 121-$n$ during a predetermined period (refer to the first sub-period T21 in FIG. 144).

Alternatively, the coil driver 263 applies one of the first and second driving signals having a frequency similar to the resonant frequency of the stylus pen 10 and having different phases to the loop coil 264 S21. That is, the coil driver 263 selects one of the first and second driving signals having different phases, that is, opposite in phase to each other, according to a predetermined order or pattern, and outputs it to the coil driver 263 during a predetermined period (refer to the first sub-period T21 in FIG. 144).

In addition, the first and second driving/receiving units 2620, 2622 receives the sensing signals from the touch sensor 261, that is, the plurality of first touch electrodes 111-1 to 111-$m$ and the plurality of second touch electrodes 121-1 to 121-$n$ S22, and transmits them to the control unit 2624 or the touch controller 262. For example, in a predetermined period (refer to the second sub-period T22 in FIG. 144) after the driving signal application in the step S21 is finished, the first driving/receiving unit 2620 may receive sensing signals from the first touch electrodes 111-1 to 111-$m$, and the second driver/receiver 2622 may receive the sensing signals from the plurality of second touch electrodes 121-1 to 121-$n$. In this case, the first and second driving/receiving units 2620, 2622 differentially amplify the sensing signals received from the respective touch electrodes, convert them into sensing data, which is a digital signal and transmits them to the control unit 2624 or the touch controller 262.

In addition, the touch controller 262 receives sensing signals from the touch sensor 261 S22. For example, in a predetermined period (refer to the second sub-period T22 in FIG. 144) after the driving signal application in the step S21 is finished, the touch controller 262 may receive sensing signals from the touch panel 261. In this case, the touch controller 262 differentially amplifies the sensing signals received from the respective touch electrodes, and converts them into sensing data that is a digital signal.

Here, the sensing data are data obtained by sampling signal values of the sensing signal through the ADC units 115, 125 of the first and second driving/receiving units 2620, 2622. Taking FIG. 143 as an example, the ADC units 115, 125 of the first and second driving/receiving units 2620, 2622 may sample the sensing signal at a plurality of time points s0 to s3, s10 to s13 in synchronization with a clock signal having a frequency of n times the frequency f1 of the driving signal, for example, a frequency of 4 times f1 4×f1. At least one sampling time point s0 to s3, s10 to s13 in the present disclosure may be any timing that may be periodically set in relation to the frequency of the driving signal.

Alternatively, the sensing data are data obtained by sampling signal values of the sensing signal through the ADC unit (not shown therein) of the touch controller 262. Taking FIG. 143 as an example, the ADC unit of the touch controller 262 may sample the sensing signal at a plurality of time points s0 to s3, s10 to s13 in synchronization with a clock signal having a frequency that is n times the frequency f1 of the driving signal, for example, a frequency of 4 times f1 4×f1. At least one sampling time point s0 to s3, s10 to s13 in the present disclosure may be any timing that is periodically set in relation to the frequency of the driving signal.

When the sensing data corresponding to the sensing signal received from each touch electrode is transmitted from the first and second driving/receiving units 2620, 2622, the control unit 2624 uses them and acquires the signal level, that is, the amplitude of each sensing signal S23.

Taking FIG. 143 as an example, the control unit 2624 or the touch controller 262 uses at least some of the signal values sampled by the first and second driving/receiving units 2620, 2622, and calculates the signal level of the corresponding sensing signal, that is, the amplitude. For example, the control unit 2624 or the touch controller 262 uses the difference between the signal values sampled at the sampling points s0, s2 and the difference between the signal values sampled at the sampling points s4, s6, and calculates the signal level of the sensing signal. Accordingly, the amplitude of the sensing signal received in response to the in-phase driving signal becomes +2, which is a difference value between the signal value 1 sampled at time s0 and the signal value −1 sampled at time s2. On the other hand, the amplitude of the sensing signal received in response to the out-of-phase driving signal becomes −2, which is the difference between the signal value −1 sampled at time s4 and the signal value 1 sampled at time s6.

While the touch sensing unit 260 is driven in the second touch driving mode, the first and second driving/receiving units 2620, 2622 apply a driving signal to the touch sensor 261 S21, or the coil driver 263 applies the driving signal to the loop coil 264 S21. Next, an operation of receiving the sensing signals from the touch sensor 261 S22 and obtaining the signal level of the sensing signal S23 is repeatedly performed N times S24 in response to the above. That is, during the second period T2 in which the touch sensing unit 260 is driven in the second touch driving mode, the combination of the first sub-period T21 to which the driving signal is applied and the second sub-period T22 to which the sensing signal is received may be repeated N times (e.g., 8 times).

After repeating the steps S21 to S23 N times, the control unit 2624 or the touch controller 262 obtains the final signal level, that is, the final amplitude of each sensing signal, through Equation 13 below S25.

$$\text{signal amplitude} = \frac{\sum_{i=1}^{N} (\Delta I_i \times \text{code})}{\#\text{ of samples}} \qquad \text{[Equation 13]}$$

In Equation 13 above, i corresponds to the number of times the steps S21 to S23 are performed, ΔIi means the signal amplitude obtained by the i-th performed steps S21 to S23, and "# of samples" corresponds to the number of times (the number of sampling times) that the signal amplitude is obtained from the sensing signal while the second touch driving mode is performed once, that is, the number of times that the steps S21 to S23 are performed.

Referring to Equation 13 above, the final signal amplitude of the sensing signal corresponding to each touch electrode corresponds to the value obtained by multiplying ΔIi by the corresponding code and dividing the sum thereof $\Sigma_{i=1}^{N}(\Delta I_i \times \text{code})$ by the number of sampling times # of samples, where the amplitude ΔIi of the sensing signal is obtained by applying the driving signal several times while the second touch driving mode is performed. Here, the code has one of the first value and the second value having the same absolute value and different signs. For example, the code has one of 1 and −1 and may be applied differently depending on the phase of a corresponding driving signal. Taking FIG. 143 as an example, the signal level of the sensing signal obtained by applying the in-phase driving signal (the first driving signal) to the touch sensor 261 or the loop coil 264 is multiplied by code 1, and the signal level of the sensing signal obtained by applying the out-of-phase signal (the second driving signal) to the touch sensor 261 or the loop coil 264 may be multiplied by code −1.

When the final signal level of the sensing signal corresponding to each touch electrode is obtained through the above-described method, the control unit 2624 or the touch controller 262 compares the value with a predetermined threshold value, and detect a valid touch signal from among the sensing signals. Then, second touch data including the touch coordinates of the stylus pen 10 are acquired in response to the touch electrodes from which the valid touch signal is detected S26.

The phase of the resonance signal generated by the stylus pen 10 is changed according to the phase of the driving signal applied to the touch sensor 261 or the loop coil 264. Accordingly, the phase of the sensing signal of the touch sensor 261 or the loop coil 264 that senses and outputs the resonance signal of the stylus pen 10 may be also changed in response to the phase of the driving signal applied to the touch sensor 261 or the loop coil 264.

Taking FIG. 143 as an example, a sensing signal generated when an in-phase driving signal is applied and a sensing signal generated when an out-of-phase driving signal is applied appear different from each other in phase. Accordingly, the amplitude of the sensing signal received by applying the in-phase driving signal (e.g., the difference value ΔI between the sensing data sampled at the sampling points s0, s2) becomes +2, and the amplitude of the sensing signal received by applying the out-of-phase driving signal (e.g., the difference value ΔI between sensing data sampled at sampling points s4, s6) becomes −2. When the amplitude values obtained in this way are substituted into Equation 13 above, the final signal amplitude value may be reduced through the cancellation between the amplitude values. That is, since the amplitude value of the sensing signal generated by the application of the in-phase driving signal is +2 and the amplitude value of the sensing signal generated by the application of the out-of-phase driving signal is −2, the final signal amplitude obtained when the code is not applied becomes (2+(−2))/2=0.

Therefore, the control unit 2624 or the touch controller 262 multiplies the amplitude of the sensing signal obtained by applying the in-phase driving signal by code 1, and multiplies the amplitude of the sensing signal obtained by applying the out-of-phase driving signal by code −1. Thereby, cancellation between the amplitude values is prevented. That is, when the code according to the phase of the driving signal is applied, the final signal amplitude of the sensing signal becomes ((2×1)+((−2)×(−1))/2=2.

Meanwhile, since the noise signal is a signal that is not affected by the driving signal, as shown in FIG. 16, the phase thereof is maintained regardless of the phase change of the driving signal. Accordingly, when obtaining the signal amplitude of the noise signal by substituting it into the above Equation 13, the amplitude values multiplied by the code are canceled. Taking the noise signal 1 as an example, the final signal magnitude obtained by Equation 13 above becomes ((2×1)+((2×(−1))/2=0, thereby being filtered. In addition, taking the noise signal 3 as an example, the final signal amplitude obtained by Equation 13 above becomes (((−2)×1)+((−2)×(−1))/2=0, thereby being filtered.

On the other hand, in FIG. 143, the driving signal of the in-phase and the driving signal of the out-of-phase are continuously applied to the touch sensor 261 or the loop coil 264, but this is for convenience of explanation. Only one of the in-phase or out-of-phase driving signals is applied to the touch sensor 261 or the loop coil 264 in one first sub-period T21. Accordingly, at least one second sub-period T21 may be disposed between the period to which the in-phase driving signal is applied and the period to which the out-of-phase driving signal is applied.

While the touch sensing unit 260 is driven in the second touch driving mode, the arrangement of the period in which the first driving signal having different phases is output and the period in which the second driving signal is output may be variously modified.

Hereinafter, embodiments in which first and second driving signals having different phases are output while driving in the second touch driving mode will be described with reference to FIGS. 144 and 147.

FIGS. 144 to 147 are waveform diagrams illustrating examples in which the touch sensing unit outputs first and second driving signals having different phases.

Figure 144:
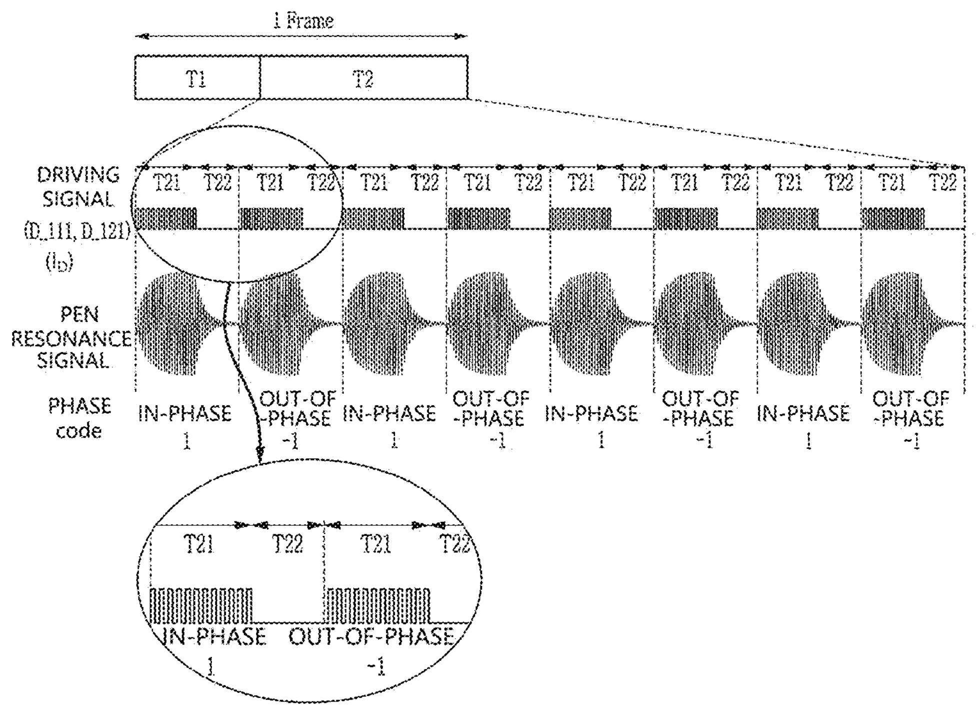
FIGS. 144 to 147 are waveform diagrams illustrating examples in which a touch sensing unit outputs first and second driving signals having different phases.
Figure 145:
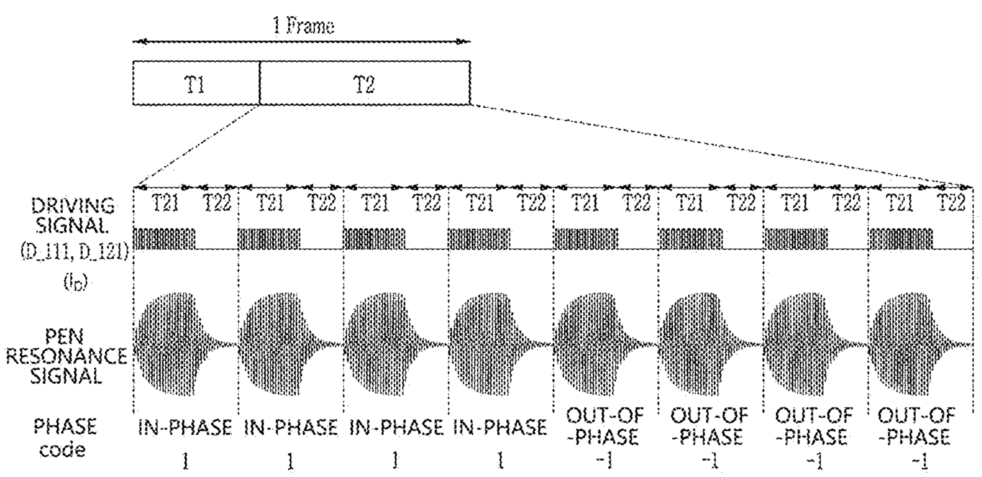
Figure 146:
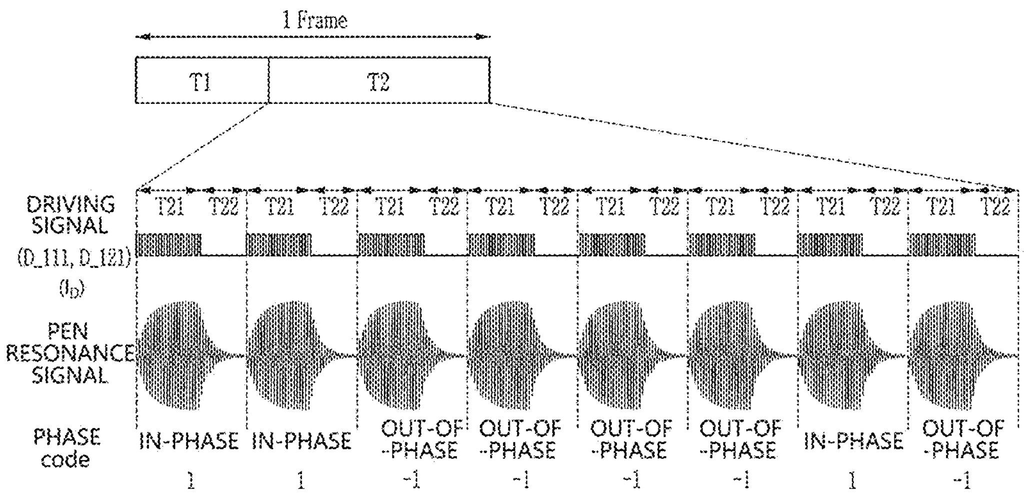

Referring to FIGS. 144 to 146, one frame period includes a first period T1 in which the touch sensing unit 260 is driven in the first touch driving mode, and a second period T2 in which the touch sensing unit 260 is driven in the second touch driving mode. When the second period T2 of the current frame period ends, the first period T1 of the next frame period starts.

The second period T2 in which the touch sensing unit 260 is driven in the second touch driving mode within one frame period includes a plurality of combinations (e.g., 8 times) of the first sub-period T21 to which the driving signal is applied and the second sub-period T22 to which the driving signal is not applied. In addition, one second period T2 may include a first sub-period T21 to which the first driving signal is applied and a first sub-period T21 to which the second driving signal is applied at least once.

Referring to FIG. 144, the first and second driving/receiving units 2620, 2622 or the coil driver 263 may alternately apply a first driving signal having a in-phase and a second driving signal having an out-of-phase according to a predetermined period (e.g., every first sub-period T21). In this case, among the first sub-periods T21 included in the second period T2, the number of periods to which the first driving signal is applied and the number of periods to which the second driving signal is applied are the same.

Meanwhile, the first sub-period T21 to which the first driving signal is applied within one second period T2 may be consecutive at least twice. Similarly, in one second period T2, at least two first sub-periods T21 to which the second driving signal is applied may also be consecutive. Taking FIG. 145 as an example, in the first four first sub-periods T21 within one second period T2, the first driving signal is continuously applied, and in the following four first sub-periods T21, the second driving signal is continuously applied. In FIG. 145, within one second section T2, the number of successive times (4) of the first sub-period T21 to which the first driving signal is applied and the number of successive times (4) of the first sub-period T21 to which the second driving signal are equal to each other.

Figure 147:
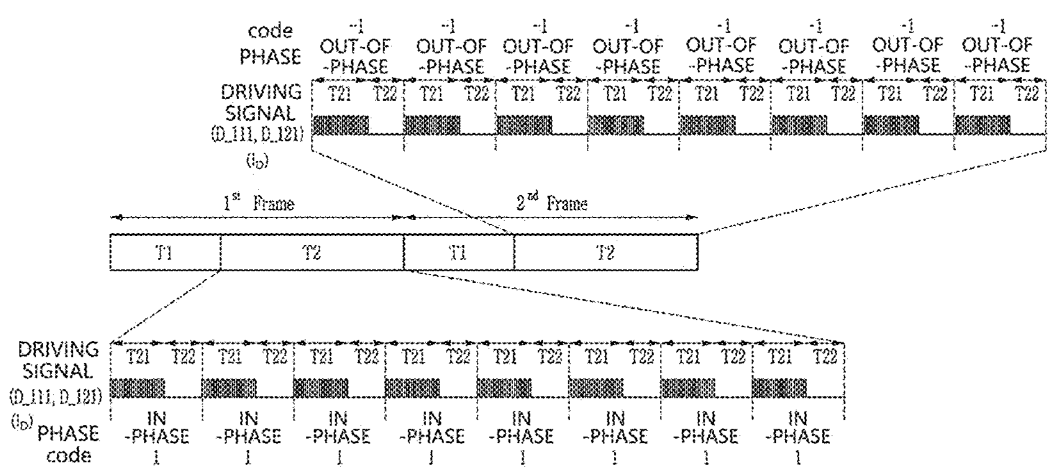

According to FIG. 147, a pattern to which the first driving signal of in-phase and the second driving signal of out-of-phase are applied by the first and second driving/receiving units 2620, 2622 or the coil driver 263 may be irregular and aperiodic. Referring to FIG. 147, the number of periods to which the first driving signal is applied and the number of periods to which the second driving signal is applied among the first sub-periods T21 included in one second period T2 are may be different. In addition, the number of times that the first sub-period T21 to which the first driving signal is applied is continuous and the number of times that the first sub-period T21 to which the second driving signal is applied is continuous within one second period T2 may be different from each other.

Meanwhile, in the above description, the case in which the phase change of the driving signal occurs in units of the first sub-period T21 has been described as an example, but the present invention is not limited thereto. According to another embodiment, the phase change of the driving signal may occur in units of the second period T2. Taking FIG. 147 as an example, in the second period T2 of the first frame period, the first driving signal having in-phase is applied to the touch sensor 261 or the loop coil 264, and in the second period T2 of the second frame period, the second driving signal having out-of-phase is applied to the touch sensor 261 or the loop coil 264. In this case, the touch sensing unit 260 may obtain the final signal level of the sensing signal from the sensing signals received from the touch sensor 261 in the second period T2 for every frame period based on Equation 13 described above, and may obtain the second touch data using this. In addition, the touch sensing unit 260 may obtain the final signal amplitude of the sensing signal from the sensing signals received from the touch sensor 261 in the second period T2 of the first frame period and the sensing signals received from the touch sensor 261 in the second period T2 of the second frame period, based on Equation 13 described above, and may obtain the second touch data using this.

According to the above-described embodiments, it is possible to minimize the influence of the noise signal on the sensing signal even in an environment in which noise in a frequency band similar to the resonance signal of the stylus pen exists, thereby improving the touch sensing performance by the stylus pen.

A method of controlling a touch device according to the embodiments shown in FIGS. 20 to 24 will be described with reference to FIGS. 148 and 149. FIG. 148 is a flow chart illustrating a method of controlling a touch sensing unit according to embodiments, and FIGS. 149A and 149B are a view illustrating an example of applying a driving signal according to a method of controlling the touch sensing unit. According to a touch report rate, one touch report frame period includes a first period and a second period. The touch report rate refers to a speed or frequency (Hz) at which the touch sensing unit 260 outputs and reports touch data obtained by driving the touch electrodes to an external host system.

First, referring to FIG. 148, in the first period, the touch sensing unit 260 is driven in the first mode S10. The first mode is a mode in which a driving signal for sensing a touch input by a touch object other than the stylus pen 10 is applied to the touch sensor 261.

For example, in the first mode, the first driving/receiving unit 2620 outputs driving signals to the plurality of first touch electrodes 111-1 to 111-*m*, and the second driving/receiving unit 2622 receives sensing signals from the plurality of second touch electrodes 121-1 to 121-*n*.

As another example, in the first mode, the third driving/receiving unit 2626 simultaneously outputs a driving signal to the plurality of third touch electrodes 131-11 to 131-*ab*, and receives a sensing signal according to a touch.

That is, in the first mode, at least one of the first driving/receiving unit 2620, the second driving/receiving unit 2622, and the third driving/receiving unit 2626 may output a driving signal to the corresponding at least one touch electrode, and at least one of the first driving/receiving unit 2620, the second driving/receiving unit 2622, and the third driving/receiving unit 2626 may receive a sensing signal according to a touch from the corresponding at least one touch electrode.

The control unit 2624 determines a position of the first object by using the sensing signal obtained in the first period S12.

For example, the control unit 2624 calculates touch information such as touch coordinates, a touch area, etc. by using the sensing signal obtained in the first period. The sensing signal acquired in the first period includes at least one of a sensing signal by a user's body part (finger, palm, etc.) and a sensing signal by the stylus pen 10 or the passive type stylus pen.

In the 1-1 sub-period of the second period, the touch sensing unit 260 is driven in the second mode S14.

The second mode is a mode in which a driving signal (hereinafter, referred to as a first driving signal) for detecting a touch input by the stylus pen 10 is applied to the touch sensor 261.

The second period may include a 1-1 sub-period, a 2-1 sub-period, a 1-2 sub-period, and a 2-2 sub-period. The 1-1 sub-period and the 2-1 sub-period may be an initial period of the second period. A plurality of sub-periods 1-1 and 2-1 may be included in the second period. When the 2-1 sub-period ends, the 1-2 sub-period may start. A plurality of sub-periods 1-2 and 2-2 may be included in the second period.

For example, in the 1-1 sub-period, the first driving/receiving unit 2620 simultaneously applies the first driving signal to the plurality of first touch electrodes 111-1 to 111-*m*.

As another example, in the 1-1 sub-period, the second driving/receiving unit 2622 simultaneously applies the first driving signal to the plurality of second touch electrodes 121-1 to 121-*n*.

As another example, in the 1-1 sub-period, the first driving/receiving unit 2620 and the second driving/receiving unit 2622 simultaneously apply a first driving signal to the plurality of first touch electrodes 111-1 to 111-*m*, and apply a first driving signal to the plurality of second touch electrodes 121-1 to 121-*n*. In this case, the phases of the first driving signal applied to the plurality of first touch electrodes 111-1 to 111-*m* and the first driving signal applied to the plurality of second touch electrodes 121-1 to 121-*n* are assumed to be the same, but they are not limited thereto.

As another example, in the first 1-1 sub-period, the first driving/receiving unit 2620 and the second driving/receiving unit 2622 simultaneously apply a first driving signal to some of the plurality of first touch electrodes 111-1 to 111-*m*, and apply a first driving signal to some of the plurality of second touch electrodes 121-1 to 121-*n*. In the first 1-1 sub-period, the first driving/receiving unit 2620 and the second driving/receiving unit 2622 simultaneously apply the first driving signal to some other parts of the plurality of first touch electrodes 111-1 to 111-*m*, and simultaneously apply the first driving signal to some other parts of the plurality of second touch electrodes 121-1 to 121-*n*. In this case, some touch electrodes to which the first driving signal is applied in the first 1-1 sub-period and some other touch electrodes to which the first driving signal is applied in the second 1-1 sub-period may partially overlap.

As another example, in the 1-1 sub-period, the third driving/receiving unit 2626 simultaneously applies the first driving signal to all of the plurality of third touch electrodes 131-11 to 131-*ab*.

As another example, in the first 1-1 sub-period, the third driving/receiving unit 2626 simultaneously applies the first driving signal to some of the plurality of third touch electrodes 131-11 to 131-*ab*, and in the second 1-1 sub-period, the third driving/receiving unit 2626 simultaneously applies the first driving signal to some of the plurality of third touch electrodes 131-11 to 131-*ab*. In this case, some touch electrodes to which the first driving signal is applied in the first 1-1 sub-period and some other touch electrodes to which the first driving signal is applied in the second 1-1 sub-period may partially overlap.

As another example, in the 1-1 sub-period, the first driving/receiving unit 2620, the second driving/receiving unit 2622, and the third driving/receiving unit 2626 simultaneously apply a first driving signal to all of the plurality of first touch electrodes 111-1 to 111-*m*, simultaneously apply the first driving signal to all of the plurality of second touch electrodes 121-1 to 121-*n*, and simultaneously apply the first driving signal to all of the plurality of third touch electrodes 131-11 to 131-1*b*. In this case, it is assumed that the phases of the first driving signal applied to the plurality of first touch electrodes 111-1 to 111-*m*, the first driving signal applied to the plurality of second touch electrodes 121-1 to 121-*n*, and the first driving signal applied to the plurality of third touch electrodes 131-11 to 131-*ab* are all the same, but they are not limited thereto.

That is, in the 1-1 sub-period, at least one of the first driving/receiving unit 2620, the second driving/receiving unit 2622, and the third driving/receiving unit 2626 may output a driving signal to at least one corresponding touch electrode.

It is assumed that the frequency of the driving signal applied to the touch sensor 261 in the first period is less than or equal to the frequency of the first driving signal applied to the touch sensor 261 in the 1-1 sub-period.

The resonance circuit unit 12 of the stylus pen 10 resonates with the first driving signal, and thereby a resonance signal may be generated and transmitted to the touch sensor 261 through the conductive tip 11.

In the 2-1 sub-period of the second period, the touch sensing unit 260 receives a sensing signal resonant based on the first driving signal S16.

For example, the first driving/receiving unit 2620 receives the sensing signal transmitted from the plurality of first touch electrodes 111-1 to 111-*m*, and the second driving/receiving unit 2622 receives the sensing signal transmitted from the plurality of second touch electrodes 121-1 to 121-*n*. The first driving/receiving unit 2620 and the second driving/receiving unit 2622 may process the received sensing signal and transmit it to the control unit 2624.

As another example, the third driving/receiving unit 2626 receives the sensing signal transmitted from the plurality of third touch electrodes 131-11 to 131-*ab*. The third driving/receiving unit 2626 may process the received sensing signal and transmit it to the control unit 2624.

The control unit 2624 may acquire touch coordinate information of a position where a touch by the stylus pen 10 occurs based on the sensing signal obtained in the 2-1 sub-period.

In addition, the control unit 2624 may calculate the touch area based on the sensing signal obtained in the 2-1 sub-period.

The 1-1 sub-period and the 2-1 sub-period may be repeated at least twice within the second period. In this case, the touch sensing unit 260 may acquire the touch coordinates of the position where a touch of the stylus pen 10 occurs by changing the areas of the touch sensor 261 applying the first driving signal in each of the 1-1 sub-periods.

Referring to FIG. 149A, the touch sensing unit 260 may apply a first driving signal only to some touch electrodes positioned to correspond to the area AA1 of the touch sensor 261 during the first 1-1 sub-period, and may receive a sensing signal from the touch electrodes of the touch sensor 261 during the first 2-1 sub-period. Here, some of the touch electrodes positioned to correspond to the area AA1 may include at least some of the first to third touch electrodes 111, 121, and 131. For example, the touch sensing unit 260 may apply the first driving signal to the first and third touch electrodes positioned to correspond to the area AA1. The touch sensing unit 260 may apply a first driving signal to the second and third touch electrodes positioned to correspond to the area AA1.

In this case, during the first 1-1 sub-period, the touch sensing unit 260 may apply a driving signal having a phase difference of 180 degrees from that of the first driving signal to the area NA1 of the touch sensor 261 (hereinafter, referred to as a second driving signal), or may ground or float. Here, some of the touch electrodes positioned to correspond to the area NA1 may include at least some of the first to third touch electrodes 111, 121, 131. For example, the touch sensing unit 260 may apply the second driving signal to the first touch electrode and the third touch electrode positioned to correspond to the area NA1, or may ground or float. The touch sensing unit 260 may apply the second driving signal to the second touch electrode and the third touch electrode positioned to correspond to the area NA1, or may ground or float.

Referring to FIG. 149B, the touch sensing unit 260 may apply a first driving signal only to some touch electrodes positioned to correspond to the area AA2 of the touch sensor 261 during the second 1-1 sub-period, and may receive a sensing signal from the electrodes of the touch sensor 261 during the second 2-1 sub-period. Here, some of the touch electrodes positioned to correspond to the area AA2 may include at least some of the first to third touch electrodes 111, 121, 131. For example, the touch sensing unit 260 may apply the first driving signal to the first and third touch electrodes positioned to correspond to the area AA2. The touch sensing unit 260 may apply the first driving signal to the second and third touch electrodes positioned to correspond to the area AA2.

In this case, during the second sub-period 1-1, the touch sensing unit 260 may apply a second driving signal having a phase difference of 180 degrees from that of the first driving signal to the area NA2 of the touch sensor 261, or may ground or float. Similarly, some of the touch electrodes positioned to correspond to the area AA2 may include at least some of the first to third touch electrodes 111, 121, 131. For example, the touch sensing unit 260 may apply the second driving signal to the first touch electrode and the third touch electrode positioned to correspond to the area NA2, or may ground or float. The touch sensing unit 260 may apply the second driving signal to the second touch electrode and the third touch electrode positioned to correspond to the area NA2, or may ground or float.

Here, the area AA1 of the touch sensor 261 to which the first driving signal is applied during the first 1-1 sub-period and the area AA2 of the touch sensor 261 to which the first driving signal is applied during the second 1-1 sub-period may partially overlap on a plane.

In the 1-2 sub-period of the second period, the touch sensing unit 260 is driven in the third mode S18.

In one embodiment, in the third mode, the first driving signal is applied to an area within the touch sensor 261 excluding the position of a first object, and the second driving signal is applied to an area within the touch sensor 261 corresponding to the position of the first object. In this case, when the distance between the touch point of the stylus pen 10 and the position of the first object 30 exceeds a predetermined threshold value, the touch sensing unit 260 may apply the second driving signal to an area within the touch sensor 261 corresponding to the position of the first object. If the distance between the point where a touch of the stylus pen 10 occurs and the position of the first object is within a predetermined threshold value, the touch sensing unit 260 may not apply the second driving signal. The threshold value may be a distance spaced apart from each other in units of at least one third touch electrode 131, but it is not limited thereto and may be any length.

That is, at least one of the first driving/receiving unit 2620, the second driving/receiving unit 2622, and the third driving/receiving unit 2626 in the 1-2 sub-period may output the first driving signal to some of the corresponding at least one touch electrode, and may output the second driving signal to other part of the corresponding at least one touch electrode.

For example, in the 1-2 sub-period, the first driver/receiver 2620 applies to all of the first touch electrodes not located at the position of a first object among the plurality of first touch electrodes 111-1 to 111-*m*. In addition, the first driving/receiving unit 2620 applies the second driving signal to all of the first touch electrodes located at the position of the first object 30 among the plurality of first touch electrodes 111-1 to 111-*m*.

As another example, in the 1-2 sub-period, the second driving/receiving unit 2622 simultaneously applies the first driving signal to all of the second touch electrodes not located at the position of a first object among the plurality of second touch electrodes 121-1 to 121-*n*. In addition, the second driving/receiving unit 2620 applies the second driving signal to all of the second touch electrodes located at the position of the first object among the plurality of second touch electrodes 121-1 to 121-*n*.

As another example, in the 1-2 sub-period, the first driving/receiving unit 2620 and the second driving/receiving unit 2622 simultaneously apply the first driving signal to all of the first touch electrodes not located at the position of a first object among the plurality of first touch electrodes 111-1 to 111-*m*, and applies the first driving signal to all of the second touch electrodes located at the position of the first object among the plurality of second touch electrodes 121-1 to 121-*n*. In addition, the first driving/receiving unit 2620 and the second driving/receiving unit 2622 simultaneously apply the second driving signal to all of the first touch electrodes located at the position of the first object among the plurality of first touch electrodes 111-1 to 111-*m*, and applies the second driving signal to all of the second touch electrodes located at the position of the first object among the plurality of second touch electrodes 121-1 to 121-*n*.

As another example, in the 1-2 sub-period, the third driving/receiving unit 2626 applies a driving signal to all of the third touch electrodes not located at the position of a first object among the plurality of third touch electrodes 131-11 to 131-*ab*. In addition, the third driving/receiving unit 2626 applies the second driving signal to all of the third touch electrodes located at the position of the first object among the plurality of third touch electrodes 131-11 to 131-*ab*.

As another example, in the 1-2 sub-period, the first driving/receiving unit 2620, the second driving/receiving unit 2622, and the third driving/receiving unit 2626 simultaneously apply the first driving signal to all of the first touch electrodes not located at the position of a first object among the plurality of first touch electrodes 111-1 to 111-*m*, simultaneously apply the first driving signal to all of the second touch electrodes not located at the position of the first object among the plurality of second touch electrodes 121-1 to 121-*n*, and simultaneously apply a driving signal to all of the third touch electrodes not located at the position of the first object among the plurality of third touch electrodes 131-11 to 131-*ab*. In addition, the first driving/receiving unit 2620 and the second driving/receiving unit 2622 simultaneously apply the second driving signal to all of the first touch electrodes located at the position of a first object among the plurality of first touch electrodes 111-1 to 111-*m*, simultaneously apply the second driving signal to all of the second touch electrodes located at the position of the first object among the plurality of second touch electrodes 121-1 to 121-*n*, and simultaneously apply the second driving signal to all of the third touch electrodes located at the position of the first object among the plurality of third touch electrodes 131-11 to 131-*ab*.

Since the second driving signal having a phase difference of 180 degrees from that of the first driving signal is provided to the ground 15 of the stylus pen 10, the voltage difference between the both ends of the resonance circuit unit 12 increases in comparison with the case when the ground is ideal. Accordingly, the energy that can be utilized for resonance increases, and thereby, the stylus pen 10 may generate a resonance signal of a larger size. That is, in an area where the user's hand is located or is expected to be located, the touch sensing unit 260 of the present embodiment provides a driving signal having a phase different from that of the area where the stylus pen 10 is located, in order to generate the above effect.

In another embodiment, in the third mode, the first driving signal is applied to an area within the touch sensor 261 excluding the position of a first object, and the driving signal is not applied to an area within the touch sensor 261 corresponding to the position of the first object. The touch electrode to which the driving signal is not applied may be grounded or floated.

That is, at least one of the first driving/receiving unit 2620, the second driving/receiving unit 2622, and the third driving/receiving unit 2626 in the 1-2 sub-period may output the second driving signal to some of the corresponding at least one touch electrode, and may ground or float other part thereof.

For example, in the 1-2 sub-period, the first driver/receiver 2620 may apply the first driving signal to all of the first touch electrodes not located at the position of a first object among the plurality of first touch electrodes 111-1 to 111-*m*. In addition, the first driving/receiving unit 2620 does not apply a driving signal to all of the first touch electrodes not located at the position of the first object 30 among the plurality of first touch electrodes 111-1 to 111-*m*.

As another example, in the 1-2 sub-period, the second driving/receiving unit 2622 simultaneously applies to all of the second touch electrodes not located at the position of a first object among the plurality of second touch electrodes 121-1 to 121-*n*. In addition, the second driving/receiving unit 2620 does not apply the driving signal to all of the second touch electrodes located at the position of the first object among the plurality of second touch electrodes 121-1 to 121-*n*.

As another example, in the 1-2 sub-period, the first driving/receiving unit 2620 and the second driving/receiving unit 2622 simultaneously apply the first driving signal to all of the first touch electrodes not located at the position of a first object among the plurality of first touch electrodes

111-1 to 111-*m*, and applies the first driving signal to all of the second touch electrodes not located at the position of the first object among the plurality of second touch electrodes 121-1 to 121-*n*. In addition, the first driving/receiving unit 2620 and the second driving/receiving unit 2622 does not apply the driving signal to all of the first electrodes located at the position of the first object 30 among the plurality of first touch electrodes 111-1 to 111-*m*, and does not apply the driving signal to all of the second touch electrodes located at the position of the first object among the plurality of second touch electrodes 121-1 to 121-*n*.

As another example, in the 1-2 sub-period, the third driving/receiving unit 2626 simultaneously applies to all of third touch electrodes not located at the position of the first object among the plurality of third touch electrodes 131-11 to 131-*ab*. In addition, the third driving/receiving unit 2626 does not apply a driving signal to all of the third touch electrodes located at the position of the first object among the plurality of third touch electrodes 131-11 to 131-*ab*.

As another example, in the 1-1 sub-period, the first driving/receiving unit 2620, the second driving/receiving unit 2622, and the third driving/receiving unit 2626 simultaneously apply the first driving signal to all of the first touch electrodes not located at the position of the first object among the plurality of first touch electrodes 111-1 to 111-*m*, apply the first driving signal to all of the second touch electrodes not located at the position of the first object among the plurality of second touch electrodes 121-1 to 121-*n*, and apply the driving signal to all of the third touch electrodes not located at the position of the first object among the plurality of third touch electrodes 131-11 to 131-*ab*. In addition, the first driving/receiving unit 2620 and the second driving/receiving unit 2622 do not apply the driving signal to all of the first touch electrodes located at the position of the first object among the plurality of first touch electrodes 111-1 to 111-*m*, do not apply the driving signal to all of the second touch electrodes located at the position of the first object among the plurality of second touch electrodes 121-1 to 121-*n*, and do not apply the driving signal to all of the third touch electrodes located at the position of the first object among the plurality of third touch electrodes 131-11 to 131-*ab*.

In this case, since the ground 15 of the stylus pen 10 is grounded by the touch sensor 261, all of the first driving signal applied to the conductive tip 11 can be used for resonance. Specifically, since the driving signal is transmitted only to one end of the resonance circuit unit 12 of the stylus pen 10, the first driving signal may be used as it is in order to generate a response signal of the resonance circuit unit 12.

In the second sub-period 2-2 of the second period, the touch sensing unit 260 receives a sensing signal resonant based on the driving signal S20.

The resonance circuit unit 12 of the stylus pen 10 resonates with the driving signal, thereby a resonance signal may be generated and transmitted to the touch sensor 261 through the conductive tip 11.

For example, the first driving/receiving unit 2620 receives the sensing signal transmitted from the plurality of first touch electrodes 111-1 to 111-*m*, and the second driving/receiving unit 2622 receives the sensing signal transmitted from the plurality of second touch electrodes 121-1 to 121-*n*. The first driving/receiving unit 2620 and the second driving/receiving unit 2622 may process the received sensing signal and transmit it to the control unit 2624.

As another example, the third driving/receiving unit 2626 receives sensing signals transmitted from the plurality of third touch electrodes 131-11 to 131-*ab*. The third driving/receiving unit 2626 may process the received sensing signal and transmit it to the control unit 2624.

The control unit 2624 may acquire touch coordinate information of a point where a touch by the stylus pen 10 occurs based on the sensing signal obtained in the sub-period 2-2.

In addition, the control unit 2624 may calculate the touch area based on the sensing signal obtained in the sub-period 2-2.

Figure 150:
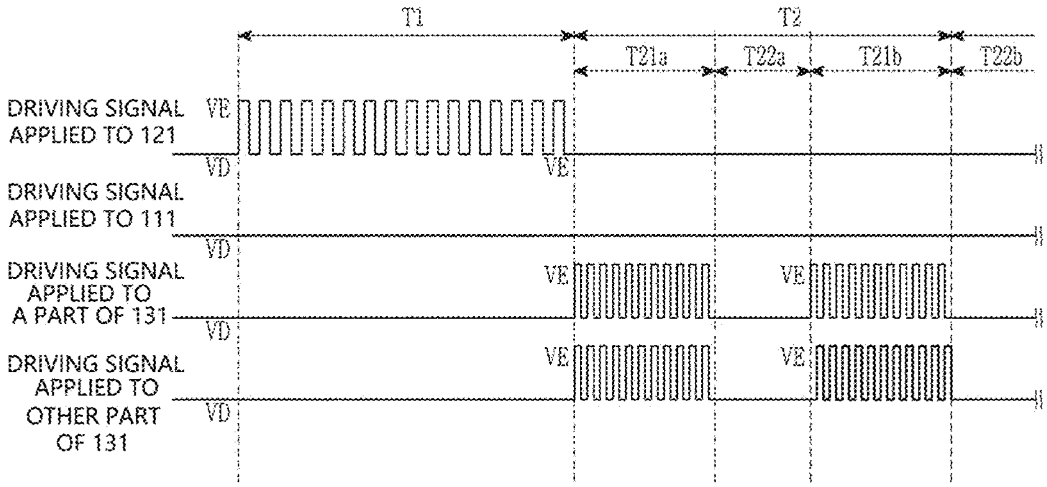
FIG. 150 is a waveform diagram illustrating a first example of a driving signal according to a method of controlling a touch device.
Figure 151:
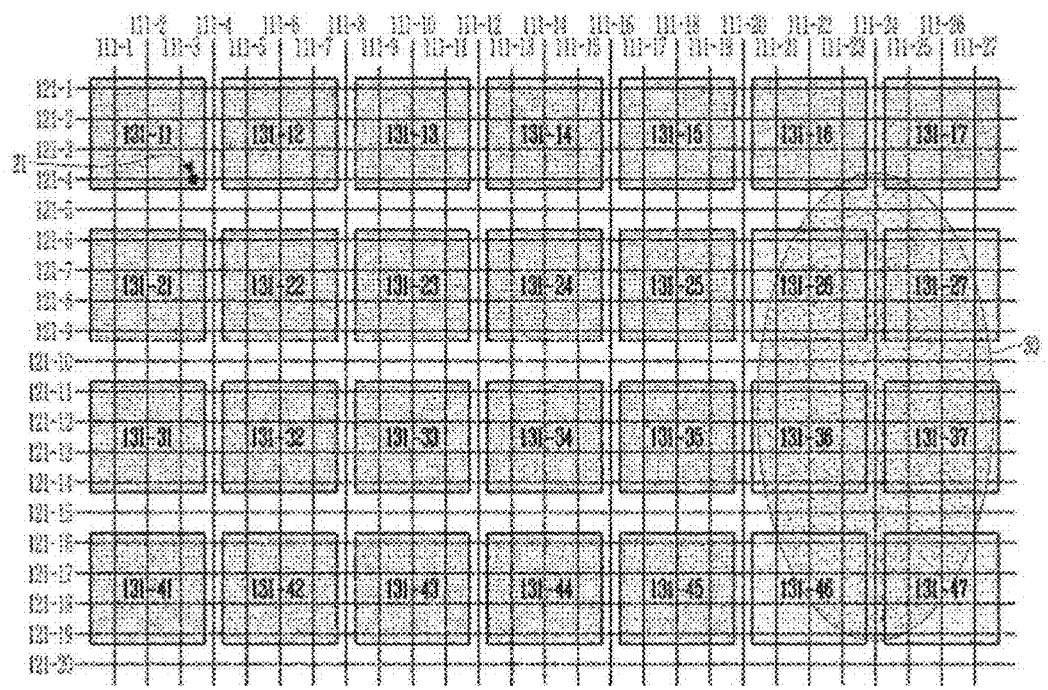
FIGS. 151 to 153 are diagrams illustrating examples to which the driving signal of FIG. 150 is applied.
Figure 152:
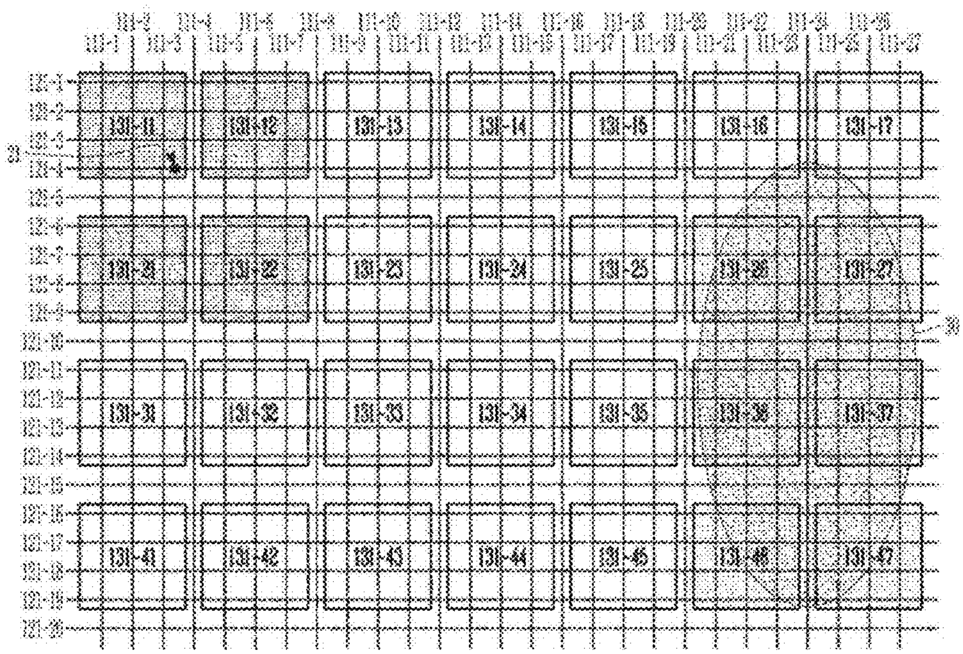
Figure 153:
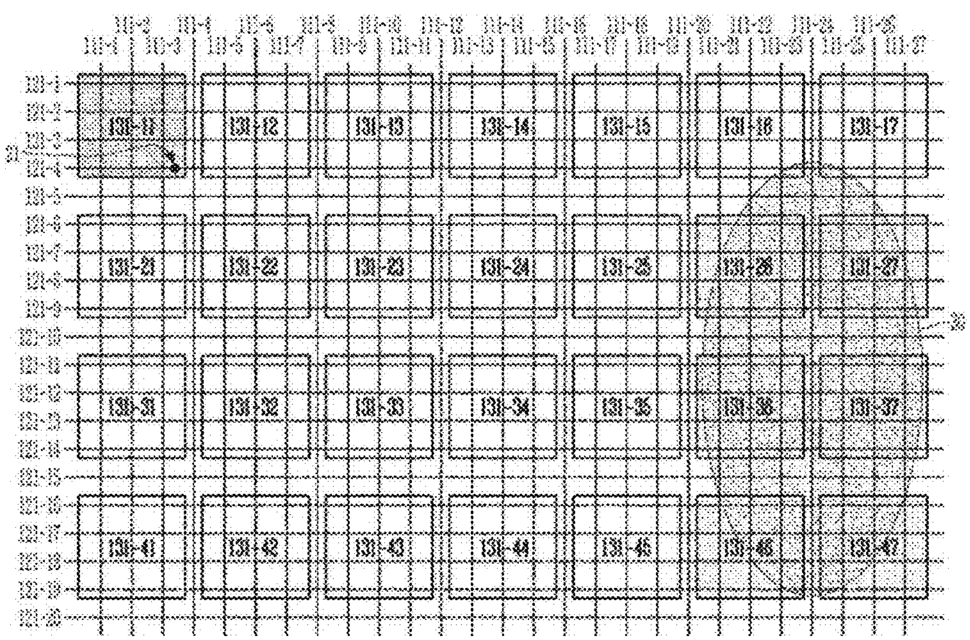

FIG. 150 is a waveform diagram illustrating a first example of a driving signal according to a control method of a touch device, and FIGS. 151 to 153 are diagrams illustrating examples to which the driving signal in FIG. 150 is applied.

Referring to FIG. 150, in a first period T1, the touch sensing unit 260 may output a driving signal to at least one type of a plurality of first touch electrodes 111-1 to 111-*m* and a plurality of second touch electrodes 121-1 to 121-*n*. When the first driving/receiving unit 2620 outputs a driving signal to the plurality of first touch electrodes 111-1 to 111-*m*, the second driving/receiving unit 2622 may receive a sensing signal from the plurality of second touch electrodes 121-1 to 121-*n*. The control unit 2624 may acquire touch coordinate information based on the signal level of the sensing signal.

Although not shown, the touch sensing unit 260 may output a driving signal to the plurality of third touch electrodes 131-11 to 131-*ab*. The third driving/receiving unit 2626 may output a driving signal to the plurality of third touch electrodes 131-11 to 131-*ab*, and may receive a sensing signal from the plurality of third touch electrodes 131-11 to 131-*ab*.

In the 1-1 sub-period T21*a* within the second period T2, the third driving/receiving unit 2626 applies the first driving signal to all of the plurality of third touch electrodes 131-11 to 131-*ab*.

In the 1-1 sub-period T21*a*, the frequency of the first driving signal applied to the plurality of third touch electrodes 131-11 to 131-*ab* corresponds to the resonance frequency of the stylus pen 10.

On the other hand, in the first period T1, the frequency of the driving signal output to the plurality of first touch electrodes 111-1 to 111-*m* is set to be different from the resonance frequency of the stylus pen 10.

In the 2-1 sub-period T22*a* within the second period T2, the first driving/receiving unit 2620 receives a sensing signal from the plurality of first touch electrodes 111-1 to 111-*m*, and the second driving/receiving unit 2622 may receive a sensing signal from the plurality of second touch electrodes 121-1 to 121-*n*. In addition, the third driving/receiving unit 2626 may receive a sensing signal from the plurality of third touch electrodes 131-11 to 131-*ab*.

Even in the 2-1 sub-period T22*a* where the driving signal application is finished, the resonance signal output by the resonance circuit unit 23 of the stylus pen 10 may be received by at least one of the plurality of first touch electrodes 111-1 to 111-*m*, the plurality of second touch electrodes 121-1 to 121-*n*, and the plurality of third touch electrodes 131-11 to 131-*ab*.

The control unit 2624 determines whether there is a touch input by the stylus pen 10 from the received sensing signal.

When there is a touch input by the stylus pen 10, if the distance between the point where a touch of the stylus pen 10 occurs and the position of the first object 30 exceeds a predetermined threshold value, in the 1-2 sub-period T21*b* within the second period T2, the third driving/receiving unit

2626 applies the first driving signal at least one of the third touch electrodes not located at the position of the first object among the plurality of third touch electrodes 131-11 to 131-*ab*. The third driving/receiving unit 2626 applies the second driving signal to all of the third touch electrodes located at the position of the first object among the plurality of third touch electrodes 131-11 to 131-*ab*.

Alternatively, in the 1-2 sub-period T21*b* within the second period T2, the third driver/receiving unit 2626 applies the first driving signal to at least one of the third touch electrodes not located at the position of the first object among the plurality of third touch electrodes 131-11 to 131-*ab*. The third driving/receiving unit 2626 does not apply the driving signal to all of the third touch electrodes located at the position of the first object among the plurality of third touch electrodes 131-11 to 131-*ab*.

In the 2-2 sub-period T22*b* within the second period T2, the first driving/receiving unit 2620 may receive the sensing signal from the plurality of first touch electrodes 111-1 to 111-*m*, and the second driving/receiving unit 2622 may receive the sensing signal from the plurality of second touch electrodes 121-1 to 121-*n*. In addition, the third driving/receiving unit 2626 may receive the sensing signal from the plurality of third touch electrodes 131-1I to 131-*ab*.

The second period T2 includes a plurality of first sub-periods T11*a*, T12*b* and second sub-periods T21*a*, T22*b*. For example, in the second period T2, the combination of the first sub-periods T21*a*, T21*b* and the second sub-periods T22*a*, T22*b* may be repeated eight times.

Although it has been described above that the second period T2 exists after the first period T1, the first period T1 may exist after the second period T2. The time lengths of the first period T1 and the second period T2 may be changed within several frames. The driving method of the touch sensing unit 260 according to the embodiment is not limited thereto.

In addition, although it has been described above that in the second period T2, the 1-2 sub-period T21*b* and the 2-2 sub-period T22*b* are present after the 1-1 sub-period T21*a* and the 2-1 sub-period T21*a*, their order may be changed and is not limited to the above description.

Referring to FIG. 151, in the 1-2 sub-section T21*b*, the third driver/receiver 2626 applies the first driving signal to all of the third touch electrodes 131-11 to 131-25, 131-31 to 131-35, 131-41 to 131-45 not located at the position of the first object 30 among the plurality of third touch electrodes 131-11 to 131-*ab*. The third driving/receiving unit 2626 applies the second driving signal to all of the third touch electrodes 131-26, 131-27, 131-36, 131-37, 131-46, 131-47 located at the position of the first object 30 among the plurality of third touch electrodes 131-11 to 131-*ab*.

Referring to FIG. 152, in the 1-2 sub-section T21*b*, the third driving/receiving unit 2626 applies the first driving signal to all of the third touch electrodes 131-11, 131-12, 131-21, 131-22 adjacent to the point where a touch of the stylus pen 10 occurs (in fact, the point where the conductive tip 11 is positioned) among the third touch electrodes 131-11 to 131-25, 131-31 to 131-35, 131-41 to 131-45 not located to the position of the first object 30 among the plurality of third touch electrodes 131-11 to 131-*ab*. The third driving/receiving unit 2626 applies the second driving signal to all of the plurality of third touch electrodes 131-26, 131-27, 131-36, 131-37, 131-46, 131-47 located at the position of the first object 30 among the plurality of third touch electrodes 131-11 to 131-*ab*.

Referring to FIG. 153, in the 1-2 sub-section T21*b*, the third driving/receiving unit 2626 applies the first driving signal only to the third touch electrode 131-11 at the point where a touch of the stylus pen 10 occurs (in fact, the point where the conductive tip 11 is positioned) among the third touch electrodes 131-11 to 131-25, 131-31 to 131-35, 131-41 to 131-45 not located to the position of the first object 30 among the plurality of third touch electrodes 131-11 to 131-*ab*. The third driving/receiving unit 2626 applies the second driving signal to all of the plurality of third touch electrodes 131-26, 131-27, 131-36, 131-37, 131-46, 131-47 located at the position of the first object 30 among the plurality of third touch electrodes 131-11 to 131-*ab*.

Figure 154:
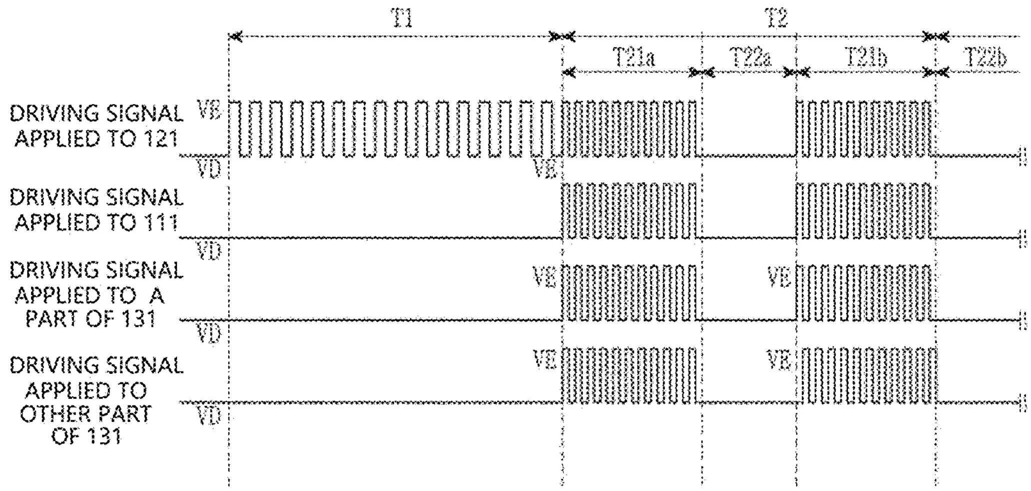
FIG. 154 is a waveform diagram illustrating a second example of a driving signal according to a control method of a touch sensing unit.
Figure 155:
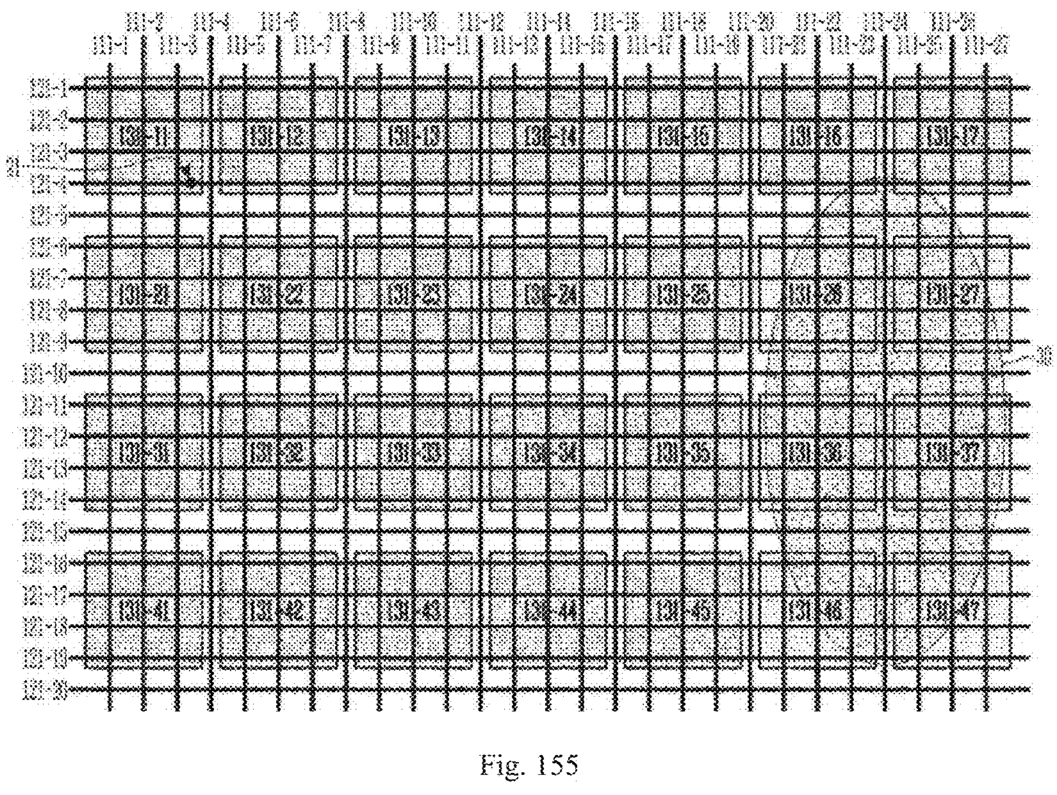
FIGS. 155 to 157 are diagrams illustrating examples to which the driving signal of FIG. 154 is applied.
Figure 156:
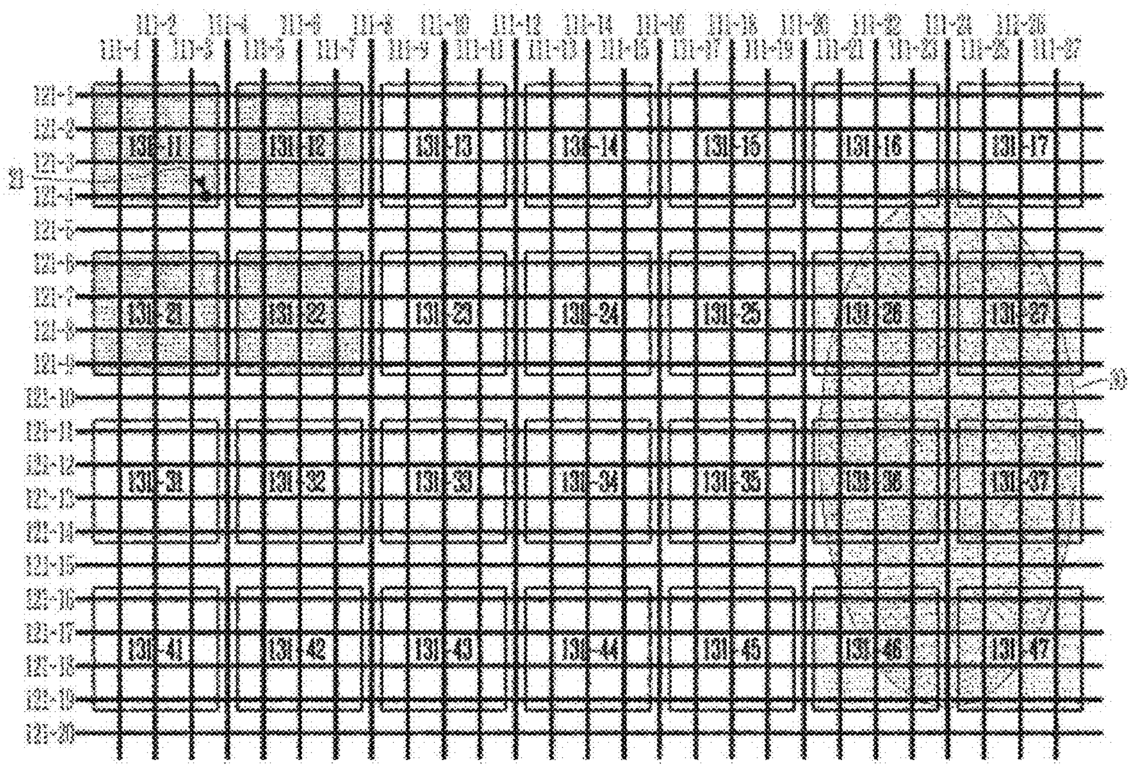
Figure 157:
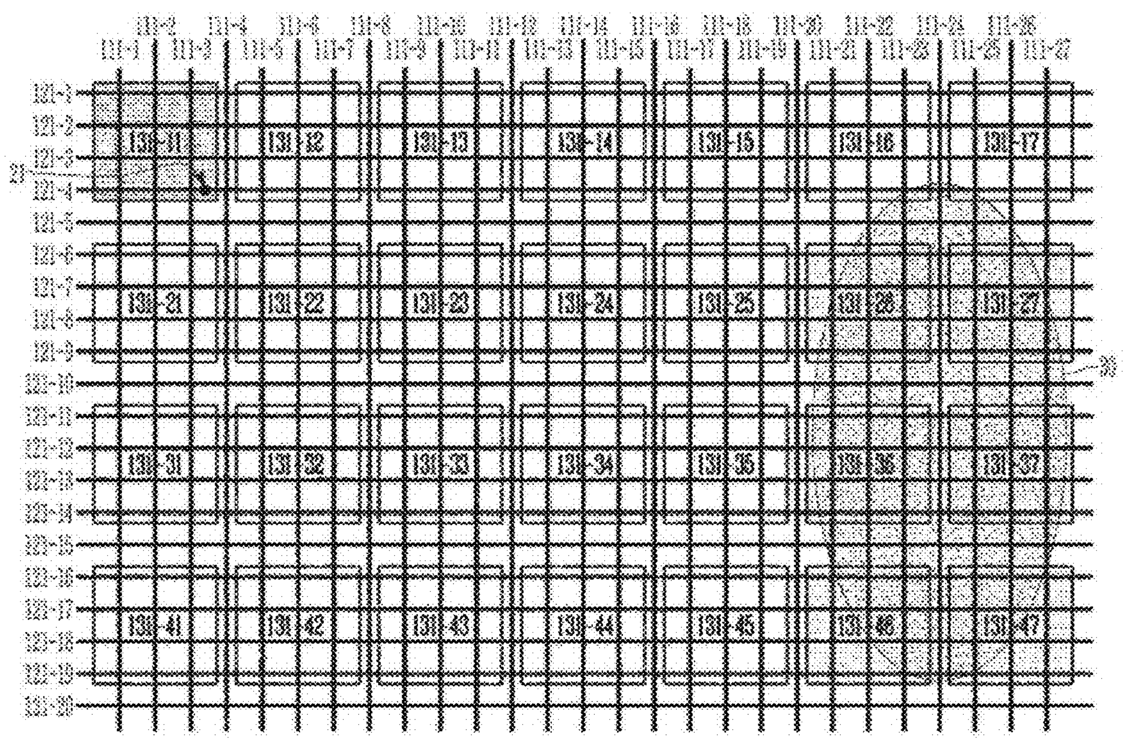

FIG. 154 is a waveform diagram illustrating a second example of a driving signal according to a control method of the touch sensing unit, and FIGS. 155 to 157 are diagrams illustrating examples to which the driving signal in FIG. 154 is applied.

Referring to FIG. 154, in a first period T1, the touch sensing unit 260 may output a driving signal to at least one type of a plurality of first touch electrodes 111-1 to 111-*m* and a plurality of second touch electrodes 121-1 to 121-*n*. When the first driving/receiving unit 2620 outputs a driving signal to the plurality of first touch electrodes 111-1 to 111-*m*, the second driving/receiving unit 2622 may receive a detection signal from the plurality of second touch electrodes 121-1 to 121-*n*. The control unit 2624 may acquire touch coordinate information based on the signal level of the sensing signal. Although not shown, the touch sensing unit 260 may output a driving signal to the plurality of third touch electrodes 131-11 to 131-*ab*. The third driving/receiving unit 2626 may output a driving signal to the plurality of third touch electrodes 131-11 to 131-*ab*, and may receive a sensing signal from the plurality of third touch electrodes 131-11 to 131-*ab*.

In the 1-1 sub-period T21*a* within the second period T2, the third driving/receiving unit 2626 may apply the first driving signal to all of the plurality of third touch electrodes 131-11 to 131-*ab*. In addition, the first driving/receiving unit 2620 may simultaneously apply the first driving signal to the plurality of first touch electrodes 111-1 to 111-*m*, and the second driving/receiving unit 2622 may simultaneously apply the first driving signal to the plurality of second touches 121-1 to 121-*n*.

In the 2-1 th sub-period T22*a* within the second period T2, the first driving/receiving unit 2620 may receive the sensing signal from the plurality of first touch electrodes 111-1 to 111-*m*, and the second driving/receiving unit 2622 may receive the sensing signal from the plurality of second touch electrodes 121-1 to 121-*n*. In addition, the third driving/receiving unit 2626 may receive the sensing signal from the plurality of third touch electrodes 131-1I to 131-*ab*.

The control unit 2624 determines whether there is a touch input by the stylus pen 10 from the received sensing signal.

If there is a touch input by the stylus pen 10, when the distance between the point where a touch of the stylus pen 10 occurs and the position of the first object 30 exceeds a predetermined threshold value, in the 1-2 sub-period T21*b* within the second period T2, the third driving/receiving unit 2626 applies the second driving signal to all of the third touch electrodes located at the position of the first object among the plurality of third touch electrodes 131-11 to 131-*ab*. In addition, the first driving/receiving unit 2626 simultaneously applies the first driving signal to the plurality of first touch electrodes 111-1 to 111-*m*, and the second driving/receiving unit 2622 simultaneously applies the first driving signal to the plurality of second touches 121-1 to 121-*n*.

Alternatively, in the 1-2 sub-period T21*b* within the second period T2, the third driver/receiver 2626 applies the first driving signal to at least one of the third touch electrodes not located at the position of the first object among the plurality of third touch electrodes 131-11 to 131-*ab*. The third driving/receiving unit 2626 does not apply a driving signal to all of the third touch electrodes located at the position of the first object among the plurality of third touch electrodes 131-11 to 131-*ab*. In addition, the first driving/receiving unit 2620 simultaneously applies the first driving signal to the plurality of first touch electrodes 111-1 to 111-*m*, and the second driving/receiving unit 2622 simultaneously applies the first driving signal to the plurality of second touch electrodes 121-1 to 121-*n*.

In the second-second sub-period T22*b* within the second period T2, the first driving/receiving unit 2620 may receive the sensing signal from the plurality of first touch electrodes 111-1 to 111-*m*, and the second driving/receiving unit 2622 may receive the sensing signal from the plurality of second touch electrodes 121-1 to 121-*n*. In addition, the third driving/receiving unit 2626 may receive the sensing signal from the plurality of third touch electrodes 131-11 to 131-*ab*.

The second period T2 includes a plurality of first sub-periods T11*a*, T12*b* and second sub-periods T21*a*, T22*b*. For example, in the second period T2, the combination of the first sub-periods T21*a*, T21*b* and the second sub-periods T22*a*, T22*b* may be repeated eight times.

Although it has been described above that the second period T2 exists after the first period T1, the first period T1 may exist after the second period T2. The time lengths of the first period T1 and the second period T2 may be changed within several frames. The driving method of the touch sensing unit 260 according to the embodiment is not limited thereto.

In addition, although it has been described above that in the second period T2, the 1-2 sub-period T21*b* and the 2-2 sub-period T22*b* are present after the 1-1 sub-period T21*a* and the 2-1 sub-period T21*a*, their order may be changed and is not limited to the above description.

Referring to FIG. 155, in the 1-2 sub-period T21*b*, the third driver/receiver 2626 applies the first driving signal to all of the third touch electrodes 131-11 to 131-25, 131-31 to 131-35, 131-41 to 131-45 not located at the position of the first object 30 among the plurality of third touch electrodes 131-11 to 131-*ab*. The third driving/receiving unit 2626 applies the second driving signal to all of the third touch electrodes 131-26, 131-27, 131-36, 131-37, 131-46, 131-47 located at the position of the first object 30 among the plurality of third touch electrodes 131-11 to 131-*ab*.

In addition, the first driving/receiving unit 2620 may simultaneously apply the first driving signal to the plurality of first touch electrodes 111-1 to 111-27, and the second driving/receiving unit 2622 may simultaneously apply the first driving signal to the plurality of second touch electrodes 121-1 to 121-19.

Referring to FIG. 156, in the 1-2 sub-period T21*b*, the third driving/receiving unit 2626 applies the first driving signal to all of the third touch electrodes 131-11, 131-12, 131-21, 131-22 adjacent to the point where a touch of the stylus pen 10 occurs (in fact, the point where the conductive tip 11 is positioned) among the third touch electrodes 131-11 to 131-25, 131-31 to 131-35, 131-41 to 131-45 not located at the position of the first object 30 among the plurality of third touch electrodes 131-11 to 131-*ab*. The third driving/receiving unit 2626 applies the second driving signal to all of the third touch electrodes 131-26, 131-27, 131-36, 131-37, 131-46, 131-47 located at the position of the first object 30 among the plurality of third touch electrodes 131-11 to 131-*ab*.

In addition, the first driving/receiving unit 2620 simultaneously may simultaneously apply the first driving signal to the plurality of first touch electrodes 111-1 to 111-27, and the second driving/receiving unit 2622 may simultaneously apply the first driving signal to the the plurality of second touch electrodes 121-1 to 121-19.

Referring to FIG. 157, in the 1-2 sub-period T21*b*, the third driving/receiving unit 2626 applies the first driving signal only to the third touch electrode 131-11 at the point where a touch of the stylus pen 10 occurs among the third touch electrodes 131-11 to 131-25, 131-31 to 131-35, 131-41 to 131-45 not located at the position of the first object 30 among the plurality of third touch electrodes 131-11 to 131-*ab*. The third driving/receiving unit 2626 applies the second driving signal to all of the third touch electrodes 131-26, 131-27, 131-36, 131-37, 131-46, 131-47 located at the position of the first object 30 among the plurality of third touch electrodes 131-11 to 131-*ab*. In addition, the first driving/receiving unit 2620 may simultaneously apply the first driving signal to the plurality of first touch electrodes 111-1 to 111-27, and the second driving/receiving unit 2622 may simultaneously apply the first driving signal to the plurality of second touch electrodes 121-1 to 121-19.

Figure 158:
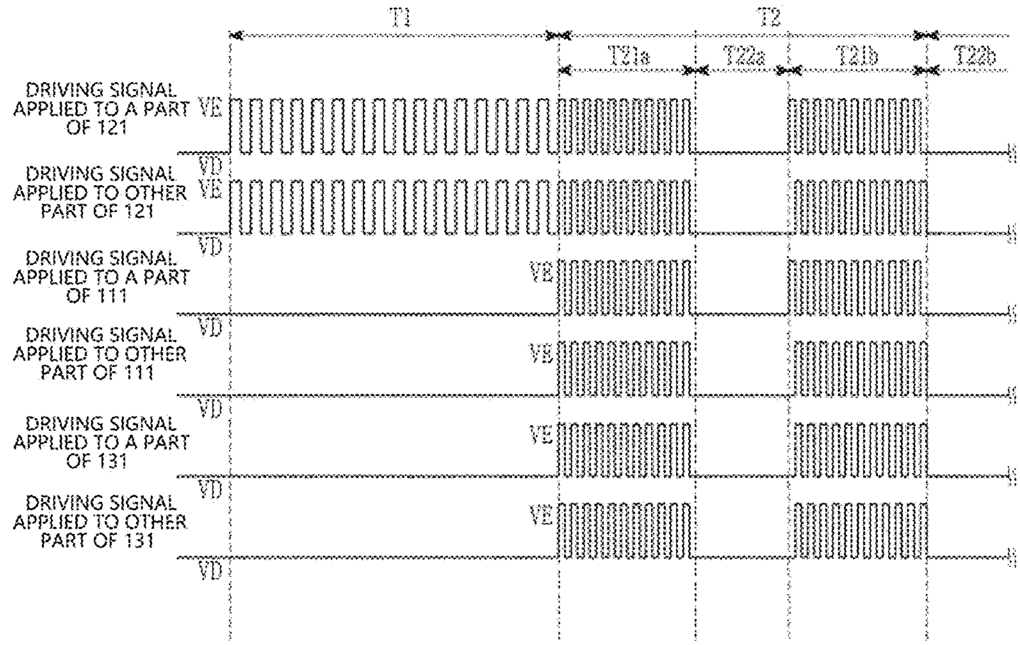
FIG. 158 is a waveform diagram illustrating a third example of a driving signal according to a method of controlling a touch device.

FIG. 158 is a waveform diagram illustrating a third example of a driving signal according to a control method of a touch device, and FIGS. 159 to 162 are diagrams illustrating examples to which the driving signal in FIG. 158 is applied.

Referring to FIG. 158, in a first period T1, the touch sensing unit 260 may apply the driving signal to at least one type of a plurality of first touch electrodes 111-1 to 111-*m* and a plurality of second touch electrodes 121-1 to 121-*n*. When the first driving/receiving unit 2620 outputs the driving signal to the plurality of first touch electrodes 111-1 to 111-*m*, the second driving/receiving unit 2622 may receive the sensing signal from the plurality of second touch electrodes 121-1 to 121-*n*. The control unit 2624 may acquire touch coordinate information based on the signal level of the sensing signal. Although not shown, the touch sensing unit 260 may output the driving signal to the plurality of third touch electrodes 131-11 to 131-*ab*. The third driving/receiving unit 2626 may output the driving signal to the plurality of third touch electrodes 131-11 to 131-*ab* and may receive the sensing signal from the plurality of third touch electrodes 131-11 to 131-*ab*.

In the 1-1 sub-period T21*a* within the second period T2, the third driving/receiving unit 2626 may apply the first driving signal to all of the plurality of third touch electrodes 131-11 to 131-*ab*. In addition, the first driving/receiving unit 2620 may simultaneously apply the first driving signal to the plurality of first touch electrodes 111-1 to 111-*m*, and the second driving/receiving unit 2622 may simultaneously apply the first driving signal to the plurality of second touch electrodes 121-1 to 121-*n*.

In the 2-1 th sub-period T22*a* within the second period T2, the first driving/receiving unit 2620 may receive the sensing signal from the plurality of first touch electrodes 111-1 to 111-*m*, and the second driving/receiving unit 2622 may receive the sensing signal from the plurality of second touch electrodes 121-1 to 121-*n*. In addition, the third driving/receiving unit 2626 may receive the sensing signal from the plurality of third touch electrodes 131-1I to 131-*ab*.

The control unit 2624 determines whether there is a touch input by the stylus pen 10 from the received sensing signal.

If there is a touch input by the stylus pen 10, when the distance between the point where a touch of the stylus pen 10 occurs and the position of the first object 30 exceeds a predetermined threshold value, in the 1-2 sub-period T21*b* within the second period T2, the third driving/receiving unit 2626 applies the second driving signal to all of the third touch electrodes located at the position of the first object among the plurality of third touch electrodes 131-11 to 131-*ab*. The third driving/receiving unit 2626 applies the first driving signal to at least one of a plurality of third touch electrodes 131-11 to 131-*ab* not located at the position of the first object. In addition, the first driving/receiving unit 2620 simultaneously applies the second driving signal to all of the first touch electrodes located at the position of the first object 30 among the plurality of first touch electrodes 111-1 to 111-*m*, and the second driving/receiving unit 2622 simultaneously applies the second driving signal to all of the second touch electrodes located at the position of the first object among the plurality of second touch electrodes 121-1 to 121-*n*. The first driving/receiving unit 2620 simultaneously applies the first driving signal to at least one of the first touch electrodes not located at the position of the first object among the plurality of first touch electrodes 111-1 to 111-*m*, and the second driving/receiving unit 2622 simultaneously applies the first driving signal to at least one of the second touch electrodes not located at the position of the first object among the plurality of second touch electrodes 121-1 to 121-*n*.

Alternatively, in the 1-2 sub-period T21*b* within the second period T2, the third driver/receiver 2626 applies the first driving signal to at least one of the third touch electrodes not located at the position of the first object among the plurality of third touch electrodes 131-11 to 131-*ab*. The third driving/receiving unit 2626 does not apply a driving signal to all of the third touch electrodes located at the position of the first object among the plurality of third touch electrodes 131-11 to 131-*ab*. In addition, the first driving/receiving unit 2620 simultaneously applies the second driving signal to all of the second touch electrodes located at the position of the first object 30 among the plurality of first touch electrodes 111-1 to 111-*m*, and the second driving/receiving unit 2622 simultaneously applies the second driving signal to all of the second touch electrodes located at the position of the first object among the plurality of second touch electrodes 121-1 to 121-*n*. The first driving/receiving unit 2620 does not apply a driving signal to at least one of the first touch electrodes not located at the position of the first object among the plurality of first touch electrodes 111-1 to 111-*m*, and the second driving/receiving unit 2622 does not apply a driving signal to at least one of a plurality of second touch electrodes not located at the position of the first object among the plurality of second touch electrodes 121-1 to 121-*n*.

In the 2-2 sub-period T22*b* within the second period T2, the first driving/receiving unit 2620 may receive the sensing signal from the plurality of first touch electrodes 111-1 to 111-*m*, and the second driving/receiving unit 2622 may receive the sensing signal from the plurality of second touch electrodes 121-1 to 121-*n*. In addition, the third driving/receiving unit 2626 may receive the sensing signal from the plurality of third touch electrodes 131-1I to 131-*ab*.

The second period T2 includes a plurality of first sub-periods T11*a*, T12*b* and second sub-periods T21*a*, T22*b*. For example, in the second period T2, the combination of the first sub-periods T21*a*, T21*b* and the second sub-periods T22*a*, T22*b* may be repeated eight times.

Although it has been described above that the second period T2 exists after the first period T1, the first period T1 may exist after the second period T2. The time lengths of the first period T1 and the second period T2 may be changed within several frames, and the driving method of the touch sensing unit 260 according to the embodiment is not limited thereto.

In addition, although it has been described above that in the second period T2, the 1-2 sub-period T21*b* and the 2-2 sub-period T22*b* are present after the 1-1 sub-period T21*a* and the 2-1 sub-period T21*a*, their order may be changed and is not limited to the above description.

Figure 159:
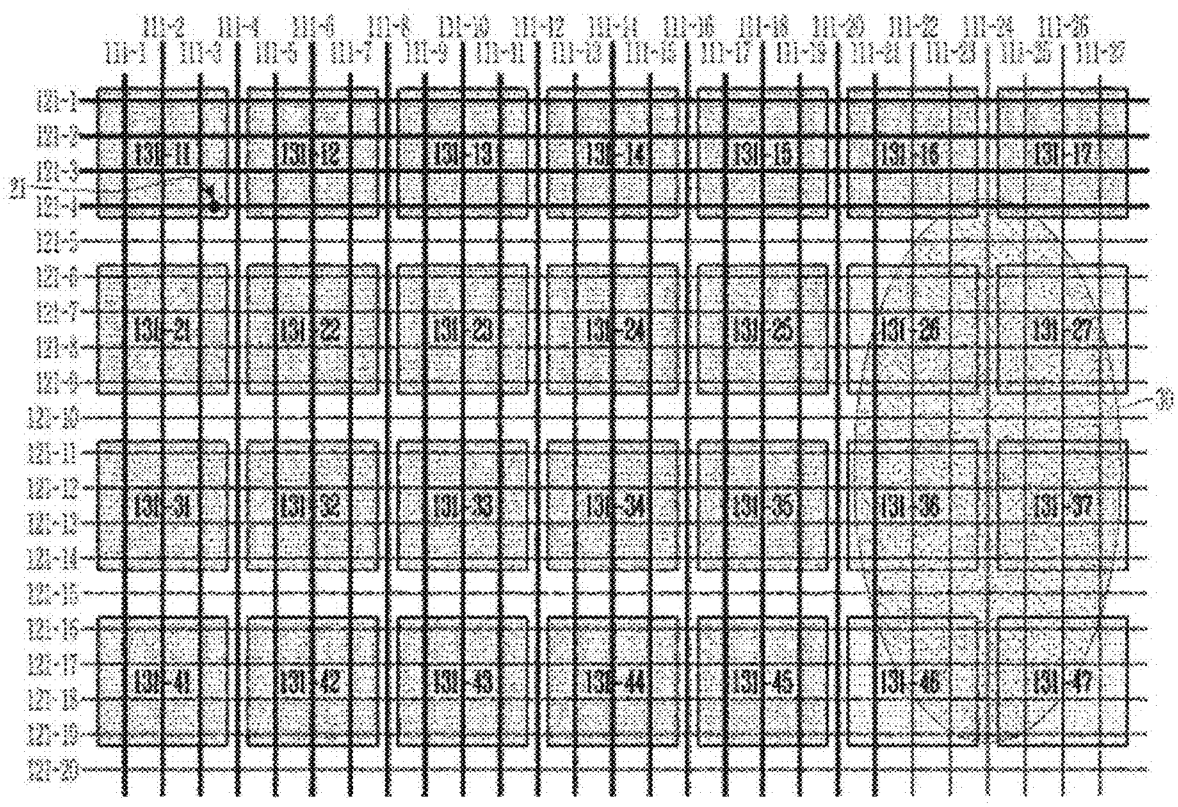
FIGS. 159 to 162 are diagrams illustrating examples to which the driving signal of FIG. 158 is applied.

Referring to FIG. 159, in the 1-2 sub-period T21*b*, the third driving/receiving unit 2626 applies the first driving signal to all of the third touch electrodes 131-11 to 131-25, 131-31 to 131-35, 131-41 to 131-45 not located at the position of the first object 30 among the plurality of third touch electrodes 131-11 to 131-*ab*. The third driving/receiving unit 2626 applies the second driving signal to all of the third touch electrodes 131-26, 131-27, 131-36, 131-37, 131-46, 131-47 located at the position of the first object 30 among the plurality of third touch electrodes 131-11 to 131-*ab*. In addition, the first driver/receiver 2620 simultaneously applies the second driving signal to all of the first touch electrodes 111-22 to 111-27 located at the position of the first object among the plurality of first touch electrodes 111-1 to 111-*m*, and the second driving/receiving unit 2622 simultaneously applies the second driving signal to all of the second touch electrodes 121-5 to 121-19 located at the position of the first object among the plurality of second touch electrodes 121-1 to 121-*n*. The first driving/receiving unit 2620 simultaneously applies the first driving signal to at least one of the first touch electrodes 111-1 to 111-21 not located at the position of the first object among the plurality of first touch electrodes 111-1 to 111-*m*, and the second driving/receiving unit 2622 simultaneously applies the first driving signal to at least one of second touch electrodes 121-1 to 121-4 not located at the position of the first object among a plurality of second touch electrodes 121-1 to 121-*n*.

Figure 160:
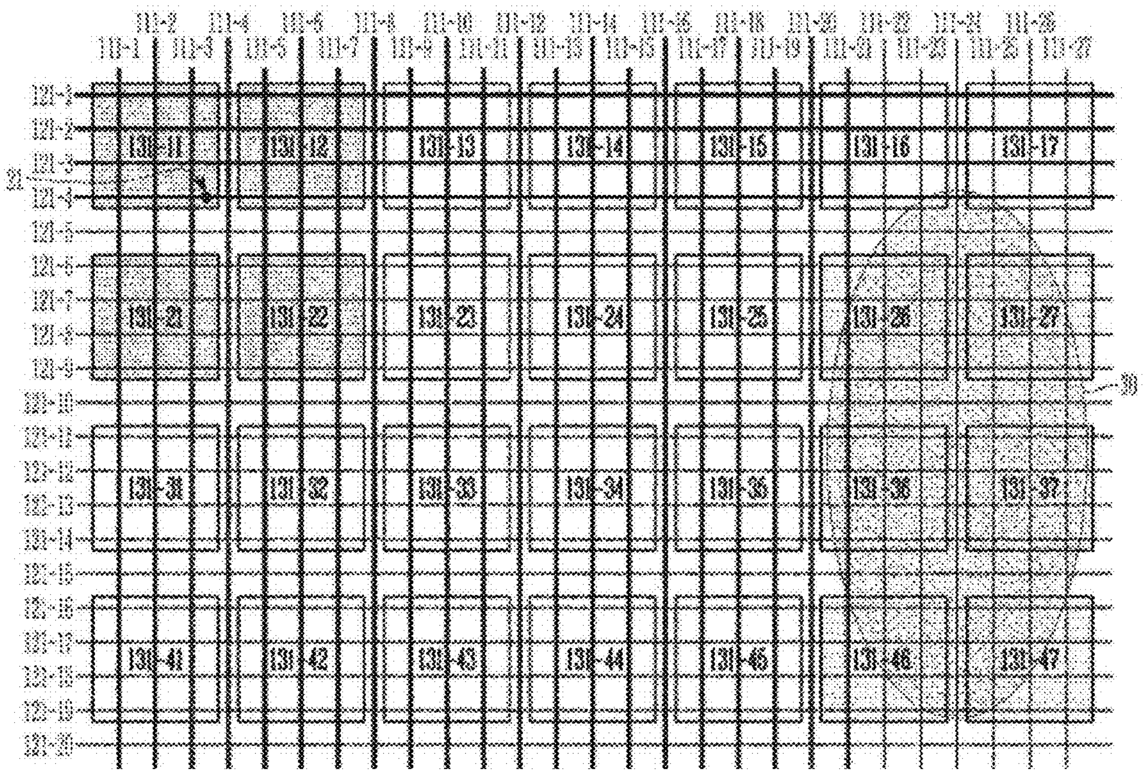

Referring to FIG. 160, in the 1-2 sub-period T21*b*, the third driving/receiving unit 2626 applies the first driving signal to all of the third touch electrodes 131-11, 131-12, 131-21, 131-22 adjacent to the point where a touch of the stylus pen 10 occurs (in fact, the point where the conductive tip 11 is positioned) among the third touch electrodes 131-11 to 131-25, 131-31 to 131-35, 131-41 to 131-45 not located at the position of the first object 30 among the plurality of third touch electrodes 131-11 to 131-*ab*. The third driving/receiving unit 2626 applies the second driving signal to all of the third touch electrodes 131-26, 131-27, 131-36, 131-37, 131-46, 131-47 located at the position of the first object 30 among the plurality of third touch electrodes 131-11 to 131-*ab*. In addition, the first driver/receiver 2620 simultaneously applies the second driving signal to all of the first touch electrodes 111-22 to 111-27 located at the position of the first object among the plurality of first touch electrodes 111-1 to 111-*m*, and the second driving/receiving unit 2622 simultaneously applies the second driving signal to all of the second touch electrodes 121-5 to 121-19 located at the position of the first object among the plurality of second touch electrodes 121-1 to 121-*n*. The first driving/receiving unit 2620 simultaneously applies the first driving signal to at least one of the first touch electrodes 111-1 to 111-21 not located at the position of the first object among the plurality of first touch electrodes 111-1 to 111-*m*, and the second driving/receiving unit 2622 simultaneously applies the first driving signal to at least one of second touch electrodes 121-1 to 121-4 not located at the position of the first object among a plurality of second touch electrodes 121-1 to 121-*n*.

Figure 161:
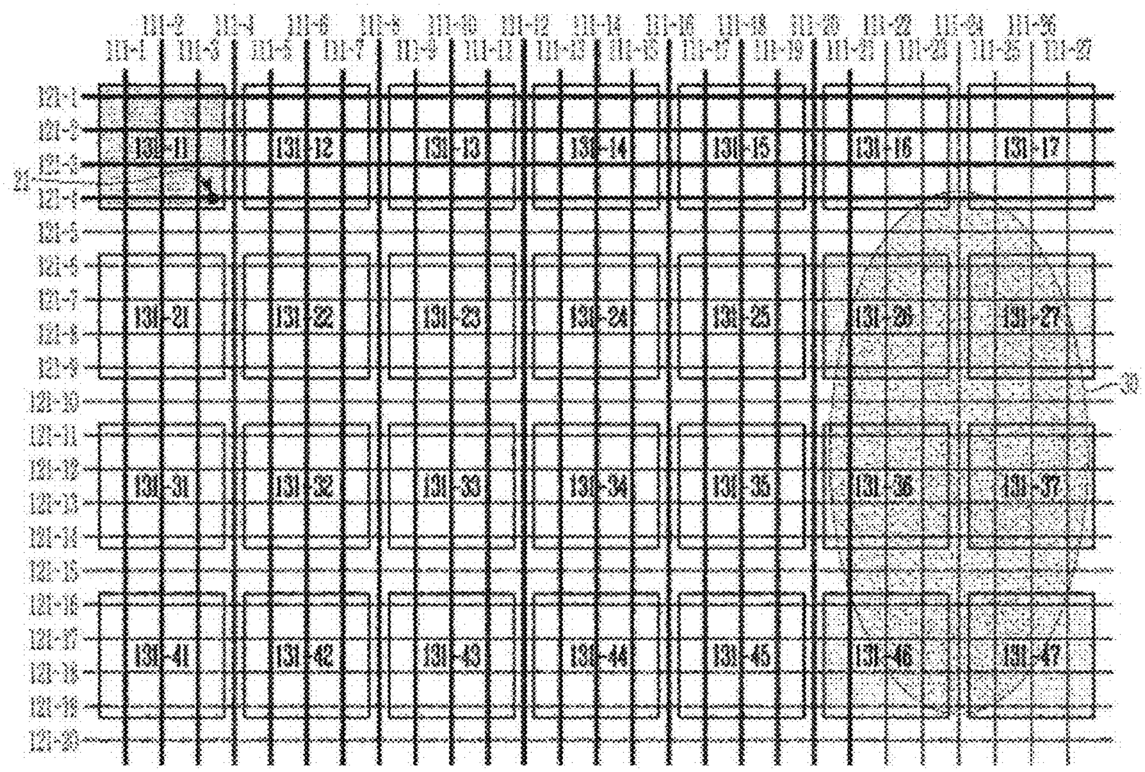

Referring to FIG. 161, in the 1-2 sub-period T21*b*, the third driving/receiving unit 2626 applies the first driving signal only to the third touch electrode 131-11 at the point where a touch of the stylus pen 10 occurs (in fact, the point where the conductive tip 21 is positioned) among the third touch electrodes 131-11 to 131-25, 131-31 to 131-35, 131-41 to 131-45 not located at the position of the first object 30 among the plurality of third touch electrodes 131-11 to 131-*ab*. The third driving/receiving unit 2626 applies the second driving signal to all of the third touch electrodes 131-26, 131-27, 131-36, 131-37, 131-46, 131-47 located at the position of the first object 30 among the plurality of third touch electrodes 131-11 to 131-*ab*. In addition, the first driver/receiver 2620 simultaneously applies the second driving signal to all of the first touch electrodes 111-22 to 111-27 located at the position of the first object among the plurality of first touch electrodes 111-1 to 111-*m*, and the second driving/receiving unit 2622 simultaneously applies the second driving signal to all of the second touch electrodes 121-5 to 121-19 located at the position of the first object among the plurality of second touch electrodes 121-1 to 121-*n*. The first driving/receiving unit 2620 simultaneously applies the first driving signal to at least one of the first touch electrodes 111-1 to 111-21 not located at the position of the first object among the plurality of first touch electrodes 111-1 to 111-*m*, and the second driving/receiving unit 2622 simultaneously applies the first driving signal to at least one of second touch electrodes 121-1 to 121-4 not located at the position of the first object among a plurality of second touch electrodes 121-1 to 121-*n*.

Figure 162:
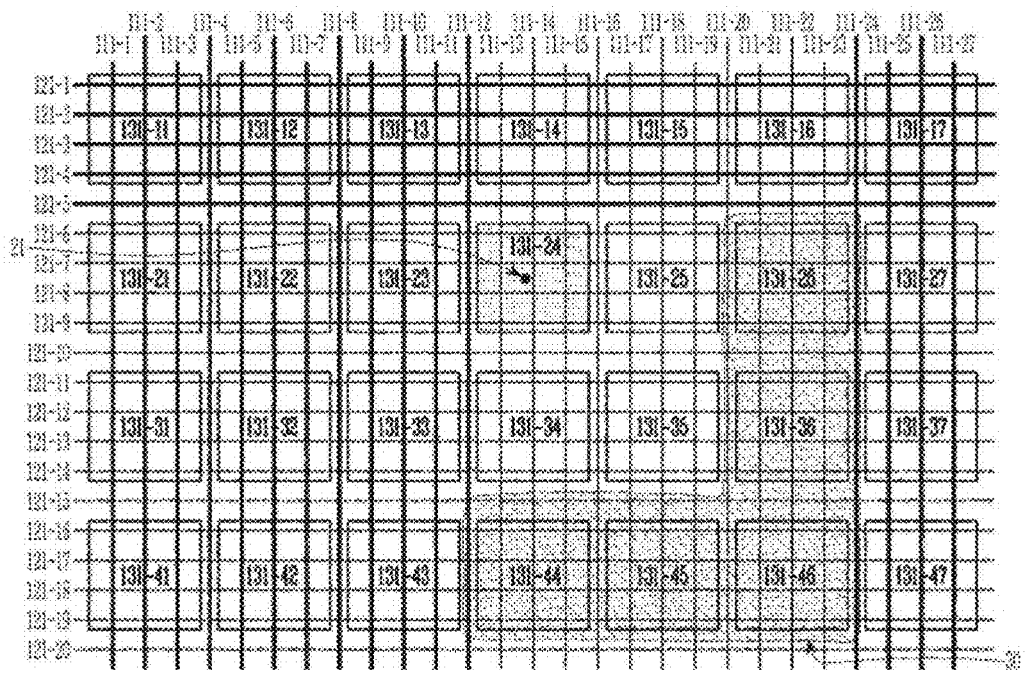

Referring to FIG. 162, in the 1-2 sub-period T21*b*, the third driving/receiving unit 2626 applies the first driving signal only to the third touch electrode 131-24 at the point where a touch of the stylus pen 10 occurs (in fact, the point where the conductive tip 11 is positioned) among the third touch electrodes 131-11 to 131-25, 131-27 to 131-35, 131-37 to 131-43, 131-47 not located at the position of the first object 30 among the plurality of third touch electrodes 131-11 to 131-*ab*. The third driving/receiving unit 2626 applies the second driving signal to all of the third touch electrodes 131-26, 131-36, 131-44, 131-45, 131-46 located at the position of the first object 30 among the plurality of third touch electrodes 131-11 to 131-*ab*. In addition, the first driver/receiver 2620 simultaneously applies the second driving signal to all of the first touch electrodes 111-13 to 111-23 located at the position of the first object among the plurality of first touch electrodes 111-1 to 111-*m*, and the second driving/receiving unit 2622 simultaneously applies the second driving signal to all of the second touch electrodes 121-6 to 121-19 located at the position of the first object among the plurality of second touch electrodes 121-1 to 121-*n*. The first driving/receiving unit 2620 simultaneously applies the second driving signal to at least one of the first touch electrodes 111-1 to 111-12, 111-24 to 111-27 not located at the position of the first object among the plurality of first touch electrodes 111-1 to 111-*m*, and the second driving/receiving unit 2622 simultaneously applies the second driving signal to at least one of second touch electrodes 121-1 to 121-5 not located at the position of the first object among a plurality of second touch electrodes 121-1 to 121-*n*.

Figure 163:
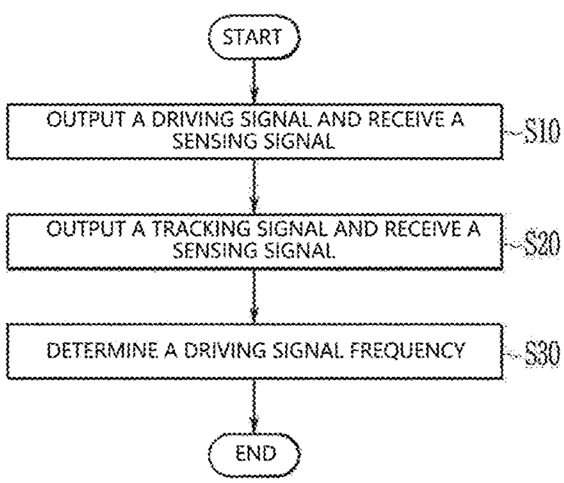
FIG. 163 is a flowchart illustrating a method of driving an electronic device according to an embodiment.

FIG. 163 is a flow chart illustrating a method of driving an electronic device according to an exemplary embodiment.

Referring to FIG. 163, the electronic device 2 outputs a driving signal and receives a sensing signal S10.

Specifically, the coil driver 263 may apply a driving signal of an AC waveform for resonating the resonance circuit 12 of the stylus pen 10 to the loop coil 264, and may receive a resonance signal resonant from the stylus pen 10 based on the driving signal as a sensing signal, or may receive an output signal of the stylus pen 10 based on the resonance signal as a sensing signal.

For example, the coil driver 263 applies a driving signal to the loop coil 264. Then, the resonance circuit unit 12 of the stylus pen 10 resonates with the driving signal, and thereby a resonance signal is generated and transmitted to the touch sensor 261 through the conductive tip 11. The touch controller 262 receives a sensing signal transmitted to the touch sensor 261. The touch controller 262 may process the received sensing signal and transmit it to the control unit 270.

The electronic device 2 outputs a tracking signal of a predetermined frequency and receives a sensing signal S20.

The coil driver 263 may apply a tracking signal to the loop coil 264, and may receive a resonance signal resonant from the stylus pen 10 based on the tracking signal as a sensing signal, or may receive an output signal of the stylus pen 10 based on the resonance signal as a sensing signal. The tracking signal may include a signal (e.g., a sine wave, a square wave, etc.) having a different frequency than that of the driving signal in the step S10, and the resonance circuit unit 12 of the stylus pen 10 may resonate with the tracking signal.

For example, the coil driver 263 applies a tracking signal to the loop coil 264. Then, the resonance circuit 12 of the stylus pen 10 resonates with the tracking signal, and thereby a resonance signal is generated and transmitted to the touch sensor 261 through the conductive tip 11. The touch controller 262 receives a sensing signal transmitted to the touch sensor 261. The touch controller 262 may process the received sensing signal and transmit it to the control unit 270.

The steps S10 and S20 may be performed continuously or discontinuously in time, and may be performed between frames or may be performed within one frame. The order of applying the driving signal and the tracking signal is not limited to the description of the present disclosure.

The electronic device 2 determines the frequency of the drive signal S30.

The electronic device 2 may determine the frequency of the driving signal based on the sensing signal received in the step S20. The electronic device 2 may determine the frequency of the driving signal by using at least one of a level, a phase, and a frequency of the sensing signal received in the step S20. That is, the electronic device 2 may determine the frequency of the driving signal by using the change in the sensing signal received in the step S20.

For example, if the level of the sensing signal received in the step S20 is greater than the level of the sensing signal received in the step S10, the electronic device 2 may determine the frequency of the driving signal closer to the frequency of the tracking signal in the step S20 than the frequency of the driving signal in the step S10.

As another example, if the phase of the sensing signal received in the step S20 has a smaller difference from the reference phase (e.g., −90°) than the phase of the sensing signal received in the step S10, the electronic device 2 may determine the frequency of the driving signal closer to the frequency of the tracking signal in the step S20 than the frequency of the driving signal in the step S10.

As another example, when the active stylus module 60 of the stylus pen 10*b* changes the frequency of a signal transmitted to the touch screen 20 according to the energy transmitted from the resonance circuit 12, if the frequency of the sensing signal received in the step S20 is higher than the frequency of the sensing signal received in the step S10, the electronic device 2 may determine the frequency of the driving signal closer to the frequency of the tracking signal in the step S20 than the frequency of the driving signal in the step S10.

Next, a driving signal applied within one frame period 1F and a resonance signal of the stylus pen 10 will be described with reference to FIG. 164.

Figure 164:
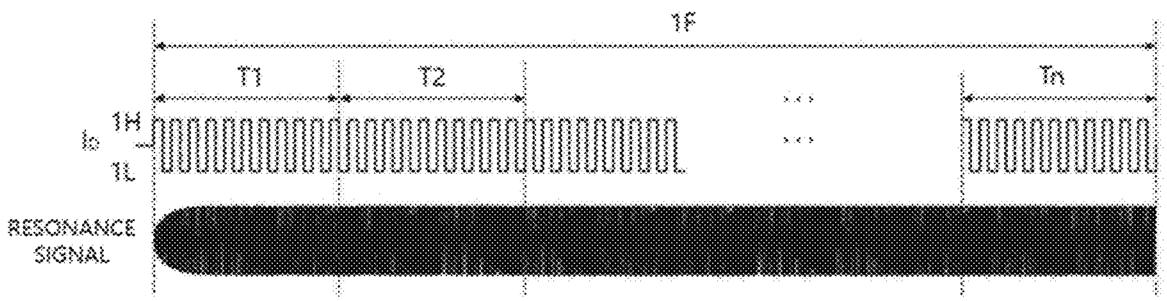
FIG. 164 is a waveform diagram illustrating an example of a driving signal according to the driving method of FIG. 163.

FIG. 164 is a waveform diagram illustrating an example of a driving signal according to the driving method in FIG. 163.

A plurality of time periods T1, T2, . . . , Tn is included in one frame period 1F. The length of one frame period 1F depends on the degree to which the touch controller 262 reports touch data to an external device.

In some time periods among the plurality of time periods T1, T2, . . . , Tn within an arbitrary frame period 1F, the coil driver 263 applies a driving signal of a first frequency to the loop coil 264. In another partial time period among the plurality of time periods T1, T2, . . . , Tn, the coil driver 263 outputs a driving signal (tracking signal) of the second frequency to the loop coil 264. Here, the frame outputting the tracking signal may be repeated every frame. Alternatively, the tracking signal may be output only during some frame periods among a plurality of frame periods. In this case, some frame periods may be temporally continuous frames or non-consecutive frames.

For example, in some time periods T1, T2, . . . , the coil driver 263 applies a driving signal of a first frequency to the loop coil 264, and in some other time periods Tn, the coil driver 263 applies a driving signal of the second frequency to the loop coil 264.

The time period for applying the tracking signal to the loop coil 264 in one frame period 1F may be at least one time period of an initial time period T1 of one frame period 1F, a middle time period of one frame period 1F, and a last time period Tn of one frame period 1F. When the time period(s) for applying the tracking signal in one frame period 1F is plural within one frame period 1F, the plurality of time periods may or may not be continuous in time.

The coil driver 263 may change the frequency of the tracking signal applied to the loop coil 264.

Specifically, the frequency of the tracking signal may be increased or decreased in units of one frame period 1F or several frame periods. For example, if the frequency of the tracking signal output during the first frame period is 300 kHz, the frequency of the tracking signal output during the subsequent second frame period may be 303 kHz. Alternatively, if the frequency of the tracking signal output during the first ten frame periods is 300 kHz, the frequency of the tracking signal output during the next ten frame periods may be 297 kHz.

In addition, the frequency of the tracking signal may increase or decrease in a plurality of time periods T1, T2, . . . , Tn within one frame period 1F. Specifically, if the frequency of the tracking signal output in the time period T1 within one frame period 1F is 300 kHz, the frequency of the tracking signal output in at least one of the subsequent time periods T2, . . . , Tn may be 303 kHz.

As another example, the touch sensing unit 260 may determine the frequency of the driving signal by increasing the frequency of the tracking signal as time elapses from the lower limit to the upper limit within a predetermined range of the reference frequency (e.g., 300 kHz), or by decreasing from the upper limit to the lower limit within a predetermined range of the reference frequency.

As another example, the touch sensing unit 260 may determine the frequency of the driving signal by changing the frequency of the tracking signal within the first range (e.g., 285 kHz to 315 kHz in 5%) of the reference frequency (e.g., 300 kHz), and then by changing the frequency of the tracking signal within the second range (e.g., 270 kHz to 330 kHz in 10%).

As another example, the touch sensing unit 260 may perform a coarse search and then a fine search to determine the frequency of the driving signal. For example, the touch sensor 260 may search for the frequency of the driving signal in units of 20 kHz, then may search for the frequency of the driving signal in units of 5 kHz within the range of 20 kHz, and then may search the frequency of the driving signal in units of 1 kHz within the range of 5 kHz.

A frequency range around the reference frequency may be divided into a plurality of first frequency periods in units of a first frequency. One first frequency period may be divided into a plurality of second frequency periods in units of a second frequency. The touch sensing unit 260 selects and outputs at least one frequency in each of the plurality of first frequency periods as the frequency of the tracking signal output in each of the plurality of time periods, and then determines at least one first frequency period based on the correspondingly received sensing signal. The touch sensing unit 260 may select and output at least one frequency in each of the plurality of second frequency periods within the determined at least one first frequency period as the frequency of the tracking signal output in each of the plurality of time periods, and may determine the frequency of the driving signal based on the correspondingly received sensing signal.

For example, a frequency range 270 kHz to 330 kHz around a reference frequency 300 kHz is divided into a first frequency unit 2 kHz. Then, the frequency range around the reference frequency is divided into 30 first frequency periods. And one first frequency period 2 kHz is divided into second frequency units 200 Hz. Then, one first frequency period 2 kHz is divided into 10 second frequency periods.

It is assumed that one frame includes 10 time periods (e.g., T1, T2, . . . , T10). Then, a tracking signal in a frequency range of 270 kHz to 290 kHz may be output for 10 time periods in the first frame. In this case, the frequencies of the tracking signals output in each time period may be different from each other. In the first time period of the first frame, a tracking signal of an arbitrary frequency (e.g., 271 kHz) selected within the range of 270 kHz or more and less than 272 kHz is output, and a corresponding sensing signal is received. In the second time period of the first frame, a tracking signal of an arbitrary frequency (e.g., 272.8 kHz) selected within a range of 272 kHz or more and less than 274 kHz is output, and a corresponding sensing signal is received. The touch sensing unit 260 may receive a sensing signal by changing the frequency of the tracking signal in the remaining time periods, and a tracking signal of a frequency range of 290 kHz to 330 kHz for a total of 20 time periods within the second frame and the third frame after the first frame is output, and corresponding sensing signals are received. The touch sensing unit 260 determines at least one first frequency period based on at least one of an amplitude and a phase of a sensing signal obtained in each time period corresponding to each of the 30 first frequency periods. Although it has been described above that the frequency of the driving signal applied in each time period sequentially increases, the frequency of the driving signal may sequentially decrease or the frequency may increase or decrease in response to the increase or decrease of the sensing signal (for example, although the frequency is increased compared to the first time period, if the amplitude of the sensing signal is decreased, the frequency is controlled in a direction for it to decrease), but it is not limited thereto. In the above description, although the tracking signal is changed and output in time periods within one frame, the tracking signal may be changed and output in time periods within a plurality of frames. It is not limited to the above description.

It is assumed that the first frequency period in the range of 272 kHz or more and less than 274 kHz is determined. The tracking signal of the first frequency period in the range of 272 kHz or more and less than 274 kHz is output for 10 time periods in the fourth frame thereafter, and in this case, the frequencies of the tracking signals output in each time period may be different from each other. In the first time period, a tracking signal of an arbitrary frequency (e.g., 272.0 kHz) selected within a range of 272 kHz or more and less than 272.2 kHz is output, and a corresponding sensing signal is received. In the second time period of the first frame, a tracking signal of an arbitrary frequency (e.g., 272.2 kHz) selected within the range of 272.2 kHz or more and less than 272.4 kHz is output, and a corresponding sensing signal is received. The touch sensor 260 may receive the sensing signal by changing the frequency of the tracking signal in the remaining time periods. The touch sensing unit 260 determines the frequency of the driving signal based on at least one of an amplitude and a phase of the sensing signal obtained in response to each of the ten first frequency periods.

The touch sensing unit 260 may further include a memory storing profiles for frequency curves in which the x-axis is the frequency value of the driving signal and the y-axis is the size of the received sensing signal. In this case, the touch sensing unit 260 may output tracking signals corresponding to at least two first frequency periods, may predict a frequency value corresponding to the maximum value of the sensing signal by using the amplitudes of the received sensing signals (or the difference in amplitude of the sensing signals or the inclination on the xy plane), and may determine the frequency of the driving signal by changing the frequency of the tracking signal within a predetermined frequency period including the corresponding frequency value.

In addition, the profiles stored in the memory correspond to frequency curves having different shapes according to temperature, humidity, and the like. In this case, the touch sensing unit 260 may receive information on temperature, humidity, etc. from an external unit (e.g., the host 270 in FIG. 21), and may read a profile for a corresponding frequency curve from the memory based thereon. The touch sensing unit 260 determines the frequency of the driving signal by using the signal sensed during at least one frame period, and outputs the driving signal.

For example, the touch sensing unit 260 may determine the frequency of the driving signal output during the next frame period by using the signal sensed during one frame period. Specifically, if the amplitude of the signal sensed in response to the tracking signal having a frequency of 303 kHz during the first frame period is greater than the amplitude of the signal sensed in response to the driving signal having a frequency of 300 kHz, the touch sensing unit 260 may output a driving signal having a frequency of 303 kHz during the second frame period. In this case, the frequency of the tracking signal output by the touch sensing unit 260 during the second frame period may be the same as or different from the frequency of the tracking signal output during the first frame period.

As another example, the touch sensing unit 260 may determine the frequency of the driving signal output during the next plurality of frame periods by using the signals sensed during a plurality of frame periods. Specifically, if the average amplitude of signals sensed corresponding to a tracking signal having a frequency of 303 kHz output during the first 10 frame periods is larger than the average amplitude of signals sensed corresponding to a driving signal having a frequency of 300 kHz output during the first 10 frame periods, the touch sensing unit 260 may output a driving signal having a frequency of 303 kHz for the next 10 frame periods. Alternatively, during the first 10 frame periods, the frequency of the tracking signal for each frame period may be gradually increased, and the frequency of the driving signal for the next 10 frame periods may be determined by taking all the amplitudes of signals received during each frame period into account.

In addition, the period for applying the tracking signal, the frequency of the tracking signal, and the method for determining the driving signal may be changed in various ways, and the present invention is not limited to the above description.

Next, a driving method according to another embodiment will be described with reference to FIG. 165.

Figure 165:
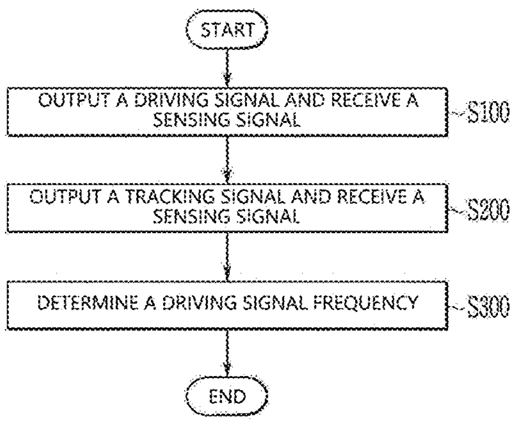
FIG. 165 is a flowchart illustrating a method of driving an electronic device according to another embodiment.

FIG. 165 is a flow chart illustrating a method of driving an electronic device according to another embodiment.

The electronic device 2 outputs a driving signal and receives a sensing signal S100.

The electronic device 2 may apply a driving signal for detecting a touch input by the stylus pen 10 to the touch sensor 261, and may receive a resonance signal resonant from the stylus pen 10 as a sensing signal based on the driving signal.

For example, the first driving/receiving unit 2620 simultaneously applies a driving signal to all of the plurality of first touch electrodes 111-1 to 111-*m*. Then, the resonance circuit unit 12 of the stylus pen 10 resonates with the driving signal, whereby a resonance signal is generated and transmitted to the touch sensor 261 through the conductive tip 11. The first driving/receiving unit 2620 receives a sensing signal transmitted from the plurality of first touch electrodes 111-1 to 111-*m*, and the second driving/receiving unit 2622 receives a sensing signal from the plurality of second touch electrodes 121-1 to 121-*n*. The first driving/receiving unit 2620 and the second driving/receiving unit 2622 may process the received sensing signal and transmit it to the control unit 2624. In this case, the control unit 2624 may determine the position of the stylus pen 10 by processing the sensing signal.

Alternatively, the coil driver 263 may apply a driving signal of an AC waveform for resonating the resonance circuit unit 12 of the stylus pen 10 to the loop coil 264, and may receive a resonance signal resonant in the stylus pen 10 based on the driving signal as a sensing signal, or an output signal of the stylus pen 10 based on the resonance signal as a sensing signal. For example, the coil driver 263 applies a driving signal to the loop coil 264. Then, the resonance circuit unit 12 of the stylus pen 10 resonates with the driving signal, whereby a resonance signal is generated and transmitted to the touch sensor 261 through the conductive tip 11. The touch controller 262 receives a sensing signal transmitted to the touch sensor 261. The touch controller 262 may process the received sensing signal and transmit it to the control unit 270.

Although it has been described that the first driving/receiving unit 2620 simultaneously applies the driving signal to all of the plurality of first touch electrodes 111-1 to 111-*m* in the step S100, in the step S10, the second driving/receiving unit 2622 simultaneously may apply a driving signal to all of the plurality of second touch electrodes 121-1 to 121-*n*, or the first driving/receiving unit 2620 and the second driving/receiving unit 2622 may simultaneously apply the driving signal to all of the plurality of first touch electrodes 111-1 to 111-*m* and apply the driving signal to all of the plurality of second touch electrodes 121-1 to 121-*n*. When the first driving/receiving unit 2620 and the second driving/receiving unit 2622 apply a driving signal to both of the plurality of first touch electrodes 111-1 to 111-*m* and the plurality of second touch electrodes 121-1 to 121-*n*, it is assumed that the phases of the driving signal applied to the plurality of first touch electrodes 111-1 to 111-*m* and the driving signal applied to the plurality of second touch electrodes 121-1 to 121-*n* are the same. However, they are not limited thereto.

Although it has been described that the first driving/receiving unit 2620 simultaneously applies the driving signal to all of the plurality of first touch electrodes 111-1 to 111-*m* in the step S100, in the step S100, the first driving/receiving unit 2620 may apply the driving signal to at least one of the first touch electrodes 111-1 to 111-*m*, the second driving/receiving unit 2622 may apply the driving signal to at least one of the plurality of second touch electrodes 121-1 to 121-*n*, the first driving/receiving unit 2620 and the second driving/receiving unit 2622 may apply the driving signal to at least one of the plurality of first touch electrodes 111-1 to 111-*m* and at least one of the plurality of second touch electrodes 121-1 to 121-*n*, or the second driving/receiving unit 2622 may simultaneously apply the driving signal to all of the plurality of first touch electrodes 111-1 to 111-*m* and all of the plurality of second touch electrodes 121-1 to 121-*n*. When the driving signal is applied to at least two different touch electrodes, the phases of the driving signals applied to the respective touch electrodes are the same, or the phases thereof may have a phase difference considering the RC delay of the touch electrodes according to a touch position of the stylus pen 10.

The electronic device 2 outputs a tracking signal of a predetermined frequency and receives a sensing signal S200.

The electronic device 2 may apply a tracking signal to the touch sensor 261 and receive a signal resonant from the stylus pen 10 as a sensing signal based on the tracking signal. The tracking signal may include a signal (e.g., a sine wave, a square wave, etc.) having a different frequency than that of the driving signal in the step S100, and the resonance circuit unit 12 of the stylus pen 10 may resonate with the tracking signal.

Alternatively, the coil driver 263 may apply a tracking signal to the loop coil 264, and may receive a resonance signal resonant from the stylus pen 10 based on the tracking signal as a sensing signal or may receive an output signal of the the stylus pen 10 based on the resonance signal as a sensing signal. The tracking signal may include a signal (e.g., a sine wave, a square wave, etc.) having a different frequency than that of the driving signal in the step S10, and the resonance circuit unit 12 of the stylus pen 10 may resonate with the tracking signal.

For example, the first driving/receiving unit 2620 simultaneously applies the tracking signal to all of the plurality of first touch electrodes 111-1 to 111-*m*. Then, the resonance circuit unit 12 of the stylus pen 10 resonates with the tracking signal, whereby a resonance signal is generated and transmitted to the touch sensor 261 through the conductive tip 11. The first driving/receiving unit 2620 receives the sensing signals transmitted from the plurality of first touch electrodes 111-1 to 111-*m*, and the second driving/receiving unit 2622 receives the sensing signal transmitted from the plurality of second touch electrodes 121-1 to 121-*n*. The first driving/receiving unit 2620 and the second driving/receiving unit 2622 may process the received sensing signal and transmit it to the control unit 2624. In this case, the control unit 2624 may process the sensing signal and determine a position of the stylus pen 10.

Alternatively, for example, the coil driver 263 applies a tracking signal to the loop coil 264. Then, the resonance circuit unit 12 of the stylus pen 10 resonates with the tracking signal, whereby a resonance signal is generated and transmitted to the touch sensor 261 through the conductive tip 11. The touch controller 262 receives a sensing signal transmitted to the touch sensor 261. The touch controller 262 may process the received sensing signal and transmit it to the control unit 270.

In the above step S200, although the first driving/receiving unit 2620 has been described as simultaneously applying the tracking signal to all of the plurality of first touch electrodes 111-1 to 111-*m*, the second driving/receiving unit 2622 may simultaneously apply the tracking signal to all of the plurality of second touch electrodes 121-1 to 121-*n*, or the first driving/receiving unit 2620 and the second driving/receiving unit 2622 may simultaneously apply the tracking signal to all of the plurality of first touch electrodes 111-1 to 111-*m* and simultaneously apply the tracking signal to all of the plurality of second touch electrodes 121-1 to 121-*n*. When the first driving/receiving unit 2620 and the second driving/receiving unit 2622 apply the tracking signal to all of the plurality of first touch electrodes 111-1 to 111-*m* and the plurality of second touch electrodes 121-1 to 121-*n*, it is assumed that the phases of the tracking signal applied to the plurality of first touch electrodes 111-1 to 111-*m* and the tracking signal applied to the plurality of second touch electrodes 121-1 to 121-*n* are the same. However, they are not limited thereto.

In the above step S200, it has been described that the first driving/receiving unit 2620 simultaneously applies the tracking signal to all of the plurality of first touch electrodes 111-1 to 111-*m*, In the step S200, the first driving/receiving unit 2620 may apply the tracking signal to at least one of the plurality of first touch electrodes 111-1 to 111-*m*, the second driving/receiving unit 2622 may apply the tracking signal to at least one of the plurality of second touch electrodes 121-1 to 121-*n*, the first driving/receiving unit 2620 and the second driving/receiving unit 2622 may simultaneously apply the tracking signal to at least one of the plurality of first touch electrodes 111-1 to 111-*m* and at least one of the plurality of second touch electrodes 121-1 to 121-*n*, the second driving/receiving unit 2622 may simultaneously apply the tracking signal to all of the plurality of second touch electrodes 121-1 to 121-*n*, or the first driving/receiving unit 2620 and the second driving/receiving unit 2622 may simultaneously apply the tracking signal to all of the plurality of first touch electrodes 111-1 to 111-*m* and all of the second touch electrodes 121-1 to 121-*n*. When the tracking signal is applied to at least two different touch electrodes, the phases of the tracking signals applied to the respective touch electrodes may be the same, or the phases thereof may have a phase difference considering the RC delay of the touch electrodes according to a touch position of the stylus pen 10.

The electronic device 2 determines the frequency of the driving signal S300.

The electronic device 2 may determine the frequency of the driving signal based on the sensing signal received in the step S200. The electronic device 2 may determine the frequency of the driving signal by using at least one of an amplitude and a phase of the sensing signal received in the step S200.

For example, if the amplitude of the sensing signal received in the step S200 is greater than the amplitude of the sensing signal received in the step S100, the electronic device 2 may determine the frequency of the driving signal closer to the frequency of the tracking signal in the step S200 than the frequency of the driving signal in the step S100.

For example, if the phase of the sensing signal received in the step S200 has a smaller difference from the reference phase (e.g., −90°) than the phase of the sensing signal received in the step S100, the electronic device 2 may determine the frequency of the driving signal closer to the frequency of the tracking signal in the step S200 than the frequency of the driving signal in the step S100.

Next, a driving signal applied within one frame period 1F and a resonance signal of the stylus pen 10 will be described with reference to FIGS. 166 and 167.

Figure 166:
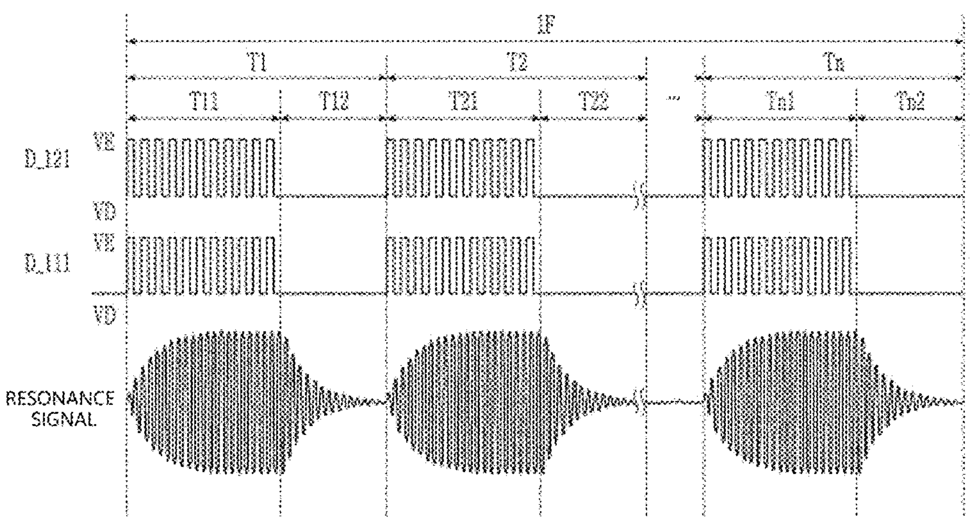
FIGS. 166 and 167 are waveform diagrams illustrating an example of a driving signal according to the driving method of FIG. 165.
Figure 167:
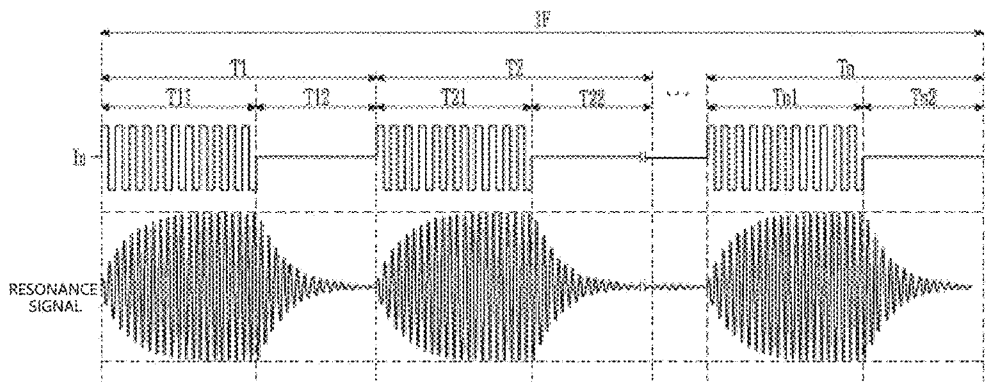

FIGS. 166 and 167 are waveform diagrams illustrating an example of a driving signal according to the driving method in FIG. 165.

A plurality of periods T1, T2, . . . , Tn is included in one frame period 1F. The length of one frame period 1F depends on the degree to which the touch controller 262 reports touch data to an external device.

Each of the plurality of periods T1, T2, . . . , Tn includes a first period T11, T21, . . . , Tn1 and a second period T12, T22, . . . , Tn2.

In at least one first period of each of the plurality of frame periods, the touch sensing unit 260 of the electronic device applies a driving signal of a first frequency to the touch sensor 261 in FIG. 166 or the loop coil 264 in FIG. 167

In some first periods among the plurality of first periods T11, T21, . . . , Tn1 within an arbitrary frame period 1F, the touch controller 262 applies a driving signal of a first frequency to the touch sensor 261. In another partial time periods among the plurality of first periods T11, T21, . . . , Tn1, the touch controller 262 outputs a driving signal (tracking signal) of the second frequency to the touch sensor 261. Here, the frame outputting the tracking signal may be repeated every frame. Alternatively, the tracking signal may be output only during some frame periods among a plurality of frame periods. In this case, some frame periods may be temporally continuous frames or non-consecutive frames.

For example, in a first period within an arbitrary frame period among a plurality of frame periods, the touch sensing unit 260 applies the tracking signal of the second frequency to the touch sensor 261. The arbitrary frame period may be all of a plurality of frame periods, or may be some frame periods among a plurality of frame periods, and some frame periods may be continuous or spaced apart in time from each other.

For example, in some first periods T11, T21, the first driving/receiving unit 2620 outputs a driving signal of a first frequency to at least one of a plurality of first touch electrodes 111-1 to 111-*m*, and in another first period Tn, the first driving/receiving unit 2620 applies the driving signal of the second frequency to at least one of a plurality of first touch electrodes 111-1 to 111-*m*.

The time period for applying the tracking signal to the touch sensor 261 in one frame period 1F may be at least one time period of a first period T11 of an initial time period T1 in one frame period 1F, a first period of a middle time period in one frame period 1F, and a last period Tn1 of a last time period Tn in one frame period 1F. When the first period(s) for applying the tracking signal in one frame period 1F is plural within one frame period 1F, the plurality of first periods may or may not be continuous in time.

In at least one of the first periods T11, T21, . . . , Tn1 within one frame period 1F, the first driver/receiver 2620 outputs a tracking signal to the plurality of first touch electrodes 111-1 to 111-*m*. Alternatively, in at least one of the first periods T11, T21, . . . , Tn1 within one frame period 1F, the coil driver 263 outputs a tracking signal to the loop coil 264.

For example, in the first period T11 of one frame period 1F, the first driving/receiving unit 2620 may output a tracking signal to the plurality of first touch electrodes 111-1 to 111-*m*. Alternatively, in the last first period Tn1 of one frame period 1F, the first driving/receiving unit 2620 may output a tracking signal to the plurality of first touch electrodes 111-1 to 111-*m*. Alternatively, the first driving/receiving unit 2620 may output a tracking signal to the plurality of first touch electrodes 111-1 to 111-*m* in the middle first period of one frame period 1F. In addition, as an example, in the first period T11 of one frame period 1F, the coil driver 263 may output a tracking signal to the loop coil 264. Alternatively, in the last first period Tn1 of one frame period 1F, the coil driver 263 may output a tracking signal to the loop coil 264. Alternatively, the coil driver 263 may output a tracking signal to the loop coil 264 in the middle first period of one frame period 1F.

As another example, only in one first period T11, T21, . . . , Tn1 of one frame period 1F, the first driver/receiver 2620 may output a tracking signal to the plurality of first touch electrodes 111-1 to 111-*m*. Alternatively, in all the first periods T11, T21, . . . , Tn1 of one frame period 1F, the first driver/receiver 2620 may output a tracking signal to the plurality of first touch electrodes 111-1 to 111-*m*. Alternatively, the first driving/receiving unit 2620 may output a tracking signal to the plurality of first touch electrodes 111-1 to 111-*m* in at least two of the plurality of first periods T11, T21, . . . , Tn1 in one frame period 1F. In addition, as another example, only in one first period T11, T21, . . . , Tn1 of one frame period 1F, the coil driver 263 may output a tracking signal to the loop coil 264. Alternatively, the coil driver 263 may output a tracking signal to the loop coil 264 in all first periods T11, T21, . . . , Tn1 of one frame period 1F. Alternatively, the coil driver 263 may output a tracking signal to the loop coil 264 in at least two of the plurality of first periods T11, T21, . . . , Tn1 in one frame period 1F.

The frequency of the tracking signal output in at least one of the first periods T11, T21, . . . , Tn1 within one frame period 1F may be changed.

The touch controller 262 may change the frequency of the tracking signal applied to the touch sensor 261.

For example, the frequency of the tracking signal may increase or decrease in units of one frame period 1F or several frame periods. Specifically, if the frequency of the tracking signal output during the first frame period is 300 kHz, the frequency of the tracking signal output during the subsequent second frame period may be 303 kHz. Alternatively, if the frequency of the tracking signal output during the first ten frame periods is 300 kHz, the frequency of the tracking signal output during the next ten frame periods may be 297 kHz.

As another example, the frequency of the tracking signal may increase or decrease in the plurality of first periods T11, T21, . . . , Tn1 within one frame period 1F. Specifically, if the frequency of the tracking signal output in the first period T11 within one frame period 1F is 300 kHz, the frequency of the tracking signal output in at least one of the subsequent first periods T21, . . . , Tn1 may be 303 kHz.

As another example, the touch sensing unit 260 may determine the frequency of the driving signal by increasing the frequency of the tracking signal from a lower limit to an upper limit within a predetermined range of a reference frequency (e.g., 300 kHz) as time elapses, or by decreasing the frequency of the tracking signal from the upper limit to the lower limit within a predetermined range of the reference frequency as time elapses.

As another example, the touch sensing unit 260 may determine the frequency of the driving signal by changing the frequency of the tracking signal within the first range (e.g., 285 kHz to 315 kHz in 5%) of the reference frequency (e.g., 300 kHz), and may determine the frequency of the driving signal by changing the frequency of the tracking signal within the second range (e.g., 270 kHz to 330 kHz in 10%).

As another example, the touch sensing unit 260 may perform a coarse search and then a fine search to determine the frequency of the driving signal. For example, the touch sensing unit 260 may search for the frequency of the driving signal in units of 20 kHz, may search the frequency of the driving signal in units of 5 kHz within the range of 20 kHz, and then may search the frequency of the driving signal in units of 1 kHz within the range of 5 kHz.

A frequency range around the reference frequency may be divided into a plurality of first frequency periods in units of a first frequency. One first frequency period may be divided into a plurality of second frequency periods in units of a second frequency.

The touch sensing unit 260 selects and outputs at least one frequency in each of the plurality of first frequency periods as the frequency of the tracking signal output in each of the plurality of time periods, and then determines at least one first frequency period based on the correspondingly received sensing signal. The touch sensing unit 260 may select and output at least one frequency in each of the plurality of second frequency periods within the determined at least one first frequency period as the frequency of the tracking signal output in each of the plurality of time periods, and may determine the frequency of the driving signal based on the correspondingly received sensing signal.

For example, a frequency range 270 kHz to 330 kHz around a reference frequency 300 kHz is divided into a first frequency unit 2 kHz. Then, the frequency range around the reference frequency is divided into 30 first frequency periods. And one first frequency period 2 kHz is divided into second frequency units 200 Hz. Then, one first frequency period 2 kHz is divided into 10 second frequency periods.

It is assumed that one frame includes ten first periods (e.g., T11, T21, . . . , T101). Then, a tracking signal in a frequency range of 270 kHz to 290 kHz is output during 10 first periods in the first frame, and in this case, frequencies of the tracking signals output in each first period may be different from each other. In the first period of the first frame, a tracking signal of an arbitrary frequency (e.g., 271 kHz) selected within a range of 270 kHz or more and less than 272 kHz is output, and a corresponding sensing signal is received. In the second first period of the first frame, a tracking signal of an arbitrary frequency (e.g., 272.8 kHz) selected within a range of 272 kHz or more and less than 274 kHz is output, and a sensing signal corresponding thereto is received. The touch sensing unit 260 may receive a sensing signal by changing the frequency of the tracking signal even in the remaining first periods, and for a total of 20 first periods in the second frame and the third frame after the first frame, a tracking signal in a frequency range of 290 kHz to 290 kHz is output, and sensing signals corresponding thereto are received. The touch sensing unit 260 determines at least one first frequency period based on at least one of an amplitude and a phase of a sensing signal obtained corresponding to each of the 30 first frequency periods.

In the above, it has been described that the frequency of the driving signal applied in each of the first periods sequentially increases, but the frequency of the driving signal may sequentially decrease or the frequency thereof may increase or decrease in response to the increase or decrease of the sensing signal (for example, if the frequency is increased compared to that in the first period, but the amplitude of the sensing signal is decreased, the frequency is controlled in a decreasing direction), but it is not limited to the above description. In the above description, the tracking signal is changed and output in the first periods within one frame, but the tracking signal may be changed and output in the first periods within a plurality of frames, and it is not limited to the above description.

It is assumed that the first frequency period in the range of 272 kHz or more and less than 274 kHz is determined. The tracking signal of the first frequency period in the range of 272 kHz or more and less than 274 kHz is output during the ten first periods in the fourth frame thereafter, and in this case, the frequencies of the tracking signals output in each first period may be different from each other. In the first period, a tracking signal of an arbitrary frequency (e.g., 272.0 kHz) selected within a range of 272 kHz or more and less than 272.2 kHz is output, and a corresponding sensing signal is received. In the second first period of the first frame, a tracking signal of an arbitrary frequency (e.g., 272.2 kHz) selected within a range of 272.2 kHz or more and less than 272.4 kHz is output, and a sensing signal corresponding thereto is received. The touch sensing unit 260 may receive the sensing signal by changing the frequency of the tracking signal even in the remaining first periods. The touch sensing unit 260 determines the frequency of the driving signal based on at least one of an amplitude and a phase of the sensing signal obtained in response to each of the 10 first frequency periods.

The touch sensing unit 260 may further include a memory storing profiles for frequency curves in which the x-axis is the frequency value of the driving signal and the y-axis is the size of the received sensing signal.

In this case, the touch sensing unit 260 may output tracking signals corresponding to at least two first frequency periods, may predict a frequency value corresponding to the maximum value of the sensing signal by using the amplitudes of the received sensing signals (or the difference in amplitude of the sensing signals or the inclination on the xy plane), and may determine the frequency of the driving signal by changing the frequency of the tracking signal within a predetermined frequency period including the corresponding frequency value.

In addition, the profiles stored in the memory correspond to frequency curves having different shapes according to temperature, humidity, and the like. In this case, the touch sensing unit 260 may receive information on temperature, humidity, etc. from an external device (e.g., the host 50, etc. in FIG. 5), and read a profile for a corresponding frequency curve from the memory based thereon. The touch sensing unit 260 determines the frequency of the driving signal by using the signal sensed during at least one frame period, and outputs the driving signal.

For example, the touch sensing unit 260 may determine the frequency of the driving signal output during the next frame period by using the signal sensed during one frame period. Specifically, if the amplitude of the signal sensed in response to the tracking signal having a frequency of 303 kHz during the first frame period is greater than the magnitude of the signal sensed in response to the driving signal having a frequency of 300 kHz, the touch sensing unit 260 may output a driving signal having a frequency of 303 kHz during the second frame period. In this case, the frequency of the tracking signal output by the touch sensing unit 260 during the second frame period may be the same as or different from the frequency of the tracking signal output during the first frame period.

As another example, the touch sensing unit 260 may determine the frequency of the driving signal output during the next plurality of frame periods by using the signals sensed during a plurality of frame periods. Specifically, if the average amplitude of signals sensed corresponding to a tracking signal having a frequency of 303 kHz output during the first 10 frame periods is larger than the average amplitude of signals sensed corresponding to a driving signal having a frequency of 300 kHz output during the first 10 frame periods, the touch sensing unit 260 may output a driving signal having a frequency of 303 kHz for the next 10 frame periods. Alternatively, during the first 10 frame periods, the frequency of the tracking signal for each frame period may be gradually increased, and the frequency of the driving signal for the next 10 frame periods may be determined by taking all the amplitudes of signals received during each frame period into account.

In addition, the period for applying the tracking signal, the frequency of the tracking signal, and the method for determining the driving signal may be changed in various ways, and the present invention is not limited to the above description.

A method of controlling an electronic device according to an embodiment will be described with reference to FIG. 168.

Figure 168:
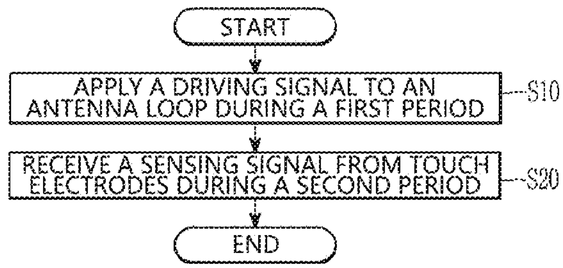
FIG. 168 is a flowchart illustrating a method of controlling an electronic device according to an embodiment.

FIG. 168 is a flow chart illustrating a method of controlling an electronic device according to an exemplary embodiment.

In the first period, the coil driver 263 applies a driving signal to the loop coil 264 S10. The resonance circuit unit 12 of the stylus pen 10 resonates with the driving signal. An electromagnetic signal generated by the resonance signal is transmitted to the touch sensor 261 through the conductive tip 11.

In a second period after the first period, the receiving unit 2622 receives a sensing signal transmitted from the plurality of first touch electrodes 111-1 to 111-*n*, and receives a sensing signal transmitted from the plurality of second touch electrodes 121-1 to 121-*m* S120.

The receiving unit 2622 may process the received sensing signal and transmit it to the touch controller 262. The touch controller 262 may acquire touch coordinate information of a point where a touch by the stylus pen 10 occurs by using the transmitted sensing signal.

According to the electronic device and the control method according to the present disclosure, by differentiating a period for driving the loop coil 264 from a period for receiving a sensing signal through the touch electrodes 111, 121, there occurs an effect of reducing the noise caused by the electromagnetic coupling between the loop coil 264 and the touch electrodes 111, 121. In relation to this, noise will be described with reference to FIG. 169.

Figure 169:
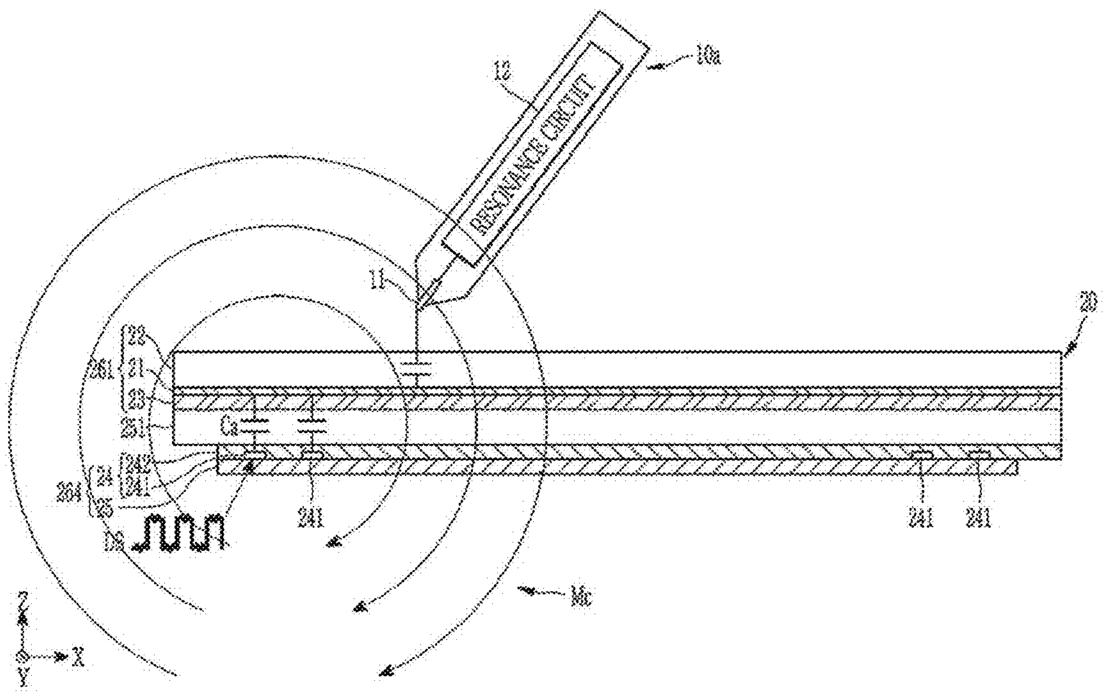
FIG. 169 is a diagram illustrating an arrangement form of a touch sensor and a loop coil of an electronic device according to an embodiment.

FIG. 169 is a diagram illustrating an arrangement form of a touch sensor and a loop coil of an electronic device according to an exemplary embodiment.

The antenna loop 241 and the touch electrode layer 21 are electromagnetically influenced by each other. For example, the touch electrodes 111, 121 positioned on the touch electrode layer 21 may form a capacitive coupling Ca with the antenna loop 241. Accordingly, when the driving signal DS of a predetermined frequency is applied to the antenna loop 241, noise may be generated in the sensing signal sensed by the touch electrodes 111, 121. In addition, when a current flows through the antenna loop 241 and generate a magnetic field Mc, noise may be generated in a sensing signal sensed by the touch electrodes 111, 121 due to electromagnetic induction.

Such a touch detection method will be described together with reference to FIGS. 170 to 172.

Figure 170:
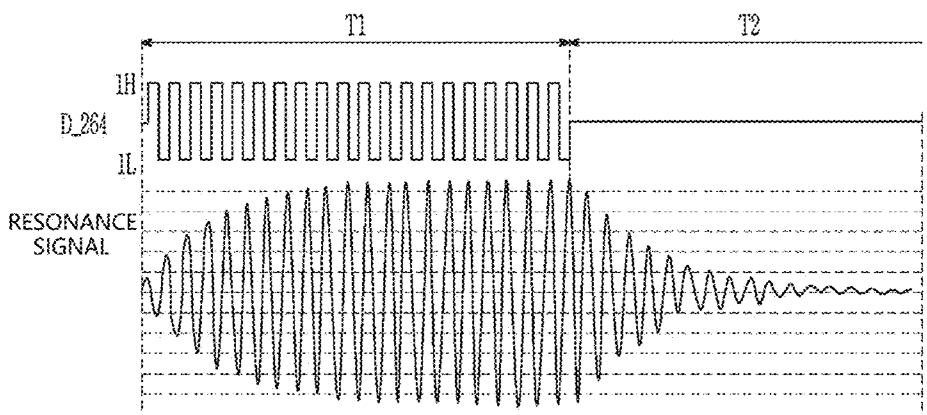
FIG. 170 is a diagram illustrating a driving signal applied to a loop coil by a coil driver and a resonance signal of a stylus pen according to an embodiment.
Figure 171:
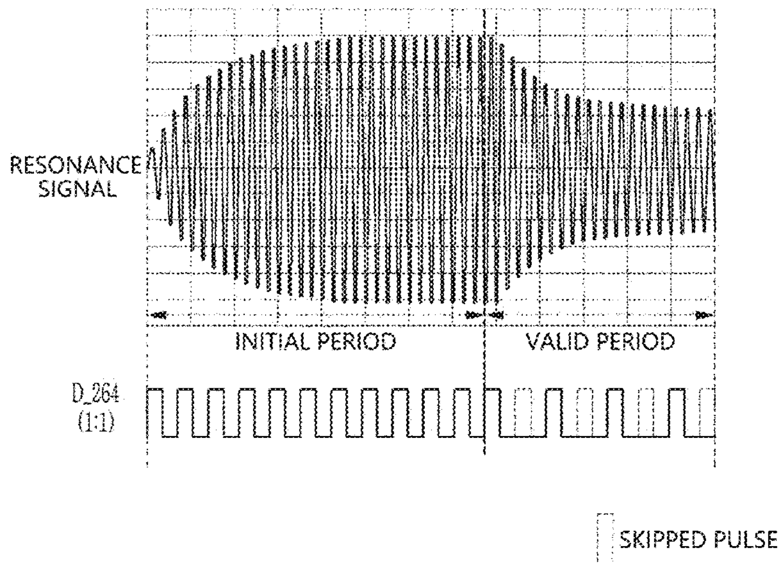
FIGS. 171 and 172 are diagrams illustrating a driving signal applied by a coil driver to a loop coil and a resonance signal of a stylus pen according to another embodiment.
Figure 172:
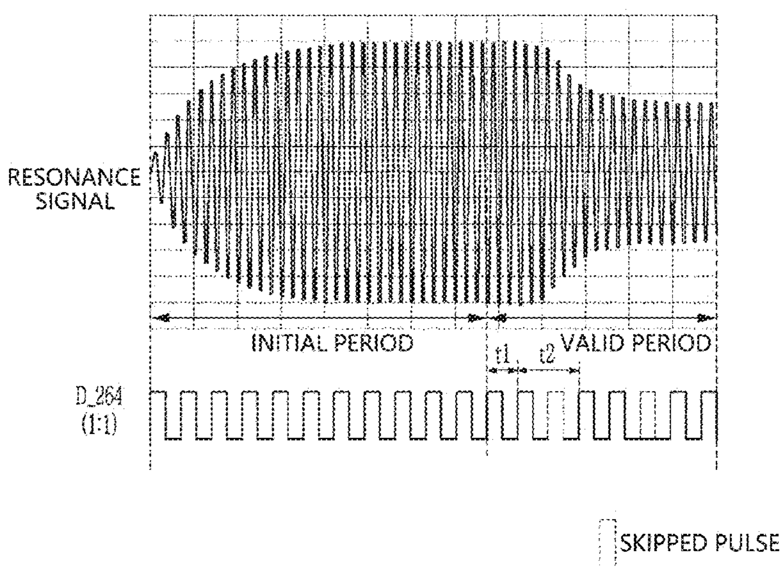

FIG. 170 is a view illustrating a driving signal applied to a loop coil by a coil driver and a resonance signal of a stylus pen according to an embodiment, and FIGS. 171 and 172 are diagrams showing the resonance signal of a stylus pen and a driving signal applied by the coil driver to the loop coil according to another embodiment.

Referring to FIG. 170, during the first period T1, the coil driver 263 applies the driving signal D_264 to the loop coil 264. The driving signal D_264 is a current oscillating at a high level IH and a low level IL, and has a frequency similar to the resonance frequency of the resonance circuit unit 12. In the first period T1, the amplitude of the resonance signal generated by the resonance circuit unit 12 increases according to the time when the driving signal D_264 is applied. And after a certain time has elapsed, the amplitude of the resonance signal is in a saturated state. In the first period T1, sensing signals from the plurality of first touch electrodes 111-1 to 111-*n* and the plurality of second touch electrodes 121-1 to 121-*m* are not received.

After the first period T1 ends, the coil driver 263 does not apply the driving signal D_264 to the loop coil 264 during the second period T2. During the second period T2, the receiving unit 2622 receives the sensing signal from the touch electrodes 111, 121.

The receiving unit 2622 may receive a signal output from the stylus pen 10 as a sensing signal in the second period T2 to which the driving signal D_264 is not applied. The touch controller 2624 may determine the touch position and the type of the touch object in the touch sensor 261 through the sensing signal received in the second period T2. According to an electronic device and a method for controlling the same according to an embodiment, in the second period T2, since the sensing signal is received through both of the plurality of first touch electrodes 111-1 to 111-*n* and the plurality of second touch electrodes 121-1 to 121-*m*, there occurs an advantage in that touch coordinates along two axes intersecting each other can be acquired in a short time.

Referring to FIG. 171, during the initial period or the first period T1 for rapidly reaching the resonance signal of the stylus pen 10 to a predetermined level, the coil driver 263 outputs or applies a driving signal of a predetermined frequency to the loop coil 264. Then, the resonance signal of the stylus pen 10 may quickly reach a predetermined level.

In the first period T1, the amplitude of the resonance signal generated by the resonance circuit unit 12 increases according to the time when the driving signal D_264 is applied. After a certain time has elapsed, the amplitude of the resonance signal is in a saturated state. In the first period T1, sensing signals from the plurality of first touch electrodes 111-1 to 111-*n* and the plurality of second touch electrodes 121-1 to 121-*m* are not received. After the initial period or the first period T1 ends, the coil driver 263 applies a driving signal D_264 different from that in the first period T1 to the loop coil 264 during a valid period or the second period T2.

During the valid period or the second period T2, the coil driver 263 outputs a driving signal in which a driving signal of a predetermined frequency is modified (e.g., a duty ratio is reduced). Then, the resonance signal of the stylus pen 10 may be maintained at a valid level. During the second period T2, the receiving unit 2622 receives a sensing signal from the touch electrodes 111, 121.

That is, a driving signal having a lower duty ratio (or duty cycle) compared to a driving signal having a predetermined frequency during the valid period may be output to the loop coil 264. For example, if the duty ratio of the driving signal output during the initial period is 1, the duty ratio of the driving signal output during the valid period may be lowered to ⅓ due to an increase in off-duty due to pulse skipping.

If the duty ratio (ratio of the disable level period to the enable level period within one repeated cycle P) of the driving signal D_264 output in the first period T1 is 1:1, the driving signal D_264 output in the second period T2 may have a duty ratio of a:2b+1, a:2b+2, a:2b+3, a:2b+4, a:(3b+1), a:2(b+3)+1, a:2(b+3), a:(2b+1), . . . , etc. Here, a and b are integers. The period corresponding to one period P of the driving signal D_264 output in the second period T2 may include a period in which the enable level period and the disable level period are repeated at least n times, and a period in which the disable level period is maintained at least 2n times. The enable level period corresponds to a period in which the driving signal has the enable level IH, and the disable level period corresponds to a period in which the driving signal has the disable level IL. The duty ratio of the driving signal is only an example, and may include all ratios that allow the resonance signal of the stylus pen 10 that has reached a predetermined level to be maintained at a valid level.

Referring to FIG. 172, the coil driver 263 raises the resonance signal of the stylus pen 10 to a predetermined level by outputting a periodic driving signal as a driving signal of the loop coil 264 during the initial period. In the subsequent valid period, each time two pulses are output compared with the driving signal output to the loop coil 264 in the initial period, the next one pulse is omitted from the driving signal to the loop coil 264. Thereby, the resonance signal of the stylus pen 10 is maintained in a valid level state.

The resonance signal of the stylus pen 10 that has reached a predetermined level by the driving signal D_264 in the first period T1 may be maintained at a valid level by the driving signal D_264 in the second period T2. Here, the valid level is a level at which the touch controller 262 senses the resonance signal of the stylus pen 10 as a touch signal, or the power operable in the power storage 14 or the battery 50 of the stylus pen 10 is stored. That is, in the valid period, when two pulses are output, the driving signal may be output in a form in which the next one pulse is omitted. Accordingly, the driving signal output in the valid period may be configured such that a first period t1 in which a pulse signal having the same duty ratio as the pulse output during the initial period is output and a second period t2 in which a pulse signal having a lower duty ratio than that of the first period t1 is output are repeated. For example, if the duty ratio in the first period t1 is 1, the duty ratio in the second period t2 may be lowered to ⅓ due to an increase in off-duty due to pulse skipping.

The driving signal D_264 in the second period T2 may be a signal in which at least one pulse is periodically omitted from the driving signal D_264 in the first period T1. As described above, since the driving signal D_264 in the second period T2 is output in a form in which at least one pulse is periodically omitted compared to the driving signal D_264 in the first period T1, the driving signal D_264 in the first period T1 and the driving signal D_264 in the second period T2 may have different pulse rates. That is, the driving signal D_264 in the second period T2 may have a lower pulse rate than the driving signal D_264 in the first period T1. Here, the pulse rate may be the number of pulses output per unit time (e.g., 1 second).

Energy transmitted from the loop coil 264 to the stylus pen 10 may increase as the period in which the pulse output is skipped in the valid period decreases. Accordingly, the smaller the period in which the pulse output is skipped in the valid period, the higher the signal level of the pen resonance signal generated in the valid period. Taking FIGS. 171 and 172 as an example, in the driving signal in FIG. 172, one pulse is omitted whenever two pulses are output. Thereby, each time one pulse is output, the signal level of the corresponding pen resonance signal may be increased compared to the driving signal in FIG. 171 in which one pulse is omitted.

In addition, as the number of periods in which the pulse output is skipped in the valid period increases, energy consumed for outputting the driving signal may be reduced. Accordingly, as the number of periods in which the pulse output is skipped in the valid period increases, energy consumed by the touch sensor 261 in the valid period may be reduced. Taking FIGS. 171 and 172 as an example, since one pulse is omitted whenever one pulse is output in the driving signal in FIG. 171, energy consumed by the touch sensor 261 may be reduced compared to in the case of the driving signal in FIG. 171 where one pulse is omitted whenever two pulses are output.

During the second period, a sensing signal may be received from the touch electrodes 111, 121 in periods ts1, . . . , ts6 in which the pulse of the driving signal D_264 is skipped. For example, the receiving unit 2622 may receive a sensing signal from at least one of a plurality of first touch electrodes 111-1 to 111-*n* and a plurality of second touch electrodes 121-1 to 121-*m*.

In this case, the receiving unit 2622 may simultaneously receive the sensing signal through at least one of a plurality of first touch electrodes 111-1 to 111-*n* and at least one of a plurality of second touch electrodes 121-1 to 121-*m*. Accordingly, the electronic device and the control method thereof according to an embodiment have an effect of quickly acquiring touch coordinates along two axes intersecting with each other.

As described above, according to the electronic device and the control method thereof according to an embodiment, there is an advantage in that the sensitivity of a touch input can be improved since noise of a sensing signal that may be generated by a driving signal can be reduced by receiving sensing signals from the touch electrodes during a period in which a driving signal is not applied to the loop coil 264.

Next, driving signal waveforms in the first period T1 and the second period T2 will be described with reference to FIGS. 173 to 176.

FIGS. 173 to 176 are waveform diagrams illustrating driving signals according to various aspects of an embodiment.

Figure 173:
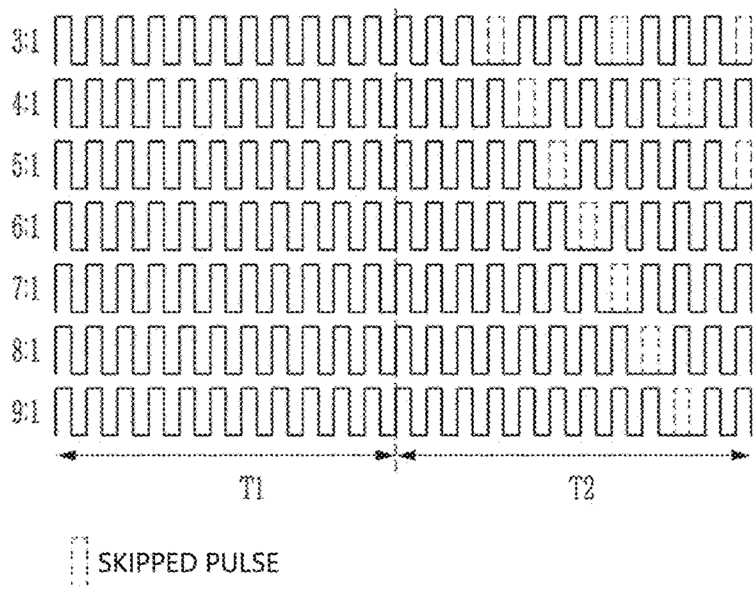
FIGS. 173 to 176 are waveform diagrams illustrating driving signals according to various aspects of an embodiment.
Figure 174:
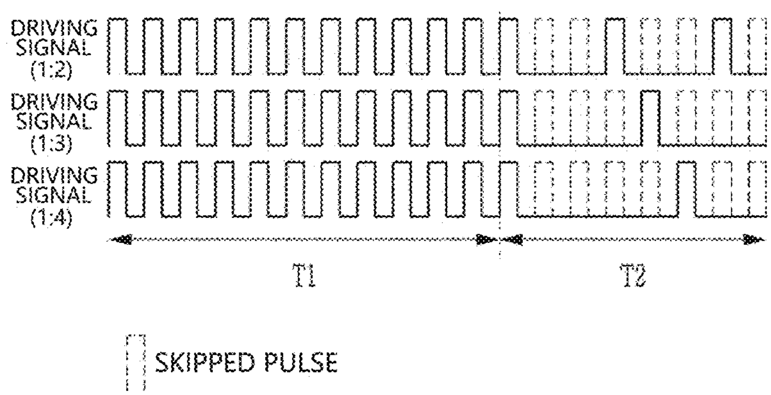

FIGS. 173 and 174 show examples of the driving signal output from the coil driver 263 to the loop coil 264. The period in which the pulse output is skipped in the second period T2 may be variously modified.

Referring to FIG. 173, in the driving signal output to the loop coil 264 during the valid period, the length of the period in which the same pulse is continuously output may be variously modified. For example, one pulse may be omitted every time three pulses are output, or one pulse may be omitted every time four pulses are output. In addition, for example, one pulse may be omitted every time five pulses are output, or one pulse may be omitted every time six pulses are output. In addition, for example, one pulse may be omitted every time seven pulses are output, or one pulse may be omitted every time eight pulses are output. In addition, for example, one pulse may be omitted every time nine pulses are output. As such, when one pulse is periodically omitted, the duty ratio in the pulse skip period may have a value of 1/(2N+1)=⅓.

Meanwhile, in the driving signal output to the loop coil 264 during the valid period, the number of continuously skipped pulses may also be variously modified. For example, in FIG. 173, a case in which only one pulse is periodically omitted during the valid period is illustrated as an example, but the number of pulses periodically omitted in the valid period may be changed to two or more. Taking FIG. 174 as an example, a driving signal may be output such that a plurality of consecutive pulses (two pulses, three pulses, four pulses, etc.) are periodically skipped in the valid period. For example, when two consecutive pulses are periodically skipped in the valid period, assuming that the duty ratio of the driving signal output in the initial period is 1, the duty ratio in the pulse skip period of the valid period may be 1/(2N+1)=⅕. In addition, for example, when three consecutive pulses are periodically skipped in the valid period, assuming that the duty ratio of the driving signal output in the initial period is 1, the duty ratio in the pulse skip period of the valid period may be 1/(2N+1)=⅐. In addition, for example, when four consecutive pulses are periodically skipped in the valid period, assuming that the duty ratio of the driving signal output in the initial period is 1, the duty ratio in the pulse skip period of the valid period may be 1/(2N+1)=⅑.

In addition, in FIGS. 173 and 174, a case in which a pulse is output after an off-duty time has elapsed after pulse skipping in the valid period is illustrated as an example, but the timing at which a new pulse is output after the pulse skip may also be variable. Taking FIG. 175 as an example, in the valid period, an output of the pulse may be immediately resumed at the time point t3 at which the pulse skip period (periods from t3 to t4) ends. Accordingly, the pulse signal output after the pulse skipping may be out of phase with the pulse signal output before the pulse skipping. In this case, if the duty ratio of the driving signal output in the initial period is 1, the duty ratio in the pulse skip period of the valid period may have a value of ½N=½.

As described above, since the smaller the period in which the pulse output is skipped in the valid period, the more energy transmitted from the loop coil 264 to the stylus pen 10 increases, energy transmitted from the loop coil 264 to the stylus pen 10 may increase as the number of pulses continuously output in the valid period increases. Accordingly, compared to the case of using a driving signal in which one pulse is omitted whenever three pulses are output, in the case of using a driving signal in which one pulse is omitted whenever nine pulses are output, a signal level of a corresponding pen resonance signal may increase as energy transmitted from the loop coil 264 to the stylus pen 10 increases. In addition, as the number of periods in which the pulse output is skipped in the valid period increases, the energy consumed for outputting the driving signal decreases. Therefore, as the number of pulses continuously output in the valid period decreases, the energy consumption in the touch sensor 20 may decreases. Accordingly, compared to the case of using a driving signal in which one pulse is omitted every time 9 pulses are output, the case of using a driving signal in which one pulse is omitted every time 3 pulses are output may reduce energy consumption in the valid period of the touch sensor 261.

Figure 175:
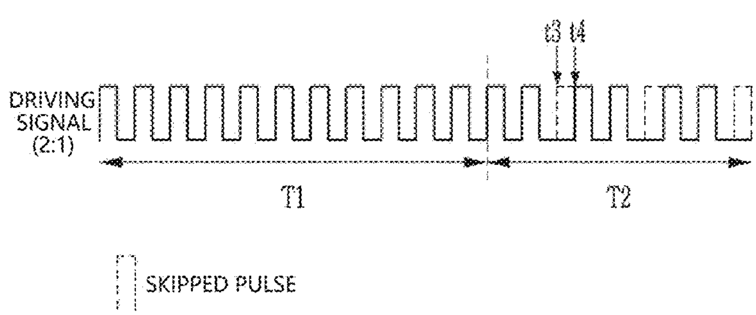

Meanwhile, in FIGS. 173 to 175, a case where the signal levels of the pulses output in the first period T1 and the second period T2 are the same as each other is illustrated as an example, but the signal levels of pulses output in the first period T1 and the second period T2 may be different from each other. For example, in order to reduce the time until the pen resonance signal of the stylus pen 10 reaches a predetermined level, the touch sensor 261 may adjust the signal level of the pulse output in the first period T1 to be higher than the signal level of the pulse output in the second period T2. In addition, for example, in order to increase the energy transmitted to the stylus pen 10 in the second period T2, the touch sensor 261 may adjust the signal level of the pulse output from in the second period T2 to be higher than the signal level of the pulse output in the first period T1.

Figure 176:
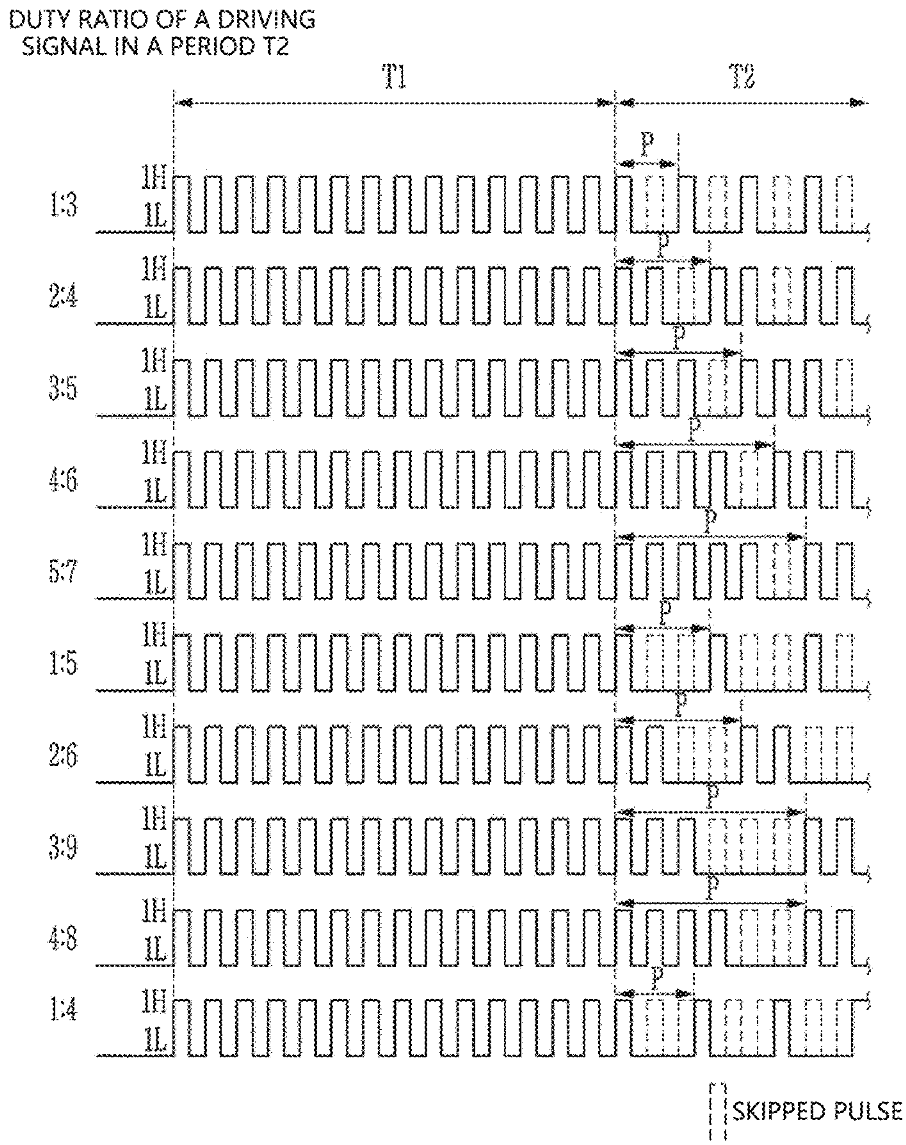

Referring to FIG. 176, during a first period T1, a first driving signal in which a high level IH pulse is repeated at a predetermined cycle is applied to the loop coil 264. During the first period T1, the resonance signal of the stylus pen 10 may rapidly reach a predetermined voltage level (i.e., may be saturated) by the first driving signal.

During the second period T2, a driving signal having a plurality of periods having different disable level periods is applied to the loop coil 264.

For example, if the duty ratio (ratio of the disable level period to the enable level period within one repeated cycle P) of the first driving signal output in the first period T1 is 1:1, the driving signal output in the second period T2 may have a duty ratio of a:2b+1, a:2b+2, a:2b+3, a:2b+4, a:(3b+1), a:2(b+3)+1, a:2(b+3), a:(2b+1), . . . , etc. Here, a and b are integers. The period corresponding to one period P of the driving signal output in the second period T2 may include a period in which the enable level period and the disable level period are repeated at least n times, and a period in which the disable level period is maintained at least 2n times. The enable level period corresponds to a period in which the driving signal has the enable level IH, and the disable level period corresponds to a period in which the driving signal has the disable level IL. The duty ratio of the driving signal is only an example, and may include all ratios that allow the resonance signal of the stylus pen 10 that has reached a predetermined level to be maintained at a valid level.

The resonance signal of the stylus pen 10 that has reached a predetermined level by the first driving signal in the initial period may be maintained at the valid level by the driving signal in the valid period. Here, the valid level means a level at which the touch controller 262 can sense the resonance signal of the stylus pen 10 as a touch signal.

The driving signal in the valid period may be a signal in which at least one pulse is periodically omitted from the first driving signal in the initial period. As described above, since the driving signal in the valid period is output in a form in which at least one pulse is periodically omitted compared to the first driving signal in the initial period, the first driving signal in the initial period and the driving signal in the valid period may have different pulse rates. That is, the driving signal in the valid period may have a lower pulse rate than the first driving signal in the initial period. Here, the pulse rate may be the number of pulses output per unit time (e.g., 1 second).

Energy transmitted from the touch sensor 261 to the stylus pen 10 may increase as the number of skipped pulses of the driving signal in the valid period decreases. Accordingly, as the number of skipped pulses of the driving signal in the valid period decreases, the signal level of the pen resonance signal generated in the valid period increases. In addition, as the number of skipped pulses of the driving signal increases in the valid period, energy consumed for outputting the driving signal may decrease. Accordingly, as the number of skipped pulses of the driving signal in the valid period increases, energy consumed by the touch sensor 261 in the valid period may be reduced.

According to the embodiments, it is possible to improve a signal-noise-ratio (SNR) of a signal output from the stylus pen, thereby improving reception sensitivity of a touch input and calculating a more accurate touch position.

According to the embodiments, there is an advantage in that palm rejection can be performed, and in that energy consumption of the touch sensor can be reduced by reducing energy consumption in a period in which a driving signal is output to the touch sensor for resonance of the stylus pen.

The first and second driving/receiving units 2620, 2622 of the touch sensing unit 260 will be described in detail with reference to FIGS. 177 to 179.

Figure 177:
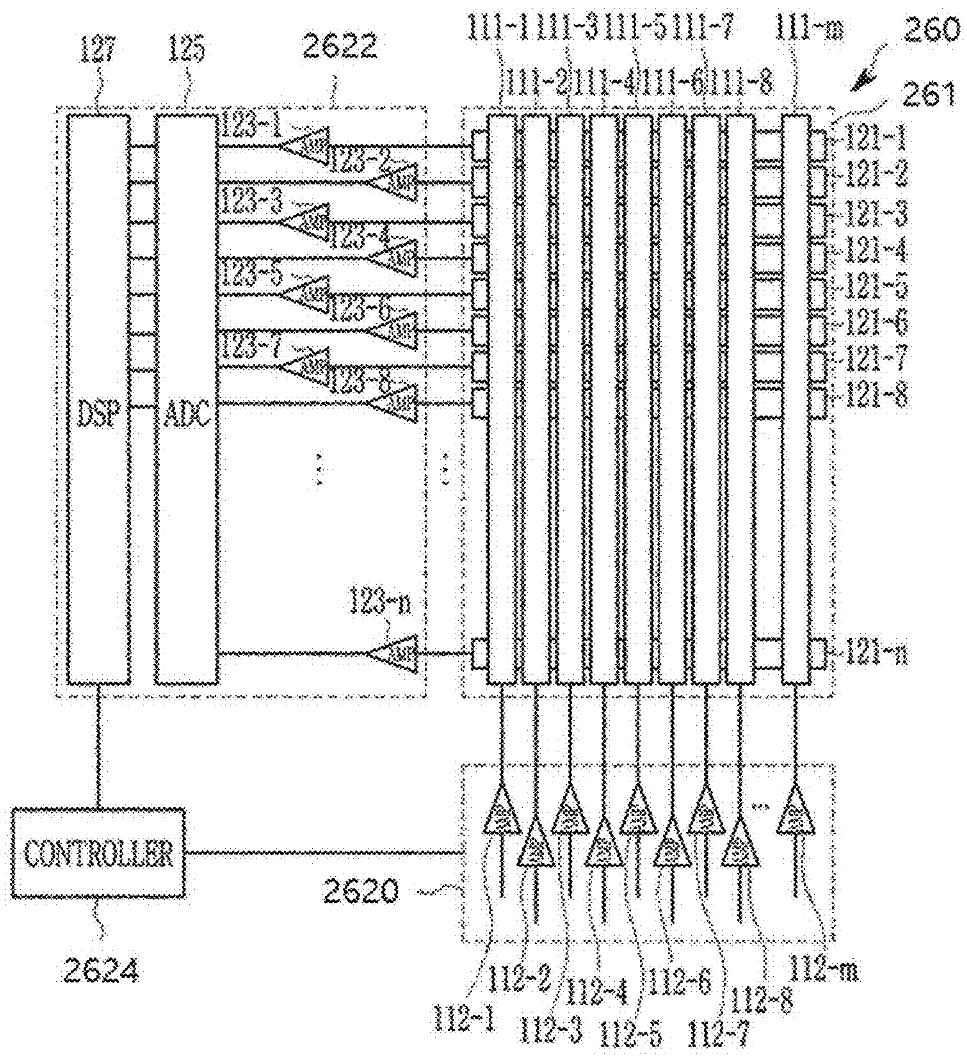
FIG. 177 is a diagram illustrating the touch sensing unit 260 operating in the first period T1 in more detail.

FIG. 177 is a diagram illustrating the touch sensing unit 260 operating in the first period T1 in more detail.

Figure 178:
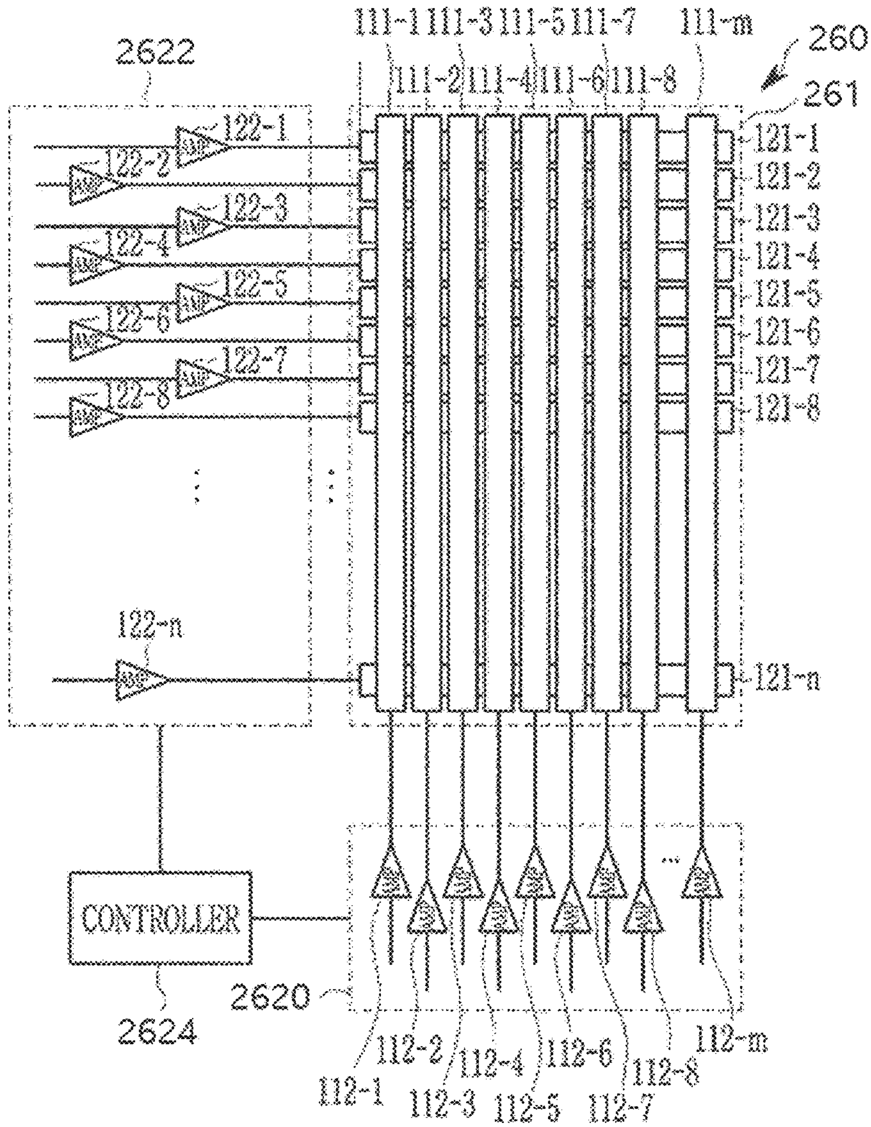
FIG. 178 is a diagram illustrating in more detail operations of the first and second driving/receiving units 2620, 2622 in the first period T1 of FIG. 177.
Figure 179:
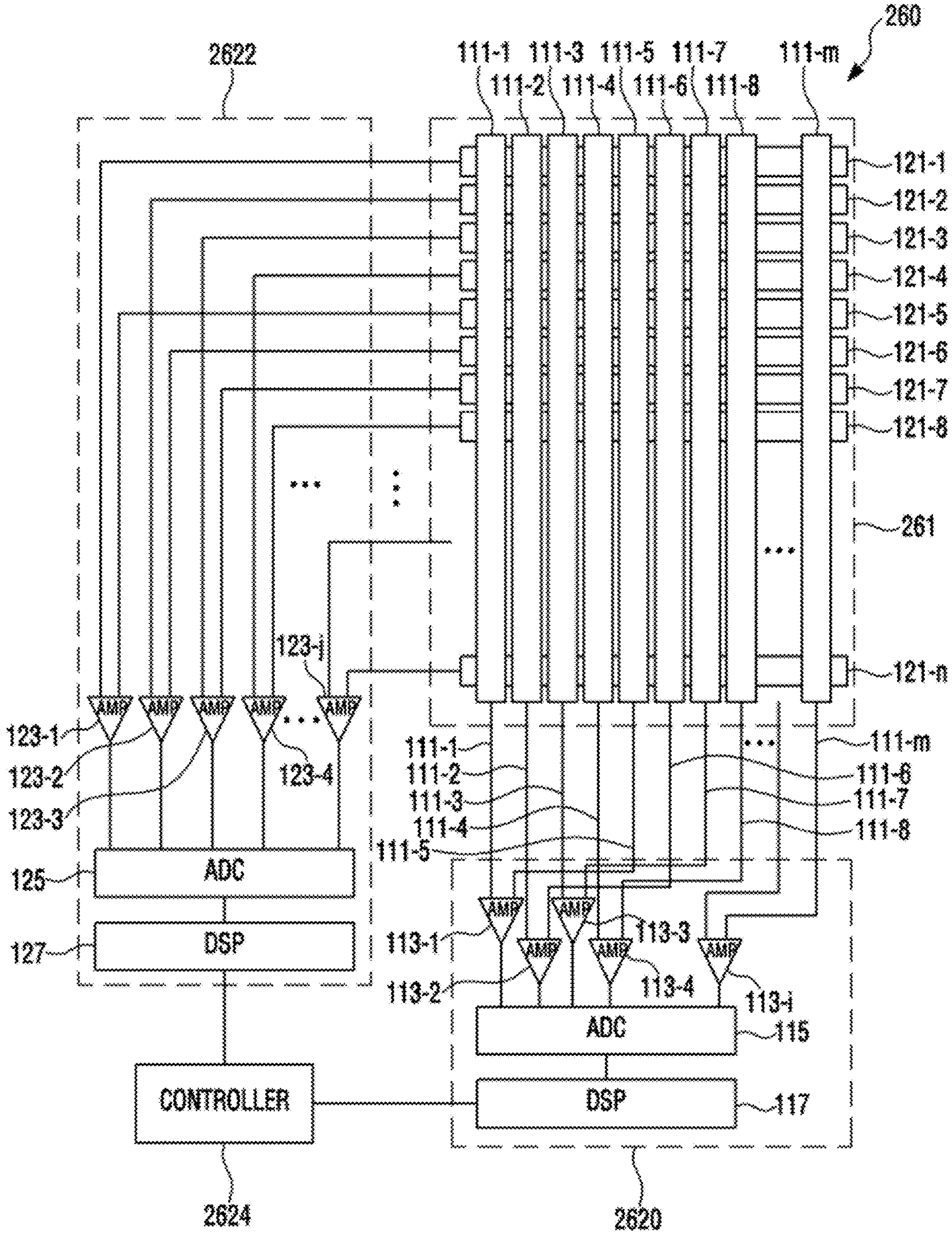
FIG. 179 is a diagram illustrating the touch device 10 operating in the second sub-period T22 of the second period T2.

Referring to FIGS. 177 to 179, the first driving/receiving unit 2620 includes a plurality of amplifiers 112-1 to **112-*m*, and a plurality of differential amplifiers (or difference amplifiers) 113-1 to 113-*i*, an analog to digital converter (ADC) unit 115, and a signal processing unit (DSP) 117**.

In addition, the second driving/receiving unit 2622 includes a plurality of first amplifiers 122-1 to **122-*n*, a plurality of second amplifiers 123-1 to 123-*j* (or a plurality of differential or difference amplifiers) 123-1 to 123-*j*, an ADC unit 125, and a signal processing unit (DSP) 127**.

FIG. 178 is a diagram illustrating in more detail operations of the first and second driving/receiving units 2620, 2622 in the first period T1 in FIG. 177.

Referring to FIG. 178, in the first period T1, the plurality of amplifiers 112-1 to **112-*m* included in the first driving/receiving unit 2620 is respectively connected to corresponding one among a plurality of first touch electrodes 111-1 to 111-*m*** through a touch channel and outputs a driving signal.

The second driving/receiving unit 2622 may sequentially receive the sensing signal of the plurality of second touch electrodes 121-1 to **121-*n* in units of one second touch electrode. Alternatively, the second driving/receiving unit 2622 may simultaneously receive the sensing signal from the plurality of second touch electrodes 121-1 to 121-*n***.

Each of the plurality of amplifiers 123-1 to **123-*n* is connected to a corresponding one of the plurality of second touch electrodes 121-1 to 121-*n*. Specifically, each of the plurality of amplifiers 123-1 to 123-*n* may be implemented as an amplifier in which one of two input terminals is connected to a ground or DC voltage and a sensing signal is input to the other input terminal. Each of the plurality of amplifiers 123-1 to 123-*n* amplifies and outputs the sensing signal transmitted from the plurality of second touch electrodes 121-1 to 121-*n*** in parallel.

In the first period T1, the ADC unit 125 of the second driving/receiving unit 2622 converts the sensing signal amplified by the plurality of second amplifiers 123-1 to **123-*n* into a digital signal, and the signal processing unit 127 processes a plurality of amplified signals converted into digital signals by the ADC unit 125 and transmits them to the control unit 2624**.

In the first period T1, the ADC unit 125 of the second driving/receiving unit 2622 converts the sensing signals amplified by the plurality of second amplifying units 123-1 to **123-*n* into digital signals of sensing data. That is, when the sensing signals amplified from the plurality of second amplifiers 123-1 to 123-*n* are input, the ADC unit 125** converts them into sensing data through periodic sampling.

The signal processing unit 127 processes the sensed data converted into a digital signal by the ADC unit 125 and transmits it to the control unit 2624.

As shown in the drawings, the plurality of amplifiers 112-1 to **112-*m* of the first driving unit 2620 is connected to the plurality of first touch electrodes 111-1 to 111-*m*, and outputs a second driving signal. The second driving unit 1210 also includes a plurality of amplifiers 122-1 to 122-*n*. The plurality of amplifiers 122-1 to 122-*n* is connected to the plurality of first touch electrodes 121-1 to 121-*n***, and outputs a third driving signal.

FIG. 179 shows the operations of the first and second driving/receiving units 2620, 2622 in the first sub-period T21 of the second period T2 in FIG. 177 in more detail.

As shown in the drawings, the plurality of amplifiers 112-1 to **112-*m* of the first driving unit 2620 is connected to the plurality of first touch electrodes 111-1 to 111-*m*, and outputs a second driving signal. The second driving unit 1210 also includes a plurality of amplifiers 122-1 to 122-*n*. The plurality of amplifiers 122-1 to 122-*n* is connected to the plurality of first touch electrodes 121-1 to 121-*n***, and outputs a third driving signal.

Next, FIG. 179 is a diagram illustrating the touch device 10 operating in the second sub-period T22 of the second period T2.

Referring to FIG. 179, in the second sub-period T22, each of the plurality of differential amplifiers (or difference amplifiers) 113-1 to **113-*i* included in the first driving/receiving unit 2620 and the plurality of differential amplifiers (or difference amplifiers) 123-1 to 123-*j* included in the the second driving/receiving unit 2620 is connected to two touch electrodes having input terminals spaced apart from each other. In addition, each of the differential amplifiers 113-1 to 113-I, 123-1 to 123-*j* may differentially amplify and output two sensing signals transmitted from the corresponding touch electrodes. Since each of the differential amplifiers 113-1 to 113-I, 123-1 to 123-*j*** receives and differentially amplifies the sensing signal from the two touch electrodes, they are not saturated even if the driving signals are simultaneously applied to the plurality of touch electrodes.

Each of the differential amplifiers 113-1 to 113-I, 123-1 to **123-*j* may receive a sensing signal from two touch electrodes spaced apart from each other instead of two adjacent touch electrodes. For example, each of the differential amplifiers 113-1 to 113-I, 123-1 to 123-*j*** receives a sensing signal from two touch electrodes spaced apart with one or more touch electrodes interposed therebetween.

In FIG. 179, the differential amplifier 113-1 receives a sensing signal from the touch electrode 111-1 and the touch electrode 111-5. When the differential amplifier 113-1 receives a sensing signal from two adjacent touch electrodes (e.g., the first touch electrode 111-1 and the first touch electrode 111-2), the values of sensing signals by a touch in the area between the first touch electrode 111-1 and the first touch electrode 111-2 are not sufficiently large even if they are differentially amplified by the differential amplifier 113-1. Therefore, when the differential amplifier 113-1 is connected to two adjacent touch electrodes, the touch sensitivity is reduced. However, since the differential amplifier 113-1 receives the sensing signal from the first touch electrode 111-1 and the first touch electrode 111-5, the sensing signal by the touch electrode at the position where a touch is input may be differentially amplified so as to have a sufficiently large value, and thereby touch sensitivity may be improved.

In the second sub-period T22, each of the ADC units 115, 125 of the first driving/receiving unit 2620 and the second driving/receiving unit 2622 converts the differentially amplified sensing signal into a digital signal. In addition, each of the signal processing units 117, 127 processes the plurality of differentially amplified signals converted into digital signals and transmits them to the control unit 2624.

In the second sub-period T22, the ADC unit 115 of the first driving/receiving unit 2620 and the ADC unit 125 of the second driving/receiving unit 2622 convert the signals amplified by the corresponding differential amplifier among a plurality of differential amplifiers 113-1 to 113-*i*, 123-1 to 123-*j* into sensing data that are digital signals. That is, when the signals amplified from the plurality of differential amplifiers 113-1 to 113-*i* are input, the ADC unit 115 converts them into sensing data through periodic sampling, and when the amplified signals from the differential amplifiers 123-1 to 123-*j* are input, the ADC unit 125 converts them into sensing data through periodic sampling.

The plurality of differential amplifiers 113-1 to 113-*i*, 123-1 to 123-*j* may be configured by changing the connection of input terminals of the plurality of amplifiers 123-1 to 123-*n*. That is, it may be $i+j \leq n$. Specifically, one input terminal to which the ground or DC voltage is connected among the two input terminals of the amplifier 123-1 may be connected to the corresponding second touch electrode 121-4, and the other input terminal to which the ground or DC voltage is connected among the two input terminals of the amplifier 123-1 may be connected to the corresponding second touch electrode 121-5.

Each of the ADC units 115, 125 converts the differentially amplified sensing signal into a digital signal. In addition, each of the signal processing units 117, 127 processes the plurality of differentially amplified signals converted into digital signals and transmits them to the control unit 2624.

Figure 180:
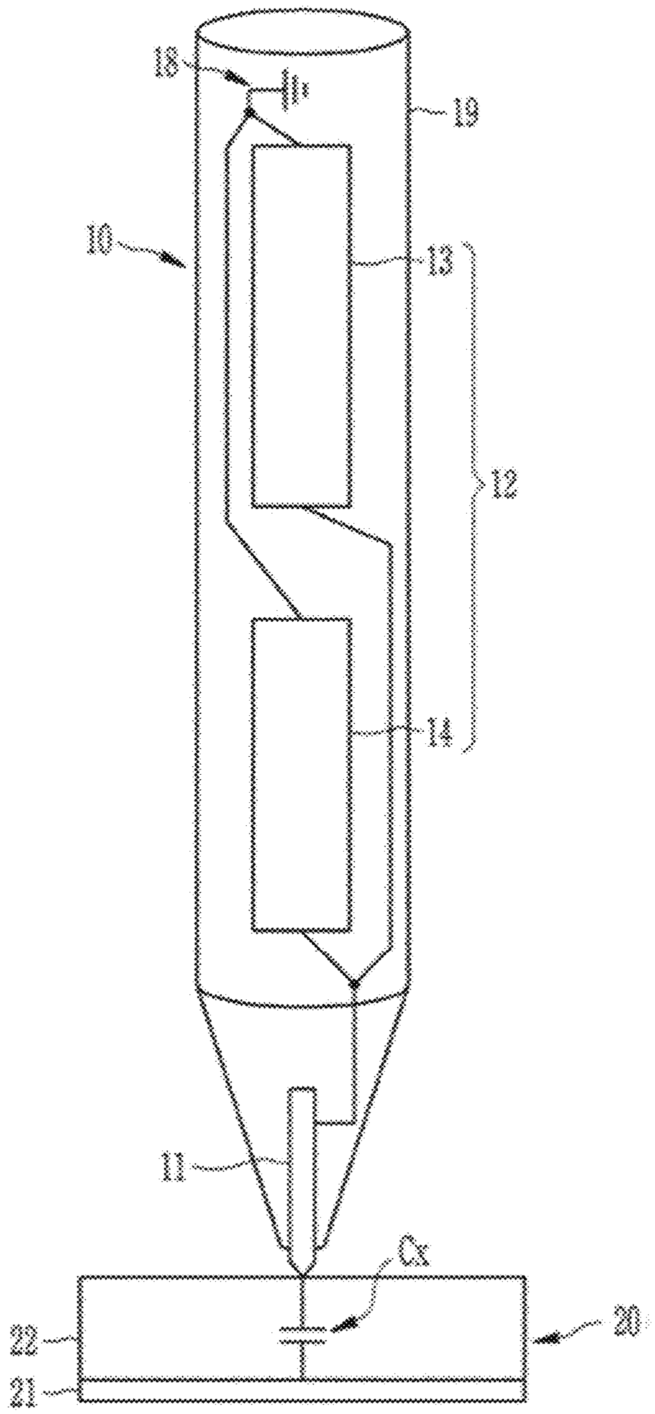
FIG. 180 is a conceptual diagram schematically illustrating a stylus pen and a touch sensor.
Figure 181:
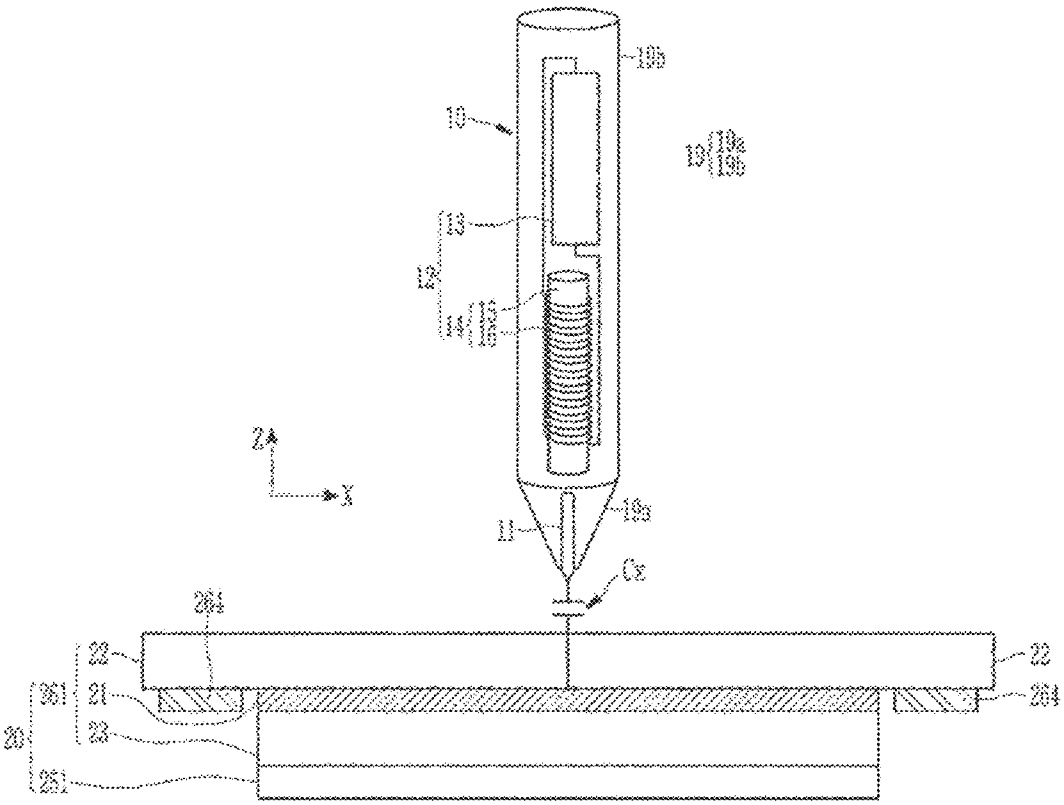
FIG. 181 is a detailed diagram illustrating a stylus pen and an electronic device in detail.

FIG. 180 is a conceptual diagram schematically illustrating a stylus pen and a touch sensor, and FIG. 181 is a detailed diagram illustrating a stylus pen and an electronic device in detail.

First, as shown in FIG. 180, the stylus pen 10 includes a conductive tip 11, a capacitor 13, an inductor 14, a ground 18, and a body 19. The capacitor 13 and the inductor 14 form the resonance circuit unit 12. Specifically, as shown in FIG. 181, the stylus pen 10 includes a conductive tip 11, a resonant circuit unit 12, and a housing 19. The resonance circuit unit 12 includes a capacitor 13 and an inductor 14. The housing 19 includes a holder portion 19*a* adjacent to the tip 11 and a body portion 19*b* spaced apart from the tip 11.

The conductive tip 11 may be connected to the capacitor 13 and/or the inductor 14 through a conductive connection member, and the conductive connection member includes a wire, a pin, a rod, a bar and the like, but it is not limited thereto. In addition, the conductive connection member may include a coil of the inductor 14.

The capacitor 13 may include a plurality of capacitors connected in parallel. Each capacitor may have a different capacitance from each other and may be trimmed within the manufacturing process.

The inductor 14 may be positioned adjacent to the conductive tip 11, and the inductor 14 may include a ferrite core and a coil 16 wound around the ferrite core 15.

The capacitor 13 and the inductor 14 are connected in parallel, and a resonance signal is generated in response to the driving signal through LC resonance of the capacitor 13 and the inductor 14.

Figure 182:
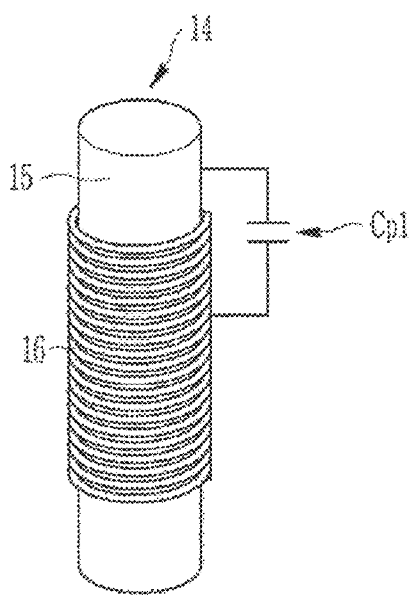
FIG. 182 is a conceptual diagram specifically illustrating the inductor part of a stylus pen.

FIG. 182 is a conceptual diagram specifically illustrating the inductor of the stylus pen.

Referring to FIG. 182, the inductor 14 includes a ferrite core 15 and a coil 16 wound around the ferrite core 15.

In this case, the inductance of the inductor 14 is determined by Equation 14 below.

$$L = \frac{\mu S N^2}{l} \quad \text{[Equation 14]}$$

As can be seen from Equation 14, the inductance is proportional to the square of the permeability of the ferrite core 15, the cross-sectional area of the coil 16, and the number of turns, and is inversely proportional to the winding length of the coil 16.

Figure 183:
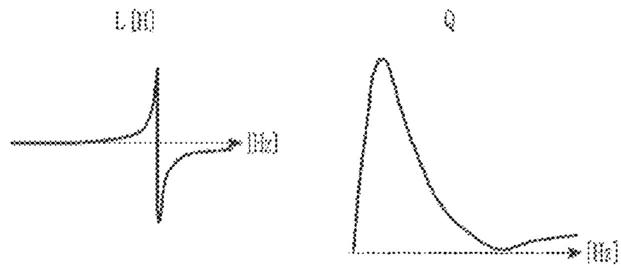

The design of the inductor 14 in the resonant circuit unit 12 accommodated in the stylus pen, in particular, the capacitive resonance stylus pen is very important. In particular, in designing the inductor, as shown in FIG. 183, the inductance L and the Q value are very important parameters. Here, the Q value is a quantity representing the coil characteristics as a resonant circuit element, and is given by $Q=2\pi fL/R$. Here, L and R are the inductance and resistance of the coil, respectively, and f is the frequency. As a coil with a larger Q value is used, sharp resonance characteristics can be obtained.

In the design of a stylus pen, in particular, a capacitive resonance stylus pen, L must have a sufficiently large self-resonance frequency for the frequency to be used, and the Q value preferably has a maximum value at the frequency to be used. In order to satisfy this, the material of the ferrite core, the wire type of the coil, and the winding method should be optimized. In addition, there is a need for a method capable of obtaining a high output signal while maintaining a diameter of a thin pen.

In the following embodiments, a design method of the most optimized capacitive resonance stylus pen among a plurality of ferrite core materials, coil wire types, and winding methods will be described.

(1) Material of Ferrite Core:

Manganese (Mn) and nickel (Ni) were used as the material of the ferrite core in this embodiment.

(2) Wire Type:

An enameled wire and a Litz wire were used as the wire type of the coil in this embodiment.

Figure 184:
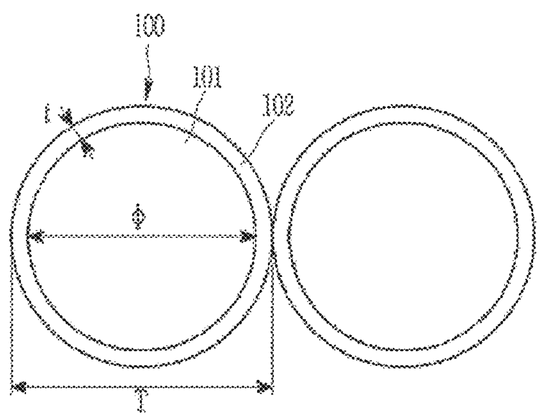

As shown in FIG. 184, the enameled wire 100 is a wire made by coating the insulating enamel 102 on the surface of the copper wire 101 and heating it to a high temperature, and is used for windings and wiring of electrical equipment, communication equipment, electric instruments, etc. In the present embodiment, an enameled wire having a total thickness T of 0.2 mm, a wire diameter Φ of 0.18 mm, and a coating thickness t of 0.01 mm was used.

Figure 185:
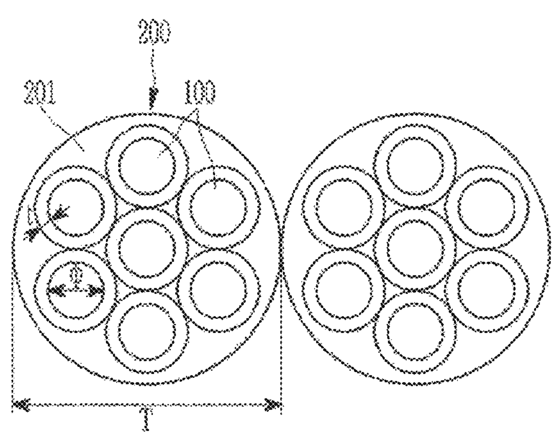

As shown in FIG. 185, the LITZ wire 200 is made by twisting several strands of thin insulated wire 100 (e.g., enamel wire) having a diameter of about 0.1 mm into one line. It is a special insulated wire with an insulating coating 201 of nylon, etc on it. The Litz wire 200 can reduce the skin effect by increasing the surface area, and is used for a coil of a high-frequency circuit.

In the present embodiment, a Litz wire having a total thickness T of 0.2 mm, a wire diameter Φ of 0.06 mm, and a covering thickness t of 0.007 mm was used.

(3) Winding Method:

In an embodiment of the present invention, in order to obtain a sufficient inductance value (i.e., a sufficient number of windings) in a limited space of a stylus pen, a winding method having a multi-layer winding structure was used. Specifically, two types of multi-layer winding methods were used as shown in FIGS. 186A and 186B.

Figure 186A:
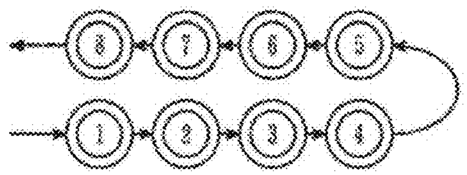

The winding method in FIG. 186A is the simplest winding method and is a sequential layer winding method in which the upper layer is wound immediately after the winding of the lower layer is finished. Here, the method in FIG. 186A is a method in which the winding of the upper layer starts immediately at the point where the winding of the previous layer ends, and hereinafter this is referred to as a U-type winding method.

Figure 186B:
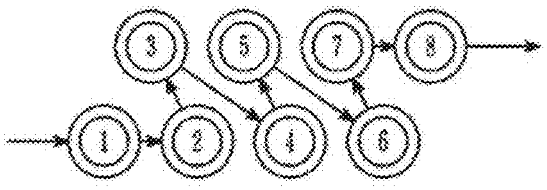

The winding method in FIG. 186B is a method in which adjacent winding layers are alternately wound (alternate layer winding method), and the windings of adjacent layers are wound in a zigzag oblique manner. Hereinafter, this is referred to as a zigzag type winding method. This zigzag-type winding method can minimize a voltage difference between windings of adjacent layers, thereby reducing winding self-capacitance. In this case, the winding self-capacitance, which is a type of parasitic capacitance, is a parameter representing electric field energy stored in the winding.

Comparative Experiment 1 (Comparison of Characteristic Values by Material):

The Q value was measured by changing the material of the ferrite core to manganese, nickel, and magnesium while winding the coil wire in an enameled wire or U-type winding method.

As a result of the measurement, there was almost no difference in the characteristics of the Q value for each material of each core, and the measured Q value was also quite insufficient to implement as a product.

Comparative Experiment 2 (Comparison of Characteristic Values by Type of Winding):

In the state in which the material of the ferrite core is manganese (Mn) and the U-type winding method was wound, the Q values were measured for inductor 1 and inductor 2 manufactured by using enameled wire and Litz wire as the wire types of the coil, respectively.

Figure 187:
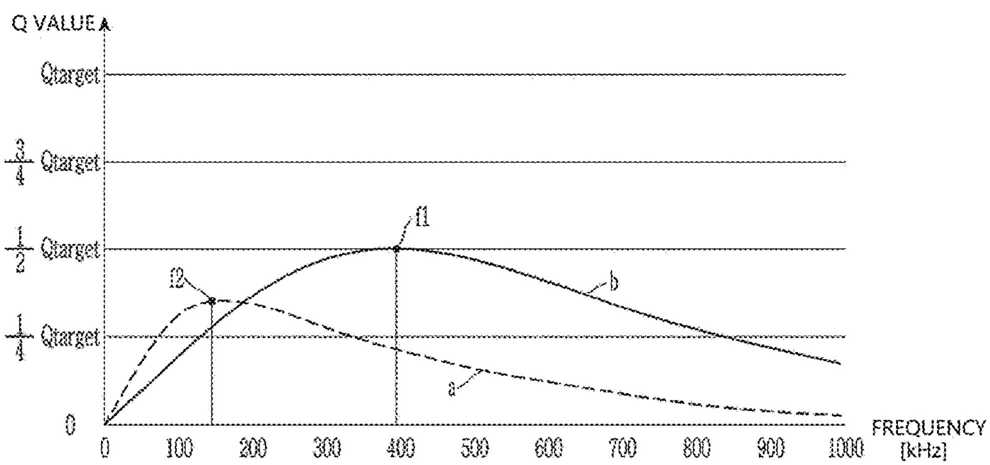

FIG. 187 is a view showing the Q values of inductor 1 and inductor 2 measured while changing the frequency through the E4980A precision LCR meter of KEYSIGHT TECHNOLOGIES.

In FIG. 187, "a" is a waveform showing the change in Q value with respect to the frequency of inductor 1 (manganese core/enamel wire/U-type winding method), "b" is a waveform showing the change of Q value with respect to the frequency of inductor 2 (manganese core/Litz wire/U-type winding method).

In inductor 2 made of Litz wire, the Q value shows almost the maximum value at a frequency f1 around 400 kHz, and in inductor 1 made of enamel wire, the Q value shows almost the maximum value at a frequency f2 near 150 kHz.

As a result of comparing "a" and "b" in FIG. 187, it can be seen that the maximum Q value of inductor 2 is approximately 1.5 times higher than the maximum Q value of inductor 1. Accordingly, it can be seen that the Litz wire is superior to the enamel wire as the coil of the inductor forming the resonance circuit of the stylus pen.

However, the maximum Q value of inductor 2 measured in Comparative Experiment 2 was only about ½ of the target value Qtarget required for commercialization.

Comparative Experiment 3 (Comparison of Characteristic Values by Winding Method):

In a state where the material of the ferrite core was manganese (Mn), the Q values were measured for inductors 3 to 5 manufactured by changing the wire type to enameled wire and Litz wire and the winding method to U type and zigzag type.

Figure 188:
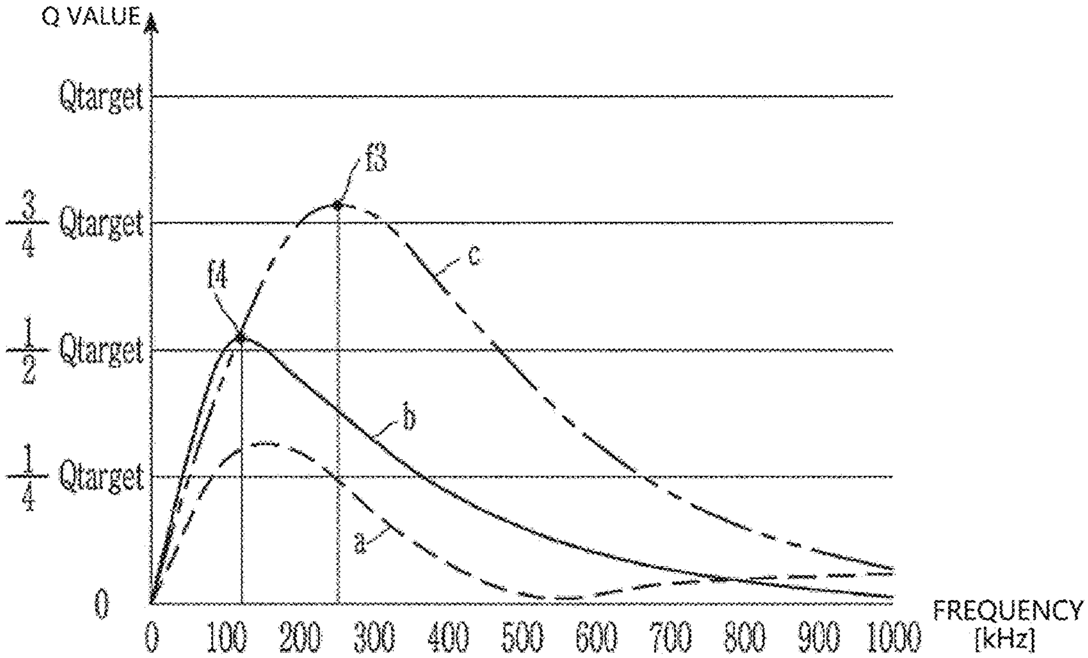

FIG. 188 is a view showing the Q values of inductors 3 to 5 measured while changing the frequency through the E4980A precision LCR meter of KEYSIGHT TECHNOLOGIES.

In FIG. 188, "a" is a waveform showing the change in Q value with respect to frequency of inductor 3 (manganese core/enamel wire/U-type winding method), and "b" is a waveform indicating the change of Q value with respect to frequency of inductor 4 (manganese core/enamel wire/zigzag type winding method), and "c" is a waveform indicating the change of Q value with respect to frequency of inductor 5 (manganese core/Litz wire/zigzag type winding method).

As can be seen from the waveform "c" in FIG. 188, in the inductor 5 manufactured by the Litz wire/zigzag winding method, the Q value exhibits a nearly maximum value at a frequency f3 near 300 kHz. In inductor 4 manufactured with enameled wire/ziz-zag winding method and inductor 3 manufactured with enameled wire/U-type winding method, the Q value shows almost the maximum at a frequency f2 around 150 kHz.

In addition, as a result of comparing "a", "b", and "c" in FIG. 188, it can be seen that the maximum Q value of inductor 5 is approximately 1.5 times higher than the maximum Q value of inductor 4, and is more than twice higher than the maximum Q value of inductor 3. Accordingly, as for the winding method of the inductor forming the resonance circuit of the stylus pen, it can be seen that the zigzag winding method is superior to the U type winding method.

However, it was only about ¾ of the target value Qtarget required for commercialization of inductor 5 (manganese core/Litz wire/zigzag-type winding method) measured in Comparative Experiment 2.

Comparative Experiment 4 (Comparison of Characteristic Values by Core Material):

In this embodiment, manganese and nickel are used as the material of the ferrite core, and it is known that the magnetic permeability of nickel is usually 200 to 300, and the magnetic permeability of manganese is 3000 to 5000.

Since manganese used in this embodiment has a magnetic permeability approximately 15 times higher than that of nickel, assuming that the cross-sectional area and length of the coils are the same, the number of windings of manganese is reduced by approximately 4 times than the number of windings of nickel in order to obtain the same inductance value, which is an advantage. Therefore, from the viewpoint of the number of turns, it can be seen that it is effective to use manganese rather than nickel.

Meanwhile, since the inductor 14 has a complex structure including a coil wound around a core, parasitic capacitance is additionally formed. Since the Q value is reduced by such parasitic capacitance, there is a problem of reducing the amplitude of a resonance signal.

The parasitic capacitance formed in the inductor 14 may occur between the wound coils and between the core and the coil. As described above, the parasitic capacitance between the wound coils can be reduced by adopting the zigzag type winding method.

Meanwhile, in this embodiment, in order to reduce the parasitic capacitance between the core and the coil, a core material having a lower permittivity than manganese was tested, and it was confirmed that the nickel core was the optimal material for the ferrite core.

In manganese and nickel, which are mainly used as ferrite core elements, an important physical property is permeability, which has an important influence on the inductance value as shown in Equation 14. However, in manganese and nickel as ferrite devices, permittivity is a physical property of little interest, and in fact, in the case of nickel, there is no relevant information in the data sheet provided by manufacturers.

In this embodiment, in order to confirm the dielectric constants of manganese and nickel, KEYSIGHT TECHNOLOGIES E4980A precision LCR meter was used to measure the permittivity of manganese and nickel, and the measurement results are shown in Table 1 below.

TABLE 1

| | Manganese Permittivity | Nickel Permittivity |
|---|---|---|
| Measurement 1 | 2400 | — |
| Measurement 2 | 8300 | 2 |

Measurement 1 and Measurement 2 were measured using the same KEYSIGHT TECHNOLOGIES E4980A precision LCR meter, and Measurement 1 represents the dielectric constant calculated automatically by the measurement software. According to Measurement 1, it can be seen that the dielectric constant of manganese is 2400, but the dielectric constant of nickel is not measured.

Measurement 2 was a method in which the dielectric constant was calculated by measuring the capacitance, area, and distance between the ferrite cores. According to Measurement 2, the dielectric constant of manganese was 8300 and that of nickel was measured as 2.

There is a large difference in the dielectric constant results between measurement 1 and measurement 2, and in particular, in the case of measurement 2, it was confirmed that the error was significant depending on capacitance, area, distance, etc. However, as a result of Measurement 1 and Measurement 2, it can be seen that the dielectric constant of nickel compared to manganese is at least 1/1000 smaller.

In Comparative Experiment 4, the Q values were measured for inductors 6 and 7 manufactured by changing the winding method to U-type and zig-zag-type with nickel as the material of the ferrite core and Litz wire as the wire type.

Figure 189:
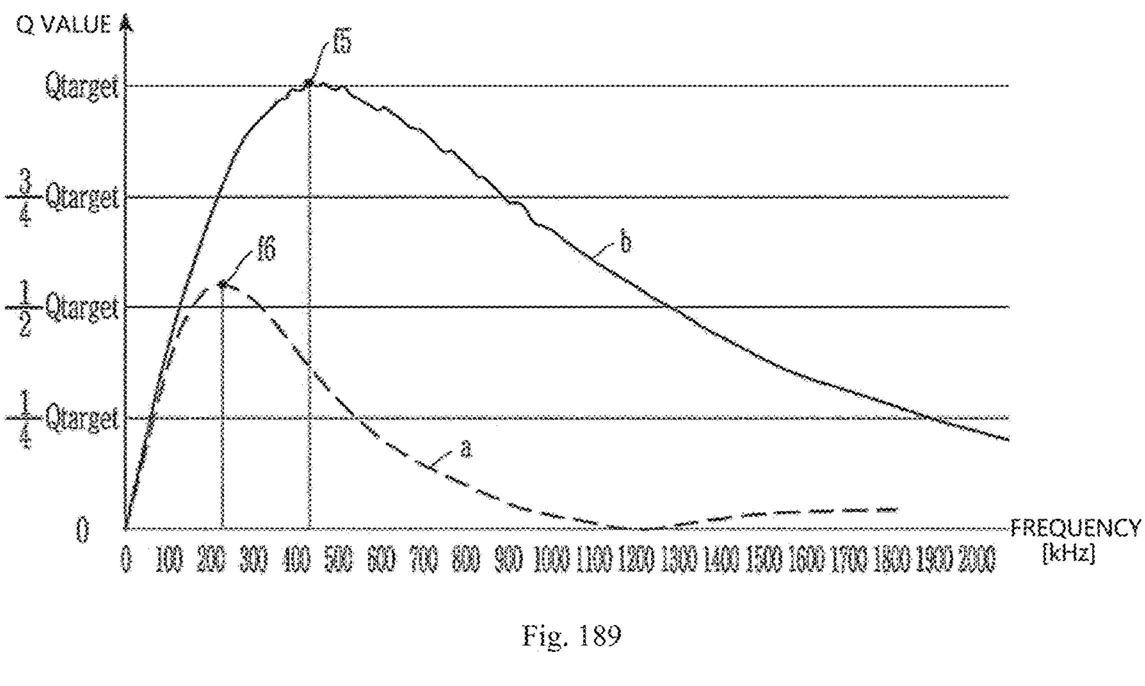

FIG. 189 is a view showing the Q values of inductor 6 and inductor 7 measured while changing the frequency through the E4980A precision LCR meter of KEYSIGHT TECHNOLOGIES.

In FIG. 189, "a" is a waveform showing the change in Q value with respect to the frequency of inductor 6 (nickel core/Litz wire/U-type winding method), and "b" is a waveform showing the change of Q value with respect to the frequency of inductor 7 (nickel core/Litz wire/zigzag type winding method).

As can be seen from the waveform "b" in FIG. 189, in the inductor 7 manufactured by the nickel core/Litz wire/zigzag winding method, the Q value exhibits a maximum value at a frequency f5 near 400 kHz. In the inductor 6 manufactured with nickel core/Litz wire/U-type winding method, the Q value shows almost the maximum at the frequency f6 around 200 kHz. As a result of comparing "a" and "b" in FIG. 189, it can be seen that the maximum Q value of the inductor 7 is approximately twice higher than the maximum Q value of the inductor 6.

Meanwhile, it was found that the maximum Q value of inductor 7 (nickel core/Litz wire/zigzag type winding method) measured in Comparative Experiment 4 almost reached the target value Qtarget required for commercialization.

In Comparative Experiments 1 to 4 described above, inductors were manufactured and tested for Q values while changing combinations of ferrite core material, coil wire type, and winding method, and as a result of the test, when an inductor of a capacitive resonance stylus pen was designed with nickel core/Litz wire/zigzag type winding method was found that the highest Q value was obtained. In addition, it was found that the maximum Q value of the inductor manufactured by this combination reached the target value Qtarget for commercialization.

On the other hand, in this embodiment, a nickel core was used as the ferrite core and a Litz wire was used as the core wire type, but a material having a dielectric constant of 1000 or less is used as the ferrite core other than the nickel core. A similar result may be obtained when a type of wire with a single coil wrapping two or more insulated strands is used, in addition to the Litz wire.

In this embodiment, a method of increasing the distance may be used by providing a bobbin between the core and the coil in order to further reduce the parasitic capacitance between the core and the coil, in addition to using nickel having a lower permittivity than manganese, as described below.

Figure 190:
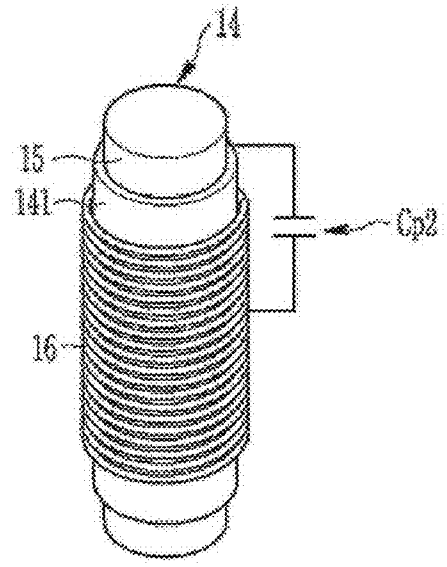

Referring to FIG. 190, the inductor 14 includes a ferrite core 15, a bobbin 141 surrounding at least a portion of the ferrite core 15, and a coil 16 wound around at least a portion of the bobbin 141. The bobbin 141 may be fixed by being in close contact with the ferrite core 15 by the force caused by the winding of the coil 16. The bobbin 141 may include the same or different material as that of the body 19, for example, plastic or a metal which surface is insulated. Specifically, the bobbin 141 may be formed of polyphenylene sulfide (PPS), liquid crystal polyester (LCP), polybutylene terephthalate (PBT), polyethylene terephthalate (PET), or a phenol-based resin.

As such, when the bobbin 141 surrounds the ferrite core 15 and the bobbin 141 is wound by the coil 16, the distance between the ferrite core 15 and the coil 16 increases, and thereby the value of the parasitic capacitance Cp2 in FIG. 190 may be set to be smaller than the value of the parasitic capacitance Cp1 in FIG. 182.

Referring to FIG. 191, when the inductor 14 includes only the ferrite core 15 and the coil 16, the maximum amplitude of the resonance signal was measured to be about 2V (+1V to −1V). Referring to FIG. 192, when the inductor 14 includes the ferrite core 15, the bobbin 141 and the coil 16, the maximum amplitude of the resonance signal is measured to be about 4V (+2V to −2V). That is, when at least a portion of the ferrite core 15 is wrapped with the bobbin 141 and the coil 16 is wound on the bobbin 141, it can be seen that the amplitude of the resonance signal is larger.

On the other hand, when nickel is used as a ferrite core to design an optimal inductor according to the present embodiment, as described above, nickel has a magnetic permeability that is 1/15 times lower than that of manganese. Thus, in order to obtain the same inductance value, the number of turns of nickel must be increased by approximately four times the number of turns of manganese. Accordingly, in order to obtain the same inductance, there is a disadvantage that the diameter must be larger than that of manganese.

This embodiment proposes a method of using a plurality of inductors in order to obtain a high output signal while reducing a diameter of a stylus pen.

FIG. 193 shows an equivalent circuit in which two thin-diameter inductors are connected in series and a capacitor is connected in parallel between both ends of the two inductors. Hereinafter, this type of resonance circuit is referred to as an "LLC resonance circuit". Although it is illustrated in FIG. 193 that two inductors are connected in series, the present embodiment is not limited thereto, and three or more inductors may be connected in series. According to the LLC resonance circuit, compared to a resonance circuit having an inductor and a capacitor (hereinafter, referred to as an "LC resonance circuit"), since the inductance L is doubled, the capacitance must be reduced by ½ for the design of a capacitor. That is, the LLC resonance circuit can have a thinner diameter compared to the LC resonance circuit, but it has a disadvantage in that it is more sensitive to the effect on capacitance.

Meanwhile, FIG. 194 is a diagram illustrating an equivalent circuit of a method in which two LC resonance circuits are connected in series (hereinafter, referred to as an "LCLC resonance circuit") and a method of combining and outputting two resonance signals. Although it is illustrated in FIG. 194 that two LC resonance circuits are connected in series, the present embodiment is not limited thereto, and three or more LC resonance circuits may be connected in series.

According to the LCLC resonance circuit, since the resonance frequencies of the two resonance circuits must be the same, there is a disadvantage in that the resonance frequencies of the respective resonance circuits must be tuned to be the same in the manufacturing process.

As described above, despite the increase in the number of windings generated by using nickel as the ferrite core, when two or more inductors are used as shown in FIGS. 193 and 194, it is possible to manufacture a stylus pen having a thin diameter by suppressing an increase in the diameter of an inductor.

Meanwhile, as shown in FIG. 193, in the case of using the LLC resonance circuit, a stylus pen having a structure described below may be adopted in order to minimize the effect on the capacitance reduced to ½.

In other words, even when the stylus pen 10 is in a hovering state, the touch controller 262 may receive the sensing signal by the signal RS transmitted to the touch electrode 21. According to the sensing signal, when the touch controller 262 generates touch data, touch data not intended by a user may be generated, whereby inaccurate or unstable touch data may be generated.

A touch input by transmission of the resonance signal RS in the hovering state will be described with reference to FIGS. 195A and 195B.

FIGS. 195A and 195B are a diagram illustrating a touch input by hovering of a stylus pen. For example, when writing by a user, in order to write a previous stroke and then write a next stroke, the stylus pen 10 in the touch screen 20 may move from the end point A of the previous stroke to the start point C of the next stroke.

The conductive tip 11 of the stylus pen 10 contacts the window 22 at one point A and contacts the window 22 at another point C. Resonance signals RS0, RS2 from the conductive tip 11 in contact with the window 22 may be transmitted to the touch electrode 21. Touch data corresponding to one point A are generated by the resonance signal RS0, and touch data corresponding to another point C are generated by the resonance signal RS2.

In the area B between one point A and another point C, the stylus pen 10 is spaced apart from the window 22. That is, in the area B, the stylus pen 10 is in a hovering state. The resonance signal RS0 from the conductive tip 11 of the stylus pen 10 in the hovering state may be transmitted to the touch electrode 21. Touch data corresponding to the connection stroke NL of the area B are generated by the resonance signal RS1. That is, when the touch controller 262 generates touch data according to the resonance signal RS1 transmitted from the stylus pen 10 in the hovering state, touch data corresponding to a connection stroke not intended by a user are generated and displayed on the touch screen 20.

Embodiments provide a stylus pen that prevents transmission of a resonance signal in the stylus pen in a hovering state.

On the other hand, a user grips the stylus pen 10, and touches the touch screen 20 with the conductive tip 11. In this regard, it will be described with reference to FIGS. 196 to 199.

FIGS. 196A and 196B are a conceptual diagram illustrating the stylus pen and the electronic device when the stylus pen is gripped, FIG. 197 is a schematic circuit diagram illustrating the stylus pen and the electronic device when the stylus pen is gripped, and FIGS. 198 and 199 are schematic circuit diagrams showing a stylus pen and an electronic device when holding the stylus pen.

As shown in FIG. 196A, a user 40 holds the stylus pen 10 and contacts the tip of the stylus pen 10 with the touch screen 20 for a touch input.

As shown in FIG. 196B, the stylus pen 10 includes a conductive tip 11, a resonance circuit 12 connected to the conductive tip 11, a ground 18, and a housing 19. The resonance circuit unit 12 includes a capacitor 13 and an inductor 14. The housing 19 includes a holder portion 19*a* adjacent to the tip 11 and a body portion 19*b* spaced apart from the tip 11.

The inductor 14 includes a ferrite core 15 and a coil 16 wound around the ferrite core 15. The inductance of the inductor 14 is proportional to the square of the magnetic coefficient, the cross-sectional area S of the coil 16 and the number of turns N, by L=μSN2/l, and is inversely proportional to the length l of the coil 16.

The stylus pen 10 is gripped by the user's fingers 40, and in this case, parasitic capacitances Cf1, Cf2 may be formed by the fingers 40 and the internal conductor of the stylus pen 10 (coil 16, conductive wire by which each element of the stylus pen 10 is connected, etc.).

Referring to FIG. 197, the parasitic capacitance Cf by the user's hand 40 is shown. That is, the resonance frequency of the stylus pen 10 is changed by the parasitic capacitance Cf. Then, the frequency of the driving signal 30 and the resonance frequency of the stylus pen 10 do not match, so there occurs a problem in that the level of the signal output from the stylus pen 10 is reduced.

Referring to FIGS. 198 and 199, the parasitic capacitance Cf by the user's hand 40 is shown. That is, the resonance frequency of the stylus pen 10 is changed by the parasitic capacitance Cf. Then, the frequency of the driving signal 30 and the resonance frequency of the stylus pen 10 do not match, and there occurs a problem in that the level of the signal output from the stylus pen 10 is reduced.

Here, the effect of the parasitic capacitance Cf in the LLC circuit is greater than that in the LC resonance circuit or the LCLC resonance circuit. This is because the capacitance of the LLC resonance circuit is smaller than the capacitance of the LC resonance circuit or the LCLC resonance circuit by ½ when designed with the same resonant frequency.

Hereinafter, a stylus pen that prevents a change in the resonance frequency by a user's grip will be described with reference to FIG. 200.

FIG. 200 is a conceptual diagram illustrating a stylus pen having an LLC structure.

As shown in FIG. 200, the stylus pen 10 includes a conductive tip 11, a capacitor 13, two inductors 14, 14', a blocking member 17, a ground 18, and a body 19.

The inductors 14, 14' respectively include two ferrite cores 15, 15', and coils 16, 16' wound around the ferrite cores 15, 15'. In this case, the two inductors 14, 14' are connected in series.

FIG. 201 is a conceptual diagram illustrating a stylus pen.

Compared with the stylus pen 10 in FIG. 196, the stylus pen 10 shown in FIG. 201 further includes a blocking member 17.

The blocking member 17 is a conductive member surrounding the capacitor 13 and the inductors 14, 14', and may prevent formation of parasitic capacitance by a user's hand. The blocking member 17 is a conductive member that surrounds at least a portion of the housing 19 or a conductive member that is at least a portion of the housing 19, and may prevent formation of parasitic capacitance by a user's hand.

However, the blocking member 17 has a problem of generating an eddy current. In this case, the blocking member 17 may be designed such that both ends of the blocking member 17 are spaced apart along the direction ED of the eddy current in order to minimize the influence of the eddy current generated by the stylus pen.

In this regard, it will be described with reference to FIGS. 202A and 202B.

FIGS. 202A and 202B are an exemplary view illustrating an eddy current generated in the stylus pen shown in FIG. 201.

As shown in FIG. 202A, a clockwise-current flows through the coils 16, 16' by the driving signal transmitted from the conductive tip 11, and a magnetic field is formed by the current flowing through the coils 16, 16'. Alternatively, as shown in FIG. 202, a current I1 flows in the coil 16 due to resonance. A magnetic field M1 is formed by the current I1 flowing through the coil 16.

In this case, an eddy current is formed in a counterclockwise direction opposite to the current direction of the coil by a change in the magnetic field generated by the current of the coil, and a clockwise eddy current flows through the blocking member 17. A current I2 in a predetermined direction is formed in the blocking member 17 by the magnetic field M1. The current I2 may be formed on a plane perpendicular to the direction of the magnetic field M1 formed by the inductor 140. These currents I2 are combined to generate an eddy current I3 in a clockwise direction as shown in FIG. 202B.

The magnetic field M1 generated in the coil 16 is suppressed by this eddy current I3. Then, the inductance of the inductor 14 changes, and a problem occurs that the resonance frequency of the stylus pen 11 changes according to the change in inductance.

Embodiments provide a stylus pen that further prevents a change in a resonance frequency caused by a user's grip and eddy current generation.

FIGS. 203A to 211D are conceptual views illustrating a structure of a stylus pen according to embodiments.

FIGS. 203A to 203D show a stylus pen that prevents transmission of a resonance signal from the stylus pen in a hovering state, and FIGS. 204A to 204D show a stylus that further prevents transmission of a resonance signal from the stylus pen in a hovering state and a change in resonance frequency due to eddy current generation 205, 206. FIGS. 205A to 206D show a stylus pen that further prevents the transmission of a resonance signal in the stylus pen in a hovering state and a change in the resonance frequency caused by a user's grip and eddy current generation, and FIGS. 207A to 211D show a stylus pen that further prevents a change in the resonance frequency caused by the user's grip and eddy current generation.

The stylus pen 100 in FIGS. 203A to 211D may include a conductive tip 110, a resonance circuit unit, a blocking member 170, a ground 180, and a housing 190. For convenience of explanation, only the inductor 140 of the resonance circuit unit is illustrated in FIGS. 203A to 211D, but the resonance circuit unit includes a capacitor, and the capacitor may be located inside the housing 190.

The conductive tip 110 is electrically connected to the capacitor (not shown therein) and the inductor 140. For example, the conductive tip 110 is directly connected to the capacitor (not shown therein) and the inductor 140 through a conductive connection member 112, or the like.

Referring to FIGS. 203A to 211D, all or part of the conductive tip 110 may be formed of a conductive material (e.g., metal), or the conductive tip 110 may be present inside a non-conductive housing while the conductive tip 110 a part of which may have a form exposed to the outside through an opening provided in the housing, but it is not limited thereto.

The conductive connection member 112 is a member having conductivity, and may be a wiring, a wire, a pin, a rod, a bar, etc., but it is not limited thereto.

The capacitor (not shown therein) and the inductor 140 are located in the housing 190. The capacitor (not shown therein) may include a plurality of capacitors connected in parallel. Each capacitor may have a different capacitance from each other and may be trimmed within a manufacturing process. The inductor 140 may be positioned to be spaced apart from the conductive tip 110 by a first distance d1.

The housing 190 may accommodate the elements of the stylus pen 100. Since the housing 190 has an empty interior, the conductive tip 110, the resonance circuit unit, and the ground 180 can be accommodated therein. The housing 190 may be made of a non-conductive material.

The housing 190 includes a holder portion 190*a* adjacent to the conductive tip 110 and a body portion 190*b* spaced apart from the conductive tip 110. The holder portion 190*a* and the body portion 190*b* may be integrally formed. Although the holder portion 190*a* and the body portion 190*b* are shown as being integrally coupled, the holder portion 190*a* and the body portion 190*b* may be separated.

Figure 203A:
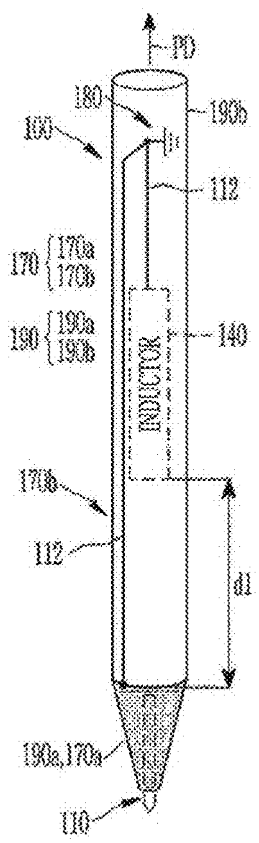
Figure 203B:
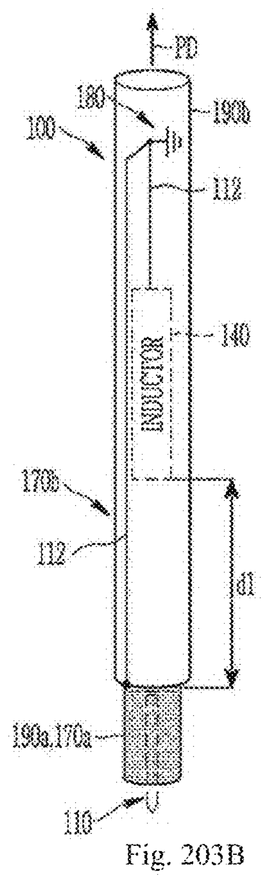
Figure 203C:
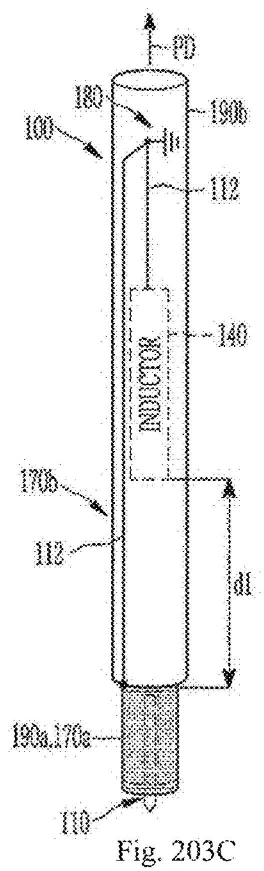

The holder portion 190*a* may be in the form of a truncated cone shown in FIG. 203A or a pillar shape in FIG. 203B. Alternatively, the holder portion 190*a* may be in the form of a column to which the dome 192 in FIG. 203C is coupled. Alternatively, the holder portion 190*a* may be in the form of a pipe in FIG. 203D.

The body portion 190*b* may have a cylinder, a polygonal pillar, a pillar shape having at least a portion of a curved surface, an entasis shape, a frustum of pyramid shape, a circular truncated cone shape, etc., the shape thereof is not limited thereto.

The blocking member 170*a* may be positioned to correspond to a portion of the housing 190 where the conductive tip 110 is exposed to the outside. For example, the blocking member 170*a* may be located within 0 mm to 20 mm from the opening of the holder portion 190*a* through which the conductive tip 110 is exposed to the outside. Specifically, the blocking member 170*a* may be positioned between the opening of the holder portion 190*a* and a portion spaced apart by 20 mm from the opening of the holder portion 190*a*. In addition, the blocking member 170*a* is between a part spaced apart 0.1 mm or more from the opening of the holder portion 190*a* and a part spaced 10 mm from the opening of the holder portion 190*a*, a part spaced apart from the opening by 1 mm or more and the holder portion 190*a* between the portions spaced 5 mm from the opening. That is, the blocking member 170*a* may be located in an area adjacent to a portion of the housing to which the conductive tip 110 is exposed to the outside by at least 20 mm.

The blocking member 170*a* may be a conductive member surrounding at least a portion of the holder portion 190*a*. The blocking member 170*a* may be a conductive member that is at least a part of the holder portion 190*a*. The blocking member 170*a* may be connected to the ground 180 through the conductive connection member 112. The blocking member 170*a* is electrically connected to the ground 180, thereby being grounded.

The blocking member 170*a* may be located inside or outside the holder portion 190*a*. That is, it may be attached to the inner or outer surface of the holder portion 190*a*, or may be spaced apart from the inner surface of the holder portion 190*a* by a predetermined distance to be accommodated in the holder portion 190*a*. In FIGS. 203A to 203D, the conductive tip 110 is illustrated as being located inside the holder portion 190*a*, but when the conductive tip 110 extends into the body portion 190*b*, the blocking member 170*a* may be located inside or outside of the body portion 190*b*. That is, it may be attached to the inner surface or the outer surface of the body portion 190*b*, or may be spaced apart from the inner surface of the body portion 190*b* by a predetermined distance to be accommodated in the body portion 190*b*.

Although not shown in a separate drawing, the blocking member 170*a* may surround at least a portion of the capacitor and the inductor 140 depending on the positions of the capacitor and the inductor 140. For example, when the capacitor and the inductor 140 are positioned inside the holder portion 190*a*, the blocking member 170*a* may surround at least a portion of the capacitor and the inductor 140.

As shown in FIGS. 203A to 203D, when the inductor 140 is spaced apart from the blocking member 170*a* by a predetermined distance or more, the blocking member 170*a* may have the shape of a single conductive plate. That is, the blocking member 170*a* may have a smooth surface or a plate-shaped member having a dot, stripe, or grid-type surface protrusion structure. In addition, the blocking member 170*a* may be a conductive coil in the holder portion 190*a*. For example, the blocking member 170*a* may be a conductive coil wound while being in contact with the inside of the holder portion 190*a*.

The blocking member 170*a* is spaced apart from the ferrite core of the inductor 140 by a first distance d1 along the direction PD. Even if the blocking member 170*a* is not formed of a plurality of blocking portions, the influence by the magnetic field formed by the ferrite core of the inductor 140 is small.

In FIG. 203A, the blocking member 170*a* may have a shape surrounding a side surface or a part of the side surface, or a part of the surface of the truncated holder portion 190*a*. For example, the blocking member 170*a* may have a shape that surrounds only a portion adjacent to the tip 110 among the side surfaces of the truncated holder portion 190*a*.

In FIG. 203B, the blocking member 170*a* may have a shape surrounding at least a portion of the side surface of the pillar-shaped holder portion 190*a*. For example, the blocking member 170*a* may have a shape that surrounds only a portion adjacent to the tip 110 among the side surfaces of the pillar-shaped holder portion 190*a*.

In FIG. 203C, the blocking member 170*a* may have a shape surrounding at least a portion of the side surface of the pillar-shaped holder portion 190*a* and the outer surface of the dome 192. For example, the blocking member 170*a* may have a shape surrounding only a portion adjacent to the tip 110 among the outer surface of the dome 192 and the side surface of the pillar-shaped holder portion 190*a*.

Figure 203D:
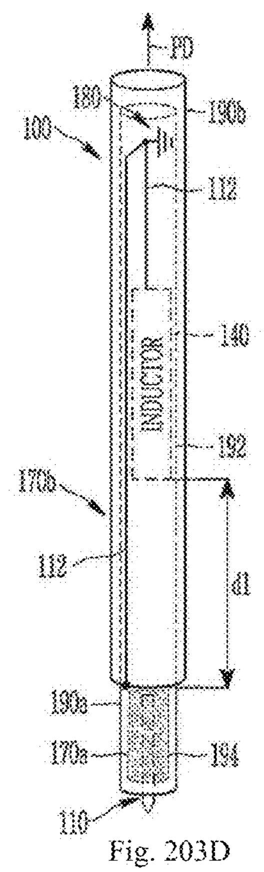

In FIG. 203D, the blocking member 170*a* may have a shape surrounding at least a portion of the inner surface of the pipe-shaped holder portion 190*a*. For example, the blocking member 170*a* may have a shape that surrounds only a portion adjacent to the tip 110 among the inner surfaces of the pipe-shaped holder portion 190*a*.

As shown in FIGS. 204A to 204D, when the inductor 140 is spaced apart from the blocking member 170*a* by a second distance d2 or less, which is shorter than the first distance d1, the blocking member 170*a* may include a first blocking portion 171*a*. For example, the blocking member 170*a* may include a plurality of blocking portions 171*a* spaced apart from each other while forming a closed loop in the circumferential direction of the holder portion 190*a*.

The plurality of first blocking portions 171*a* may extend in a direction parallel to the axial direction PD of the ferrite core in the inductor 140. Referring to the direction of the eddy current shown in the drawings, it may extend in a direction PD perpendicular to the eddy current or in a longitudinal direction PD of the body portion 190*b*. The plurality of first blocking portions 171*a* is spaced apart from each other in a direction perpendicular to the axial direction PD of the ferrite core or in a circumferential direction of the holder portion 190*a*. The plurality of first blocking portions 171*a* spaced apart from each other may be spaced apart from each other by an interval of 0.03 mm or more in a direction perpendicular to the axial direction PD of the ferrite core or in a circumferential direction of the holder portion 190*a*. Referring to the direction of the eddy current shown in the drawings, the plurality of first blocking portions 171*a* may be spaced apart from each other by an interval of 0.03 mm or more along the direction ED of the eddy current. Since the blocking member 170 includes a plurality of first blocking portions 171*a* spaced apart from each other, an eddy current cannot flow along the blocking member 170*a*, and generation of the eddy current is blocked. The plurality of first blocking portions 171*a* may extend along a direction inclined at a predetermined angle (more than 0 degrees and less than 90 degrees) in the axial direction PD of the ferrite core.

The plurality of first blocking portions 171*a* is electrically connected to each other through a connection portion 174*a*. In addition, the connection portion 174*a* may be electrically connected to the ground 180. That is, the plurality of first blocking portions 171*a* may be connected to the ground 180 through the conductive connecting member 112. The blocking member 170*a* is electrically connected to the grounding 180, thereby being grounded.

Figures 204A, 204B, 204C, 204D:
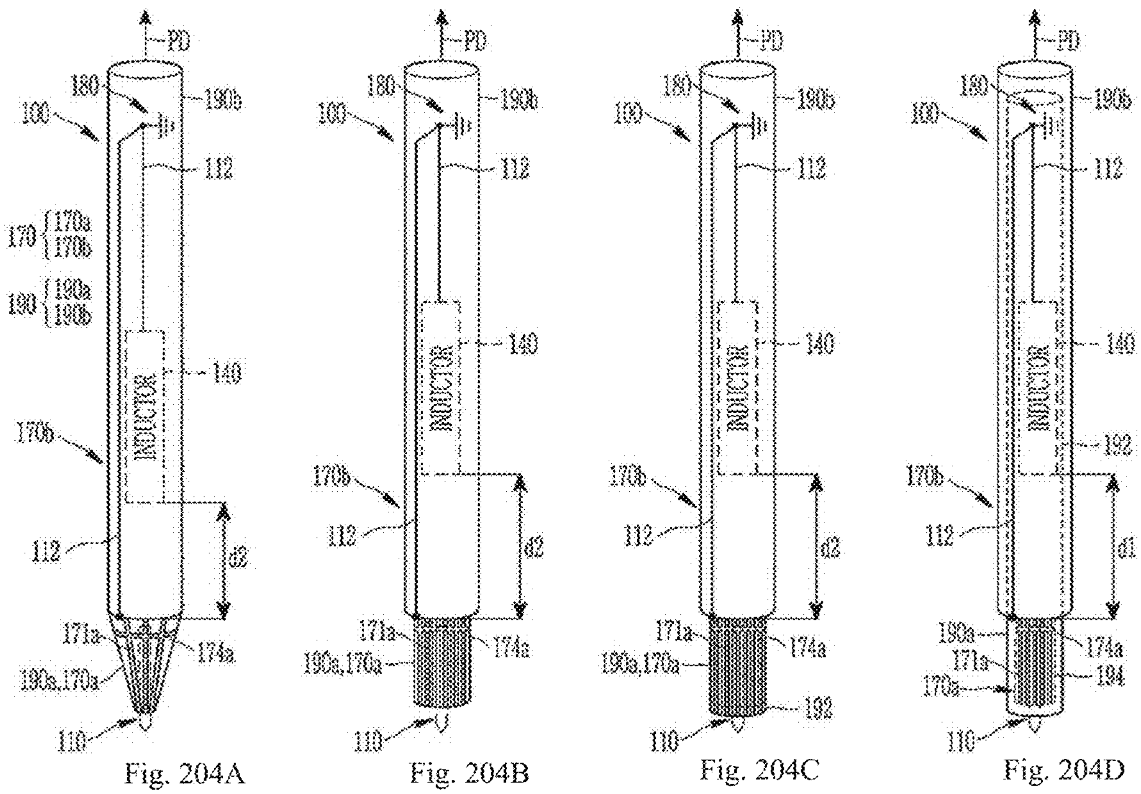
Figure 205A:
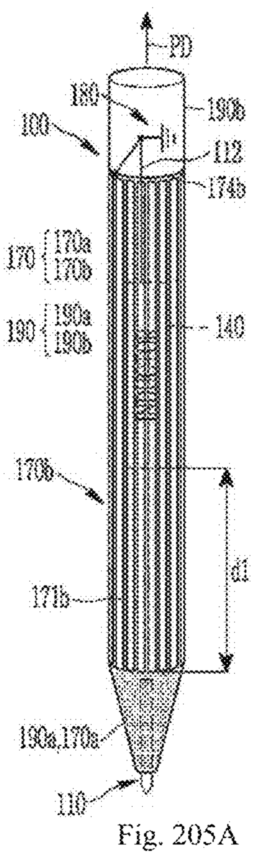
Figure 205B:
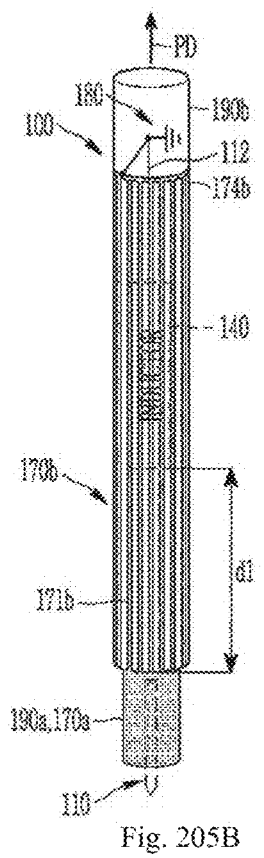
Figure 205C:
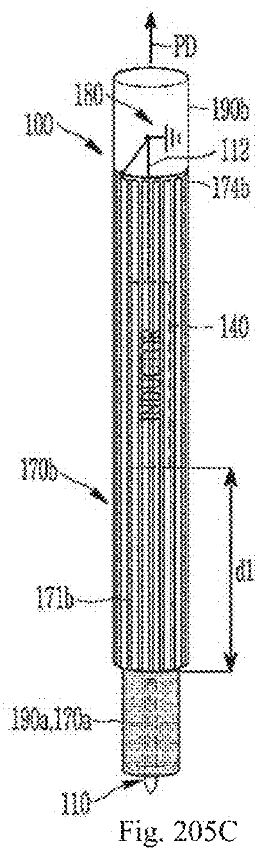
Figure 205D:
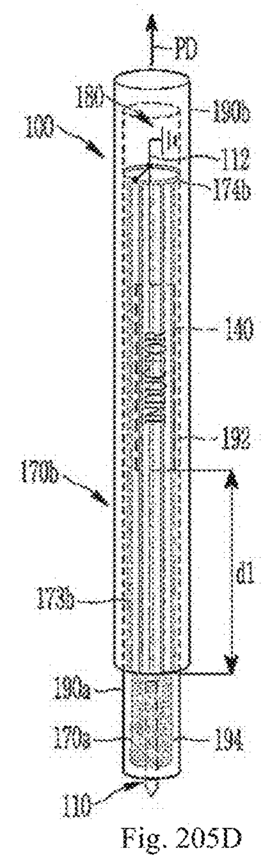
Figure 206A:
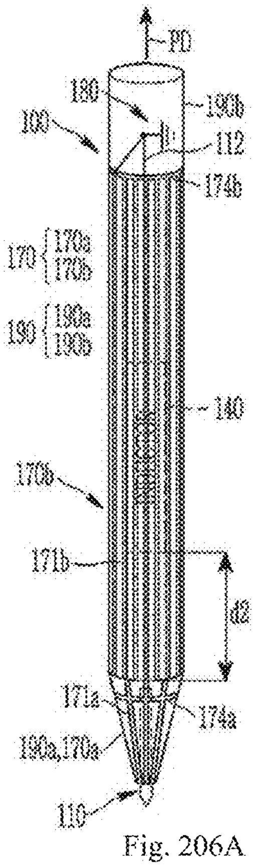
Figure 206B:
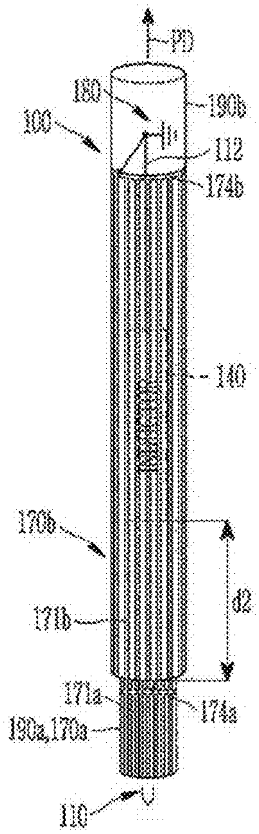
Figure 206C:
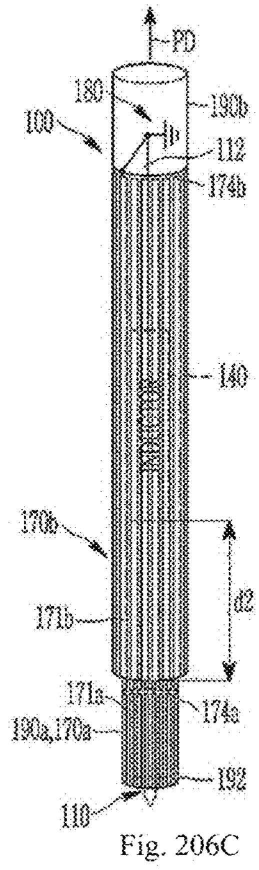
Figure 206D:
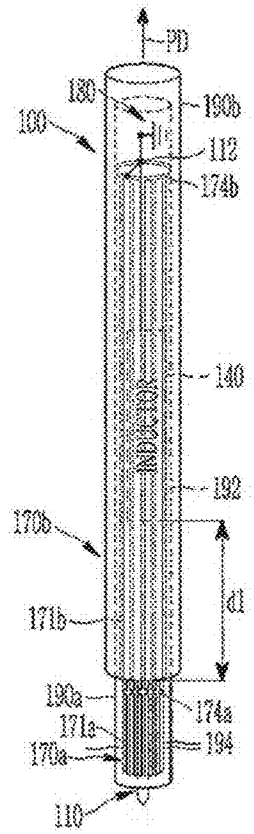

In FIG. 204A, the blocking member 170*a* may have a shape surrounding at least a portion of a side surface and a surface of the truncated holder portion 190*a*. For example, the blocking member 170*a* may have a shape that surrounds only a portion adjacent to the tip 110 among the side surfaces of the truncated holder portion 190*a*.

In FIG. 204B, the blocking member 170*a* may have a shape surrounding at least a portion of a side surface and a surface of the pillar-shaped holder portion 190*a*. For example, the blocking member 170*a* may have a shape that surrounds only a portion adjacent to the tip 110 among the side surfaces of the pillar-shaped holder portion 190*a*.

In FIG. 204C, the blocking member 170*a* may have a shape surrounding at least a portion of the side surface of the pillar-shaped holder portion 190*a* and the outer surface of the dome 192. For example, the blocking member 170*a* may have a shape surrounding only a portion adjacent to the tip 110 among the outer surface of the dome 192 and the side surface of the pillar-shaped holder portion 190*a*.

In FIG. 204D, the blocking member 170*a* may have a shape surrounding at least a portion of the inner surface of the pipe-shaped holder portion 190*a*. For example, the blocking member 170*a* may have a shape that surrounds only a portion adjacent to the tip 110 among the inner surfaces of the pipe-shaped holder portion 190*a*.

The stylus pen 100 illustrated in FIGS. 205A to 205D further includes a blocking member 170*b* compared to the stylus pen 100 illustrated in FIGS. 203A to 203D. The stylus pen 100 illustrated in FIGS. 206A to 206D further includes a blocking member 170*b* compared to the stylus pen 100 illustrated in FIGS. 204A to 204D.

The blocking member 170*b* includes a conductive member surrounding the inductor 140. The blocking member 170*b* may be positioned on a circumference having a predetermined radius with the inductor 140 as the center. The blocking member 170*b* may include a plurality of first blocking portions 171*b*. That is, the blocking member 170*b* may exist in a separated state into a plurality of pieces as shown in FIG. 27. For example, the blocking member 170*b* may include a plurality of blocking portions 171*b* disposed in the circumferential direction of the body portion 190*b*. In addition, the blocking member 170*b* may include a plurality of blocking portions 171*b* spaced apart from each other while forming a closed loop in the circumferential direction of the body portion 190*b*.

The blocking member 170*b* may be positioned inside or outside the body portion 190*b* to surround at least a portion of the inductor 140. That is, the blocking member 170*b* may be provided on any one of an inner surface of the body portion 190*b*, a position spaced apart from the inner surface by a predetermined distance, and an outer surface of the body portion 190*b*. In FIGS. 205A to 205D, the inductor 140 is illustrated as being positioned inside the body portion 190*b*, but in another embodiment, the inductor 140 extends into the holder portion 190*a*, and the blocking member 170*b* may be located inside or outside the holder portion 190*a*.

The plurality of first blocking portions 171*b* is arranged in a direction perpendicular to the eddy current PD, that is, in a direction parallel to the axial direction PD of the ferrite core in the inductor 140 or the longitudinal direction PD of the body portion 190*b*, and is spaced apart from each other in the direction ED of the eddy current shown in FIGS. 202A and 202B or along the circumference of the body portion 190*b*. The plurality of first blocking portions 171*b* may be disposed to be spaced apart from each other by a predetermined distance on a circumference about the axis of the ferrite core. Since the blocking member 170*b* includes a plurality of first blocking portions spaced apart from each other in a direction ED of the eddy current (see FIGS. 202A and 202B), that is, on a circumference about the axis of the ferrite core or along the circumference of the body portion 190*b*, the eddy current cannot flow along the blocking member 170*b*, and generation of the eddy current is blocked. Although it was described that the plurality of first blocking portions 171*b* extends in a direction parallel to the axial direction PD of the ferrite core, in other words, in the axial direction PD of the ferrite core or the longitudinal direction PD of the body portion 190*b*, the plurality of first blocking portions 171*b* may extend along a direction inclined at a predetermined angle (more than 0 degree and less than 90 degree) in the direction PD. In the above description, the description based on the direction of the eddy current is included, but this is to help the understanding of the description based on the drawings of FIGS. 202A and 202B.

The blocking member 170*a* and the blocking member 170*b* may be electrically connected to each other. For example, the blocking member 170*a* and the plurality of first blocking portions 171*b* are electrically connected at the boundary between the holder portion 190*a* and the body portion 190*b*. In addition, the plurality of first blocking portions 171*b* is electrically connected to each other through the connection portion 174*b*. The connection portion 174*b* may be electrically connected to the ground 180. That is, the plurality of first blocking portions 171*b* may be connected to the ground 180 through the conductive connecting member 112. Both the blocking member 170*a* and the blocking member 170*b* are electrically connected to the ground 180, thereby being grounded.

Figure 207A:
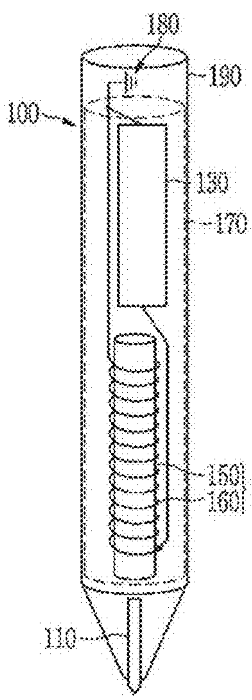

Referring to FIG. 207A, the stylus pen 100 includes a conductive tip 110, a conductive connection member 120, a capacitor 130, an inductor 140, a blocking member 170, and a ground 180, and a body portion 190.

The blocking member 170 includes a conductive member surrounding the capacitor 130 and the inductor 140. Although not shown in the drawings, the blocking member 170 may be connected to the ground 180. That is, a conductive wire connecting the blocking member 170 and the ground 180 may be further provided, which will be described in detail with reference to FIGS. 208A to 208D below.

In addition, the blocking member 170 extends along the axial direction of the ferrite core or the longitudinal direction of the body portion. Both ends of the blocking member 170 may be disposed on a circumference centered on the central axis of the ferrite core or the central axis of the body portion, and may be disposed to be spaced apart a predetermined distance. Referring to the drawings, both ends of the blocking member 170 are spaced apart along the direction ED of the eddy current. In this regard, FIGS. 207B to 207E show the blocking member 170 in detail.

Figure 207B:
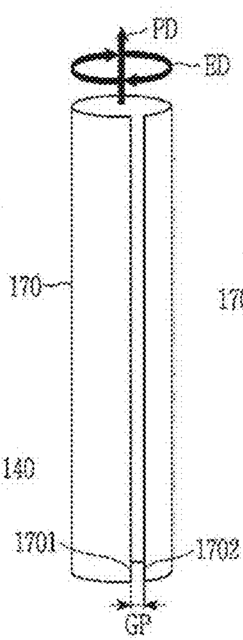

Referring to FIG. 207B, the blocking member 170 includes one slit GP that blocks the generation of eddy currents. The slit GP may be formed in a direction parallel to the central axis PD of the ferrite core or the central axis of the body portion. That is, referring to the drawings, the slit GP extends along the direction PD perpendicular to the eddy current. That is, both ends of the plate-shaped blocking member 170 disposed on the circumference with respect to the axis of the ferrite core do not contact each other, and thereby the slit GP parallel to the central axis PD is formed. Accordingly, both ends 1701, 1702 of blocking member 170 are spaced apart by one slit GP. In embodiments, the slit GP may have a width of 0.03 mm or more along the direction ED of the eddy current.

It has been described that the slit GP extends along a direction parallel to the central axis PD of the ferrite core and extends along a direction PD perpendicular to the eddy current with reference to the drawings, but the slit GP may extend along a direction inclined at a predetermined angle (more than 0 degrees and less than 90 degrees) with respect to the central axis PD direction.

In the blocking member 170 having a rectangular plate shape, both ends (both sides) 1701, 1702 of blocking member 170 are spaced apart in a direction parallel to the central axis PD of the ferrite core or the central axis of the body portion, which is the direction ED of the eddy current in the drawings. Therefore, since the eddy current cannot flow along the blocking member 170, the generation of the eddy current is blocked.

Figure 207C:
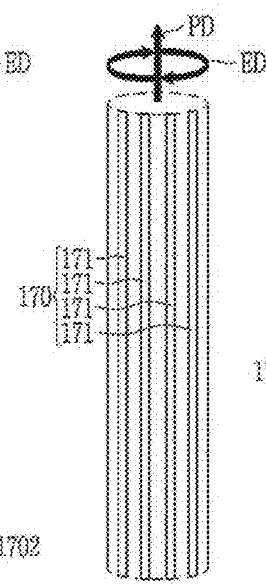

Referring to FIG. 207C, the blocking member 170 includes a plurality of first blocking portions 171. The plurality of first blocking portions 171 extends in a direction parallel to the central axis PD of the ferrite core or the central axis of the body portion, that is, in a direction perpendicular to the eddy current. In addition, it is spaced apart from each other along a circumference centered on the axis of the ferrite core. Referring to the drawings, it can be described that it is spaced apart from each other along the direction ED of the eddy current. Similarly, since the blocking member 170 includes a plurality of first blocking portions 171 spaced apart from each other along the direction ED of the eddy current, eddy current cannot flow along the blocking member 170, thereby blocking the generation of an eddy current. Although it has been described that the plurality of first blocking portions 171 extends along the central axis PD of the ferrite core, the plurality of first blocking portions 171 may extend along the inclined direction at a predetermined angle (more than 0 degrees and less than 90 degrees) in the direction PD.

Figure 207D:
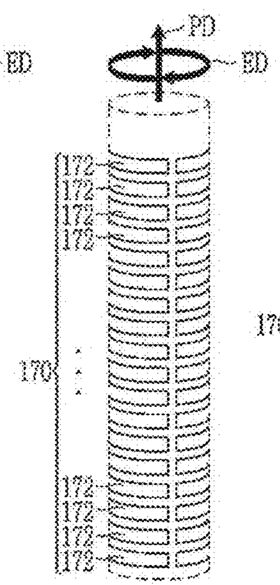

Referring to FIG. 207D, the blocking member 170 includes a plurality of second blocking portions 172. The plurality of second blocking portions 172 is spaced apart from each other in a direction parallel to the central axis PD of the ferrite core or the central axis of the body portion, which is along a direction perpendicular to the eddy current, when referring to the drawings. Both ends of the plurality of second blocking portions 172 are spaced apart from each other along a circumference centered on the axis of the ferrite core, that is, along the direction ED of the eddy current. Similarly, since both ends of each of the plurality of second blocking portions 172 included in the blocking member 170 are spaced apart along the circumference centered on the axis of the ferrite core, that is, along the direction ED of the eddy current, an eddy current cannot flow along the blocking member 170, and thereby blocking the generation of an eddy current.

Figure 207E:
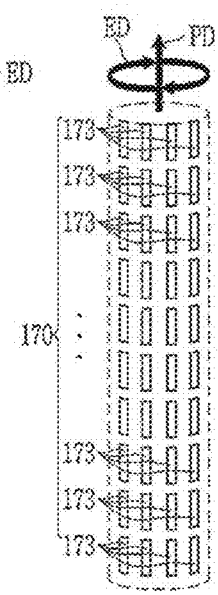

Referring to FIG. 207E, the blocking member 170 includes a plurality of third blocking portions 173. The plurality of third blocking portions 173 is also spaced apart along the central axis PD of the ferrite core or a direction parallel to the central axis of the body portion PD, and is also spaced apart along the circumference of the axis of the ferrite core. Referring to the drawings, it can be said that it is spaced apart from each other along the direction ED of the eddy current. Similarly, since the plurality of third blocking parts 173 included in the blocking member 170 is spaced apart from each other along a circumference centered on the axis of the ferrite core, that is, along the direction ED of the eddy current, the eddy current cannot flow along the blocking member 170, and thereby blocking the generation of an eddy current.

The body portion 190 may include a form in which a truncated cone and a pillar are combined. The body portion 190 is illustrated in a form in which the truncated cone part and the pillar part are integrally coupled, but the two parts may be separated. The pillar part may have a cylindrical shape, a polygonal pillar, a pillar shape having at least a portion of a curved surface, a entasis pillar shape, a truncated pyramid shape, a truncated cone shape, and the like, but it is not limited thereto. The body portion 190 may be made of a non-conductive material.

The blocking member 170 may be located on the inner surface, the outer surface, or the inside of the body portion 190, which will be described later with reference to the drawings to be described later.

Figure 208A:
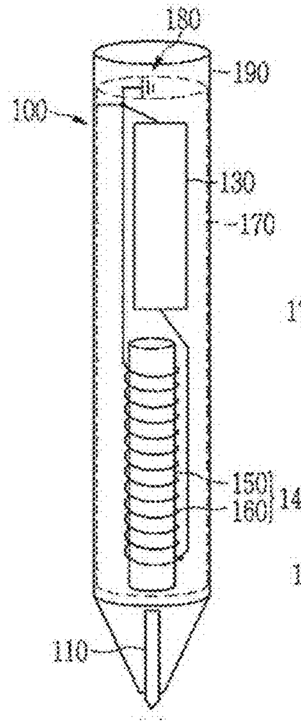

Next, referring to FIG. 208A, compared with the stylus pen 100 in FIG. 207A, the stylus pen 101 has a difference in that the blocking member 170 thereof is connected to the ground 180.

In addition, the blocking member 170 and the ground 180 may be connected to each other at a position spaced apart from the inductor 140.

Figure 208B:
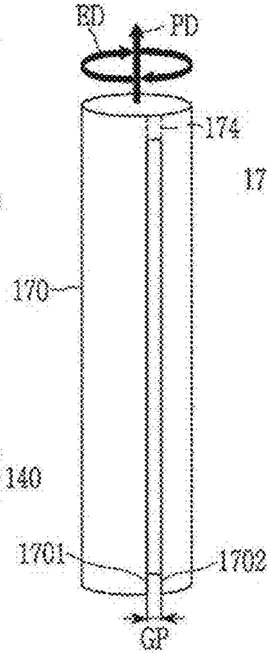
Figure 208C:
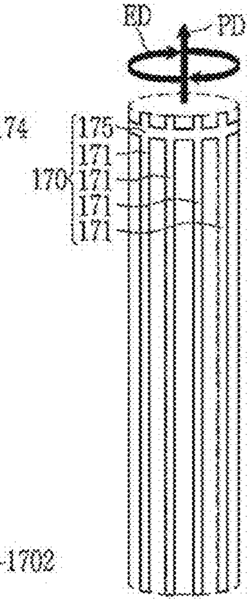
Figure 208D:
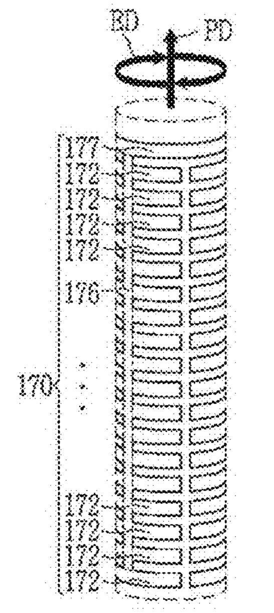

In this regard, FIGS. 208B to 208D show the blocking member 170 connected to the ground 180 in detail.

Referring to FIG. 208B, the blocking member 170 includes a single slit GP for blocking the generation of an eddy current and a connection portion 174 connecting both ends 1701, 1702 of blocking member 170. The slit GP extends along a central axis direction PD of the ferrite core or a longitudinal direction PD of the body portion, that is, along a direction perpendicular to the eddy current ED. Both ends 1701, 1702 of blocking member 170 are spaced apart by one slit GP. Both ends 1701, 1702 of blocking member 170 are spaced apart along a circumference centered on the axis of the ferrite core or the axis of the body portion, that is, along the direction ED of an eddy current.

The connection portion 174 may connect both ends 1701, 1702 of blocking member 170 at a position spaced apart from the inductor 140 along the central axis direction PD of the ferrite core, when referring to the drawing, at a position spaced apart from the inductor 140 in a direction perpendicular to the eddy current direction ED. In the area where the connection portion 174 is located, the blocking member 170 may be connected to the ground 180.

Referring to FIG. 208C, the blocking member 170 includes a plurality of first blocking portions 171 and a first connecting portion 175 connecting the plurality of first blocking portions 171 to each other.

The plurality of first blocking portions 171 extends along a direction perpendicular to the central axis direction PD of the ferrite core or the longitudinal direction PD of the body portion, when referring to the drawings, along the eddy current direction ED, and it is spaced apart from each other along the direction ED. As mentioned above, the eddy current direction ED may correspond to a circumferential direction centering on the axis of the ferrite core or the axis of the body portion.

The first connection portion 175 may connect the plurality of first blocking portions 171 at a position spaced apart from the inductor 140 along the central axis direction PD of the ferrite core or the longitudinal direction PD of the body portion, when referring to the drawing, at a position spaced apart from the inductor 140 in a direction perpendicular to the eddy current direction ED. In the area where the connection portion 175 is located, the blocking member 170 may be connected to the ground 180.

Referring to FIG. 208D, the blocking member 170 includes a plurality of second blocking portions 172, a second connection portion 176 connecting the plurality of second blocking portions 172 to each other, and an additional ground 177.

The plurality of second blocking portions 172 is spaced apart from each other in the central axis direction PD of the ferrite core or the longitudinal direction PD of the body portion, that is, in a direction perpendicular to the eddy current direction ED. Both ends of each of the plurality of second blocking portions 172 are spaced apart from each other by a predetermined distance on a circumference about the axis of the ferrite core or the axis of the body portion. That is, they are spaced apart from each other along the direction ED of an eddy current.

The second connection portion 176 extends along the central axis direction PD of the ferrite core, when referring to the drawings, along the direction PD perpendicular to an eddy current, and may connect the plurality of second blocking portions 172 with the additional ground 177.

The additional ground 177 may be connected to the ground 180. The additional ground 177 may be connected to the ground 180 at a position spaced apart from the inductor 140.

Figure 209A:
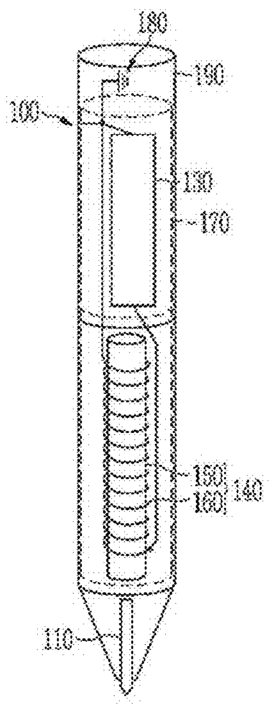

Next, referring to FIG. 209A, compared with the stylus pen 101 in FIGS. 208A to 208D, the stylus pen 100 has a difference in that the blocking member 170 includes a first blocking member 170*a* positioned to correspond to the inductor 140 and a second blocking member 170*b* connected to the ground 180. The second blocking member 170*b* may be electrically connected to the ground 180.

The first blocking member 170*a* may extend beyond the length CL of the ferrite core 150 along the central axis direction PD of the ferrite core or the longitudinal direction PD of the body portion, when referring to the drawings, along the direction PD perpendicular to an eddy current. The second blocking member 170*b* is connected to the first blocking member 170*a*. That is, the second blocking member 170*b* may be electrically connected to the first blocking member 170*a*. In this regard, FIGS. 209B to 209D illustrate in detail the blocking member 170 including the first blocking member 170*a* and the second blocking member 170*b*.

Figure 209B:
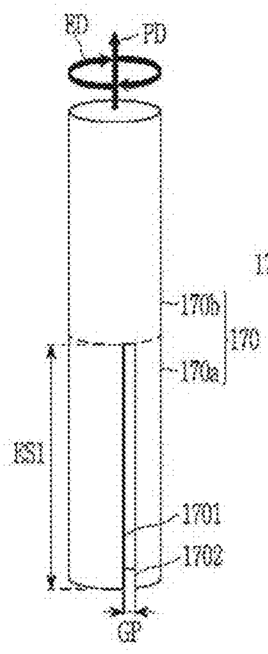
Figure 209C:
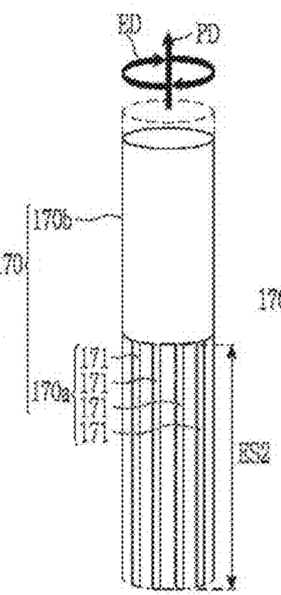
Figure 209D:
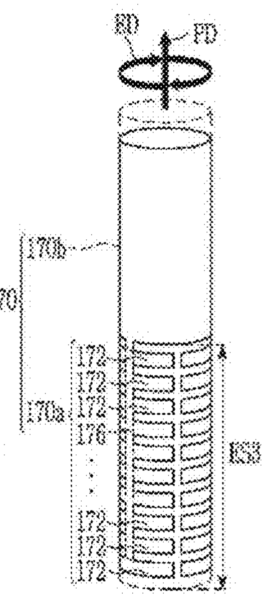

Referring to FIG. 209B, the first blocking member 170*a* includes one slit GP that blocks the generation of an eddy current. The slit GP extends to the lower end of the second blocking member 170*b* along the direction PD perpendicular to an eddy current or the longitudinal direction PD of the body portion. The length ES1 of the first blocking member 170*a* may be greater than or equal to the length CL of the ferrite core 150 of the inductor 140. The length of the slit GP also corresponds to the length ES1 of the first blocking member 170*a*.

Both ends 1701, 1702 of the first blocking member 170*a* are spaced apart from each other by one slit GP. Both ends 1701 and 1702 of the first blocking member 170*a* are spaced apart from each other in the circumferential direction with respect to the axis of the ferrite core or the axis of the body portion, that is, along the direction ED of the eddy current. Therefore, since an eddy current cannot flow along the first blocking member 170*a*, the generation of an eddy current is blocked.

The second blocking member 170*b* is coupled to the upper end of the first blocking member 170*a*. The second blocking member 170*b* may be connected to the ground 180. The second blocking member 170*b* is spaced apart from the ferrite core 150 of the inductor 140 along the central axis direction PD of the ferrite core or the longitudinal direction PD of the body portion. Therefore, even if the slit is not formed in the second blocking member 170*b*, the influence of the magnetic field formed by the ferrite core 150 is small.

Referring to FIG. 209C, the first blocking member 170*a* includes a plurality of first blocking portions 171. The plurality of first blocking portions 171 extends along a central axis direction PD of the ferrite core or a longitudinal direction PD of the body portion, with reference to the drawings, along a direction PD perpendicular to an eddy current. It is spaced apart from each other in the circumferential direction about the axis of the ferrite core or the axis of the body portion, that is, along the direction ED of an eddy current. The length ES2 of the first blocking member 170*a* may be greater than or equal to the length CL of the ferrite core 150 of the inductor 140. The lengths of the plurality of first blocking portions 171 also correspond to the lengths ES2 of the first blocking members 170*a*. Therefore, since an eddy current cannot flow along the first blocking member 170*a*, the generation of an eddy current is blocked.

The second blocking member 170*b* is coupled to the upper end of the first blocking member 170*a*. The second blocking member 170*b* may be connected to the ground 180. The second blocking member 170*b* is spaced apart from the ferrite core 150 of the inductor 140 in the direction PD. Therefore, even if the second blocking member 170*b* is not formed of a plurality of blocking portions, the influence by the magnetic field formed by the ferrite core 150 is small.

Referring to FIG. 209D, the first blocking member 170*a* includes a plurality of second blocking portions 172 and a second connection portion 176 connecting the plurality of second blocking portions 172 to each other. The plurality of second blocking portions 172 are spaced apart along the central axis direction PD of the ferrite core or the longitudinal direction PD of the body portion, when referring to the drawings, along the direction PD perpendicular to an eddy current. Both ends of each of the two blocking portions 172 are spaced apart from each other in the circumferential direction centered on the axis of the ferrite core, that is, along the direction ED of an eddy current. Therefore, since an eddy current cannot flow along the first blocking member 170*a*, the generation of an eddy current is blocked. The length ES3 of the first blocking member 170*a* may be greater than or equal to the length CL of the ferrite core 150 of the inductor 140.

The second connection portion 176 extends in the central axis direction PD of the ferrite core from the inductor 140 or the longitudinal direction PD of the body portion, when referring to the drawings, in a direction PD perpendicular to an eddy current. The first blocking member 170*a* and the second blocking member 170*b* may be connected by the second connection portion 176.

The second blocking member 170*b* is coupled to the upper end of the first blocking member 170*a*. The second blocking member 170*b* may be connected to the ground 180. The second blocking member 170*b* is spaced apart from the ferrite core 150 of the inductor 140 along the central axis direction PD of the ferrite core or the longitudinal direction PD of the body portion, when referring to the drawings, along the direction PD perpendicular to an eddy current.

Therefore, even if the second blocking member 170*b* is not formed of a plurality of blocking portions, the influence by the magnetic field formed by the ferrite core 150 is small.

Figure 210A:
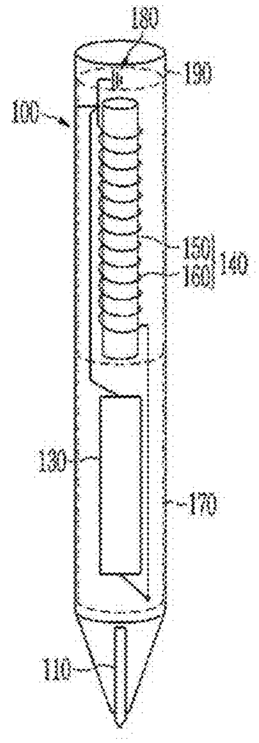

Next, referring to FIG. 210A, the stylus pen 103 may include a conductive tip 110, a conductive connection member 120, a capacitor 130, an inductor 140, a blocking member 170, a ground 180, and a body portion 190. Descriptions of the same or similar components as those shown in FIG. 205A will be omitted.

The position of the inductor 140 in the body portion 190 of the stylus pen 103 is different from the position of the inductor 140 in the body portion 190 of the stylus pen 102 in FIG. 209A. In the body portion 190 of the stylus pen 103, the inductor 140 is spaced apart from the conductive tip 110.

Figure 210B:
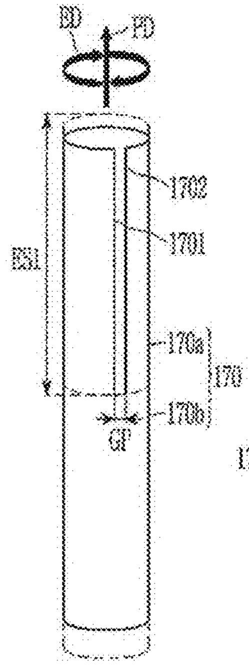
Figure 210C:
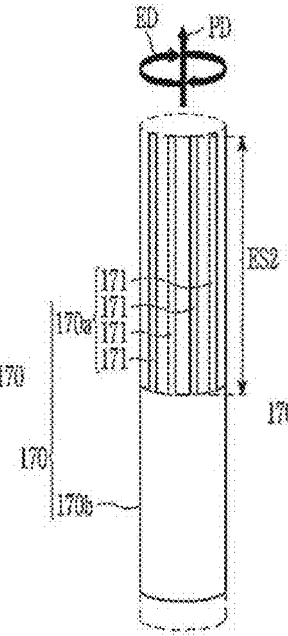
Figure 210D:
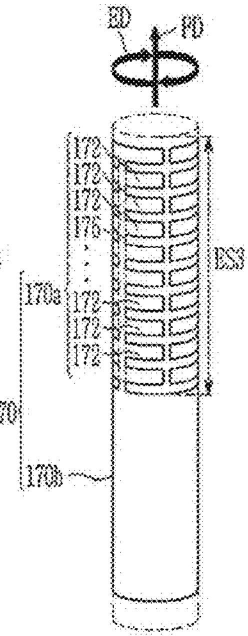

In this regard, FIGS. 210B to 210D illustrate in detail the blocking member 170 including the first blocking member 170*a* and the second blocking member 170*b*.

Referring to FIG. 210B, the first blocking member 170*a* includes one slit GP that blocks the generation of eddy currents. The slit (GP) extends to the upper end of the second blocking member 170*b* along the central axis direction PD of the ferrite core or the longitudinal direction PD of the body portion, when referring to the drawings, along the direction opposite to the direction PD perpendicular to an eddy current (the direction away from the conductive tip, referring to the drawing). The length ES1 of the first blocking member 170*a* may be greater than or equal to the length CL of the ferrite core 150 of the inductor 140. The length of the slit GP also corresponds to the length ES1 of the first blocking member 170*a.*

Both ends 1701, 1702 of the first blocking member 170*a* are spaced apart from each other by one slit GP. Both ends 1701, 1702 of the first blocking member 170*a* are spaced apart from each other in the circumferential direction with respect to the axis of the shaft body of the ferrite core, that is, along the eddy current direction ED. Therefore, since an eddy current cannot flow along the first blocking member 170*a*, the generation of an eddy current is blocked.

The second blocking member 170*b* is coupled to the lower end of the first blocking member 170*a*. The second blocking member 170*b* is spaced apart from the ferrite core 150 of the inductor 140 along the central axis direction PD of the ferrite core or the longitudinal direction PD of the body portion, when referring to the drawings, in the opposite direction to the direction perpendicular to an eddy current (the direction away from the conductive tip, referring to the drawings). Therefore, even if the slit is not formed in the second blocking member 170*b*, the influence of the magnetic field formed by the ferrite core 150 is small.

Referring to FIG. 210C, the first blocking member 170*a* includes a plurality of first blocking portions 171. The plurality of first blocking portions 171 extends along the central axis direction PD of the ferrite core or the longitudinal direction PD of the body portion, along the direction PD perpendicular to an eddy current with reference to the drawings. It is spaced apart from each other along the circumferential direction on the circumference about the axis of the ferrite core or the axis of the body portion, that is, along the direction ED of an eddy current. The length ES1 of the first blocking member 170*a* may be greater than or equal to the length CL of the ferrite core 150 of the inductor 140. The lengths of the plurality of first blocking portions 171 also correspond to the lengths ES1 of the first blocking member 170*a*. Therefore, since an eddy current cannot flow along the first blocking member 170*a*, the generation of an eddy current is blocked.

The second blocking member 170*b* is coupled to the lower end of the first blocking member 170*a*. The second blocking member 170*b* is spaced apart from the ferrite core 150 of the inductor 140 in a direction opposite to the direction PD. Therefore, even if the second blocking member 170*b* is not formed of a plurality of blocking portions, the influence by the magnetic field formed by the ferrite core 150 is small.

Referring to FIG. 210D, the first blocking member 170*a* includes a plurality of second blocking portions 172 and a second connection portion 176 connecting the plurality of second blocking portions 172 to each other. The plurality of second blocking portions 172 is spaced apart from each other in a direction PD perpendicular to an eddy current or in the longitudinal direction PD of the body portion, and both ends of each of the plurality of second blocking portions 172 are are spaced apart from each other in the eddy current direction ED. Therefore, since an eddy current cannot flow along the first blocking member 170*a*, the generation of an eddy current is blocked.

The second connection portion 176 extends in the central axis direction PD of the ferrite core from the inductor 140 or the longitudinal direction PD of the body portion, when referring to the drawings, in the direction PD perpendicular to an eddy current. The first blocking member 170*a* and the second blocking member 170*b* may be connected by the second connection portion 176.

The second blocking member 170*b* is coupled to the lower end of the first blocking member 170*a*. The second blocking member 170*b* is spaced apart from the ferrite core 150 of the inductor 140 in the direction opposite to the central axis direction PD of the ferrite core, when referring to the drawings, in the direction PD perpendicular to an eddy current. Therefore, even if the second blocking member 170*b* is not formed of a plurality of blocking portions, the influence by the magnetic field formed by the ferrite core 150 is small.

Figure 211A:
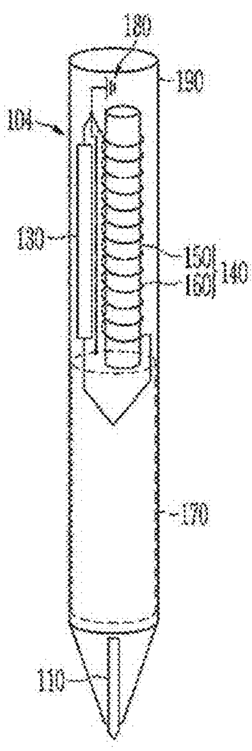
Figure 211B:
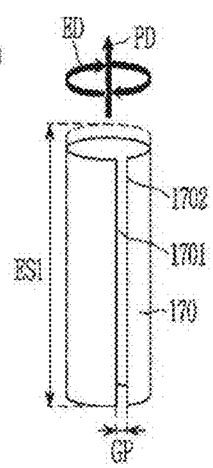
Figure 211C:
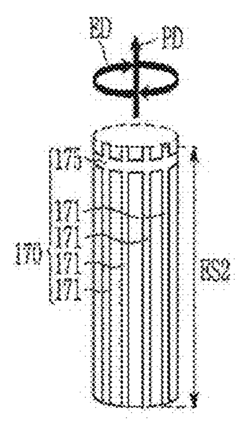
Figure 211D:
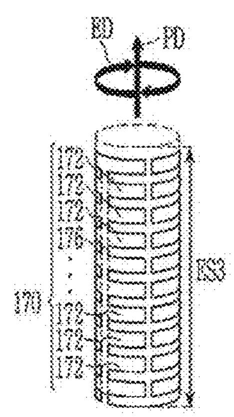

Next, referring to FIG. 211A, the stylus pen 100 may include a conductive tip 110, a conductive connection member 120, a capacitor 130, an inductor 140, a blocking member 170, a ground 180 and a body portion 190. Descriptions of the same or similar components as those shown in FIG. 210A will be omitted.

The position of the capacitor 130 in the body portion 190 of the stylus pen 100 is different from the position of the capacitor 130 of the stylus pen 100 in FIGS. 207A, 208A, and 209A. In the body portion 190 of the stylus pen 100, the capacitor 130 is spaced apart from the conductive tip 110.

Similarly, the position of the inductor 140 in the body portion 190 of the stylus pen 100 is spaced apart from the conductive tip 110.

The conductive tip 110 and the conductive connection member 120 are located at the front of the stylus pen 104, and the capacitor 130 and the inductor 140 are located at the rear of the stylus pen 104.

In order to minimize the influence of a user's hand on the conductive connection member 120 and prevent eddy currents from being generated by the inductor 140, the stylus pen 104 further includes a blocking member 170.

In this regard, FIGS. 210B to 210D show the blocking member 170 in detail.

Referring to FIG. 210B, the blocking member 170 includes one slit GP that blocks the generation of eddy currents. The slit GP extends along the direction opposite to the central axis direction PD of the ferrite core or the longitudinal direction PD of the body portion, when referring to the drawings, along the direction opposite to the direction PD perpendicular to an eddy current (the direction away from the conductive tip, referring to the drawing). The length ES1 of the blocking member 170 may correspond to the length of the conductive connection member 120.

Both ends 1701, 1702 of blocking member 170 are spaced apart by one slit GP. Both ends 1701, 1702 of blocking member 170 are spaced apart from each other in the circumferential direction on the circumference centered on the axis of the ferrite core or the axis of the body portion, that is, along the direction ED of an eddy current. Therefore, since an eddy current cannot flow along the blocking member 170, the generation of an eddy current is blocked.

Referring to FIG. 210C, the blocking member 170 includes a plurality of first blocking portions 171 and a first connecting portion 175 connecting the plurality of first blocking portions 171 to each other.

The plurality of first blocking portions 171 extends along a central axis direction PD of the ferrite core or a longitudinal direction PD of the body portion, along a direction PD perpendicular to an eddy current with reference to the drawings. It is spaced apart from each other in the circumferential direction on the circumference about the axis of the ferrite core or the axis of the body portion, that is, in the direction ED of an eddy current. The length ES2 of the blocking member 170 may be greater than or equal to the length CL of the ferrite core 150 of the inductor 140. The length of the plurality of first blocking portions 171 also corresponds to the length ES2 of the blocking member 170. Therefore, since an eddy current cannot flow along the blocking member 170, the generation of an eddy current is blocked.

The first connection portion 175 may connect the plurality of first blocking portions 171 to each other. In addition, at the position of the connection portion 175, the blocking member 170 may be electrically connected to the ground 180.

Referring to FIG. 210D, the blocking member 170 includes a plurality of second blocking portions 172 and a second connecting portion 176 connecting the plurality of second blocking portions 172 to each other. The plurality of second blocking portions 172 are spaced apart along the central axis direction PD of the ferrite core or the longitudinal direction PD of the body portion, in the direction PD perpendicular to an eddy current, when referring to the drawings. Both ends of each of the two blocking portions 172 are spaced apart from each other in the circumferential direction on the circumference centered on the axis of the ferrite core or the axis of the body portion, that is, in the direction ED of an eddy current. Therefore, since an eddy current cannot flow along the blocking member 170, the generation of an eddy current is blocked.

The second connection portion 176 extends along the central axis direction PD of the ferrite core from the inductor 140 or the longitudinal direction PD of the body portion, when referring to the drawings, along the direction PD perpendicular to an eddy current.

FIGS. 212A to 213C are conceptual views illustrating a structure of a blocking member of a stylus pen according to embodiments.

Figure 212B:
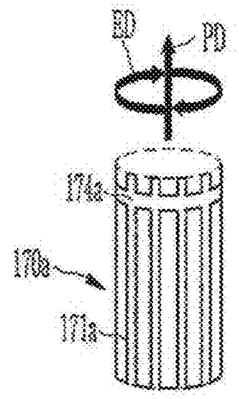
Figure 212C:
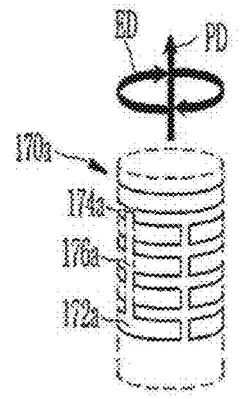

As shown in FIGS. 212A to 212C, both ends of the blocking member 170*a* are spaced apart from each other in the circumferential direction on the circumference centered on the axis of the ferrite core or the axis of the body portion, that is, along the direction ED of the eddy current. The blocking member 170*a* may be printed on a sheet and attached to the holder portion 190*a* by a method such as plating, photolithography, thin film sputtering, etc., or may be printed on the holder part 190*a* by a method such as direct plating, photolithography, thin film sputtering, etc.

Referring to FIG. 212A, the blocking member 170*a* includes one slit GP that blocks the generation of eddy currents and a connection portion 174*a* that connects both ends 1701*a*, 1702*a* of the blocking member 170*a*. The slit GP extends along the central axis direction PD of the ferrite core or the longitudinal direction PD of the body portion, when referring to the drawings, along the direction PD perpendicular to an eddy current. Both ends 1701*a*, 1702*a* of the blocking member 170*a* are spaced apart by one slit GP. Both ends 1701*a*, 1702*a* of the blocking member 170*a* are spaced apart from each other in the direction ED of an eddy current. The connection portion 174*a* may connect both ends 1701*a*, 1702*a* of the blocking member 170*a*.

Referring to FIG. 212B, the blocking member 170*a* includes a plurality of first blocking portions 171*a* and a connection portion 174*a* connecting the plurality of first blocking portions 171*a* to each other. The plurality of first blocking portions 171*a* extends along the central axis direction PD of the ferrite core or the longitudinal direction PD of the body portion, when referring to the drawings, along the direction PD perpendicular to an eddy current, and it is spaced apart from each other along the direction ED of an eddy current. The connection portion 174*a* may connect the plurality of first blocking portions 171*a*.

Referring to FIG. 212C, the blocking member 170*a* includes a plurality of second blocking portions 172*a* and connecting portions 174*a*, 176*a* connecting the plurality of second blocking portions 172*a*.

The plurality of second blocking portions 172*a* are spaced apart along the central axis direction PD of the ferrite core or the longitudinal direction PD of the body portion, when referring to the drawings, along the direction PD perpendicular to an eddy current. Both ends of each of the second blocking portions 172*a* are spaced apart from each other in the circumferential direction centered on the axis of the ferrite core or the axis of the body portion, that is, in the direction ED of an eddy current. The connection portion 176*a* may extend along the central axis direction PD of the ferrite core, when referring to the drawing, along the direction PD perpendicular to an eddy current, and may connect the plurality of second blocking parts 172*a*.

As shown in FIGS. 213A to 213C, both ends of the blocking member 170*b* are spaced apart from each other in the direction ED of an eddy current. The blocking member 170*b* may be printed on a sheet and attached to the body portion 190*b* by a method such as plating, photolithography, thin film sputtering, etc., or may be printed on the holder part 190*a* by a method such as direct plating, photolithography, thin film sputtering, etc., but it is not limited thereto.

Referring to FIG. 213A, the blocking member 170*b* includes one slit GP that blocks the generation of eddy currents and a connection portion 174*b* that connects both ends 1701*b*, 1702*b* of the blocking member 170*b*. The slit GP extends along the central axis direction PD of the ferrite core or the longitudinal direction PD of the body portion, when referring to the drawings, along the direction PD perpendicular to an eddy current. Both ends 1701*b*, 1702*b* of the blocking member 170*b* are spaced apart from each other by one slit GP. Both ends 1701*b*, 1702*b* of the blocking member 170*b* are spaced apart from each other in the circumferential direction centered on the axis of the ferrite core or the axis of the body portion, that is, along the eddy current direction ED. The connection portion 174*b* may connect both ends 1701*b*, 1702*b* of the blocking member 170*b*.

Referring to FIG. 213B, the blocking member 170*b* includes a plurality of first blocking portions 171*b* and a connection portion 174*b* connecting the plurality of first blocking portions 171*b* to each other. The plurality of first blocking portions 171*b* extends along a direction PD perpendicular to an eddy current or a longitudinal direction PD of the body portion, and is spaced apart from each other along the direction ED of an eddy current. The connection portion 174*b* may connect the plurality of first blocking portions 171*b*.

Referring to FIG. 213C, the blocking member 170*b* includes a plurality of second blocking portions 172*b* and connecting portions 174*b*, 176*b* connecting the plurality of second blocking portions 172*b*.

The plurality of second blocking portions 172*b* is spaced apart from each other in the central axis direction PD of the ferrite core or the longitudinal direction PD of the body portion, when referring to the drawings in the direction PD perpendicular to an eddy current. Both ends of each of the second blocking portions 172*b* are spaced apart from each other along the direction ED of an eddy current. The connection portion 176*b* may extend along the central axis direction PD of the ferrite core or the longitudinal direction PD of the body portion, when referring to the drawings, along the direction PD perpendicular to an eddy current, and may connect the plurality of second blocking portions 172*b*.

FIGS. 214A and 214B are a diagram illustrating a touch input by hovering of a stylus pen according to embodiments. As shown in FIGS. 195A and 195B, in order to write the next stroke after writing the previous stroke during writing, the stylus pen 100 in the touch screen 20 may move from the end point A of the previous stroke to the starting point of the next stroke C.

The conductive tip 110 of the stylus pen 100 contacts the window 22 at one point A, and contacts the window 22 at another point C. Signals RS3, RS5 from the conductive tip 110 in contact with the window 22 may be transmitted to the touch electrode 21. By the signal RS3, touch data corresponding to one point A is generated, and by the signal RS5, touch data corresponding to the other point C is generated.

In the area B between one point A and another point C, the stylus pen 100 is spaced apart from the window 22. That is, in the area B, the stylus pen 100 is in a hovering state. In the hovering state, the signal RS4 from the conductive tip 110 of the stylus pen 100 according to the embodiment is transmitted to the touch electrode 21 with a very small value or is not transmitted. The touch controller 262 does not generate touch data according to the signal RS4. That is, touch data corresponding to the connection stroke NL of the area B is not generated.

According to at least one of embodiments, there is an advantage in that it is possible to provide a stylus pen that prevents an unintentional touch input by the stylus pen in a hovering state.

According to at least one of embodiments, there is an advantage in that it is possible to provide a stylus pen that is robust against external factors such as a user's grip.

According to at least one of embodiments, since the inductance value and the capacitance value of the stylus pen may be constantly maintained and the resonance frequency is maintained constant, there is an advantage in that the touch sensitivity for the touch sensor may be improved.

Next, a positional relationship between the blocking member 170 and the housing 190 will be described with reference to FIGS. 215A to 217B.

FIGS. 215A to 217B are views illustrating a structure of a body portion of a stylus pen according to embodiments.

Figure 215A:
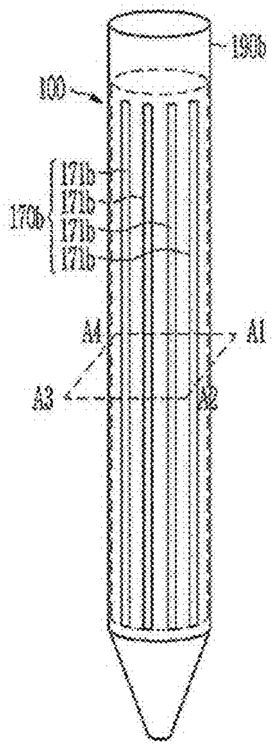

First, referring to FIG. 215A, the stylus pen 100 includes a blocking member 170*b* including a plurality of first blocking portions 171*b* and a body portion 190*b*.

Figure 215B:
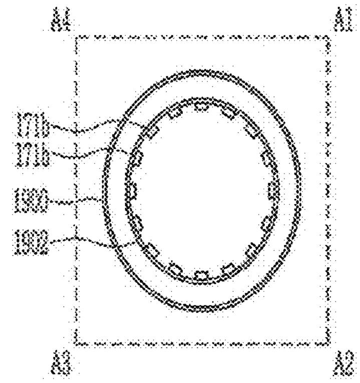

FIG. 215B shows a cross-section of the stylus pen 100 cut along the cut surfaces A1-A2-A3-A4. According to an embodiment, the first blocking portions 171*b* may be located on the inner surface 1902 of the body portion 190*b*.

Figure 216A:
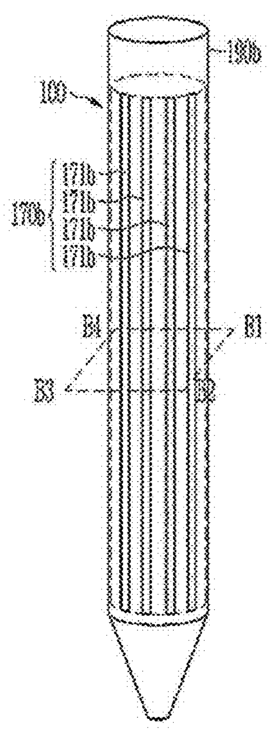

Next, referring to FIG. 216A, the stylus pen 100 includes a blocking member 170*b* including a plurality of first blocking portions 171*b* and a body portion 190*b*.

Figure 216B:
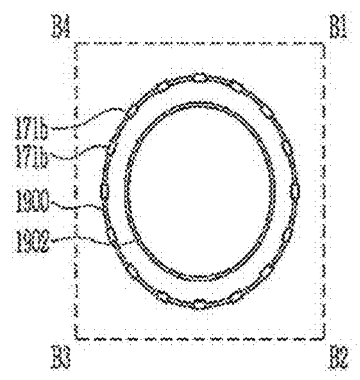

FIG. 216B shows a cross-section of the stylus pen 100 cut along the cut surfaces B1-B2-B3-B4. According to an embodiment, the first blocking portions 171*b* may be located on the outer surface 1900 of the body portion 190*b*.

Figure 217A:
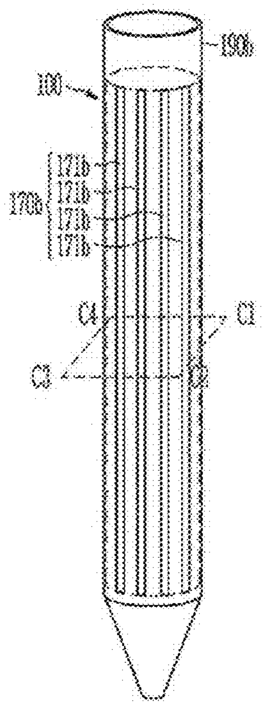

Finally, referring to FIG. 217A, the stylus pen 100 includes a blocking member 170*b* including a plurality of first blocking portions 171*b* and a body portion 190*b*.

Figure 217B:
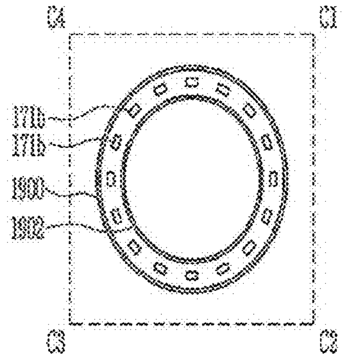

FIG. 217B shows a cross-section of the stylus pen 100 cut along the cut surface C1-C2-C3-C4. According to an embodiment, the first blocking portions 171*b* may be embedded between the outer surface 1900 and the inner surface 1902 of the body portion 190*b*.

Although only the blocking member 170*b* has been described in FIGS. 215A to 217B, the blocking member 170*a* may also be located on the inner surface of the holder portion 190*a*, may be located on the outer surface thereof, or may be embedded between the outer surface and the inner surface.

A stylus pen according to an embodiment of the present disclosure will be described with reference to FIGS. 218 and 219B.

FIG. 218 is a conceptual diagram illustrating a stylus pen according to an embodiment, and FIGS. 219A and 219B are a conceptual diagram illustrating a stylus pen including resonance circuits each resonating with driving signals having different frequencies.

The stylus pen 10 may include a conductive tip 11, a first resonance circuit unit 13, a second resonance circuit unit 14, a ground 15, and a body portion 17.

At least a portion of the conductive tip 11 may include a conductive material (e.g., metal, conductive rubber, conductive fabric, conductive silicone, etc.), and may be electrically connected to the first resonance circuit unit 13.

Each of the first and second resonance circuit units 13, 14 is an LC resonance circuit, and is connected in series between the conductive tip 11 and the ground 15.

The resonance frequencies of the first resonance circuit unit 13 and the second resonance circuit unit 14 are different from each other. The first resonance circuit unit 13 may resonate with the first driving signal transmitted through the conductive tip 11, and the second resonance circuit unit 14 may resonate with the second driving signal transmitted through the conductive tip 11, respectively.

Each of the first resonance circuit unit 13 and the second resonance circuit unit 14 may include an inductor (L1 in FIG. 219A, L2 in FIG. 219B) and a capacitor (C1 in FIG. 219A, C2 in FIG. 219A), respectively. The inductor L1 may include a first ferrite core and a coil wound around the first ferrite core, and the inductor L2 may include a second ferrite core and a coil wound around the second ferrite core. Here, the first ferrite core and the second ferrite core are separate ferrite cores and are spaced apart from each other by a predetermined distance or more within the body portion 17. Since the ferrite core is easily deformed or bent during a manufacturing process, it is easy to manufacture the ferrite core with a shorter length. According to the stylus pen 10 of the present embodiment, by using a separate ferrite core instead of a single ferrite core, the manufacturing cost of the stylus pen 10 can be reduced, and the manufacturing of the stylus pen 10 can be easily implemented.

At least one of the first driving/receiving unit 2620 and the second driving/receiving unit 2622 may apply the first driving signal or the second driving signal to all of at least one type touch electrodes of a plurality of first touch electrodes 111-1 to 111-*m* and a plurality of second touch electrodes 121-1 to 121-*m*. However, the first driving/receiving unit 2620 may apply the first driving signal to some of the plurality of first touch electrodes 111-1 to 111-*m*, and the second driving/receiving unit 2622 may apply the second driving signal to some of the plurality of second touch electrodes 121-1 to 121-*n*, but it is not limited thereto.

By the first resonance circuit unit 13 and the second resonance circuit unit 14, the stylus pen 10 responds to an electromagnetic signal of which frequency changes with time, and outputs a resonance signal which frequency changes with time. For example, the electromagnetic signal may change with time from a first driving signal having a first driving frequency to a second driving signal having a second driving frequency higher than the first driving frequency, or may change from a second driving signal to a first driving signal. The frequency of the resonance signal output from the stylus pen 10 also changes in response to the change above.

Referring to FIG. 219A, when the first driving signal DS1 is applied to the loop coil 264, since the inductor L1 and the capacitor C1 included in the first resonance circuit unit 13 have a very large impedance compared to the inductor L2 and the capacitor C2 included in the second resonance circuit unit 14, this is similar to a state of a short circuit between the second resonance circuit unit 14 and the ground 15. When a resonance actually occurs, the reactances XL=jwL, XC=1/jwC of the LC parallel circuit have the same magnitudes and opposite signs. Thus, an infinite impedance may be seen by (XL*XC)/(XL+XC), but a finite impedance is actually shown due to parasitic resistance, capacitance, etc. As a result of the simulations of the inventors, it was measured that the LC parallel circuit at resonance had an impedance of about 1 to 2 Mohm, while the LC parallel circuit not resonating had an average impedance of about 10 ohm. Accordingly, the resonance signal RS1 resonated by the first resonance circuit unit 13 may be output.

Similarly, referring to FIG. 219B, when the second driving signal DS2 is applied to the loop coil 264, since the inductor L2 and the capacitor C2 included in the second resonance circuit unit 14 have a very large impedance compared to the inductor L1 and the capacitor C1 included in the first resonance circuit unit 13, this is similar to a state of a short circuit between the first resonance circuit unit 14 and the ground 15. Accordingly, the resonance signal RS2 resonated by the second resonance circuit unit 14 may be output.

The resonance signals RS1, RS2 may be output to the touch panel 261 through the conductive tip 11. In a period in which a driving signal is applied to the loop coil 264 and a period thereafter, the resonance signals RS1, RS2 may be transmitted to the conductive tip 11. The first resonance circuit unit 13 and the second resonance circuit unit 14 may be located in the body portion 17 and may be electrically connected to the ground 15.

The stylus pen 10 of this type may generate a touch input by generating resonance signals RS1, RS2 in response to the driving signals DS1, DS2 applied to the loop coil 264.

A capacitance Cx is formed by at least one of the touch electrodes 111-1 to 111-*m* and 121-1 to 121-*n* and the conductive tip 11 of the stylus pen 10. Through the capacitance Cx between at least one of the touch electrodes 111-1 to 111-*m*, 121-1 to 121-*n* and the conductive tip 11, the resonance signals RS1, RS2 may be transmitted to the touch sensor 261.

Next, an embodiment of a control method of the electronic device 2 using the stylus pen 10 will be described with reference to FIGS. 220 and 221.

FIG. 220 is a flow chart illustrating a method of controlling an electronic device according to an exemplary embodiment, and FIG. 221 is a waveform diagram illustrating an example of a driving signal and a resonance signal according to the method of controlling the electronic device in FIG. 220.

Referring to FIG. 220, in the initial section of one touch report frame period, the touch sensing unit 260 samples the noise at the first sampling frequency S10.

In the present embodiment, one touch report frame period according to a touch report rate may include an initial period, and n first periods and n second periods. The touch report rate refers to a speed or frequency (Hz) at which the touch sensing unit 260 outputs and reports touch data obtained by driving the touch electrodes to an internal or external host system. The host may be a mobile system-on-chip (SoC), an application processor (AP), a media processor, a microprocessor, a central processing unit (CPU), or a similar device. The first period and the second period alternate with each other. That is, a second period exists between two consecutive first periods. After the initial period ends, the first period begins.

Although it has been described above that the initial period is an initial period of the touch report frame period, the initial period described herein may be a period after at least one second period ends. The initial period may be repeated with a cycle smaller than the cycle for reporting touch data or may be repeated with a cycle longer than the cycle for reporting touch data, but it is not limited thereto. For example, the initial period may exist two or more times within one touch report frame period, or the initial period may exist once within a plurality of touch report frame periods.

The first driving/receiving unit 2620 and the second driving/receiving unit 2622 may periodically perform sampling according to the first sampling frequency.

The sampling frequency has a frequency that is a predetermined multiple of the frequency of any driving signal. The first sampling frequency in the present disclosure may be a frequency that may be set in relation to the frequency of the first driving signal.

The touch sensing unit 260 determines whether noise is received using the sampled signal S12. The touch sensing unit 260 may determine whether a noise signal is introduced by using a difference between signals periodically sampled according to the first sampling frequency. For example, the touch sensing unit 260 determines that the noise signal is introduced into the touch sensing unit 260 when the difference in levels of signals sampled during the initial period is greater than or equal to a predetermined size.

When it is determined that the noise signal is received in the initial period, the touch sensing unit 260 drives at the second driving frequency in the first period S14.

For example, in the first period, the coil driver 263 applies the second driving signal to the loop coil 264.

It has been described in the above that in the first period, the first driving/receiving unit 2620 simultaneously applies the second driving signal to the plurality of first touch electrodes 111-1 to 111-*m*, but in the first period, the second driving/receiving unit 2622 may simultaneously apply the second driving signal to the plurality of second touch electrodes 121-1 to 121-*n*, or the first driving/receiving unit 2620 and the second driving/receiving unit 2622 may simultaneously apply the second driving signal to the plurality of first touch electrodes 111-1 to 111-*m* and may simultaneously apply the second driving signal to the plurality of second touch electrodes 121-1 to 121-*n*. When the first driving/receiving unit 2620 and the second driving/receiving unit 2622 apply the second driving signal to the plurality of first touch electrodes 111-1 to 111-*m* and the plurality of second touch electrodes 121-1 to 121-*n*, it is assumed that the phases of the second driving signal applied to the plurality of first touch electrodes 111-1 to 111-*m* and the second driving signal applied to the plurality of second touch electrodes 121-1 to 121-*n* are the same, but it is not limited thereto.

In the second period, the touch sensing unit 260 receives a sensing signal S15. The touch sensor 260 may sample the sensing signal at the second sampling frequency. For example, the first driving/receiving unit 2620 and the second driving/receiving unit 2622 may periodically perform sampling according to the second sampling frequency. The second sampling frequency in the present disclosure may be a frequency that may be set in relation to the frequency of the second driving signal.

The control unit 2624 may generate touch information indicating touch coordinates, touch intensity, and the like by using the sensing signal periodically sampled according to the second sampling frequency.

In this case, the control unit 2624 may obtain a signal amplitude of the sensing signal by using a difference value between signal values sampled at two sampling points. The control unit 2624 may determine whether to touch, touch coordinates, etc. according to the signal level of the sensing signal.

If it is determined that noise is not received in the initial period, the touch sensing unit 260 drives at the first driving frequency in the first period S16.

For example, in the first period, the coil driver 263 simultaneously applies a first driving signal having a first driving frequency to the loop coil 264.

It has been described in the above that, in the first period, the first driving/receiving unit 2620 simultaneously applies the first driving signal to the plurality of first touch electrodes 111-1 to 111-*m*, but in the first period, the second driving/receiving unit 2622 may simultaneously apply the first driving signal to the plurality of second touch electrodes 121-1 to 121-*n*, or the first driving/receiving unit 2620 and the second driving/receiving unit 2622 may simultaneously apply the first driving signal to the plurality of first touch electrodes 111-1 to 111-*m* and may simultaneously apply the first driving signal to the plurality of second touch electrodes 121-1 to 121-*n*. When the first driving/receiving unit 2620 and the second driving/receiving unit 2622 apply the first driving signal to the plurality of first touch electrodes 111-1 to 111-*m* and the plurality of second touch electrodes 121-1 to 121-*n*, it is assumed that the phases of the second driving signal applied to the plurality of first touch electrodes 111-1 to 111-*m* and the first driving signal applied to the plurality of second touch electrodes 121-1 to 121-*n* are the same, but it is not limited thereto.

The touch sensing unit 260 receives a sensing signal in the second period S17. The touch sensing unit 260 may sample the sensing signal at the first sampling frequency. For example, the first driving/receiving unit 2620 and the second driving/receiving unit 2622 may periodically perform sampling according to the first sampling frequency.

In the initial period of the next one touch report frame period, the touch sensing unit 260 samples the noise at the second sampling frequency S20. For example, the first driving/receiving unit 2620 and the second driving/receiving unit 2622 may periodically perform sampling according to the second sampling frequency.

The touch sensing unit 260 determines whether noise is received using the sampled signal S22. The touch sensing unit 260 may determine whether noise is introduced by using a difference between signals periodically sampled according to the second sampling frequency. Similarly, the touch sensing unit 260 determines that the noise signal is introduced into the touch sensing unit 260 when the difference in levels of the signals sampled during the initial period is greater than or equal to a predetermined size.

When it is determined that noise is received in the initial period, the touch sensing unit 260 drives at the first driving frequency in the first period S24.

In the second section, the touch sensing unit 260 receives a sensing signal S25. The touch sensing unit 260 may sample the sensing signal at the first sampling frequency. For example, the first driving/receiving unit 2620 and the second driving/receiving unit 2622 may periodically perform sampling according to the first sampling frequency.

If it is determined that noise is not received in the initial period, the touch sensing unit 260 drives at the second driving frequency in the first period S26, and the touch sensing unit 260 receives the sensing signal in the second period S27.

Next, a method for controlling the touch sensor will be described in detail.

In the initial period T10 within one touch report frame period F1, the first driving/receiving unit 2620 and the second driving/receiving unit 2622 may sample the sensing signal in response to the frequency of the first driving signal.

For example, the first driving/receiving unit 2620 and the second driving/receiving unit 2622 may sample the sensing signal at at least one sampling point according to a clock signal having a predetermined frequency. In this case, the clock signal for sampling the sensing signal may have a frequency four times the frequency of the first driving signal.

When it is determined that noise is not received in the initial period, in the first period T11 after the initial period T10, the coil driver 263 applies the first driving signal to the loop coil 264.

In the first section T11, the frequency of the first driving signal applied to the loop coil 264 corresponds to the resonance frequency of the first resonance circuit unit 13 of the stylus pen 10.

In the second period T12, the first driving/receiving unit 2620 receives a sensing signal from the plurality of first touch electrodes 111-1 to 111-*m*, and the second driving/receiving unit 2622 receives a sensing signal from the plurality of second touch electrodes 121-1 to 121-*n*.

The first driving/receiving unit 2620 and the second driving/receiving unit 2622 may sample the sensing signal at at least one sampling point according to a clock signal having a predetermined frequency. In this case, the clock signal for sampling the sensing signal may have a frequency four times the frequency of the first driving signal applied in the first period T11.

Even after the application of the first driving signal is finished, the resonance signal output by the first resonance circuit unit 13 of the stylus pen 10 in the second period T12 may be received by at least one of plurality of first touch electrodes 111-1 to 111-*m* and plurality of second touch electrodes 121-1 to 121-*n*.

The touch report frame period F1 includes a plurality of first periods T11 and second periods T12. For example, within the touch report frame period F1, the combination of the first period T11 and the second period T12 may be repeated eight times.

In the initial period T20 within the touch report frame period F2, in response to the frequency of the first driving signal, the first driving/receiving unit 2620 and the second driving/receiving unit 2622 may sample the sensing signal. In this case, the sampling frequency corresponds to the frequency of the driving signal applied in the first period T11 within the touch report frame period F1.

When it is determined that noise is received in the initial period, in the first period T21 after the initial period T20, the coil driver 263 applies the second driving signal to the loop coil 264.

In the first period T21, the frequency of the second driving signal applied to the loop coil 264 corresponds to the resonance frequency of the second resonance circuit unit 14 of the stylus pen 10.

In the second period T22, the first driving/receiving unit 2620 receives a sensing signal from the plurality of first touch electrodes 111-1 to **111-*m*, and the second driving/receiving unit 2622 receives a sensing signal from the plurality of second touch electrodes 121-1 to 121-*n***.

The first driving/receiving unit 2620 and the second driving/receiving unit 2622 may sample the sensing signal at at least one sampling point according to a clock signal having a predetermined frequency. In this case, the clock signal for sampling the sensing signal may have a frequency four times the frequency of the second driving signal applied in the first period T21.

Even after the application of the second driving signal is finished, the resonance signal output by the second resonance circuit unit 14 of the stylus pen 10 in the second section T22 may be received by at least one of plurality of first touch electrodes 111-1 to **111-*m* and plurality of second touch electrodes 121-1 to 121-*n***.

The touch report frame period F2 includes a plurality of first periods T21 and second periods T2. For example, within the touch report frame period F2, the combination of the first period T21 and the second period T22 may be repeated eight times.

According to the control method of the electronic device, there occurs an advantageous effect that a signal with reduced noise can be received by applying a driving signal having a frequency different from that of external noise currently being applied to the electronic device to the touch panel 261 and by resonating the stylus pen 10.

Next, another embodiment of the control method of the electronic device 2 using the stylus pen 10 is described with reference to FIGS. 222 and 223.

FIG. 222 is a flow chart illustrating a control method of the electronic device 2 according to another embodiment, and FIG. 223 is a waveform diagram illustrating a driving signal according to the method of controlling the electronic device in FIG. 222.

Referring to FIG. 222, in A first periods of one touch report frame period, the touch sensing unit 260 is driven at the first driving frequency S30. Compared to the method of controlling the touch sensor in FIG. 220, in the method of controlling the touch sensor in FIG. 222, noise sampling is not performed in the initial period.

For example, in A first periods within one touch report frame period, the coil driver 263 applies a first driving signal to the loop coil 264.

In the present embodiment, one touch report frame period according to the touch report rate may include n first periods and n second periods. The first period and the second period alternate with each other. That is, a second period exists between two consecutive first periods. The A first periods may include a first period other than at least one first period (B first periods) among a plurality of first periods included in one touch report frame period. That is, it may be n=A+B, where A>0 and B>0.

In the control method in FIG. 222, the first period of one touch report frame period is included in A first periods. The order and arrangement of the A first periods within one touch report frame period may be changed.

It has been described in the above that, in the A first periods, the first driving/receiving unit 2620 simultaneously applies the first driving signal to the plurality of first touch electrodes 111-1 to **111-*m*, but in the first period, the second driving/receiving unit 2622 may simultaneously apply the first driving signal to the plurality of second touch electrodes 121-1 to 121-*n*, or the first driving/receiving unit 2620 and the second driving/receiving unit 2622 may simultaneously apply the first driving signal to the plurality of first touch electrodes 111-1 to 111-*m* and may simultaneously apply the first driving signal to the plurality of second touch electrodes 121-1 to 121-*n*. When the first driving/receiving unit 2620 and the second driving/receiving unit 2622 apply the first driving signal to the plurality of first touch electrodes 111-1 to 111-*m* and the plurality of second touch electrodes 121-1 to 121-*n*, it is assumed that the phases of the first driving signal applied to the plurality of first touch electrodes 111-1 to 111-*m* and the first driving signal applied to the plurality of second touch electrodes 121-1 to 121-*n*** are the same, but it is not limited thereto.

In A second periods of one touch report frame period, the touch sensing unit 260 receives a sensing signal S32. The A second periods include the second periods immediately following the A first periods.

For example, the touch sensing unit 260 may sample the sensing signal at the first sampling frequency. That is, the first driving/receiving unit 2620 and the second driving/receiving unit 2622 may periodically perform sampling according to the first sampling frequency.

The control unit 2624 may generate touch information indicating touch coordinates, touch intensity, and the like, by using the sensing signal periodically sampled according to the first sampling frequency.

In this case, the control unit 2624 may acquire the signal amplitude of the sensing signal by using the difference value between the signal values sampled at the two sampling points. The control unit 2624 may determine whether to touch, touch coordinates, etc. according to the signal level of the sensing signal.

In B first periods of one touch report frame period, the touch sensing unit 260 is driven at the second driving frequency S34.

For example, in B first periods within one touch report frame period, the coil driver 263 simultaneously applies the second driving signal to the loop coil 264.

It has been described in the above that, in the B first periods, the first driving/receiving unit 2620 simultaneously applies the second driving signal to the plurality of first touch electrodes 111-1 to **111-*m*, but in the first period, the second driving/receiving unit 2622 may simultaneously apply the second driving signal to the plurality of second touch electrodes 121-1 to 121-*n*, or the first driving/receiving unit 2620 and the second driving/receiving unit 2622 may simultaneously apply the second driving signal to the plurality of first touch electrodes 111-1 to 111**-*m* and may simultaneously apply the second driving signal to the plurality of second touch electrodes 121-1 to 121-*n*. When the first driving/receiving unit 2620 and the second driving/receiving unit 2622 apply the second driving signal to the plurality of first touch electrodes 111-1 to 111-*m* and the plurality of second touch electrodes 121-1 to 121-*n*, it is assumed that the phases of the second driving signal applied to the plurality of first touch electrodes 111-1 to 111-*m* and the second driving signal applied to the plurality of second touch electrodes 121-1 to 121-*n* are the same, but it is not limited thereto.

In B second periods of one touch report frame period, the touch sensing unit 260 receives a sensing signal S36. The B second periods include second periods immediately following the B first periods.

For example, the touch sensing unit 260 may sample the sensing signal at the second sampling frequency. That is, the first driving/receiving unit 2620 and the second driving/receiving unit 2622 may periodically perform sampling according to the second sampling frequency.

The control unit 2624 may generate touch information indicating touch coordinates, touch intensity, and the like by using the sensing signal periodically sampled according to the second sampling frequency.

In this case, the control unit 2624 may acquire the signal amplitude of the sensing signal by using the difference value between the signal values sampled at the two sampling points. The control unit 2624 may determine whether to touch, touch coordinates, etc. according to the signal level of the sensing signal.

Next, the touch sensing unit 260 determines whether there is a noise signal using the sensing signal received in A second periods and the sensing signal received in B second periods S38, and determines whether there is a noise signal. If it is determined that there is a noise signal, the control unit 2624 determines the frequency of the noise signal S40.

For example, the control unit 2624 may acquire the signal amplitude (referred to as the first amplitude) of the sensing signal by using a difference value between signal values sampled at any two sampling points in one second period among the A second periods, and may acquire the signal amplitude (referred to as a second amplitude) of the sensing signal by using a difference value between signal values sampled at any two sampling points in one second period among the B second periods. If the difference between the first amplitude and the second amplitude is equal to or greater than a threshold value, the control unit 2624 may determine that there is a noise signal. When the first amplitude is greater than the second amplitude by a threshold value or more, the control unit 2624 may determine that a noise signal similar to the frequency of the second driving signal is being introduced. Similarly, when the second amplitude is greater than the first amplitude by more than a threshold value, the control unit 2624 may determine that a noise signal similar to the frequency of the first driving signal is being introduced.

In addition, the control unit 2624 stores in advance the level of a signal that can be sensed and output from the stylus pen 10 by each driving signal in a memory or the like, and when a signal greater than the stored value is received (that is, the first level is greater than the value stored in the memory, or the second level is greater than the value stored in the memory), it may be determined that a noise signal is being introduced.

That is, the control unit 2624 may compare a signal received from the touch panel 261 by resonating the first resonant circuit unit 13 by the first driving signal and a signal received from the touch sensor 261 by resonating the second resonance circuit unit 14 by the second driving signal, and may determine whether a noise signal similar to the frequency of the first driving signal or a noise signal similar to the frequency of the second driving signal is introduced from the outside.

When the frequency of a noise signal is similar to the frequency of the second driving signal, the touch sensing unit 260 increases the number of first periods driven by the first driving signal within the touch report frame period S42.

If the frequency of a noise signal is similar to the frequency of the first driving signal, the touch sensing unit 260 increases the number of first periods driven by the second driving signal within the touch report frame period S44.

For example, as shown in FIG. 223, within the first touch report frame period F1, when the first driving signal f1 is applied during four first periods T11, the second driving signal f2 is applied during four first periods T11, and it is determined that the frequency of an incoming noise signal is similar to the frequency of the second driving signal, during the second touch report frame period F2, the control unit 2624 may apply the first driving signal f1 during six first periods T21, and apply the second driving signal f2 during two first periods T21. In this case, the control unit 2624 may generate touch information indicating touch coordinates, touch intensity, and the like, using only the sensing signals received during the six second periods T22.

That is, if the signal-to-noise ratio (SNR) of the signal sampled within the A second periods is greater than the SNR of the signal sampled within the B second periods, the control unit 2624 increases the number of first periods driven by the first driving signal. If the SNR of the signal sampled within the B second periods is greater than the SNR of the signal sampled within the A second periods, the control unit 2624 increases the number of first periods driven by the second driving signal.

Although FIG. 223 shows a first period T11 to which the first driving signal f1 is applied and a second period T12 to which the second driving signal f2 is applied are mutually alternating within the first touch report frame period F1, the second period T12 in which the second driving signal f2 is applied may start after the first period T11 in which the first driving signal f1 is applied is continued four times. The order of the first period T11 to which the first driving signal f1 is applied and the second period T12 to which the second driving signal f2 is applied is not limited in the present embodiment.

The control unit 2624 may perform the steps S30 to S40 within the second touch report frame period F2, and may determine the presence or absence of a noise signal and the frequency of the noise signal again.

When it is determined again that the frequency of an incoming noise signal is similar to the frequency of the second driving signal within the second touch report frame period F2, the control unit 2624 may apply the first driving signal f1 during seven first periods T31, and may apply the second driving signal f2 during one first period T31, within the third touch report frame period F3.

In this case, the control unit 2624 may generate touch information indicating touch coordinates, touch intensity, and the like, using only the sensing signals received during the seven second periods T32.

According to the control method of the touch sensor, by determining the external noise currently being applied to the touch sensor, applying a driving signal having a different frequency to the touch sensor 261, and resonating the stylus pen 10, there occurs an advantageous effect that a signal with reduced noise can be received.

According to embodiments, the touch sensing unit 260 may determine the presence or absence of a noise signal and transmit touch data including information on the determined noise signal to a host device.

An antenna loop of a spiral pattern implemented on one plane according to the present disclosure will be described with reference to the drawings below.

FIG. 224A and FIG. 224B are views showing the arrangement of a touch sensor and a loop coil.

As shown in FIG. 224A, the loop coil 264 may be positioned to surround the circumference of the touch sensor 261 without overlapping with the touch sensor 261. A current ID having an AC waveform by a driving signal is applied to the loop coil 264.

As shown in FIG. 224B, the loop coil 264 may be located in an area overlapping the touch sensor 261. A current ID having an AC waveform by a driving signal is applied to the loop coil 264.

An area with low reception sensitivity within the touch sensor will be described with reference to FIGS. 225 and 226.

FIGS. 225 and 226 are views illustrating the arrangement of a touch sensor and a loop coil.

As shown in FIG. 225, the touch electrodes 111, 121 in the touch sensor are connected to the traces 112, 122 of the peripheral area positioned at the edge of the touch area. The first touch electrodes 111-1, 111-2, 111-3, . . . are respectively connected to the corresponding traces 112, and the second touch electrodes 121-1, 121-2, 121-3, . . . are respectively connected to the corresponding traces 122.

Since the first touch electrodes 111-1, 111-2, 111-3, . . . are longer than the second touch electrodes 121-1, 121-2, 121-3, . . . , RC delay may occur. Thus, the traces 112 may be connected to both one end and the other end of the first touch electrodes 111-1, 111-2, 111-3, . . . .

When a current by the driving signal DS flows through the antenna loop 241, the levels of a magnetic field formed in the central area A1 of the touch sensor and a magnetic field formed in the corner areas C1, C2, C3, C4 of the touch sensor are different from each other.

Whereas a magnetic field is generated in the center area A1 of the touch sensor in the same direction (−Z-axis direction in FIG. 225) by a current flowing through the antenna loop 241, since the direction of the antenna loop 241 is arranged in a form in which a magnetic field is difficult to be generated in the corner areas C1, C2, C3, C4 of the touch sensor, the magnitude of a magnetic field is smaller. More specifically, a magnetic field in the −Z axis direction is generated by the current flowing in the antenna loop 241 inside the touch sensor. In this case, the magnitude of the magnetic field at the edge or in the corner areas C1, C2, C3, C4 of the touch sensor is smaller than that in the central area A1 of the touch sensor.

Accordingly, the stylus pen 10 receives less magnetic energy from the touch sensor corner areas C1, C2, C3, C4 than from the touch sensor center area A1. As a result, when the stylus pen 10 is located in the corner areas C1, C2, C3, C4 of the touch sensor, a signal output from the stylus pen 10 might be significantly reduced, or a signal output might be stopped in some cases.

Accordingly, it is required to design an antenna module capable of increasing the magnetic energy transmitted to the stylus pen 10 located in the corner areas C1, C2, C3, C4 of the touch sensor.

As shown in FIG. 226, the trace layer 26 may be formed on the same layer as the touch electrode layer 21. In addition, the trace layer 26 may be formed of a conductor material exhibiting high transmittance and low impedance, such as silver nanowires. However, the trace layer 26 may be positioned as a different layer from the touch electrode layer 21, and may be made of ITO or graphene, but it is not limited thereto.

The antenna loop 241 may be positioned on the base film 242. In this case, the base film may be made of a polyimide resin, an epoxy-based resin, or other known flexible material. The base film may be flexible.

When a touch object, such as a human body, is being touched in the peripheral area of the touch sensor, a capacitance Cc is formed between the conductive antenna loop 241 and the touch object. A capacitance Ct is also formed between the touch object and the traces 112, 122. A capacitance Ce is also formed between the touch object and the touch electrodes 111, 121 located in the touch electrode layer 21. In more detail, when a touch object such as a human body comes into contact with an edge area of the touch sensor, for example, the corner areas C1, C2, C3, C4 of the touch sensor or the area where the antenna loop 241 is located, a capacitance Cc is formed between the conductive antenna loop 241 and the touch object. A capacitance Ct is also formed between the touch object and the traces 112, 122, and a capacitance Ce is also formed between the touch object and the touch electrodes 111, 121 located in the touch electrode layer 21.

When the driving signal DS is applied to the antenna loop 241, the driving signal DS affects the traces 112, 122 and the touch electrodes 111, 121 by the electrical coupling Cc, Ct, Ce.

For example, while the driving signal DS is being applied to the antenna loop 241, when a sensing signal from the stylus pen 10 is received by the touch electrodes 111, 121, noise may be generated by the driving signal DS transmitted to the touch electrodes 111, 121 through the touch object. In addition, while the driving signal DS is being applied to the antenna loop 241, when the sensing signal received by the touch electrodes 111, 121 is transmitted to the touch controller 262 through the traces 112, 122, noise may be generated by the driving signal DS transmitted to the traces 112, 122 through the touch object.

In addition, even when the touch object is not being touched, the antenna loop 241, the touch electrodes 111, 121, and the traces 112, 122 are electrically influenced by each other. For example, the touch electrodes 111, 121 and the traces 112, 122 may form a direct capacitive coupling with the antenna loop 241. Accordingly, when a voltage of a predetermined frequency is applied to the loop coil 264, noise may be generated by the sensing signal sensed by the touch electrodes 111, 121 or the sensing signal transmitted to the touch controller 262 by the traces 112, 122.

In addition, when a current flows through the antenna loop 241, a magnetic field Mc is generated, and this magnetic field eventually causes a current (e.g., eddy current) in the touch electrodes 111, 121 and the traces 112, 122 to be generated. That is, noise may be generated by electromagnetic induction in a sensing signal sensed by the touch electrodes 111, 121 or a sensing signal transmitted to the touch controller 262 by the traces 112, 122.

In particular, in the case of touch electrodes in which the trace 112 and the touch electrode 111 extend in the same direction, noise due to an electromagnetic coupling may be greater. In this regard, it will be described with reference to FIG. 227.

FIG. 227 is a view showing the arrangement of the touch sensor and the loop coil of FIG. 225 in more detail.

Referring to FIG. 227, touch electrodes 111-1, . . . , 111-16 are connected to traces 112-1, . . . , 112-16, respectively, and touch electrodes 121-1, . . . , 121-28 are connected to traces 122-1, . . . , 122-28, respectively.

In this case, when the trace connected to the touch electrode is adjacent to the corresponding touch electrode, greater noise may be generated.

For example, as shown in FIG. 227, the touch electrode 111-1 extending in the y-axis direction and the trace 112-1 extending in the y-axis direction are connected to each other. The touch electrode 111-1 and the trace 112-1 are positioned adjacent to each other. That is, no other trace or touch electrode is positioned between the touch electrode 111-1 and the trace 112-1. In this case, when the length of the antenna loop 241 extending in the Y-axis direction, which is located within the maximum width in the Z-axis direction of the touch electrode 111-1, is more than twice the length of the touch electrode 111-1 in the Y-axis direction, the touch electrode 111-1 and the trace 112-1 are all affected by the driving signal DS applied to the antenna loop 241. In more detail, the first touch electrode 111-1 extending in the Y-axis direction and the first trace 112-1 extending in the y-axis direction are connected to each other. In addition, the first touch electrode 111-1 and the first trace 112-1 are positioned adjacent to each other. That is, no other trace or touch electrode is positioned between the first touch electrode 111-1 and the first trace 112-1. In this case, when the sum of the lengths of the antenna loop 241 extending in the Y-axis direction located within the maximum width in the X-axis direction of the first touch electrode 111-1 is more than twice the length of the first touch electrode 111-1 in the Y-axis direction, both the touch electrode 111-1 and the trace 112-1 are affected by the driving signal DS applied to the antenna loop 241.

That is, when a touch object comes into contact with the area P1 where the touch electrode 111-1 and the trace 112-1 are located, or the area P1 where the first touch electrode 111-1 and the antenna loop 241 overlap, both the first touch electrode 111-1 receiving a sensing signal and the first trace 112-1 transmitting the received sensing signal to the touch controller 262 are affected by the driving signal DS applied to the antenna loop 241 located in the area corresponding to the maximum width in the X-axis direction of the first touch electrode 111-1.

However, even when a touch object is being touched in the area P2, the touch electrodes 111-2, . . . , 111-15, 111-16 are affected by the driving signal DS applied to the antenna loop 241. However, in the case of the traces 112-2, . . . , 112-15, 112-16 that are connected to each other and are not adjacent to each other, the influence by the driving signal DS applied to the antenna loop 241 is little. In detail, when the touch object is being touched in the area P2 where the touch electrodes 111-2, . . . , 111-15, 111-16 and the antenna loop 241 do not overlap on the Z-axis, the touch electrodes 111-2, . . . , 111-15, 111-16 that do not overlap with the antenna loop 41 extending in the Y-axis may be affected by the driving signal DS applied to the antenna loop 241. However, since the interconnected traces 112-2, . . . , 112-15, 112-16 are not directly adjacent to each other, the influence of the driving signal DS applied to the antenna loop 241 is small.

In addition, when a touch object is being touched adjacent to the traces 112-1, . . . , 112-15, 112-28, the touch electrodes 121-1, . . . , 121-28 may be affected by the driving signal DS applied to the antenna loop 241. However, the area affected thereby is smaller in comparison with the touch electrodes 111-1, . . . , 111-16. When a touch object is being touched adjacent to the touch electrodes 121-1, . . . , 121-28, the touch electrodes 121-1, . . . , 121-28 may be affected by the driving signal DS applied to the antenna loop 241. However, the traces 112-1, . . . , 112-15, 112-28 are less affected by the driving signal DS. In detail, in the case of the touch electrodes 121-1, . . . , 121-28 extending in the X-axis direction, when the touch object is being touched in an area adjacent to the traces 112-1, . . . , 112-15, 121-16, the touch electrodes 121-1, . . . , 121-28 extending in the X-axis direction may be affected by the driving signal DS applied to the antenna loop 241. However, the area affected thereby is smaller in comparison with the touch electrodes 111-1, . . . , 111-16 extending in the Y-axis direction.

That is, a greater noise may be generated in the case between a trace and a touch electrode that are connected to each other, adjacent to each other and arranged in the same or similar direction, in comparison with in the case between a trace and a touch electrode that are connected to each other and arranged in the same or similar direction but not adjacent to each other, and in the case between a trace and a touch electrode that are connected to each other and adjacent to each other but not arranged in the same or similar direction.

The inventors found and confirmed that when the touch electrode and the trace connected thereto extend in the same or similar direction (the Y-axis direction in FIG. 227) and are located adjacent to each other (the electrode or the trace is not disposed between them), if the sum of the lengths of the antenna loop present in the area overlapping the touch electrode is more than twice the length of the touch electrode in the Y-axis direction, noise caused by the antenna loop driving was generated in the touch electrode and the trace. Here, the area overlapping the touch electrode may mean an area within the maximum width in the X-axis direction of the touch electrode (in some cases, within ±15% of the maximum width in the X-axis direction of the touch electrode).

Therefore, it is required to design an antenna module capable of reducing such noise.

FIGS. 228 to 233 are views showing the arrangement of a touch sensor and a loop coil in various aspects of an embodiment.

It is assumed that the arrangement of the touch electrodes 111, 121 and the traces 112, 122 in FIGS. 228 to 233 is the same as that of the touch sensor illustrated in FIGS. 225 and 227. The antenna loop 241 is indicated by a solid line, the touch sensor is indicated by a dashed-dotted line, and the antenna loop and the touch sensor may be located on different layers.

In FIGS. 228 to 232, in the area P1 adjacent to the trace 112-1 and the touch electrode 111-1 extending in the Y-axis direction while being connected to each other, the length of a part of the antenna loop 241 extending in the Y-axis direction while overlapping the touch electrode within the maximum width in the X-axis direction of the touch electrode 111-1 as a part of the antenna loop 241 is less than twice the length of the touch electrode 111-1 in the Y-axis direction. That is, the density of the antenna loop 241 located in the area P1 is less than the density of the antenna loop 241 located in the area P2. Here, it is assumed that the density is the overlapping length of the touch electrode extending in the same direction and the antenna loop 241 on the XY plane. Alternatively, in the area P1 adjacent to the trace 112-1 and the touch electrode 111-1 extending in the Y-axis direction while being connected to each other, the length or the sum of the lengths of the antenna loop 241 extending in the Y-axis direction while overlapping the touch electrode within the maximum width in the X-axis direction of the touch electrode 111 as a part of the antenna loop 241 is less than twice the length of the touch electrode 111-1 in the Y-axis direction.

Figure 228:
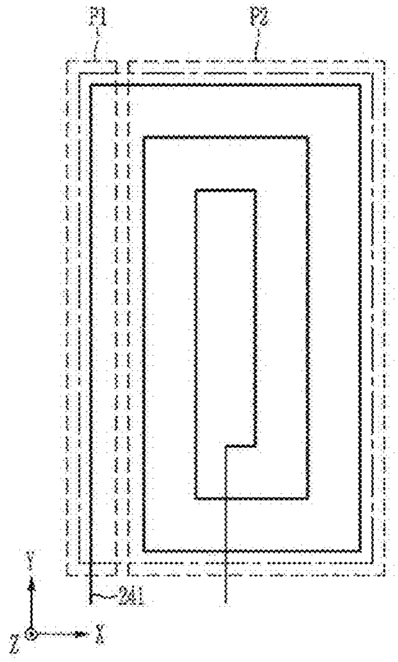
Figure 229:
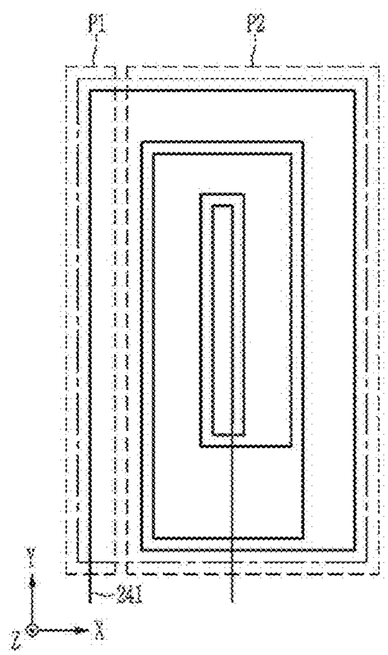

Referring to FIGS. 228 and 229, the Y-axis direction length of the antenna loop 241 extending in the Y-axis direction overlapping the touch electrode 111-1 extending in the Y-axis direction along the Y-axis direction is less than or equal to 1 time the length of the touch electrode 111-1 in the Y-axis direction. Since the antenna loop 241 is wound, the first winding of the antenna loop 241 located in the area P1 and the second winding of the antenna loop 241 adjacent to the area P1 may be located on different Y-axis direction touch electrodes. More specifically, in the P1 area, the Y-axis direction length of the antenna loop 241 positioned within the maximum width in the X-axis direction of the touch electrode 111-1 is less than 1 time the Y-axis direction length of the touch electrode 111-1. As shown in the drawings, when the antenna loop 241 is wound, the touch electrode overlapping the first winding of the antenna loop 241 located in the area P1 may be different from the touch electrode overlapping the second winding of the antenna loop 241 located in the area P2.

As shown in FIG. 228, the separation distance between the first and second windings of the antenna loop 241 (the separation distance in the X-axis direction) and the minimum separation distance between the second and third windings of the antenna loop 241 may be substantially the same.

As shown in FIG. 229, the separation distance between the first winding and the second windings of the antenna loop 241 may be greater than the minimum separation distance between the second winding and the third winding of the antenna loop 241. The separation distance between the first winding of the antenna loop 241 and the second winding of the antenna loop 241 may be substantially equal to the minimum separation distance between the third winding and the fourth winding of the antenna loop 241.

Figure 230:
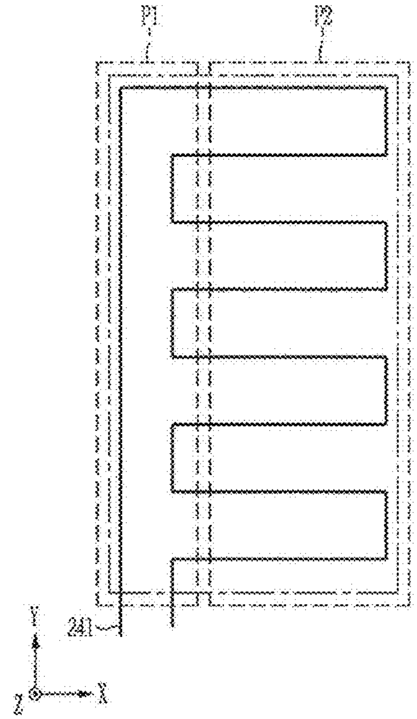
Figure 231:
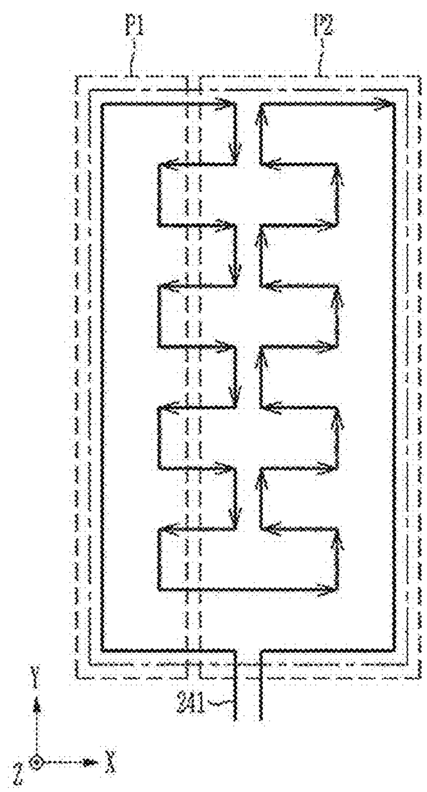

Referring to FIGS. 230 and 231, the Y-axis direction length or total length of the antenna loop 241 extending in the Y-axis direction overlapping the touch electrode 111-1 extending in the Y-axis direction along the Y-axis direction is less than twice the length of the touch electrode 111-1 in the Y-axis direction.

As shown in FIG. 230, the antenna loop 241 may include a first portion extending in the Y-axis direction and a second portion in which a pulse-shaped pattern is repeated along the Y-axis direction. In this case, a portion of the second portion may be located in the area P1. That is, a portion of the second portion may overlap the touch electrode 111-1 extending in the Y-axis direction.

As shown in FIG. 231, the antenna loop 241 may be in a form that a structure including a first portion extending in the Y-axis direction and a second portion in which a pulse-shaped pattern is repeated along the Y-axis direction is symmetrically disposed. In this case, a portion of the second portion may be located in the area P1. That is, a portion of the second portion may overlap the touch electrode 111-1 extending in the Y-axis direction.

As shown in FIGS. 230 and 231, by setting the sum of the partial areas of the first portion overlapping the touch electrode 111-1 and including the second portion in which the pulse-shaped pattern is repeated and the second portion to be less than twice the length of the electrode 111-1 in the Y-axis direction, it is possible to prevent the above-mentioned noise generation and to achieve a further improved noise reduction effect by the repeated pulse-shaped patterns. That is, it is possible to achieve a synergistic effect of enhancing the noise reduction effect through the antenna patterns in FIGS. 230 and 231.

Figure 232:
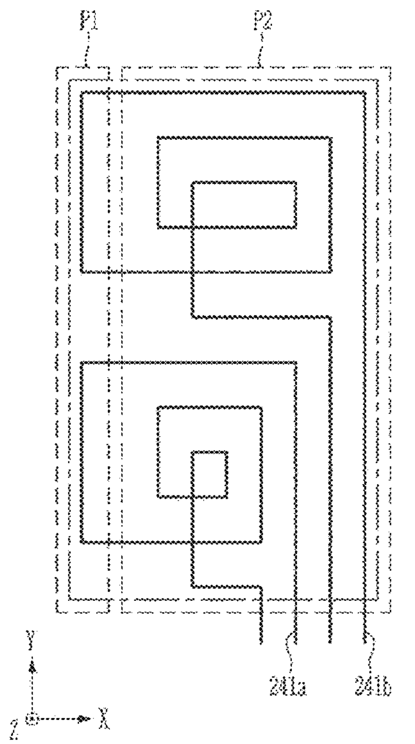

Referring to FIG. 232, a plurality of antenna loops 241*a*, 241*b* may be located. The sum of the lengths in Y-axis direction of the antenna loop 241*a* extending in the Y-axis direction overlapping the touch electrode 111-1 extending in the Y-axis direction and the antenna loop 241*b* extending in the Y-axis direction overlapping the touch electrode 111-1 extending in the Y-axis direction is less than or equal to 1 time the length in the Y-axis direction of the touch electrode 111-1.

A driving signal may be applied to each of the antenna loops 241*a*, 241*b* independently of each other. Accordingly, when a driving signal is applied only to the antenna loop 241*a* or only to the antenna loop 241*b*, the influence on the touch electrode 111-1 and the trace 112-1 can be further reduced.

Figure 233:
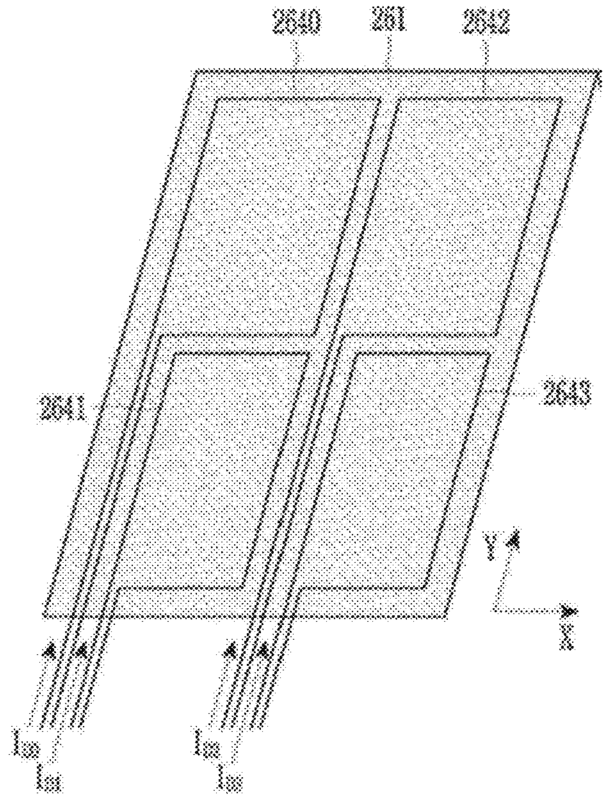

As shown in FIG. 233, the loop coil 264 may include a plurality of sub-loop coils 2640, 2641, 2642, 2643. The plurality of sub-loop coils 2640, 2641, 2642, 2643 may be located in an area overlapping the touch panel 261, but it is not limited thereto. Currents ID0, ID1, ID2, ID3 having AC waveforms by driving signals are respectively applied to the plurality of sub-loop coils 2640, 2641, 2642, 2643.

A noise reduction effect in the case of using the antenna loop 241 according to an embodiment of the present disclosure will be described with reference to FIG. 234.

FIG. 234 is a graph comparing a touch signal and a noise signal according to an embodiment and a comparative example.

The Y-axis represents the amplitude of a signal sensed by each touch electrode, and the X-axis represents the number of the touch electrode. It will be described that the first electrode is the touch electrode 111-1 and the 16th electrode is the touch electrode 111-16.

Signals 2010, 2012 sensed in the structure of the antenna loop 241 as shown in FIG. 227 will be described. Since the difference between the noise signal 2010 and the touch signal 2012 sensed by the touch electrodes 111-2, . . . , 111-16 is greater than or equal to a threshold value, the touch controller 262 may detect the touch signal 2012 as a touch input. However, in the case of the first electrode 111-1, since the amplitude of the touch signal 2012 is smaller than the amplitude of the noise signal 2020, the touch controller 262 may not detect the touch signal 2012 as a touch input.

Signals 2020, 2022 sensed in the structure of the antenna loop 241 as shown in FIGS. 228 to 232 will be described. Since the amplitude of the touch signal 2022 sensed by the touch electrodes 111-1, . . . , 111-16 is greater than the amplitude of the noise signal 2020, the touch controller 262 may detect the touch signal 2022 as a touch input.

Next, an antenna module capable of increasing magnetic energy transmitted to the stylus pen 10 positioned in the corner areas C1, C2, C3, C4 of the touch sensor will be described with reference to FIGS. 235 to 238B.

FIGS. 235 to 238B are views showing the arrangement of a touch sensor and a loop coil in various aspects of another embodiment.

Figure 235:
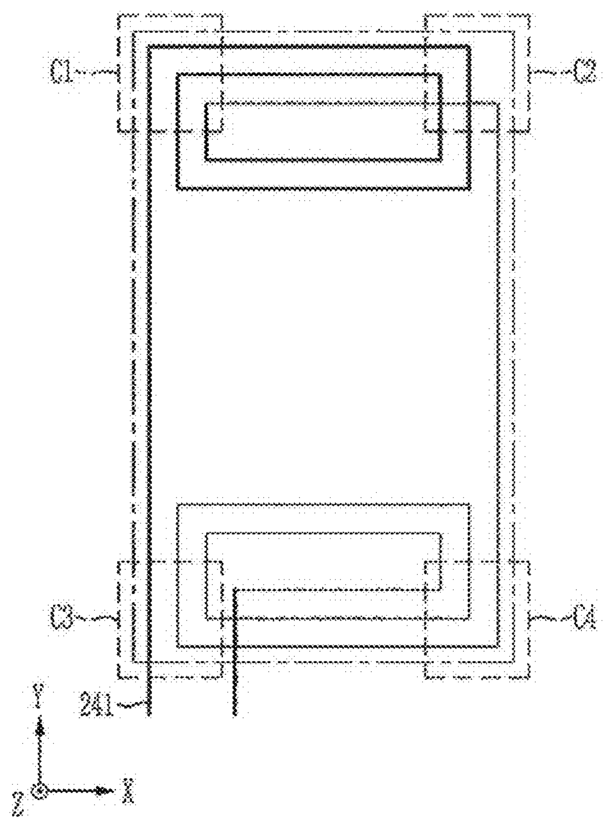
Figure 236:
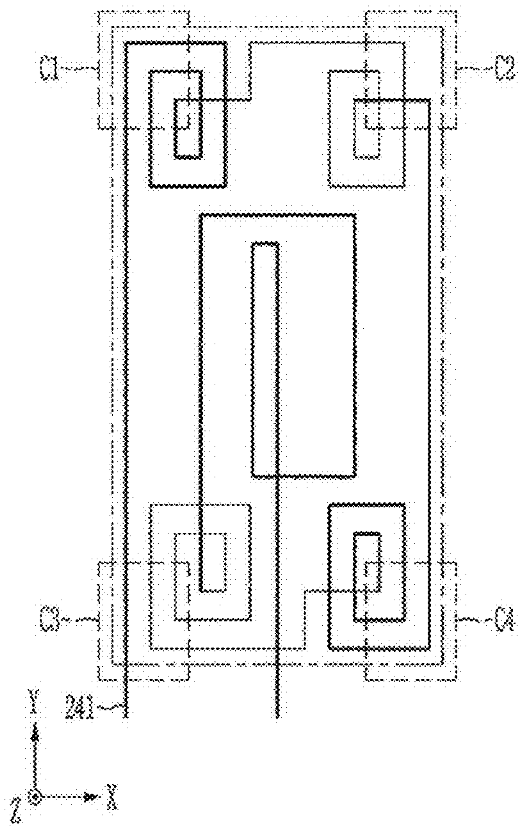

FIGS. 235 and 236, the number of windings in the corner areas C1, C2, C3, C4 of the antenna loop 241 is greater than the number of windings in other areas.

As shown in FIG. 235, the antenna loop 241 may be wound twice across the corner areas C1, C2, C3, C4 adjacent to each other, and as shown in FIG. 236, the antenna loop 241 may be wound twice in each of the corner areas C1, C2, C3, C4.

Also, as shown in FIG. 236, after winding in each of the corner areas C1, C2, C3, C4, one winding may be performed in the central area as well.

Magnetic energy transmitted to the stylus pen 10 located in the corner areas C1, C2, C3, C4 can be increased through a structure that increases the number of windings in the corner areas C1, C2, C3, C4 as described above.

Figure 237:
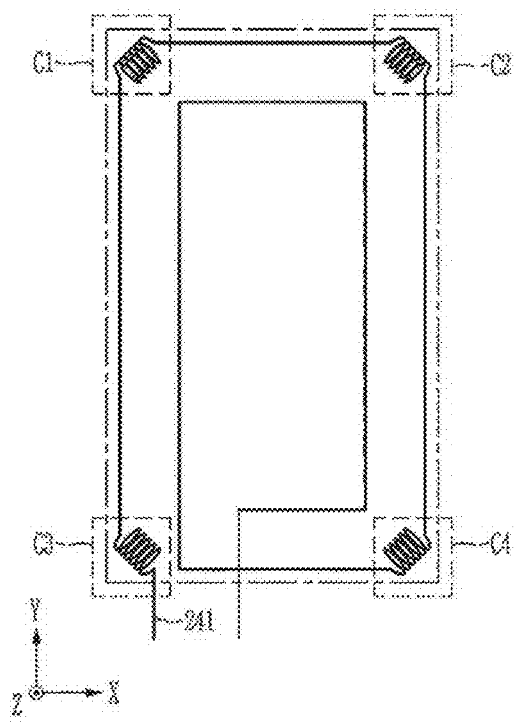
Figure 238A:
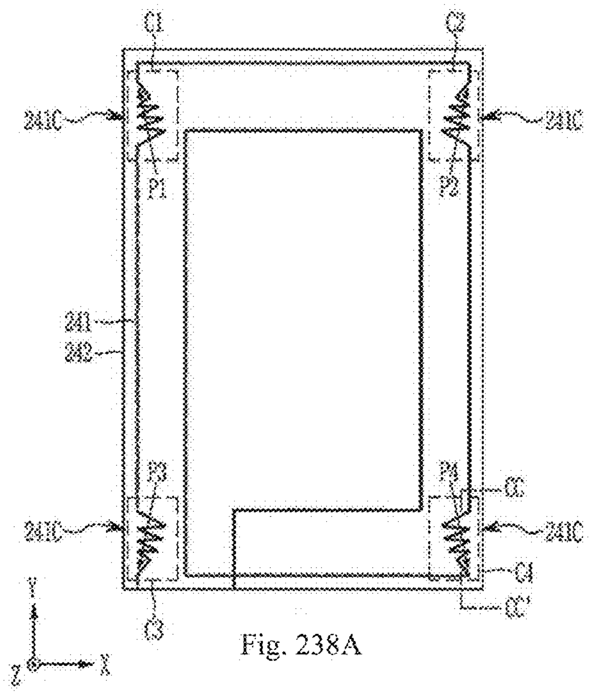

Referring to FIGS. 237 and 238A, in order to form a magnetic field in the vertex directions P1, P2, P3, P4 in the corner areas C1, C2, C3, C4, corner patterns 241*c* may be positioned on the corner areas C1, C2, C3, C4. The corner pattern 241*c* has a pattern that is repeated in a zigzag manner in each of the corner areas C1, C2, C3, C4.

Figure 238B:
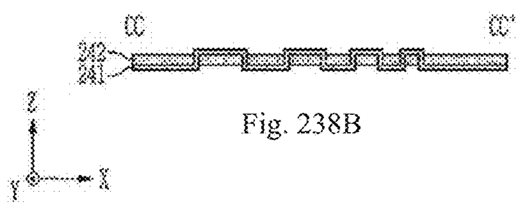

Referring to FIG. 238B, if the base film 242 is a double side PCB, the corner patterns 241*c* may be alternately positioned on both surfaces of the base film 242. If the base film 242 is a multilayer PCB, the corner patterns 241*c* may be positioned on several layers of the base film 242. This is to implement a solenoid as the corner pattern 241*c*.

The solenoid implemented as the corner patterns 241*c* may form a magnetic field in a vertex direction or a direction in which the vertex direction and the Z-axis direction are combined. Accordingly, the antenna loop 241 may increase the transmission of magnetic energy even to the stylus pen 10 inclined toward the vertex in the corner areas C1, C2, C3, C4.

According to the embodiments, there are advantages in that the reception sensitivity of a touch input can be improved and a more accurate touch position can be calculated.

According to the embodiments, there is an advantage in that the energy delivered to the stylus pen in the corner area of the antenna loop can be increased.

Next, touch data reported by the touch sensing unit 260 to an internal/external device will be described with reference to FIGS. 239 and 240.

FIG. 239 is a block diagram illustrating a touch sensor and a host according to the present disclosure, and FIG. 240 is a diagram illustrating an example of touch data provided from the touch sensor to the host.

Referring to FIG. 239, the host 270 may receive touch data from the touch controller 262 included in the touch sensing unit 260. For example, the host 270 may be a mobile system-on-chip (SoC), an application processor (AP), a media processor, a microprocessor, a central processing unit (CPU), or a similar device.

After one frame ends, the touch sensing unit 260 may generate touch information inputted during one frame period 1F as touch data and transmit it to the host 270. Alternatively, when the first period T1 ends, the touch sensing unit 260 may generate touch information inputted during the first period T1 as touch data and transmit it to the host 270, and when the first sub-period T21 continuous to the first period T1 ends, the touch sensing unit 260 may generate touch information inputted during the first period T1 as touch data and transmit it to the host 270. Alternatively, when the first period (e.g., T1 in FIG. 115) ends, the touch sensing unit 260 may generate touch information inputted during the first period T1 as touch data and transmit it to the host 270, and when the second period T2 ends, the touch sensing unit 260 may generate touch information inputted during the first period T2 as touch data and transmit it to the host 270.

Alternatively, whenever each time period T1, T2, . . . , Tn ends, the touch sensing unit 260 may generate touch information inputted during each time period T1, T2, . . . , Tn as touch data and transmit it to the host 270.

In addition, the touch sensing unit 260 may perform the driving method according to FIG. 165 or the driving method according to FIG. 168 at predetermined time periods. For example, the touch sensing unit 260 may perform the driving method according to FIG. 165 or the driving method according to FIG. 168 at a period of three hours, one day, or the like.

Alternatively, the touch sensing unit 260 may perform the driving method according to FIG. 165 or the driving method according to FIG. 168 when there is a touch input after a predetermined time has elapsed from the last touch input to the touch sensing unit 260.

Alternatively, the touch sensing unit 260 may perform the driving method according to FIG. 165 or the driving method according to FIG. 168 when there is a request from the host 270 or when information indicating a specific state is received from the host 270.

As an example, the host 270 requests the touch sensing unit 260 to perform the driving method according to FIG. 165 or the driving method according to FIG. 168 when a change in the surrounding environment is detected through an environment sensor (e.g., barometer, hygrometer, thermometer, heat sensor, etc.) connected to the host 270. In this case, the host 270 may also transmit the value obtained from the environment sensor to the touch sensing unit 260 together.

As another example, when the host 270 transmits a value obtained from the environment sensor to the touch sensing unit 260, the touch sensing unit 260 may initiate to perform the driving method according to FIG. 165 or the driving method according to FIG. 168, based on the value obtained from the environment sensor.

In this case, the touch sensing unit 260 may change the frequency of a tracking signal by using the temperature, humidity, etc. sensed by the environment sensor.

For example, if the current ambient temperature is equal to or greater than the first threshold value, the touch sensing unit 260 may change the frequency periods in a direction in which the frequency of a tracking signal increases from a period including the lowest frequency among a plurality of frequency periods in which a frequency range around the reference frequency is divided into predetermined frequency units, and may change the frequency of the tracking signal. For example, if the current ambient temperature is less than the second threshold value (first threshold value>second threshold value), the touch sensing unit 260 may change the frequency periods in a direction in which the frequency of a tracking signal decreases from a period including the highest frequency among a plurality of frequency periods in which a frequency range around the reference frequency is divided into predetermined frequency units, and may change the frequency of the tracking signal.

Alternatively, if the current ambient temperature is a value between the third threshold value and the fourth threshold value (first threshold value>third threshold value>fourth threshold value>second threshold value), the touch sensing unit 260 may change the frequency periods in a direction in which the frequency of a tracking signal increases or decreases back and forth from a period including a frequency corresponding between the third threshold value and the fourth threshold value among a plurality of frequency periods in which a frequency range around the reference frequency is divided into predetermined frequency units, and may change the frequency of the tracking signal.

The touch sensing unit 260 may further include a memory, and temperature, humidity, and frequency periods of tracking signals corresponding to temperature and humidity conditions may be stored in the memory in a form of a look-up table (LUT). Then, the touch sensing unit 260 may read the frequency period of a tracking signal corresponding to the temperature and humidity sensed by the environment sensor from the memory, and may change the frequency of the tracking signal within the read frequency period.

In addition, the touch sensing unit 260 may trigger a driving method of the touch sensing unit 260 in various ways in order to search for the resonance frequency of the stylus pen 10, and it is not limited to the above description.

Referring to FIG. 240, touch data 600 may be transmitted from the touch sensing unit 260 to the host 270, and may include a touch count field 610 and at least one touch entity field 612, 614. In addition, the touch data 600 may further include sensor input data from the stylus pen 10, data indicating a change in a resonance signal, and the like.

A value indicating the number of touches input during one frame period may be written in the touch count field 610. For example, when the touch coordinates by one finger are calculated in the first period T1 within one frame period and the touch coordinates by one stylus pen are calculated in the first sub period T21, a value indicating that two touches are input is written in the touch count field 610. In addition, a value indicating the number of touches input during one frame period may be written in the touch count field 610. For example, when the touch coordinates by one finger are calculated in the first period T1 within one frame period and the touch coordinates by one stylus pen are calculated in the second period T2, a value indicating that two touches are input is written in the touch count field 610.

The touch entity fields 612, 614 include fields representing information about each touch input. For example, the touch entity fields 612, 614 include a flag field 620, an X-axis coordinate field 621, a Y-axis coordinate field 622, a Z value field 623, an area field 624, and a touch action field 625.

The number of touch entity fields 612, 614 may be equal to the value written in the touch count field 61.

A value indicating a touch object may be written in the flag field 620. For example, a finger, a palm, and a stylus pen may be written in the flag field 620 with different values. Values representing the calculated touch coordinates may be written in the X-axis coordinate field 621 and the Y-axis coordinate field 622. A value corresponding to the signal strength of the sensing signal may be written in the Z value field 623. A value corresponding to the area of the touched area may be written in the area field 624.

According to embodiments, the host device 270 receiving the touch data 600 uses the value of the area field 624, determines that the touch object is a finger if the touch area is greater than a threshold value, and determines that the touch object is a stylus pen 10 if the touch area is less than or equal to the threshold value.

According to embodiments, the host device 270 receiving the touch data 600 may use the value of the flag field 620 and identify whether the touch object is a finger or the stylus pen 10.

The electronic devices according to various embodiments disclosed in the present disclosre may be various types of apparatuses. The electronic device may include, for example, a portable communication device (e.g., a smartphone), a computer device, a portable multimedia device, a portable medical device, a camera, a wearable device, or a home appliance device. The electronic devices according to the embodiments of the present disclosure are not limited to the above-described devices.

Although the embodiments of the present invention have been described in detail above, the scope of the present invention is not limited thereto, and various modifications and improvements by those skilled in the art using the basic concept of the present invention defined in the following claims also fall within the scope of the present invention.

What is claimed is:

1. An electronic device comprising:

an OLED display panel including an encapsulation substrate;

a touch electrode layer formed directly on the top surface of the encapsulation substrate of the OLED display panel and including at least one touch electrode;

a conductive wire formed directly on the upper surface of the encapsulation substrate of the OLED display panel, disposed in the same layer as the touch electrode layer, and configured to generate a magnetic field signal for driving a stylus pen; and a touch controller configured to detect a position of the stylus pen on the OLED display panel, wherein the conductive wire is made of the same material as the at least one touch electrode, wherein the touch controller is configured to apply a first drive signal and a second drive signal to both ends of the conductive wire, respectively, and wherein the first drive signal is in opposite phase to the second drive signal.

2. The electronic device of claim 1, wherein the conductive wire has a form extending along a boundary of a display area of the OLED display panel.

3. The electronic device of claim 1, wherein the conductive wire is printed directly on the upper surface of the encapsulation substrate.

4. The electronic device of claim 1, wherein the OLED display panel includes at least one folding region, wherein the folding area is configured with a curved surface at least partially having a predetermined curvature when the OLED display panel is folded, and wherein the conductive wire has a form extending along a boundary of a display area of the OLED display panel.

5. An electronic device comprising:

an OLED display panel including an encapsulation substrate;

a touch electrode layer formed directly on the top surface of the encapsulation substrate of the OLED display panel and including at least one touch electrode;

a conductive wire formed directly on the upper surface of the encapsulation substrate of the OLED display panel, disposed in the same layer as the touch electrode layer, and configured to generate a magnetic field signal for driving a stylus pen; and a touch controller configured to detect a position of the stylus pen on the OLED display panel, wherein the OLED display panel includes at least one folding region, wherein the folding area is configured with a curved surface at least partially having a predetermined curvature when the OLED display panel is folded, wherein the electronic device comprises a magnetic field shielding sheet placed under the OLED display panel and placed so as to overlap with the conductive wire, and wherein the magnetic field shielding sheet is arranged under the OLED display panel in a first region and a second region separated from each other with the folding region as a reference.

6. An electronic device comprising:

an OLED display panel including an encapsulation substrate;

a touch electrode layer formed directly on the top surface of the encapsulation substrate of the OLED display panel and including at least one touch electrode;

a conductive wire formed directly on the upper surface of the encapsulation substrate of the OLED display panel, disposed in the same layer as the touch electrode layer, and configured to generate a magnetic field signal for driving a stylus pen; and a touch controller configured to detect position of the stylus pen on the OLED display panel, wherein the OLED display panel includes at least one folding region, wherein the folding area is configured with a curved surface at least partially having a predetermined curvature when the OLED display panel is folded, wherein the conductive wire includes a first conductive wire and a second conductive wire arranged on both sides of the folding region, and wherein the first and second conductive wires have a shape extending along a boundary between a display area and the folding area of the OLED display panel.

7. The electronic device of claim 6, wherein the electronic device comprises a magnetic field shielding sheet placed under the OLED display panel and placed so as to overlap with the conductive wire, wherein the magnetic field shielding sheet includes a first magnetic field shielding sheet disposed below the OLED display panel and disposed to overlap the first conductive wiring, and a second magnetic field shielding sheet disposed below the OLED display panel and disposed to overlap the second conductive wiring, wherein the first magnetic field shielding sheet is disposed in a first region separated from the folding region under the OLED display panel, and wherein the second magnetic field shielding sheet is arranged in a second region separated from the folding region under the OLED display panel.

8. The electronic device of claim 6, wherein when the stylus pen is located on the folding area, the touch controller is configured to apply a driving signal with the same phase to the first conductive wire and the second conductive wire.

9. The electronic device of claim 1, wherein the touch controller is configured to apply a driving signal for resonating the stylus pen to the at least one touch electrode.

10. The electronic device of claim 1, wherein the at least one touch electrode includes a first touch electrode and a second touch electrode, and wherein one of the first touch electrode and the second touch electrode is configured to detect an electromagnetic signal output from the stylus pen.

11. The electronic device of claim 1, wherein the at least one touch electrode includes a first touch electrode and a second touch electrode, and wherein one of the first touch electrode and the second touch electrode is configured to detect a signal due to electromagnetic interaction with the stylus pen.

12. The electronic device of claim 1, wherein the touch controller is configured to apply a driving signal for resonating a resonance circuit part of the stylus pen to the conductive wire in a first period, and wherein the touch controller is configured to receive a detection signal received through the at least one touch electrode in a second period after the first period.

* * * * *